US012608877B2

(12) United States Patent (10) Patent No.: US 12,608,877 B2
Ravasz et al. (45) Date of Patent: Apr. 21, 2026

(54) METHODS OF INTERACTING WITH CONTENT IN A VIRTUAL ENVIRONMENT

(71) Applicant: Apple Inc., Cupertino, CA (US)

(72) Inventors: Jonathan Ravasz, Sunnyvale, CA (US); Shih-Sang Chiu, San Francisco, CA (US); Christopher D. McKenzie, Burlingame, CA (US); Nicholas W. Henderson, San Carlos, CA (US); James M. Dessero, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/894,997

(22) Filed: Sep. 24, 2024

(65) Prior Publication Data

US 2025/0378629 A1 Dec. 11, 2025

Related U.S. Application Data

(60) Provisional application No. 63/658,393, filed on Jun. 10, 2024, provisional application No. 63/657,975, filed on Jun. 9, 2024.

(51) Int. Cl.
*G06T 15/20* (2011.01)
*G06F 3/01* (2006.01)

(52) U.S. Cl.
CPC .............. *G06T 15/20* (2013.01); *G06F 3/013* (2013.01)

(58) Field of Classification Search
CPC .................................. G06T 15/20; G06F 3/013
See application file for complete search history.

(56) References Cited

U.S. PATENT DOCUMENTS

| | | | |
|---|---|---|---|
| 1,173,824 | A | 2/1916 | Mckee |
| 5,015,188 | A | 5/1991 | Pellosie et al. |

(Continued)

FOREIGN PATENT DOCUMENTS

| | | |
|---|---|---|
| AU | 2022348895 A1 | 4/2024 |
| CA | 3033344 A1 | 2/2018 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.

(Continued)

*Primary Examiner* — Ibrahim A Khan
(74) *Attorney, Agent, or Firm* — Kubota & Basol LLP

(57) ABSTRACT

One or more computer systems switch a representation of a first content item at a docked position in an environment with a representation of a second content item in the environment in response to input, switch from displaying a first environment to displaying a second environment in response to input while displaying a representation of a first content item at a docked position, detect and respond to events corresponding to requests to move virtual content in an environment, detect and respond to events corresponding to requests to transition a mode of display of virtual content in the environment, display a first framing element concurrently with a representation of a content item having different degrees of transparency in response to detecting an input, and/or facilitate docking of a content item in an environment based on an input, and/or determine clusters of virtual objects and restore virtual objects after a reboot event.

41 Claims, 183 Drawing Sheets

1700

While a three-dimensional environment is visible via one or more display generation components, detect, via one or more input devices, a first input corresponding to a request to display a representation of a first content item docked in the three-dimensional environment, wherein the first input includes a respective input elevation relative to a frame of reference — 1702

In response to detecting the first input: — 1704

In accordance with a determination that the respective input elevation is a first angle of elevation within a first range of angles of elevation, display, via the one or more display generation components, the representation of the first content item at a first position in the three-dimensional environment, wherein the first position corresponds to a first placement elevation, and the first position and the first placement elevation are used for a plurality of different input elevations that are in the first range of angles of elevation — 1706

In accordance with a determination that the respective input elevation is a second angle of elevation that is outside of the first range of angles of elevation, display, via the one or more display generation components, the representation of the first content item at a second position, different from the first position, wherein the second position has a corresponding second angle of elevation, different from the first angle of elevation — 1708

In accordance with a determination that the respective input elevation is a third angle of elevation that is outside of the first range of angles of elevation, display, via the one or more display generation components, the representation of the first content item at a third position, different from the first position and different from the second position, wherein the third position has a corresponding third angle of elevation, different from the first angle of elevation and different from the second angle of elevation — 1710

(56) References Cited

U.S. PATENT DOCUMENTS

| | | | |
|---|---|---|---|
| 5,422,812 A | 6/1995 | Knoll et al. | |
| 5,515,488 A | 5/1996 | Hoppe et al. | |
| 5,524,195 A | 6/1996 | Clanton et al. | |
| 5,610,828 A | 3/1997 | Kodosky et al. | |
| 5,731,805 A | 3/1998 | Tognazzini et al. | |
| 5,737,553 A | 4/1998 | Bartok | |
| 5,740,440 A | 4/1998 | West | |
| 5,751,287 A | 5/1998 | Hahn et al. | |
| 5,758,122 A | 5/1998 | Corda et al. | |
| 5,794,178 A | 8/1998 | Caid et al. | |
| 5,809,267 A | 9/1998 | Moran et al. | |
| 5,877,766 A | 3/1999 | Bates et al. | |
| 5,900,849 A | 5/1999 | Gallery | |
| 5,933,143 A | 8/1999 | Kobayashi | |
| 5,990,886 A | 11/1999 | Serdy et al. | |
| 6,061,060 A | 5/2000 | Berry et al. | |
| 6,078,310 A | 6/2000 | Tognazzini | |
| 6,108,004 A | 8/2000 | Medl | |
| 6,112,015 A | 8/2000 | Planas et al. | |
| 6,154,559 A | 11/2000 | Beardsley | |
| 6,167,433 A | 12/2000 | Maples et al. | |
| 6,295,069 B1 | 9/2001 | Shirur | |
| 6,323,846 B1 | 11/2001 | Westerman et al. | |
| 6,426,745 B1 | 7/2002 | Isaacs et al. | |
| 6,456,296 B1 | 9/2002 | Cataudella et al. | |
| 6,570,557 B1 | 5/2003 | Westerman et al. | |
| 6,584,465 B1 | 6/2003 | Zhu et al. | |
| 6,677,932 B1 | 1/2004 | Westerman | |
| 6,714,201 B1 | 3/2004 | Grinstein et al. | |
| 6,750,873 B1 | 6/2004 | Bernardini et al. | |
| 6,756,997 B1 | 6/2004 | Ward et al. | |
| 6,968,511 B1 | 11/2005 | Robertson et al. | |
| 7,035,903 B1 | 4/2006 | Baldonado | |
| 7,096,120 B2 | 8/2006 | Hull | |
| 7,134,130 B1 | 11/2006 | Thomas | |
| 7,137,074 B1 | 11/2006 | Newton et al. | |
| 7,230,629 B2 | 6/2007 | Reynolds et al. | |
| 7,298,370 B1 | 11/2007 | Middler et al. | |
| 7,580,576 B2 | 8/2009 | Wang et al. | |
| 7,614,008 B2 | 11/2009 | Ording | |
| 7,633,076 B2 | 12/2009 | Huppi et al. | |
| 7,634,718 B2 | 12/2009 | Nakajima | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,706,579 B2 | 4/2010 | Oijer | |
| 7,721,226 B2 | 5/2010 | Barabe et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,122,341 B1 | 2/2012 | Dayan et al. | |
| 8,239,784 B2 | 8/2012 | Hotelling et al. | |
| 8,279,180 B2 | 10/2012 | Hotelling et al. | |
| 8,341,541 B2 | 12/2012 | Holecek et al. | |
| 8,381,135 B2 | 2/2013 | Hotelling et al. | |
| 8,436,872 B2 | 5/2013 | Wright et al. | |
| 8,479,122 B2 | 7/2013 | Hotelling et al. | |
| 8,593,558 B2 | 11/2013 | Gardiner et al. | |
| 8,724,856 B1 | 5/2014 | King | |
| 8,730,156 B2 | 5/2014 | Weising et al. | |
| 8,767,045 B2 | 7/2014 | Kitazato et al. | |
| 8,793,620 B2 | 7/2014 | Stafford | |
| 8,793,729 B2 | 7/2014 | Adimatyam et al. | |
| 8,803,873 B2 | 8/2014 | Yoo et al. | |
| 8,866,880 B2 | 10/2014 | Tan et al. | |
| 8,896,632 B2 | 11/2014 | Macdougall et al. | |
| 8,947,323 B1 | 2/2015 | Raffle et al. | |
| 8,970,478 B2 | 3/2015 | Johansson | |
| 8,970,629 B2 | 3/2015 | Kim et al. | |
| 8,994,718 B2 | 3/2015 | Latta et al. | |
| 9,007,301 B1 | 4/2015 | Raffle et al. | |
| 9,108,109 B2 | 8/2015 | Pare et al. | |
| 9,158,115 B1 | 10/2015 | Worley et al. | |
| 9,164,975 B2 | 10/2015 | Milewski et al. | |
| 9,183,672 B1 | 11/2015 | Hickman et al. | |
| 9,185,062 B1 | 11/2015 | Yang et al. | |
| 9,189,611 B2 | 11/2015 | Wssingbo | |
| 9,196,072 B2 | 11/2015 | Oh et al. | |
| 9,201,500 B2 | 12/2015 | Srinivasan et al. | |
| 9,214,137 B2 | 12/2015 | Bala et al. | |
| 9,222,787 B2 | 12/2015 | Blumenberg et al. | |
| 9,230,368 B2 | 1/2016 | Keane et al. | |
| 9,237,334 B2 | 1/2016 | Cheng et al. | |
| 9,241,149 B2 | 1/2016 | Redmann | |
| 9,245,388 B2 | 1/2016 | Poulos et al. | |
| 9,256,785 B2 | 2/2016 | Qvarfordt | |
| 9,293,118 B2 | 3/2016 | Matsui | |
| 9,294,757 B1 | 3/2016 | Lewis et al. | |
| 9,298,334 B1 | 3/2016 | Zimmerman et al. | |
| 9,316,827 B2 | 4/2016 | Lindley et al. | |
| 9,348,458 B2 | 5/2016 | Hotelling et al. | |
| 9,383,189 B2 | 7/2016 | Bridges et al. | |
| 9,384,594 B2 | 7/2016 | Maciocci et al. | |
| 9,396,580 B1 | 7/2016 | Nowrouzezahrai et al. | |
| 9,400,559 B2 | 7/2016 | Latta et al. | |
| 9,426,193 B2 | 8/2016 | Goodman | |
| 9,436,357 B2 | 9/2016 | Pallakoff et al. | |
| 9,437,047 B2 | 9/2016 | Chang et al. | |
| 9,448,635 B2 | 9/2016 | Macdougall et al. | |
| 9,448,687 B1 | 9/2016 | Mckenzie et al. | |
| 9,465,479 B2 | 10/2016 | Cho et al. | |
| 9,491,374 B1 | 11/2016 | Avrahami et al. | |
| 9,519,371 B2 | 12/2016 | Nishida | |
| 9,526,127 B1 | 12/2016 | Taubman et al. | |
| 9,544,257 B2 | 1/2017 | Ogundokun et al. | |
| 9,563,331 B2 | 2/2017 | Poulos et al. | |
| 9,575,559 B2 | 2/2017 | Andrysco | |
| 9,588,651 B1 | 3/2017 | Buchanan et al. | |
| 9,612,722 B2 | 4/2017 | Miller et al. | |
| 9,619,105 B1 | 4/2017 | Dal Mutto | |
| 9,619,519 B1 | 4/2017 | Dorner | |
| 9,672,588 B1 | 6/2017 | Doucette et al. | |
| 9,681,112 B2 | 6/2017 | Son | |
| 9,684,372 B2 | 6/2017 | Xun et al. | |
| 9,704,230 B2 | 7/2017 | Hofmann et al. | |
| 9,734,402 B2 | 8/2017 | Jang et al. | |
| 9,778,814 B2 | 10/2017 | Ambrus et al. | |
| 9,779,512 B2 | 10/2017 | Tomlin et al. | |
| 9,829,708 B1 | 11/2017 | Asada | |
| 9,851,866 B2 | 12/2017 | Goossens et al. | |
| 9,864,498 B2 | 1/2018 | Olsson et al. | |
| 9,870,130 B2 | 1/2018 | Schubert et al. | |
| 9,886,087 B1 | 2/2018 | Wald et al. | |
| 9,911,232 B2 | 3/2018 | Shapira et al. | |
| 9,933,833 B2 | 4/2018 | Tu et al. | |
| 9,933,937 B2 | 4/2018 | Lemay et al. | |
| 9,934,614 B2 | 4/2018 | Ramsby et al. | |
| 9,952,042 B2 | 4/2018 | Abovitz et al. | |
| 10,026,209 B1 | 7/2018 | Dagley et al. | |
| 10,049,460 B2 | 8/2018 | Romano et al. | |
| 10,101,803 B2 | 10/2018 | Faaborg et al. | |
| 10,139,985 B2 | 11/2018 | Mildrew et al. | |
| 10,163,198 B2 | 12/2018 | Rochford et al. | |
| 10,175,483 B2 | 1/2019 | Salter et al. | |
| 10,186,086 B2 | 1/2019 | Giraldi et al. | |
| 10,192,347 B2 | 1/2019 | Bui et al. | |
| 10,203,764 B2 | 2/2019 | Katz et al. | |
| 10,210,664 B1 | 2/2019 | Chaturvedi | |
| 10,303,427 B2 * | 5/2019 | Shintani ................... H04R 3/12 |
| 10,307,671 B2 | 6/2019 | Barney et al. | |
| 10,318,034 B1 | 6/2019 | Hauenstein et al. | |
| 10,331,205 B2 | 6/2019 | Kim et al. | |
| 10,339,721 B1 | 7/2019 | Dascola et al. | |
| 10,353,532 B1 | 7/2019 | Holz et al. | |
| 10,373,381 B2 | 8/2019 | Nuernberger et al. | |
| 10,394,320 B2 | 8/2019 | George-Svahn et al. | |
| 10,401,958 B2 | 9/2019 | Peana et al. | |
| 10,402,081 B1 | 9/2019 | Andersen et al. | |
| 10,424,124 B2 | 9/2019 | Takahashi | |
| 10,448,189 B2 | 10/2019 | Link | |
| 10,484,641 B2 | 11/2019 | Zhou et al. | |
| 10,488,941 B2 | 11/2019 | Lam et al. | |
| 10,499,044 B1 | 12/2019 | Giokaris et al. | |
| 10,534,439 B2 | 1/2020 | Raffa et al. | |

(56) References Cited

U.S. PATENT DOCUMENTS

| | | |
|---|---|---|
| 10,540,005 B2 | 1/2020 | Yoon et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 | 2/2020 | Deluca et al. |
| 10,573,067 B1 | 2/2020 | Naik et al. |
| 10,599,570 B1 | 3/2020 | Ding et al. |
| 10,630,803 B2 | 4/2020 | Hwang et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,877,645 B2 | 12/2020 | Lee et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1* | 8/2021 | Hulbert ................. G06F 3/1423 |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,266,919 B2* | 3/2022 | Bear ..................... G06F 3/0346 |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,379,033 B2 | 7/2022 | O'Hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,682,180 B1 | 6/2023 | Willkie |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,842,454 B1 | 12/2023 | Lin et al. |
| 11,847,748 B2 | 12/2023 | Liu et al. |
| 11,861,056 B2 | 1/2024 | Burns et al. |
| 11,861,136 B1 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 12,456,271 B1 | 10/2025 | Bernstein et al. |
| 2001/0047250 A1 | 11/2001 | Schuller et al. |
| 2002/0015024 A1 | 2/2002 | Westerman et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0073136 A1 | 4/2005 | Larsson et al. |
| 2005/0100210 A1 | 5/2005 | Rice et al. |

(56)         References Cited

U.S. PATENT DOCUMENTS

| | | |
|---|---|---|
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0190059 A1 | 9/2005 | Wehrenberg |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |
| 2006/0017692 A1 | 1/2006 | Wehrenberg et al. |
| 2006/0028400 A1 | 2/2006 | Lapstun et al. |
| 2006/0033724 A1 | 2/2006 | Chaudhri et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0197753 A1 | 9/2006 | Hotelling |
| 2006/0256083 A1 | 11/2006 | Rosenberg |
| 2006/0283214 A1 | 12/2006 | Donadon et al. |
| 2007/0172112 A1 | 7/2007 | Paley et al. |
| 2007/0259716 A1 | 11/2007 | Mattice et al. |
| 2008/0132249 A1 | 6/2008 | Hamilton |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0146961 A1 | 6/2009 | Cheung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1* | 2/2011 | Yett ...................... G02B 30/35 |
| | | 359/627 |
| 2011/0066981 A1 | 3/2011 | Chmielewski et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0103313 A1 | 4/2013 | Moore et al. |
| 2013/0127850 A1 | 5/2013 | Bindon |
| 2013/0147820 A1 | 6/2013 | Kalai et al. |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0191160 A1 | 7/2013 | Oran |
| 2013/0207963 A1 | 8/2013 | Stirbu et al. |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0293468 A1 | 11/2013 | Perez et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0181683 A1 | 6/2014 | Lim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |

(56) References Cited

U.S. PATENT DOCUMENTS

| | | |
|---|---|---|
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0268925 A1 | 9/2014 | Lee et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0143251 A1 | 5/2015 | Bailiang et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0199081 A1* | 7/2015 | Wheeler ............... G06F 3/0482 |
| | | 715/781 |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0262428 A1 | 9/2015 | Tatzgern et al. |
| 2015/0277699 A1 | 10/2015 | Algreatly |
| 2015/0286741 A1 | 10/2015 | Zhu et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0070448 A1 | 3/2016 | Krol |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1 | 12/2016 | Kawasima |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2016/0379418 A1 | 12/2016 | Osborn et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052373 A1 | 2/2017 | Memmott et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-Svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |

(56)  References Cited

U.S. PATENT DOCUMENTS

| | | |
|---|---|---|
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1* | 11/2018 | Bastov .................... G06F 3/011 |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0004683 A1 | 1/2019 | Pahud et al. |
| 2019/0005055 A1 | 1/2019 | Andrew et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1* | 6/2019 | Pomerantz ........... H04N 13/117 |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1 | 10/2019 | Lee et al. |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |

(56) References Cited

U.S. PATENT DOCUMENTS

| | | |
|---|---|---|
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1* | 3/2020 | Nguyen ........... G05B 19/41885 |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1 | 4/2020 | Enriquez et al. |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-Zeev et al. |
| 2020/0225747 A1 | 7/2020 | Bar-Zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0258481 A1 | 8/2020 | Woo et al. |
| 2020/0267326 A1 | 8/2020 | Mm |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1* | 12/2020 | Mak ........................ G06F 21/31 |
| 2020/0410960 A1 | 12/2020 | Saito et al. |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2021/0409903 A1 | 12/2021 | Shapiro et al. |
| 2022/0011577 A1 | 1/2022 | Lawver et al. |
| 2022/0011855 A1 | 1/2022 | Hazra et al. |
| 2022/0012002 A1 | 1/2022 | Bar-Zeev et al. |
| 2022/0027115 A1* | 1/2022 | Haapoja ................... G09G 5/14 |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |

(56) References Cited

U.S. PATENT DOCUMENTS

| | | |
|---|---|---|
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1* | 6/2022 | Cansizoglu ........... G06V 20/20 |
| 2022/0214743 A1* | 7/2022 | Dascola ................ G06F 3/017 |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0252882 A1 | 8/2022 | Berliner et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'Leary et al. |
| 2022/0303680 A1 | 9/2022 | Ahmed et al. |
| 2022/0311950 A1 | 9/2022 | Ith et al. |
| 2022/0319134 A1 | 10/2022 | Rodrigues et al. |
| 2022/0319453 A1 | 10/2022 | Llull et al. |
| 2022/0326837 A1* | 10/2022 | Dessero .............. G06F 3/04815 |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1* | 12/2022 | Simpson ............... A63F 13/211 |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0315270 A1 | 10/2023 | Hylak et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0360264 A1 | 11/2023 | Wu et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |

(56)  References Cited

U.S. PATENT DOCUMENTS

| | | |
|---|---|---|
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0126362 A1 | 4/2024 | Burns et al. |
| 2024/0135612 A1 | 4/2024 | Hold-Geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-Faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |
| 2025/0306727 A1 | 10/2025 | Kawashima et al. |
| 2025/0322612 A1 | 10/2025 | Cerra et al. |

FOREIGN PATENT DOCUMENTS

| | | |
|---|---|---|
| CN | 102298493 A | 12/2011 |
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111641843 A | 9/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |

(56) References Cited

FOREIGN PATENT DOCUMENTS

| | | | |
|---|---|---|---|
| EP | 3654147 | A1 | 5/2020 |
| EP | 4155867 | A1 | 3/2023 |
| EP | 3688726 | B1 | 8/2023 |
| GB | 2540791 | A | 2/2017 |
| JP | H06-4596 | A | 1/1994 |
| JP | H10-51711 | A | 2/1998 |
| JP | H10-78845 | A | 3/1998 |
| JP | H11-289555 | A | 10/1999 |
| JP | 2004-510239 | A | 4/2004 |
| JP | 2005-215144 | A | 8/2005 |
| JP | 2005-333524 | A | 12/2005 |
| JP | 2006-4093 | A | 1/2006 |
| JP | 2006-107048 | A | 4/2006 |
| JP | 2006-146803 | A | 6/2006 |
| JP | 2006-295236 | A | 10/2006 |
| JP | 2011-203880 | A | 10/2011 |
| JP | 2012-234550 | A | 11/2012 |
| JP | 2013-178639 | A | 9/2013 |
| JP | 2013-196158 | A | 9/2013 |
| JP | 2013-254358 | A | 12/2013 |
| JP | 2013-257716 | A | 12/2013 |
| JP | 2014-21565 | A | 2/2014 |
| JP | 2014-59840 | A | 4/2014 |
| JP | 2014-71663 | A | 4/2014 |
| JP | 2014-99184 | A | 5/2014 |
| JP | 2014-514652 | A | 6/2014 |
| JP | 2014-514653 | A | 6/2014 |
| JP | 2015-56173 | A | 3/2015 |
| JP | 2015-515040 | A | 5/2015 |
| JP | 2015-118332 | A | 6/2015 |
| JP | 2015-222565 | A | 12/2015 |
| JP | 2016-96513 | A | 5/2016 |
| JP | 2016-194744 | A | 11/2016 |
| JP | 2017-27206 | A | 2/2017 |
| JP | 2017-58528 | A | 3/2017 |
| JP | 2017-126009 | A | 7/2017 |
| JP | 2017-525002 | A | 8/2017 |
| JP | 2017-531221 | A | 10/2017 |
| JP | 2018-5516 | A | 1/2018 |
| JP | 2018-5517 | A | 1/2018 |
| JP | 2018-41477 | A | 3/2018 |
| JP | 2018-514005 | A | 5/2018 |
| JP | 2018-88118 | A | 6/2018 |
| JP | 2018-101019 | A | 6/2018 |
| JP | 2018-106499 | A | 7/2018 |
| JP | 6438869 | B2 | 12/2018 |
| JP | 2019-40333 | A | 3/2019 |
| JP | 2019-515361 | A | 6/2019 |
| JP | 2019-169154 | A | 10/2019 |
| JP | 2019-175449 | A | 10/2019 |
| JP | 2019-527881 | A | 10/2019 |
| JP | 2019-532382 | A | 11/2019 |
| JP | 2019-536131 | A | 12/2019 |
| JP | 2020-503595 | A | 1/2020 |
| JP | 2020-86913 | A | 6/2020 |
| JP | 2022-53334 | A | 4/2022 |
| JP | 2022-175629 | A | 11/2022 |
| JP | 2023-52278 | A | 4/2023 |
| KR | 10-2011-0017236 | A | 2/2011 |
| KR | 10-2011-0128487 | A | 11/2011 |
| KR | 10-2014-0097654 | A | 8/2014 |
| KR | 10-2016-0012139 | A | 2/2016 |
| KR | 10-2017-0027240 | A | 3/2017 |
| KR | 10-2018-0102171 | A | 9/2018 |
| KR | 10-2019-0100957 | A | 8/2019 |
| KR | 10-2020-0010296 | A | 1/2020 |
| KR | 10-2020-0035103 | A | 4/2020 |
| KR | 10-2020-0110788 | A | 9/2020 |
| KR | 10-2020-0135496 | A | 12/2020 |
| KR | 10-2020-0140378 | A | 12/2020 |
| KR | 10-2021-0083016 | A | 7/2021 |
| KR | 10-2021-0123530 | A | 10/2021 |
| WO | 2010/026519 | A1 | 3/2010 |
| WO | 2011/008638 | A1 | 1/2011 |
| WO | 2012/145180 | A1 | 10/2012 |
| WO | 2013169849 | A2 | 11/2013 |
| WO | 2013/184447 | A2 | 12/2013 |
| WO | 2014105276 | A1 | 7/2014 |
| WO | 2014/190106 | A1 | 11/2014 |
| WO | 2014/203301 | A1 | 12/2014 |
| WO | 2015/130150 | A1 | 9/2015 |
| WO | 2015/192117 | A1 | 12/2015 |
| WO | 2015/195216 | A1 | 12/2015 |
| WO | 2016/014877 | A1 | 1/2016 |
| WO | 2016/118344 | A1 | 7/2016 |
| WO | 2016/126522 | A1 | 8/2016 |
| WO | 2017/024142 | A1 | 2/2017 |
| WO | 2017/088487 | A1 | 6/2017 |
| WO | 2018/005557 | A1 | 1/2018 |
| WO | 2018/046957 | A2 | 3/2018 |
| WO | 2018/090060 | A1 | 5/2018 |
| WO | 2018/106299 | A1 | 6/2018 |
| WO | 2018/116556 | A1 | 6/2018 |
| WO | 2018/125428 | A1 | 7/2018 |
| WO | 2018/175735 | A1 | 9/2018 |
| WO | 2018/213801 | A1 | 11/2018 |
| WO | 2019/067902 | A1 | 4/2019 |
| WO | 2019/074771 | A1 | 4/2019 |
| WO | 2019/142560 | A1 | 7/2019 |
| WO | 2019/152286 | A2 | 8/2019 |
| WO | 2019/172678 | A1 | 9/2019 |
| WO | 2019/213111 | A1 | 11/2019 |
| WO | 2019/217163 | A1 | 11/2019 |
| WO | 2020/066682 | A1 | 4/2020 |
| WO | 2020/105349 | A1 | 5/2020 |
| WO | 2020/121483 | A1 | 6/2020 |
| WO | 2020/179027 | A1 | 9/2020 |
| WO | 2020/247256 | A1 | 12/2020 |
| WO | 2021/061349 | A1 | 4/2021 |
| WO | 2021/061351 | A1 | 4/2021 |
| WO | 2021/133053 | A1 | 7/2021 |
| WO | 2021/173839 | A1 | 9/2021 |
| WO | 2021/202783 | A1 | 10/2021 |
| WO | 2021/203856 | A1 | 10/2021 |
| WO | 2022/046340 | A1 | 3/2022 |
| WO | 2022/055821 | A1 | 3/2022 |
| WO | 2022/055822 | A1 | 3/2022 |
| WO | 2022/066399 | A1 | 3/2022 |
| WO | 2022/066535 | A2 | 3/2022 |
| WO | 2022/067075 | A1 | 3/2022 |
| WO | 2022/067343 | A2 | 3/2022 |
| WO | 2022/072187 | A2 | 4/2022 |
| WO | 2022/146936 | A1 | 7/2022 |
| WO | 2022/146938 | A1 | 7/2022 |
| WO | 2022/147146 | A1 | 7/2022 |
| WO | 2022/164881 | A1 | 8/2022 |
| WO | 2022/192040 | A1 | 9/2022 |
| WO | 2022/204664 | A1 | 9/2022 |
| WO | 2022/208797 | A1 | 10/2022 |
| WO | 2022/225795 | A1 | 10/2022 |
| WO | 2023/043646 | A1 | 3/2023 |
| WO | 2023/096940 | A2 | 6/2023 |
| WO | 2023/141535 | A1 | 7/2023 |
| WO | 2024/064036 | A1 | 3/2024 |
| WO | 2024/064373 | A1 | 3/2024 |

OTHER PUBLICATIONS

Corrected Notice of Allowability received for US. Appl. No. 17/448,875, mailed on April 24, 2024, 4 pages.

Corrected Notice of Allowability received for U.S. Appl. No. 17/479,791, mailed on May 19, 2023, 2 pages.

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Corrected Notice of Allowability received for U.S. Appl. No. 17/932,999, mailed on Jan. 23, 2025, 9 pages.

Corrected Notice of Allowability received for U.S. Appl. No. 17/935,095, mailed on Oct. 18, 2024, 3 pages.

Corrected Notice of Allowability received for U.S. Appl. No. 18/154,757, mailed on Aug. 30, 2024, 2 pages.

(56) References Cited

OTHER PUBLICATIONS

Corrected Notice of Allowability received for U.S. Appl. No. 18/174,337, mailed on Jan. 15, 2025, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html> [Search Date Aug. 22, 2023], Sep. 20, 2021, 8 pages (1 page of English Abstract and 7 pages of Official Copy).
International Search Report received for PCT Patent Application No. PCT/US2021/050948, mailed on Mar. 4, 2022, 6 pages.
Simple Modal Window with Background Blur Effect, Available online at: <http://web.archive.org/web/20160313233427/https://www.cssscript.com/simple-modal-window-with-background-blur-effect/>, Mar. 13, 2016, 5 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.

(56) References Cited

OTHER PUBLICATIONS

Non-Final Office Action received for U.S. Appl. No. 17/580,495, mailed on Aug. 15, 2024, 28 pages.

Non-Final Office Action received for U.S. Appl. No. 17/580,495, mailed on Dec. 11, 2023, 27 pages.

Non-Final Office Action received for U.S. Appl. No. 17/659,147, mailed on Mar. 16, 2023, 19 pages.

Non-Final Office Action received for U.S. Appl. No. 17/816,314, mailed on Jul. 6, 2023, 10 pages.

Non-Final Office Action received for U.S. Appl. No. 17/816,314, mailed on Sep. 23, 2022, 10 pages.

Non-Final Office Action received for U.S. Appl. No. 17/932,655, mailed on Apr. 20, 2023, 10 pages.

Non-Final Office Action received for U.S. Appl. No. 17/932,999, mailed on Feb. 23, 2024, 22 pages.

Non-Final Office Action received for U.S. Appl. No. 17/935,095, mailed on Jun. 22, 2023, 15 pages.

Non-Final Office Action received for U.S. Appl. No. 18/149,640, mailed on Jan. 15, 2025, 17 pages.

Non-Final Office Action received for U.S. Appl. No. 18/154,697, mailed on Nov. 24, 2023, 10 pages.

Non-Final Office Action received for U.S. Appl. No. 18/157,040, mailed on May 2, 2024, 25 pages.

Non-Final Office Action received for U.S. Appl. No. 18/182,300, mailed on May 29, 2024, 33 pages.

Non-Final Office Action received for U.S. Appl. No. 18/182,300, mailed on Oct. 26, 2023, 29 pages.

Non-Final Office Action received for U.S. Appl. No. 18/322,469, mailed on Nov. 15, 2024, 34 pages.

Non-Final Office Action received for U.S. Appl. No. 18/336,770, mailed on Jun. 5, 2024, 12 pages.

Non-Final Office Action received for U.S. Appl. No. 18/375,280, mailed on Nov. 27, 2024, 17 pages.

Non-Final Office Action received for U.S. Appl. No. 18/473,196, mailed on Aug. 16, 2024, 21 pages.

Notice of Allowance received for U.S. Appl. No. 18/154,757, mailed on Aug. 26, 2024, 12 pages.

Notice of Allowance received for U.S. Appl. No. 14/531,874, mailed on Mar. 28, 2017, 9 pages.

Notice of Allowance received for U.S. Appl. No. 15/644,639, mailed on Jan. 16, 2020, 16 pages.

Notice of Allowance received for U.S. Appl. No. 16/881,599, mailed on Dec. 17, 2021, 7 pages.

Notice of Allowance received for U.S. Appl. No. 17/123,000, mailed on May 27, 2022, 8 pages.

Notice of Allowance received for U.S. Appl. No. 17/123,000, mailed on Sep. 19, 2022, 7 pages.

Notice of Allowance received for U.S. Appl. No. 17/448,875, mailed on Apr. 17, 2024, 8 pages.

Notice of Allowance received for U.S. Appl. No. 17/448,875, mailed on Jul. 12, 2024, 8 pages.

Notice of Allowance received for U.S. Appl. No. 17/448,876, mailed on Apr. 7, 2022, 9 pages.

Notice of Allowance received for U.S. Appl. No. 17/448,876, mailed on Jul. 20, 2022, 8 pages.

Notice of Allowance received for U.S. Appl. No. 17/478,593, mailed on Aug. 31, 2022, 10 pages.

Notice of Allowance received for U.S. Appl. No. 17/479,791, mailed on Mar. 13, 2023, 9 pages.

Notice of Allowance received for U.S. Appl. No. 17/479,791, mailed on Nov. 17, 2022, 9 pages.

Notice of Allowance received for U.S. Appl. No. 17/580,495, mailed on Jun. 6, 2023, 6 pages.

Notice of Allowance received for U.S. Appl. No. 17/580,495, mailed on Nov. 30, 2022, 12 pages.

Notice of Allowance received for U.S. Appl. No. 17/659,147, mailed on Jan. 26, 2024, 13 pages.

Notice of Allowance received for U.S. Appl. No. 17/659,147, mailed on May 29, 2024, 13 pages.

Notice of Allowance received for U.S. Appl. No. 17/816,314, mailed on Jan. 4, 2024, 6 pages.

Notice of Allowance received for U.S. Appl. No. 17/932,655, mailed on Jan. 24, 2024, 7 pages.

Notice of Allowance received for U.S. Appl. No. 17/932,655, mailed on Sep. 29, 2023, 7 pages.

Notice of Allowance received for U.S. Appl. No. 17/932,999, mailed on Sep. 12, 2024, 9 pages.

Notice of Allowance received for U.S. Appl. No. 17/935,095, mailed on Jul. 3, 2024, 9 pages.

Notice of Allowance received for U.S. Appl. No. 18/154,697, mailed on Aug. 6, 2024, 8 pages.

Notice of Allowance received for U.S. Appl. No. 18/154,697, mailed on Dec. 3, 2024, 7 pages.

Notice of Allowance received for U.S. Appl. No. 18/154,757, mailed on Jan. 23, 2024, 10 pages.

Notice of Allowance received for U.S. Appl. No. 18/154,757, mailed on Jan. 23, 2025, 12 pages.

Notice of Allowance received for U.S. Appl. No. 18/154,757, mailed on May 10, 2024, 12 pages.

Notice of Allowance received for U.S. Appl. No. 18/174,337, mailed on Jan. 2, 2025, 8 pages.

Notice of Allowance received for U.S. Appl. No. 18/336,770, mailed on Nov. 29, 2024, 9 pages.

Notice of Allowance received for U.S. Appl. No. 18/421,675, mailed on Apr. 11, 2024, 9 pages.

Notice of Allowance received for U.S. Appl. No. 18/421,675, mailed on Jul. 31, 2024, 8 pages.

Notice of Allowance received for U.S. Appl. No. 18/421,827, mailed on Aug. 14, 2024, 10 pages.

Notice of Allowance received for U.S. Appl. No. 18/423,187, mailed on Jun. 5, 2024, 9 pages.

Notice of Allowance received for U.S. Appl. No. 18/463,739, mailed on Feb. 1, 2024, 10 pages.

Notice of Allowance received for U.S. Appl. No. 18/463,739, mailed on Jun. 17, 2024, 9 pages.

Notice of Allowance received for U.S. Appl. No. 18/463,739, mailed on Oct. 30, 2023, 11 pages.

Notice of Allowance received for U.S. Appl. No. 18/465,098, mailed on Jun. 20, 2024, 8 pages.

Notice of Allowance received for U.S. Appl. No. 18/465,098, mailed on Mar. 4, 2024, 6 pages.

Notice of Allowance received for U.S. Appl. No. 18/465,098, mailed on Nov. 17, 2023, 8 pages.

Notice of Allowance received for U.S. Appl. No. 18/515,188, mailed on Nov. 27, 2024, 9 pages.

Notice of Allowance received for U.S. Appl. No. 18/671,936, mailed on Jan. 15, 2025, 9 pages.

Restriction Requirement received for U.S. Appl. No. 17/932,999, mailed on Oct. 3, 2023, 6 pages.

Restriction Requirement received for U.S. Appl. No. 18/473,187, mailed on Dec. 30, 2024, 5 pages.

Search Report received for Chinese Patent Application No. 202310873465.7, mailed on Feb. 1, 2024, 5 pages (2 pages of English Translation and 3 pages of Official Copy).

Supplemental Notice of Allowance received for U.S. Appl. No. 14/531,874, mailed on Jul. 26, 2017, 5 pages.

Supplemental Notice of Allowance received for U.S. Appl. No. 18/515,188, mailed on Dec. 12, 2024, 2 pages.

Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.

Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.

Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.

(56) References Cited

OTHER PUBLICATIONS

Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.

Chatterjee et al., "Gaze+Gesture: Expressive, Precise and Targeted Free-Space Interactions", ICMI '15, Nov. 9-13, 2015, 8 pages.

Fatima et al., "Eye Movement Based Human Computer Interaction", 3rd International Conference on Recent Advances in Information Technology (RAIT), Mar. 3, 2016, pp. 489-494.

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.

Lin et al., "Towards Naturally Grabbing and Moving Objects in VR", IS&T International Symposium on Electronic Imaging and the Engineering Reality of Virtual Reality, 2016, 6 pages.

McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Extended European Search Report received for European Patent Application No. 25179367.5, mailed on Jul. 1, 2025, 10 pages.

Extended European Search Report received for European Patent Application No. 25169060.8, mailed on May 12, 2025, 10 pages.

Notice of Allowance received for U.S. Appl. No. 18/427,434, mailed on Sep. 17, 2025, 10 pages.

Extended European Search Report received for European Patent Application No. 25169059.0, mailed on May 12, 2025, 11 pages.

Extended European Search Report received for European Patent Application No. 25174955.2, mailed on Jun. 25, 2025, 12 pages.

Non-Final Office Action received for U.S. Appl. No. 18/473,198, mailed on Jul. 15, 2025, 13 pages.

Notice of Allowance received for U.S. Appl. No. 18/174,403, mailed on Aug. 21, 2025, 13 pages.

Non-Final Office Action received for U.S. Appl. No. 18/473,197, mailed on May 1, 2025, 14 pages.

Non-Final Office Action received for U.S. Appl. No. 18/896,227, mailed on May 29, 2025, 14 pages.

Notice of Allowance received for U.S. Appl. No. 18/322,469, mailed on Jul. 7, 2025, 14 pages.

Notice of Allowance received for U.S. Appl. No. 18/322,469, mailed on Mar. 19, 2025, 14 pages.

Non-Final Office Action received for U.S. Appl. No. 18/473,187, mailed on May 16, 2025, 15 pages.

Non-Final Office Action received for U.S. Appl. No. 18/473,195, mailed on Jun. 27, 2025, 16 pages.

Non-Final Office Action received for U.S. Appl. No. 18/587,815, mailed on Sep. 25, 2025, 16 pages.

Non-Final Office Action received for U.S. Appl. No. 18/473,242, mailed on Sep. 5, 2025, 17 pages.

Non-Final Office Action received for U.S. Appl. No. 18/916,583, mailed on Oct. 2, 2025, 18 pages.

Non-Final Office Action received for U.S. Appl. No. 18/467,523, mailed on Jun. 17, 2025, 19 pages.

Non-Final Office Action received for U.S. Appl. No. 18/471,729, mailed on Jun. 17, 2025, 19 pages.

Corrected Notice of Allowability received for U.S. Appl. No. 18/146,234, mailed on Mar. 20, 2025, 2 pages.

Corrected Notice of Allowability received for U.S. Appl. No. 18/152,656, mailed on Jul. 22, 2025, 2 pages.

Corrected Notice of Allowability received for U.S. Appl. No. 18/157,040, mailed on Oct. 30, 2025, 2 pages.

Corrected Notice of Allowability received for U.S. Appl. No. 18/157,040, mailed on Sep. 25, 2025, 2 pages.

Corrected Notice of Allowability received for U.S. Appl. No. 18/473,180, mailed on Apr. 1, 2025, 2 pages.

Corrected Notice of Allowability received for U.S. Appl. No. 18/988,115, mailed on Jul. 15, 2025, 2 pages.

Corrected Notice of Allowance received for U.S. Appl. No. 18/424,644, mailed on Jun. 24, 2025, 2 pages.

Supplemental Notice of Allowability received for U.S. Appl. No. 18/473,261, mailed on Sep. 30, 2025, 2 pages.

Final Office Action received for U.S. Appl. No. 18/473,196, mailed on Jul. 16, 2025, 20 pages.

Final Office Action received for U.S. Appl. No. 18/518,340, mailed on Oct. 31, 2025, 20 pages.

Non-Final Office Action received for U.S. Appl. No. 17/905,483, mailed on Jul. 15, 2025, 20 pages.

Non-Final Office Action received for U.S. Appl. No. 18/515,191, mailed on Oct. 21, 2025, 20 pages.

Non-Final Office Action received for U.S. Appl. No. 18/518,340, mailed on Jul. 22, 2025, 20 pages.

Final Office Action received for U.S. Appl. No. 18/317,890, mailed on Sep. 3, 2025, 22 pages.

Non-Final Office Action received for U.S. Appl. No. 18/473,176, mailed on May 14, 2025, 23 pages.

Final Office Action received for U.S. Appl. No. 18/149,640, mailed on May 21, 2025, 24 pages.

Non-Final Office Action received for U.S. Appl. No. 18/174,403, mailed on Mar. 20, 2025, 26 pages.

Non-Final Office Action received for U.S. Appl. No. 18/317,890, mailed on Apr. 17, 2025, 26 pages.

Non-Final Office Action received for U.S. Appl. No. 18/327,844, mailed on Mar. 24, 2025, 27 pages.

Final Office Action received for U.S. Appl. No. 17/933,020, mailed on May 21, 2025, 28 pages.

Non-Final Office Action received for U.S. Appl. No. 17/933,020, mailed on Oct. 1, 2025, 28 pages.

Final Office Action received for U.S. Appl. No. 18/298,994, mailed on Sep. 12, 2025, 32 pages.

Non-Final Office Action received for U.S. Appl. No. 18/317,886, mailed on Apr. 30, 2025, 34 pages.

Non-Final Office Action received for U.S. Appl. No. 18/587,739, mailed on Sep. 16, 2025, 34 pages.

Non-Final Office Action received for U.S. Appl. No. 18/473,260, mailed on Jun. 27, 2025, 35 pages.

Final Office Action received for U.S. Appl. No. 18/473,260, mailed on Oct. 22, 2025, 38 pages.

Non-Final Office Action received for U.S. Appl. No. 18/473,239, mailed on Sep. 10, 2025, 38 pages.

Non-Final Office Action received for U.S. Appl. No. 18/473,256, mailed on Nov. 4, 2025., 38 pages.

European Search Report received for European Patent Application No. 22723527.2, mailed on May 12, 2025, 4 pages.

International Search Report received for PCT Patent Application No. PCT/US2023/074978, mailed on Apr. 4, 2024, 4 pages.

International Search Report received for PCT Patent Application No. PCT/US2024/012828, mailed on May 6, 2024, 4 pages.

International Search Report received for PCT Patent Application No. PCT/US2024/032109, mailed on Sep. 13, 2024, 4 pages.

International Search Report received for PCT Patent Application No. PCT/US2024/043470, mailed on Oct. 29, 2024, 4 pages.

International Search Report received for PCT Patent Application No. PCT/US2025/011189, mailed on Apr. 23, 2025, 4 pages.

Non-Final Office Action received for U.S. Appl. No. 17/202,034, mailed on Jun. 4, 2025, 40 pages.

Non-Final Office Action received for U.S. Appl. No. 18/473,184, mailed on Jul. 25, 2025, 40 pages.

Final Office Action received for U.S. Appl. No. 18/645,292, mailed on Jun. 2, 2025, 41 pages.

Non-Final Office Action received for U.S. Appl. No. 18/473,155, mailed on Jul. 10, 2025, 47 pages.

Search Report received for Chinese Patent Application No. 202210728190.3, mailed on Aug. 29, 2025, 5 pages (2 pages of English Translation and 3 pages of Official Copy Only).

(56)             References Cited

OTHER PUBLICATIONS

Notice of Allowance received for U.S. Appl. No. 18/988,115, mailed on Oct. 7, 2025, 5 pages.
International Search Report received for PCT Patent Application No. PCT/US2023/074960, mailed on Feb. 12, 2024, 6 pages.
International Search Report received for PCT Patent Application No. PCT/US2024/032153, mailed on Nov. 11, 2024, 6 pages.
International Search Report received for PCT Patent Application No. PCT/US2025/032533, mailed on Oct. 30, 2025, 6 pages.
Notice of Allowance received for U.S. Appl. No. 18/152,656, mailed on Jun. 25, 2025, 6 pages.
Notice of Allowance received for U.S. Appl. No. 18/424,644, mailed on Jun. 11, 2025, 6 pages.
Extended European Search Report received for European Patent Application No. 24221722.2, mailed on Apr. 17, 2025, 7 pages.
International Search Report received for PCT Patent Application No. PCT/US2023/074973, mailed on Mar. 7, 2024, 7 pages.
International Search Report received for PCT Patent Application No. PCT/US2025/032549, mailed on Oct. 23, 2025, 7 pages.
Notice of Allowance received for U.S. Appl. No. 18/153,943, mailed on Jun. 17, 2025, 7 pages.
Notice of Allowance received for U.S. Appl. No. 18/304,290, mailed on Aug. 20, 2025, 7 pages.
Notice of Allowance received for U.S. Appl. No. 18/471,729, mailed on Oct. 10, 2025, 7 pages.
Notice of Allowance received for U.S. Appl. No. 18/988,115, mailed on Jun. 30, 2025, 7 pages.
Restriction Requirement received for U.S. Appl. No. 18/473,259, mailed on Oct. 30, 2025, 7 pages.
Non-Final Office Action received for U.S. Appl. No. 18/882,622, mailed on May 22, 2025, 8 pages.
Notice of Allowance received for U.S Appl. No. 18/473,182, mailed on Apr. 23, 2025, 8 pages.
Notice of Allowance received for U.S. Appl. No. 18/473,182, mailed on Oct. 21, 2025, 8 pages.
Notice of Allowance received for U.S. Appl. No. 17/655,521, mailed on Apr. 16, 2025, 8 pages.
Notice of Allowance received for U.S Appl. No. 18/473,179, mailed on Oct. 6, 2025, 8 pages.
Notice of Allowance received for U.S. Appl. No. 18/473,262, mailed on Oct. 7, 2025, 8 pages.
Notice of Allowance received for U.S. Appl. No. 18/645,292, mailed on Nov. 4, 2025, 8 pages.
Notice of Allowance received for U.S. Appl. No. 18/882,622, mailed on Aug. 27, 2025, 8 pages.
Notice of Allowance received for U.S. Appl. No. 18/896,227, mailed on Jul. 11, 2025, 8 pages.
Notice of Allowance received for U.S. Appl. No. 18/919,095, mailed on Jul. 22, 2025, 8 pages.
Notice of Allowance received for U.S. Appl. No. 18/919,095, mailed on Oct. 23, 2025, 8 pages.
Notice of Allowance received for U.S. Appl. No. 18/153,943, mailed on Oct. 7, 2025, 9 pages.
Notice of Allowance received for U.S. Appl. No. 18/157,040, mailed on Jun. 24, 2025, 9 pages.
Notice of Allowance received for U.S. Appl. No. 18/427,434, mailed on Apr. 17, 2025, 9 pages.
Notice of Allowance received for U.S. Appl. No. 18/471,850, mailed on Jun. 10, 2025, 9 pages.
Notice of Allowance received for U.S Appl. No. 18/473,179, mailed on May 8, 2025, 9 pages.
Notice of Allowance received for U.S. Appl. No. 18/473,261, mailed on Sep. 23, 2025, 9 pages.
Notice of Allowance received for U.S. Appl. No. 18/473,262, mailed on Jun. 10, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.

Applicant-Initiated Interview Summary received for U.S. Appl. No. 18/119,219, mailed on May 21, 2024, 3 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: < https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 17/932,999, mailed on Feb. 20, 2025, 2 pages.
Corrected Notice of Allowability received for U.S. Appl. No. 18/146,234, mailed on Feb. 6, 2025, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Progsoft, Available Online at: <URL: https://progsoft.net/en/software/curious-blocks>, [retrieved on Apr. 25, 2024], 2024, 7 pages.
European Search Report received for European Patent Application No. 22703771.0, mailed on Feb. 26, 2025, 4 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Extended European Search Report received for European Patent Application No. 24217335.9, mailed on Feb. 24, 2025, 8 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/407,675, mailed on May 22, 2024, 18 pages.
Final Office Action received for U.S. Appl. No. 17/469,788, mailed on Nov. 16, 2023, 24 pages.
Final Office Action received for U.S. Appl. No. 17/580,495, mailed on Feb. 12, 2025, 29 pages.
Final Office Action received for U.S. Appl. No. 17/655,521, mailed on Apr. 10, 2024, 18 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Final Office Action received for U.S Appl. No. 17/934,104, mailed on Oct. 18, 2024, 28 pages.
Final Office Action received for U.S. Appl. No. 18/327,844, mailed on Nov. 29, 2024, 25 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2021/049520, mailed on Apr. 8, 2022, 8 pages.

(56)            References Cited

OTHER PUBLICATIONS

International Search Report received for PCT Patent Application No. PCT/US2021/071596, mailed on Apr. 8, 2022, 7 pages.
International Search Report received for PCT Patent Application No. PCT/US2022/071208, mailed on Aug. 18, 2022, 9 pages.
International Search Report received for PCT Patent Application No. PCT/US2022/071228, mailed on Aug. 25, 2022, 6 pages.
International Search Report received for PCT Patent Application No. PCT/US2022/076608, mailed Feb. 24, 2023, 8 pages.
International Search Report received for PCT Patent Application No. PCT/US2022/076719, mailed on Mar. 3, 2023, 8 pages.
International Search Report received for PCT Patent Application No. PCT/US2022/076808, mailed on Mar. 28, 2023, 6 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/013602, mailed on Apr. 29, 2024, 4 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032455, mailed on Sep. 25, 2024, 4 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/12826654028126085 13>, [retrieved on Apr. 25, 2024], 2024, 1 page.
Light Manager, Available online at: https://manual.keyshot.com/ manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v= WPPFnHQWwFk>, [retrieved on Ap. 25, 2024], 2024, 2 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.

Non-Final Office Action received for U.S. Appl. No. 17/933,020, mailed on Jan. 30, 2025, 26 pages.
Non-Final Office Action received for U.S Appl. No. 17/934,104, mailed on Mar. 25, 2024, 26 pages.
Non-Final Office Action received for U.S. Appl. No. 18/119,219, mailed on Mar. 28, 2024, 15 pages.
Non-Final Office Action received for U.S. Appl. No. 18/153,943, mailed on Dec. 31, 2024, 33 pages.
Non-Final Office Action received for U.S. Appl. No. 18/298,994, mailed on Mar. 7, 2025, 26 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/327,844, mailed on May 17, 2024, 20 pages.
Non-Final Office Action received for U.S. Appl. No. 18/424,644, mailed on Jan. 29, 2025, 18 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Non-Final Office Action received for U.S Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S Appl. No. 18/988,115, mailed on Feb. 24, 2025, 40 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 17/933,707, mailed on Jun. 28, 2024, 8 pages.
Notice of Allowance received for U.S. Appl. No. 17/933,707, mailed on Mar. 6, 2024, 9 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.

(56) References Cited

OTHER PUBLICATIONS

Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/668,032, mailed on Jan. 16, 2025, 9 pages.
Notice of Allowance received for U.S. Appl. No. 18/671,936, mailed on Mar. 5, 2025, 7 pages.
Non-Final Office Action received for U.S. Appl. No. 18/057,172, mailed on Mar. 14, 2025, 22 pages.
Notice of Allowance received for U.S. Appl. No. 18/057,172, mailed on Jul. 15, 2025, 12 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP2 3D Scanner (Infrared Light | Precision 0.05mm), REVPOINT [online]. Revopoint 3D, <URL: https://global.revopoint3d.com/products/face-3d-scanner-pop2 ?_ ga=2.182721893.277596832. 1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Sharevox, PHORIA [online]. Phoria Pty Ltd, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on c. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
VoxEdit Beta Tutorial- Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
VR Design Best Practices, LeapMotion, Aug. 29, 2015, 31 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-US/HT206894>, [retrieved on Feb. 22, 2024], 5 pages.
Banta et al., "A Next-Best-View System for Autonomous 3-D Object Reconstruction", IEEE Transactions on Systems, Man, and Cybernetics —Part A: Systems and Humans vol. 30, No. 5, Sep. 30, 2000, pp. 589-598.
Berard Francois, "A Study on Two-Dimensional Scrolling with Head Motion", Clips-Imag Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.
Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.
CAS and Chary XR, "Oculus Go & Your Phone As 2nd Controller !! —An Inexpensive Way To Play PC VR Games", posted on Mar. 8, 2019, https://www.youtube.com/watch?v=i_iRVaOkemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Dhakal et al., "SLAM-Share: Visual Simultaneous Localization and Mapping for Real- time Multi-user Augmented Reality", Nov. 30, 2022. CoNEXT '22: Proceedings of the 18th International Conference on emerging Networking Experiments and Technologies, Dec. 6-9, 2022, Roma, Italy, pp. 293-306. Retrieved from <https://doi.org/10.1145/3555050.3569142>, 14 pages.
Didehkhorshid et al., "Text Input in Virtual Reality Using a Tracked Drawing Tablet", HCII 2020, LNCS 12428, 2020, pp. 314-329.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Ghosh et al., "NotifiVIR: Exploring Interruptions and Notifications in Virtual Reality", IEEE transactions on visualization and computer graphics, vol. 24, No. 4, Apr. 2018, pp. 1447-1456.
Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.
Huang et al., "Proxy-Based Security Audit System for Remote Desktop Access", Computer Communications And Networks, ICCCN

(56) References Cited

OTHER PUBLICATIONS

2009. Proceedings of 18th International Conference On, IEEE, Piscataway, NJ, USA, Aug. 3, 2009, 5 pages.

Jones et al., "The Future of Virtual Museums: On-Line, Immersive, 3D Environments", ProQuest (Technology Collection Database, Dissertations and Theses Database): Technical Literature Search, Jul. 26, 2002, 12 pages.

Kim et al., "Pseudo-haptic Button for Improving User Experience of Mid-air Interaction in VR", International Journal of Human-Computer Studies, vol. 168, No. 102907, Aug. 9, 2022, 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d. com/files/solutions/photogrammetry/Unity-Photogrammetry-Workflow_2017-07_v2.pdf, Jun. 23, 2017, pp. 55-64.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lin et al., "Ubii: Physical World Interaction Through Augmented Reality", Publisher: IEEE, vol. 16, No. 3, Doi: 10.1109/TMC.2016. 2567378, May 13, 2016, pp. 872-885.

Locher et al., "Mobile Phone and Cloud—a Dream Team for 3D Reconstruction", 2016 IEEE Winter Conference on Applications of Computer Vision (WACV), 2016, pp. 1-8.

Lor Cas, "Reality Capture: Exporting Mesh", Youtube, https://www.youtube.com/watch?v=PdvTRa2B_s0, Dec. 10, 2020, 2 pages.

Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.

Medeiros et al., "Promoting Reality Awareness in Virtual Reality through Proxemics", IEEE Virtual Reality and 3D User Interfaces (VR), March 27-Apr. 1, 2021, 11 pages.

Mendes et al., "Mid-Air Interactions Above Stereoscopic Interactive Tables", IEEE Symposium on 3D User Interfaces (3DUI), Mar. 29-30, 2014, pp. 3-10.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Nunez Angulo et al., "Manual for the Design of Didactic Units in Augmented Reality Using the Cospaces EDU Application", 2020, 75 pages.

Pfeuffer et al., "Gaze+touch vs. Touch: What's the Trade-off When Using Gaze to Extend Touch to Remote Displays?", Advances In Databases And Information Systems, Aug. 30, 2015, pp. 349-367.

Process a 3D Scan With Projection in Reality Capture (RC), Wayback Machine, https://web.archive.org/web/20200116135047/http:/www.pi3dscan.com/index.php/instructi ons/item/process-a-3d-scan-with-projection-in-reality-capture-rc, Jan. 16, 2020, 1 page.

Qi et al., "PointNet++: Deep Hierarchical Feature Learning on Point Sets in a Metric Space", Stanford University, Jun. 7, 2017, 14 pages.

Ran et al., "Multi-User Augmented Reality with Communication Efficient and Spatially Consistent Virtual Objects", Nov. 24, 2020.

CoNEXT '20: Proceedings of the 16th International Conference on emerging Networking Experiments and Technologies, Dec. 1-4, 2020, Barcelona, Spain, pp. 386-398. Retrieved from <https://doi.org/10.1145/3386367.3431312>, 13 pages.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021. 91668, Mar. 8, 2021, 119 pages.

Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.

Strand Robin, "Surface Skeletons in Grids With Non-cubic Voxels", 2004 IEEE Xplore, Available Online at: <DOI: 10.1109/ICPR.2004. 1334195>, Sep. 2004, 5 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Tolle et al., "Design of Head Movement Controller System (HEMOCS) for Control Mobile Application through Head Pose Movement Detection", Retrieved from :<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOwVaw3HR1t7v8Rx7osc1lp0UfOh>, DOI: <httpdx.doi.org/10.3991/ijim.v10i3.5552>, Retrieved on Dec. 26, 2024, 2016, 5 pages.

Wood Tyriel, "The HoloLens 2 Tour! —Discovering a World of Holograms", YouTube [online]. YouTube, Mar. 23, 2021 [retrieved on Dc. 7, 2023], Retrieved from the Internet: <URL: https://www.youtube.com/watch?v=rMks7sMzPxI>, 2 pages.

Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

Yue et al., "Optimal Region Selection for Stereoscopic Video Subtitle Insertion", IEEE Transactions on Circuits and Systems for Video Technology, vol. 28, No. 11, Nov. 2018, 13 pages.

Zhuang et al., "Distributed Architecture for 3D Graphics Rendering in Collaborative System", Computer and Modernization, Issue 4, 2017, 5 pages (1 page of English Abstract and 4 pages of Official Copy).

International Search Report received for PCT Patent Application No. PCT/US2025/029209, mailed on Nov. 5, 2025, 9 pages.

International Search Report received for PCT Patent Application No. PCT/US2025/029736, mailed on Nov. 6, 2025, 8 pages.

* cited by examiner

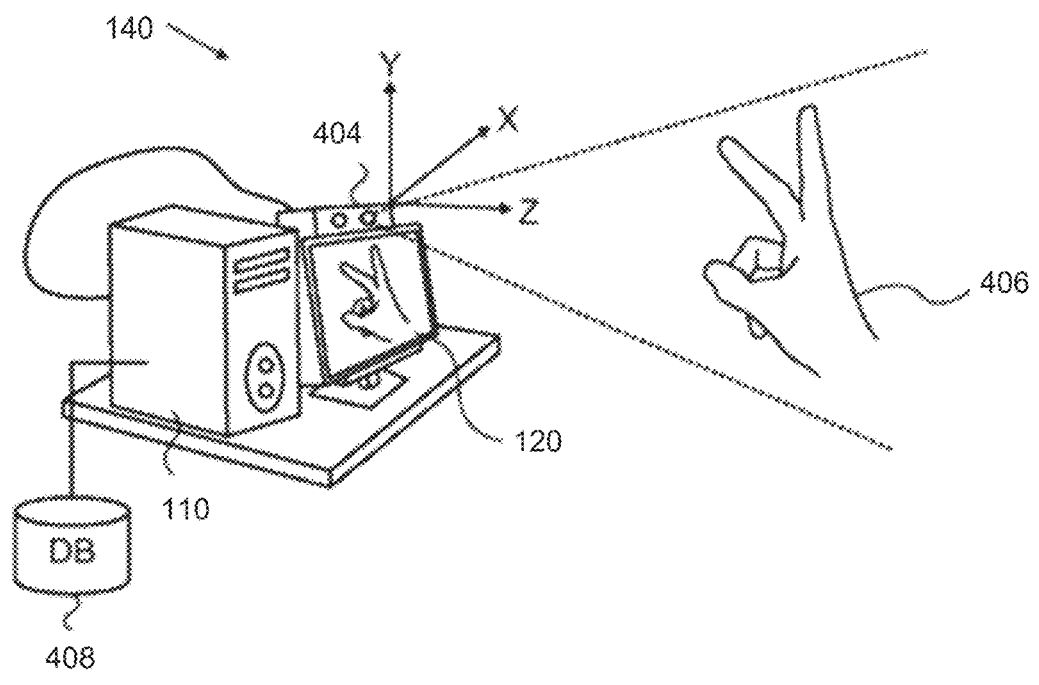
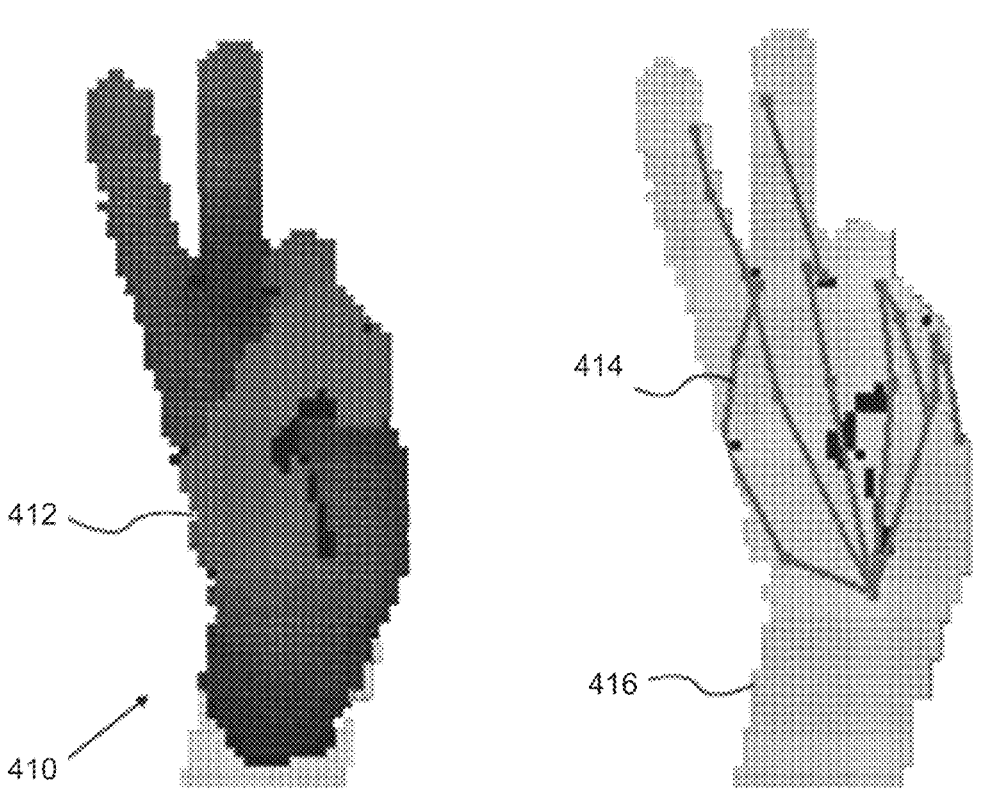
Figure 4

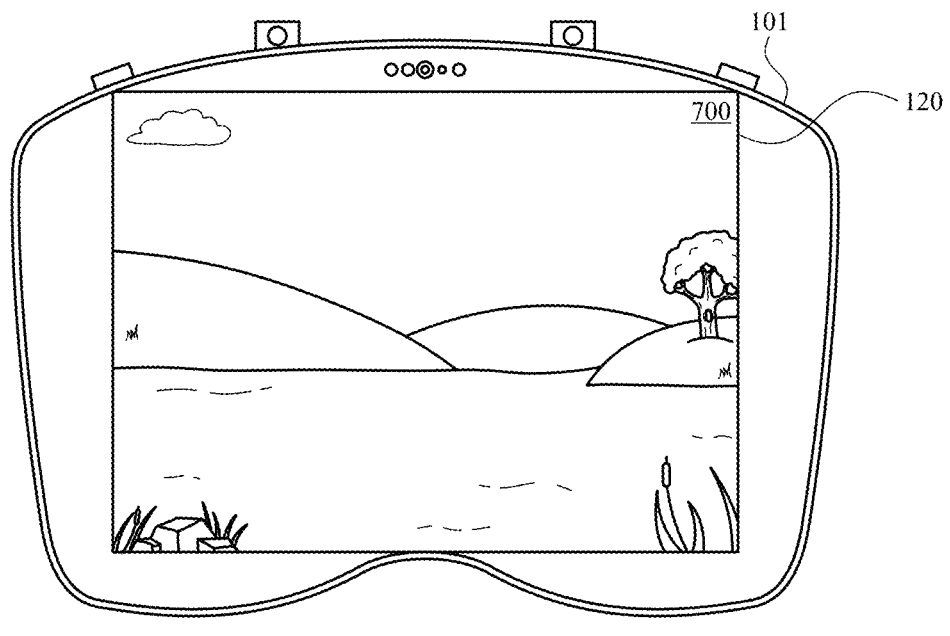
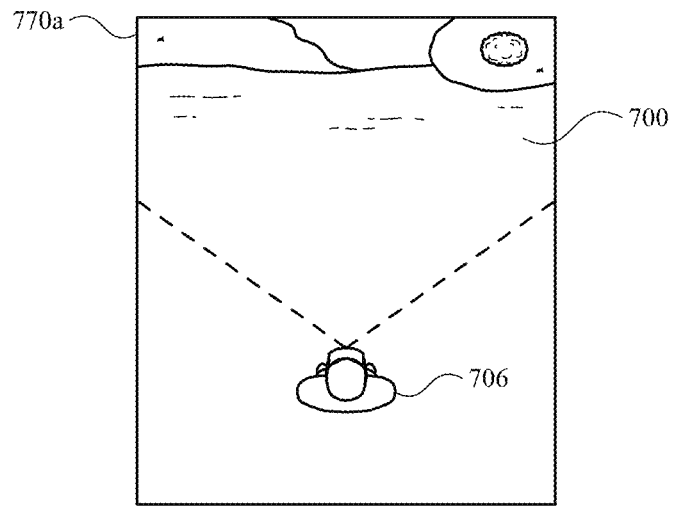
*FIG. 7A*

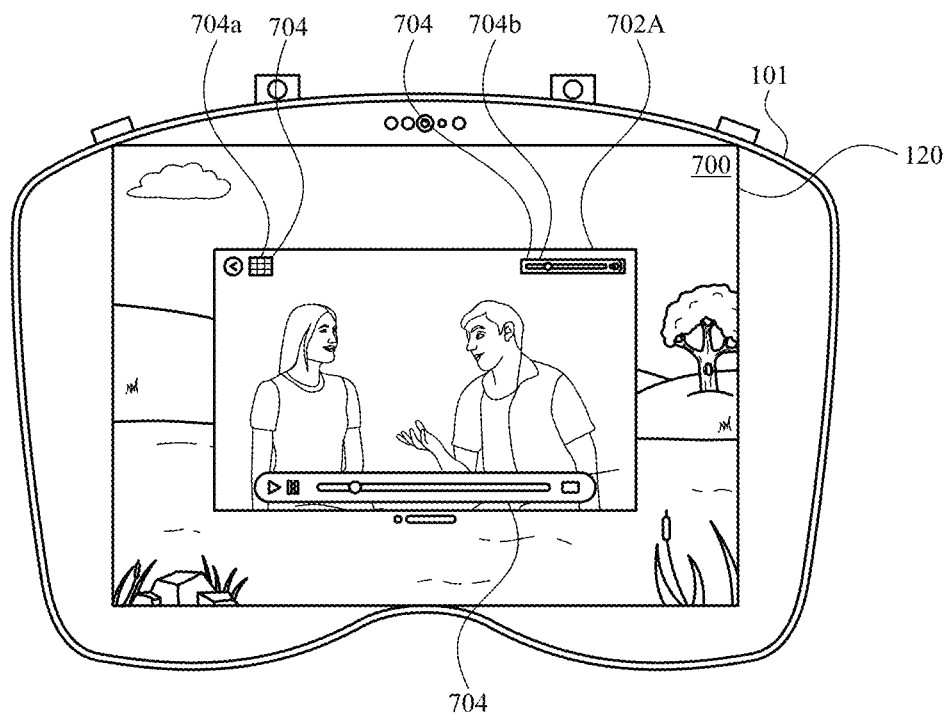
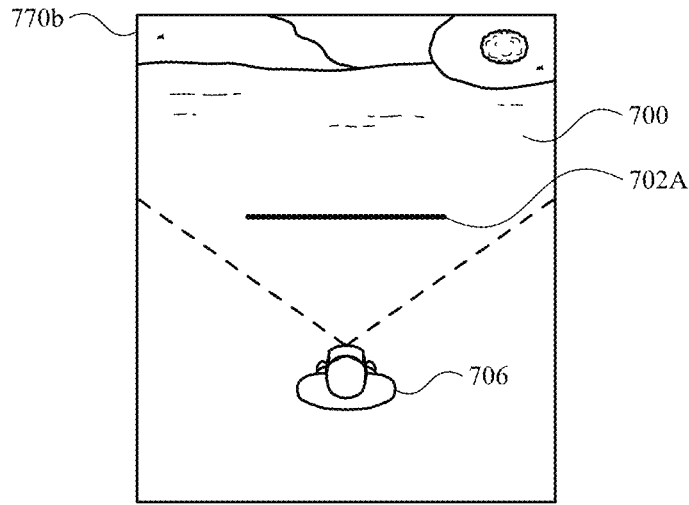
*FIG. 7B*

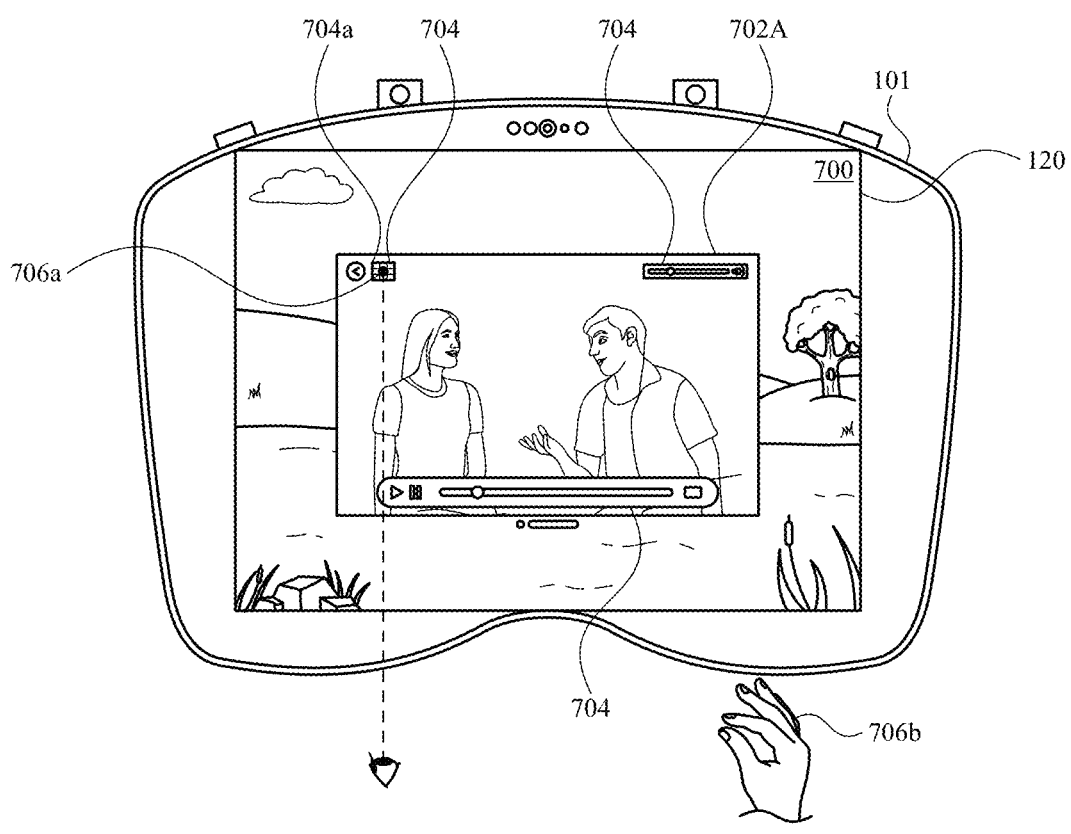
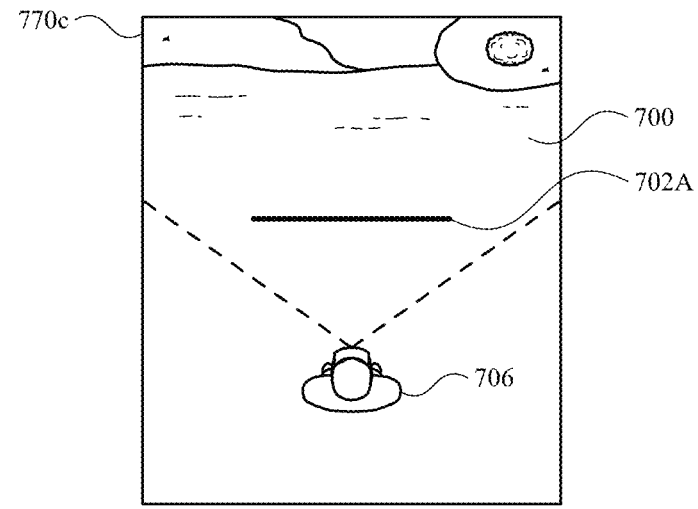
FIG. 7C

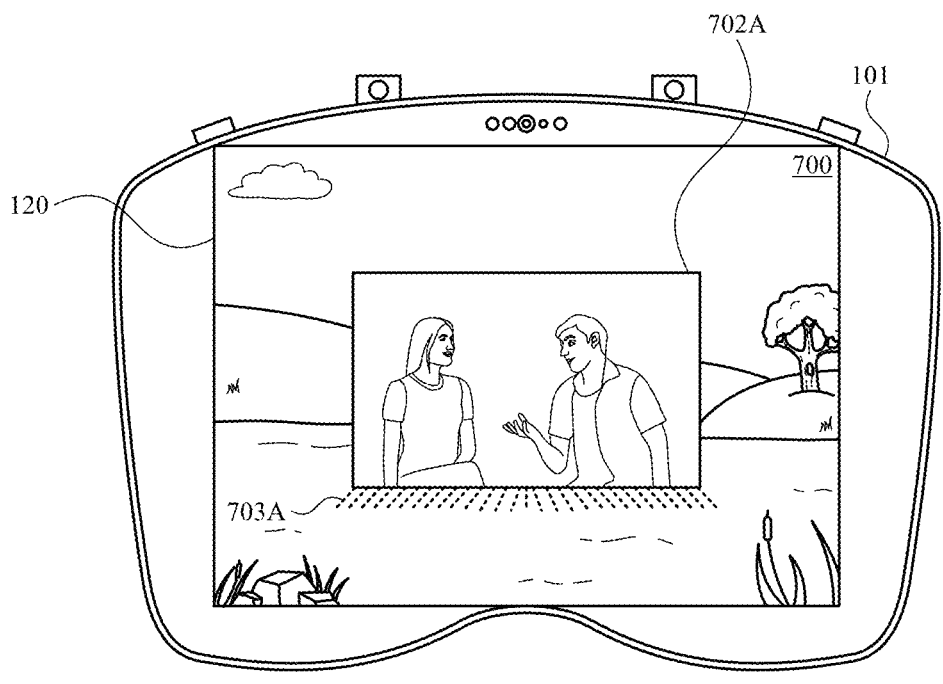
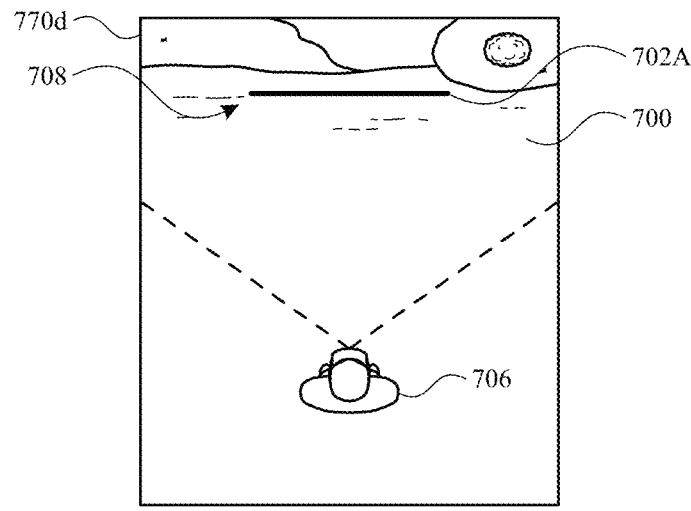
*FIG. 7D*

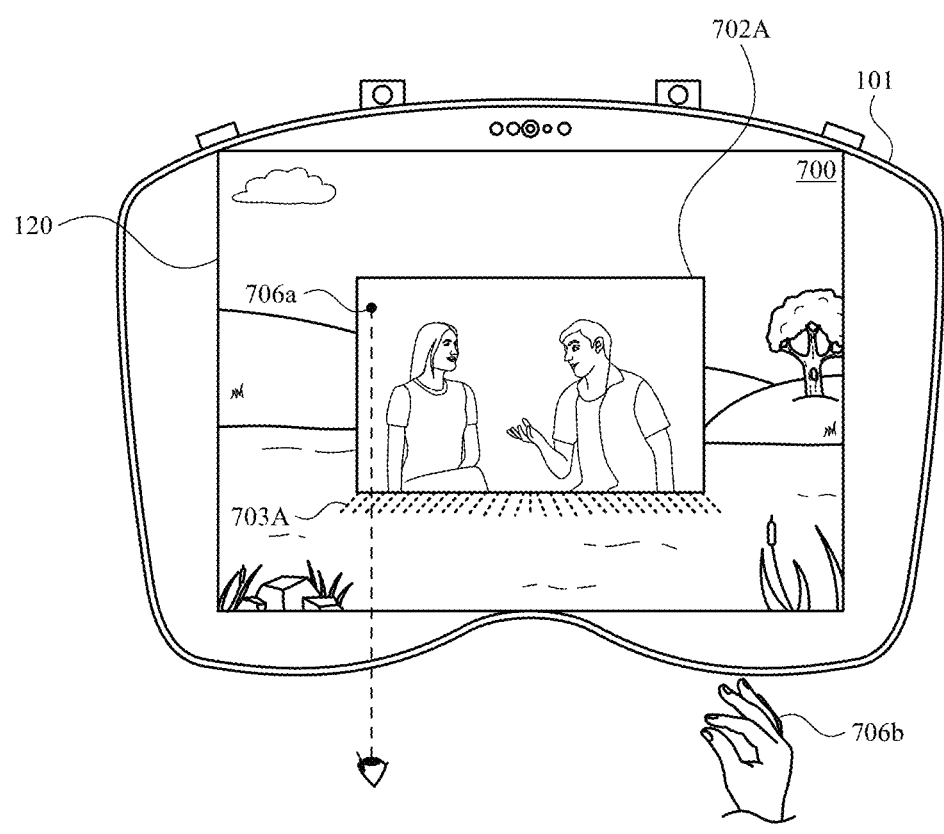
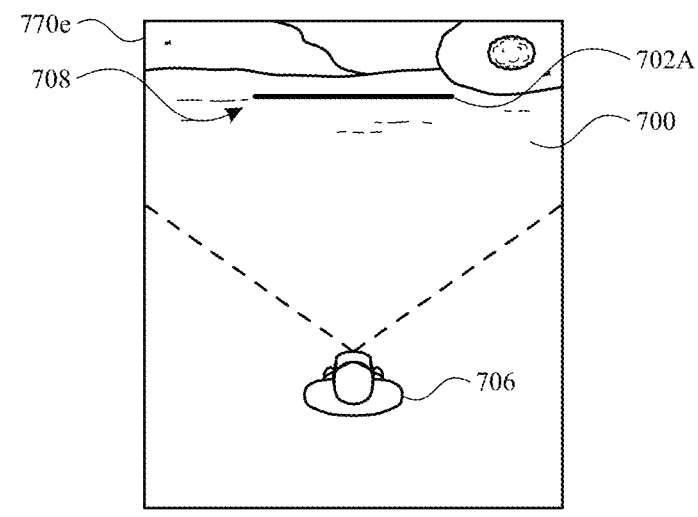
FIG. 7E

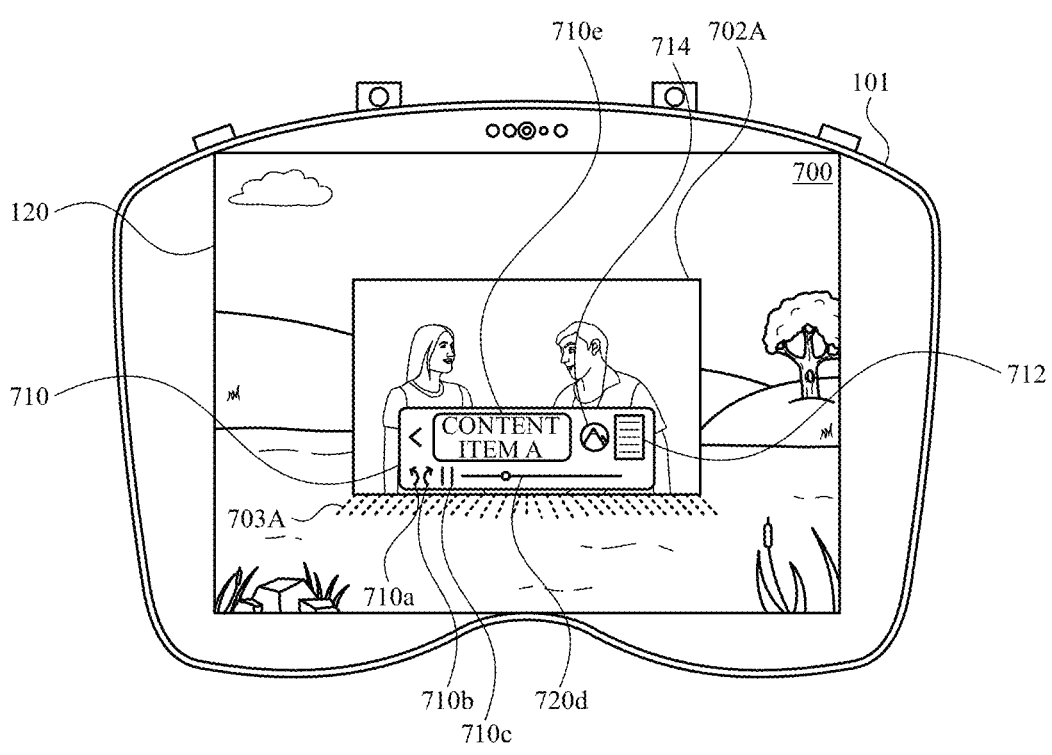
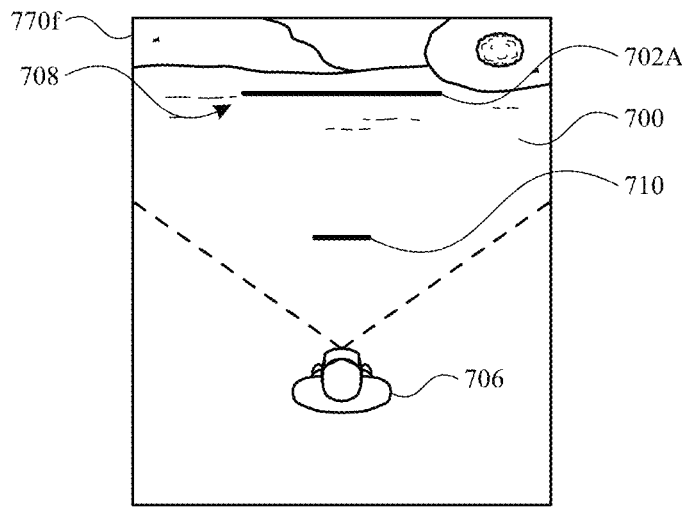
*FIG. 7F*

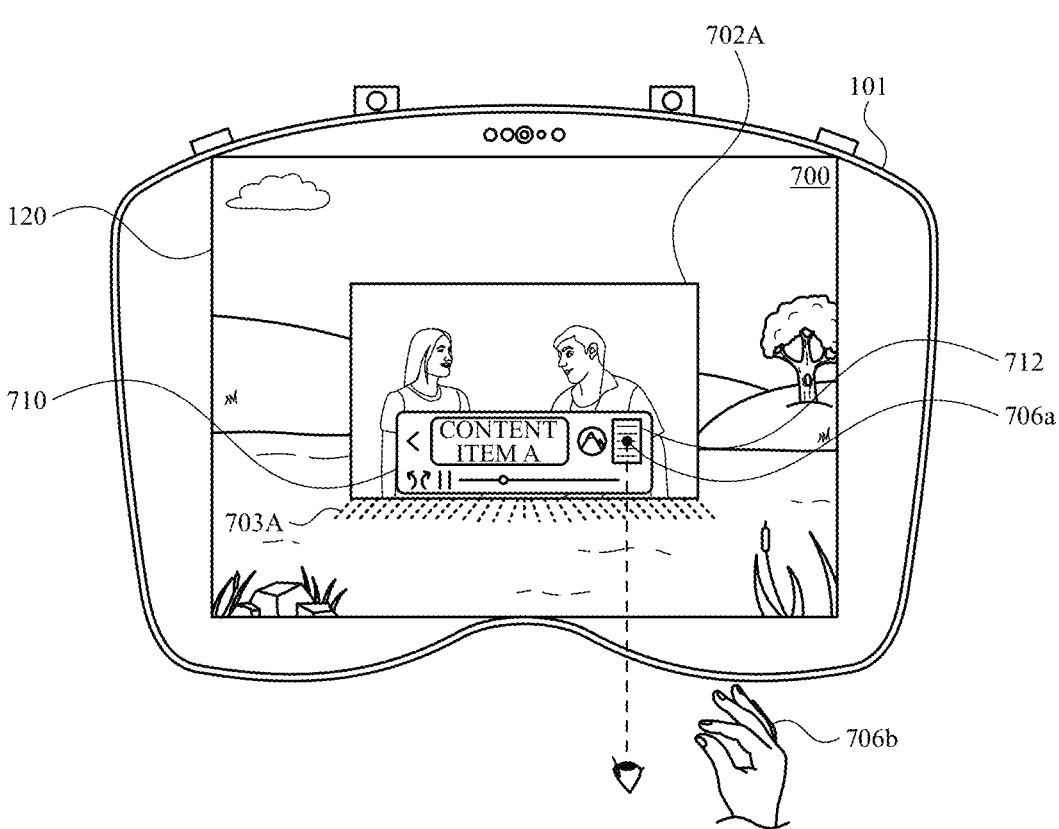
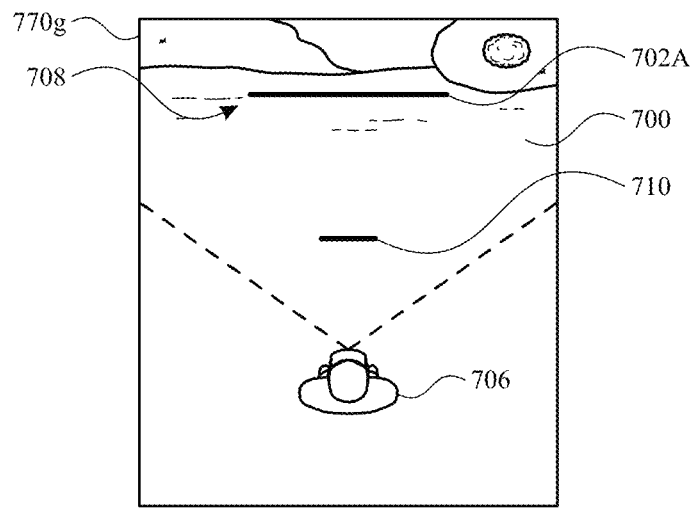
FIG. 7G

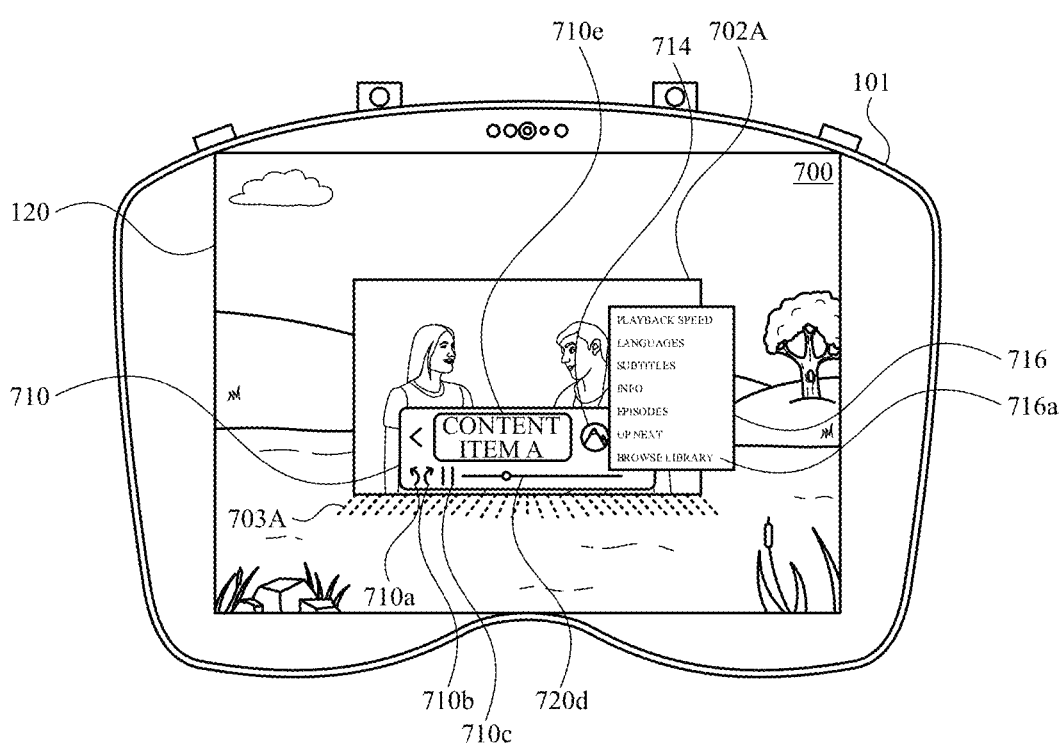
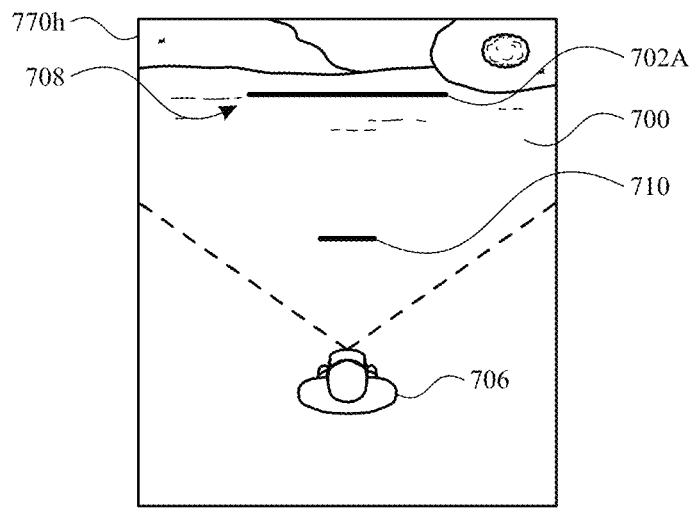
*FIG. 7H*

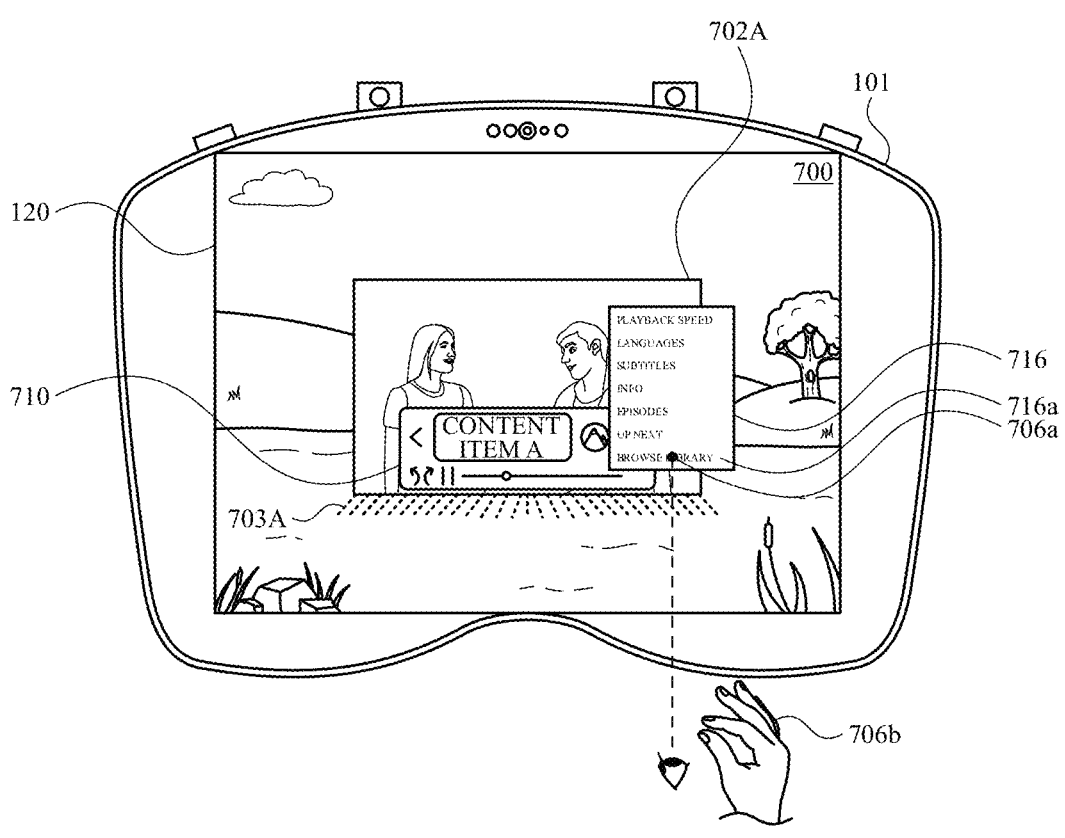
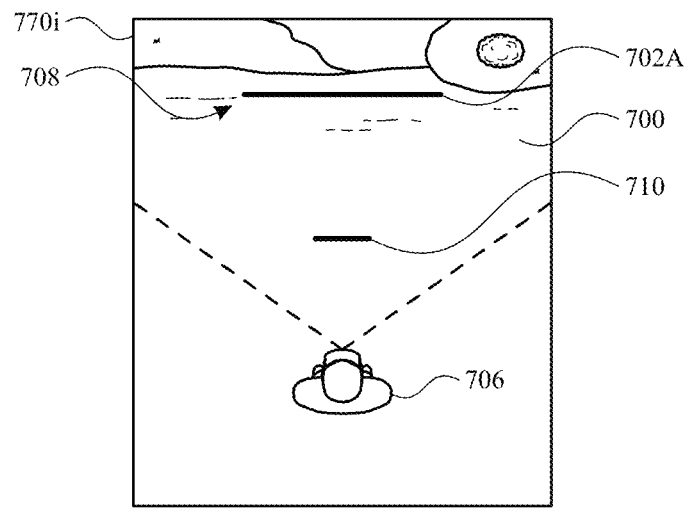
FIG. 7I

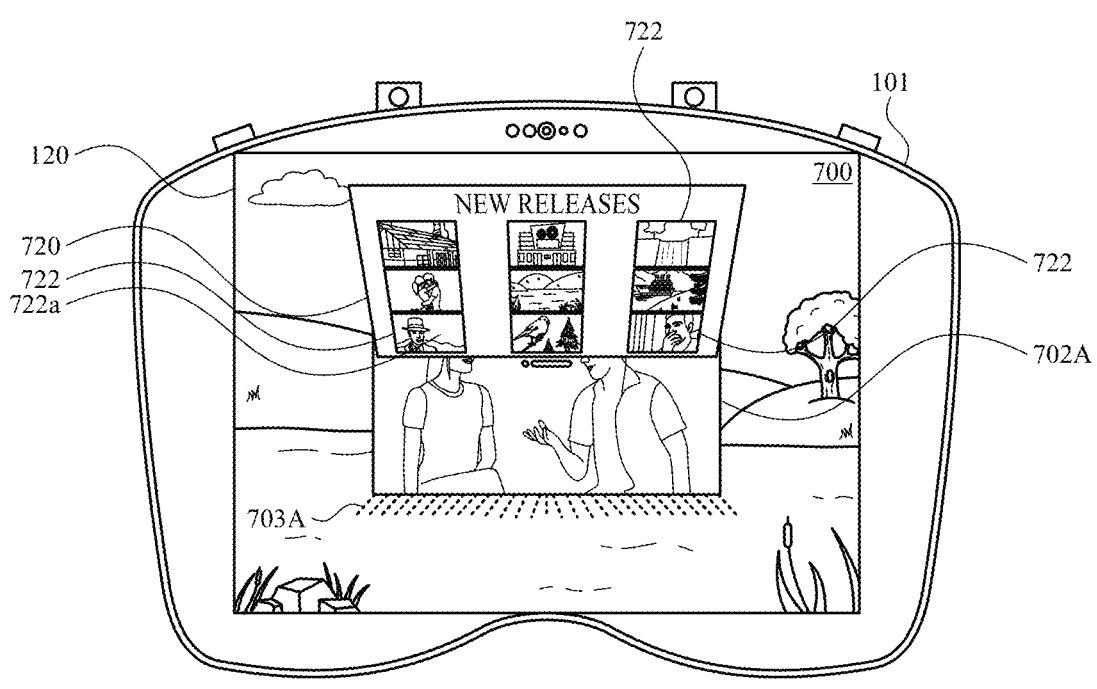
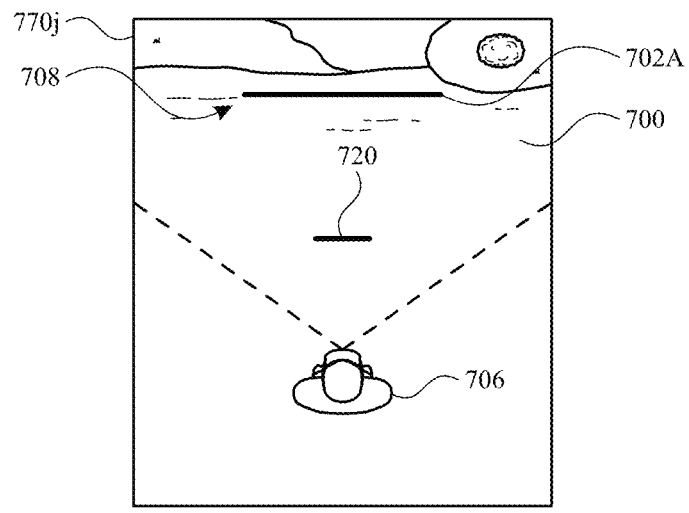
*FIG. 7J*

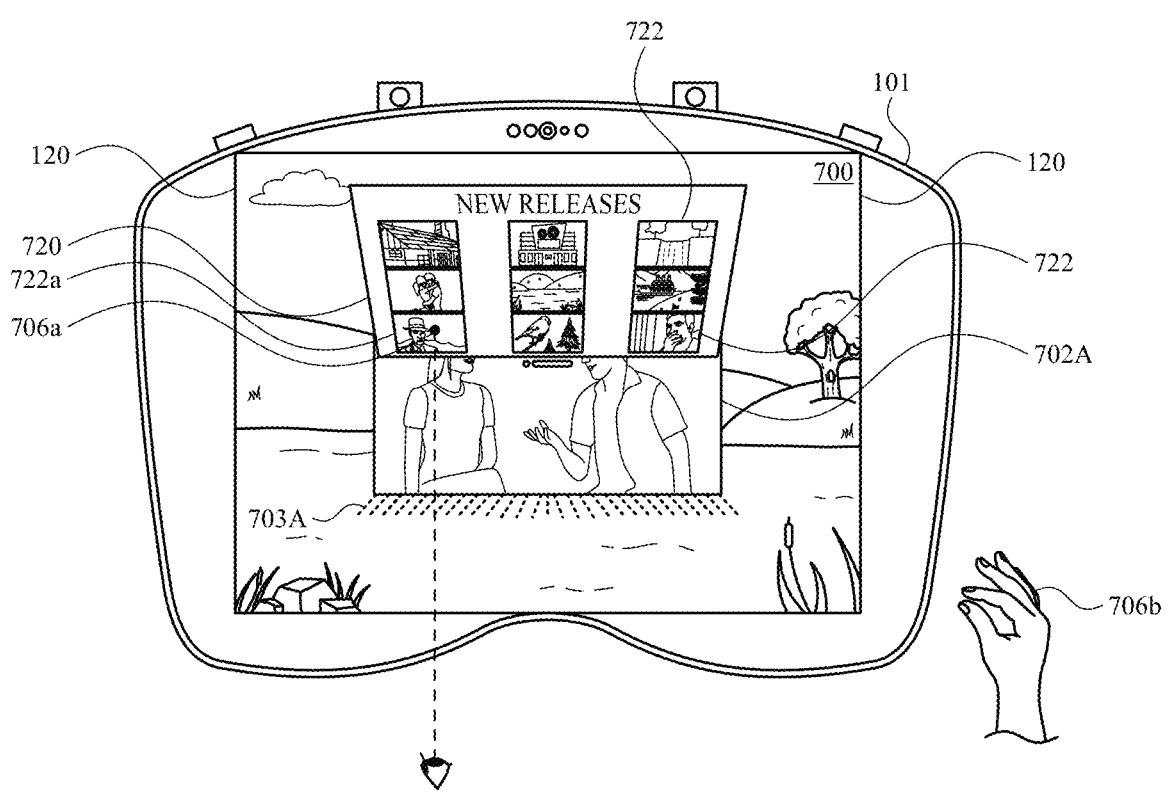
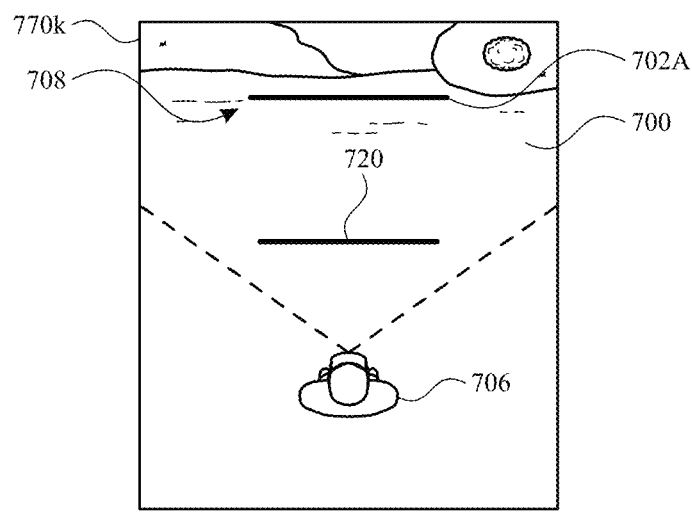
*FIG. 7K*

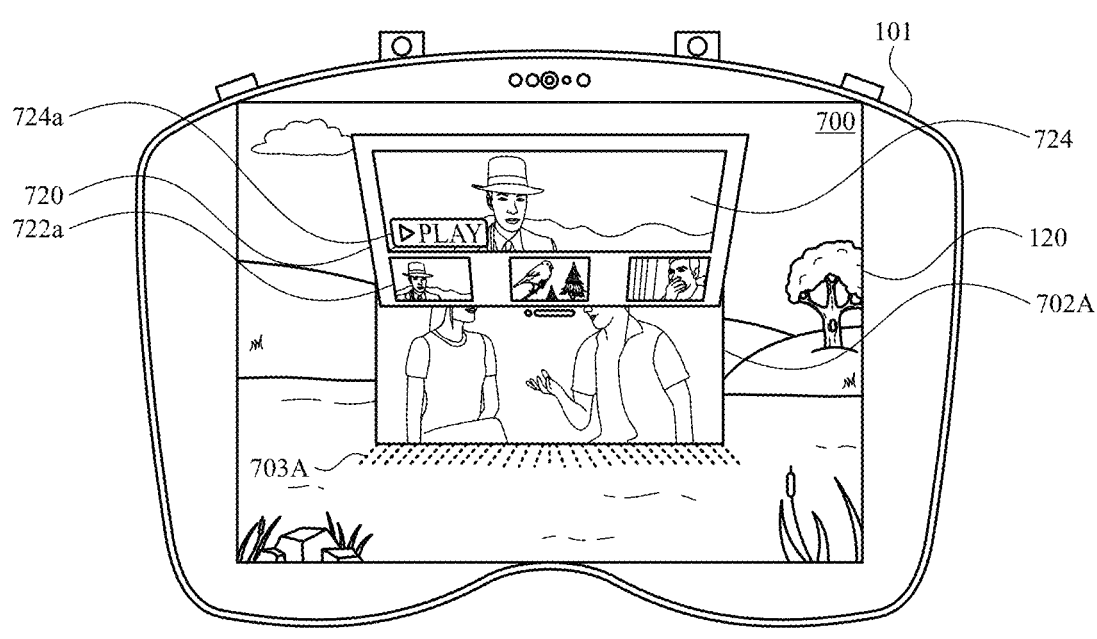
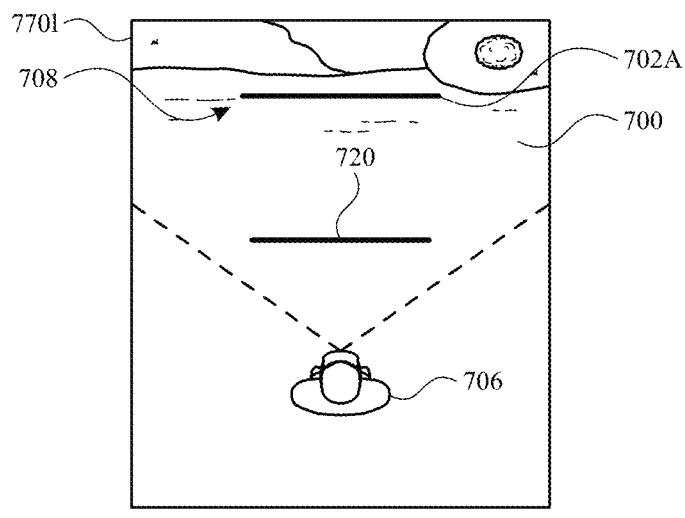
FIG. 7L

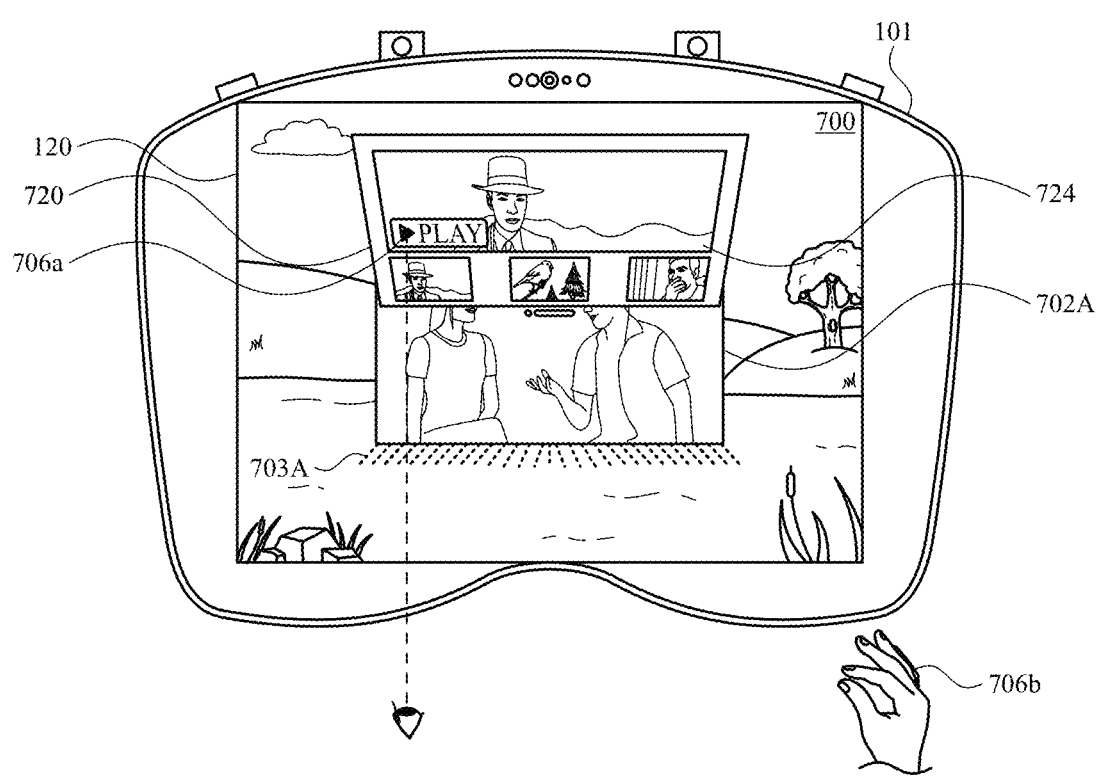
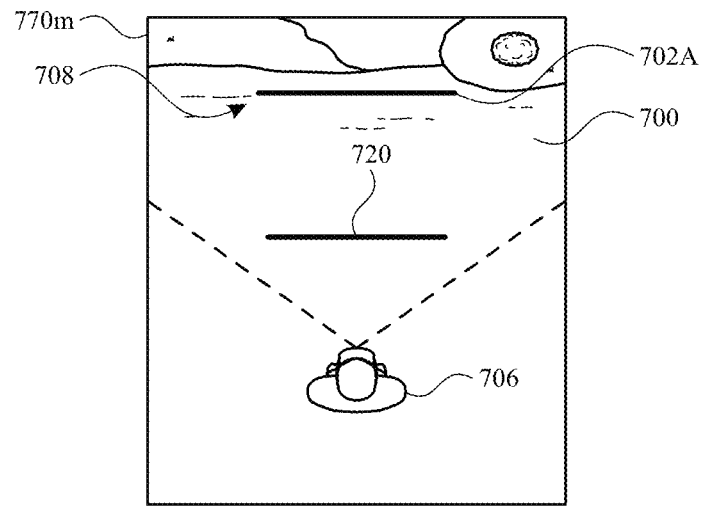
*FIG. 7M*

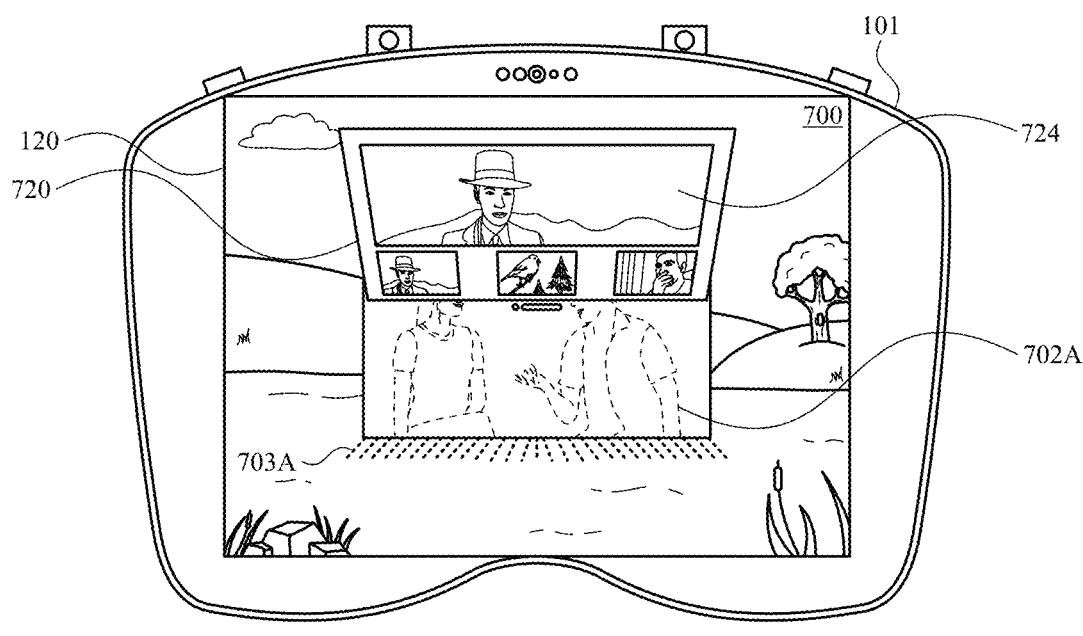
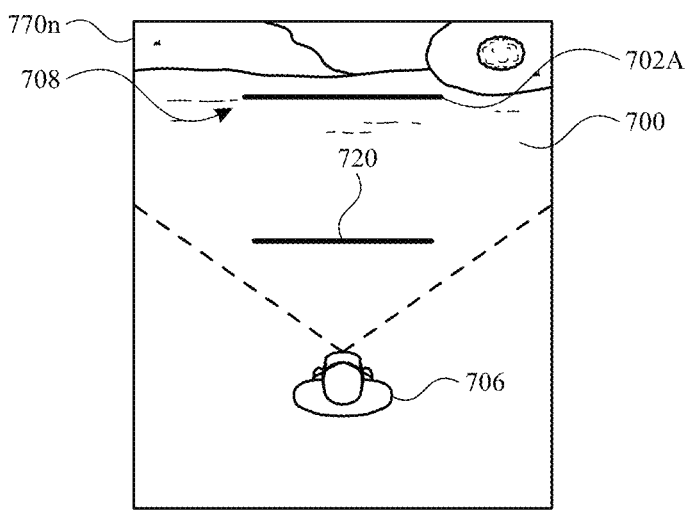
FIG. 7N

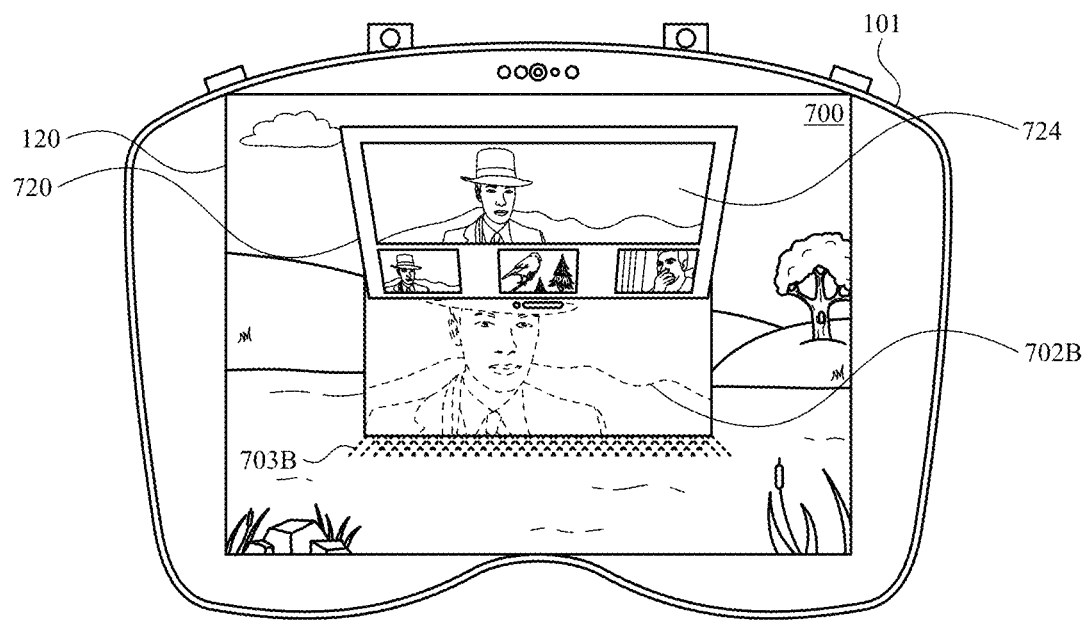
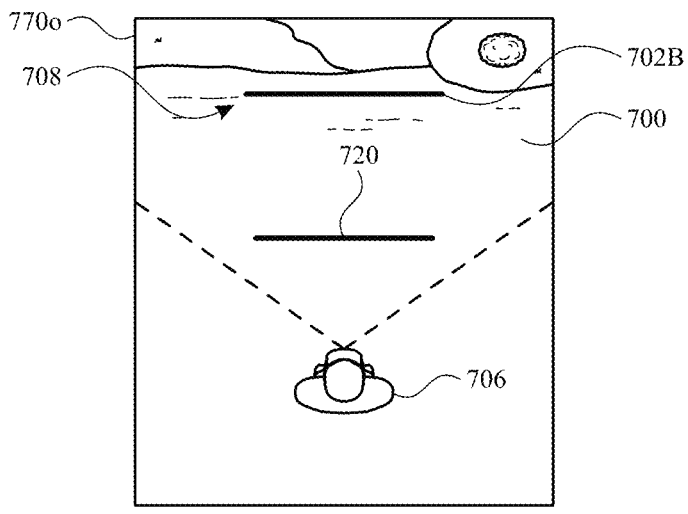
FIG. 7O

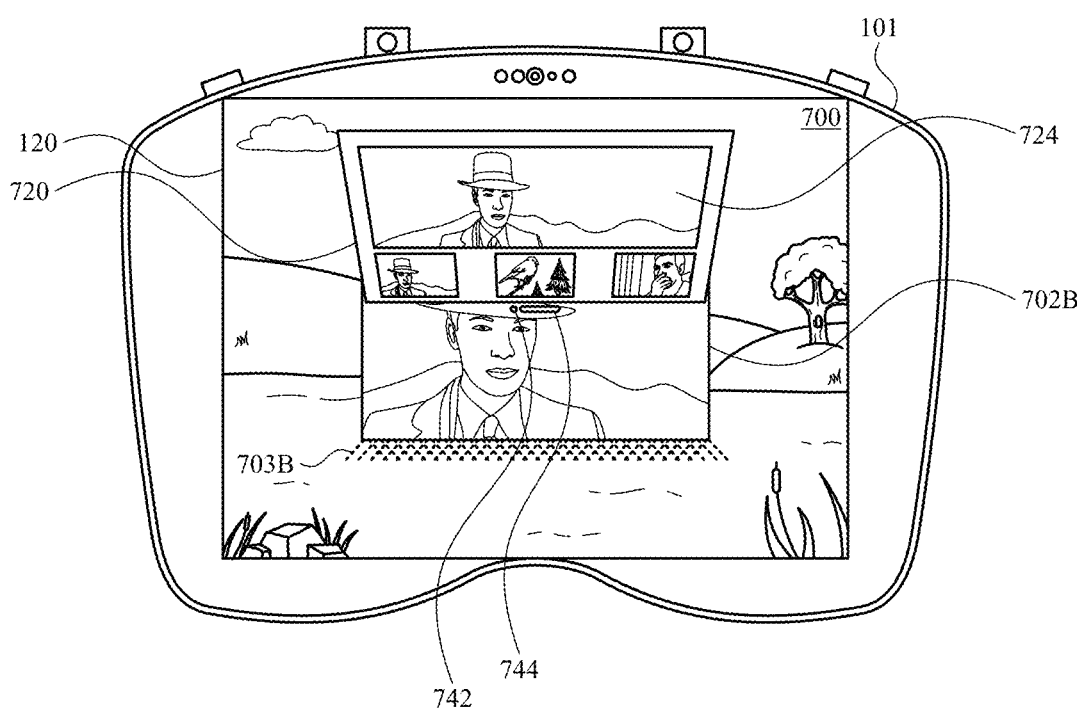
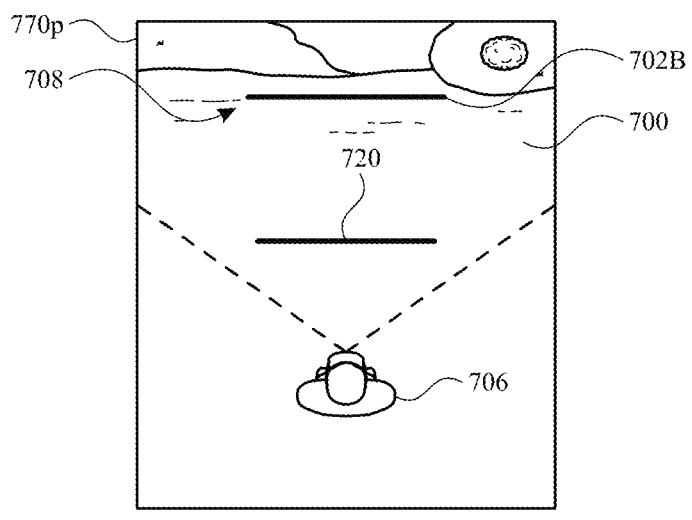
*FIG. 7P*

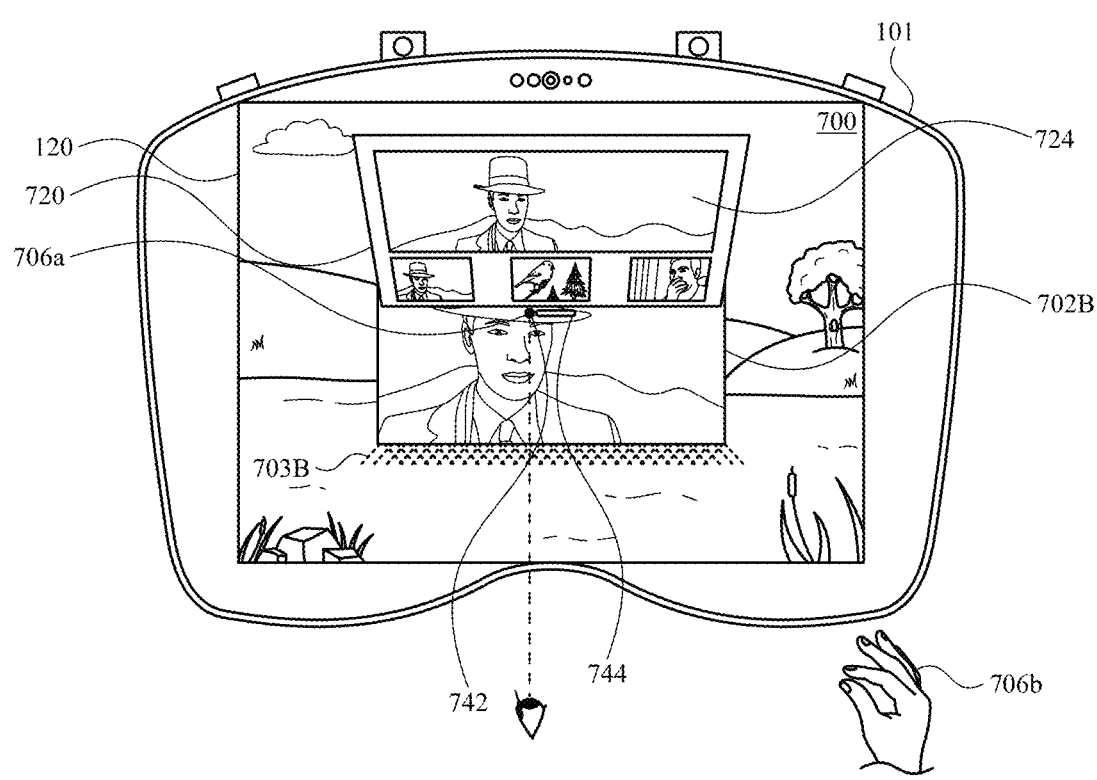
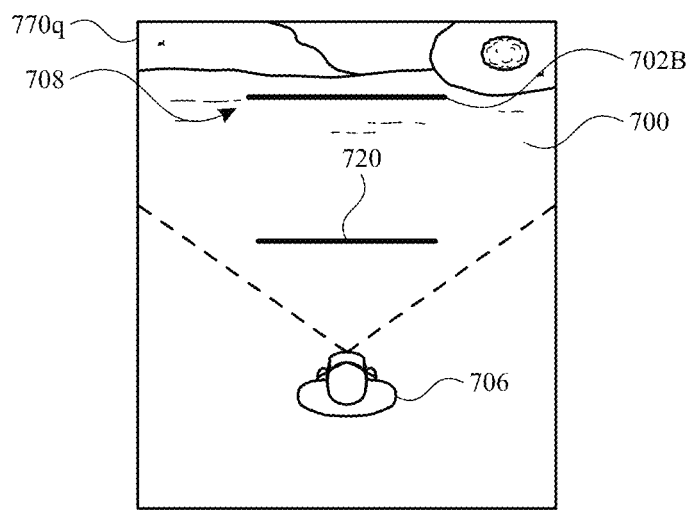
*FIG. 7Q*

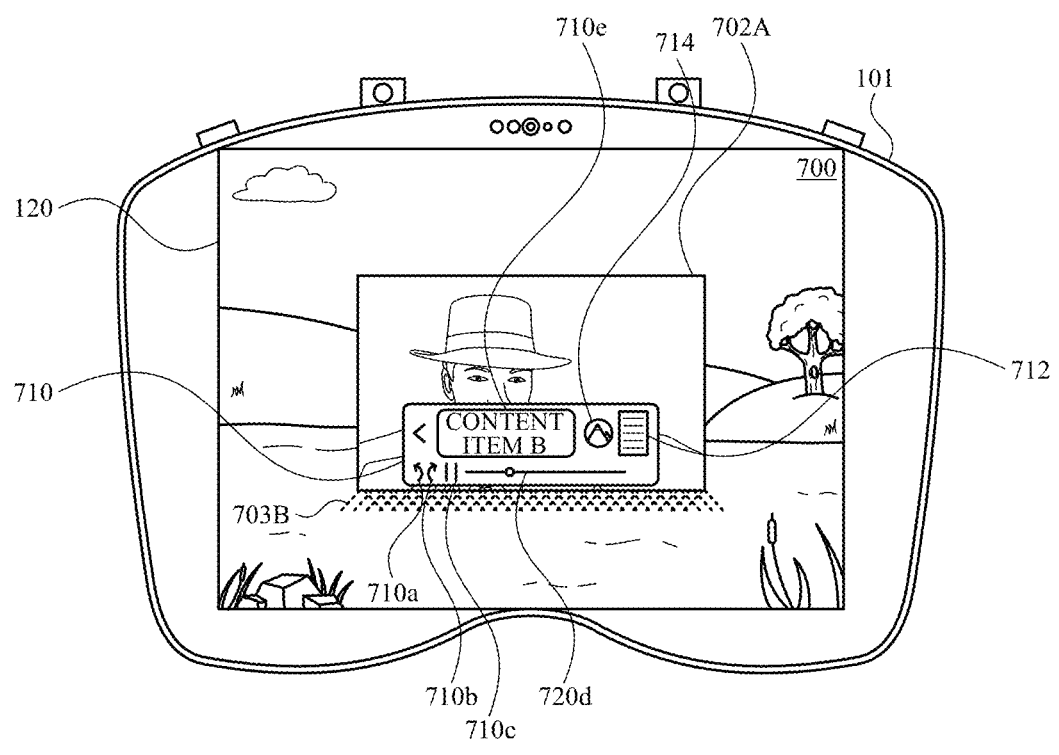
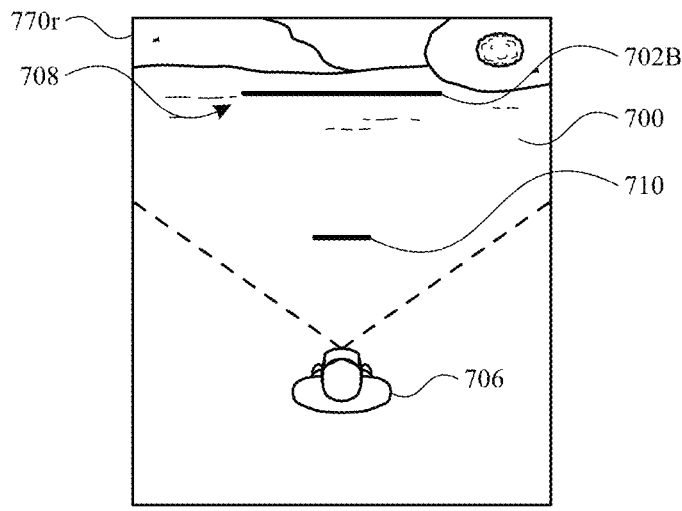
*FIG. 7R*

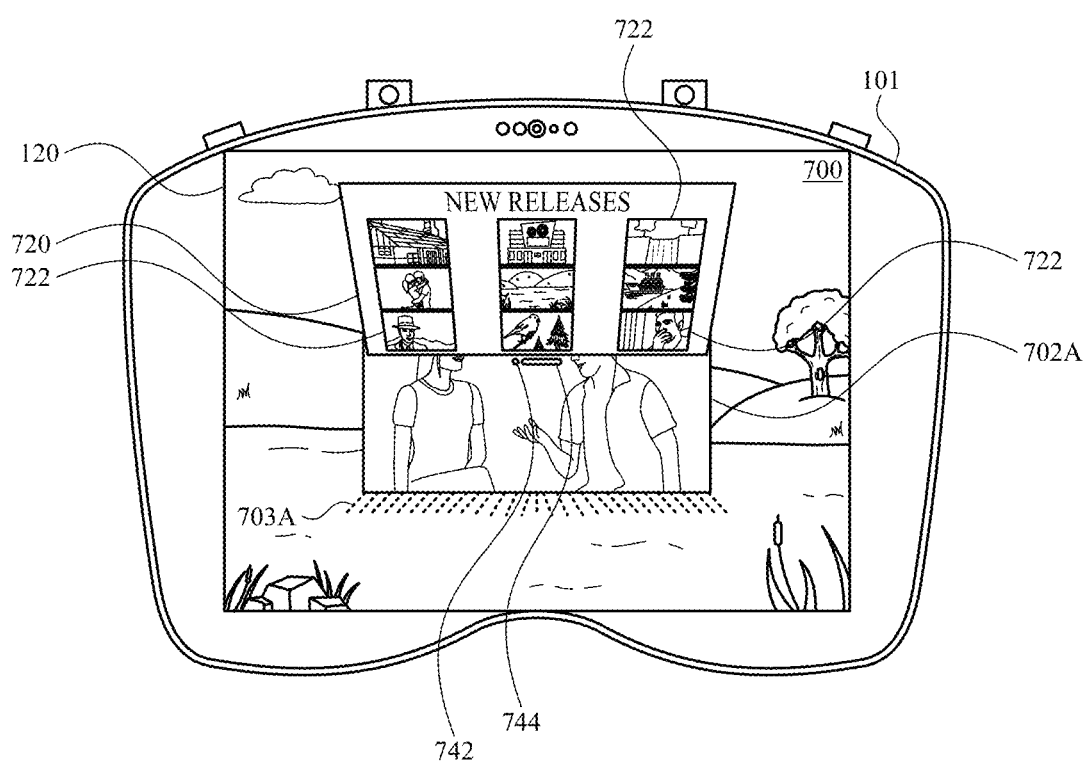
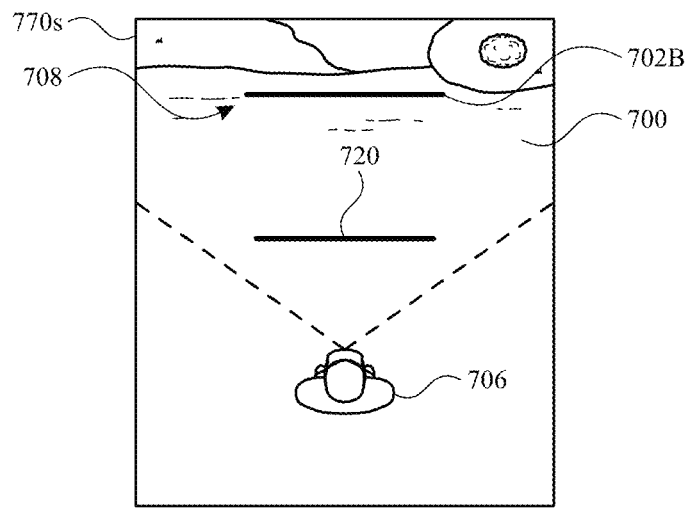
*FIG. 7S*

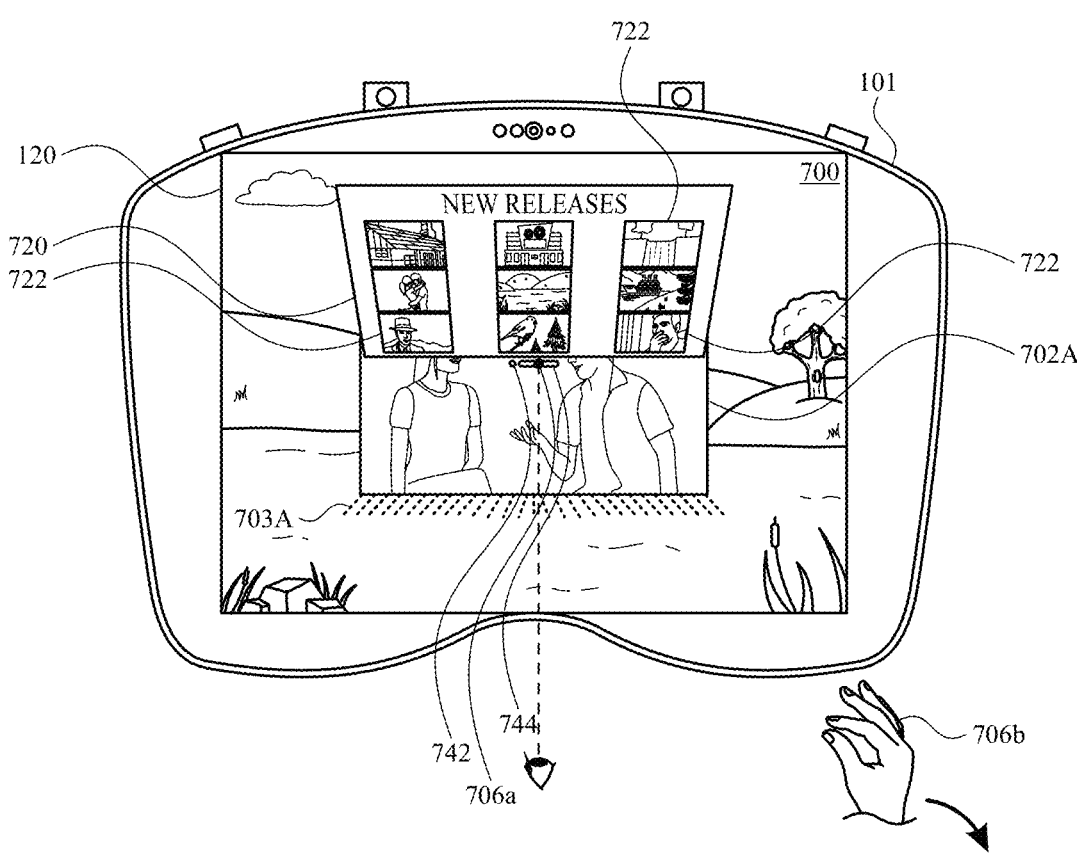
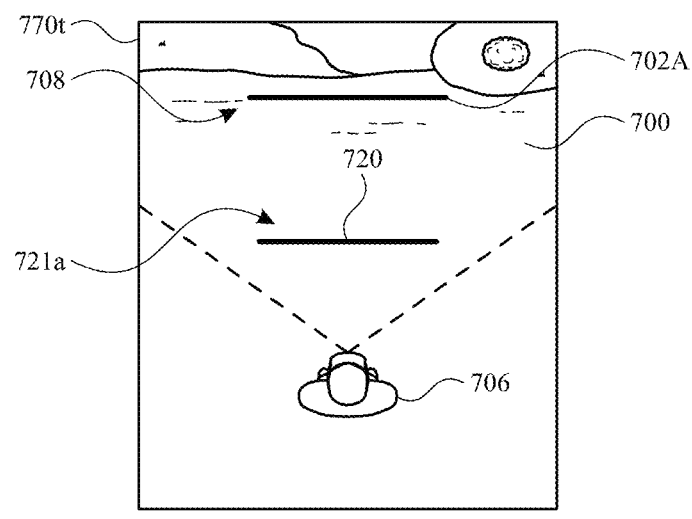
*FIG. 7T*

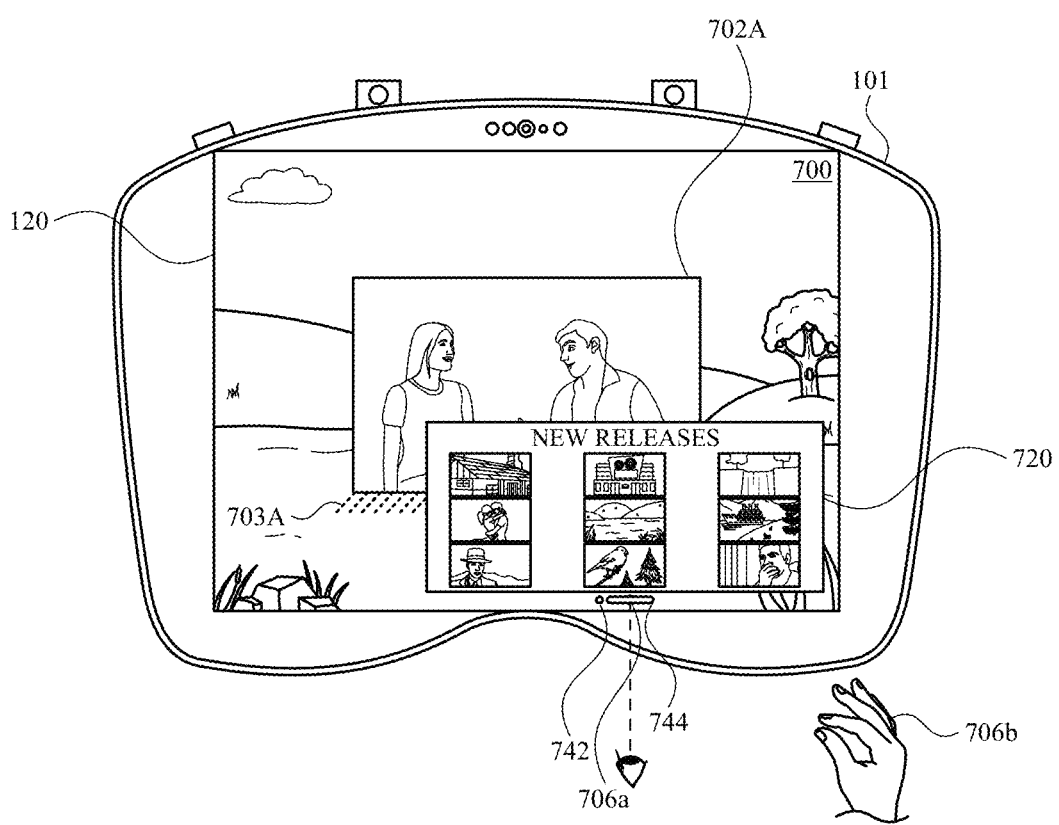
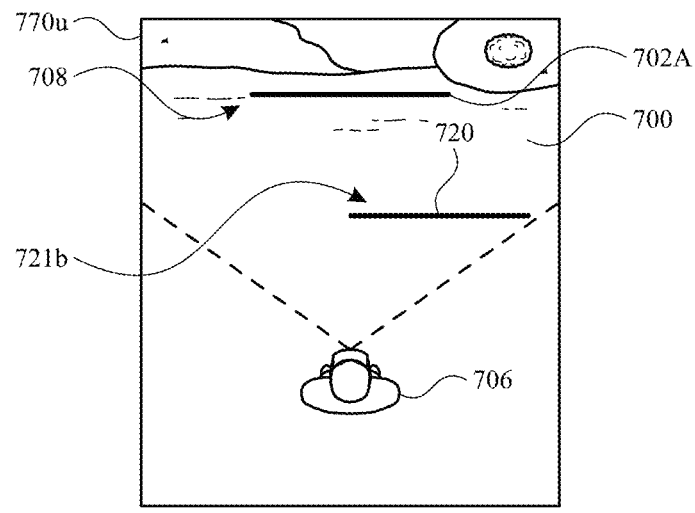
FIG. 7U

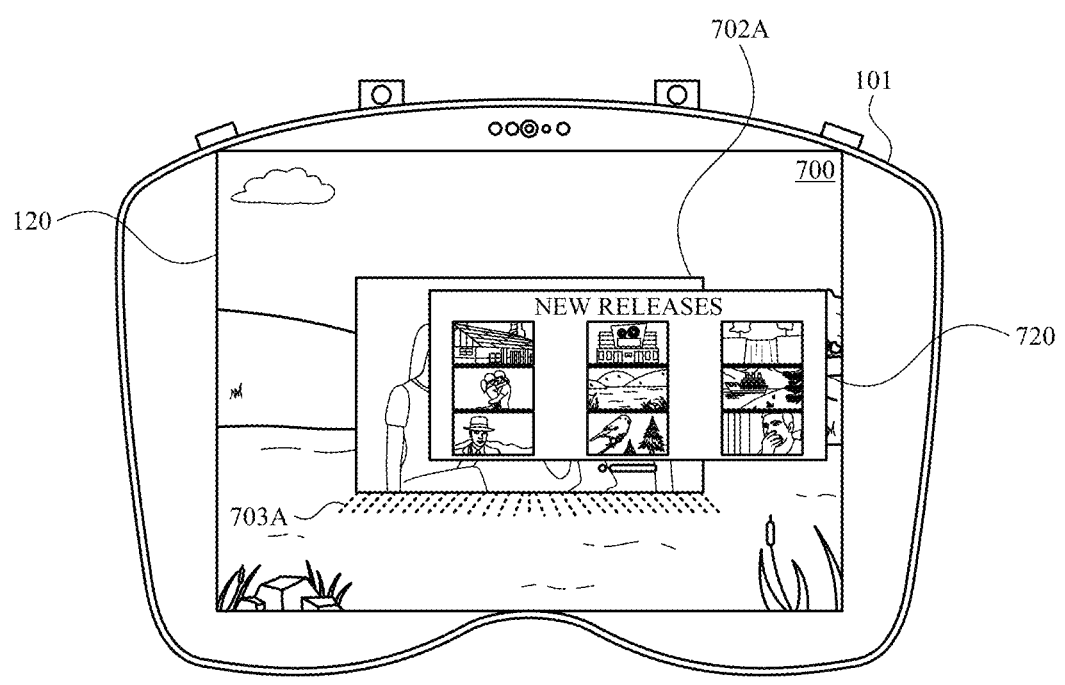
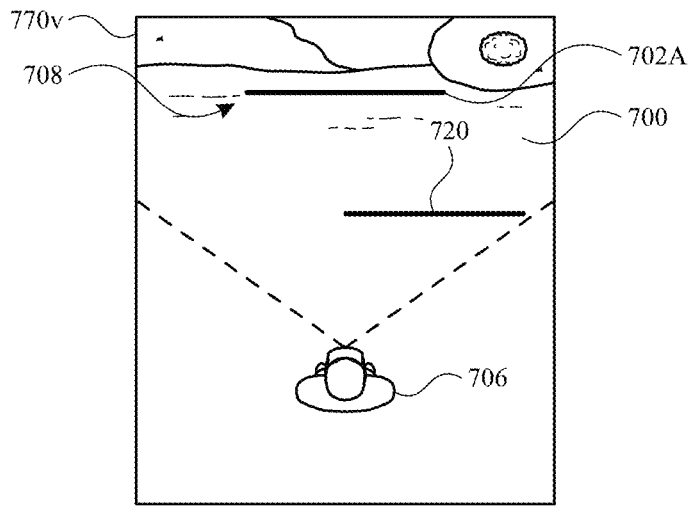
*FIG. 7V*

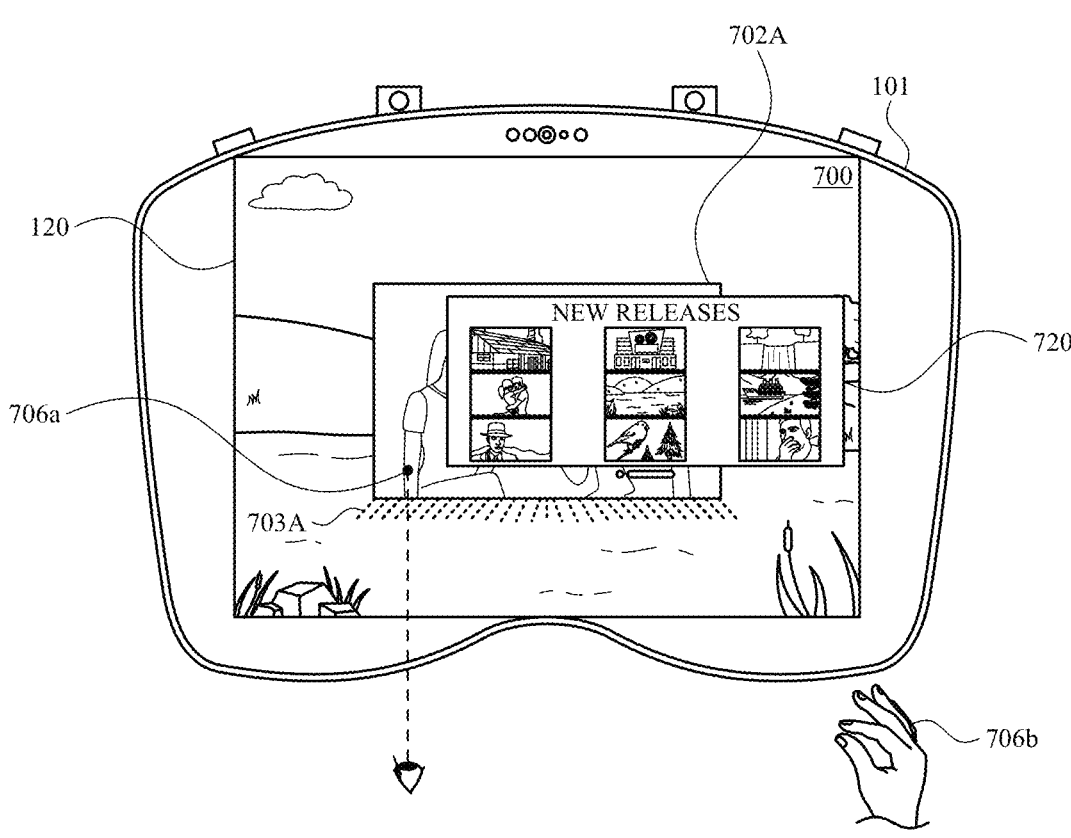
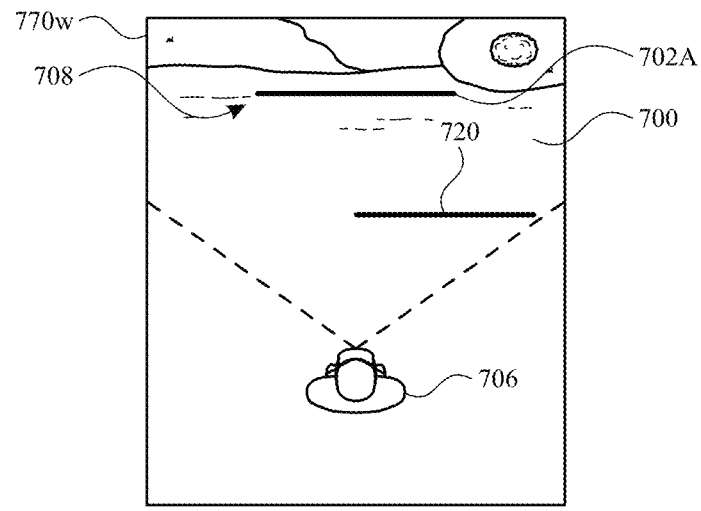
*FIG. 7W*

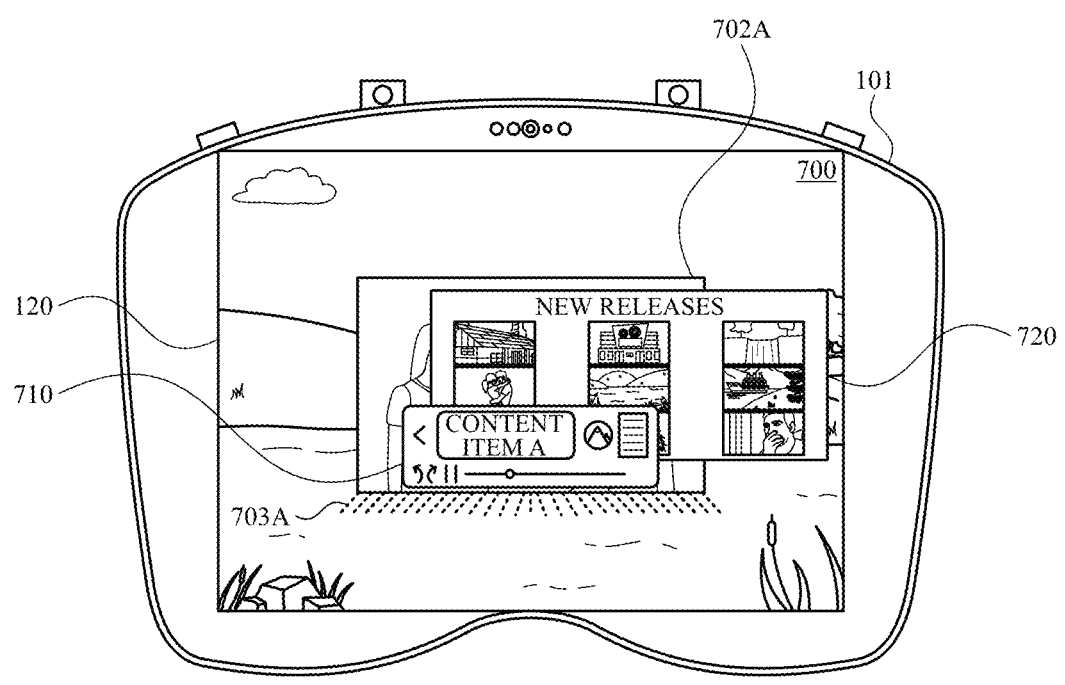
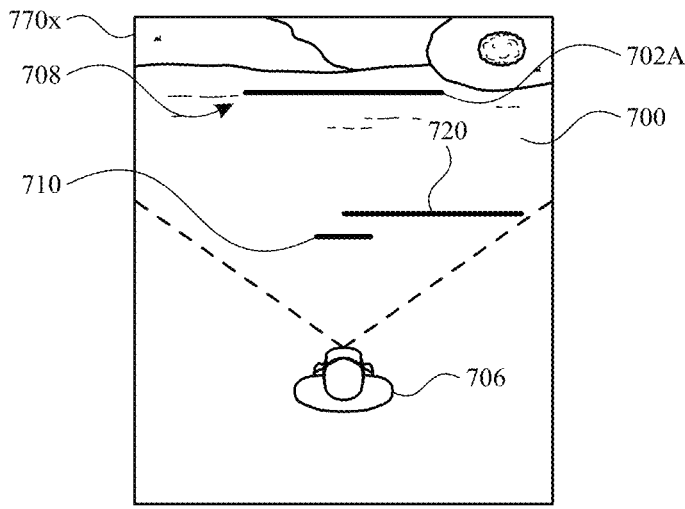
FIG. 7X

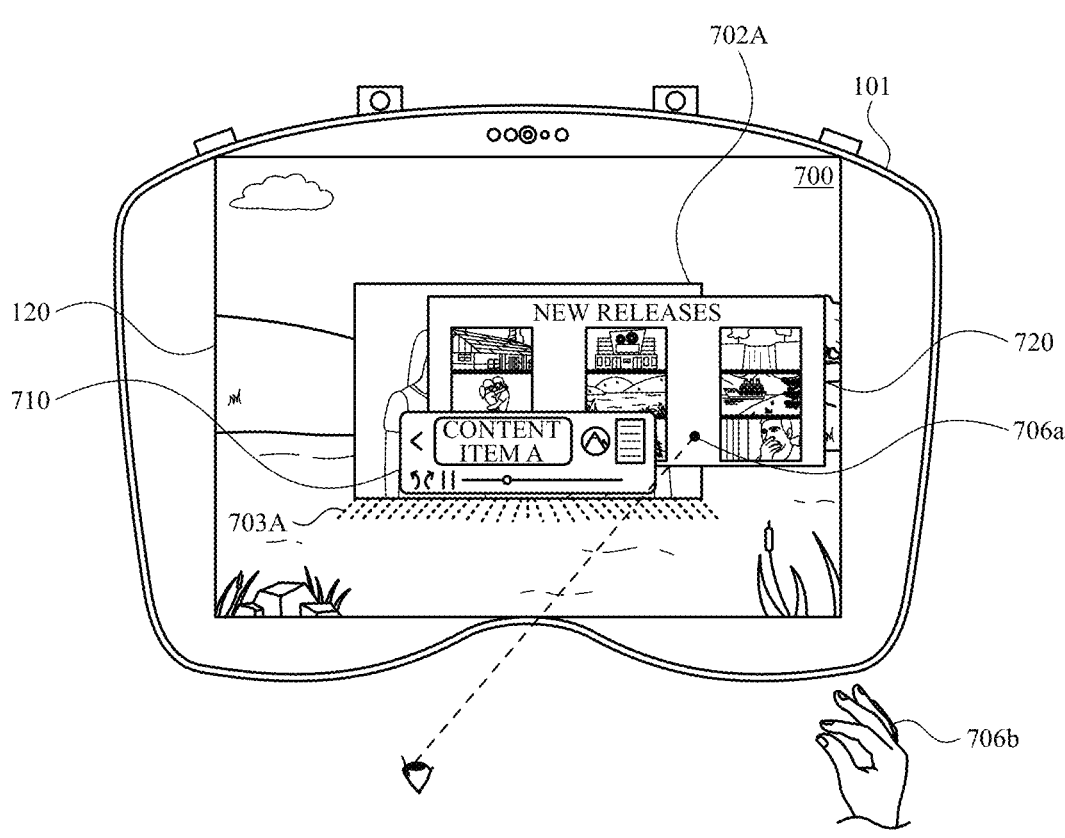
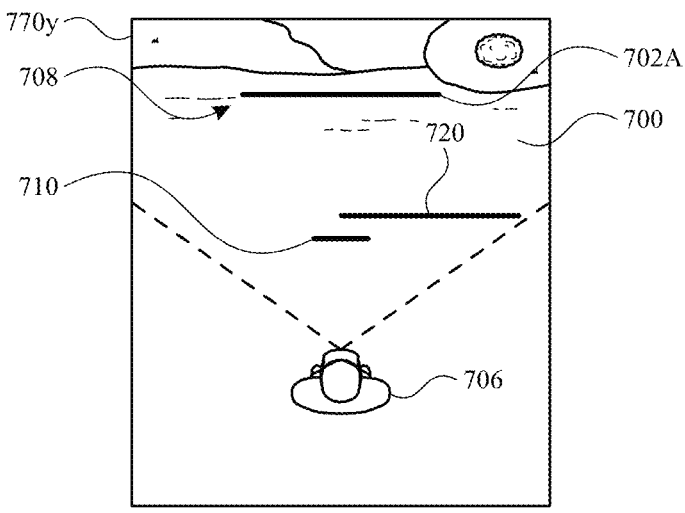
*FIG. 7Y*

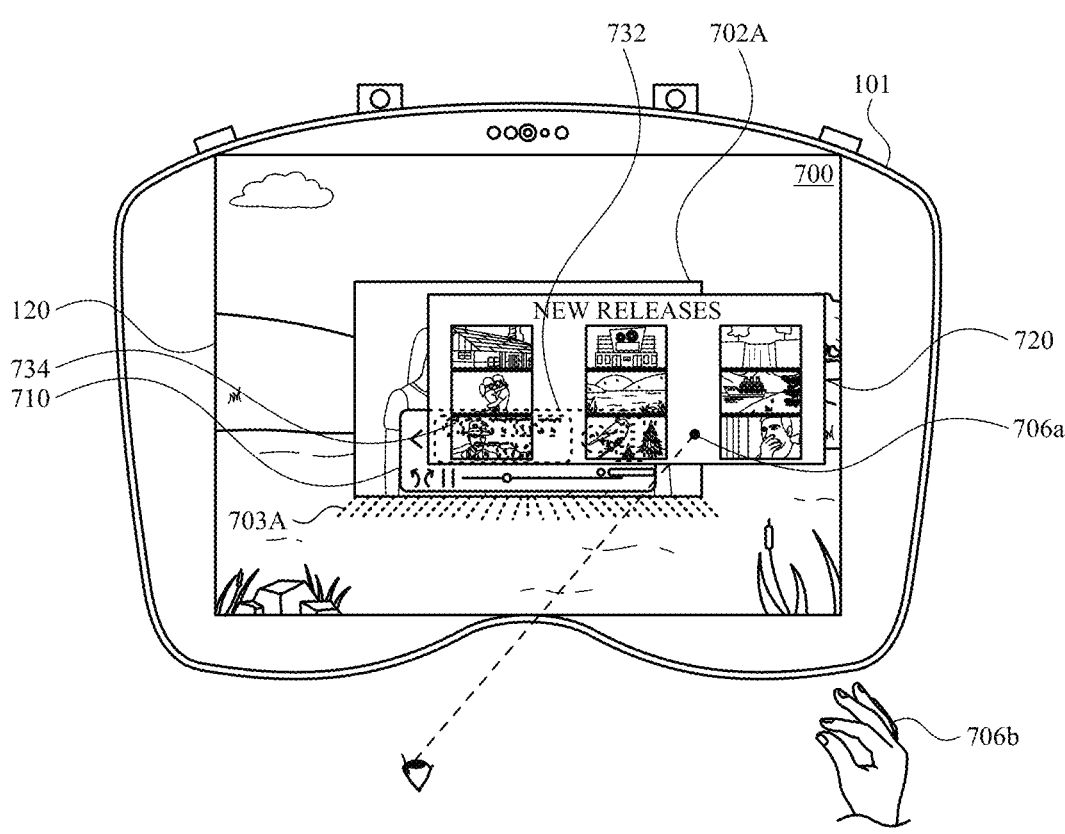
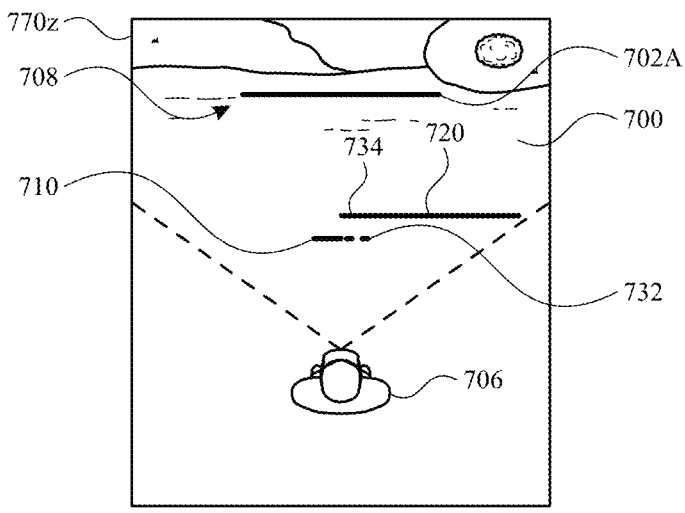
FIG. 7Z

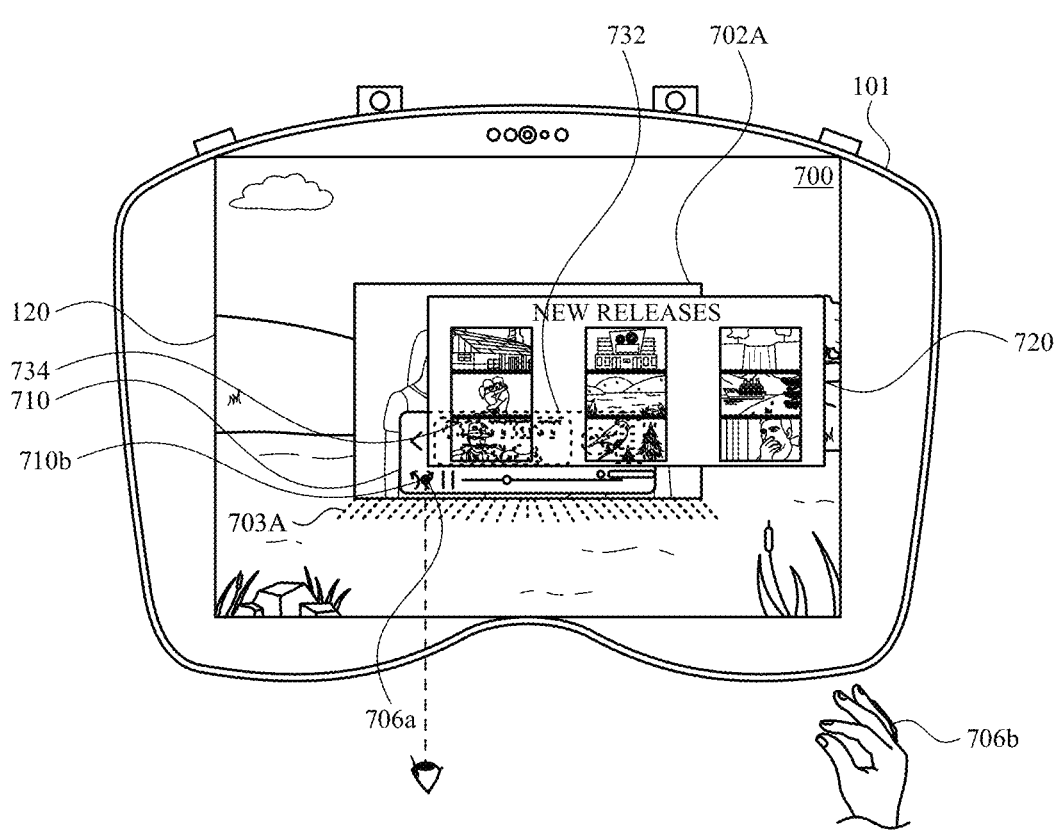
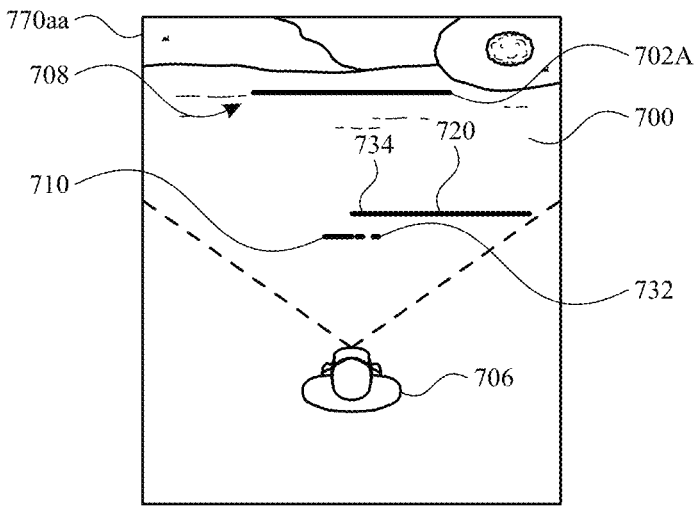
*FIG. 7AA*

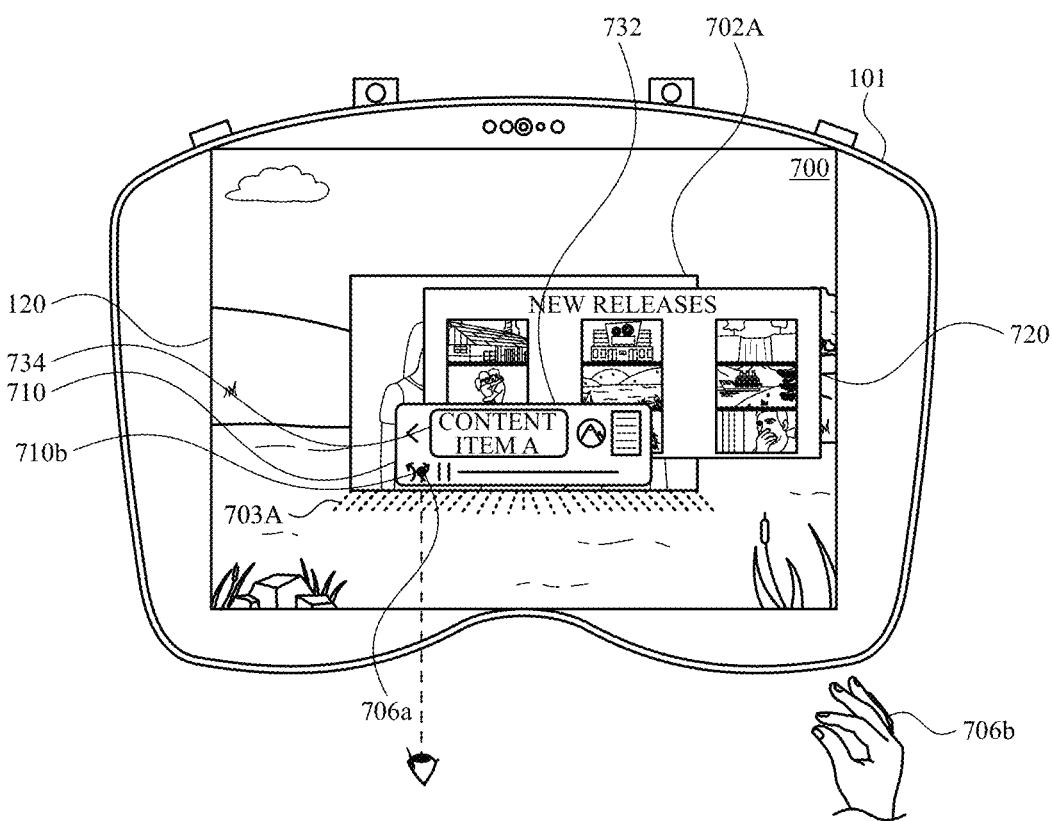
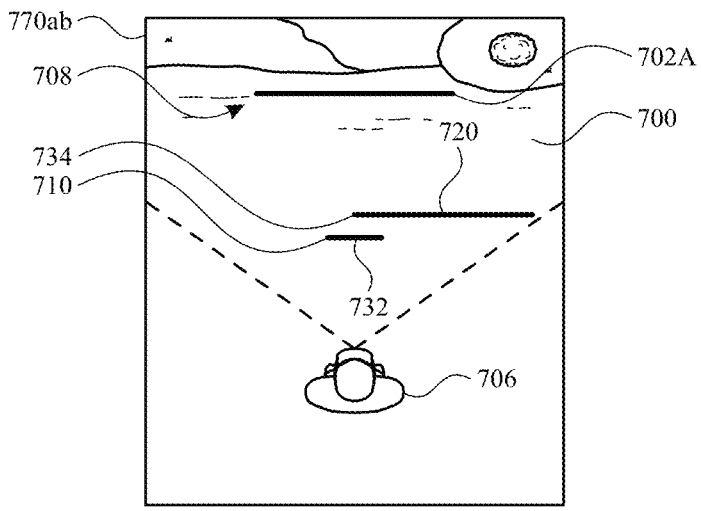
*FIG. 7AB*

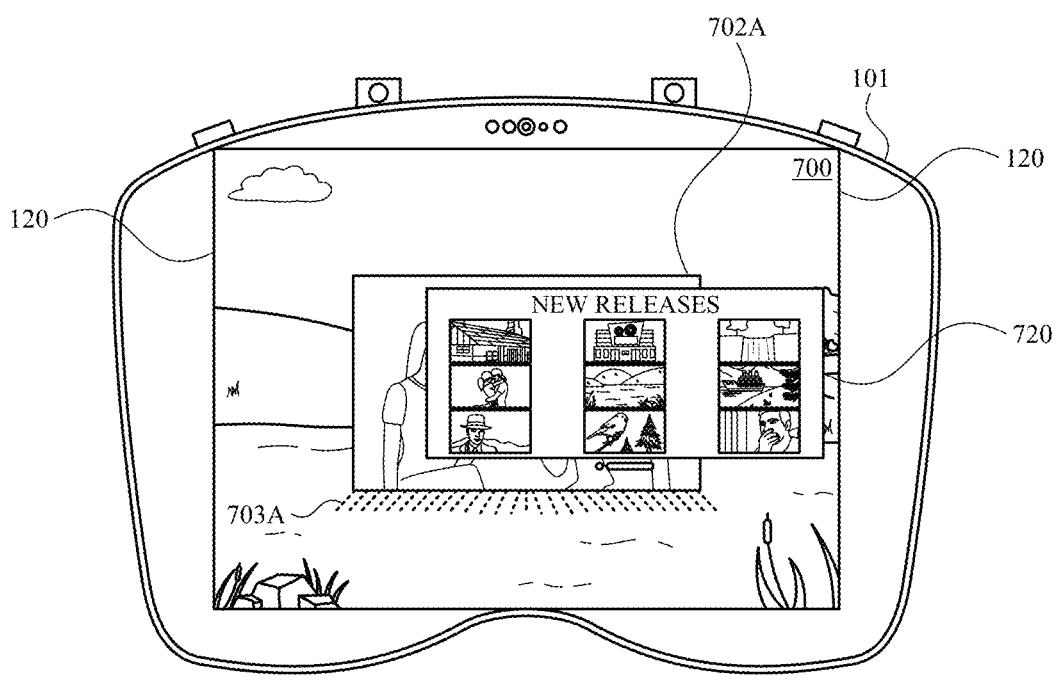
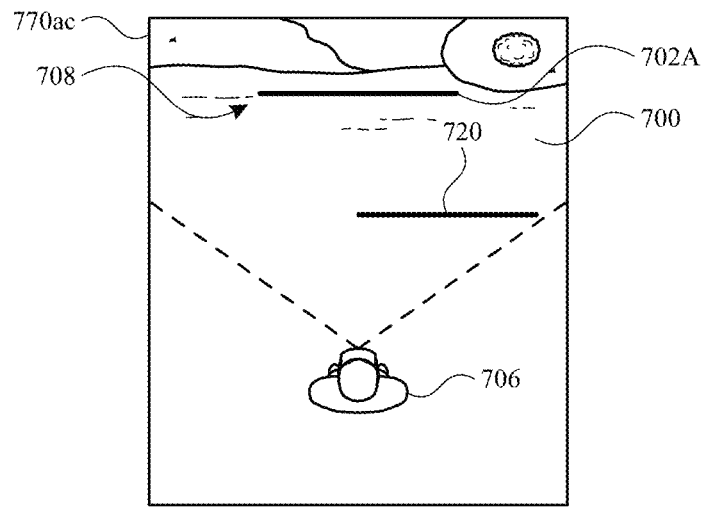
*FIG. 7AC*

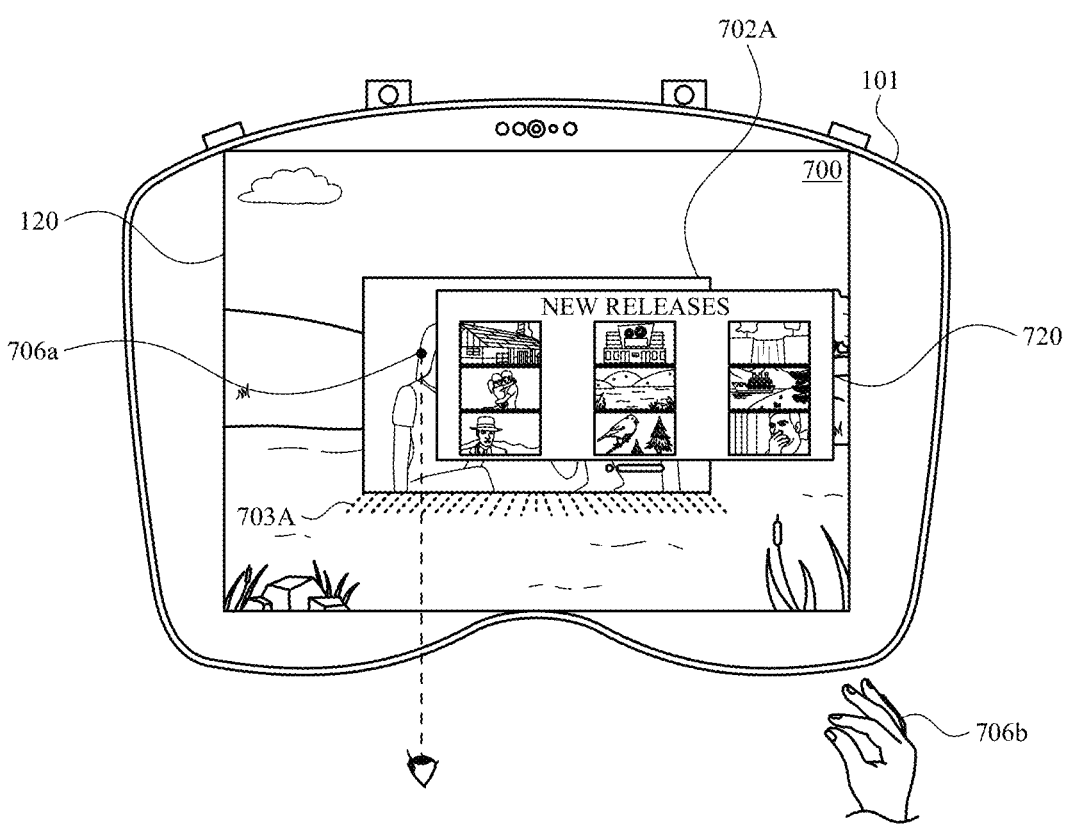
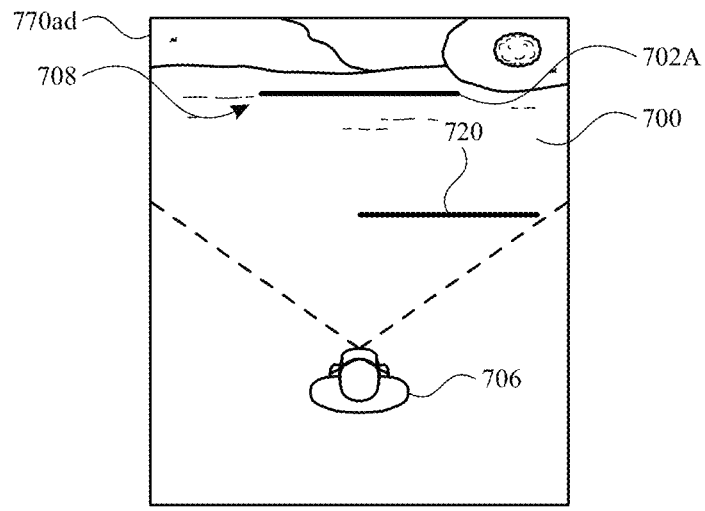
*FIG. 7AD*

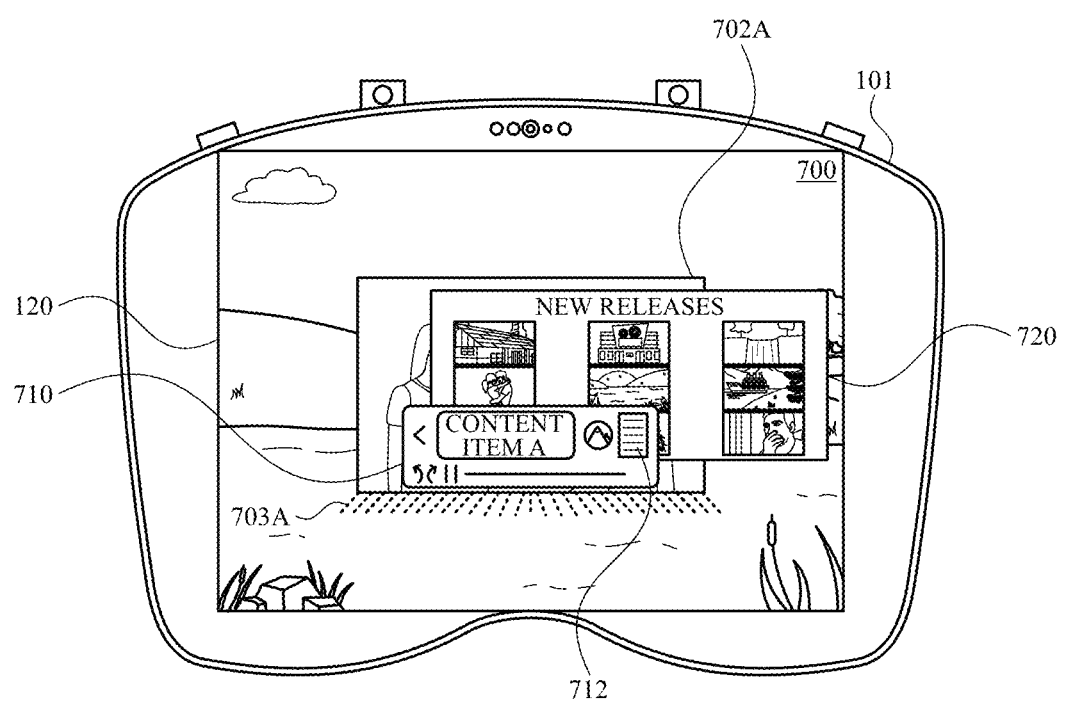
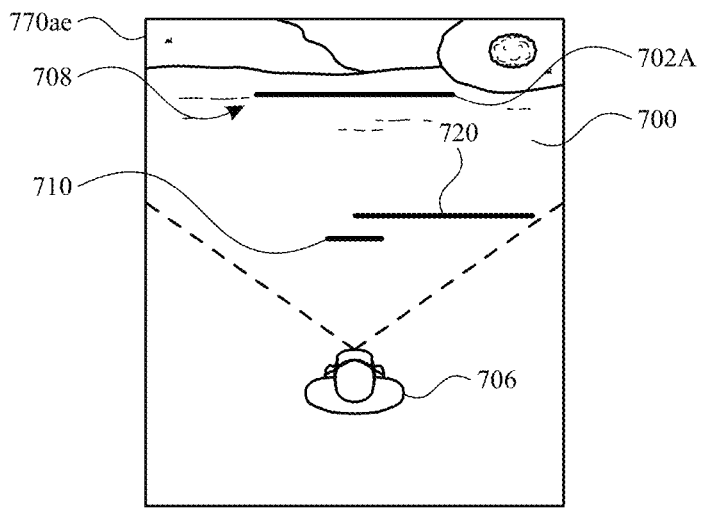
*FIG. 7AE*

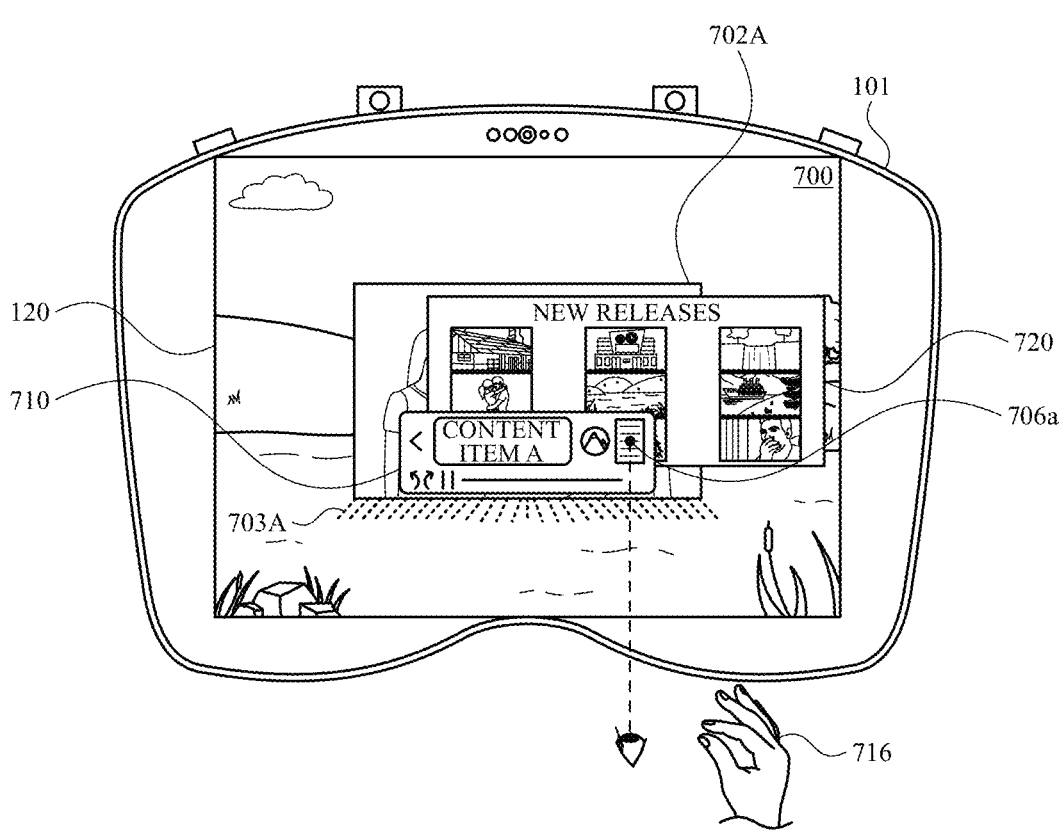
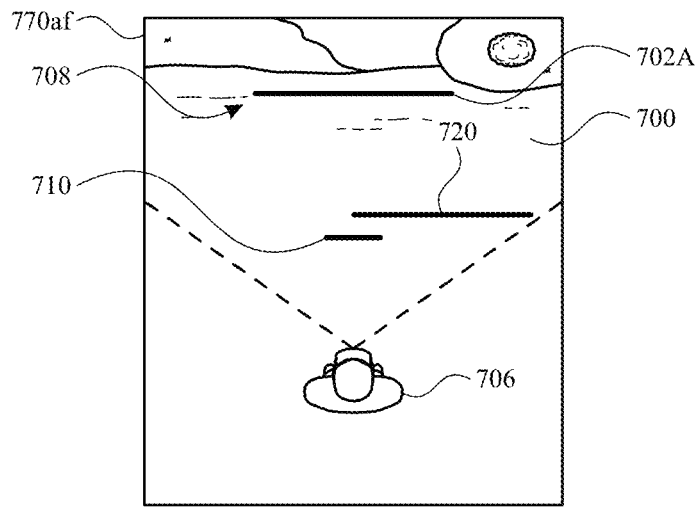
*FIG. 7AF*

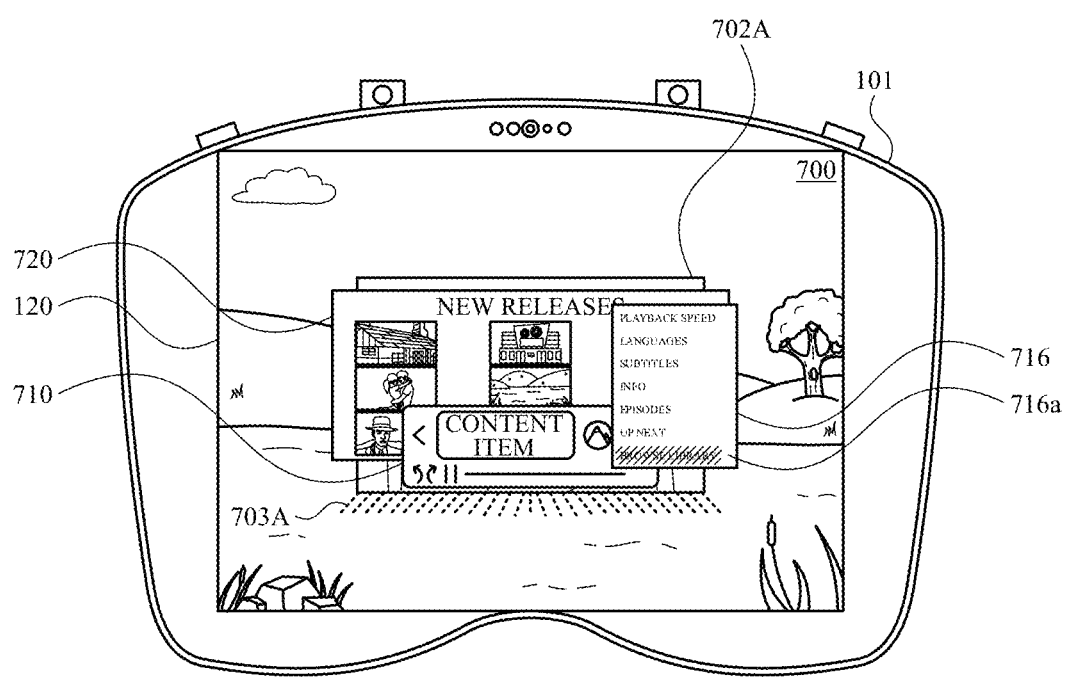
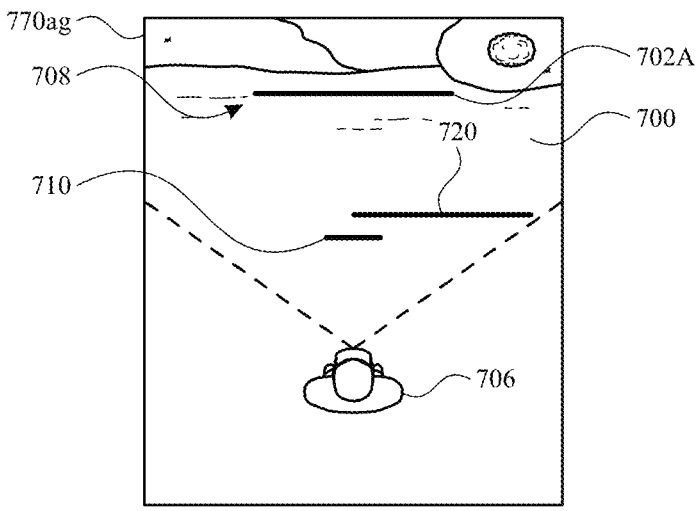
*FIG. 7AG*

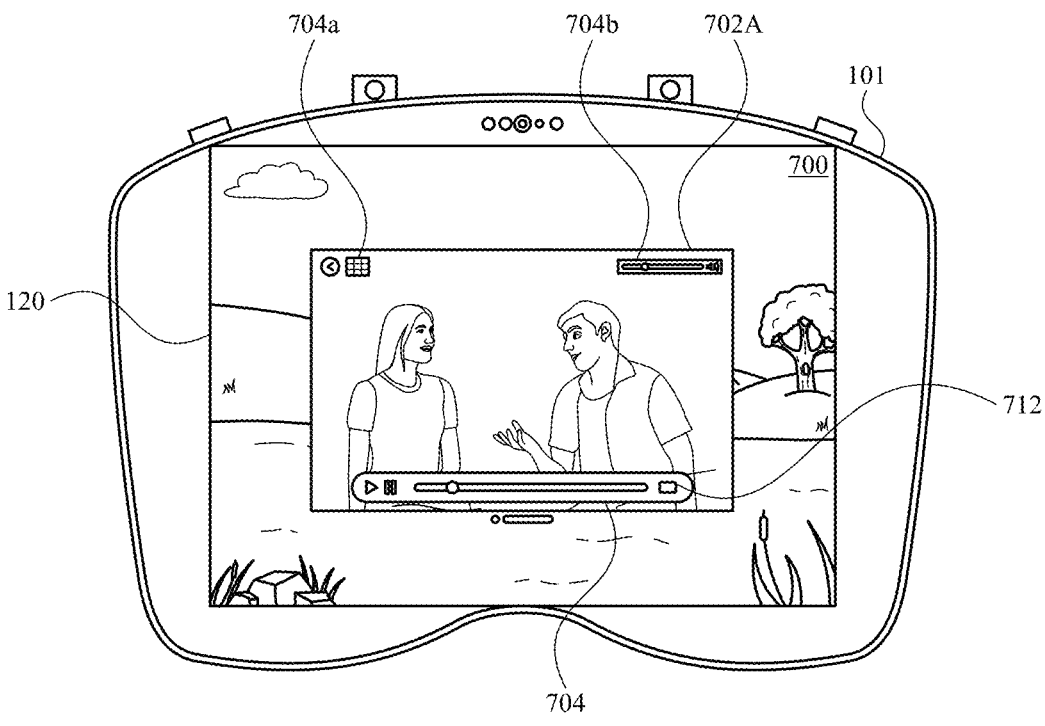
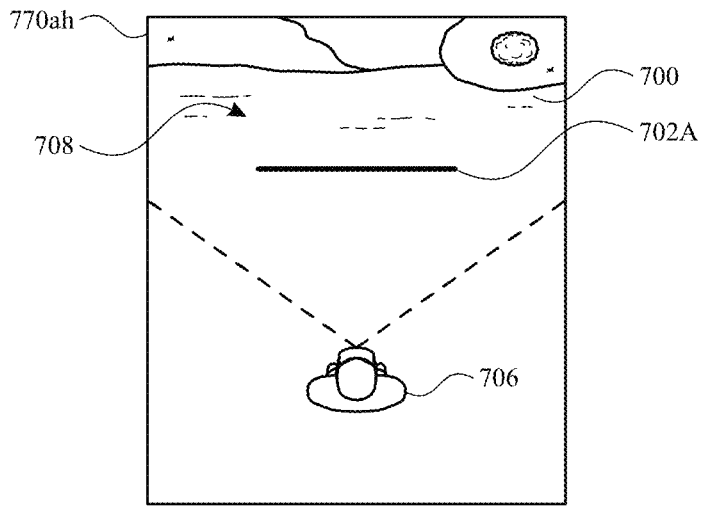
*FIG. 7AH*

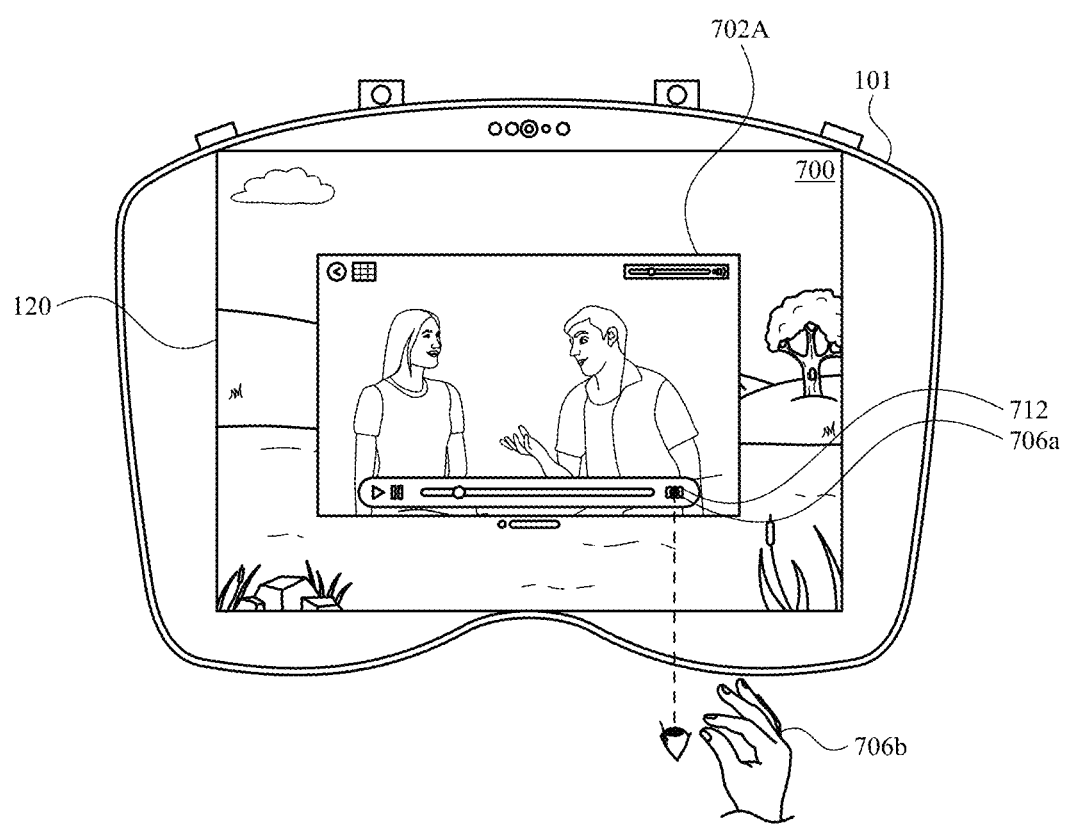
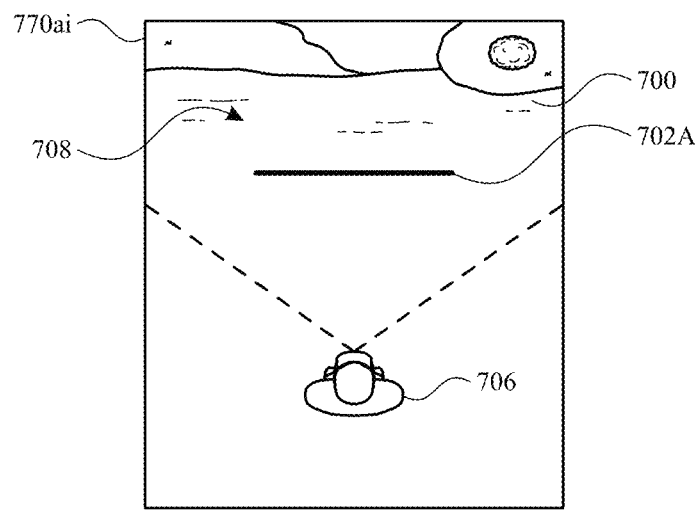
FIG. 7AI

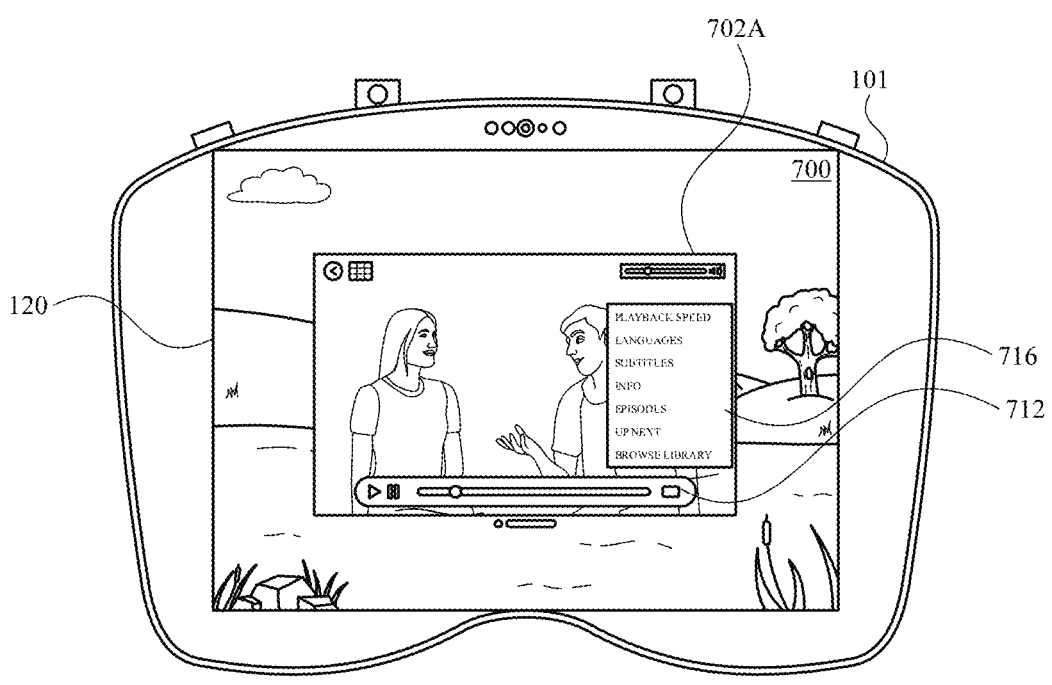
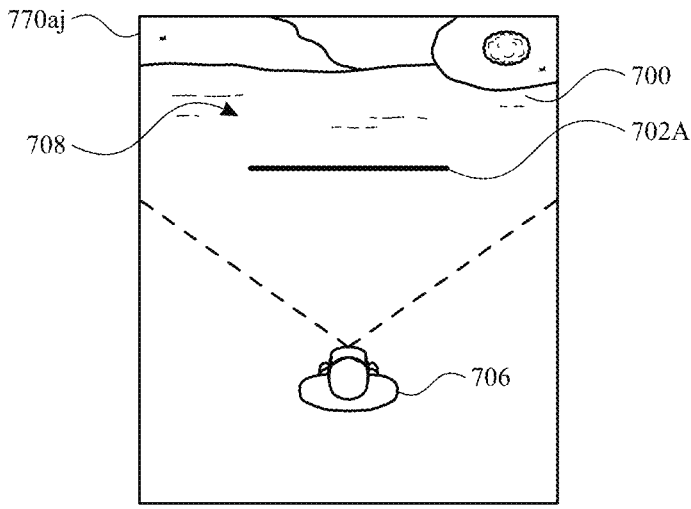
*FIG. 7AJ*

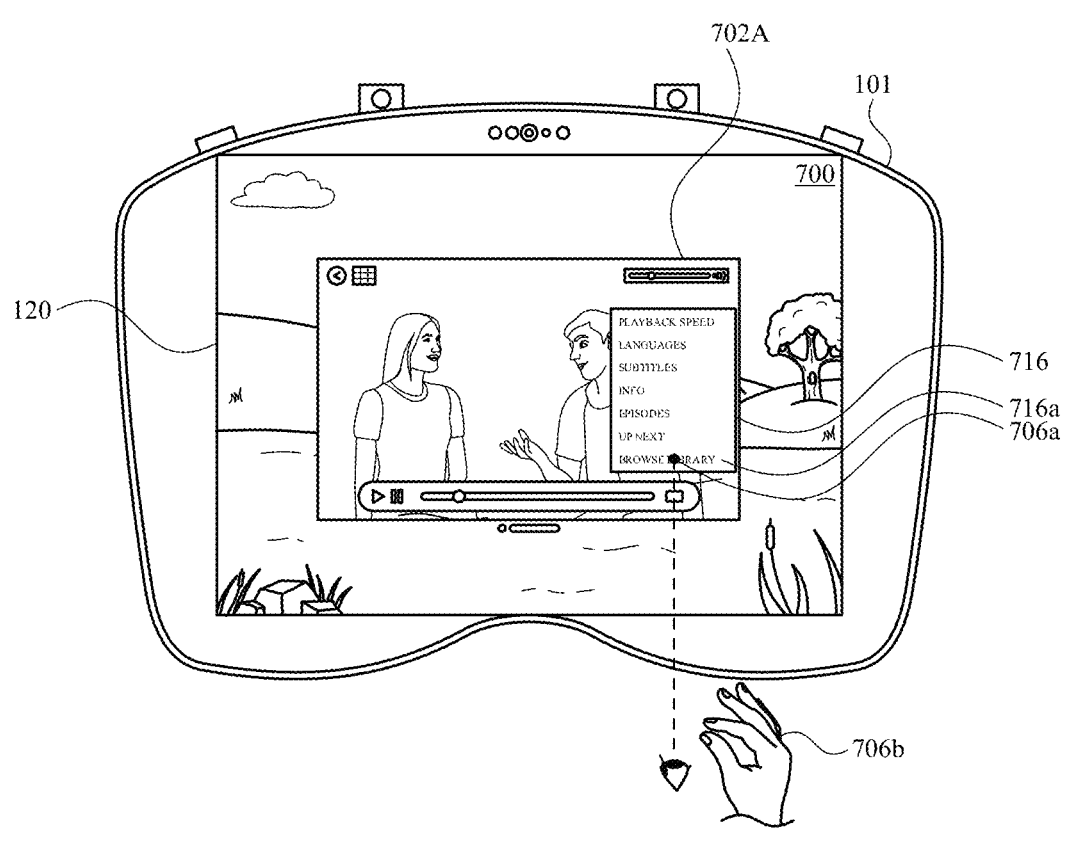
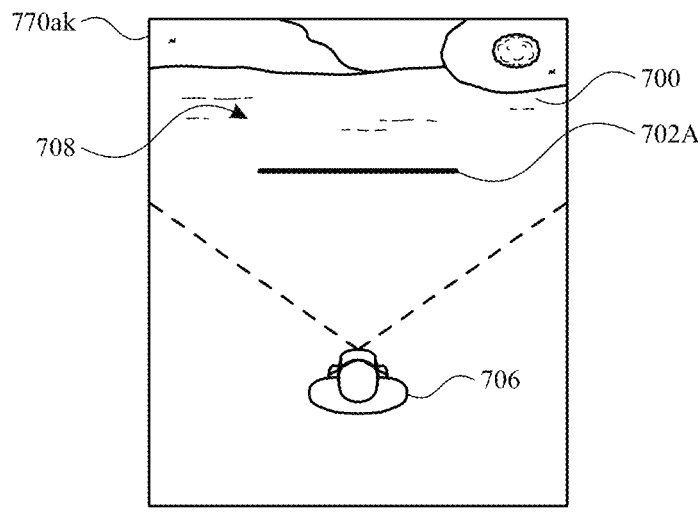
*FIG. 7AK*

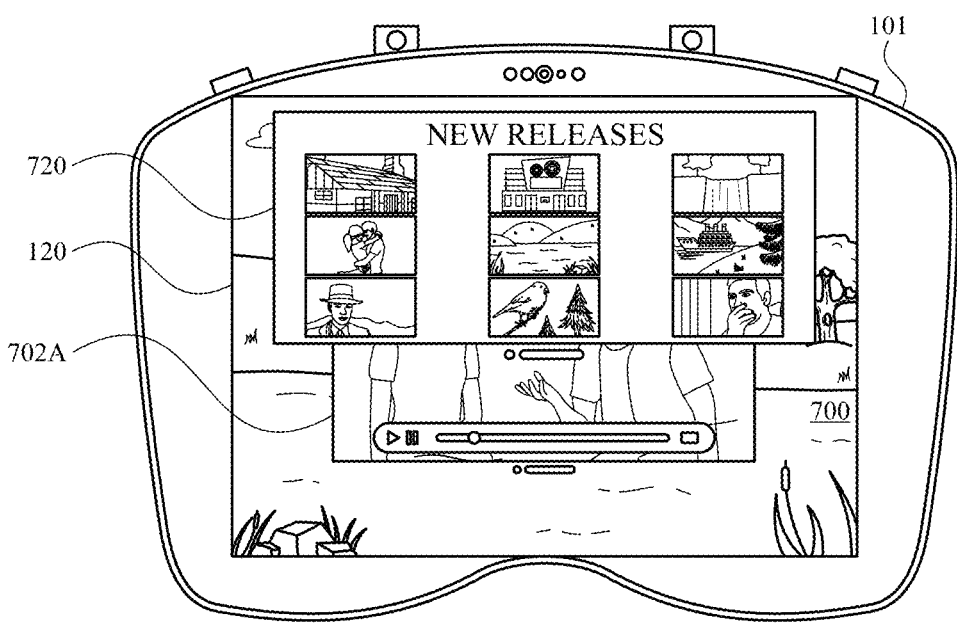
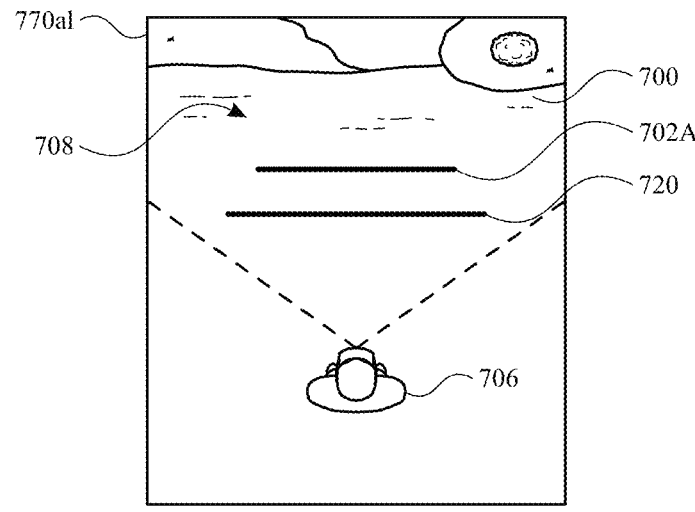
FIG. 7AL

<u>800</u>

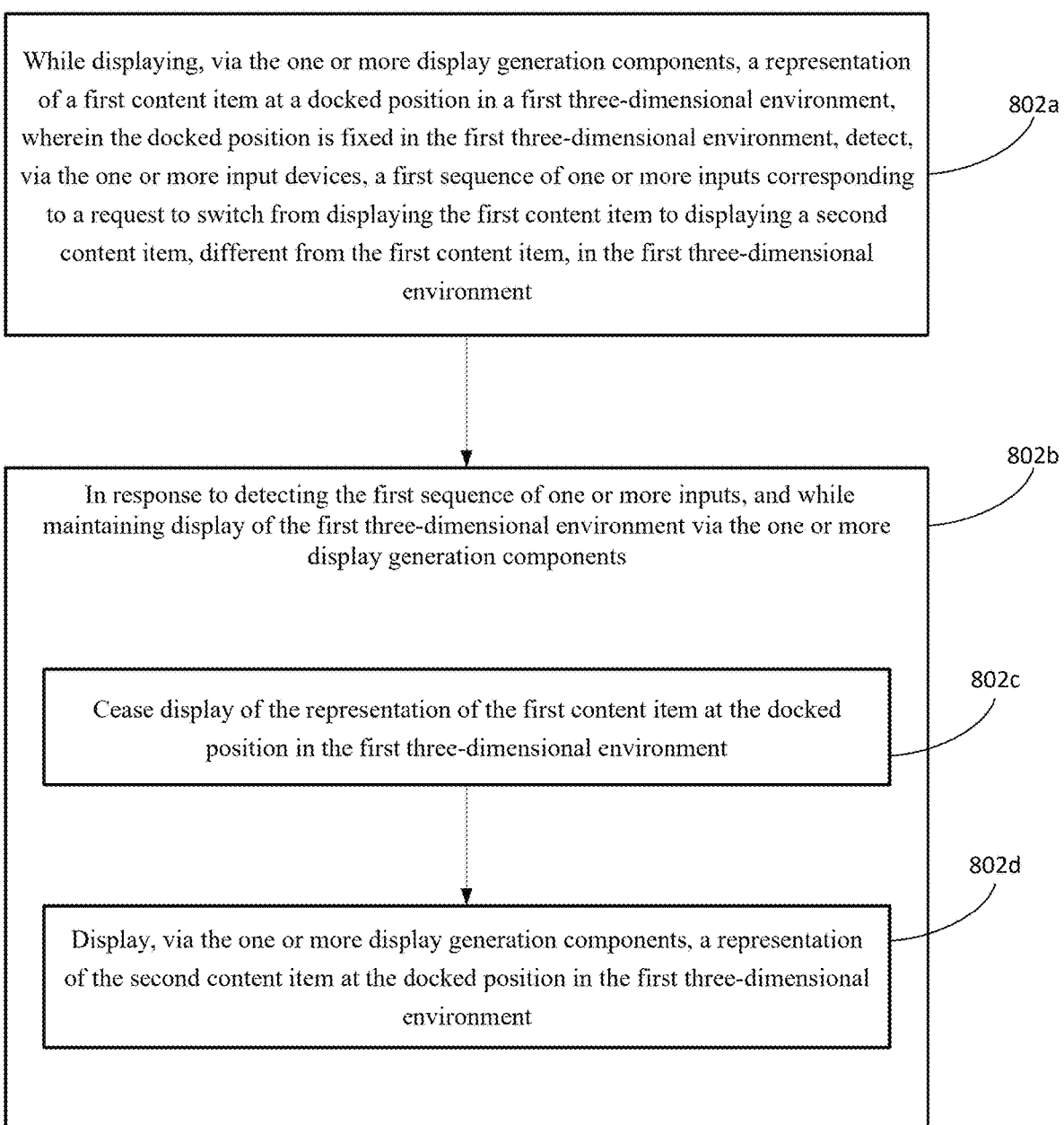

While displaying, via the one or more display generation components, a representation of a first content item at a docked position in a first three-dimensional environment, wherein the docked position is fixed in the first three-dimensional environment, detect, via the one or more input devices, a first sequence of one or more inputs corresponding to a request to switch from displaying the first content item to displaying a second content item, different from the first content item, in the first three-dimensional environment ⟋ 802a In response to detecting the first sequence of one or more inputs, and while maintaining display of the first three-dimensional environment via the one or more display generation components ⟋ 802b Cease display of the representation of the first content item at the docked position in the first three-dimensional environment ⟋ 802c Display, via the one or more display generation components, a representation of the second content item at the docked position in the first three-dimensional environment ⟋ 802d

FIG. 8

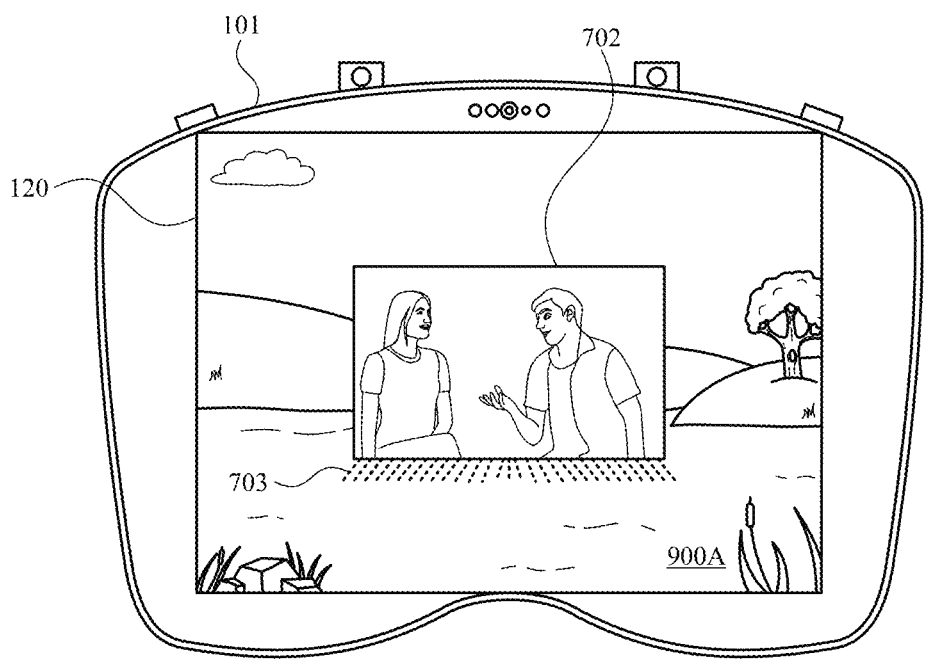
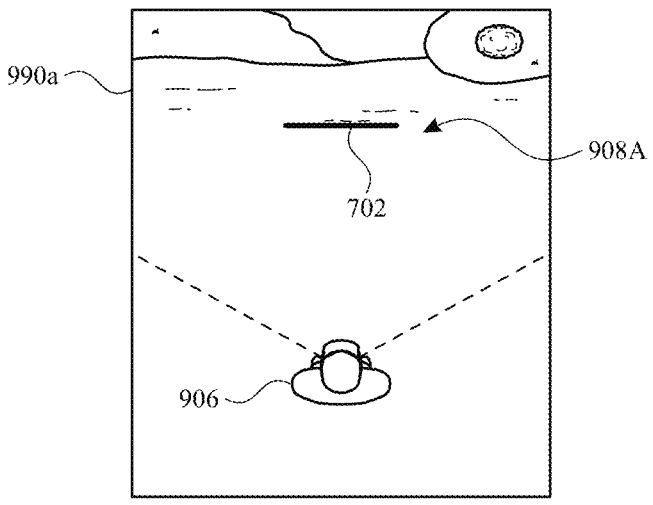
*FIG. 9A*

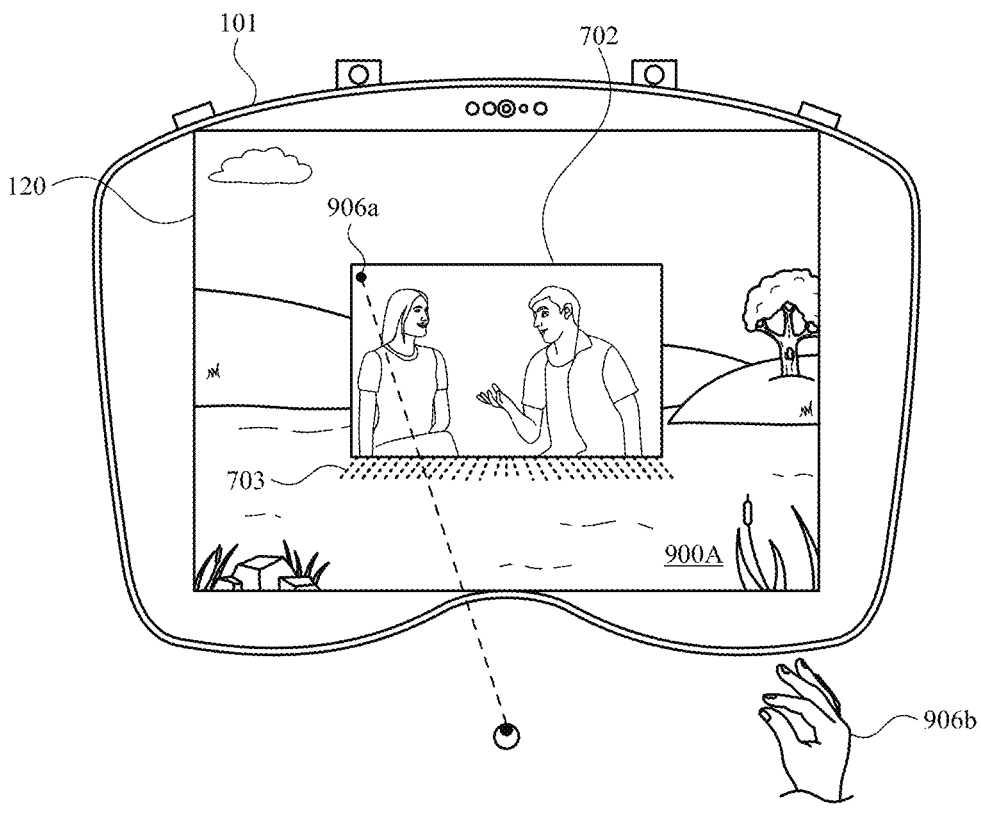
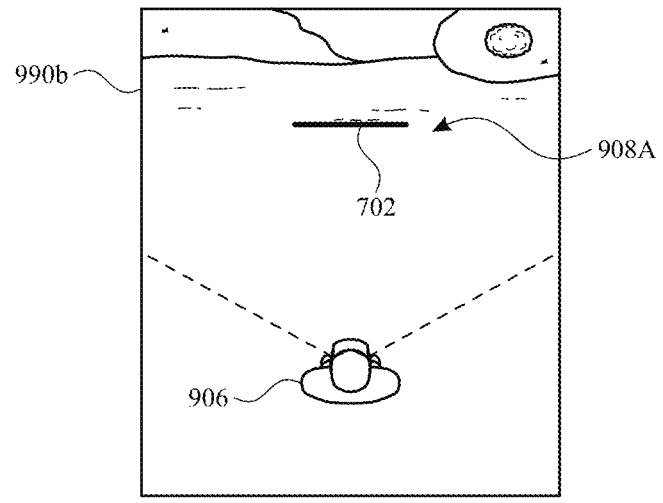
*FIG. 9B*

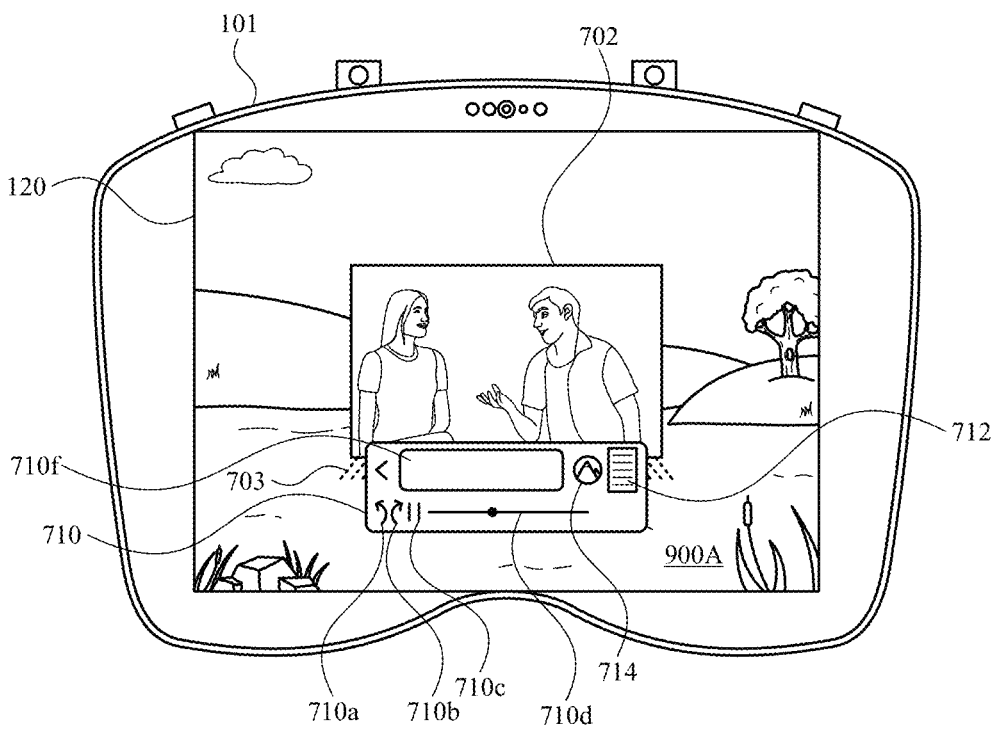
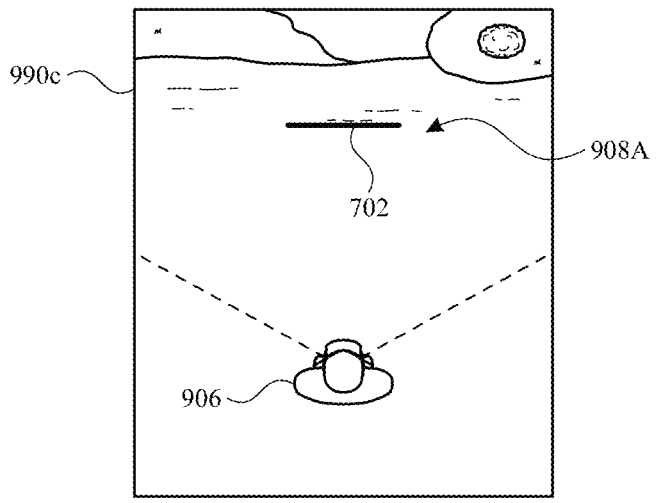
*FIG. 9C*

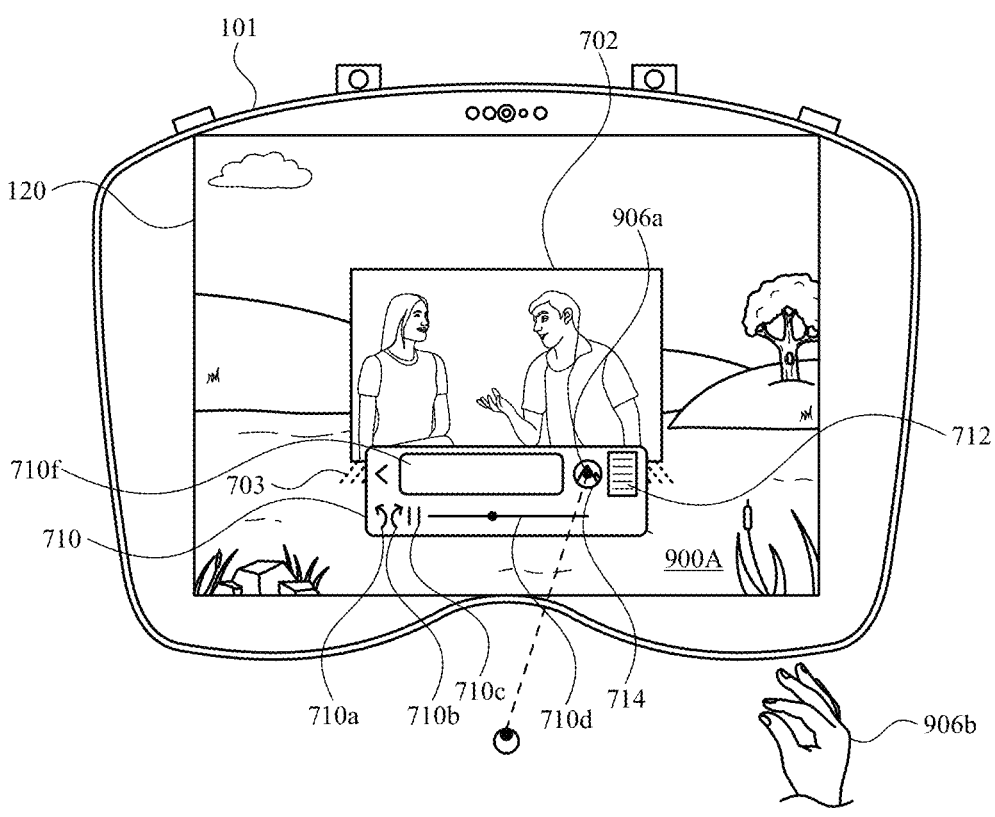
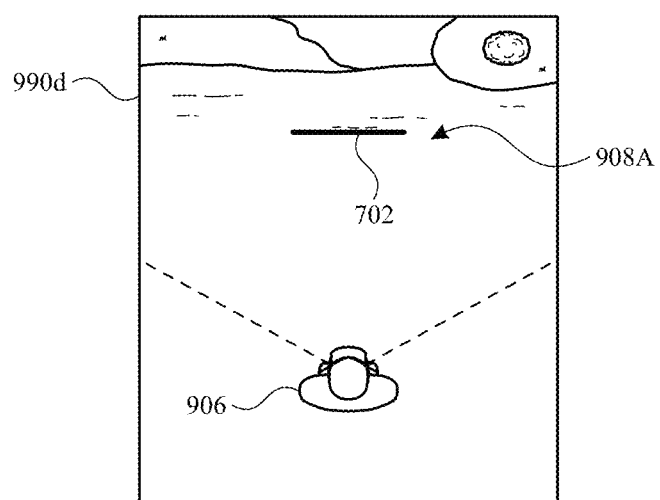
*FIG. 9D*

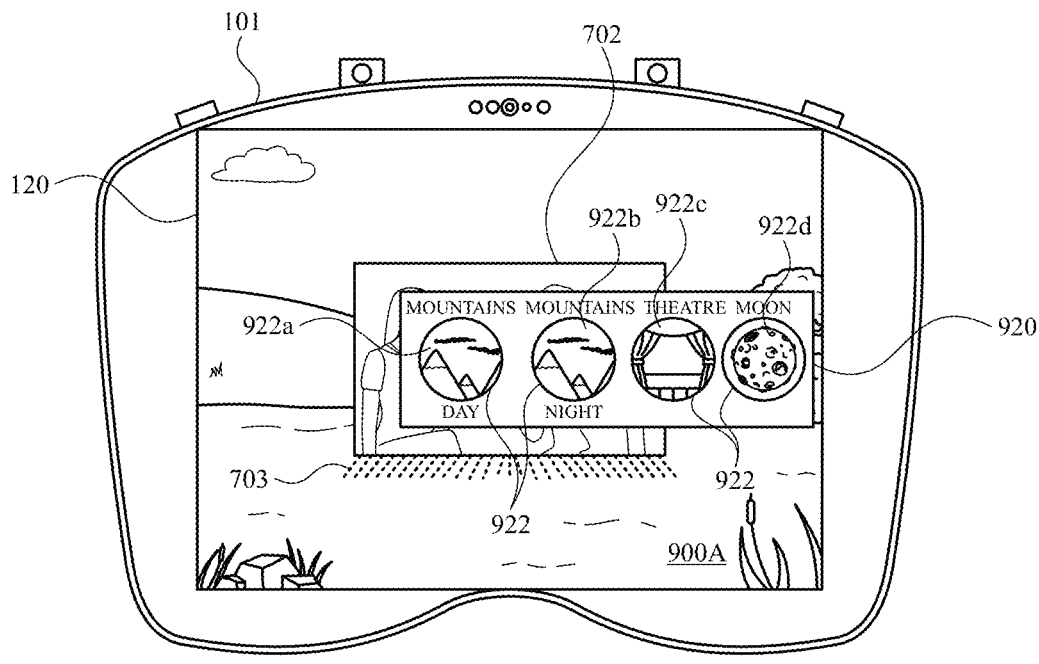
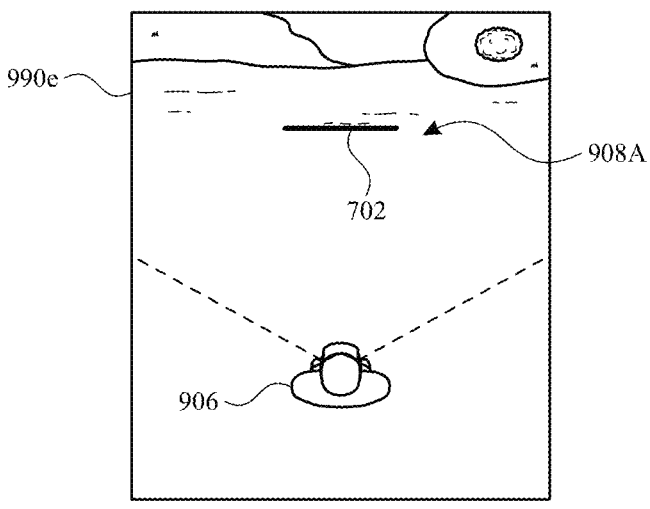
FIG. 9E

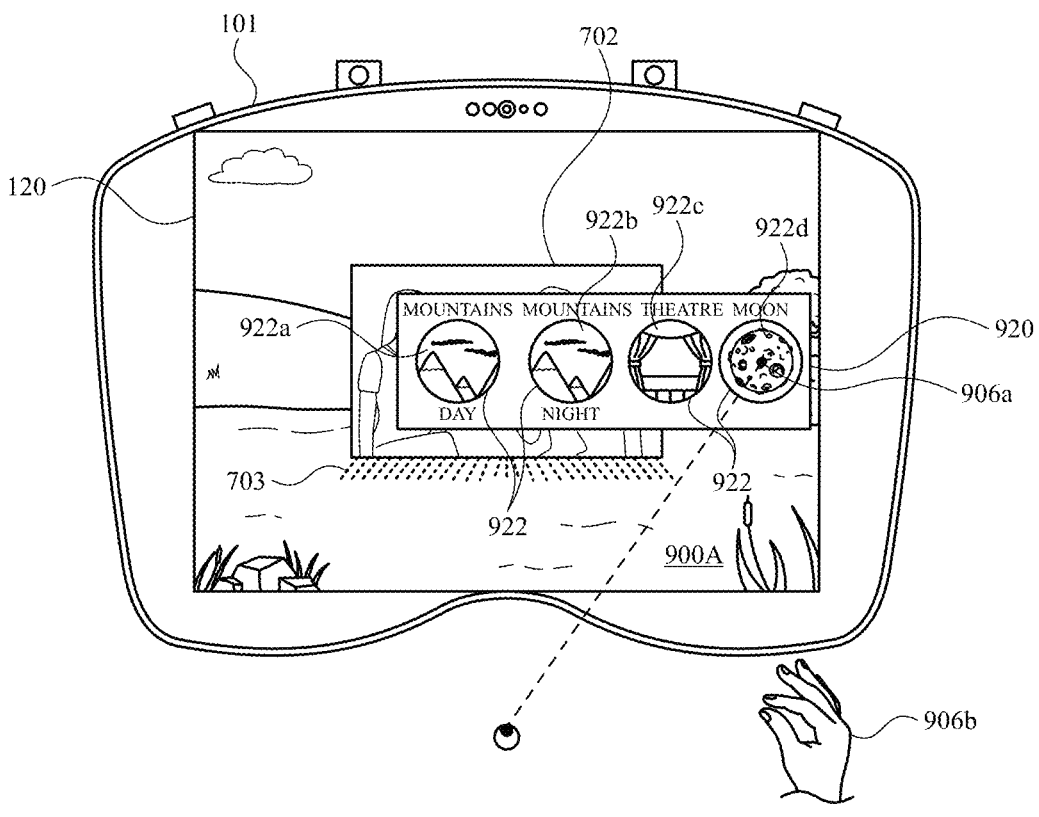
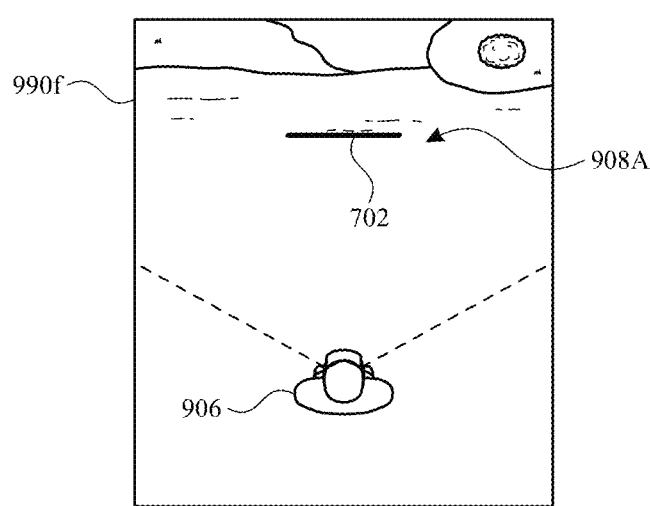
*FIG. 9F*

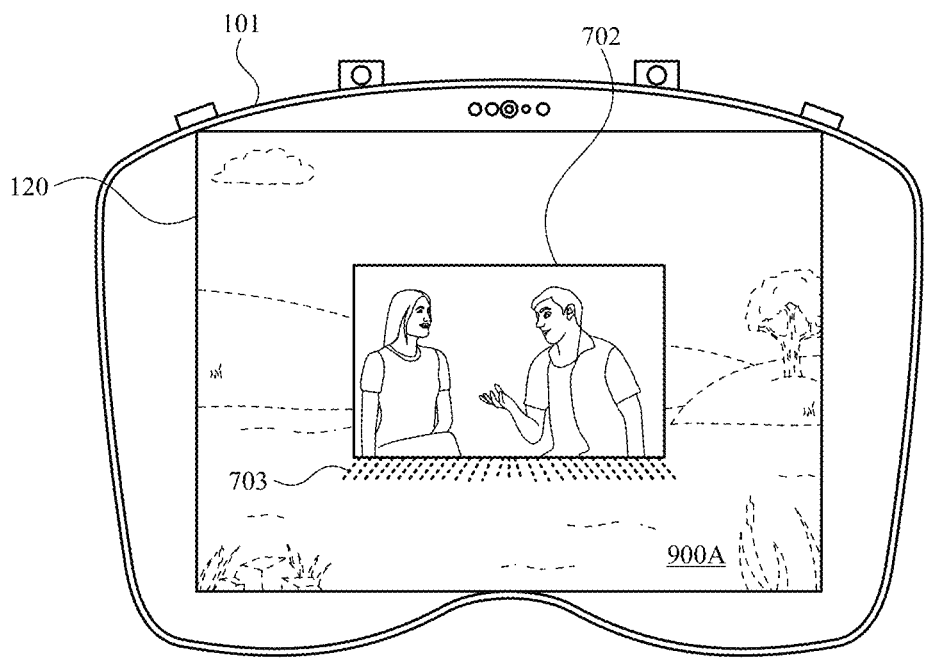
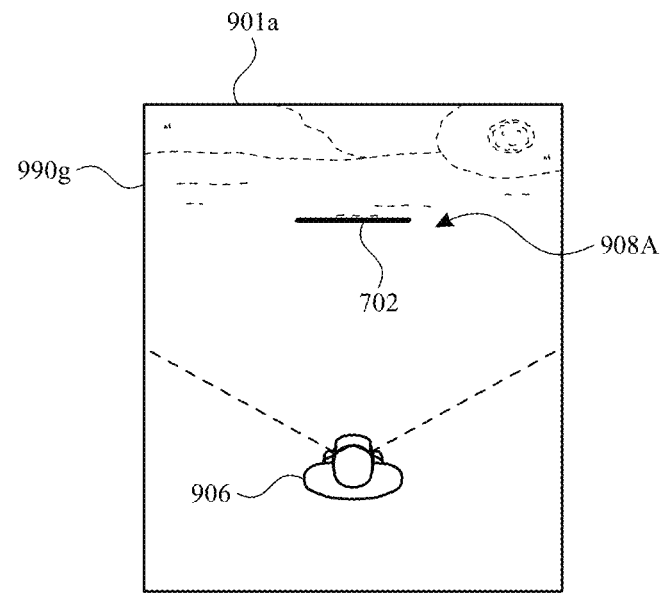
*FIG. 9G*

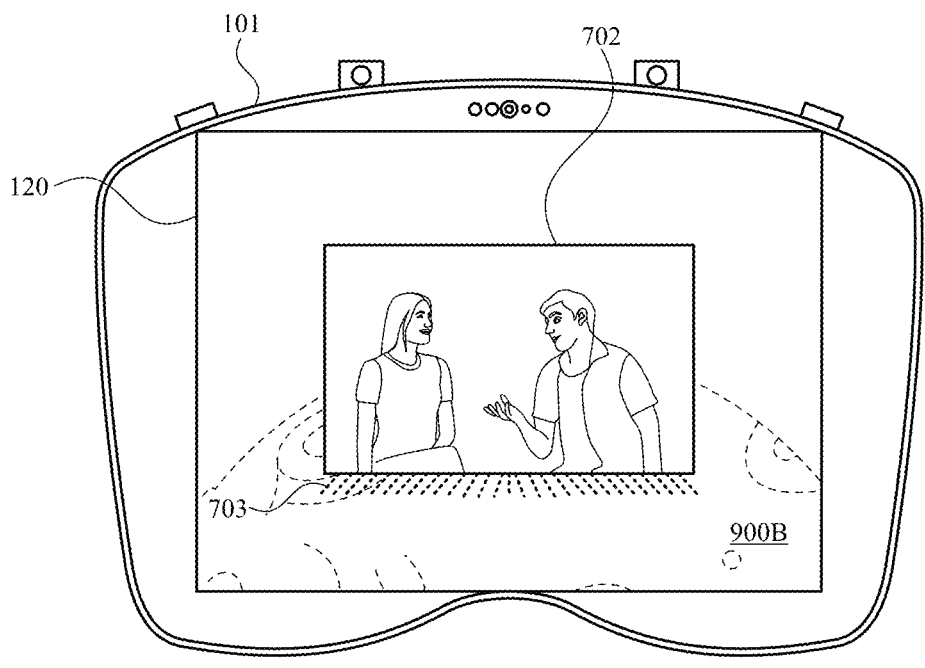
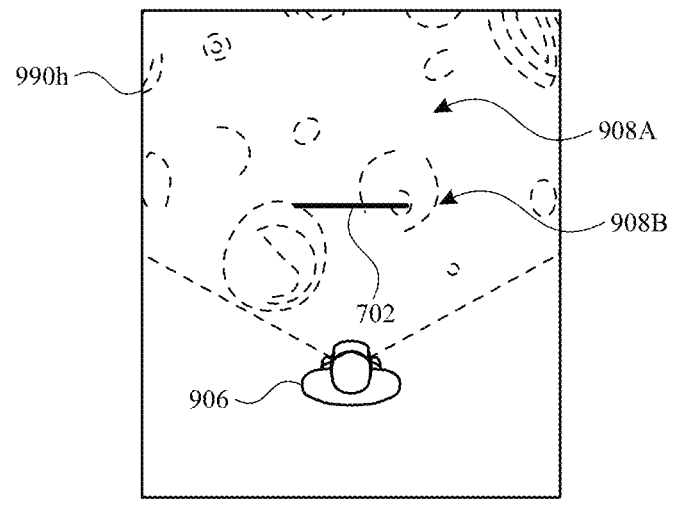
*FIG. 9H*

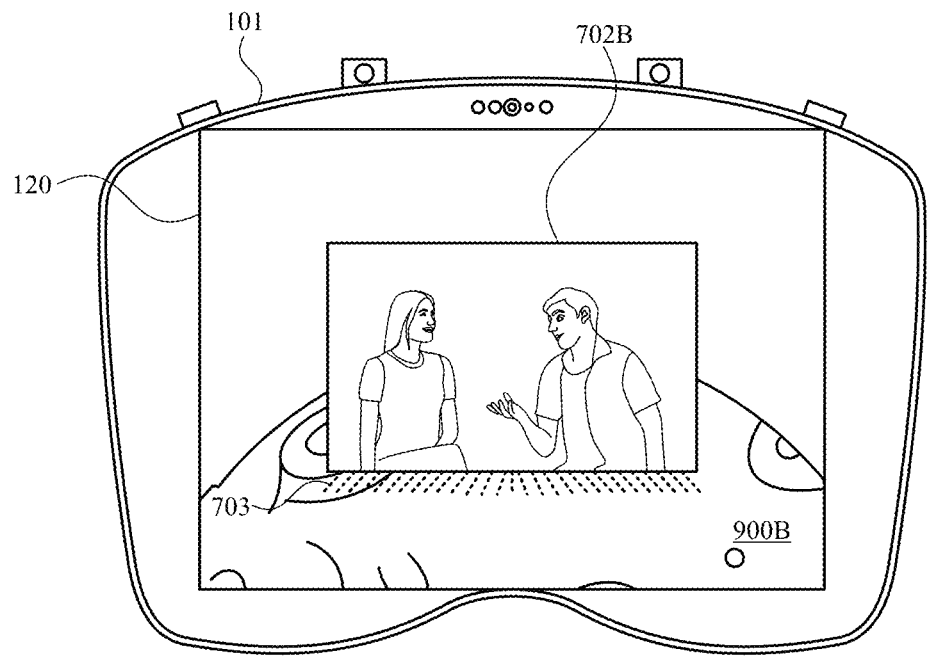
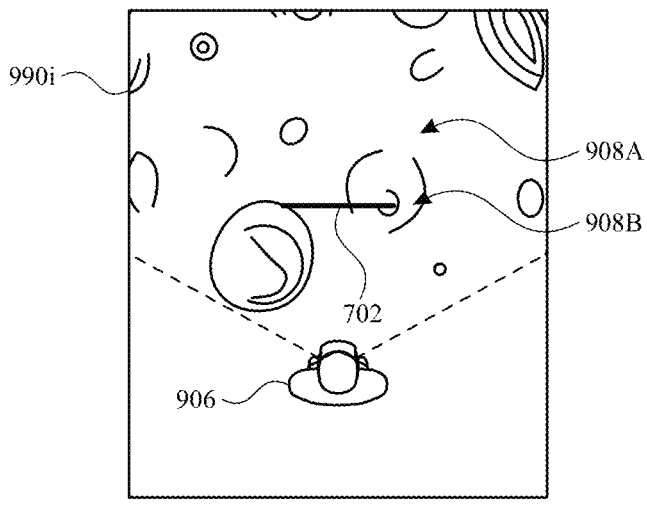
*FIG. 9I*

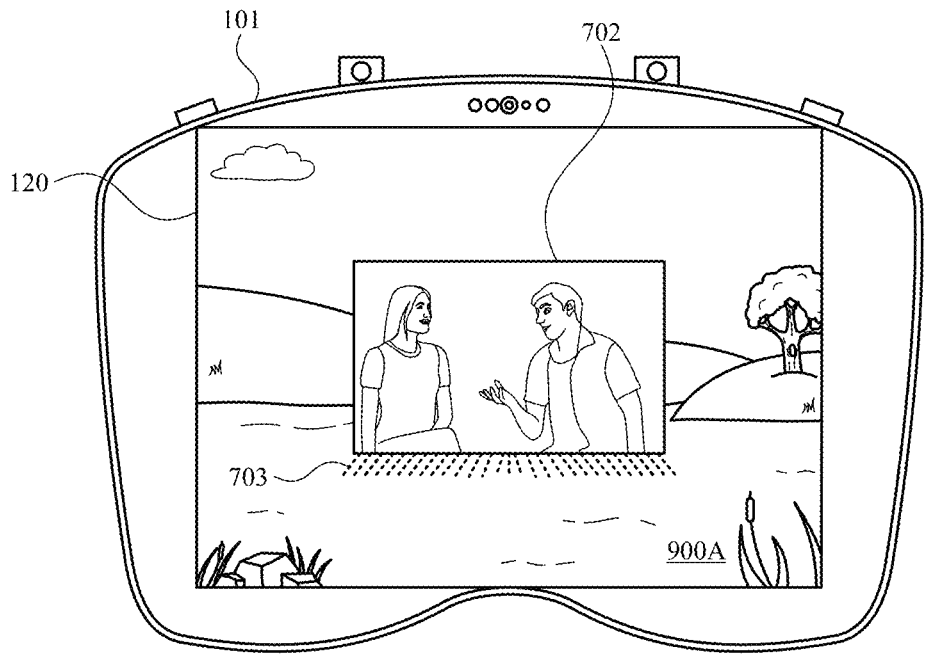
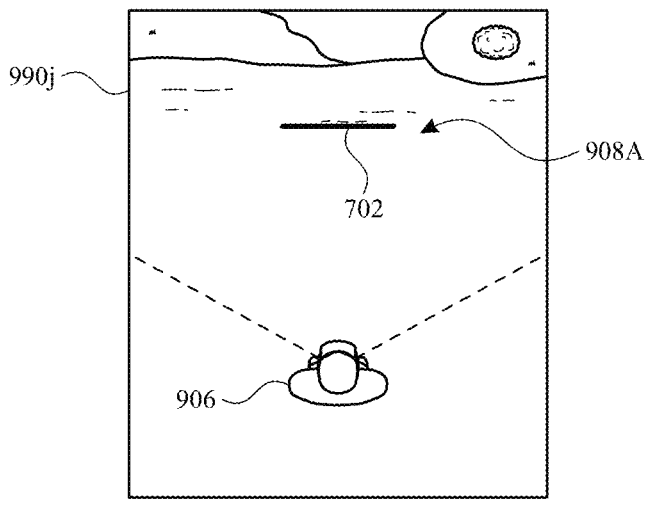
*FIG. 9J*

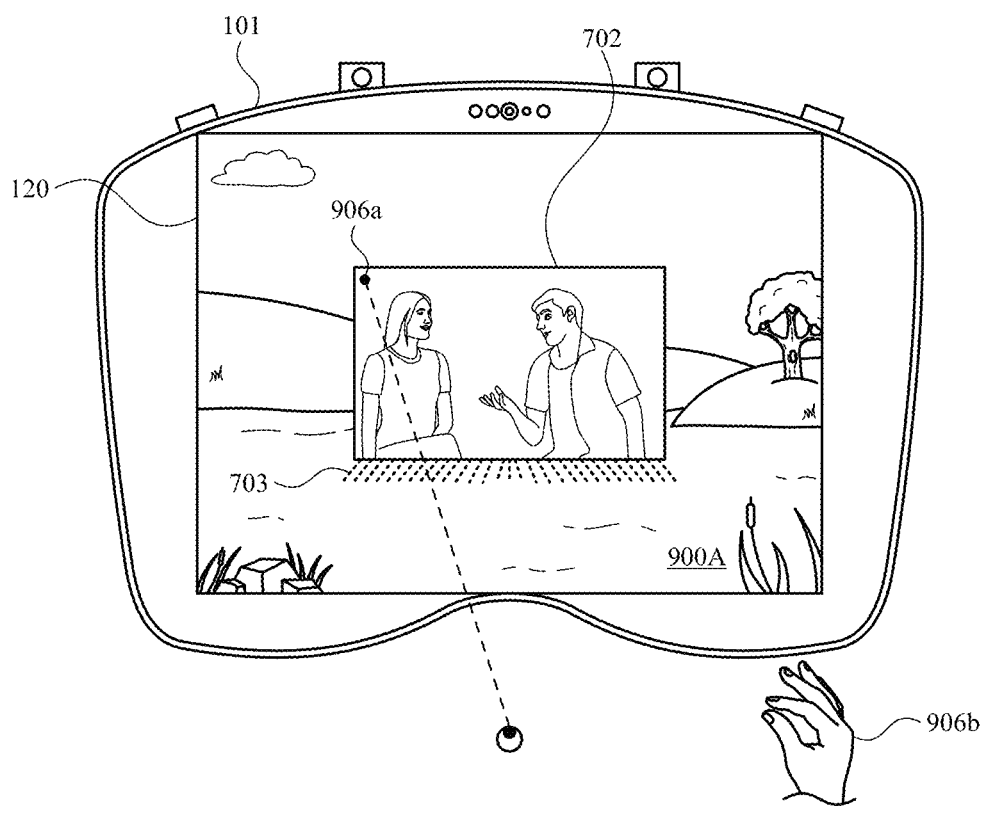
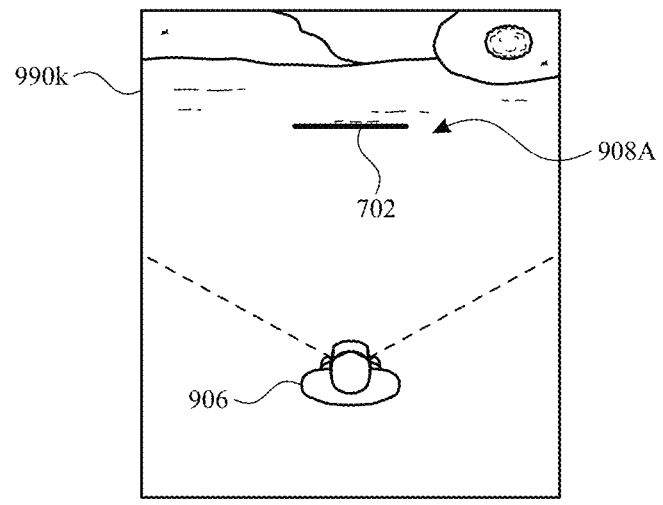
*FIG. 9K*

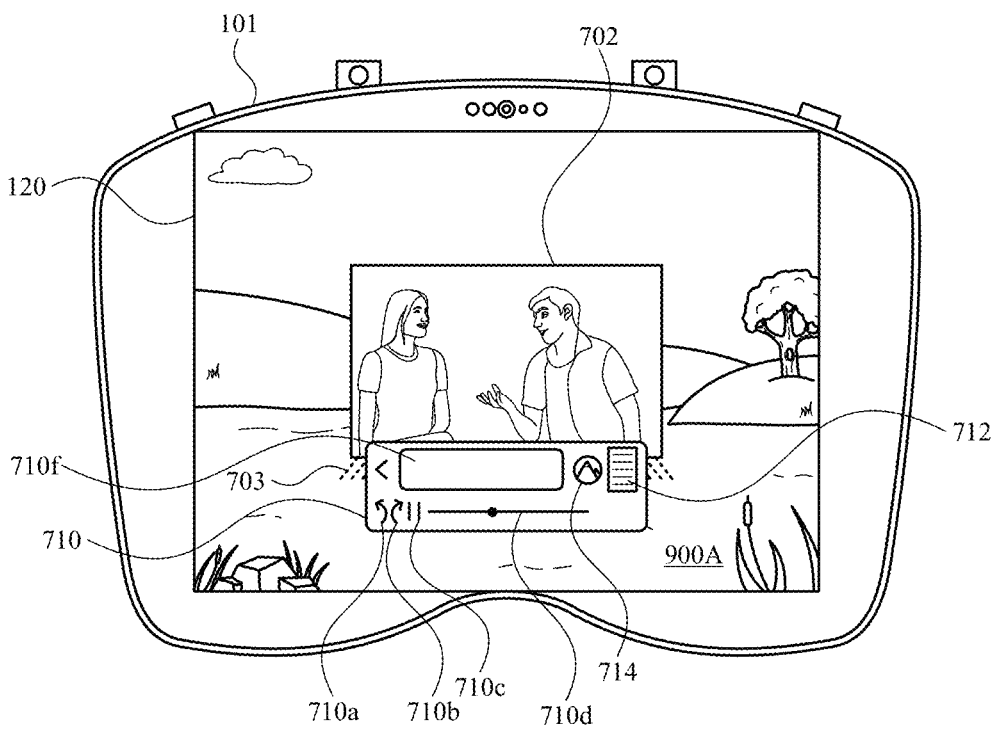
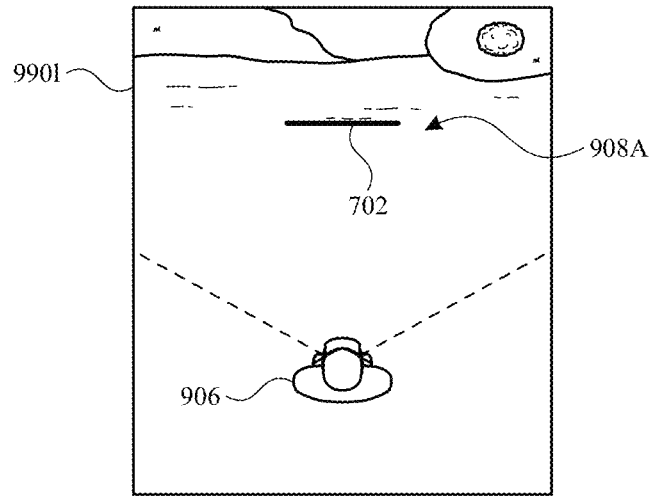
*FIG. 9L*

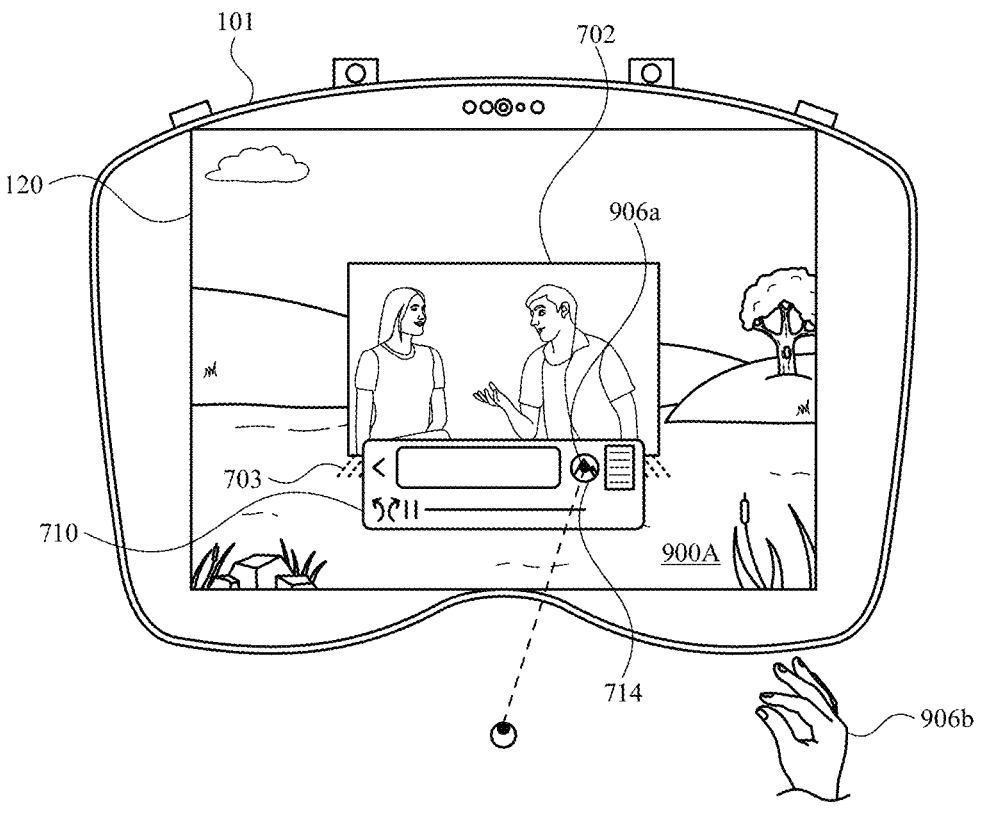
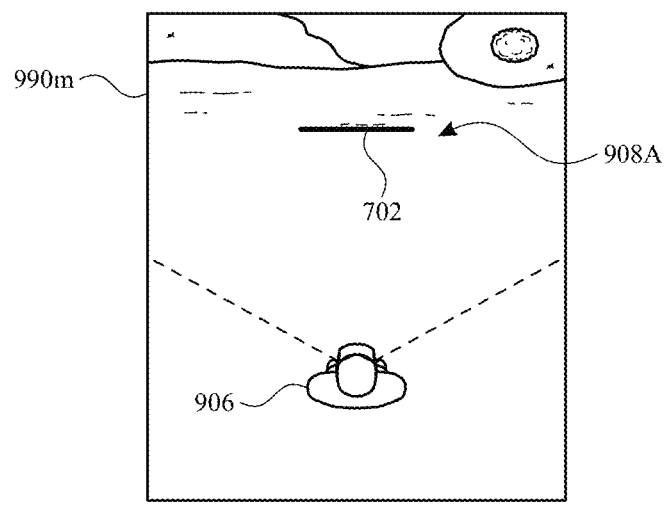
*FIG. 9M*

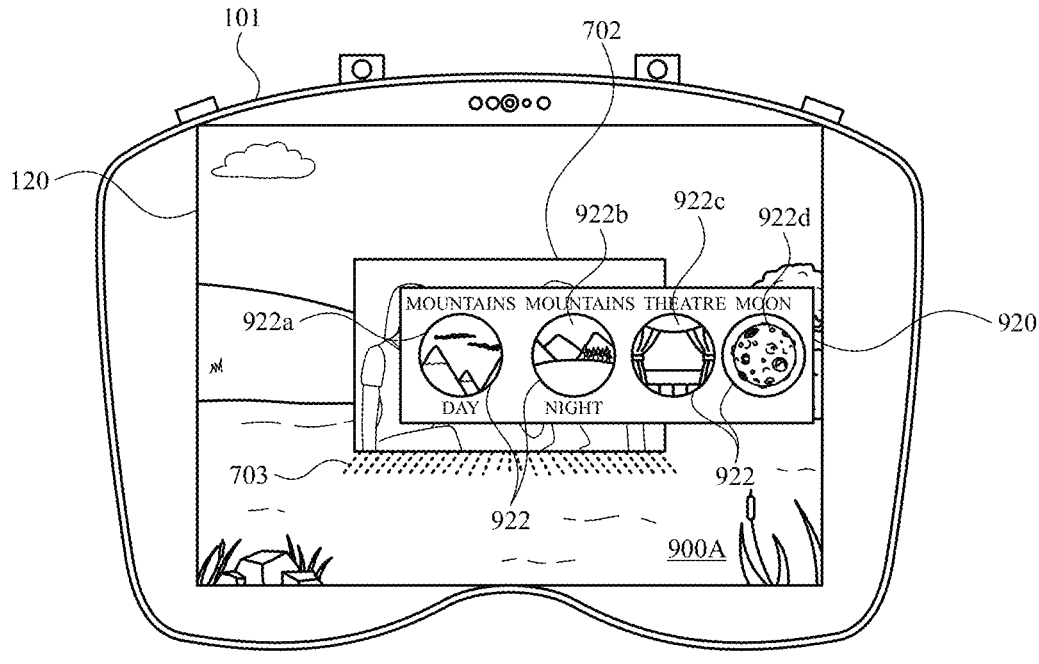
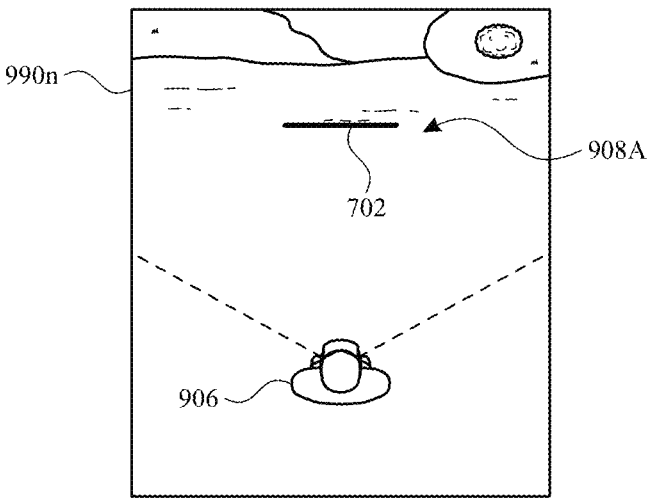
*FIG. 9N*

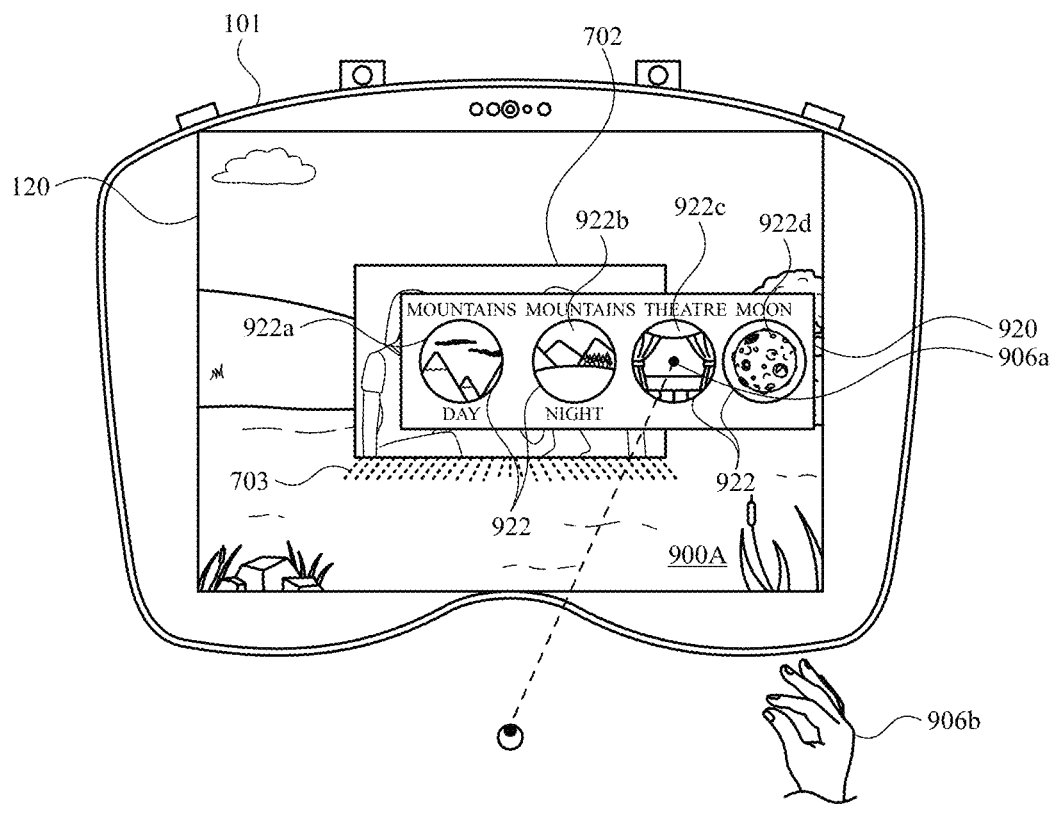
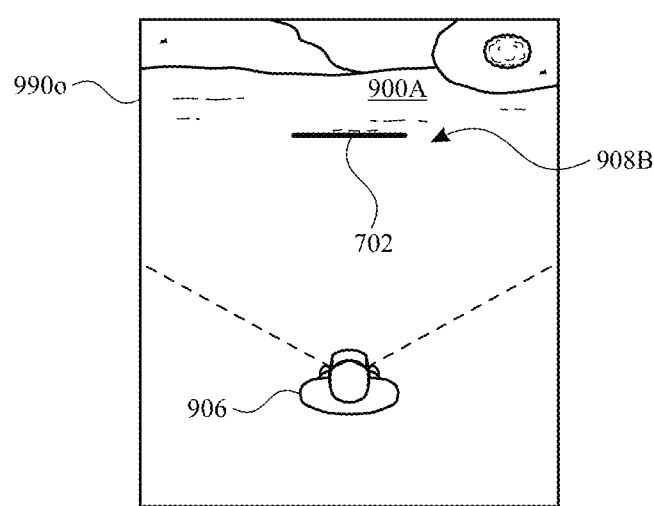
FIG. 9O

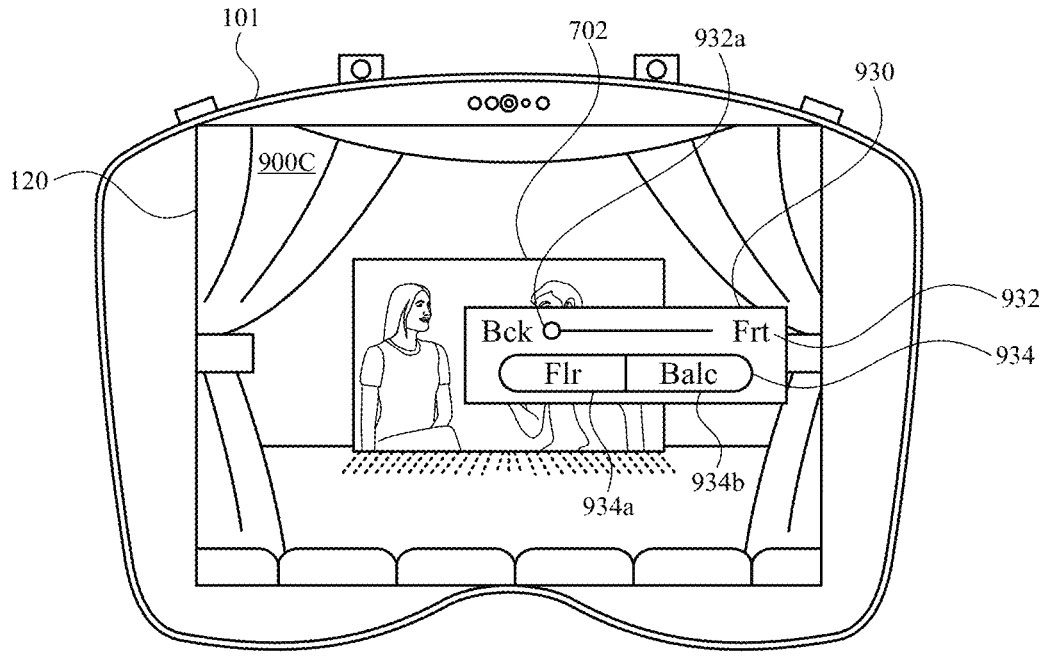
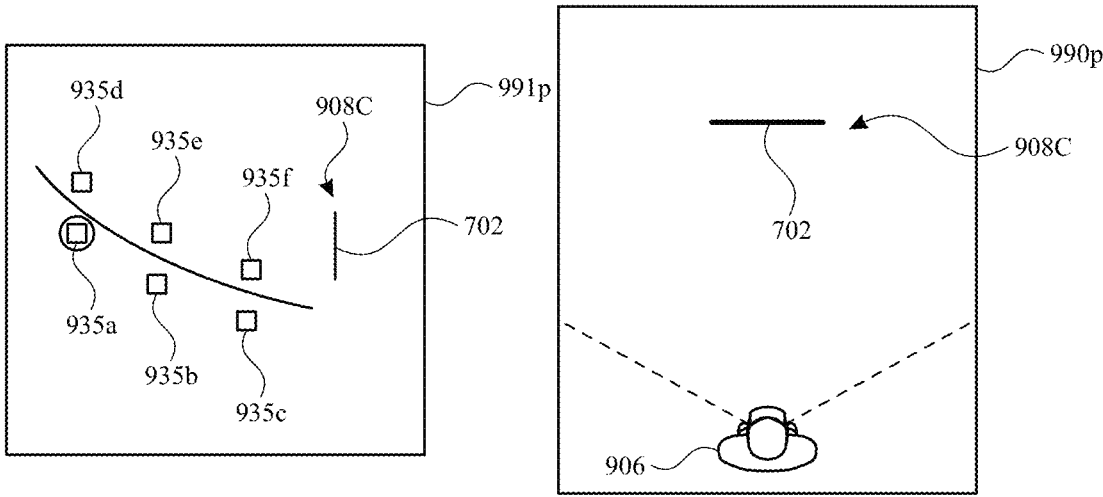
*FIG. 9P*

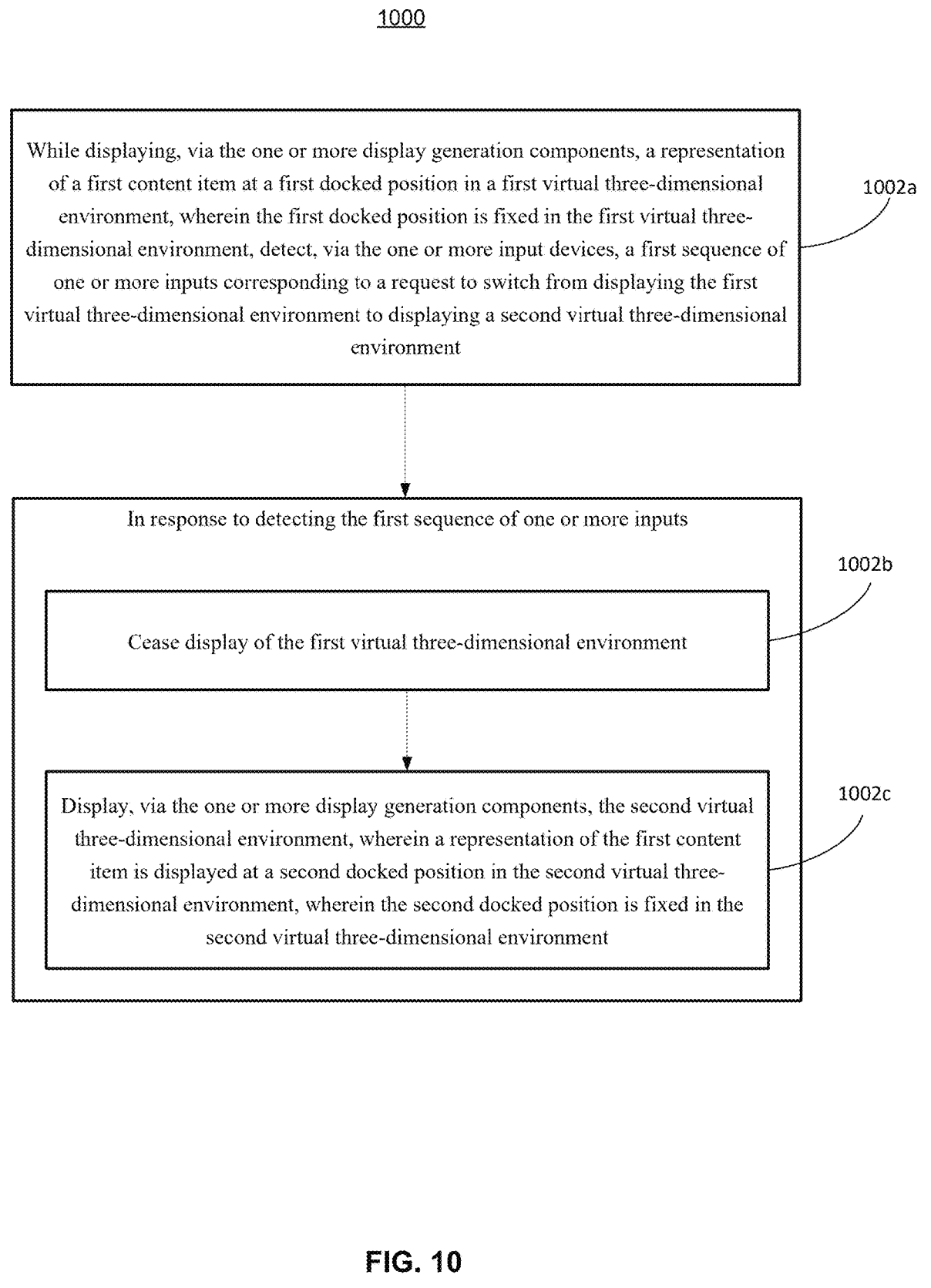

1000

While displaying, via the one or more display generation components, a representation of a first content item at a first docked position in a first virtual three-dimensional environment, wherein the first docked position is fixed in the first virtual three-dimensional environment, detect, via the one or more input devices, a first sequence of one or more inputs corresponding to a request to switch from displaying the first virtual three-dimensional environment to displaying a second virtual three-dimensional environment 1002a In response to detecting the first sequence of one or more inputs 1002b Cease display of the first virtual three-dimensional environment Display, via the one or more display generation components, the second virtual three-dimensional environment, wherein a representation of the first content item is displayed at a second docked position in the second virtual three-dimensional environment, wherein the second docked position is fixed in the second virtual three-dimensional environment 1002c

FIG. 10

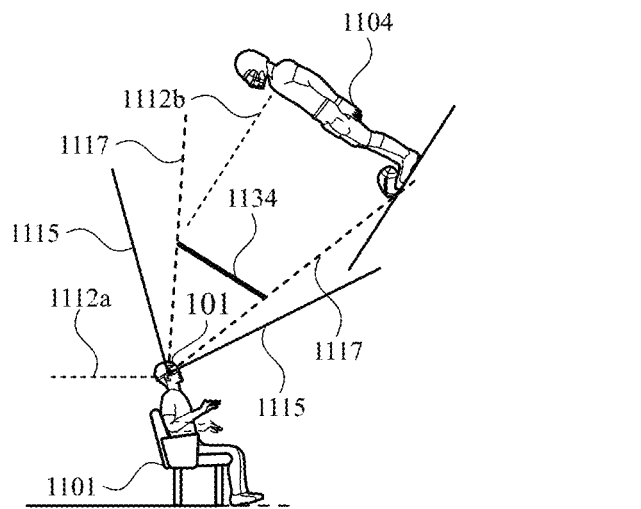
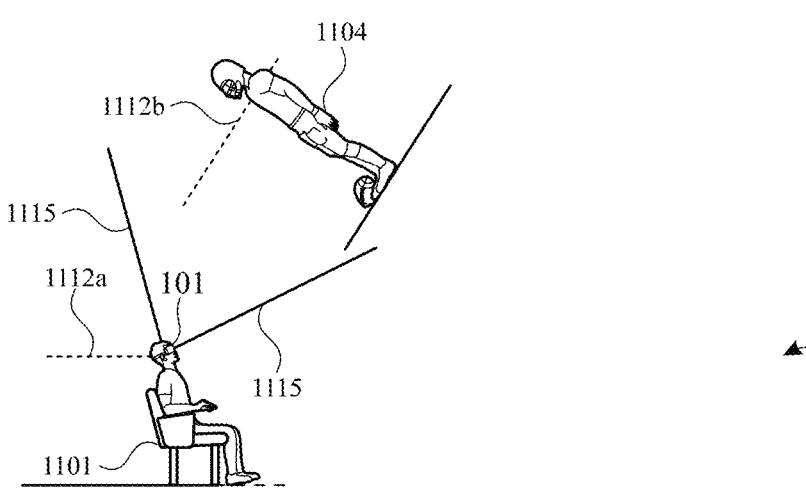
*FIG. 11AM*

Figure 12:
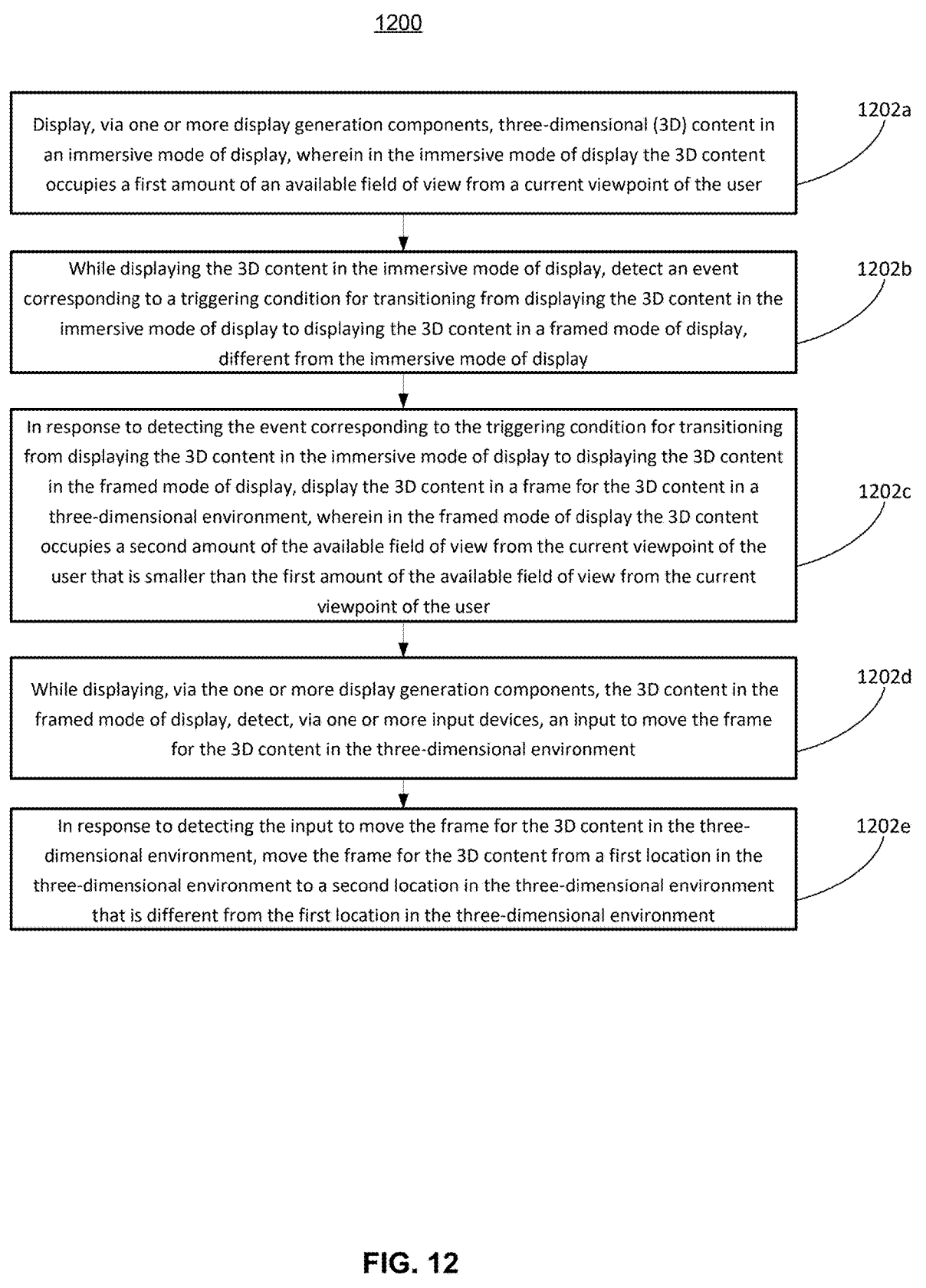

1200

| | |
|---|---|
| Display, via one or more display generation components, three-dimensional (3D) content in an immersive mode of display, wherein in the immersive mode of display the 3D content occupies a first amount of an available field of view from a current viewpoint of the user | 1202a |

↓

| | |
|---|---|
| While displaying the 3D content in the immersive mode of display, detect an event corresponding to a triggering condition for transitioning from displaying the 3D content in the immersive mode of display to displaying the 3D content in a framed mode of display, different from the immersive mode of display | 1202b |

↓

| | |
|---|---|
| In response to detecting the event corresponding to the triggering condition for transitioning from displaying the 3D content in the immersive mode of display to displaying the 3D content in the framed mode of display, display the 3D content in a frame for the 3D content in a three-dimensional environment, wherein in the framed mode of display the 3D content occupies a second amount of the available field of view from the current viewpoint of the user that is smaller than the first amount of the available field of view from the current viewpoint of the user | 1202c |

↓

| | |
|---|---|
| While displaying, via the one or more display generation components, the 3D content in the framed mode of display, detect, via one or more input devices, an input to move the frame for the 3D content in the three-dimensional environment | 1202d |

↓

| | |
|---|---|
| In response to detecting the input to move the frame for the 3D content in the three-dimensional environment, move the frame for the 3D content from a first location in the three-dimensional environment to a second location in the three-dimensional environment that is different from the first location in the three-dimensional environment | 1202e |

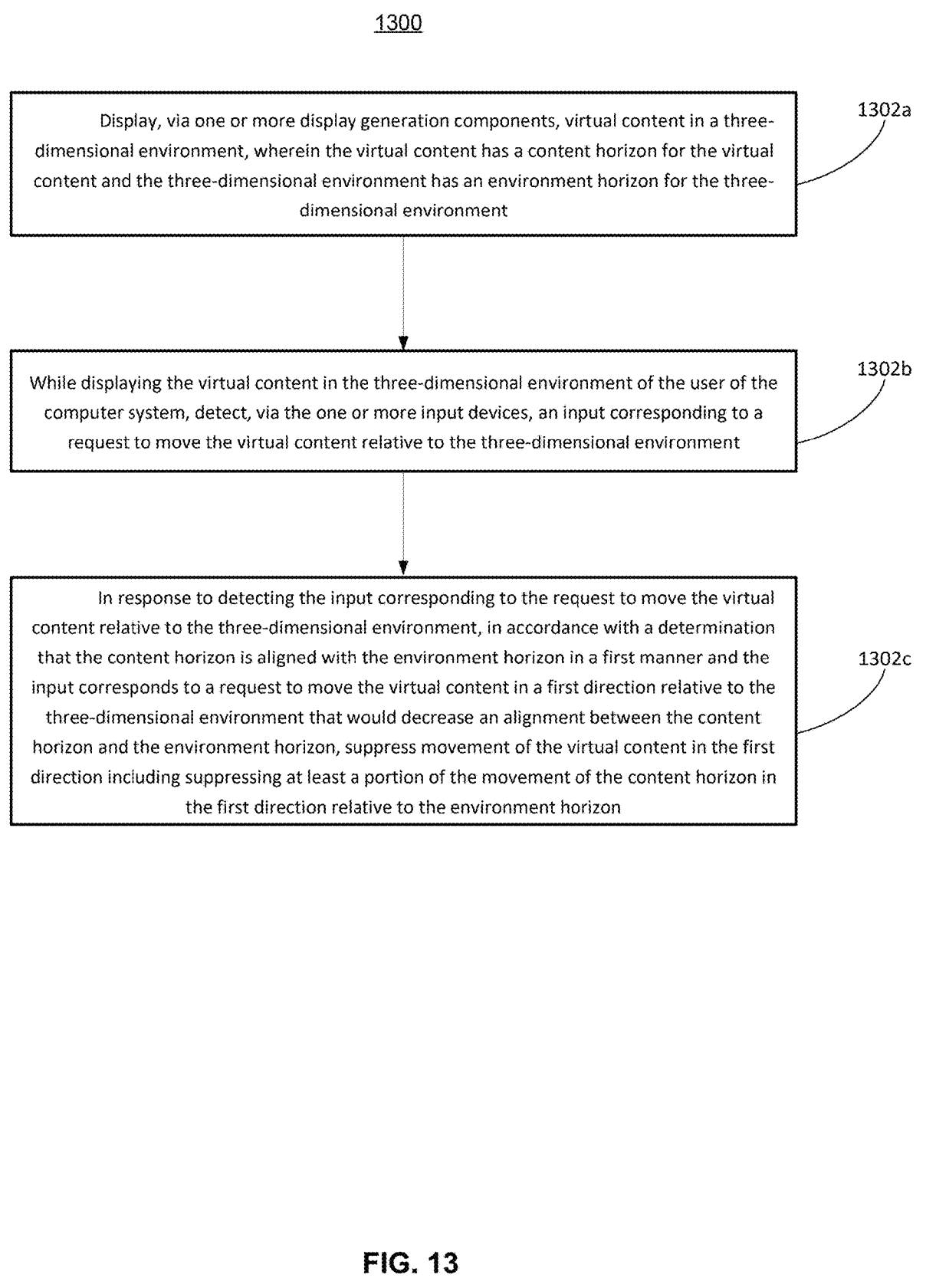

Display, via one or more display generation components, virtual content in a three-dimensional environment, wherein the virtual content has a content horizon for the virtual content and the three-dimensional environment has an environment horizon for the three-dimensional environment 1302a While displaying the virtual content in the three-dimensional environment of the user of the computer system, detect, via the one or more input devices, an input corresponding to a request to move the virtual content relative to the three-dimensional environment 1302b In response to detecting the input corresponding to the request to move the virtual content relative to the three-dimensional environment, in accordance with a determination that the content horizon is aligned with the environment horizon in a first manner and the input corresponds to a request to move the virtual content in a first direction relative to the three-dimensional environment that would decrease an alignment between the content horizon and the environment horizon, suppress movement of the virtual content in the first direction including suppressing at least a portion of the movement of the content horizon in the first direction relative to the environment horizon 1302c

FIG. 13

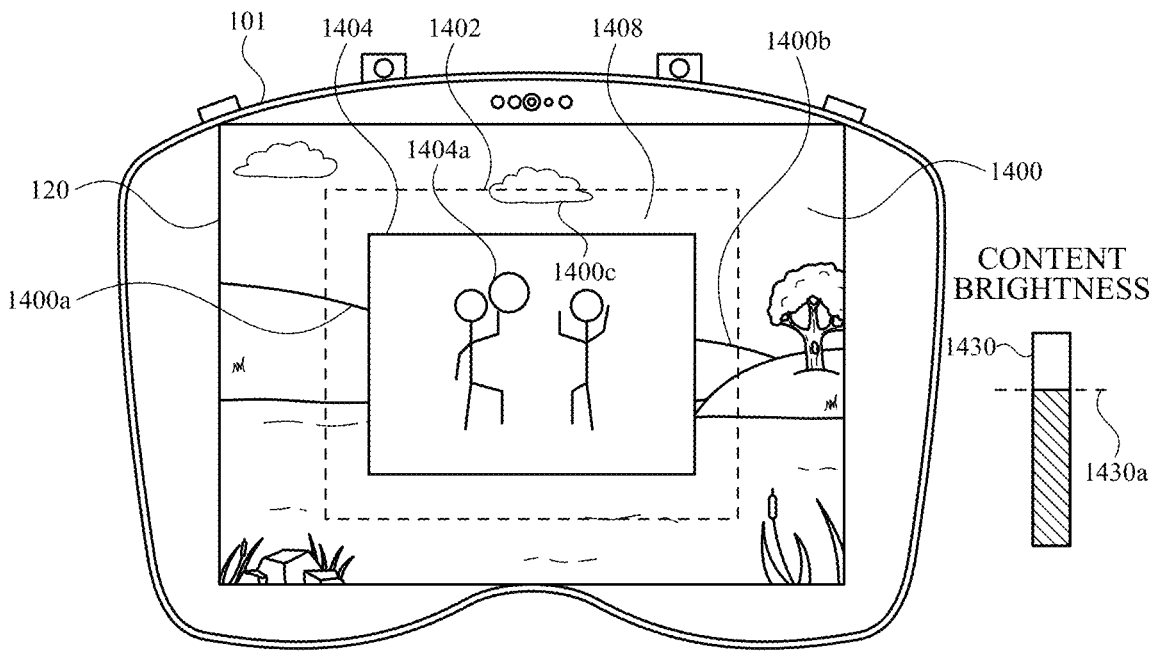
CONTENT
BRIGHTNESS
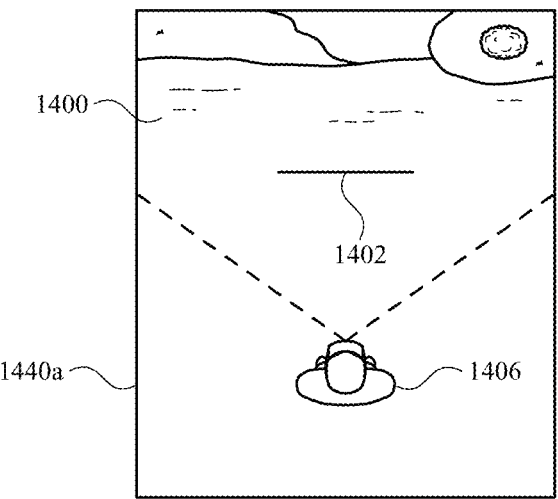
*FIG. 14A*

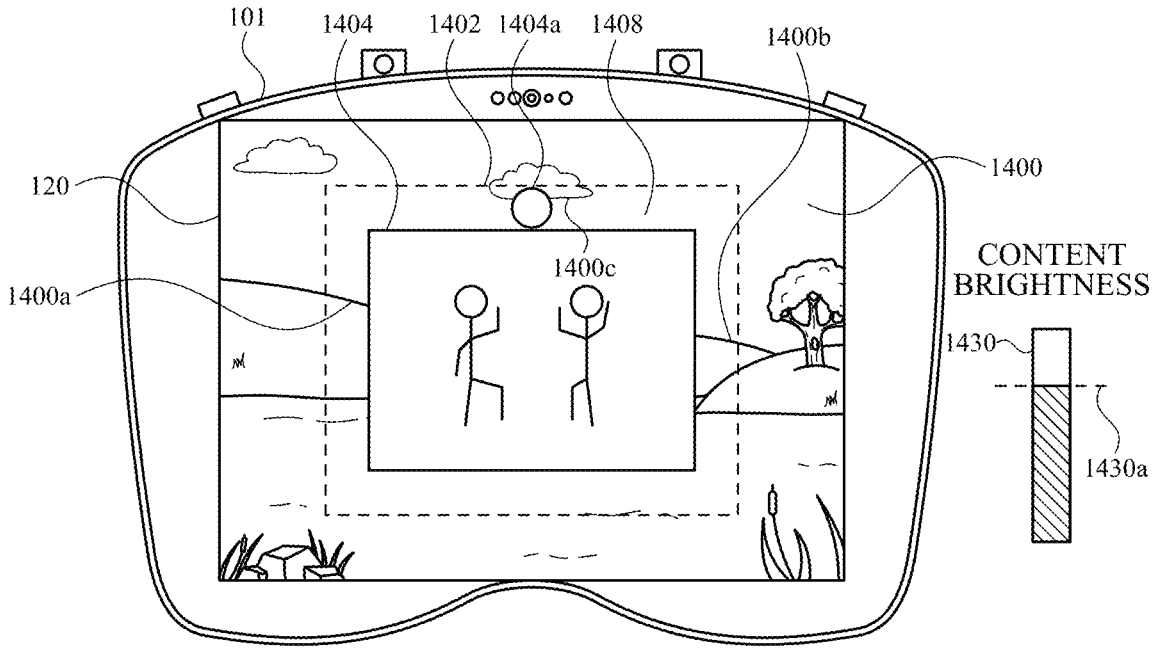
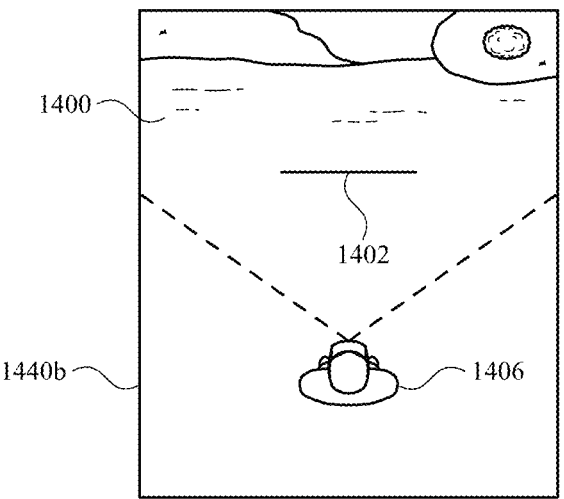
FIG. 14B

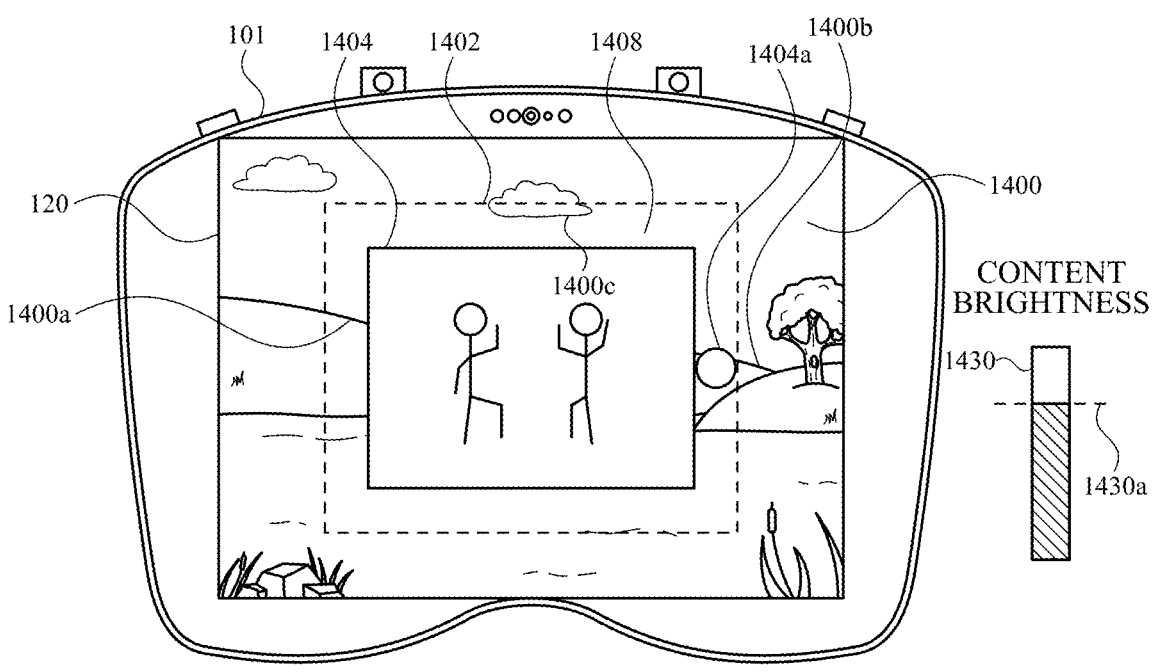
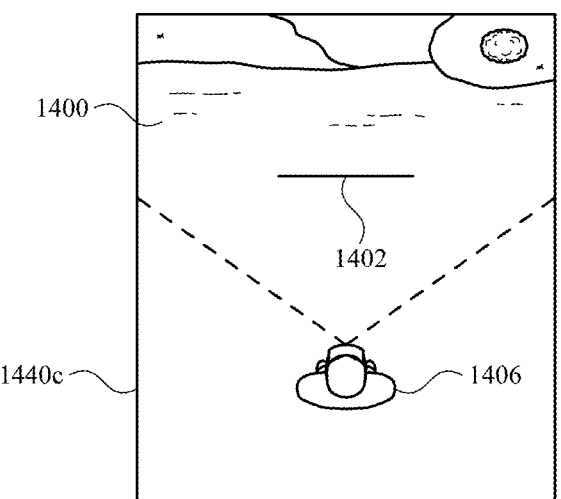
FIG. 14C

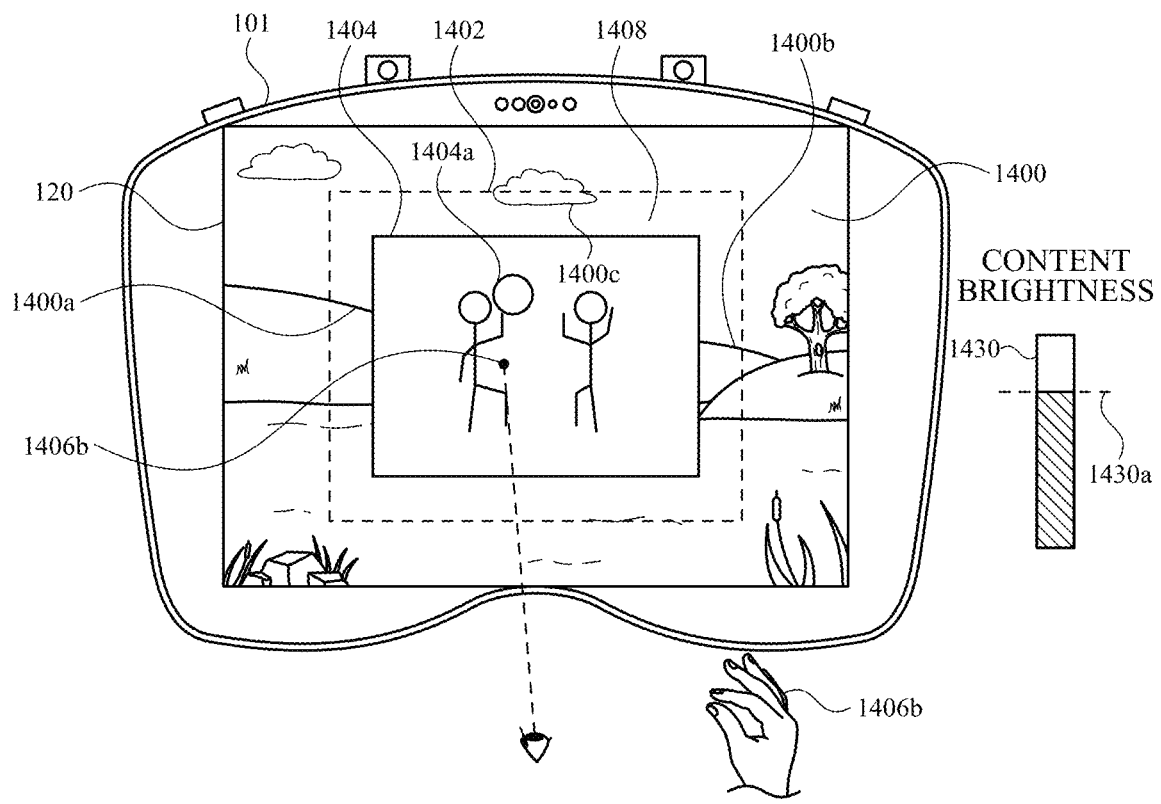
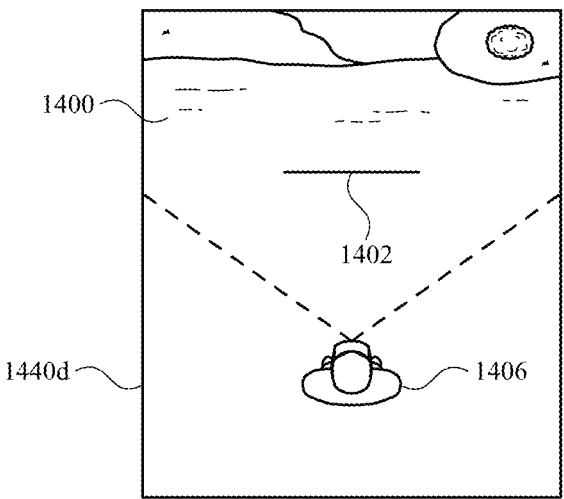
*FIG. 14D*

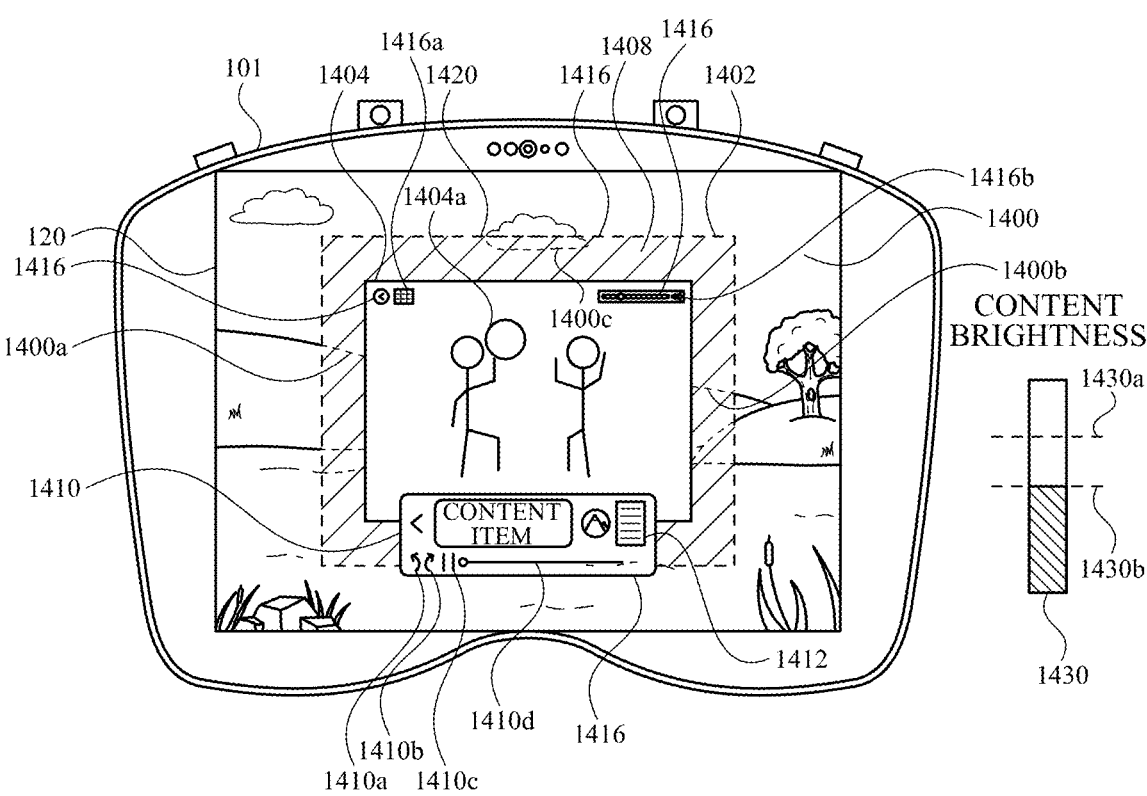
CONTENT
BRIGHTNESS
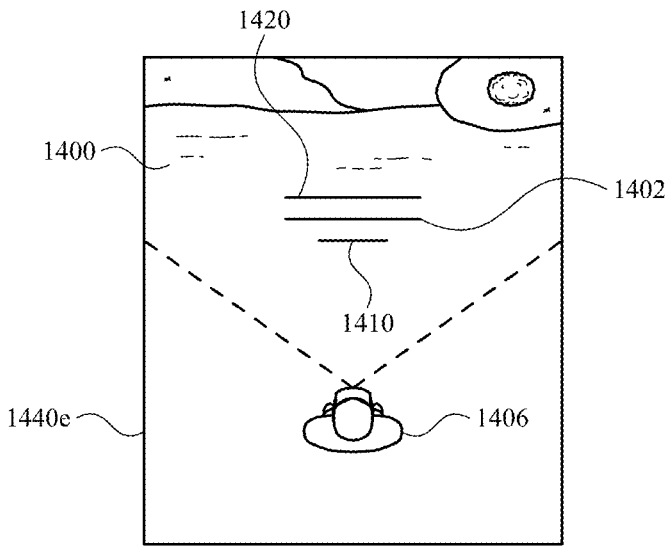
*FIG. 14E*

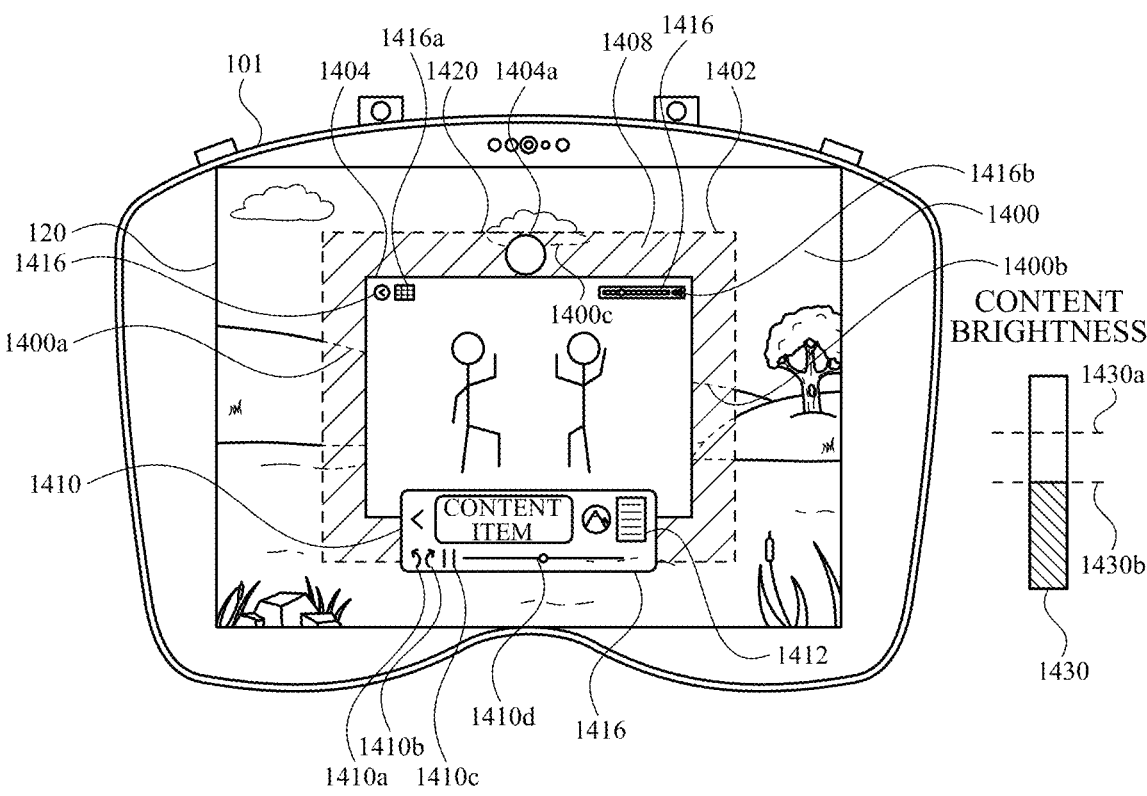
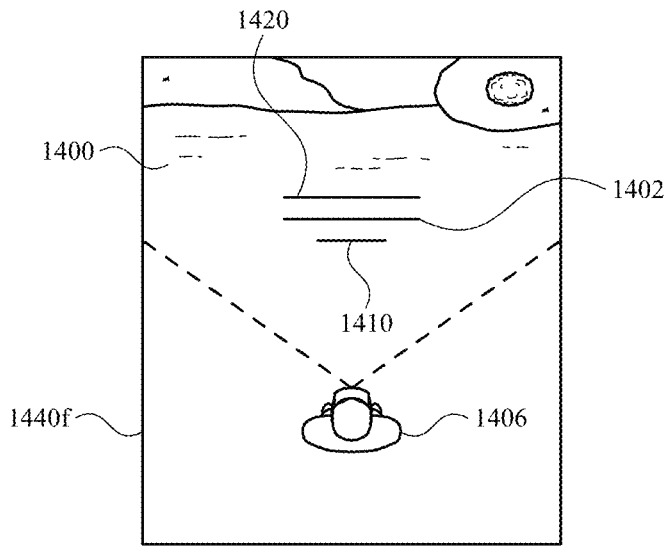
FIG. 14F

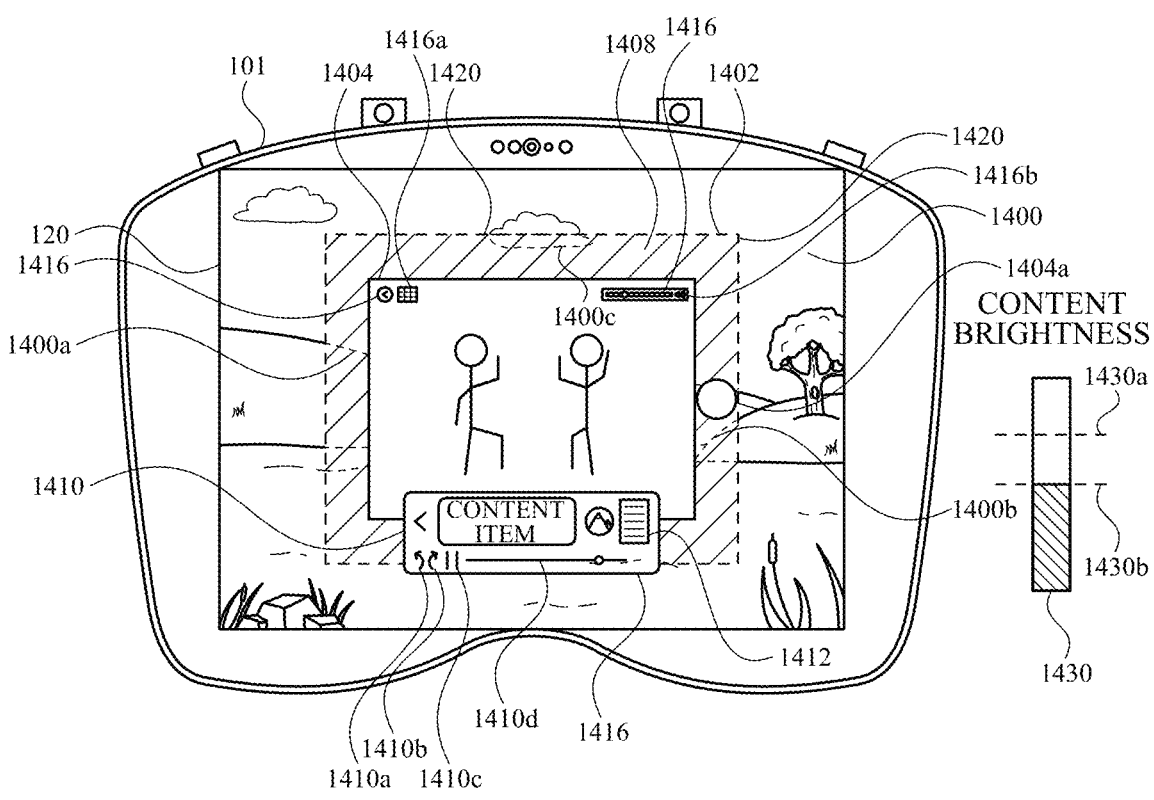
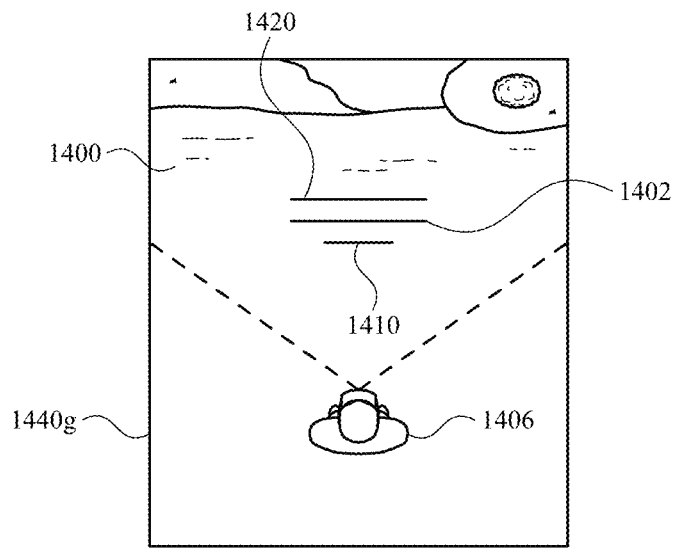
*FIG. 14G*

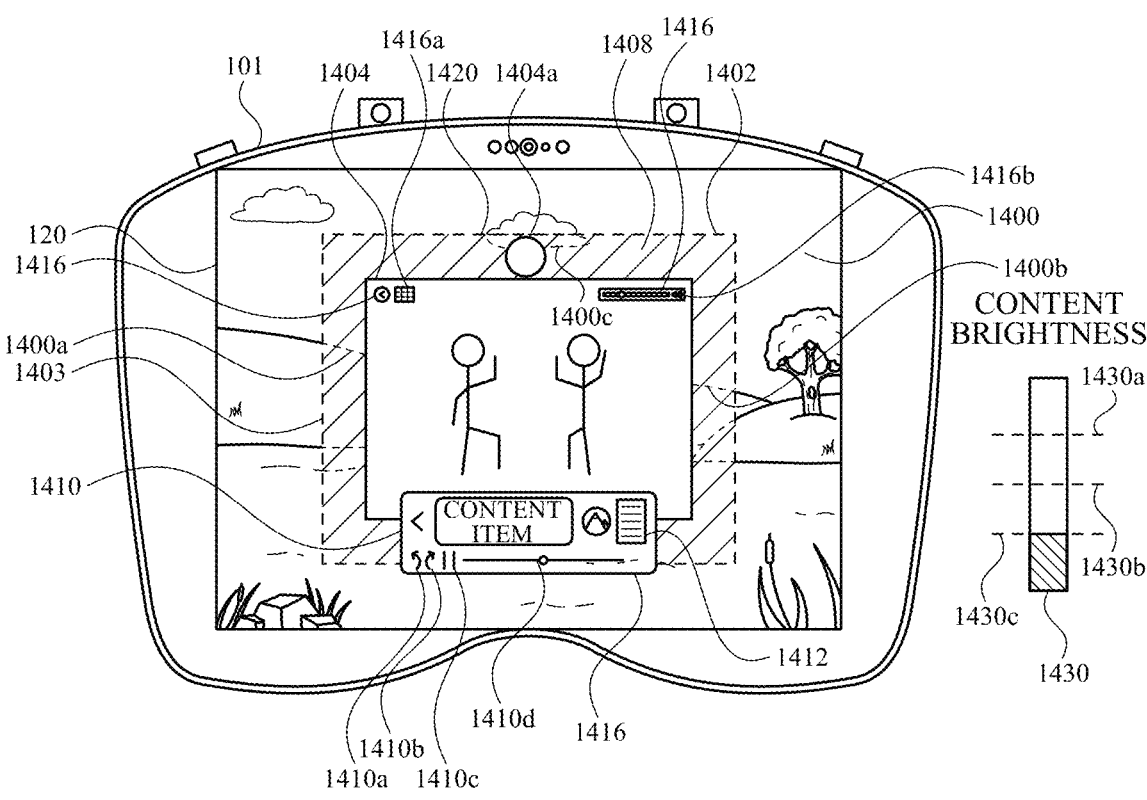
CONTENT
BRIGHTNESS
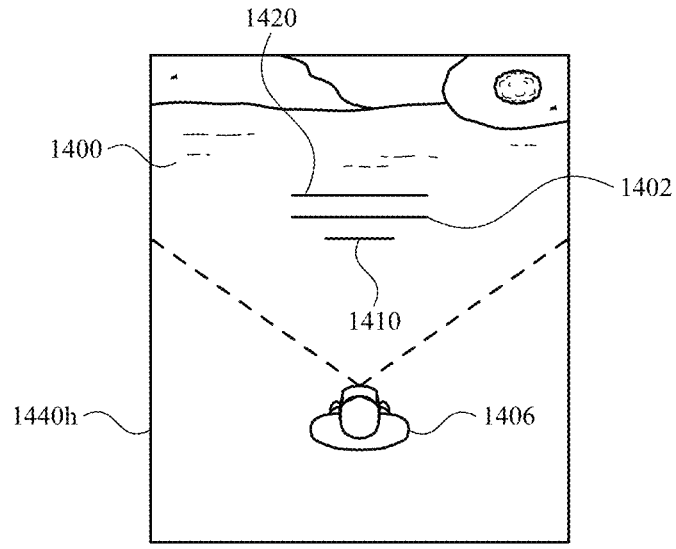
FIG. 14H

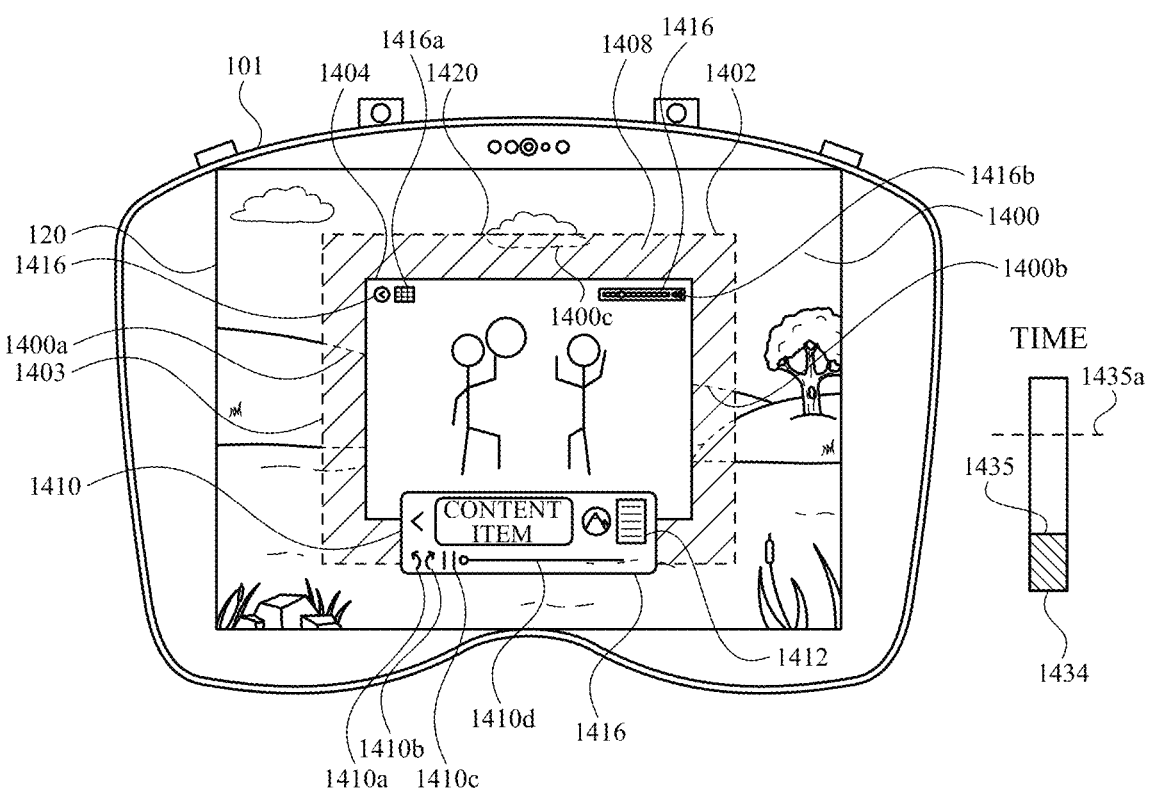
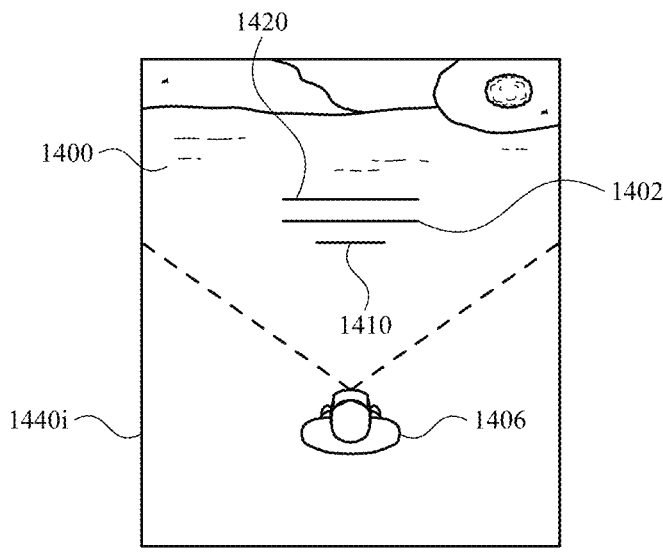
*FIG. 14I*

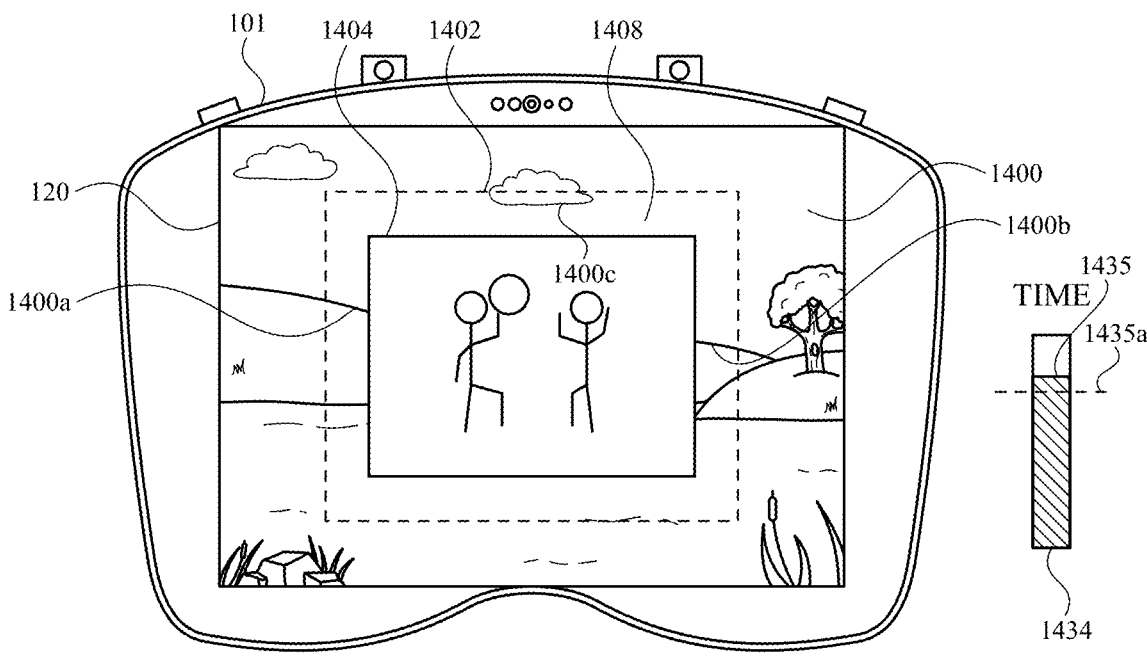
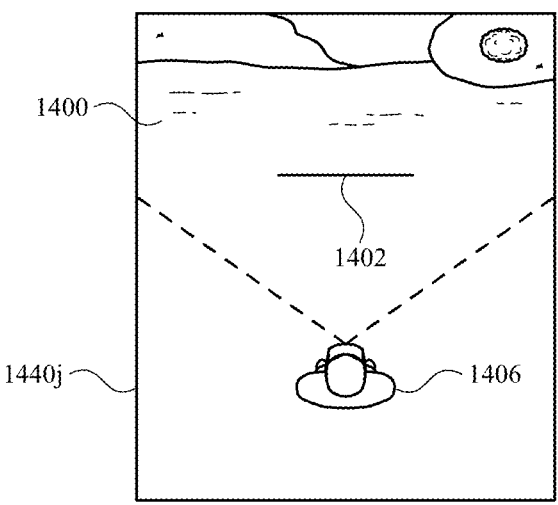
FIG. 14J

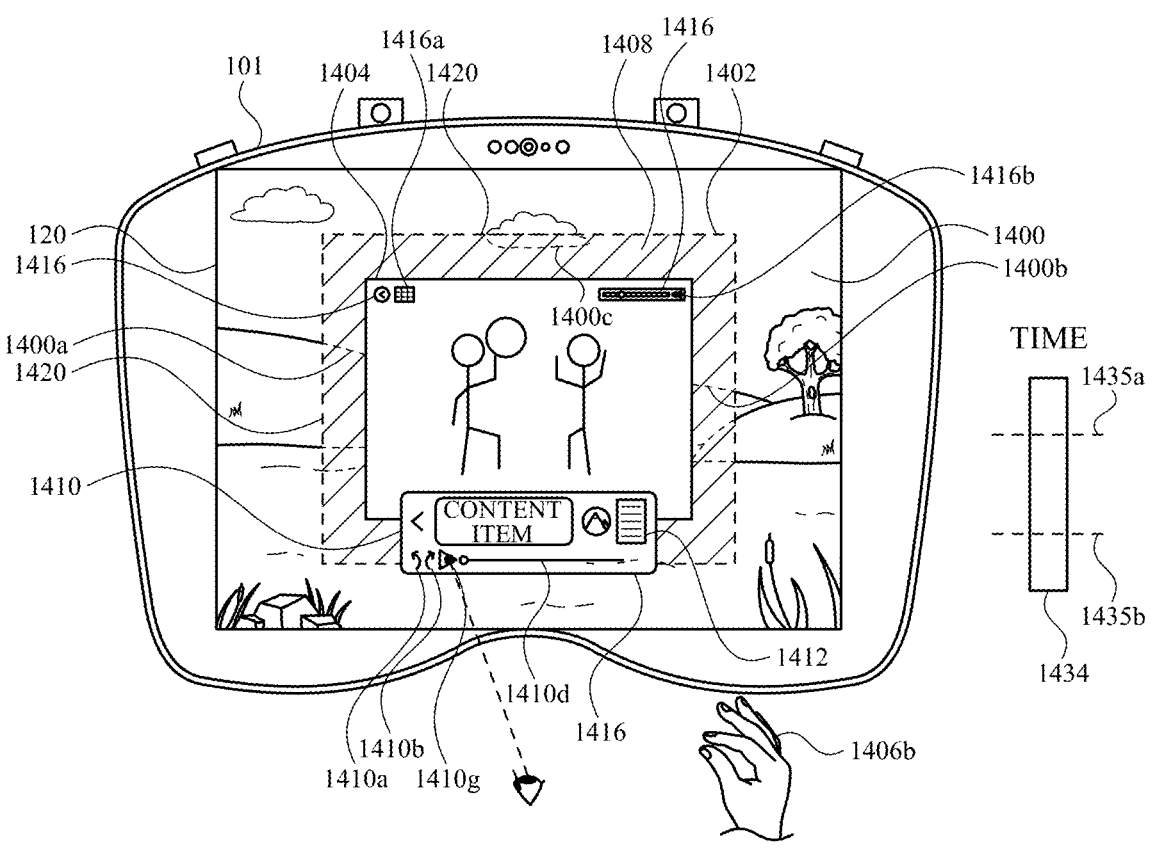
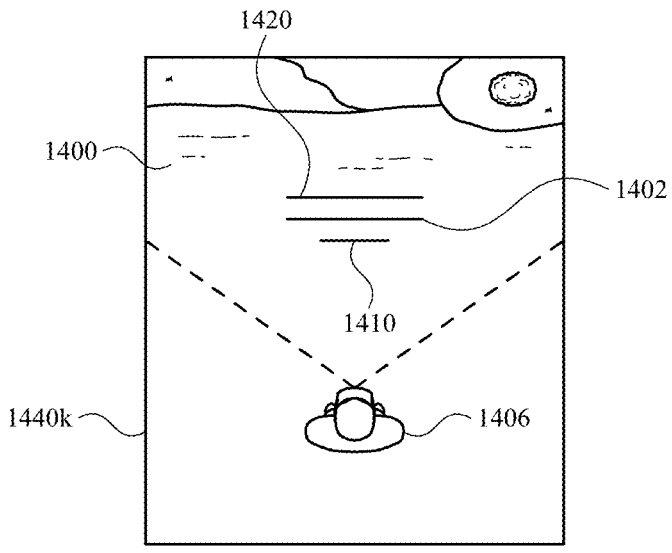
FIG. 14K

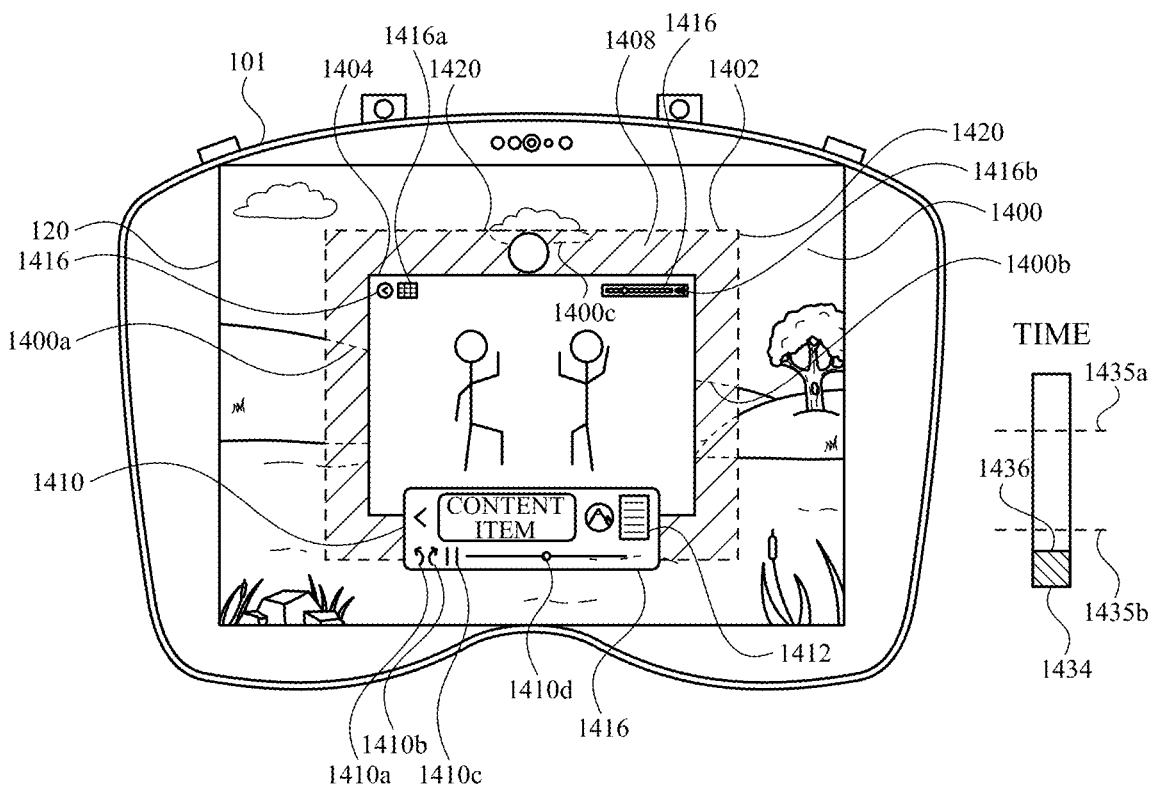
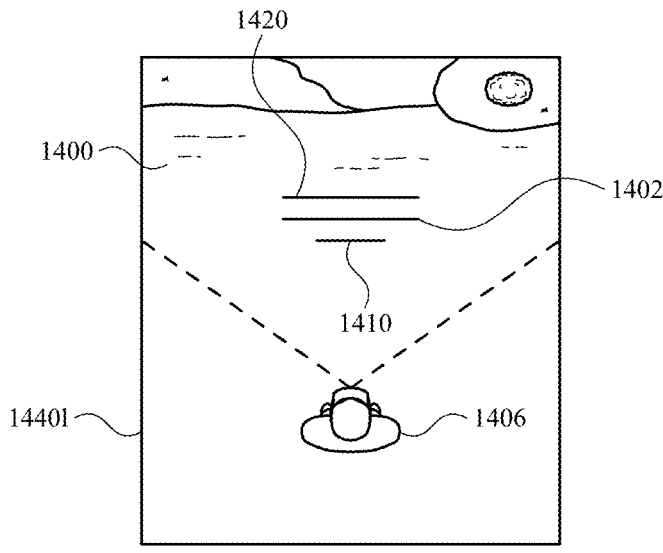
*FIG. 14L*

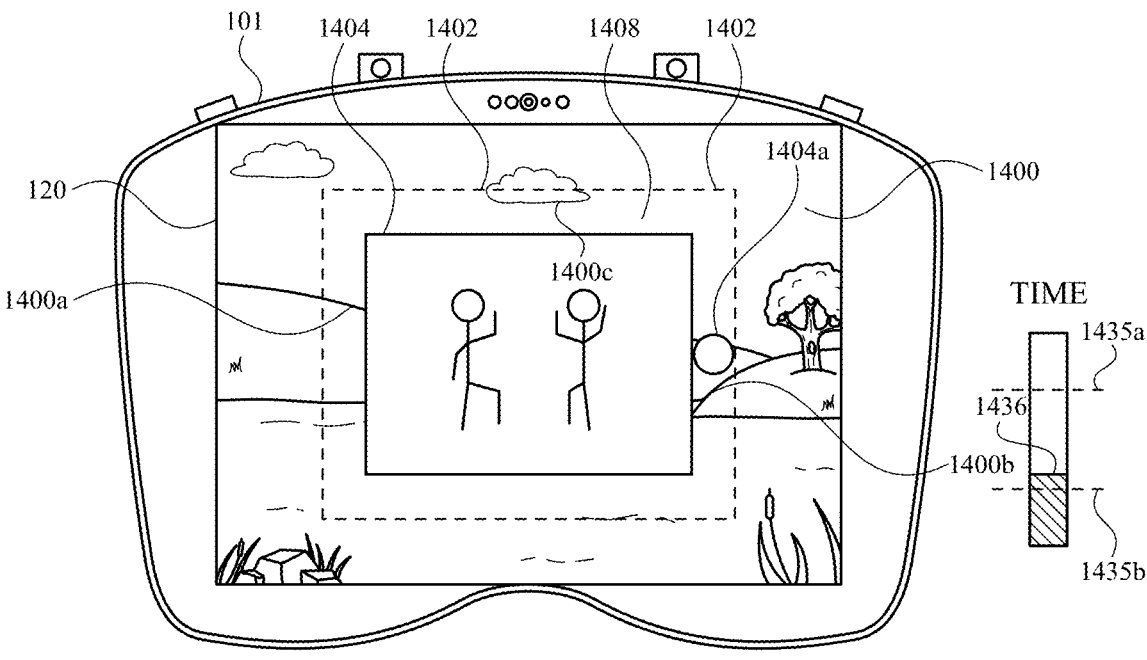
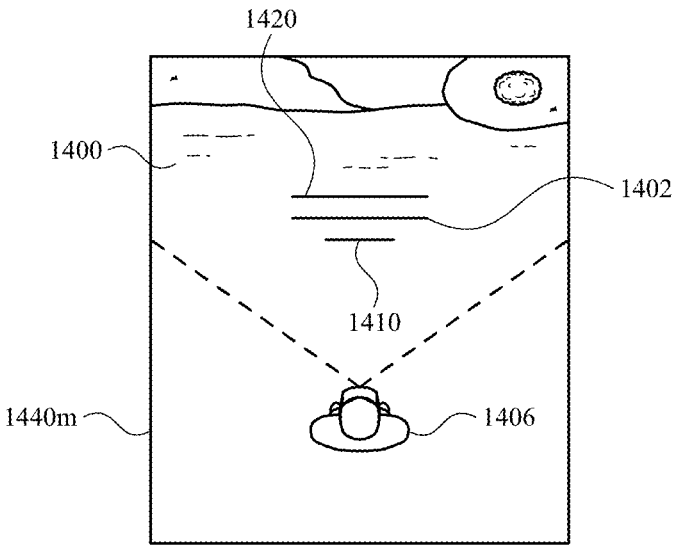
FIG. 14M

Figure 15:
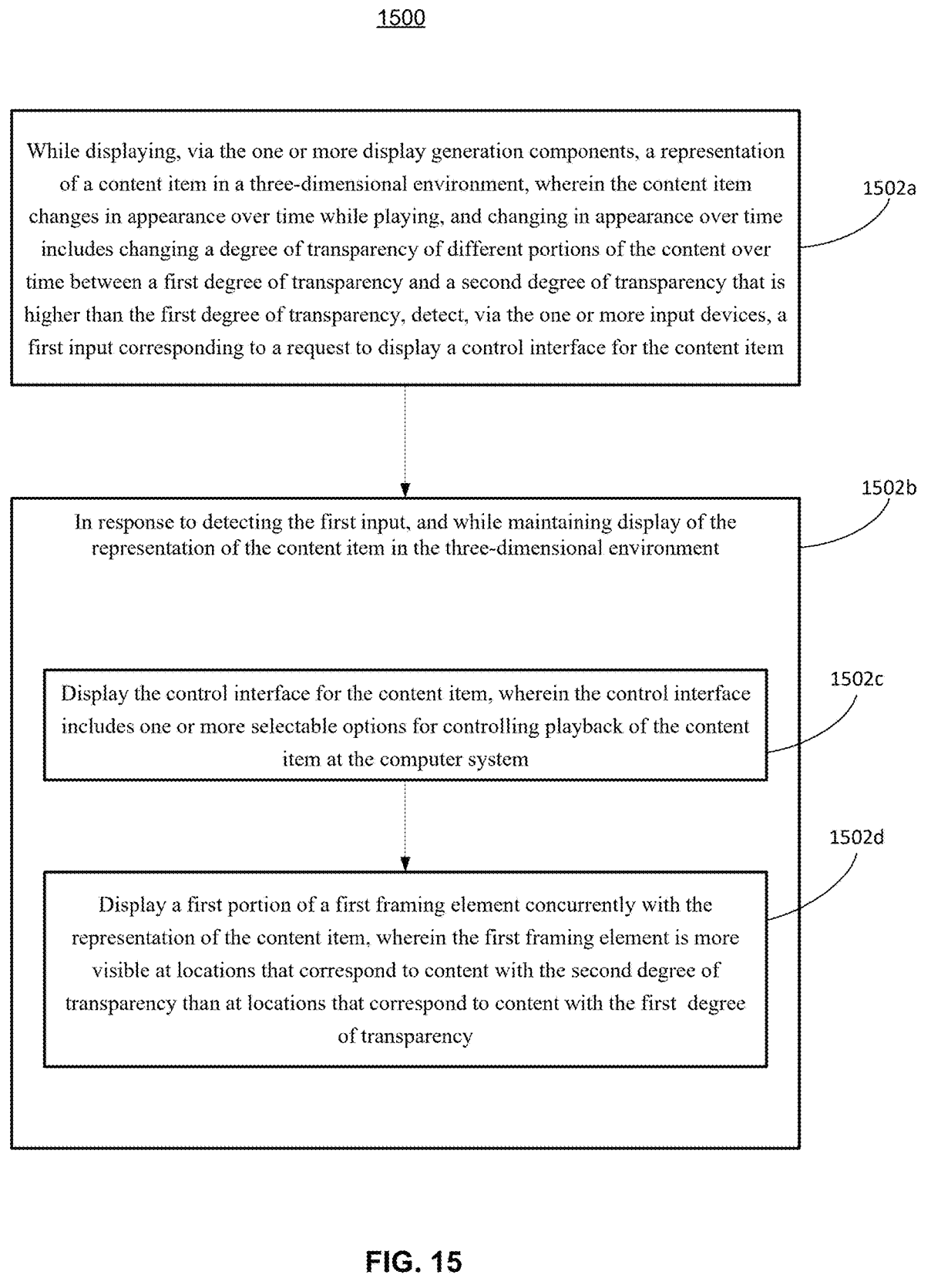

1500

While displaying, via the one or more display generation components, a representation of a content item in a three-dimensional environment, wherein the content item changes in appearance over time while playing, and changing in appearance over time includes changing a degree of transparency of different portions of the content over time between a first degree of transparency and a second degree of transparency that is higher than the first degree of transparency, detect, via the one or more input devices, a first input corresponding to a request to display a control interface for the content item 1502a In response to detecting the first input, and while maintaining display of the representation of the content item in the three-dimensional environment 1502b Display the control interface for the content item, wherein the control interface includes one or more selectable options for controlling playback of the content item at the computer system 1502c Display a first portion of a first framing element concurrently with the representation of the content item, wherein the first framing element is more visible at locations that correspond to content with the second degree of transparency than at locations that correspond to content with the first  degree of transparency 1502d

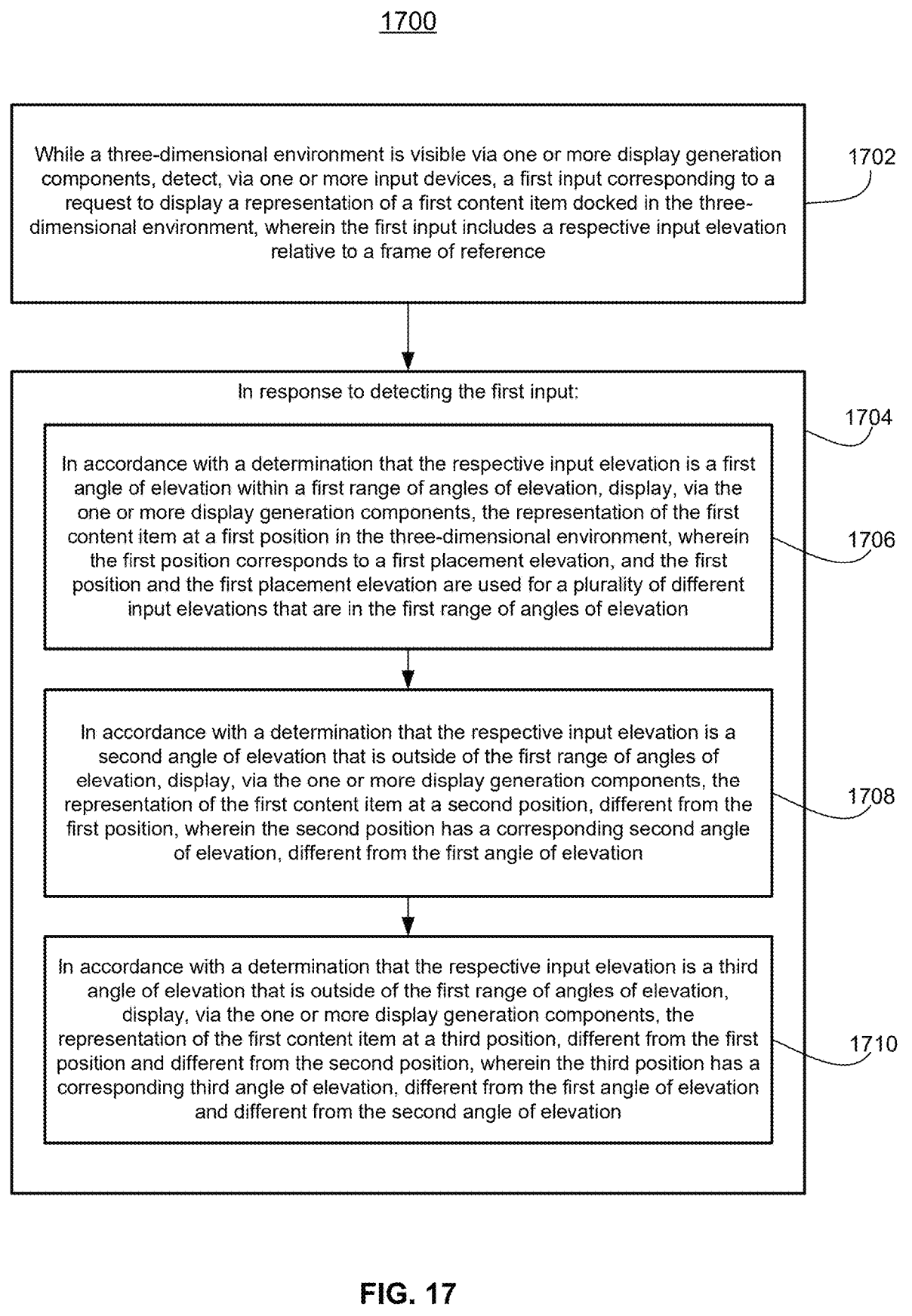

While a three-dimensional environment is visible via one or more display generation components, detect, via one or more input devices, a first input corresponding to a request to display a representation of a first content item docked in the three-dimensional environment, wherein the first input includes a respective input elevation relative to a frame of reference — 1702

In response to detecting the first input: — 1704

In accordance with a determination that the respective input elevation is a first angle of elevation within a first range of angles of elevation, display, via the one or more display generation components, the representation of the first content item at a first position in the three-dimensional environment, wherein the first position corresponds to a first placement elevation, and the first position and the first placement elevation are used for a plurality of different input elevations that are in the first range of angles of elevation — 1706

In accordance with a determination that the respective input elevation is a second angle of elevation that is outside of the first range of angles of elevation, display, via the one or more display generation components, the representation of the first content item at a second position, different from the first position, wherein the second position has a corresponding second angle of elevation, different from the first angle of elevation — 1708

In accordance with a determination that the respective input elevation is a third angle of elevation that is outside of the first range of angles of elevation, display, via the one or more display generation components, the representation of the first content item at a third position, different from the first position and different from the second position, wherein the third position has a corresponding third angle of elevation, different from the first angle of elevation and different from the second angle of elevation — 1710

FIG. 17

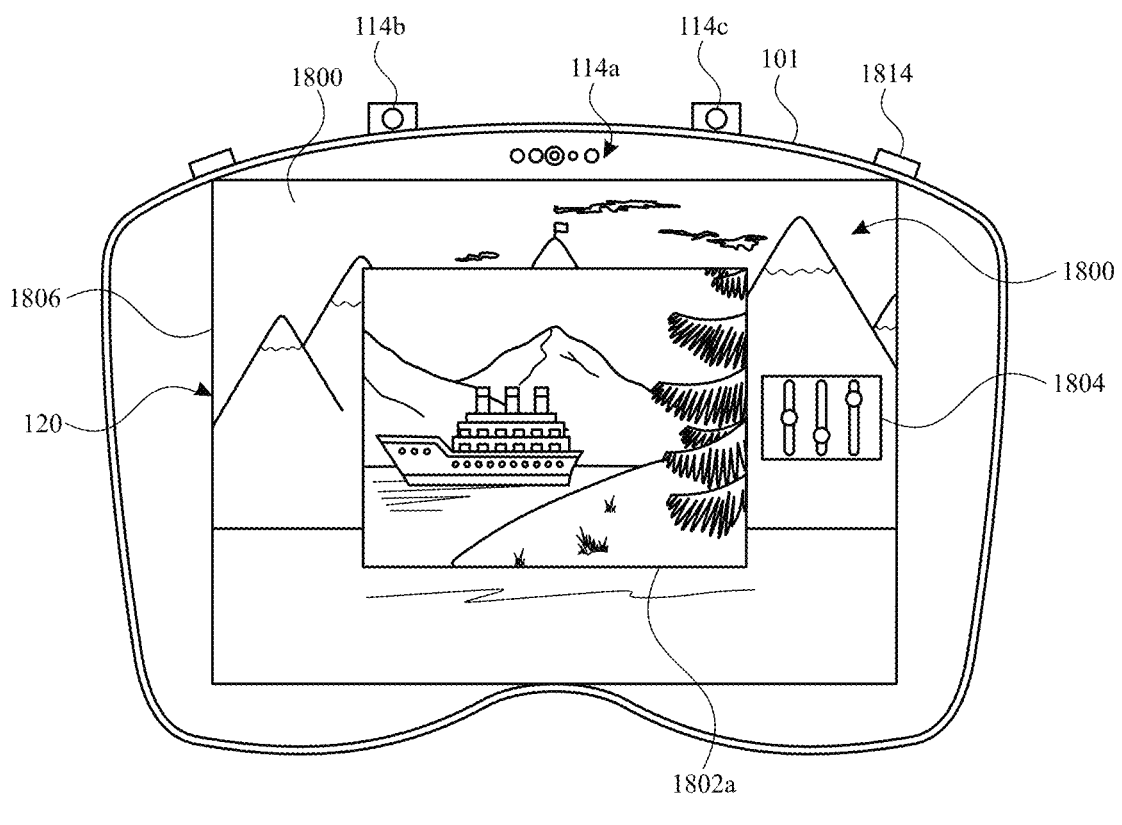
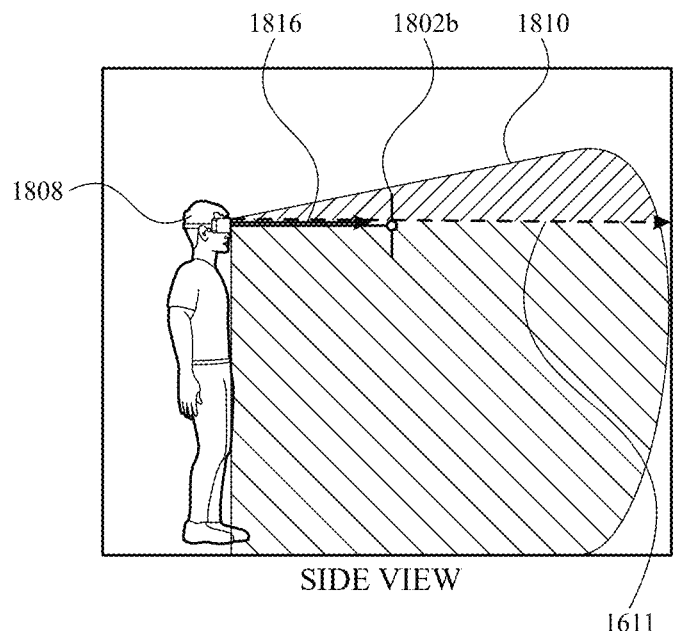
SIDE VIEW
*FIG. 18A*

SIDE VIEW

SIDE VIEW

SIDE VIEW

SIDE VIEW

TOP-DOWN VIEW

TOP-DOWN VIEW

SIDE VIEW

TOP-DOWN VIEW

SIDE VIEW

SIDE VIEW

TOP-DOWN VIEW

TOP-DOWN VIEW

SIDE VIEW

SIDE VIEW

1900

In response to detecting the recentering input, shifting the first virtual content item in the three-dimensional environment so that it is closer to a center of a viewport of the user                                1902b Last saved info before reboot          Restored placement after reboot

2100

METHODS OF INTERACTING WITH CONTENT IN A VIRTUAL ENVIRONMENT

CROSS-REFERENCE TO RELATED APPLICATIONS

This application claims the benefit of U.S. Provisional Application No. 63/657,975, filed Jun. 9, 2024, and U.S. Provisional Application No. 63/658,393, filed Jun. 10, 2024, the contents of which are herein incorporated by reference in their entireties for all purposes.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has (e.g., includes or is in communication with) a display generation component (e.g., a display device such as a head-mounted display device (HMD), a display, a projector, a touch-sensitive display (also known as a "touch screen" or "touch-screen display"), or other device or component that preserves visual content to a user, for example on or in the display generation component itself or produced from the display generation component and visible elsewhere). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system switches a representation of a first content item at a docked position in a three-dimensional environment with a representation of a second content item in the three-dimensional environment while maintaining display of the three-dimensional environment. In some embodiments, a computer system switches from displaying a first virtual three-dimensional environment to displaying a second virtual three-dimensional environment while displaying a representation of a first content item at a docked position. In some embodiments, a computer system detects and responds to a request to transition a mode of display of virtual content from an immersive mode to a framed mode, or from the immersive mode to the framed mode. In some embodiments, a computer system detects and responds to a request to move virtual content in a direction that would change an alignment a content horizon of the virtual content with an environment horizon of a three-dimensional environment in which the virtual content is displayed. In some embodiments, a computer system displays a first framing element concurrently with a representation of a content item having different degrees of transparency and in response to user input. In some embodiments, a computer system facilitates docking of a content item in a virtual environment based on an input angle of elevation associated with a docking input. In some embodiments, a computer system facilitates docking of a content item in a virtual environment based on an input angle of elevation and viewpoint yaw in accordance with some embodiments. In some embodiments, a computer system determines clusters of virtual objects and restores virtual objects after a reboot event.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the Figures.

FIG. 4 is a block diagram illustrating a hand tracking unit of a computer system that is configured to capture gesture inputs of the user in accordance with some embodiments.

FIGS. 7A-7AL illustrate examples of a computer system switching a representation of a first content item at a docked position in a three-dimensional environment with a representation of a second content item in the three-dimensional environment in response to detecting user input in accordance with some embodiments.

FIG. 8 is a flowchart illustrating an exemplary method of switching a representation of a first content item at a docked position in a three-dimensional environment with a representation of a second content item in the three-dimensional environment in response to detecting user input in accordance with some embodiments.

FIG. 10 is a flowchart illustrating an exemplary method of switching from displaying a first virtual three-dimensional environment to displaying a second virtual three-dimensional environment in response to user input while displaying a representation of a first content item at a docked position in accordance with some embodiments.

FIG. 12 is a flowchart illustrating an exemplary method of detecting and responding to a request to transition a mode of display of virtual content from an immersive mode to a framed mode in accordance with some embodiments.

FIG. 13 is a flowchart illustrating an exemplary method of detecting and responding to a request to move virtual content in a direction that would reduce an alignment of the virtual content with an environment horizon of an environment in which the virtual content is displayed, where the request is detected while the virtual content is aligned with the environment horizon in accordance with some embodiments.

FIGS. 14A-14M illustrate examples of a computer system displaying a first framing element concurrently with a representation of a content item having different degrees of transparency in response to detecting an input in accordance with some embodiments.

FIG. 15 is a flowchart illustrating an exemplary method of displaying a first framing element concurrently with a representation of a content item having different degrees of transparency in response to detecting an input in accordance with some embodiments.

FIG. 17 is a flowchart illustrating an exemplary method of facilitating docking of a content item in a virtual environment based on an input angle of elevation in accordance with some embodiments.

DESCRIPTION OF EMBODIMENTS

Figure 1B:
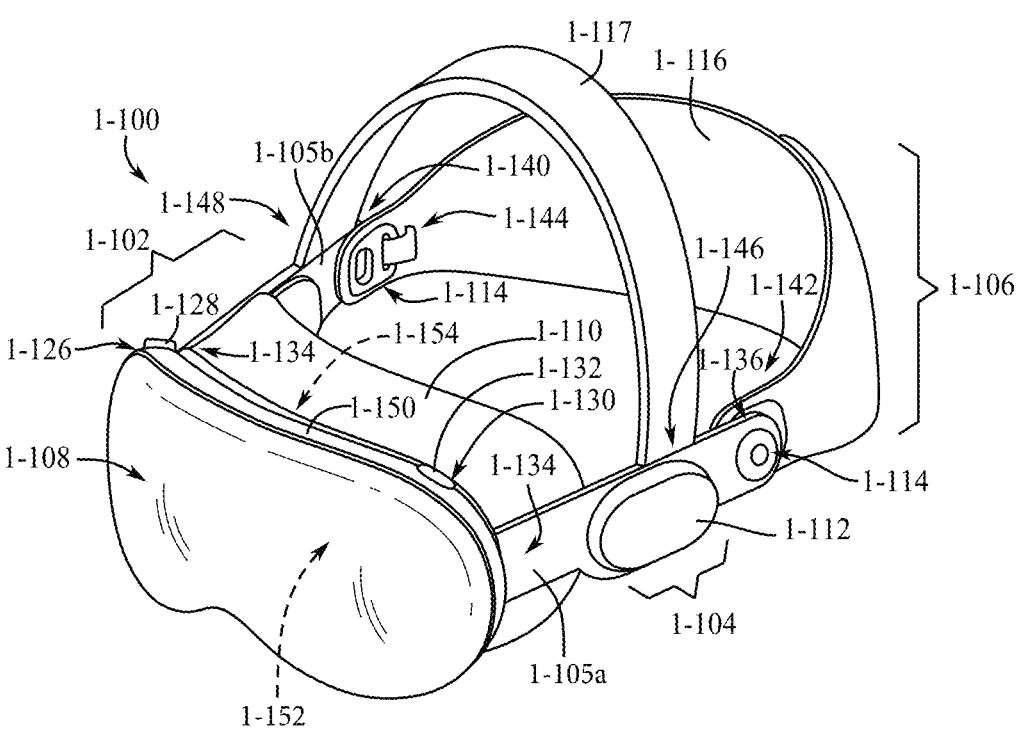
FIGS. 1B-1P are examples of a computer system for providing XR experiences in the operating environment of FIG. 1A.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system switches a representation of a first content item at a docked position in a three-dimensional environment with a representation of a second content item in the three-dimensional environment while maintaining display of the three-dimensional environment. In some embodiments, while displaying, via the one or more display generation components, a representation of a first content item at a docked position in a first three-dimensional environment, wherein the docked position is fixed in the first three-dimensional environment, the computer system detects, via the one or more input devices, a first sequence of one or more inputs corresponding to a request to switch from displaying the first content item to displaying a second content item, different from the first content item, in the first three-dimensional environment. In some embodiments, in response to detecting the first sequence of one or more inputs, and while maintaining display of the first three-dimensional environment via the one or more display generation components, the computer system ceases display of the representation of the first content item at the docked position in the first three-dimensional environment. In some embodiments, in response to detecting the first sequence of one or more inputs, and while maintaining display of the first three-dimensional environment via the one or more display generation components, the computer system displays, via the one or more display generation components, a representation of the second content item at the docked position in the first three-dimensional environment.

In some embodiments, a computer system switches from displaying a first virtual three-dimensional environment to displaying a second virtual three-dimensional environment while displaying a representation of a first content item at a docked position. In some embodiments, while displaying, via the one or more display generation components, a representation of a first content item at a first docked position in a first virtual three-dimensional environment, wherein the first docked position is fixed in the first virtual three-dimensional environment, the computer system detects, via the one or more input devices, a first sequence of one or more inputs corresponding to a request to switch from displaying the first virtual three-dimensional environment to displaying a second virtual three-dimensional environment. In some embodiments, in response to detecting the first sequence of one or more inputs, the computer system ceases display of the first virtual three-dimensional environment. In some embodiments, in response to detecting the first sequence of one or more inputs, the computer system displays, via the one or more display generation components, the second virtual three-dimensional environment, wherein a representation of the first content item is displayed at a second docked position in the second virtual three-dimensional environment, wherein the second docked position is fixed in the second virtual three-dimensional environment.

In some embodiments, a computer system displays, via one or more display generation components, three-dimensional (3D) content in an immersive mode of display, wherein in the immersive mode of display the 3D content occupies a first amount of an available field of view from a current viewpoint of the user. In some embodiments, while displaying the 3D content in the immersive mode of display, the computer system detects an event corresponding to a triggering condition for transitioning from displaying the 3D content in the immersive mode of display to displaying the 3D content in a framed mode of display, different from the immersive mode of display. In some embodiments, in response to detecting the event corresponding to the triggering condition for transitioning from displaying the 3D content in the immersive mode of display to displaying the 3D content in the framed mode of display, the computer system displays the 3D content in a frame for the 3D content in a three-dimensional environment. In some embodiments, in the framed mode of display, the 3D content occupies a second amount of the available field of view from the current viewpoint of the user that is smaller than the first amount of the available field of view from the current viewpoint of the user. In some embodiments, while displaying, via the one or more display generation components, the 3D content in the framed mode of display, the computer system detects, via one or more input devices, an input to move the frame for the 3D content in the three-dimensional environment. In some embodiments, in response to detecting the input to move the frame for the 3D content in the three-dimensional environment, the computer system moves the frame for the 3D content from a first location in the three-dimensional environment to a second location in the three-dimensional environment that is different from the first location in the three-dimensional environment.

In some embodiments, a computer system displays, via one or more display generation components, virtual content in a three-dimensional environment. In some embodiments, the virtual content has a content horizon for the virtual content and the three-dimensional environment has an environment horizon for the three-dimensional environment. In some embodiments, while displaying the virtual content in the three-dimensional environment of the user of the computer system, the computer system detects, via one or more input devices, an input corresponding to a request to move the virtual content relative to the three-dimensional environment. In some embodiments, in response to detecting the input corresponding to the request to move the virtual content relative to the three-dimensional environment, in accordance with a determination that the content horizon is aligned with the environment horizon in a first manner and the input corresponds to a request to move the virtual content in a first direction relative to the three-dimensional environment that would decrease an alignment between the content horizon and the environment horizon, the computer system suppresses movement of the virtual content in the first direction including suppressing at least a portion of the movement of the content horizon in the first direction relative to the environment horizon.

In some embodiments, while displaying, via the one or more display generation components, a representation of a content item in a three-dimensional environment, wherein the content item changes in appearance over time while playing, and changing in appearance over time includes changing a degree of transparency of different portions of the content over time between a first degree of transparency and a second degree of transparency that is higher than the first degree of transparency, the computer system detects, via the one or more input devices, a first input corresponding to a request to display a control interface for the content item. In some embodiments, in response to detecting the first input, and while maintaining display of the representation of the content item in the three-dimensional environment, the computer system displays the control interface for the content item, wherein the control interface includes one or more selectable options for controlling playback of the content item at the computer system. In some embodiments, in response to detecting the first input, and while maintaining display of the representation of the content item in the three-dimensional environment, the computer system displays a first portion of a first framing element concurrently with the representation of the content item, wherein the first framing element is more visible at locations that correspond to content with the second degree of transparency than at locations that correspond to content with the first degree of transparency.

In some embodiments, a computer system facilitates docking of a content item in a virtual environment based on an input angle of elevation associated with a docking input. In some embodiments, while a three-dimensional environment is visible via one or more display generation components, the computer system detects, via one or more input devices, a first input corresponding to a request to display a representation of a first content item docked in the three-dimensional environment, wherein the first input includes a respective input elevation relative to a frame of reference. In some embodiments, in response to detecting the first input, in accordance with a determination that the respective input elevation is a first angle of elevation within a first range of angles of elevation, the computer system displays, via the one or more display generation components, the representation of the first content item at a first position in the three-dimensional environment, wherein the first position corresponds to a first placement elevation, and the first position and the first placement elevation are used for a plurality of different input elevations that are in the first range of angles of elevation. In some embodiments, in accordance with a determination that the respective input elevation is a second angle of elevation that is outside of the first range of angles of elevation, the computer system displays, via the one or more display generation components, the representation of the first content item at a second position, different from the first position, wherein the second position has a corresponding second angle of elevation, different from the first angle of elevation. In some embodiments, in accordance with a determination that the respective input elevation is a third angle of elevation that is outside of the first range of angles of elevation, the computer system displays, via the one or more display generation components, the representation of the first content item at a third position, different from the first position and different from the second position, wherein the third position has a corresponding third angle of elevation, different from the first angle of elevation and different from the second angle of elevation.

In some embodiments, while displaying, via one or more display generation components, a first virtual content item in a three-dimensional environment, a computer system detects, via one or more input devices, a recentering input. In some embodiments, in response to detecting the recentering input, the computer system shifts the first virtual content item in the three-dimensional environment so that it is closer to a center of a viewport of the user. In some embodiments, shifting the first virtual content item includes, in accordance with a determination that a viewpoint of the user of the computer system has a first viewpoint elevation angle relative to a frame of reference, displaying, via the one or more display generation components, the first virtual content item at a first content elevation angle relative to the frame of reference. In some embodiments, shifting the first virtual content item includes, in accordance with a determination that the viewpoint of the user of the computer system has a second viewpoint elevation angle relative to the frame of reference, different from the first viewpoint elevation angle, displaying, via the one or more display generation components, the first virtual content item at a second content elevation angle relative to the frame of reference, different from the first content elevation angle.

In some embodiments, a computer system detects occurrence of a respective event that corresponds to the computer system starting to operate in a respective state. In some embodiments, in response to detecting the occurrence of the respective event, in accordance with a determination that a prior spatial arrangement of one or more virtual objects is available, the computer system displays, via the one or more display generation components, one or more virtual objects in an environment, wherein the one or more virtual objects are displayed with a spatial arrangement that is based on a prior spatial arrangement that was selected based on one or more user inputs prior to detecting the respective event. In some embodiments, in response to detecting the occurrence of the respective event, in accordance with a determination that a prior spatial arrangement of one or more virtual objects is not available, the environment is visible without displaying the one or more virtual objects in the environment.

Figure 11A:
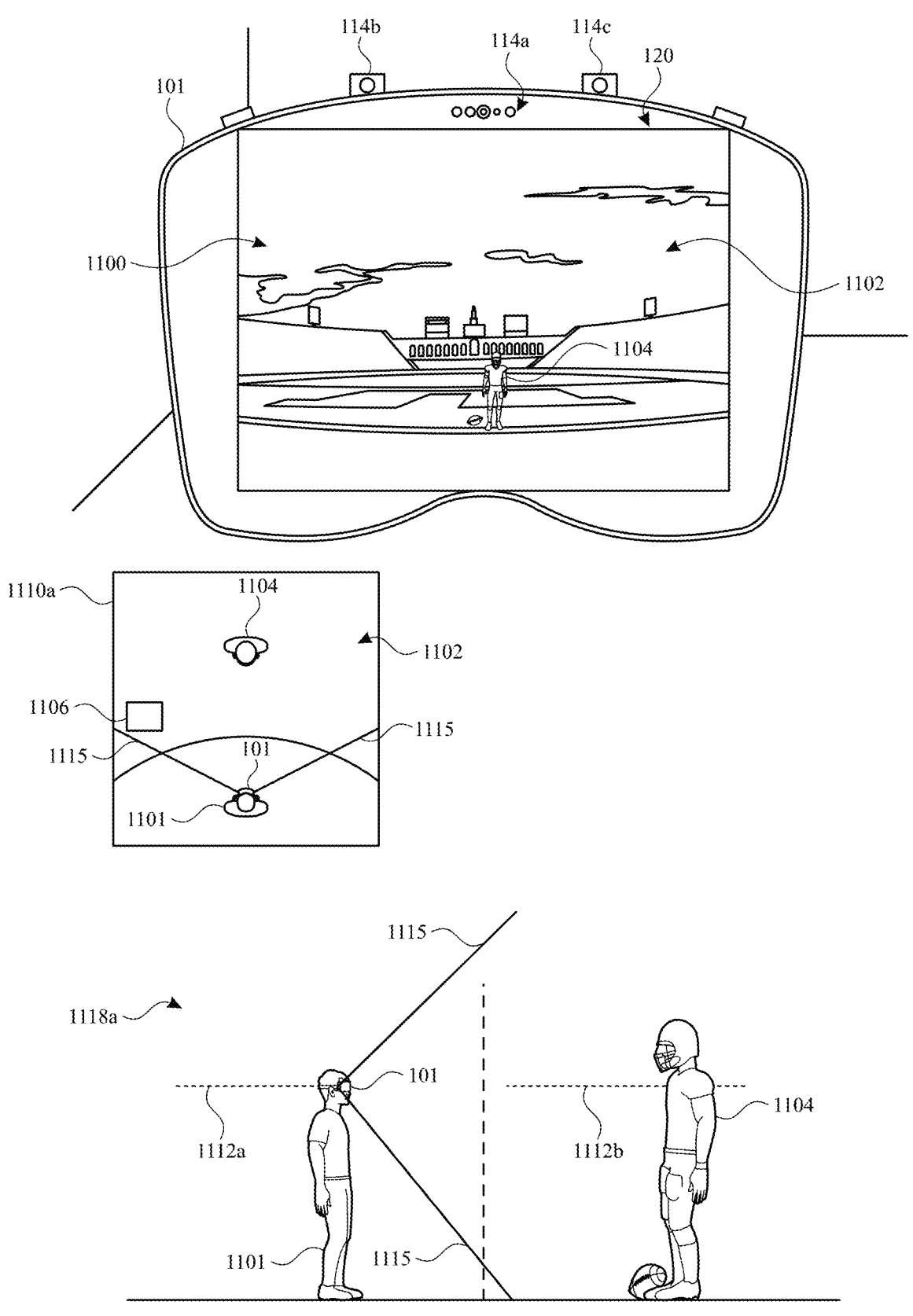
FIGS. 11A-11AO generally illustrate examples of a computer system detecting and responding to events corresponding to requests to move virtual content and/or a frame for virtual content in a three-dimensional environment and/or detecting and responding to events corresponding to requests to transition a mode of display of the virtual content in the three-dimensional environment in accordance with some embodiments.
Figure 16A:
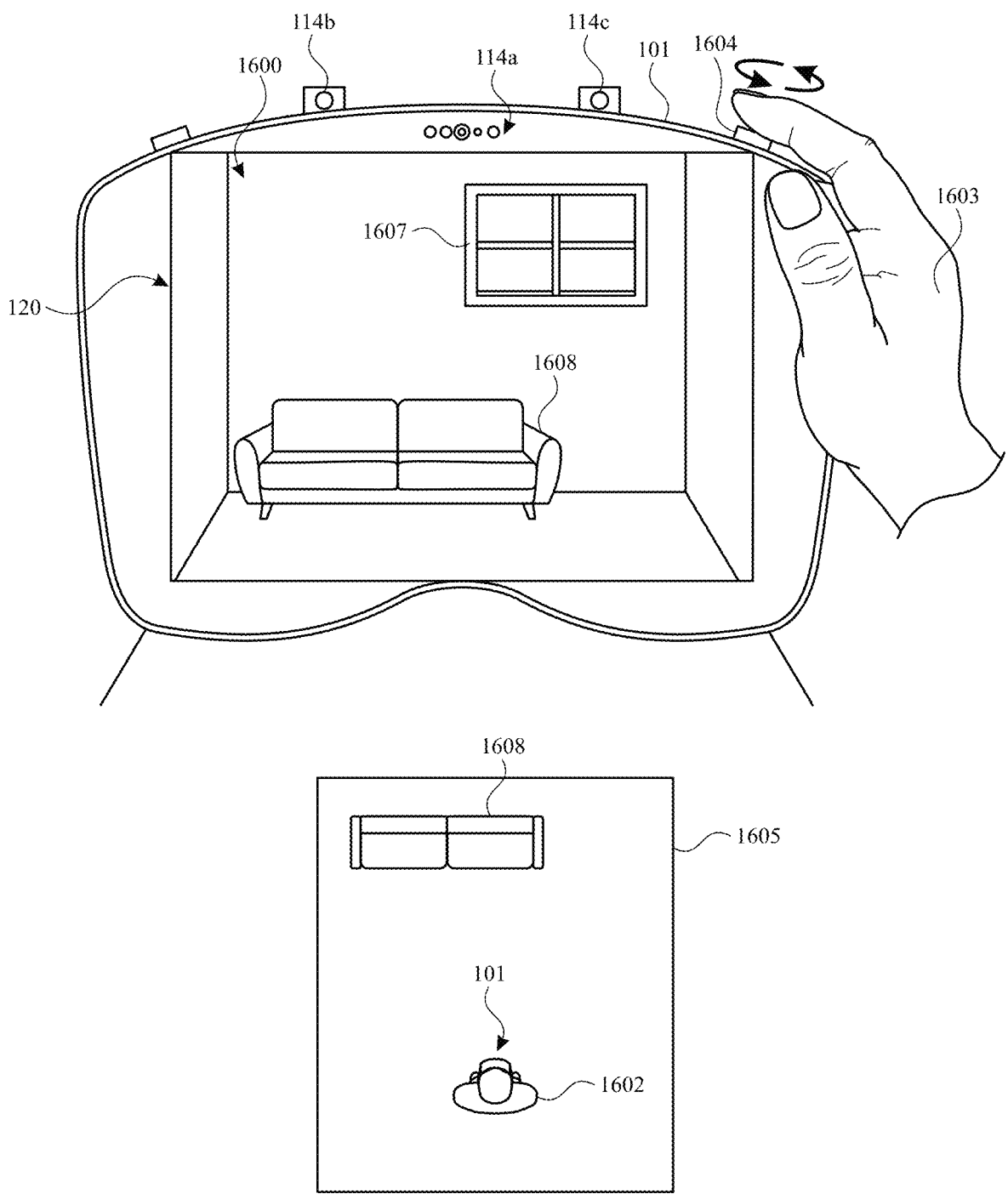
FIGS. 16A-16P illustrate examples of a computer system facilitating docking of a content item in a virtual environment based on an input angle of elevation in accordance with some embodiments.
Figure 18B:
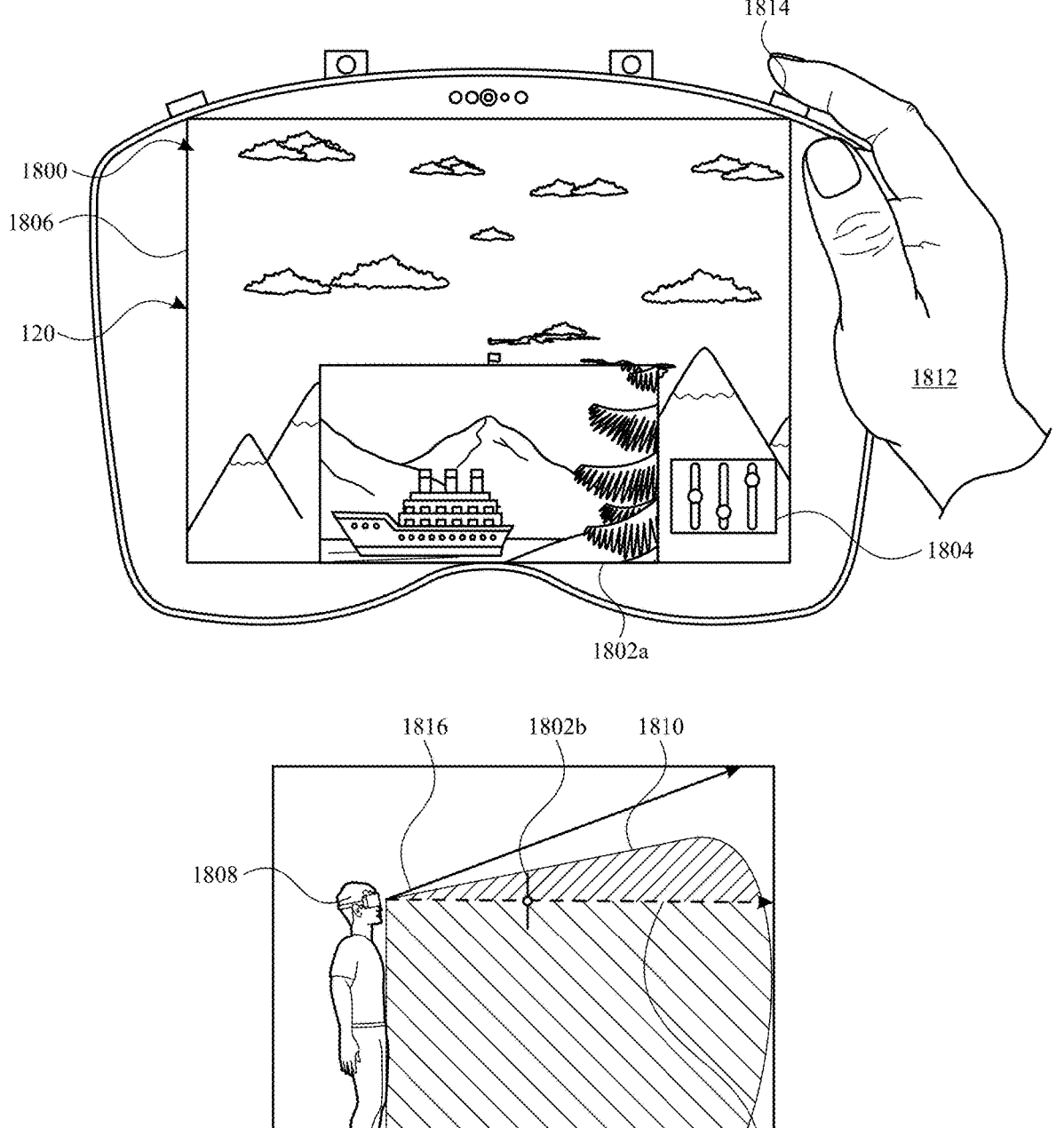
FIGS. 18A-18V illustrate examples of a computer system facilitating docking of a content item in a virtual environment based on an input angle of elevation and viewpoint yaw in accordance with some embodiments.
Figure 18C:
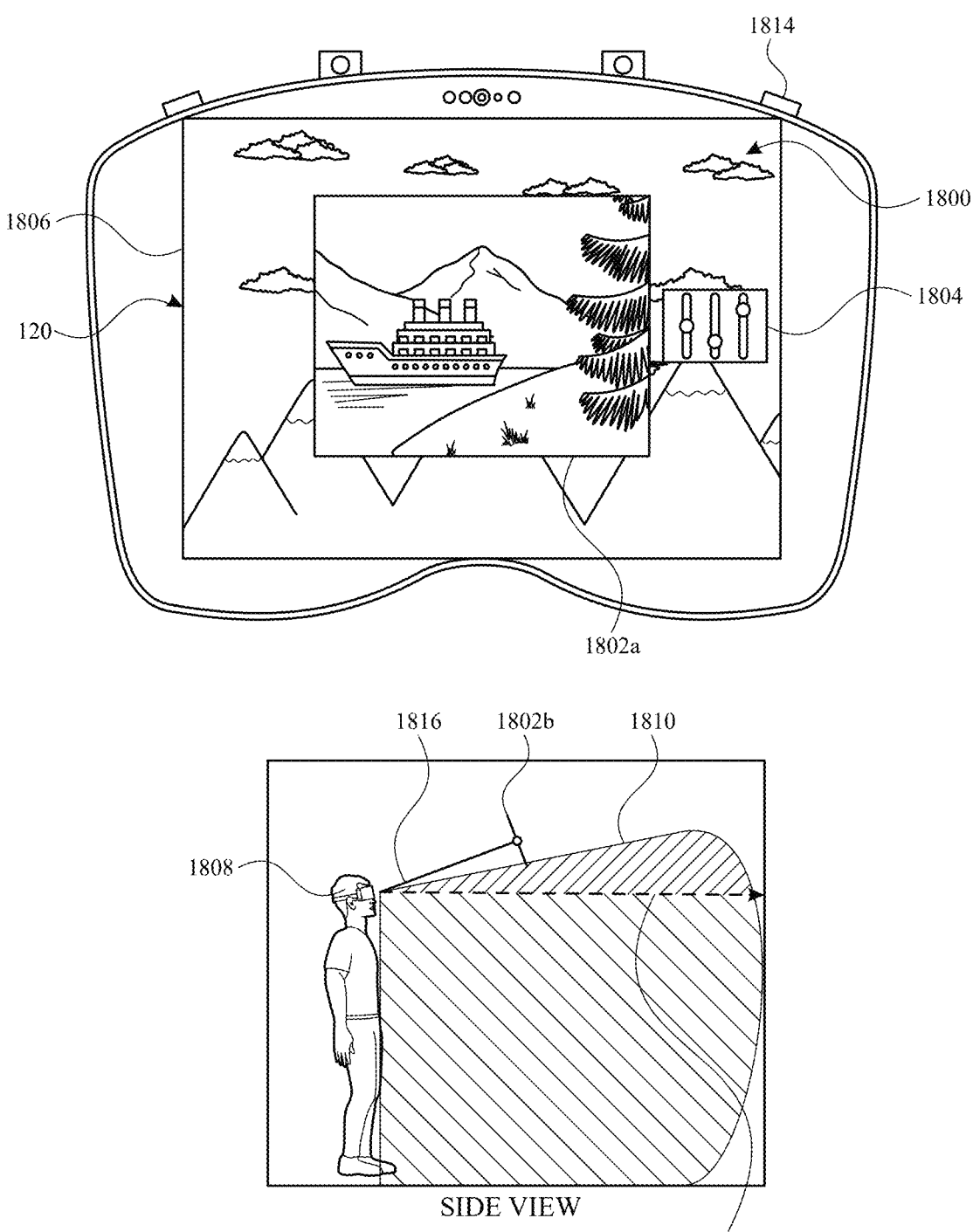
Figure 18D:
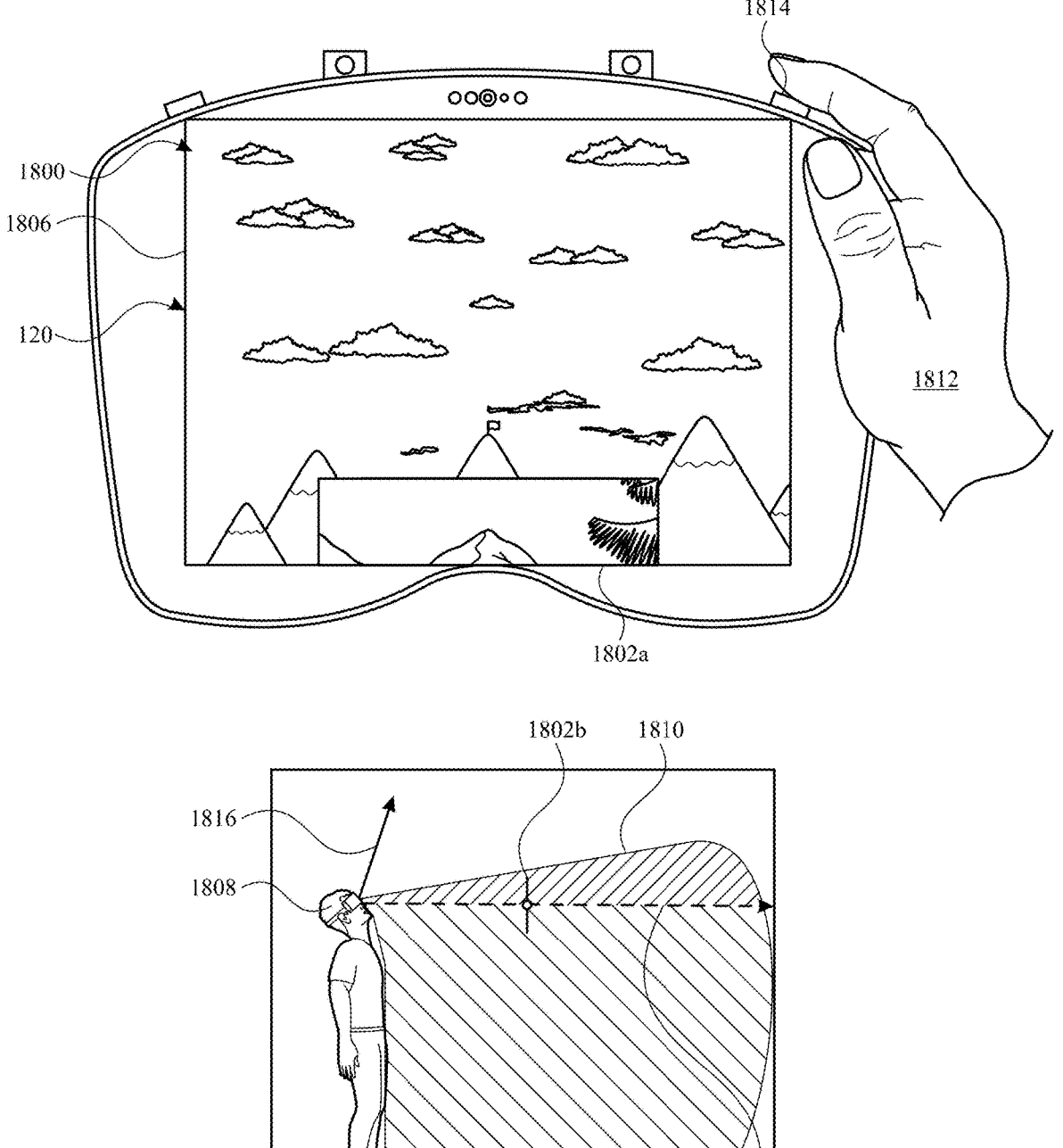
Figure 18E:
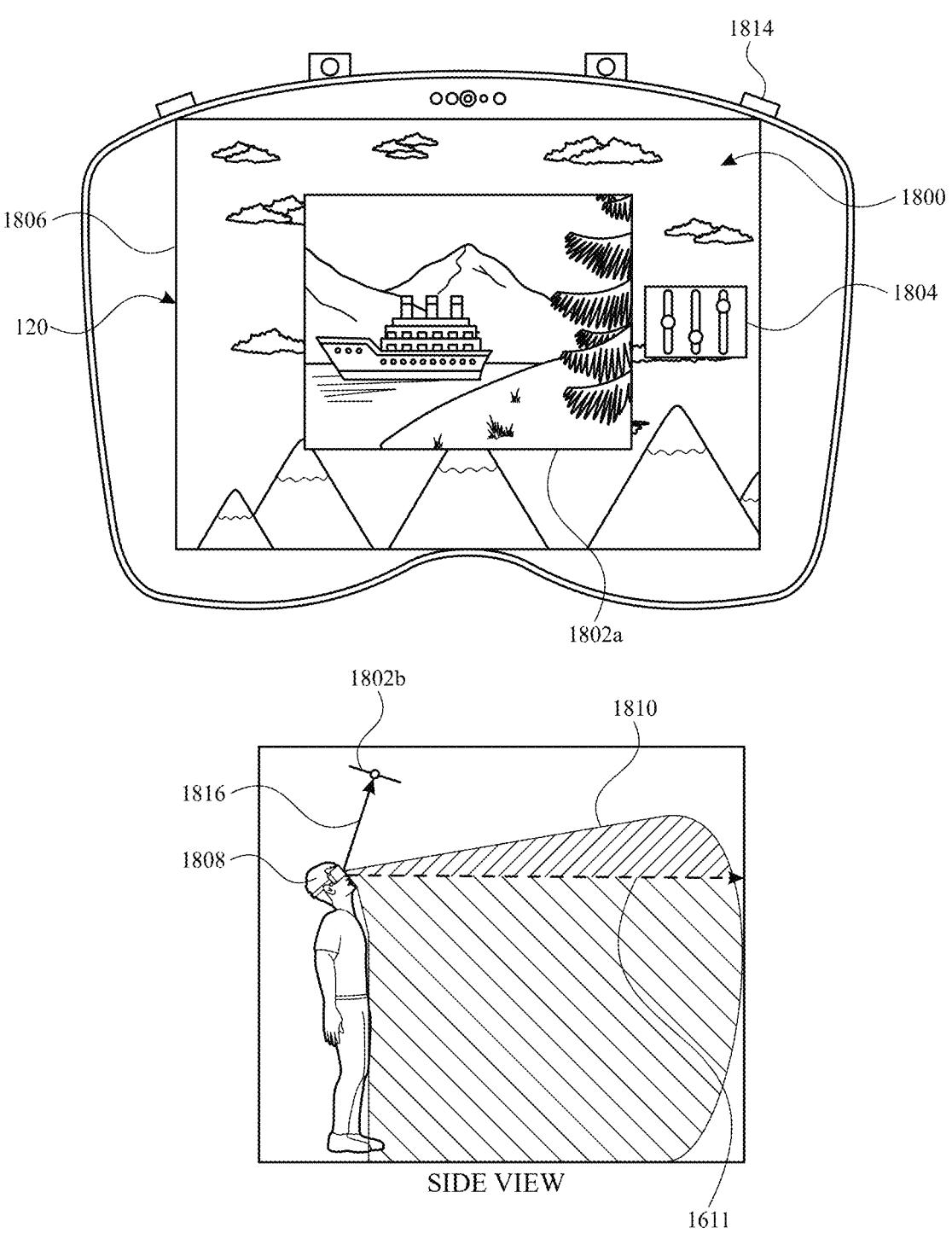
Figure 18F:
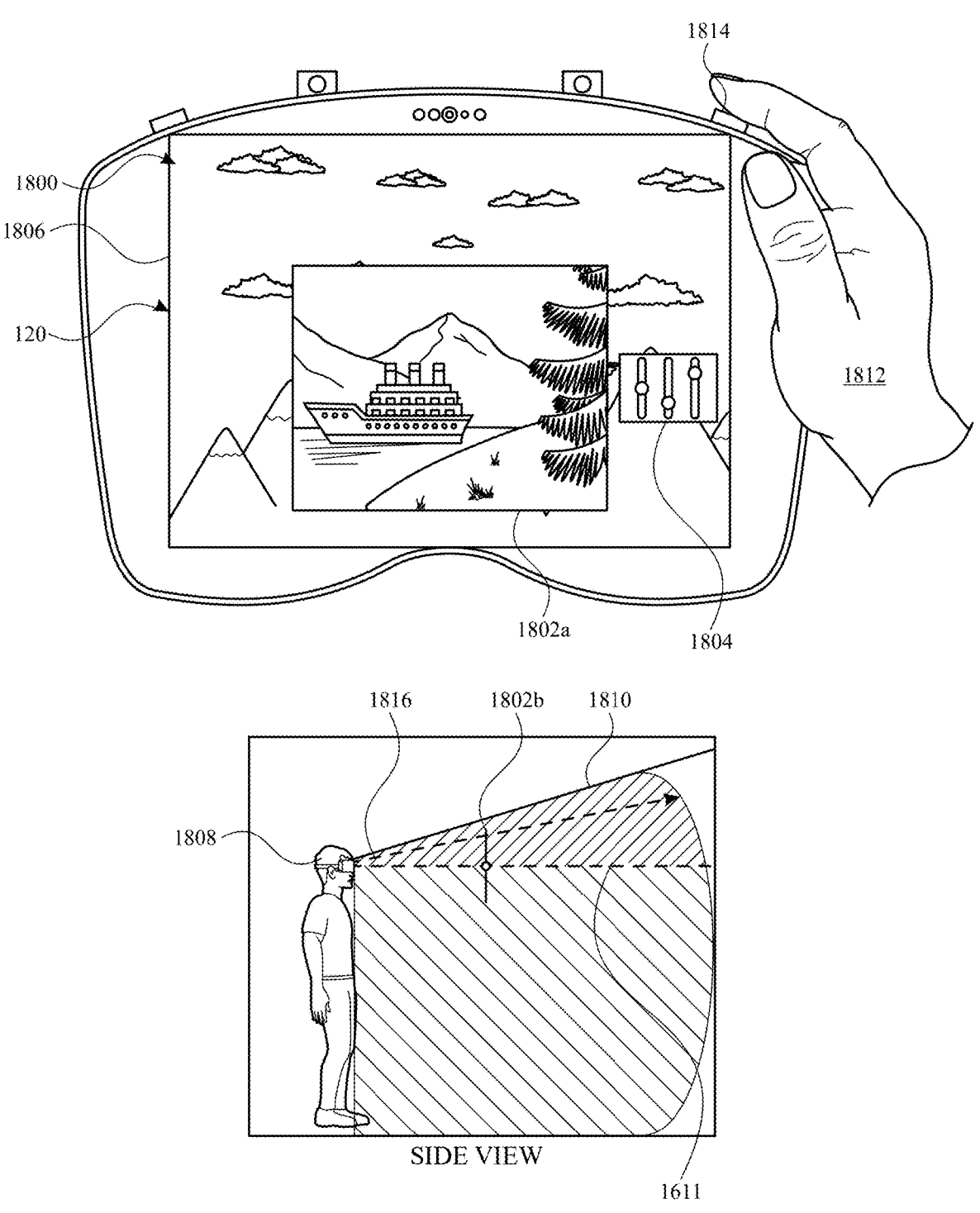
Figure 18G:
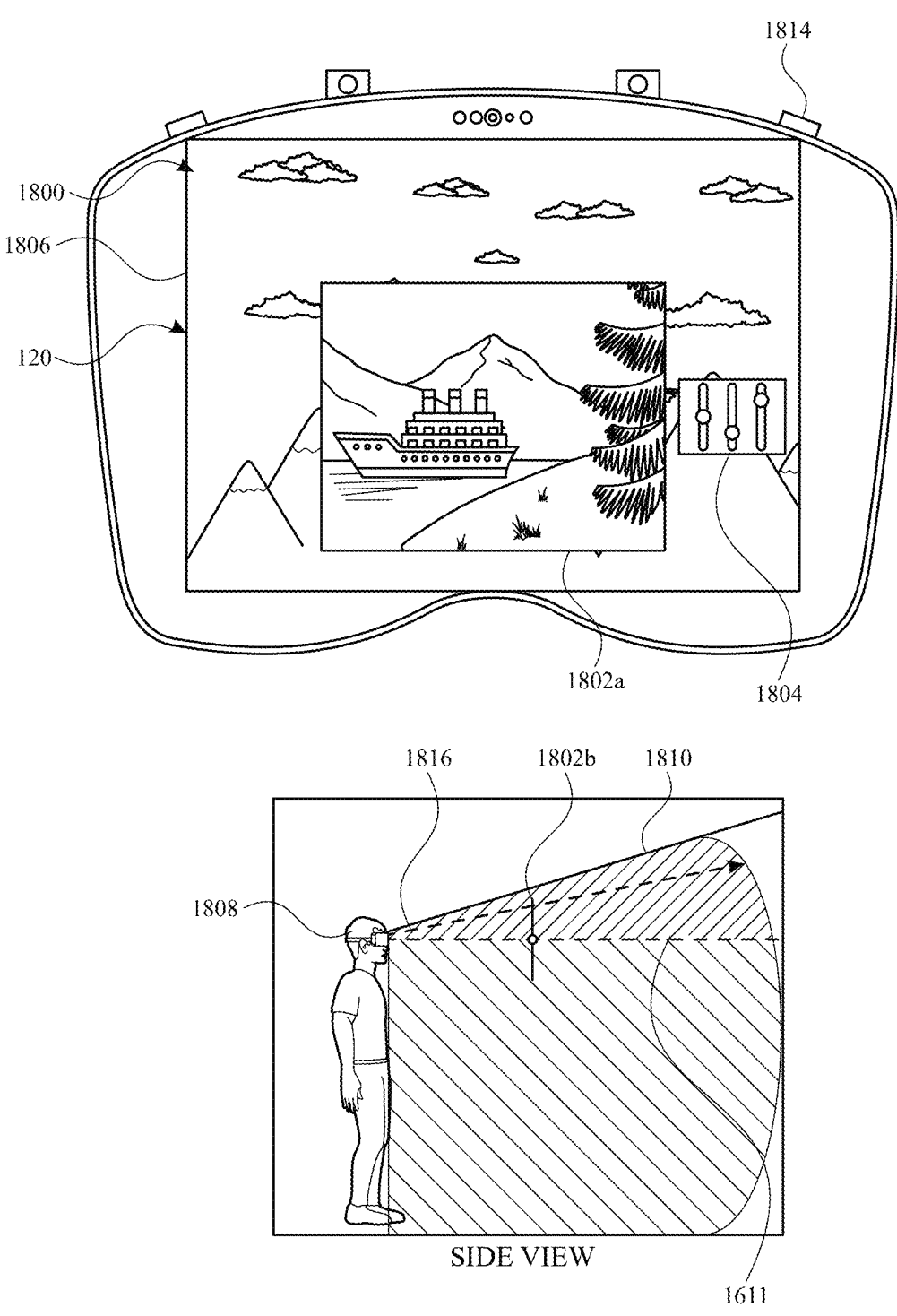
Figure 18H:
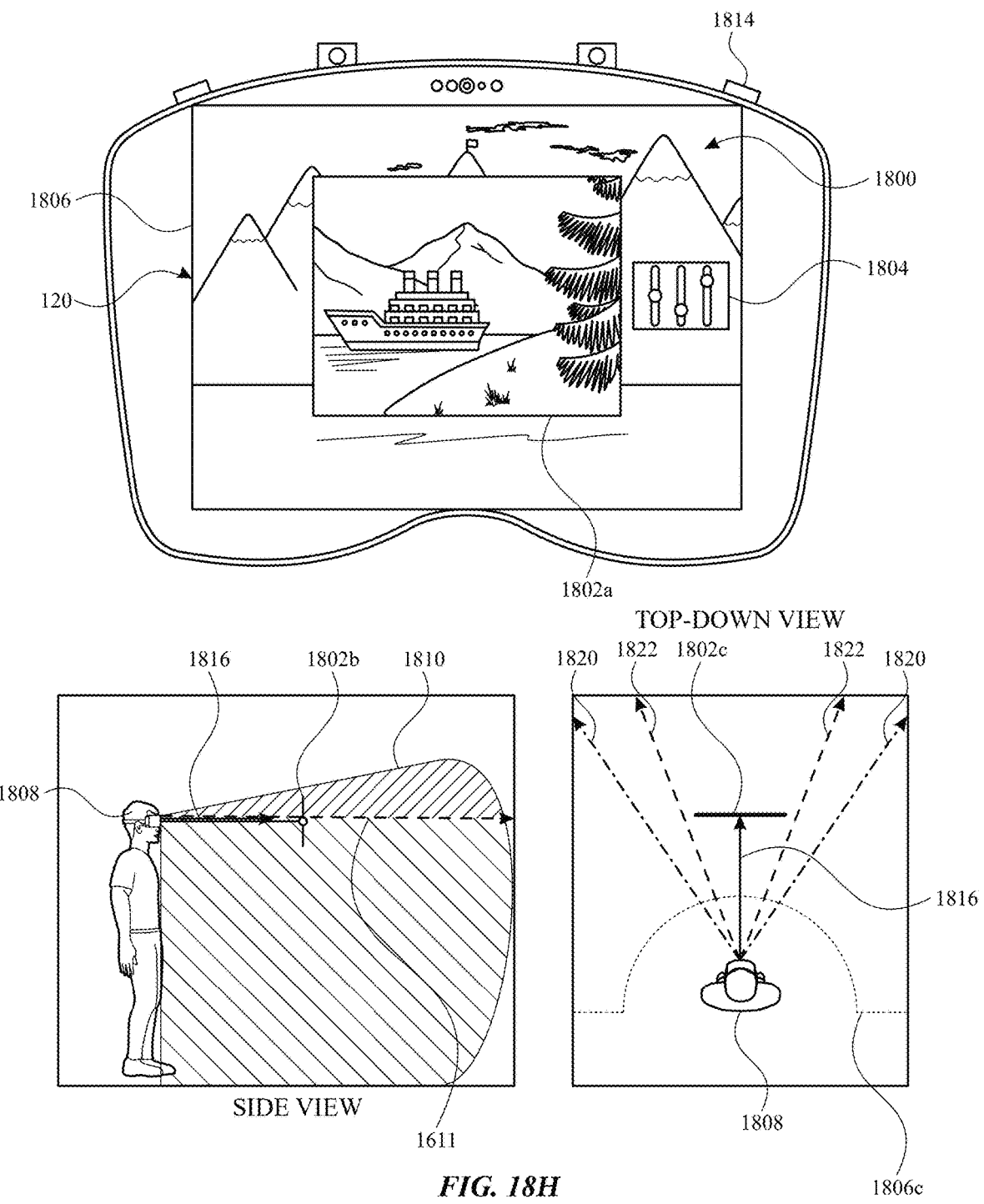
Figure 181:
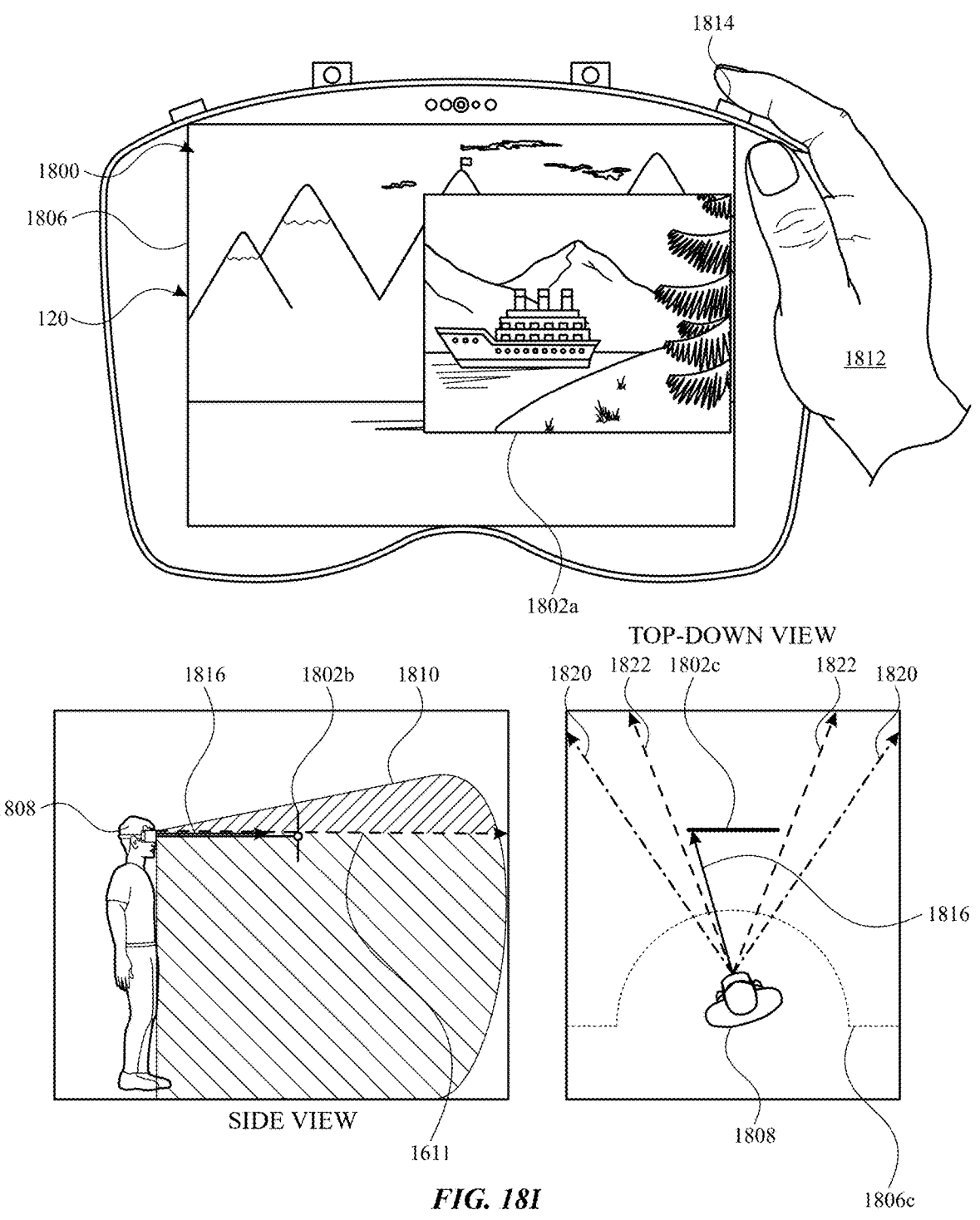
Figure 18J:
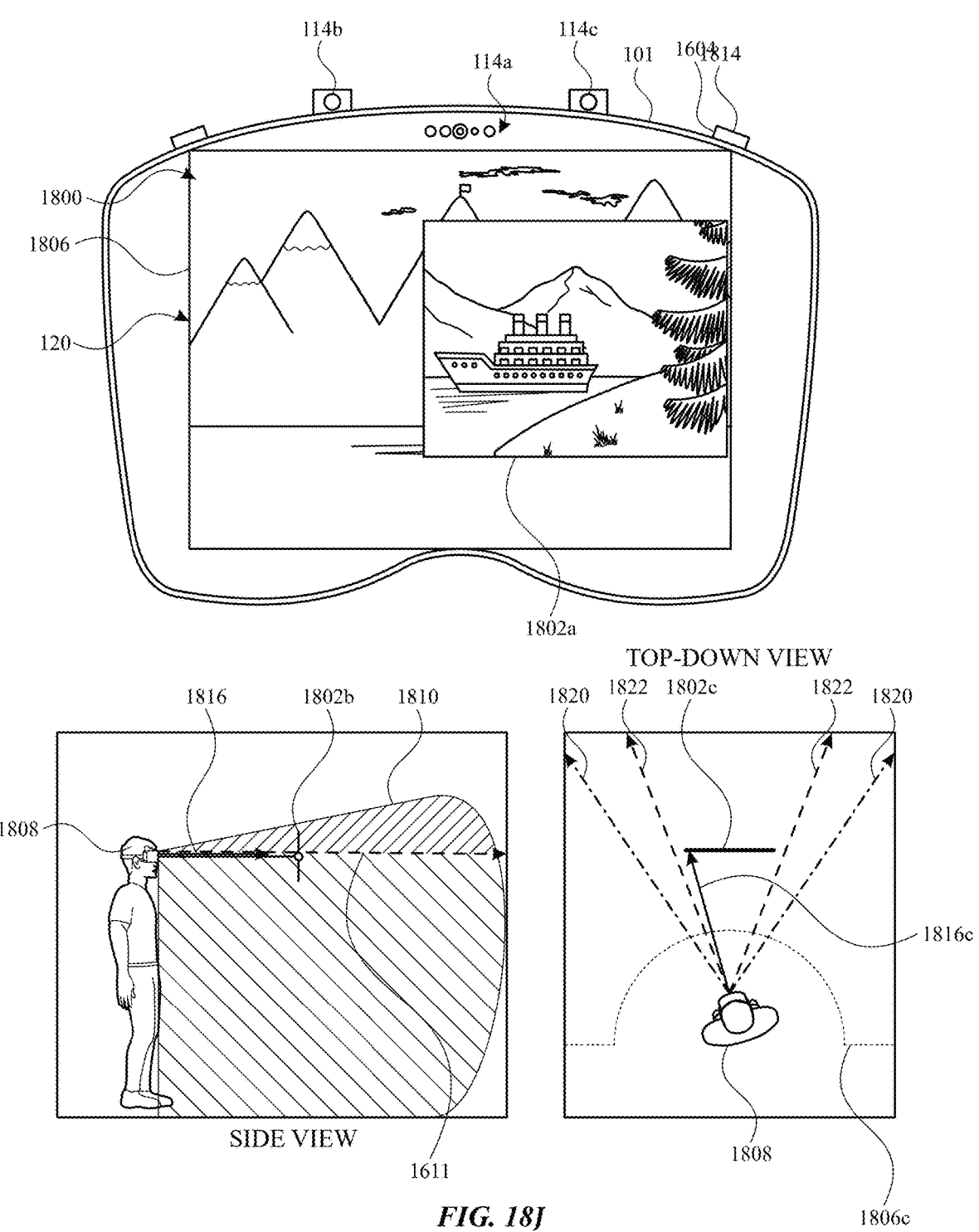
Figure 18K:
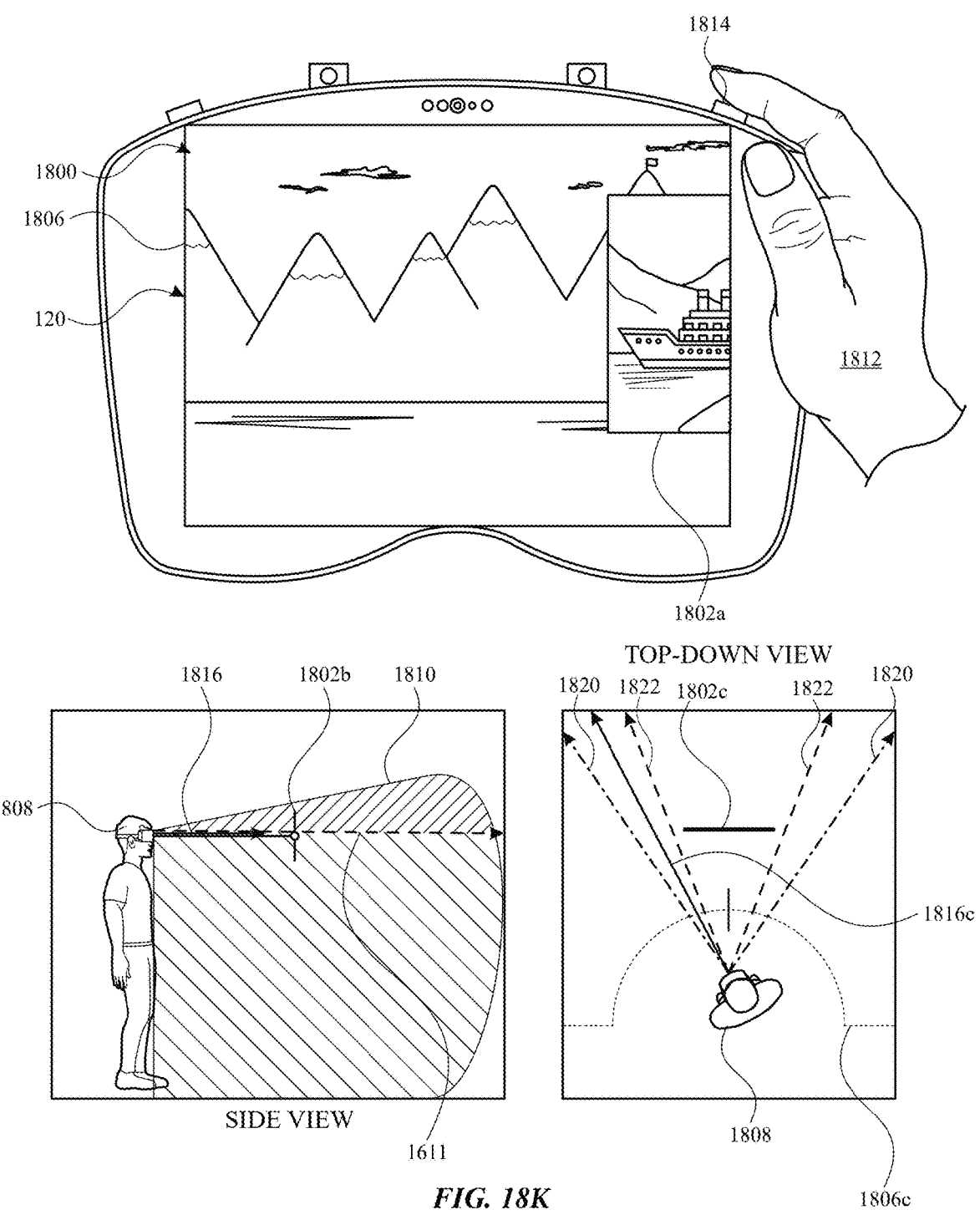
Figure 18L:
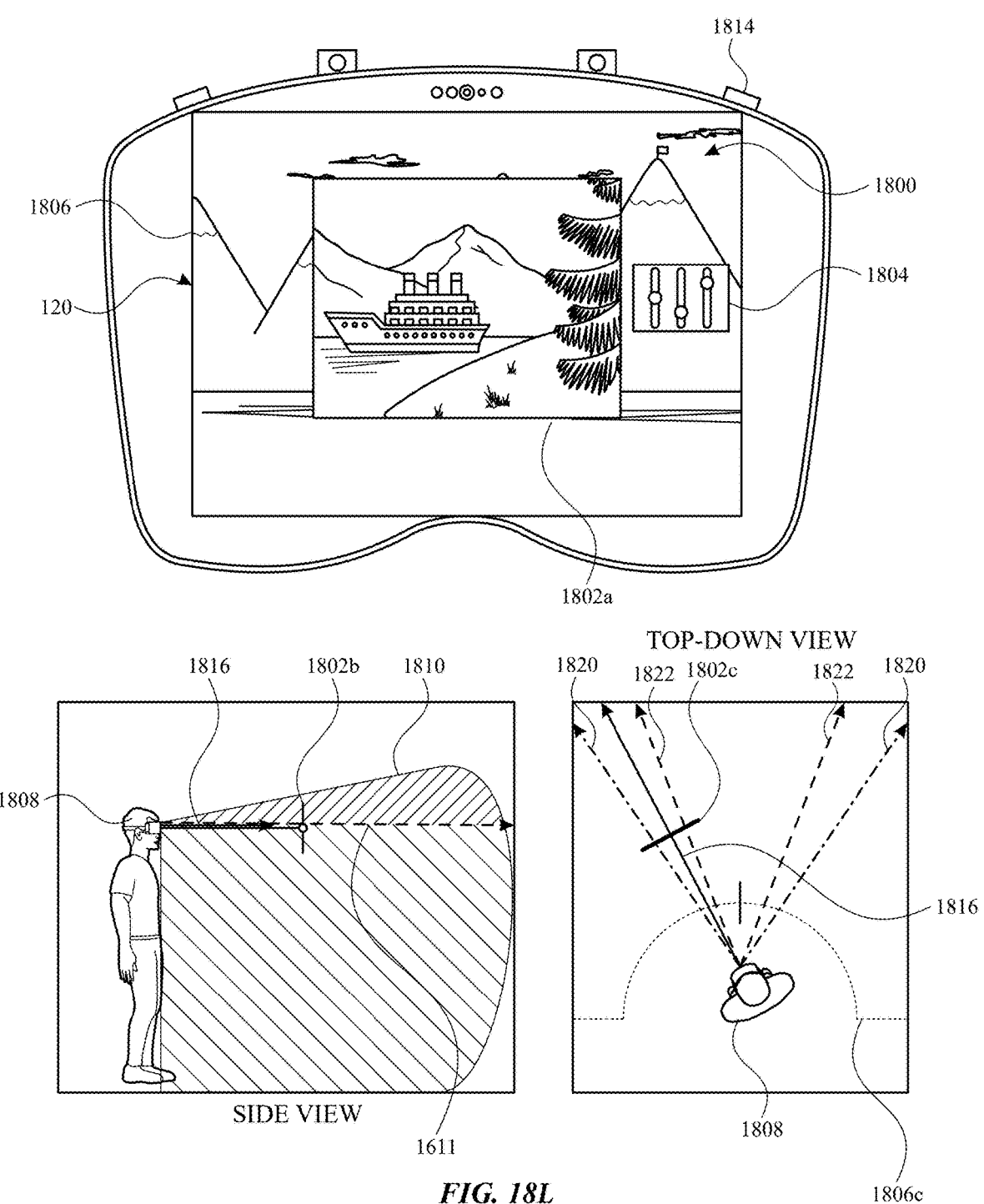
Figure 18M:
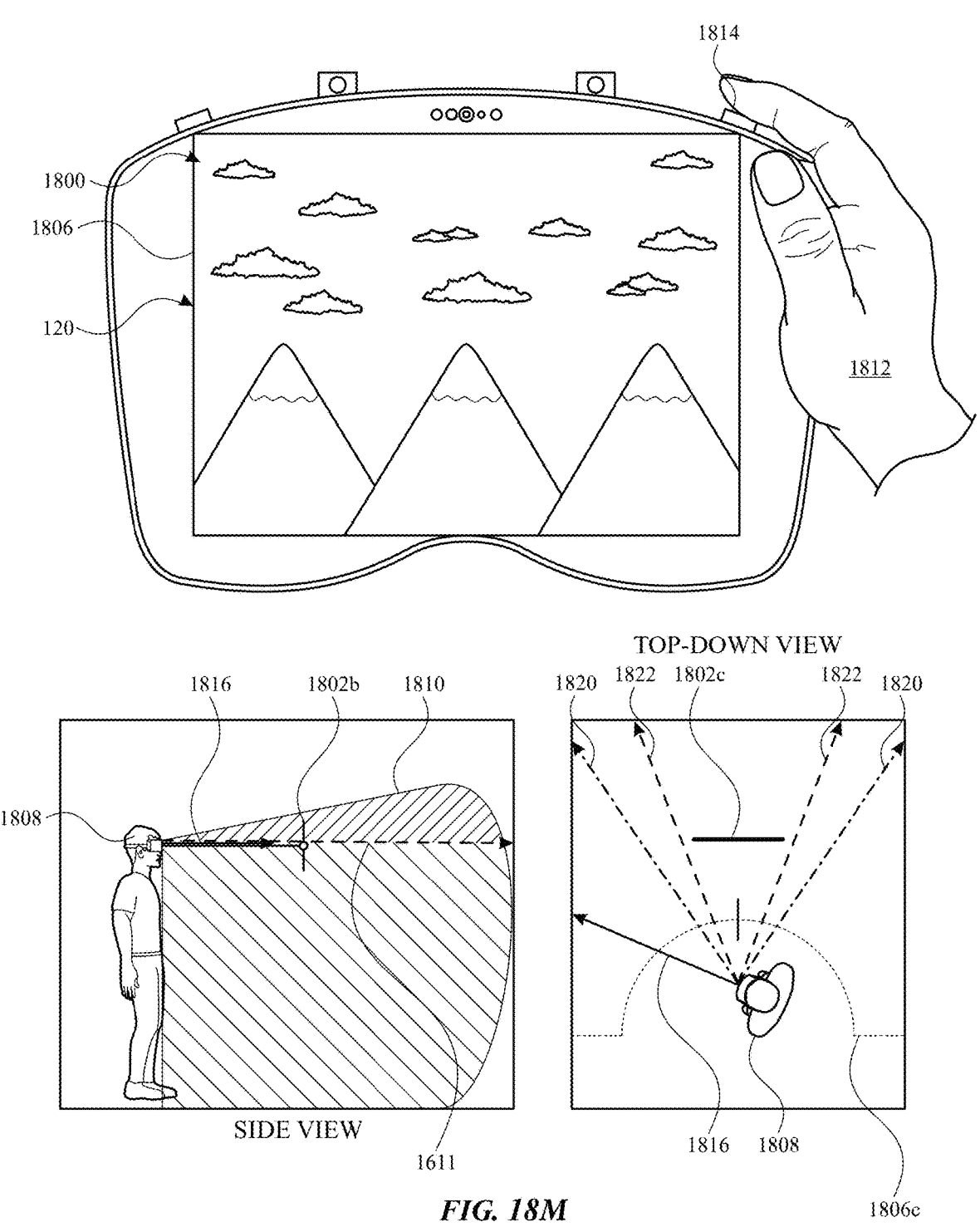
Figure 18N:
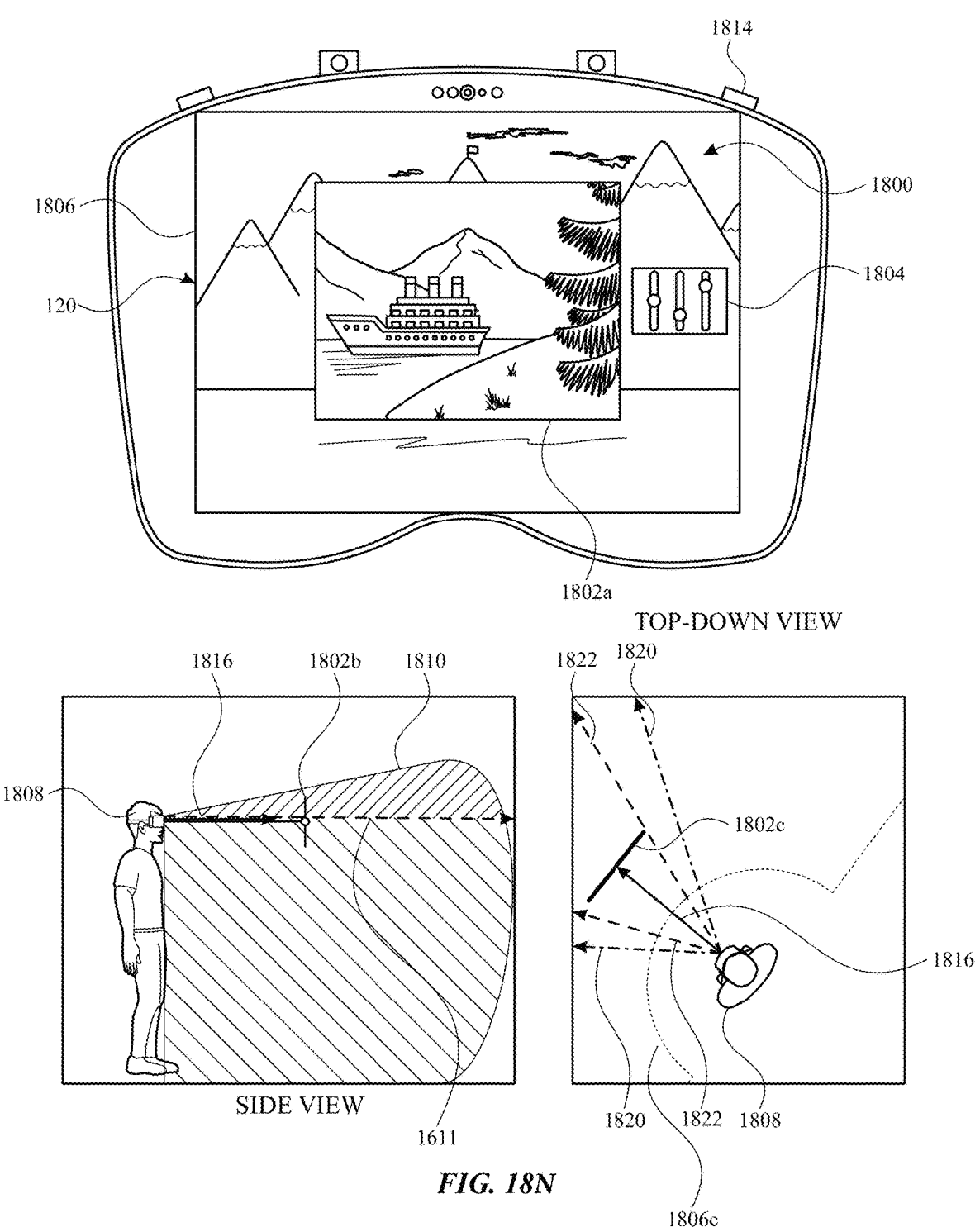
Figure 18O:
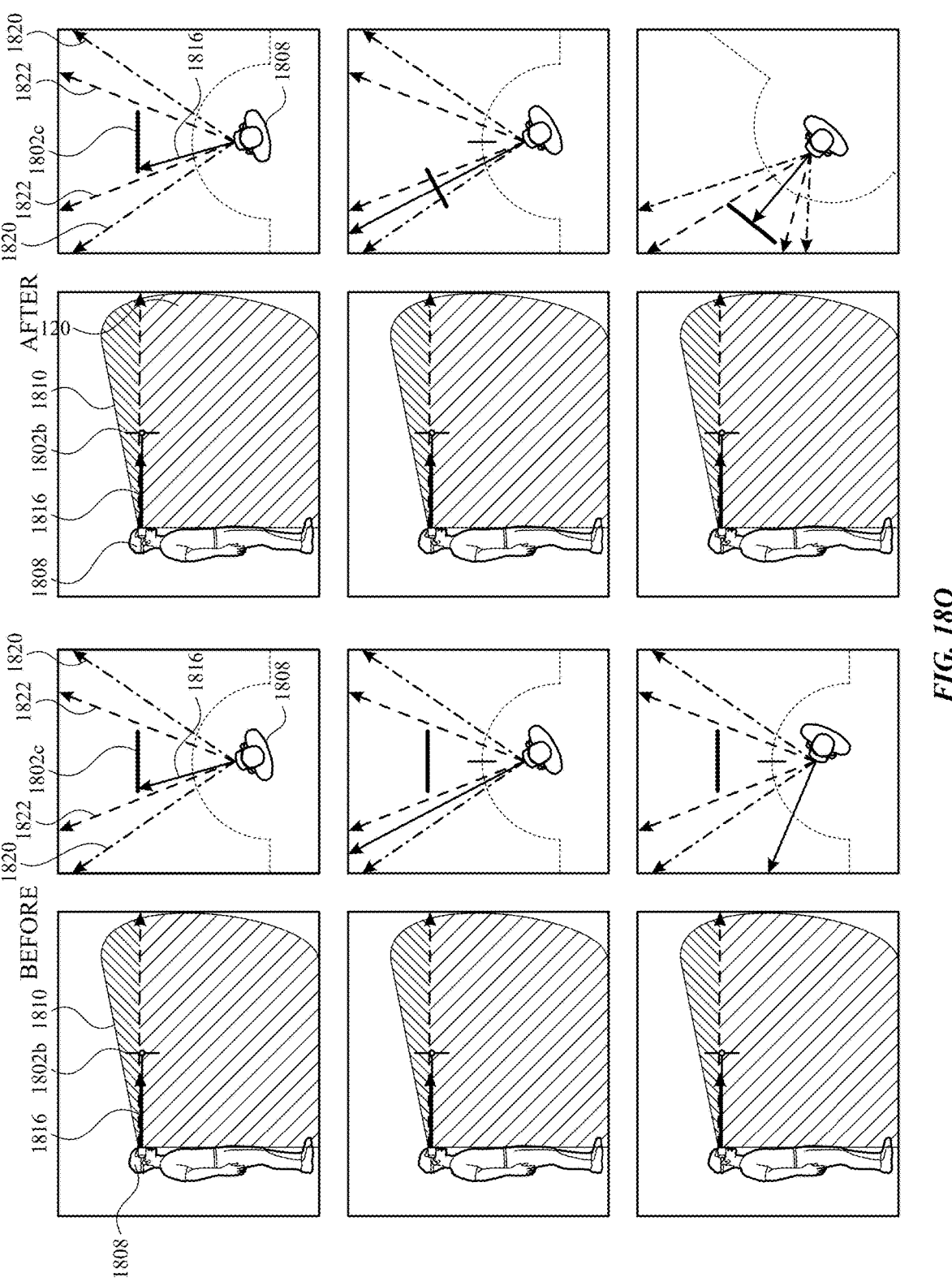
Figure 18P:
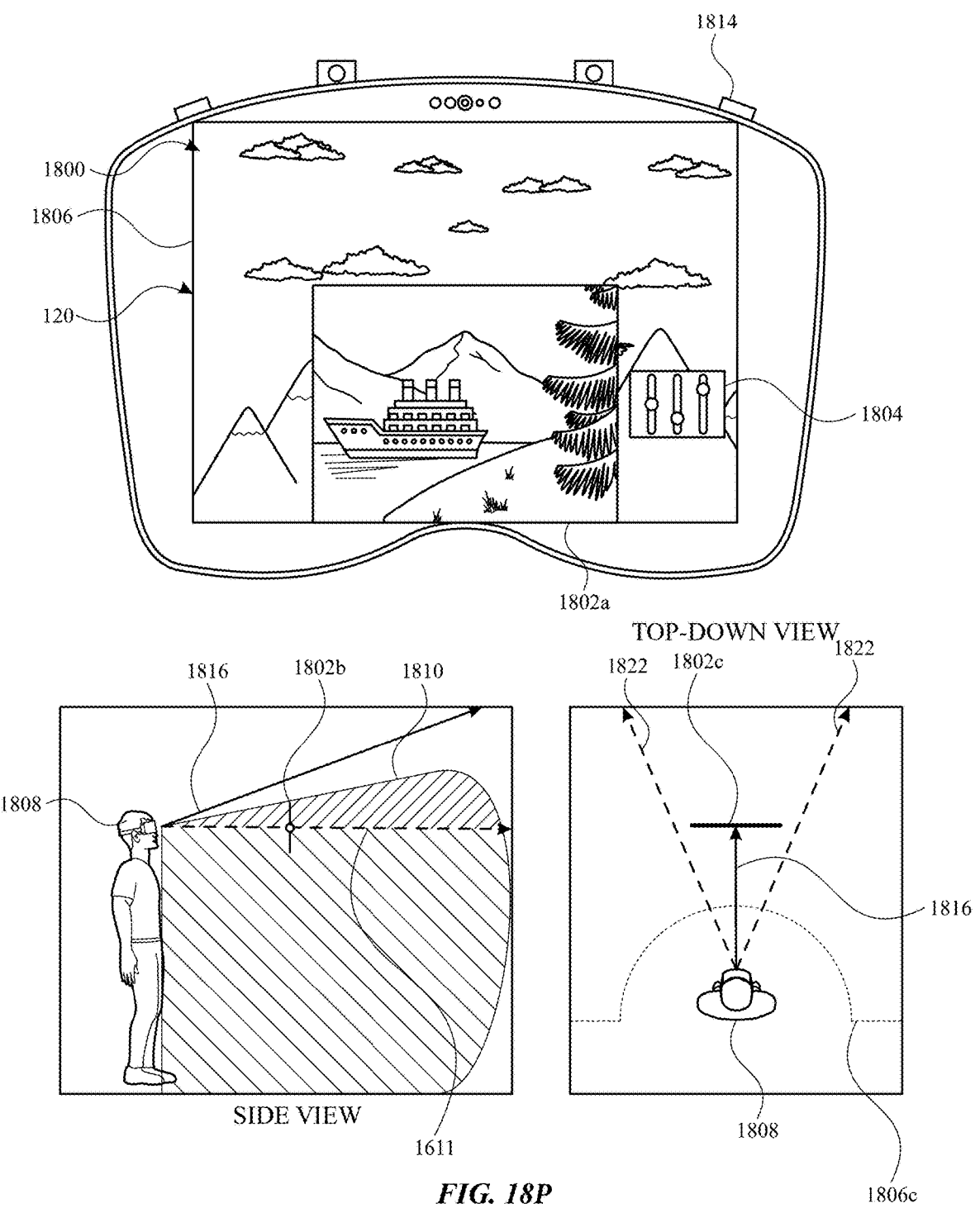
Figure 18Q:
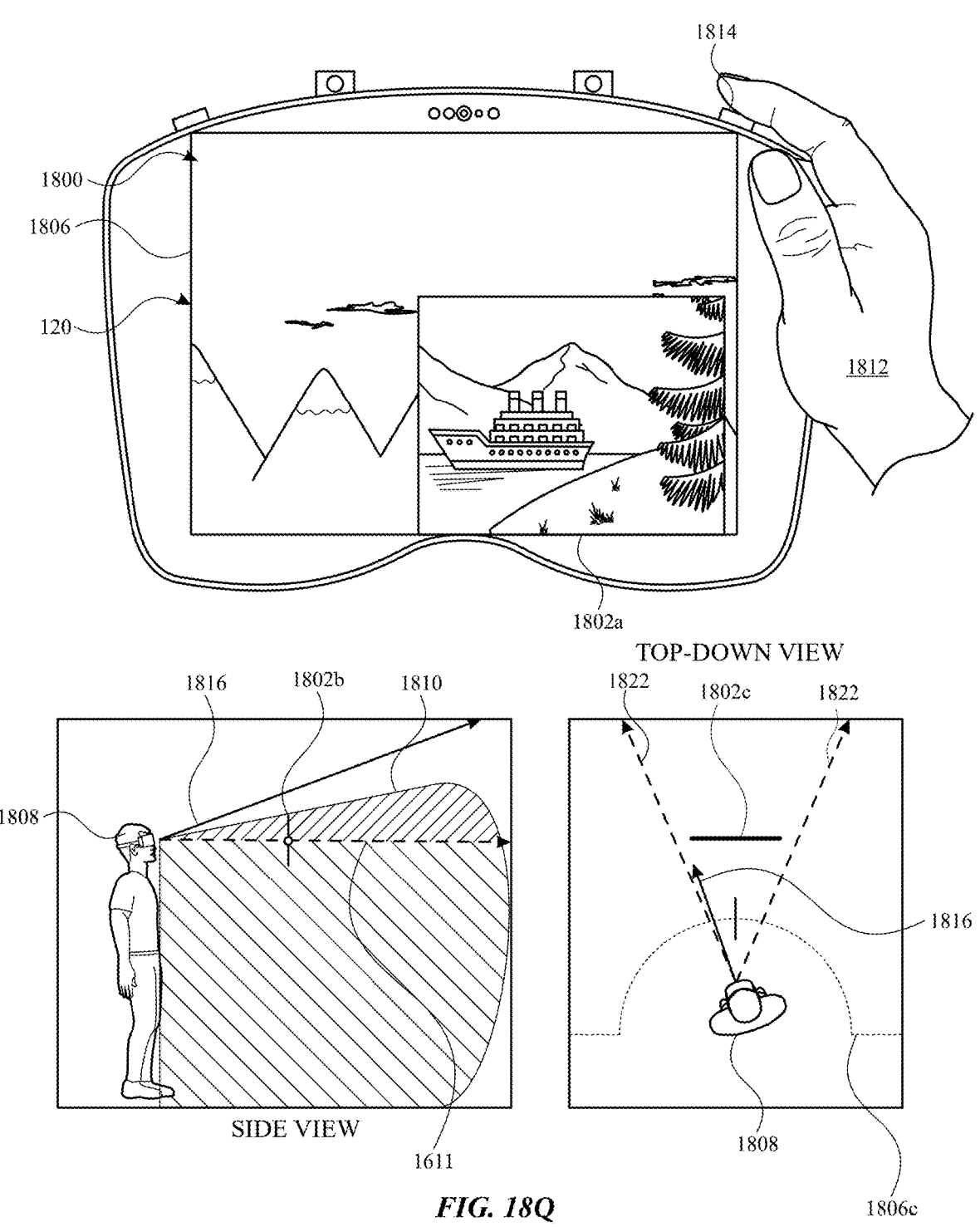
Figure 18R:
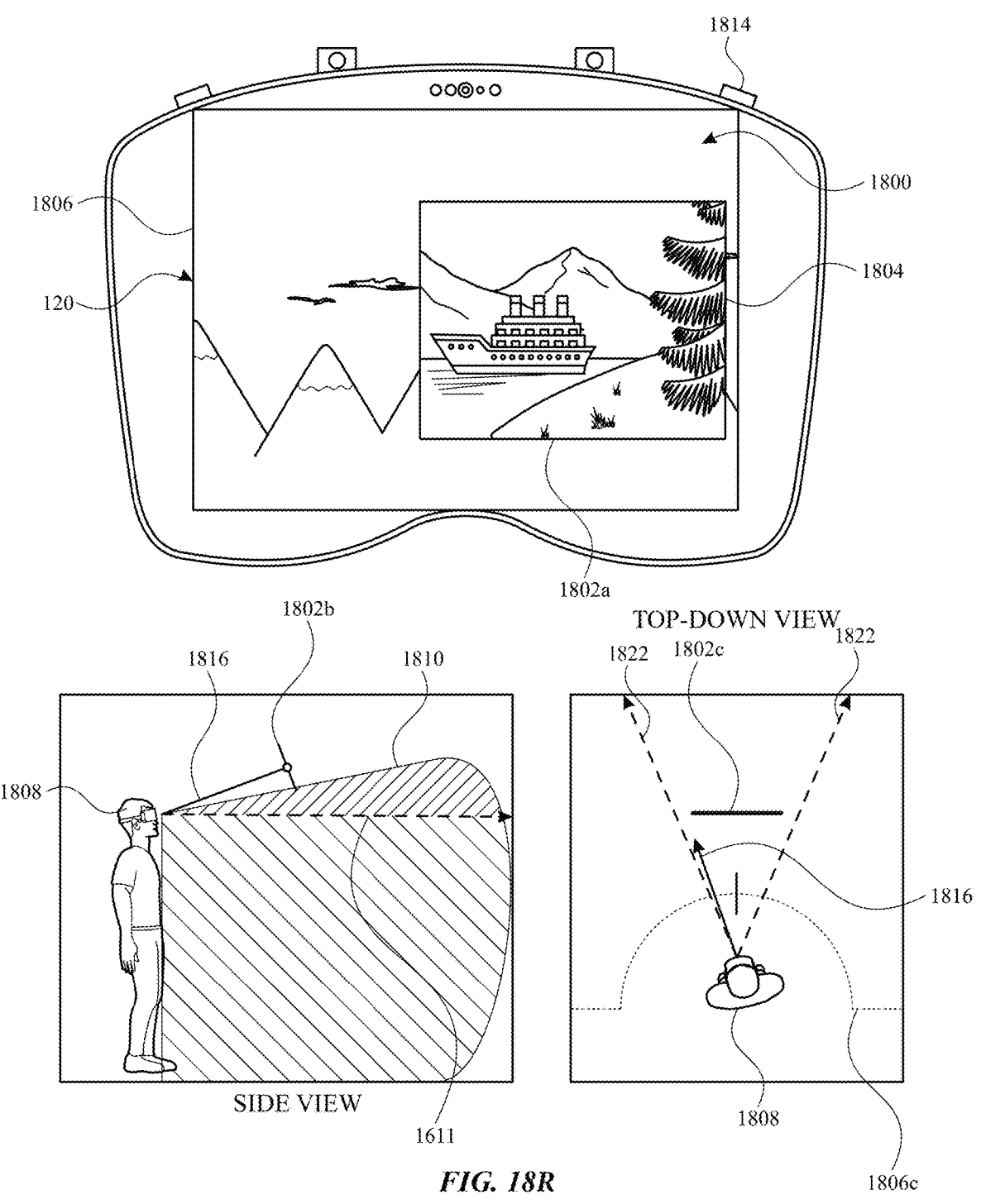
Figure 18S:
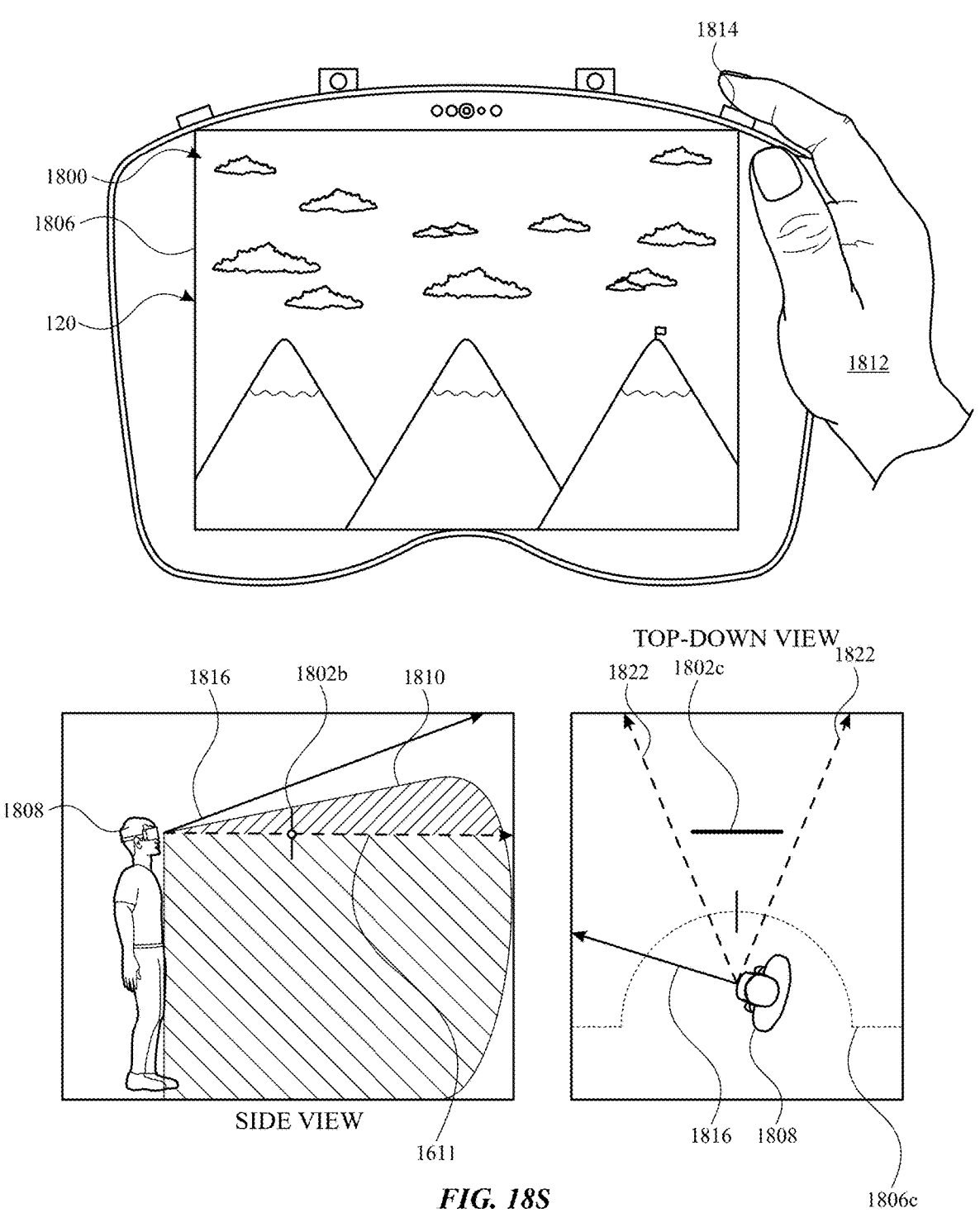
Figure 18T:
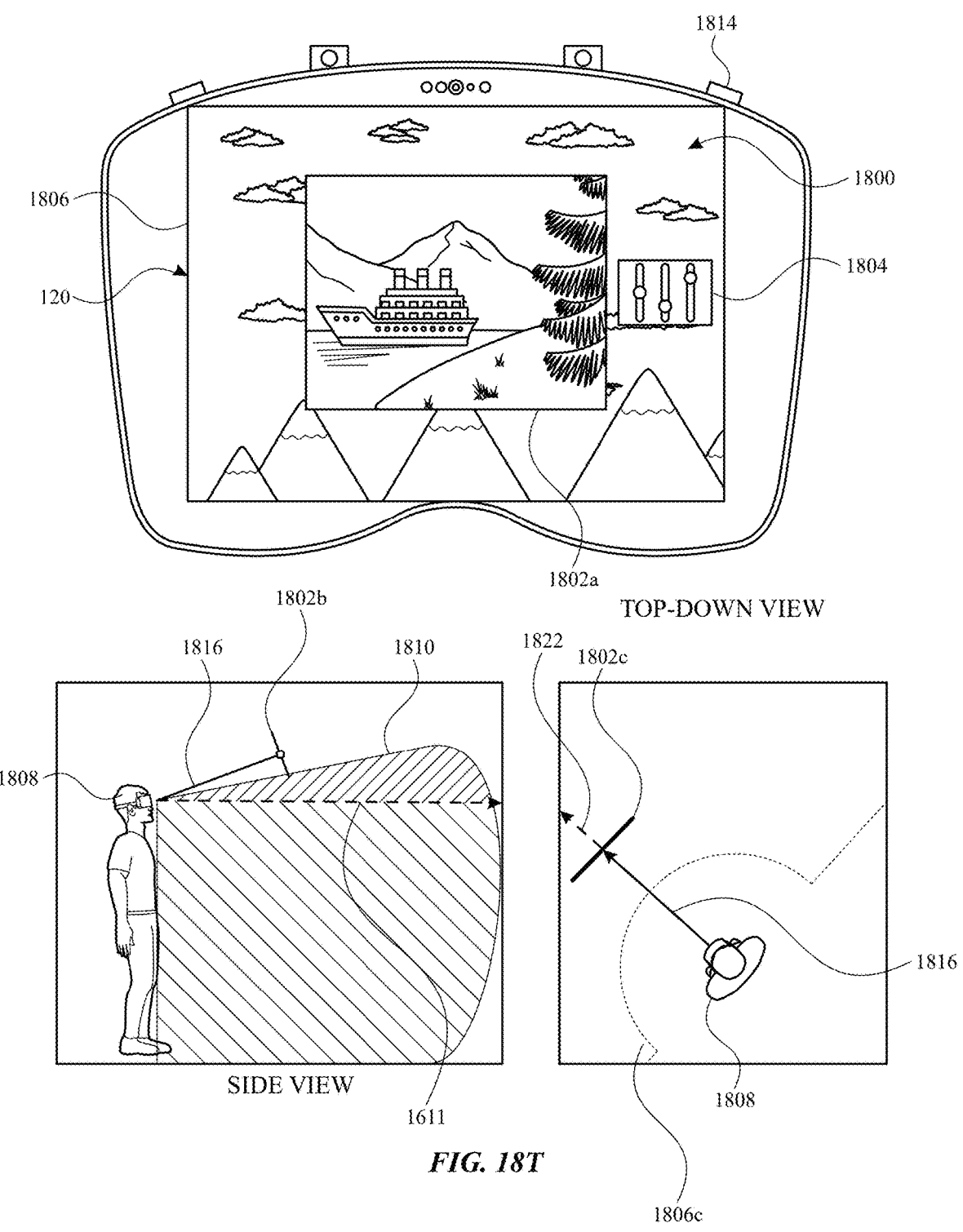
Figure 19:
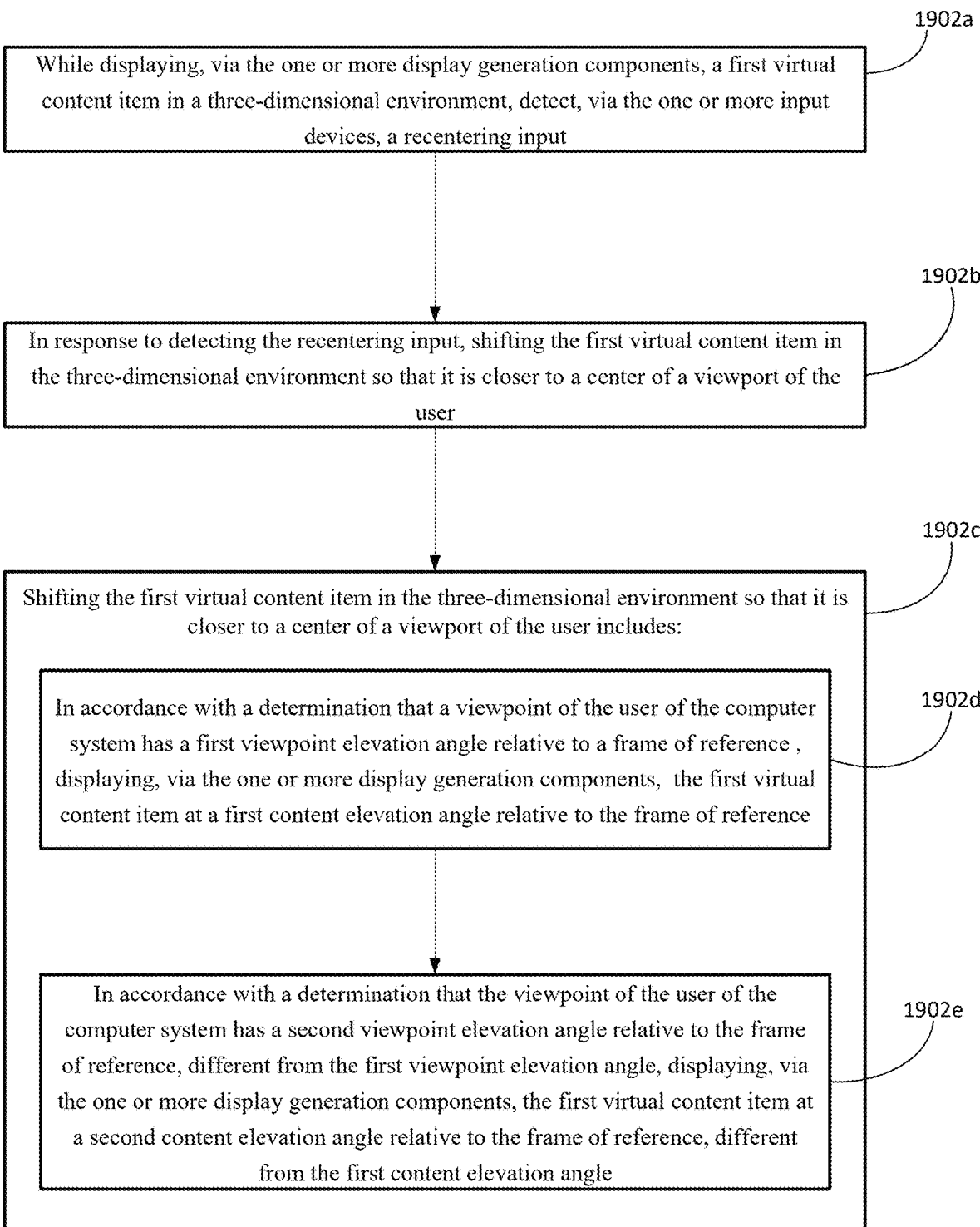
FIG. 19 is a flowchart illustrating an exemplary method of facilitating docking of a content item in a virtual environment based on an input angle of elevation and viewpoint yaw in accordance with some embodiments.

FIGS. 1A-6 provide a description of example computer systems for providing XR experiences to users (such as described below with respect to methods 800, 1000, 1200, 1300, 1500, 1700, 1900, and/or 2100). FIGS. 7A-7AL illustrate examples of a computer system switching a representation of a first content item at a docked position in a three-dimensional environment with a representation of a second content item in the three-dimensional environment in response to detecting user input, in accordance with some embodiments. FIG. 8 is a flowchart illustrating an exemplary method of switching a representation of a first content item at a docked position in a three-dimensional environment with a representation of a second content item in the three-dimensional environment in response to detecting user input, in accordance with some embodiments. The user interfaces in FIGS. 7A-7AL are used to illustrate the processes in FIG. 8. FIGS. 9A-9X illustrate examples of a computer system switching from displaying a first virtual three-dimensional environment to displaying a second virtual three-dimensional environment in response to user input while displaying a representation of a first content item at a docked position, in accordance with some embodiments. FIG. 10 is a flowchart illustrating an exemplary method of switching from displaying a first virtual three-dimensional environment to displaying a second virtual three-dimensional environment in response to user input while displaying a representation of a first content item at a docked position, in accordance with some embodiments. The user interfaces in FIGS. 9A-9X are used to illustrate the processes in FIG. 10. FIGS. 11A-11AO illustrate examples of a computer system detecting and responding to events corresponding to requests to move virtual content and/or a frame for virtual content in a three-dimensional environment and/ or detecting and responding to events corresponding to requests to transition a mode of display of the virtual content in the three-dimensional environment in accordance with some embodiments. The illustrated examples of FIGS. 11A-11AO, such as the illustrated user interfaces therein, are used to illustrated the processes in FIGS. 12 and 13. FIGS. 14A-14M illustrate examples of a computer system displaying a first framing element concurrently with a representation of a content item having different degrees of transparency and in response to detecting an input. FIG. 15 is a flowchart illustrating an exemplary method of displaying a first framing element concurrently with a representation of a content item having different degrees of transparency and in response to detecting an input. The user interfaces in FIGS. 14A-14M are used to illustrate the processes in FIG. 15. FIGS. 16A-16P illustrate examples of a computer system facilitating docking of a content item in a virtual environment based on an input angle of elevation in accordance with some embodiments. FIG. 17 is a flowchart illustrating an exemplary method of docking a content item in a virtual environment based on an input angle of elevation in accordance with some embodiments. The user interfaces in FIGS. 16A-16P are used to illustrate the processes in FIG. 17. FIGS. 18A-18T illustrate examples of a computer system facilitating docking of a content item in a virtual environment based on an input angle of elevation and viewpoint yaw in accordance with some embodiments. FIG. 19 is a flowchart illustrating an exemplary method of facilitating docking of a content item in a virtual environment based on an input angle of elevation and viewpoint yaw in accordance with some embodiments. The user interfaces of FIGS. 18A-18T are used to illustrate the processes in FIG. 19. FIGS. 20A-20H illustrate examples of a computer system determining clusters of virtual objects and restoring virtual objects after a reboot event in accordance with some embodiments. FIG. 21 is a flowchart illustrating an exemplary method of determining clusters of virtual objects and restoring virtual objects after a reboot event in accordance with some embodiments. The user interfaces in FIGS. 20A-20H are used to illustrate the processes in FIG. 21.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people.

People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3A. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1A:
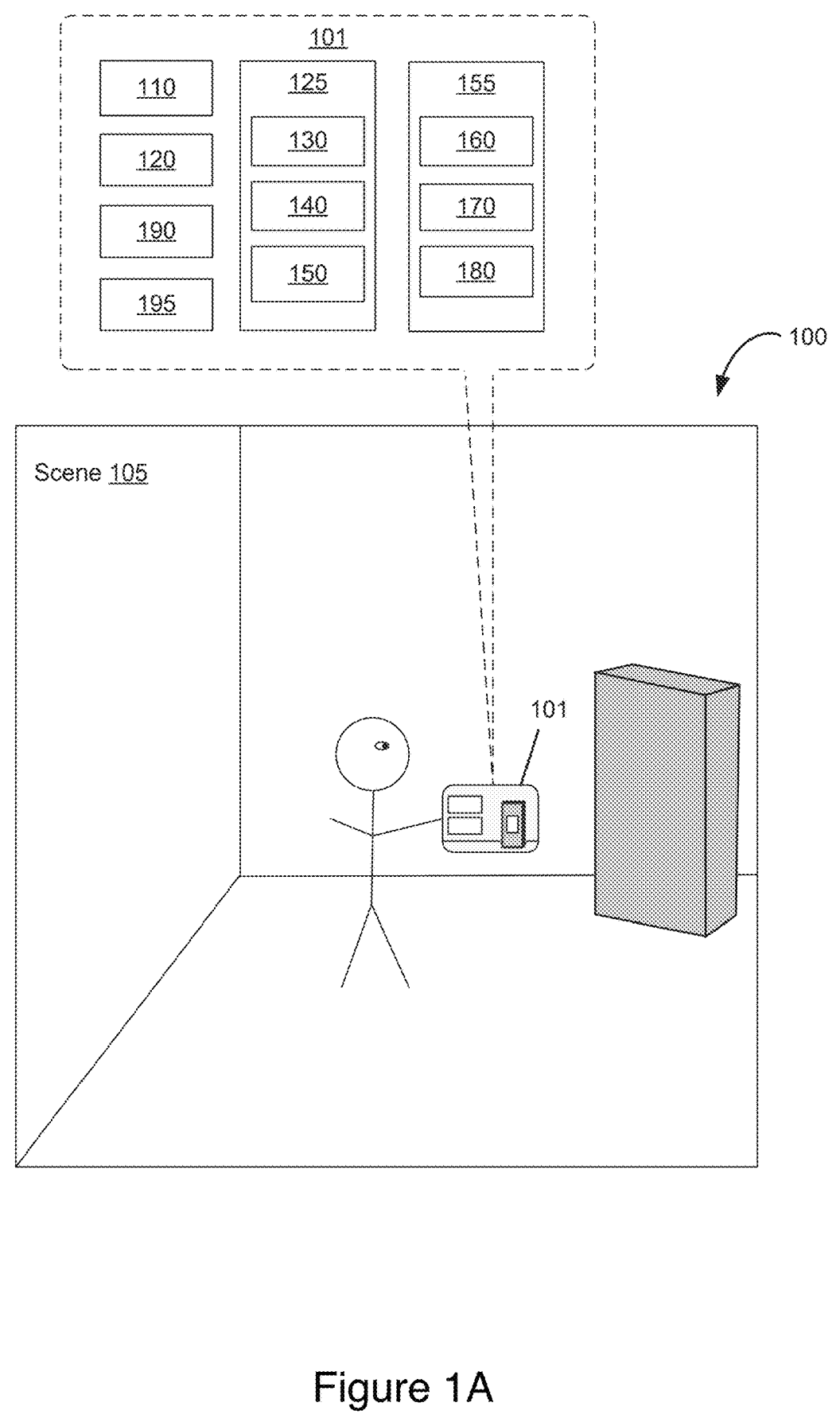
Figure 1C:
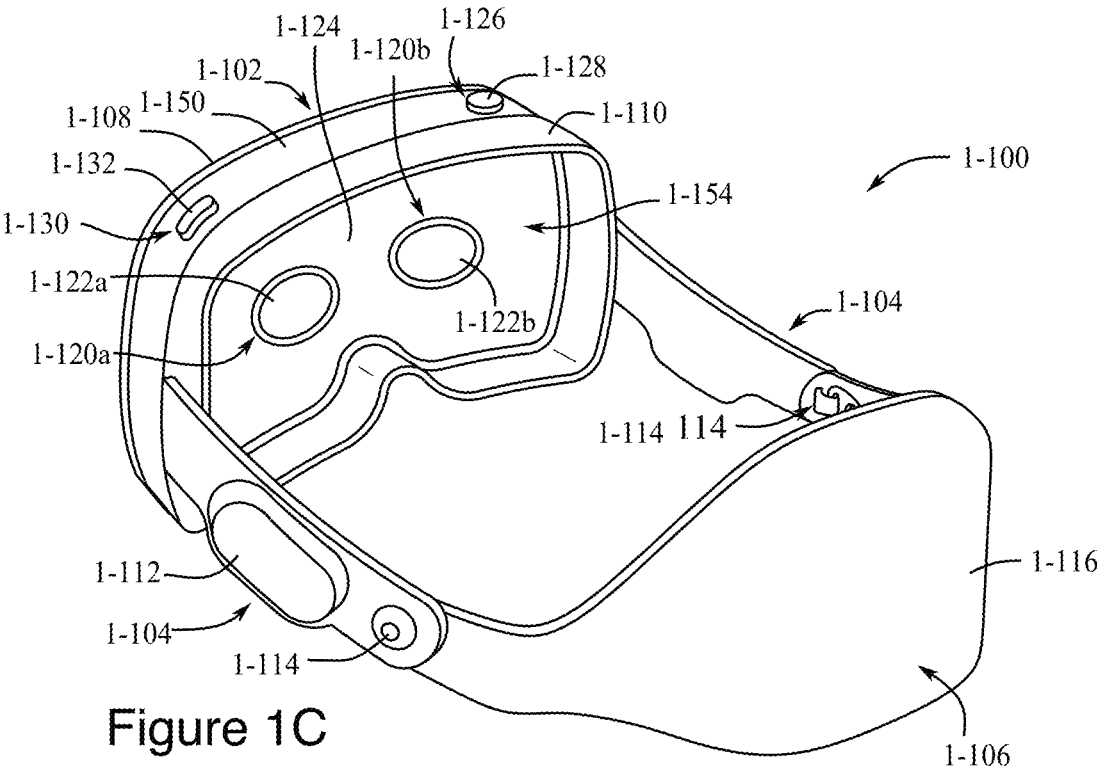
FIG. 1A is a block diagram illustrating an operating environment of a computer system for providing XR experiences in accordance with some embodiments.
Figure 1D:
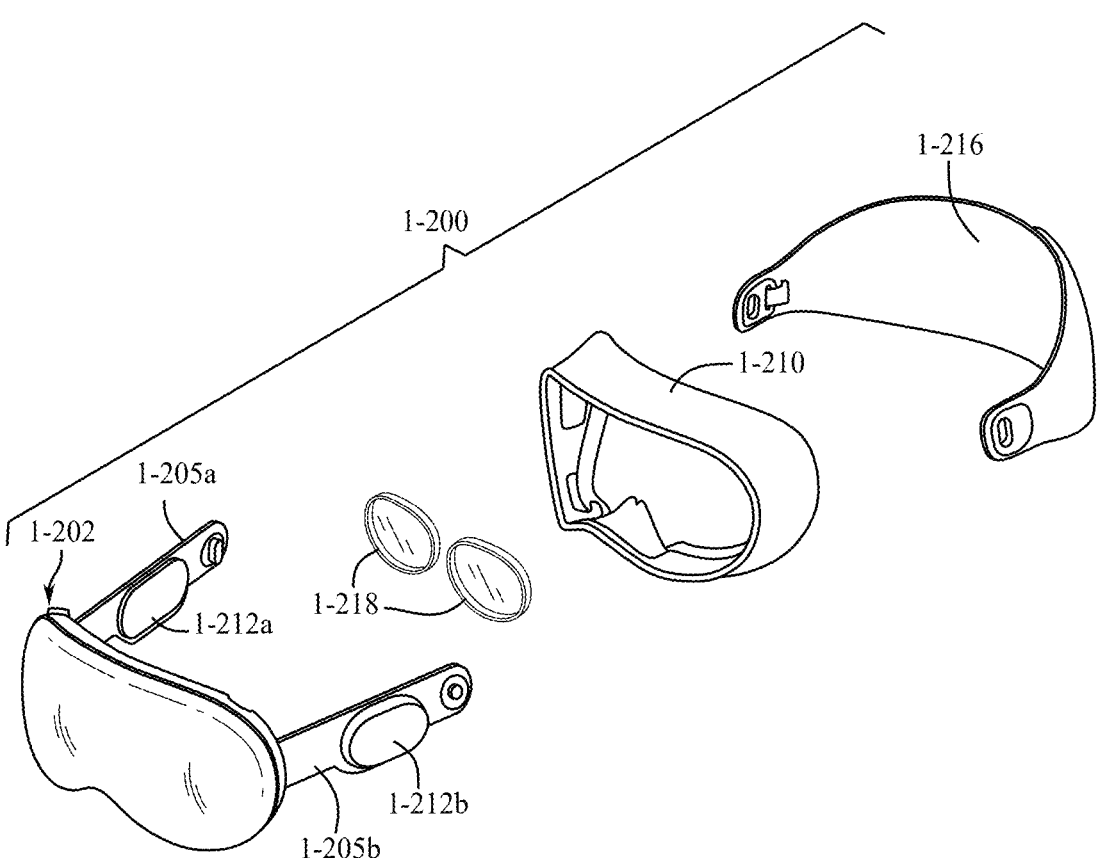
Figure 1E:
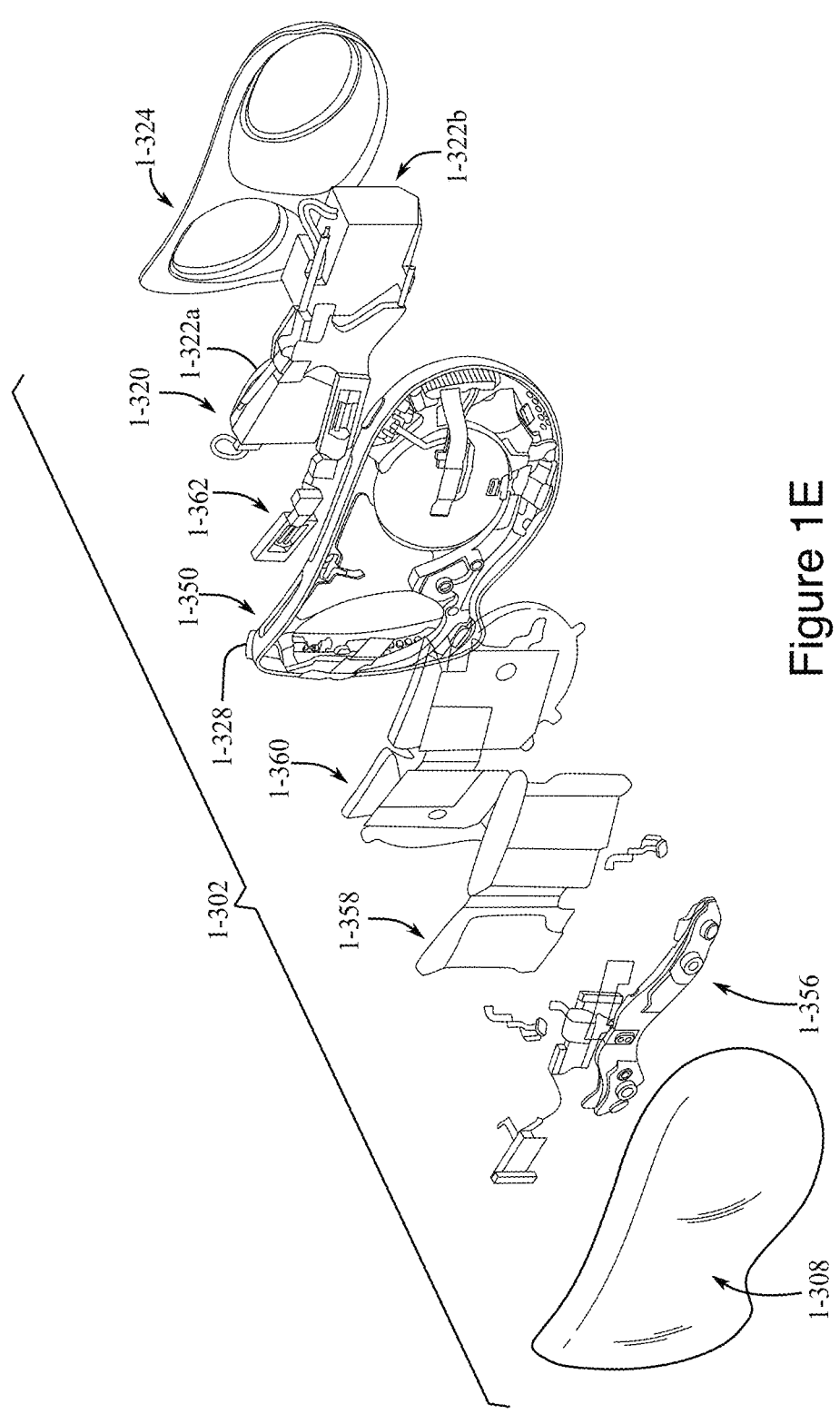
Figure 1F:
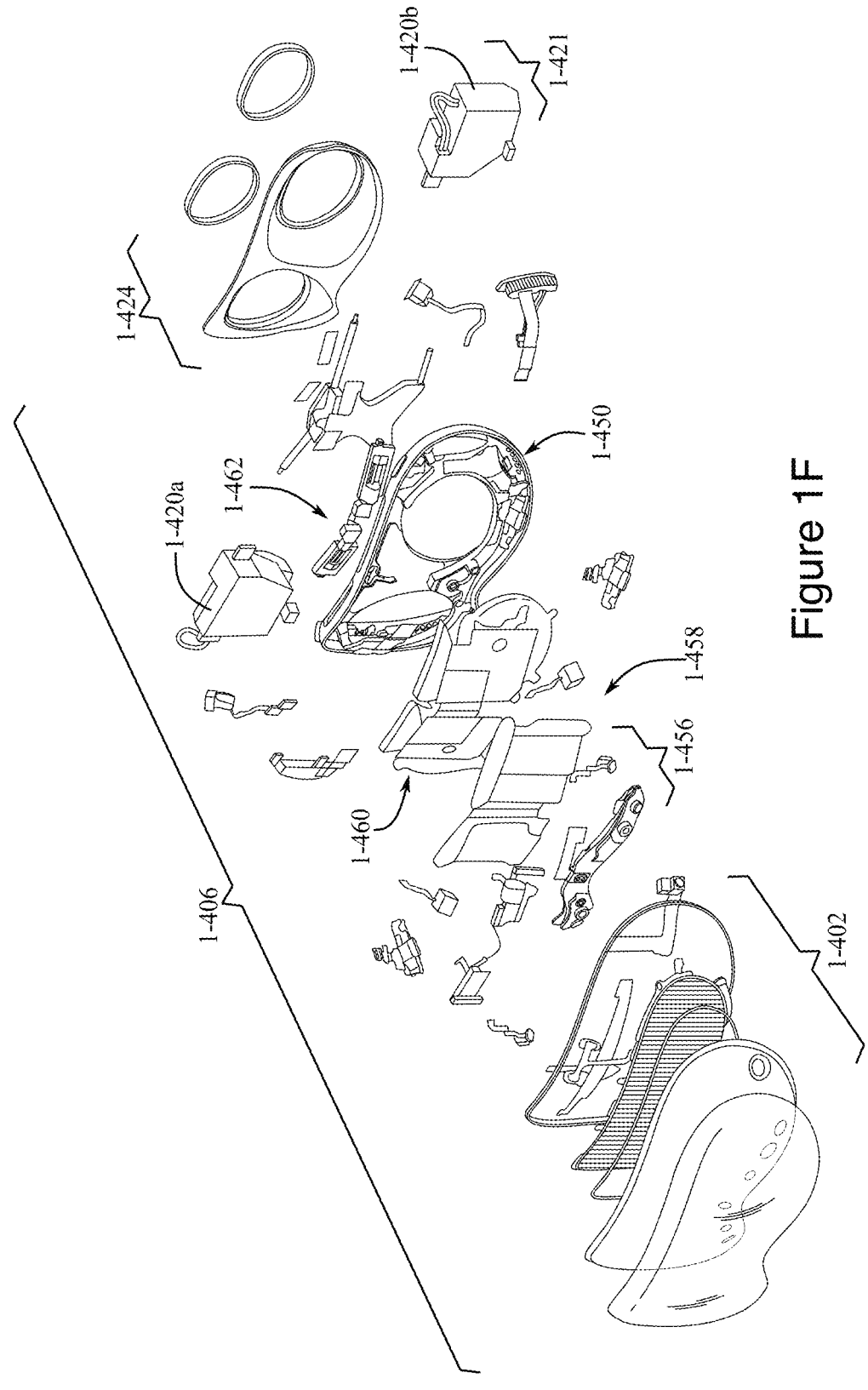
Figure 1G:
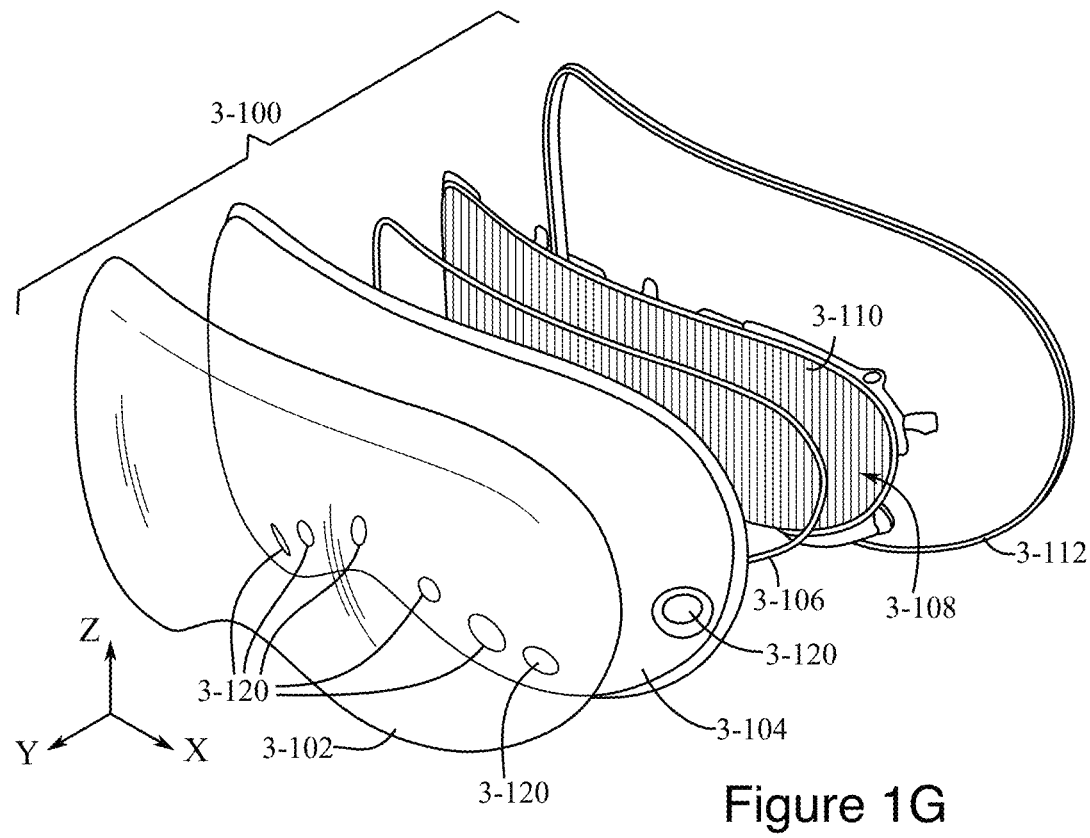
Figure 1H:
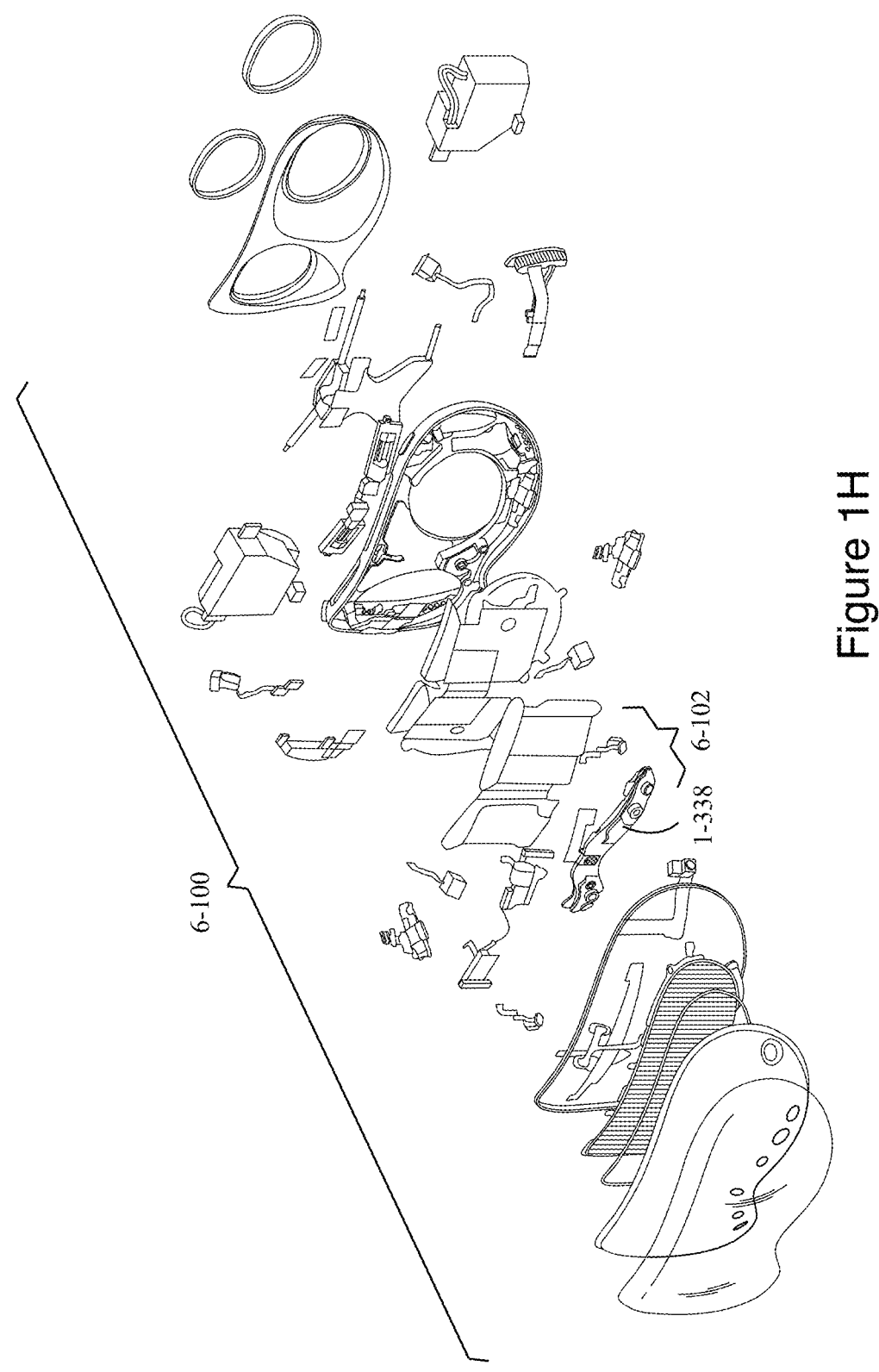
Figure 1I:
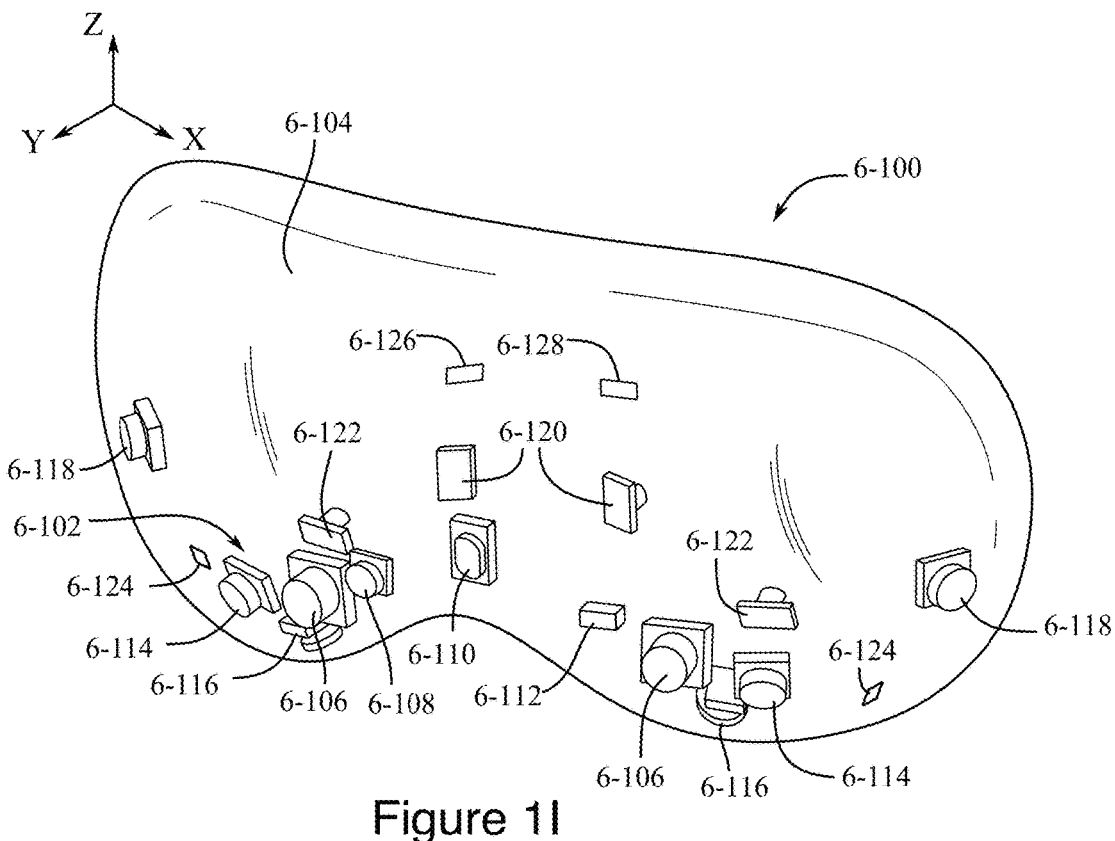
Figure 1J:
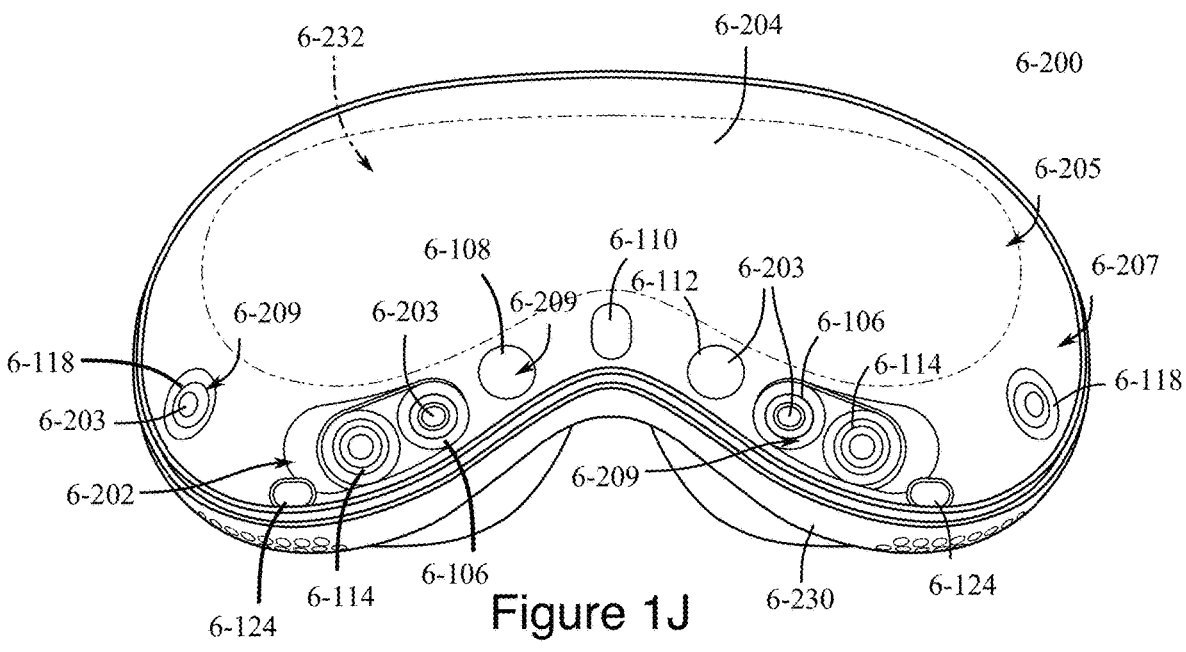
Figure 1K:
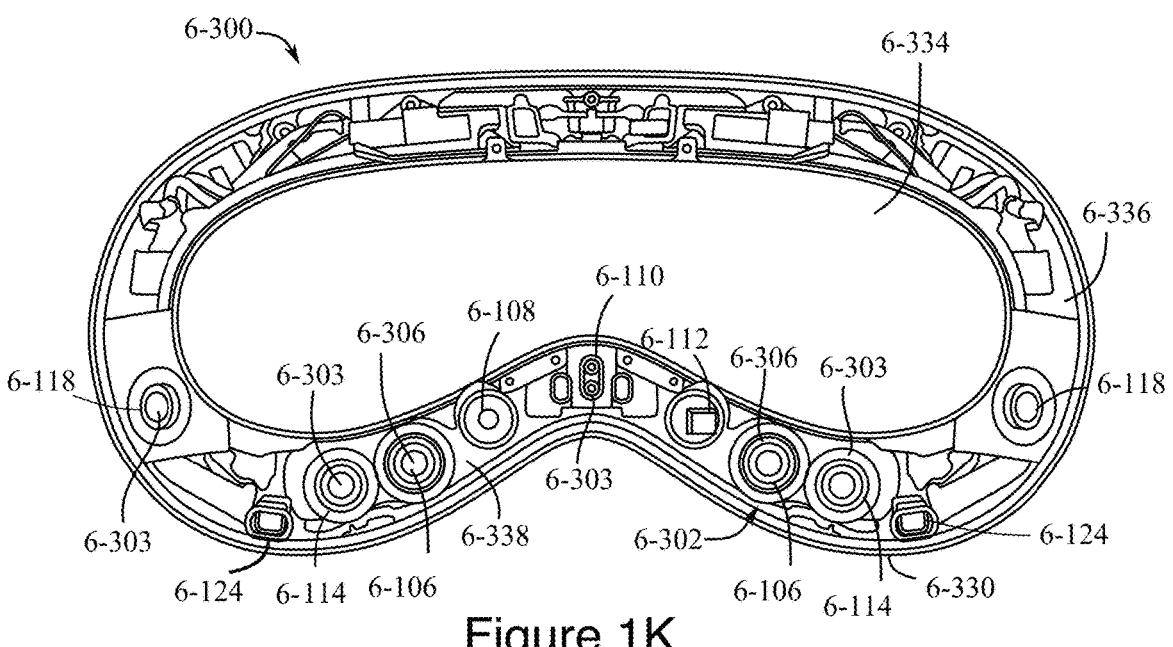
Figure 1L:
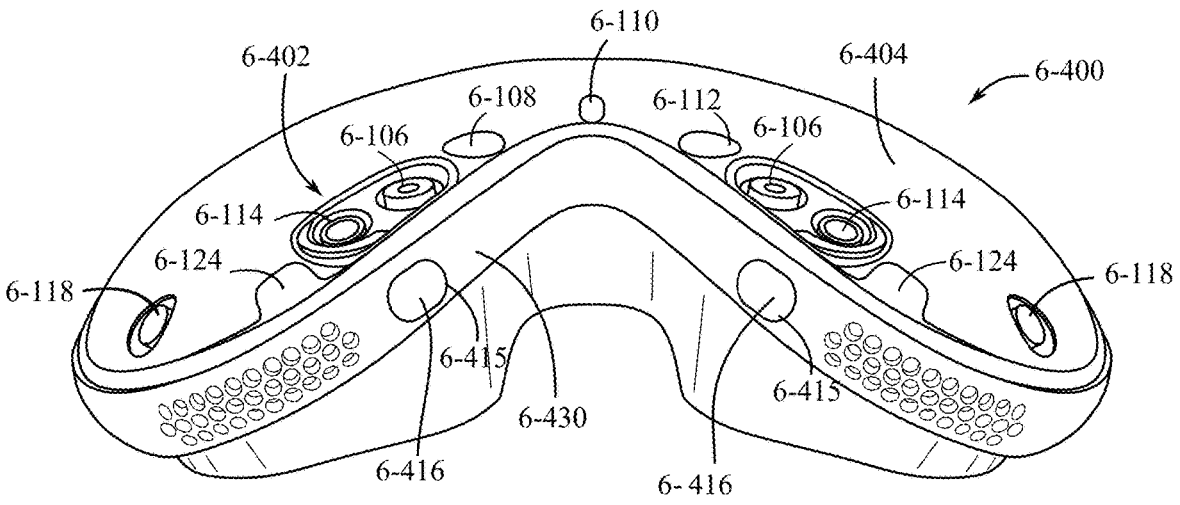
Figure 1M:
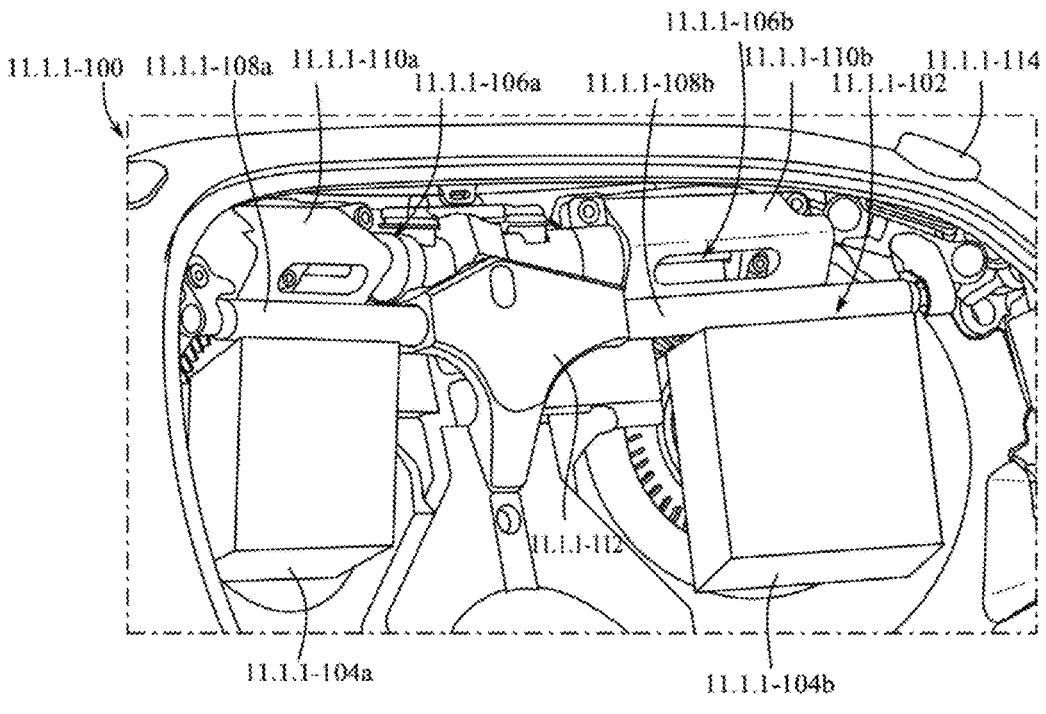
Figure 1N:
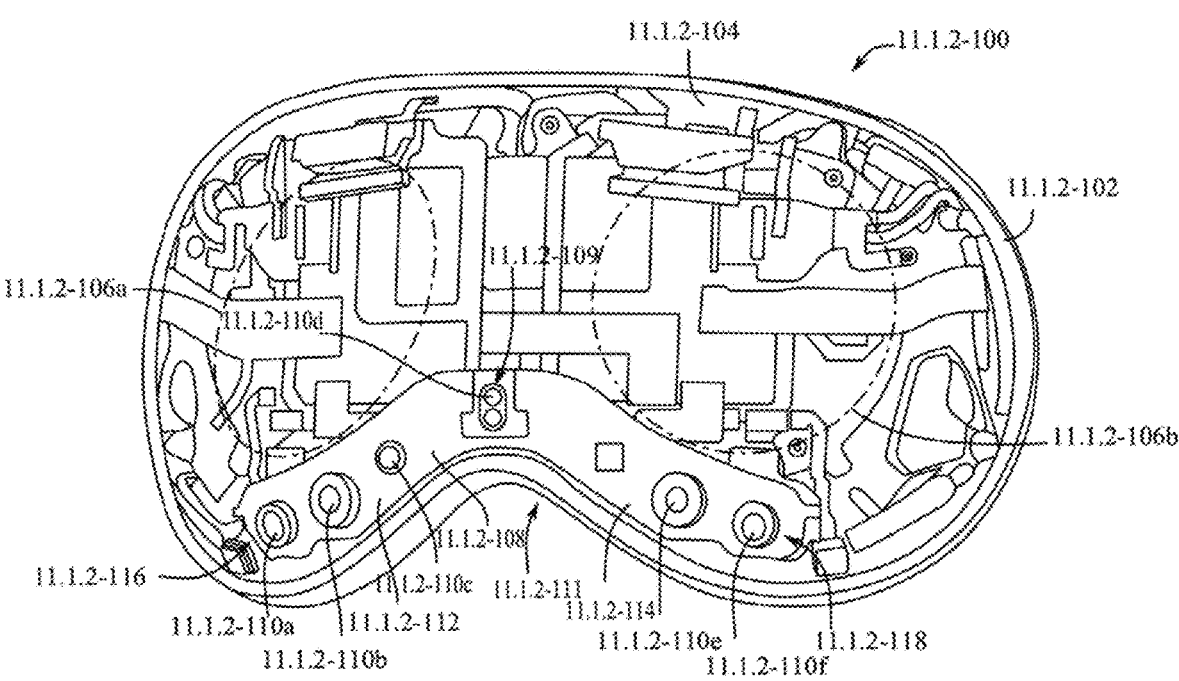
Figure 1O:
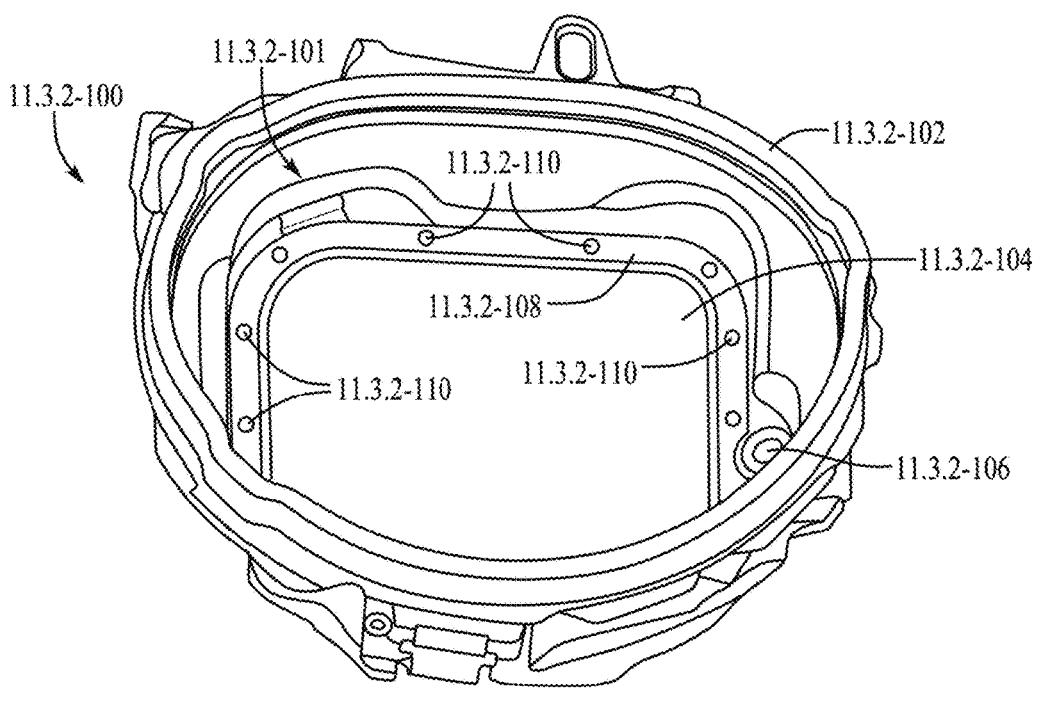
Figure 1P:
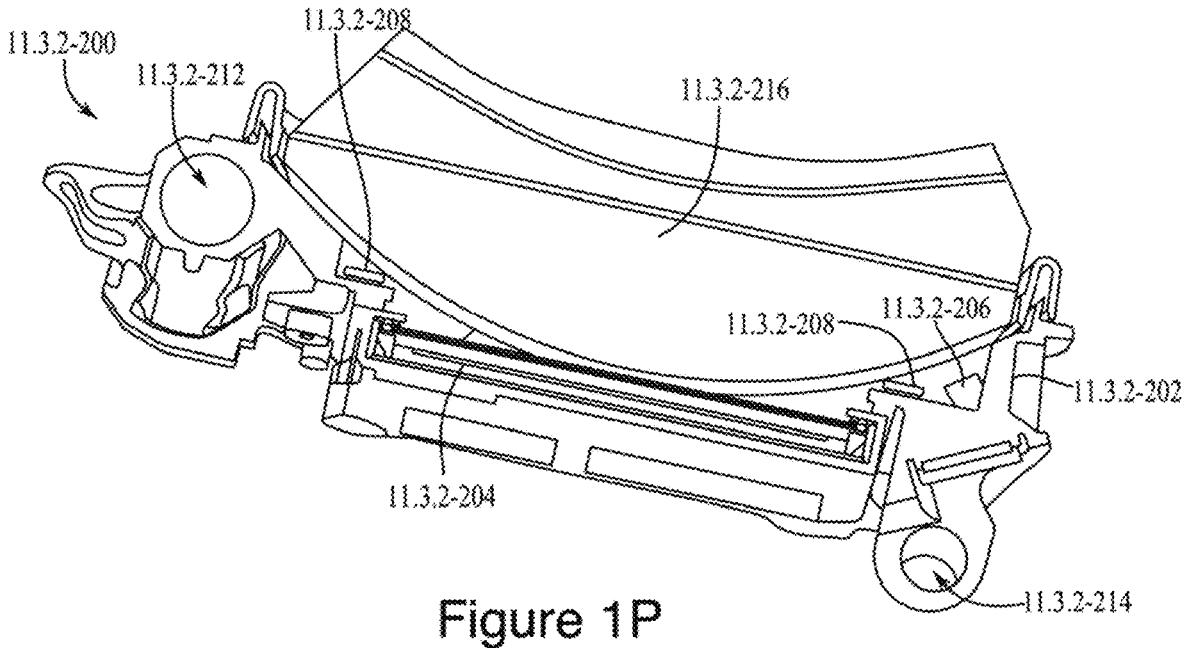

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be clastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, cither alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG.

1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and IF and described herein. Likewise, any of the features, components, and/or parts, including the arrangements and configurations thereof shown and described with reference to FIGS. 1B-1D and IF can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein.

Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, cither alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, cither alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors 11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
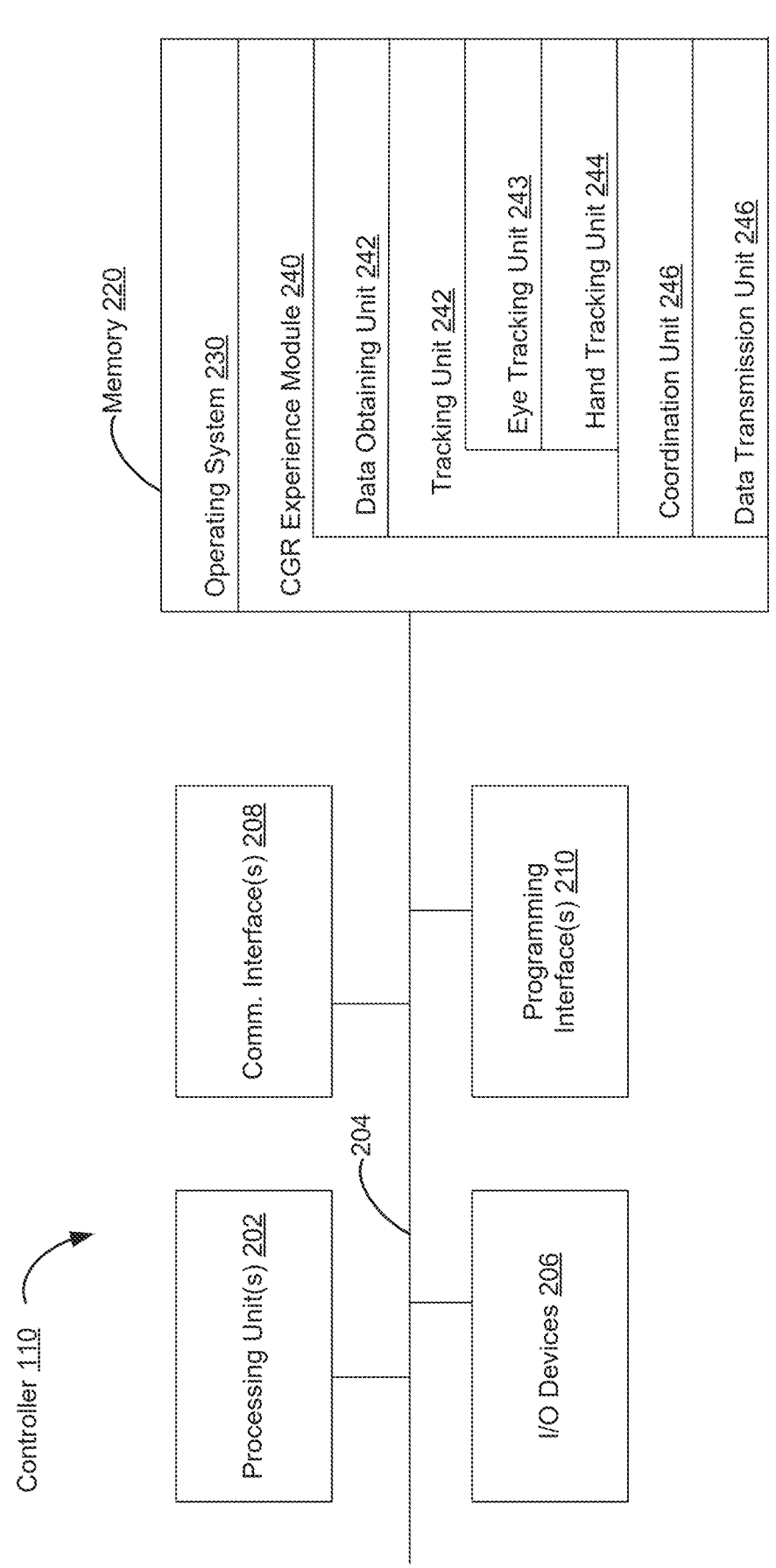
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU-ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3A:
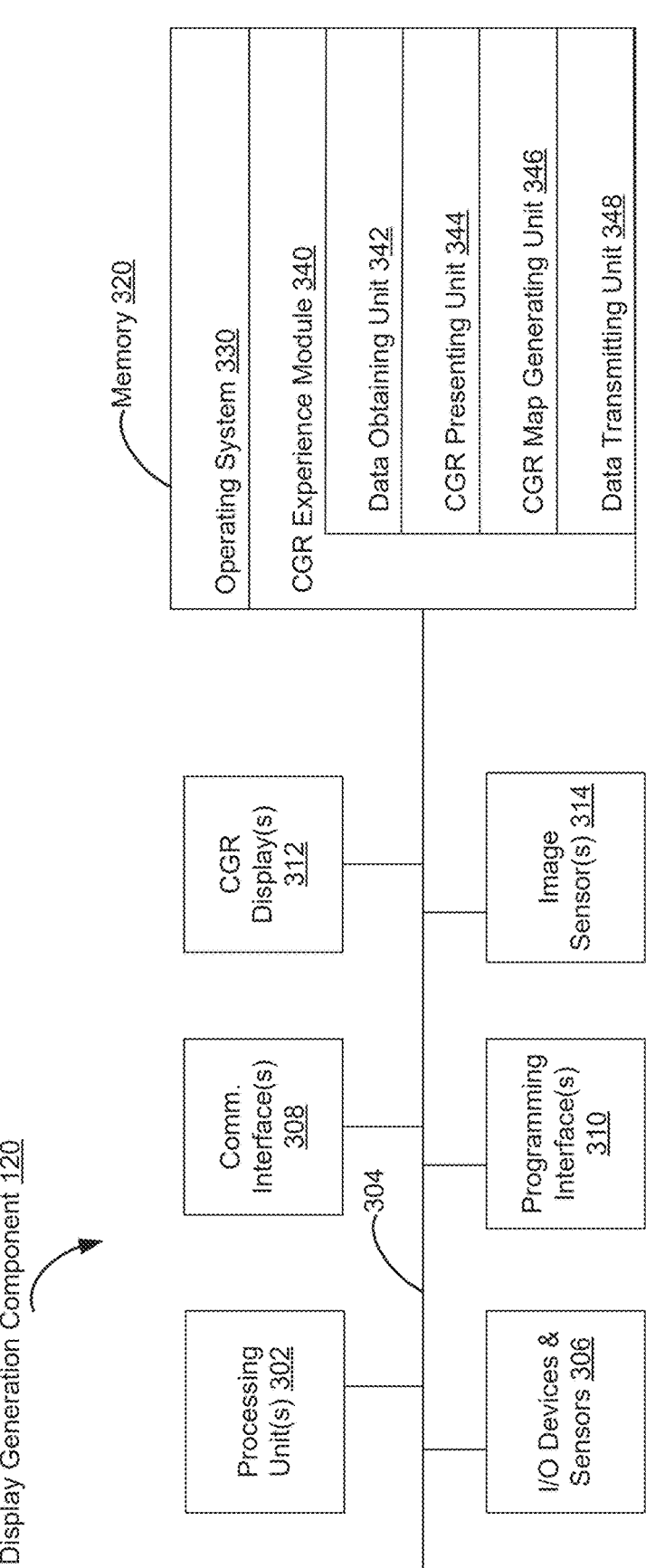
FIG. 3A is a block diagram illustrating a display generation component of a computer system that is configured to provide a visual component of the XR experience to the user in accordance with some embodiments.

FIG. 3A is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3A is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Implementations within the scope of the present disclosure can be partially or entirely realized using a tangible computer-readable storage medium (or multiple tangible computer-readable storage media of one or more types) encoding one or more computer-readable instructions. It should be recognized that computer-executable instructions can be organized in any format, including applications, widgets, processes, software, and/or components.

Figure 3B:
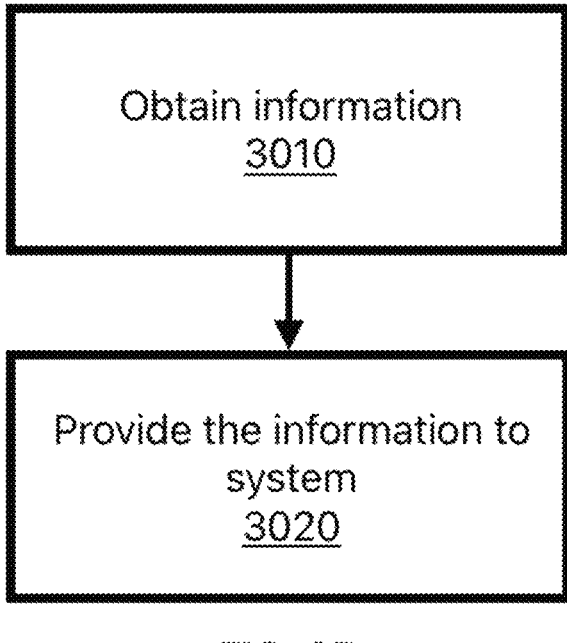
FIGS. 3B-3G illustrate the use of Application Programming Interfaces (APIs) to perform operations.
Figure 3C:
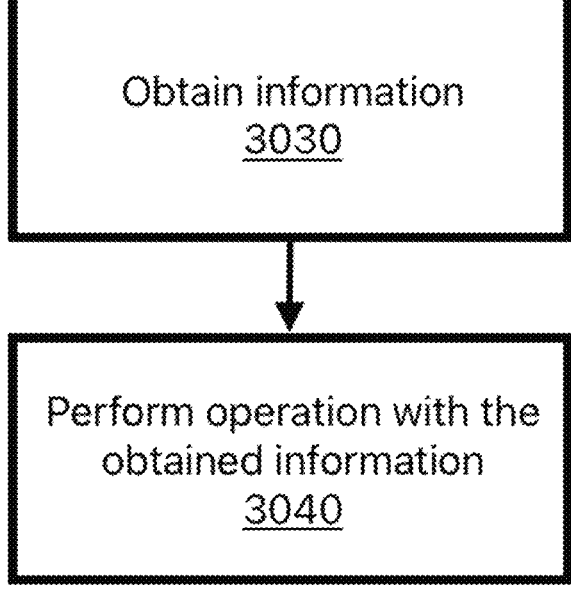

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first party application). In other embodiments, application 3160 is an application that is provided to device 3150 via an operating system update file (e.g., a first party application or a second party application). In other embodiments, application 3160 is an application that is provided via an application store. In some embodiments, the application store can be an application store that is pre-installed on device 3150 at purchase (e.g., a first party application store). In other embodiments, the application store is a third-party application store (e.g., an application store that is provided by another application store, downloaded via a network, and/or read from a storage device).

Figure 3D:
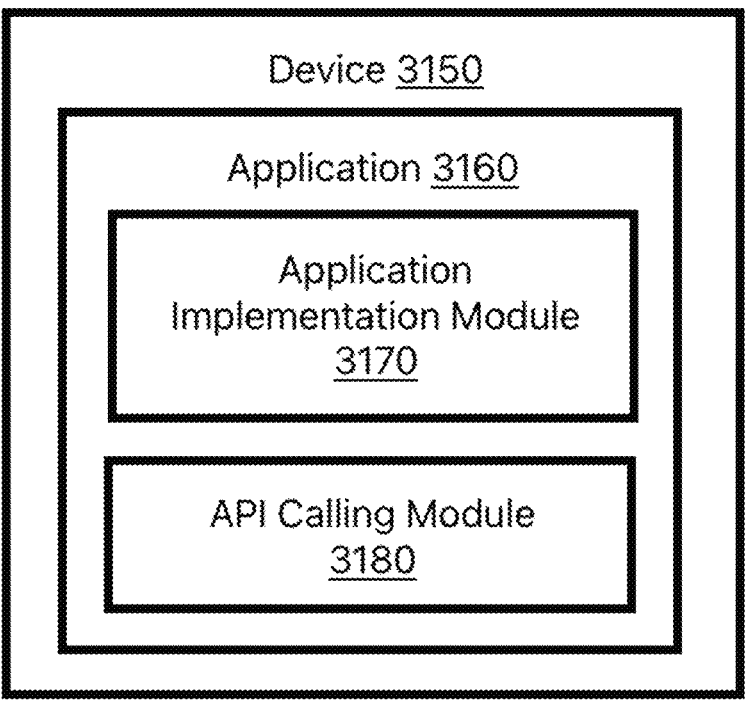
Figure 3E:
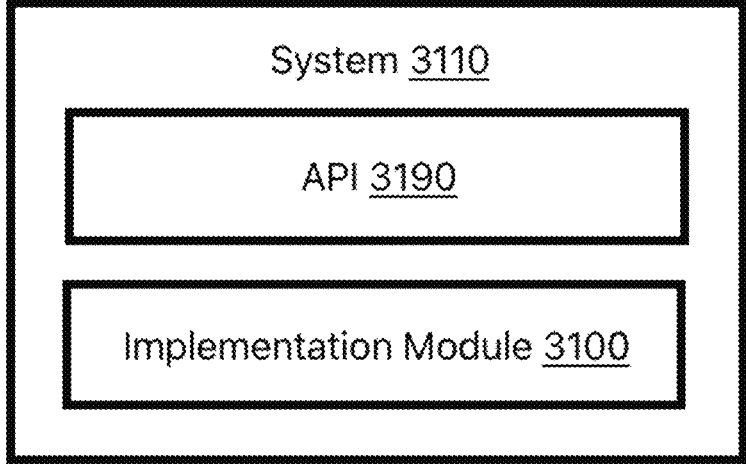
Figure 3F:
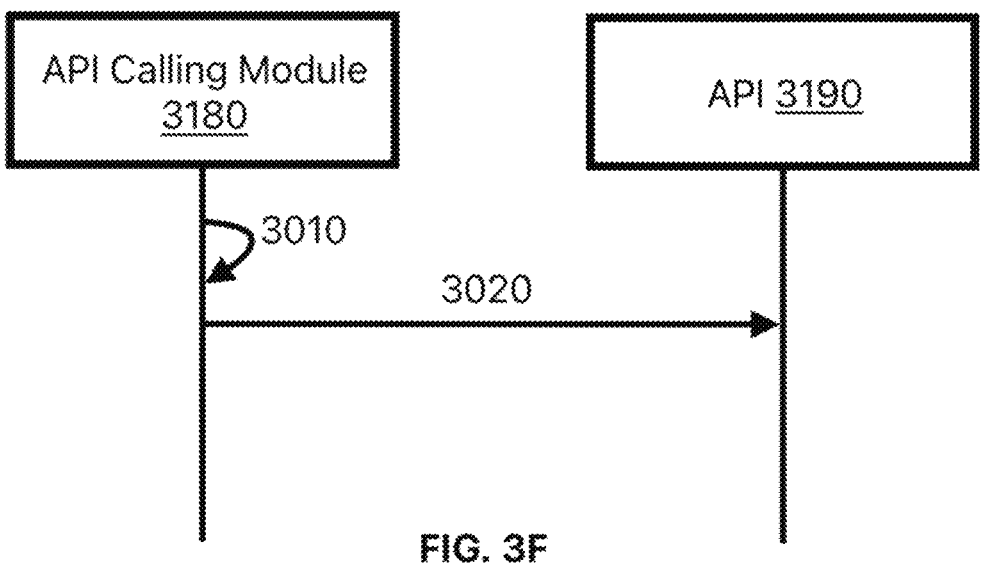

Referring to FIG. 3B and FIG. 3F, application 3160 obtains information (e.g., 3010). In some embodiments, at 3010, information is obtained from at least one hardware component of the device 3150. In some embodiments, at 3010, information is obtained from at least one software module of the device 3150. In some embodiments, at 3010, information is obtained from at least one hardware component external to the device 3150 (e.g., a peripheral device, an accessory device, a server, etc.). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on the device 3150. In some embodiments, the system (e.g., 3110 shown in FIG. 3E) is an external device (e.g., a server, a peripheral device, an accessory, a personal computing device, etc.) that includes an operating system.

Figure 3G:
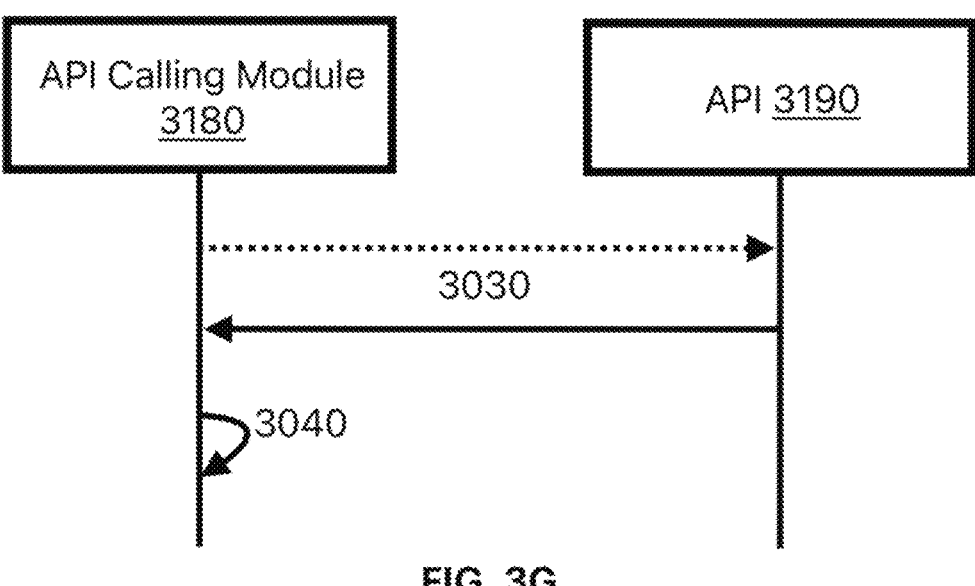

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and operating system (e.g., system 3110 shown in FIG. 3E). Application 3160 includes application implementation module 3170 and API calling module 3180. System 3110 includes API 3190 and implementation module 3100. It should be recognized that device 3150, application 3160, and/or system 3110 can include more, fewer, and/or different components than illustrated in FIGS. 3D and 31E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API calling module to communicate with system 3110 via API 3190 (shown in FIG. 3E).

In some embodiments, API 3190 is a software module (e.g., a collection of computer-readable instructions) that provides an interface that allows a different module (e.g., API calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In other embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor and/or biometric sensor.

In some embodiments, implementation module 3100 is an system (e.g., operating system, server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or other hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus be both an API calling module and an implementation module. It should be recognized that implementation module 3100 can include additional functions, methods, classes, data structures, and/or other features that are not specified through API 3190 and are not available to API calling module 3180. It should also be recognized that API calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example when an input is detected the direct sensor data is frequently processes into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first party application). In other embodiments, the application is an application that is provided to the first computer system via an operating system update file (e.g., a first party application). In other embodiments, the application is an application that is provided via an application store. In some implementations, the application store is pre-installed on the first computer system at purchase (e.g., a first party application store) and allows download of one or more applications. In some embodiments, the application store is a third party application store (e.g., an application store that is provided by another device, downloaded via a network, and/or read from a storage device). In some embodiments, the application is a third party application (e.g., an app that is provided by an application store, downloaded via a network, and/or read from a storage device). In some embodiments, the application controls the first computer system to perform methods 800, 1000, 1200, 1300, 1500, 1700, 1900, and/or 2100 (FIGS. 8, 10, 12, 13, 15, 17, 19, and/or 21) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API.

In some embodiments, at least one API is a software module (e.g., a collection of computer-readable instructions) that provides an interface that allows a different module (e.g., API calling module) to access and use one or more functions, methods, procedures, data structures, classes, and/or other services provided by an implementation module of the system process. The API can define one or more parameters that are passed between the API calling module and the implementation module. In some embodiments, the API 3190 defines a first API call that can be provided by API calling module 3190. The implementation module is an system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement.

In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semicustom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
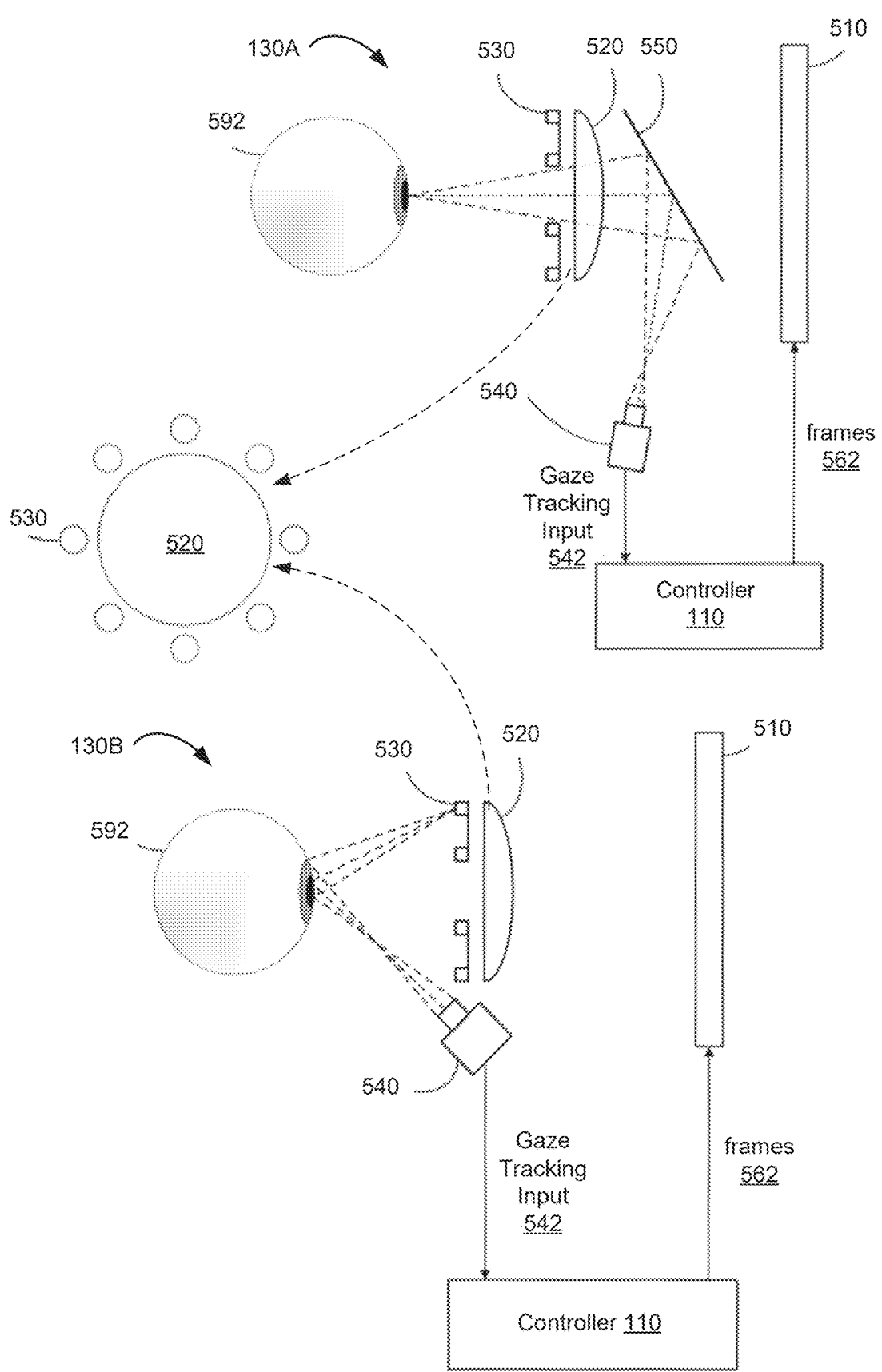
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a headmounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
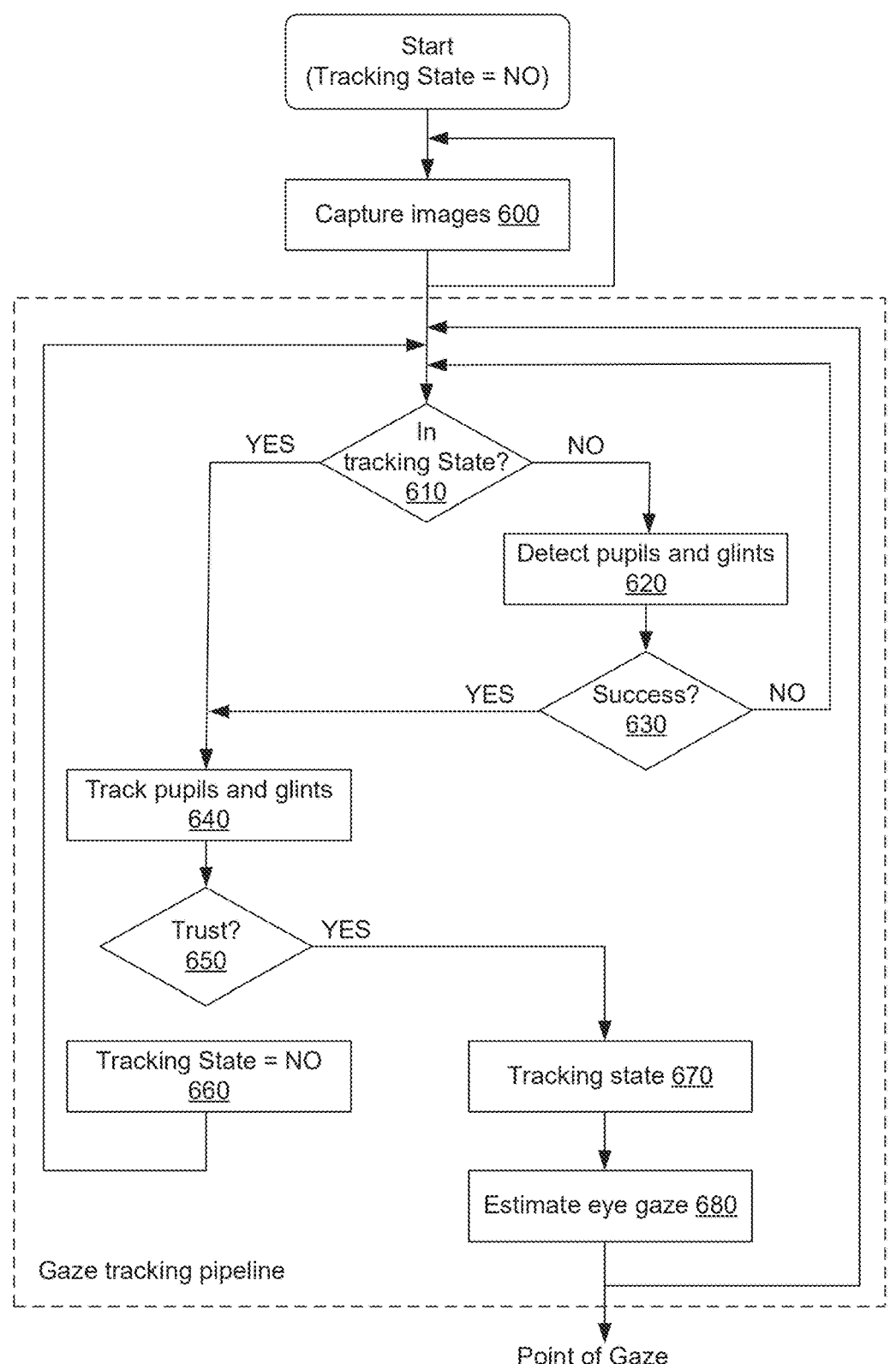
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation.

As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vasc, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one or more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7AL illustrate examples of a computer system 101 switching a representation of a first content item at a docked position in a three-dimensional environment with a representation of a second content item in the three-dimensional environment in response to detecting user input.

FIG. 7A illustrates a computer system 101 (e.g., an electronic device) displaying (e.g., via a display generation component 120) a three-dimensional environment 700. In some embodiments, computer system 101 is a headmounted device (e.g., a head-mounted display) worn by a user of computer system 101 (e.g., user 706 as shown and described with reference to FIGS. 7A-7AL). In some embodiments, computer system 101 includes a display generation component 120. For example, the display generation component is configured to display one or more virtual objects (e.g., virtual content included in a virtual window or a user interface) in three-dimensional environment 700. In some embodiments, the one or more virtual objects are displayed within (e.g., superimposed on) a virtual environment (e.g., as shown and described with reference to FIGS. 7A-7AL). In some embodiments, the one or more virtual objects are displayed within (e.g., superimposed on) a representation of a physical environment of a user. In some embodiments, the three-dimensional environment 700 is visible to the user of computer system 101 through display generation component 120 (e.g., optionally through a transparent and/or translucent display). For example, three-dimensional environment 700 is visible to the user of computer system 101 while the user is wearing computer system 101. In some embodiments, three-dimensional environment 700 has one or more characteristics of the first three-dimensional environment described with reference to method 800. In some embodiments, computer system 101 includes a plurality of image sensors (e.g., image sensors 314 of FIG. 3). The image sensors optionally include one or more of a visible light camera, an infrared camera, a depth sensor, or any other sensor computer system 101 would be able to use to capture one or more images of a user or a part of the user (e.g., one or more hands of the user) while the user interacts with computer system 101.

In FIG. 7A, three-dimensional environment 700 includes a representation of a virtual environment. As shown in FIG. 7A, the representation of the virtual environment includes a lakeside setting with a hilly background (e.g., a lake environment). In some embodiments, the virtual environment is a representation of a real-world geographic location. In some embodiments, the representation of the virtual environment shown in FIG. 7A has one or more characteristics of the representation of the virtual environment described with reference to method 800.

For the purpose of illustration, FIGS. 7A-7AL include respective top-down views 770a-770a1 of the three-dimensional environment 700 that indicate the positions of various objects in the three-dimensional environment 700 in a horizontal dimension and a depth dimension. The top-down view of the three-dimensional environment 700 further includes an indication of the viewpoint of the user 706 of the computer system 101. For example, the computer system 101 displays the view of the three-dimensional environment 700 visible through the display generation component 120 from the viewpoint of the user 706 illustrated in the top-down view 770a of the three-dimensional environment 700.

FIG. 7B illustrates computer system 101 displaying a representation of a first content item 702A in the three-dimensional environment 700. The first content item of the representation of the first content item 702A is a video (e.g., a movie, streaming video, and/or a television show). In some embodiments, the first content item is an image (e.g., a photo and/or a drawing), a document, and/or an application (e.g., a browser and/or a game). The representation of the first content item 702A is displayed in an undocked position in the three-dimensional environment 700, as further shown in top-down view 770b. In some embodiments, the computer system 101 displays the representation of the first content item 702A concurrently with a first user interface element 704. The first user interface element includes selectable options for controlling the first content item, such as a selectable option 704a for displaying the representation of the first content item at a docked position (e.g., docking the representation of the first content item).

In FIG. 7C, the computer system 101 detects an input corresponding to a request to display the representation of the first content item 702A at a docked position in the three-dimensional environment 700 (e.g., to dock the representation of the first content item 702A). The input is directed to the selectable option 704a of the first user interface 704. In particular, the input includes an air pinch gesture performed by a hand 706b of the user 706 while attention of the user (e.g., based on gaze 706a) is directed to the selectable option 704a. In response to detecting the input corresponding to the request to display the representation of the first content item 702A at a docked position, the computer system 101 displays the representation of the first content item 702A at a docked position 708 in the three-dimensional environment 700 (see FIG. 7A).

FIG. 7D illustrates computer system 101 displaying the representation of a first content item 702A at the docked position 708 in the three-dimensional environment 700. The docked position 708 is optionally a fixed position in the three-dimensional environment 700, and is therefore optionally environment-locked (e.g., world-locked). Accordingly, the computer system 101 displays the representation of the first content item 702A at a location and/or position 708 in the viewport of the user that is based on (e.g., selected in reference to and/or anchored to) a location and/or object in the three-dimensional environment 700 (e.g., a physical environment or a virtual environment). In some embodiments, the docked position 708 (e.g., as shown in FIG. 7D and in the top-down view 770d) is located at a greater distance from the viewpoint of the user 706 in the three-dimensional environment than the location of the representation of the first content while undocked (e.g., as shown in FIGS. 7B and 7C and corresponding top-down views 770b and 770c). In some embodiments, the computer system increases a size of the representation of the first content item 702A at the docked position 708 such that the representation of the first content item 702A appears bigger in the viewport of the user 706 despite the greater distance from the viewpoint of the user 706 than the distance of the representation of the first content item at an undocked position (e.g., as shown in FIGS. 7B and 7C). In some embodiments, the computer system 101 increases a size of the three-dimensional environment 700 such that the representation of the first content item at the docked position 708 appears smaller to the user 706 than the representation of the first content item at an undocked position (e.g., as shown in FIGS. 7B and 7C). When the representation of the first content item 702A is at a docked position 708, the computer system 101 optionally displays one or more simulated environmental effects corresponding to the representation of the first content item 702A, such as light spill 703A, which is a simulated reflection of representation of the first content item 702A against the surface of the three-dimensional environment 700.

FIGS. 7E-7M illustrate the computer system 101 detecting a first sequence of one or more inputs corresponding to a request to switch to displaying a second content item in the three-dimensional environment 700.

In FIG. 7E, the computer system 101 detects an input directed to the representation of the first content item 702A. The input is one of a sequence of one or more inputs corresponding to a request to display a second content item, different from the first content item, in the three-dimensional environment 700. The input includes an air pinch gesture performed by a hand 706*b* of the user 706 while attention of the user (e.g., based on gaze 706*a*) is directed to the representation of the first content item 702A.

In FIG. 7F, in response to the input directed to the representation of the first content item 702A, the computer system 101 displays a system controls interface 710. The system controls interface 710 is displayed adjacent to the representation of the first content item 702A. In some embodiments, the system control 710 is displayed in front of the representation of content item 702A from the perspective of the viewpoint of the user 706, such as illustrated in top-down view 770*f*. The system controls interface 710 includes one or more controls for controlling the first content item. For example, the system controls interface 710 includes one or more media controls 710*a*-710*d* for controlling playback of the first content item such as a rewind button 710*a*, a fast forward button 710*b*, a pause button 710*c*, and a playback progress bar 710*d* that indicates a playback position of the first content item. The one or more controls also include a display 710*e* for displaying the name and/or title of the first content item (e.g., "Content Item A"). The one or more controls further include a menu icon 712, selection of which displays selectable options including an option to launch a content picker interface. The one or more controls further include an option 714 to launch an environment picker interface, selection of which displays the environment picker interface (e.g., as described in more detail with reference to method 1000). It is understood that the one or more controls optionally include additional controls not shown in FIG. 7F.

In FIG. 7G, the computer system 101 detects an input directed to the menu icon 712 on the system controls interface 710. The input is one of a sequence of one or more inputs corresponding to the request to display a second content item, different from the first content item, in the three-dimensional environment 700. The input includes an air pinch gesture performed by a hand 706*b* of the user 706 while attention of the user (e.g., based on gaze 706*a*) is directed to the menu icon 712.

In FIG. 7H, the computer system 101, in response to the input directed to the menu icon 712 on the system controls interface 710, displays a menu interface 716. The menu interface 716 includes an option 716*a* to launch a content picker interface. In the embodiment of FIG. 7H, the option 716*a* to launch the content picker interface is labeled "Browse Library" but it is understood that other labels and/or designations for the option can be displayed.

In FIG. 7I, the computer system 101 detects an input directed to the option 716*a* (e.g., labeled "Browse Library") to launch the content picker interface. The input is one of a sequence of one or more inputs corresponding to the request to display a second content item, different from the first content item, in the three-dimensional environment 700. The input includes an air pinch gesture performed by a hand 706*b* of the user 706 while attention of the user (e.g., based on gaze 706*a*) is directed to the option 716*a* to launch the content picker interface.

In FIG. 7J, in response to detecting the input directed to the option 716*a* to launch the content picker interface, the computer system 101 displays the content picker interface 720 in the three-dimensional environment 700. The content picker interface 720 is shown as a window displayed in front of the representation of the first content item (e.g., closer to a viewpoint of the user than the representation of the first content item 702A at the docked position 708), as further shown in top-down view 770*j*. In some embodiments, the computer system 101 displays the content picker interface 720 as oriented (e.g., tilted) toward the viewpoint of the user 706, as shown in FIG. 7J. The content picker interface 720 includes one or more representation of available content items 722. For example, in FIG. 7J, the content picker interface includes a grid of thumbnails 722 (e.g., representation of content items) of new releases (e.g., newly released movies) for selection by the user. Each of the one or more representations of content items 722 (e.g., thumbnail 722) is optionally selectable to display the corresponding content item in the three-dimensional environment 700. Further, the computer system 101 ceases display of the system control interface 710 (e.g., shown in FIG. 7I, but not in FIG. 7J) when the content picker interface 720 is launched in response to detecting the input directed to the option 716*a* to launch the content picker interface.

In FIG. 7K, the computer system 101 detects an input directed to a representation of a second content item 722*a* (e.g., thumbnail 722*a*) of the one or more presentations of content items 722 of the content picker interface 720. The input is one of a sequence of one or more inputs corresponding to the request to display a second content item, different from the first content item, in the three-dimensional environment 700. The input includes an air pinch gesture performed by a hand 706*b* of the user 706 while attention of the user (e.g., based on gaze 706*a*) is directed to the representation of the second content item 722*a* (e.g., thumbnail 722*a*).

In FIG. 7L, in response to detecting the input directed to the representation of a second content item 722*a* (e.g., thumbnail 722*a*) of the one or more representations of content items 722 of the content picker interface 720, the computer system 101 displays in the content picker user interface 720 a preview 724 of the second content item. The computer system 101 also displays concurrently with preview 724 an option 724*a* (e.g., a play button 724*a*) selectable to display the second content item in the three-dimensional environment 700.

In FIG. 7M, the computer system 101 detects an input directed to the option 724*a* (e.g., play button 724*a*) selectable to display the second content item in the three-dimensional environment 700. The input is one of a sequence of one or more inputs corresponding to the request to display a second content item, different from the first content item, in the three-dimensional environment 700. The input includes an air pinch gesture performed by a hand 706*b* of the user 706 while attention of the user (e.g., based on gaze 706*a*) is directed to the option 724*a* (e.g., play button 724*a*) selectable to display the second content item in the three-dimensional environment.

FIGS. 7N-7P illustrate the computer system 101 ceasing display of the representation of the first content item 702A and displaying the representation of the second content item 702B at the docked position 708 while maintaining display of the three-dimensional environment 700.

In FIG. 7N, the computer system 101 ceases display of the representation of the first content item 702A at the docked position 708 in response to detecting the input directed to the option 724*a* (e.g., play button 724*a*) selectable to display the second content item in the three-dimensional environment 700. The computer system 101 begins removing display of the representation of the first content item 702A (e.g., "the couple") from the docked position 708 using an animation, such as a fade effect. As illustrated, the computer system 101 thus fades out the representation of the first content item 702A from the docked position 708. The first content item fading out is shown by the dashed lines. The computer system 101 maintains display of the three-dimensional environment 700 while ceasing display of the representation of the first content item 702A.

In FIG. 7O, the computer system 101 displays the representation of the second content item 702B at the docked position 708. The computer system 101 begins display of the representation of the second content item 702B after ceasing display of representation of the first content item 702A and while maintaining display of the three-dimensional environment 700. The computer system 101 begins display of the representation of the second content item 702B (e.g., "the man in the hat") at the docked position using an animation, such as a fade effect. As illustrated, the computer system 101 thus fades into the docked position 708 the representation of the second content item 702B (e.g., "the man in the hat"). The second content item fading in is shown by the dashed lines. The computer system 101 maintains display of the three-dimensional environment 700 throughout the transition from the displaying the representation of the first content item 702A to displaying the representation of the second content item 702B in the three-dimensional environment.

In FIG. 7P, the computer system 101 has displayed the representation of the second content item 702B (e.g., "the man in the hat") at the docked position 708 in the three-dimensional environment 700. When the representation of the second content item 702B is at a docked position 708, the computer system 101 optionally displays one or more simulated environmental effects corresponding to the representation of the second content item 702B, such as light spill 703b, which is a simulated reflection of representation of the second content item 702B against the surface of the three-dimensional environment 700. The representation of the second content item 702B is further shown at the docked position 708 in the three-dimensional environment 700 in top-down view 770p.

In FIGS. 7Q-7R, the computer system 101 ceases display of the content picker interface 720 in the three-dimensional environment 700. In particular, in FIG. 7Q the computer system 101 detects an input directed to the close button 742 of the content picker item 720. The input includes an air pinch gesture performed by a hand 706b of the user 706 while attention of the user (e.g., based on gaze 706a) is directed to the close button 742. In FIG. 7R, in response to detecting the input directed to the close button 742 of the content picker item 720, the computer system 101 ceases display of the content picker 720 in the three-dimensional environment 700. Further, the computer system 101 displays the system controls interface in the three-dimensional environment after ceasing display content picker interface 720 (e.g., in response to the input directed to the close button 742 of the content picker interface 720). As further illustrated in top-down view 770r, the computer system 101 has ceased display of the content picker interface 720 and displays the system controls interface 710 in the three-dimensional environment in response to the input directed to the close button 742.

In some embodiments, the computer system 101 moves the content picker interface 720 in the three-dimensional environment 700 in response to detecting a movement input corresponding to a request to move the content picker interface 720. FIGS. 7S-7U illustrate the computer system 101 moving the content picker interface in response to an input.

In FIG. 7S, the content picker interface is displayed at a first content picker interface location in the three-dimensional environment 700, for example in response to a previous input corresponding to a request to display the content picker interface 720 (e.g., such as described with reference to FIGS. 7E-7M).

In FIG. 7T, the computer system 101 detects a movement input directed to the grabber bar or handle 742 of the content picker interface 720 and corresponding to a request to move the content picker interface 720 from the first content picker interface location 721a in the three-dimensional environment 700 to a second content picker interface location in the three-dimensional environment 700, different from the first content picker interface location 721a (e.g., a movement input to move the content picker 720 from its current position 721a to a different position). The input includes an air pinch gesture performed by a hand 706b of the user 706 while attention of the user (e.g., based on gaze 706a) is directed to the grabber bar or handle 742, followed by a drag gesture (e.g., a movement) while the air pinch is maintained from the first content picker location 721a in the three-dimensional environment (e.g., near the top of the viewport) to the second content picker location in the three-dimensional environment (e.g., near the bottom right of the viewport) and performed by the one or more hands of the user.

In FIG. 7U, in response to detecting the movement input, the computer system 101 moves the content picker interface 720 according to the drag gesture and therefore from the first content picker location 721a in the three-dimensional environment 700 (e.g., near the top of the viewport) to the second content picker location 721b in the three-dimensional environment 700 (e.g., near the bottom right of the viewport). The content picker interface 720 displayed at the second content picker location 721b is further illustrated in top-down view 770u. In some embodiments, the computer system maintains the content picker interface 720 oriented toward the viewpoint of the user 706 at the second content picker location 721b. The computer system optionally maintains orientation of the content picker interface 720 toward the viewpoint of the user 706 throughout a change of position of the content picker interface in the first dimensional environment 700. Accordingly, the orientation of the content picker interface 720 varies based on the position of the content picker interface 720 in the three-dimensional environment 700 and/or the position of the content picker interface 720 relative to the viewpoint of the user 706.

FIGS. 7V-7AB illustrate the computer system 101 increasing or decreasing a visual prominence of the system controls interface 710 and/or the content picker interface 720 in accordance with the current focus of the user 706. The current focus optionally includes attention of the user, a gaze of the user, user interaction, and/or user input.

In FIG. 7V, the content picker interface 720 is displayed in the three-dimensional environment 700, for example in response to a previous input corresponding to a request to display the content picker interface 720 (e.g., such as described with reference to FIGS. 7E-7M). In some embodiments, the computer system 101 displays the content picker interface 720 as oriented (e.g., tilted) toward the viewpoint of the user 706.

In FIG. 7W, the computer system 101 detects an input directed to the representation of the first content item 702A. The input includes an air pinch gesture performed by a hand 706b of the user 706 while attention of the user (e.g., based on gaze 706a) is directed to the representation of the first content item 702A.

In FIG. 7X, in response to the input directed to the representation of the first content item 702A, the computer system 101 displays the system controls interface 710. In some embodiments, such as illustrated in FIG. 7X, the system controls interface 710 is displayed in front of the content picker interface 720 (e.g., closer to a viewpoint of the user than the content picker user interface 720). Further, system control interface 710 partially overlays the content picker interface 720 from a viewpoint of a user of the computer system 101 (e.g., the system control interface 710 at least partially obscures or blocks a portion of the control system interface 720). The relative positions of the representation of the first content item 702A at the docked position 708, the content picker interface 720, and system controls interface 710 are further illustrated in top-down view 770y.

In FIG. 7Y, the computer system 101 detects current focus on the content picker interface 720, such as via an input directed to the content picker interface 720 (e.g., an input corresponding to a request to display a second content item). The current focus optionally corresponds to attention of the user, a gaze of the user, user interaction, and/or user input. The input includes an air pinch gesture performed by a hand 706b of the user 706 while attention of the user (e.g., based on gaze 706a) is directed to the content picker interface 720.

In FIG. 7Z, in accordance with the current focus (e.g., in response to input directed to the content picker interface 720) being on the content picker interface 720, the computer system 101 reduces a visual prominence of at least a portion of the system controls interface to increase visibility of the content picker interface from the viewpoint of the user. The portion of the system controls interface 710 whose visual prominence the computer system 101 reduces is the portion 732 (shown in dashed lines) that is overlaying portion 734 of the content picker interface 720. The computer system 101 optionally reduces the visual prominence of the portion 732 of the system controls interface by reducing a brightness of the portion 732 of the system controls interface and/or increasing a degree of transparency of the portion 732 of the system controls interface. Reducing the visual prominence of the portion 732 of the system controls interface 710 optionally increases visibility of portion 734 of the content picker interface 720.

In FIG. 7AA, the computer system 101 detects current focus on the system controls interface 710, such as via an input directed to the fast forward button 710b of the system controls interface 710. The input includes an air pinch gesture performed by a hand 706b of the user 706 while attention of the user (e.g., based on gaze 706a) is directed to the fast forward button 710b.

In FIG. 7AB, in accordance with the current focus (e.g., in response to input directed to the fast forward button 710b) being on the system controls interface 710, the computer system 101 reduces a visual prominence of at least a portion of the content picker interface 720 (e.g., to increase visibility of the system controls interface 710 from the viewpoint of the user). The portion of the content picker interface 720 whose visual prominence the computer system 101 reduces is the portion 734 (shown in dashed lines) that is overlaid by the system control interface 710. The computer system 101 reduces prominence of the portion 734 of the content picker interface 720 by increasing the visual prominence of the portion 732 of the system controls interface 710 that is overlaying the portion 734 of the content picker interface 710. The computer system 101 therefore reduces the visual prominence of the portion 734 of the content picker interface 720 by increasing a brightness of the portion 732 of the system controls interface 710 and/or decreasing a degree of transparency of the portion 732 of the system controls interface 710. The computer system 101 optionally reduces the visual prominence of the portion 734 of the content picker interface by reducing a brightness of the portion 734 of the content picker interface and/or increasing a degree of transparency of the portion 734 of the content picker interface.

FIGS. 7AC-7AF illustrate the computer system 101 displaying an option selectable to display the content picker interface as a non-selectable option when the control picker interface is already displayed.

In FIG. 7AC, the content picker interface 720 is displayed in the three-dimensional environment 700, for example in response to a previous input corresponding to a request to display the content picker interface 720 (e.g., such as described with reference to FIGS. 7E-7M). In some embodiments, the computer system 101 displays the content picker interface 720 as oriented (e.g., tilted) toward the viewpoint of the user 706. In FIG. 7AD, the computer system 101 detects an input directed to the representation of the first content item 702A while the content picker interface 720 is displayed. The input includes an air pinch gesture performed by a hand 706b of the user 706 while attention of the user (e.g., based on gaze 706a) is directed to the representation of the first content item 702A. In FIG. 7AE, in response to the input directed to the representation of the first content item 702A, the computer system 101 displays system controls interface 710. The system controls interface 710 is displayed in front of the representation of the first content item 702A. As previously described, the system controls interface 710 includes menu icon 712, selection of which displays selectable options including an option to launch a content picker interface. In FIG. 7AF, the computer system 101 detects an input directed to the menu icon 712 on the system controls interface 710. The input includes an air pinch gesture performed by a hand 706b of the user 706 while attention of the user (e.g., based on gaze 706a) is directed to the menu icon 712.

In FIG. 7AG, the computer system 101, in response to the input directed to menu icon 712, displays a menu interface 716. The menu interface 716 includes an option 716a (labelled "Browse Library") to launch a content picker interface. As previously described in reference to FIG. 7H, in response to an input directed to option 716a, the computer system 101 displays the content picker interface 720. In FIG. 7AG, however, because the content picker 720 is already displayed, option 716a is non-selectable to display the content picker interface (e.g., input directed to option 716a does not cause the computer system 101 to display the content picker interface 720).

FIGS. 7AH-7AK illustrate the computer system 101 displaying content picker user interface 720 while the representation of the first content item 702A is undocked.

FIG. 7AH illustrates computer system 101 displaying a representation of a first content item 702A in the three-dimensional environment 700. The representation of the first content item 702A is displayed in an undocked position in the three-dimensional environment 700. Accordingly, the computer system 101 displays the representation of the first content item 702A concurrently with a first user interface element 704. As previously described, the first user interface element includes selectable options for controlling the first content item, such as a selectable option 704a for displaying the representation of the first content item at a docked position. The first user interface element 704 further includes a volume slider 704b, one or more controls for controlling playback of the first content item, and menu icon 712.

In FIG. 7AI, the computer system 101 detects an input directed to the menu icon 712 on the user interface element 704. The input includes an air pinch gesture performed by a hand 706*b* of the user 706 while attention of the user (e.g., based on gaze 706*a*) is directed to the menu icon 712. In FIG. 7AJ, the computer system 101, in response to the input directed to the menu icon 712 on the system controls interface 710, displays a menu interface 716. The menu interface 716 includes an option 716*a* (labeled "Browse Library") to launch a content picker interface. In FIG. 7AK, the computer system 101 detects an input directed to the option 716*a* (labeled "Browse Library") to launch a content picker interface. The input includes an air pinch gesture performed by a hand 706*b* of the user 706 while attention of the user (e.g., based on gaze 706*a*) is directed to an option 716*a*.

In FIG. 7AL, in response to detecting the input directed to the option 716*a* to launch the content picker interface, the computer system 101 displays the content picker interface 720 in the three-dimensional environment 700. The content picker interface 720 is shown as a window displayed in front of the representation of the first content item (e.g., closer to a viewpoint of the user than the representation of the first content item 702A at the docked position 708). As previously described, the content picker interface 720 includes one or more representations of the content items 722. However, unlike in FIGS. 7J-7Q, where the computer system 101 displayed the content picker 720 in response to a sequence of one or more inputs while the representation of the first content item 702A was at a docked position 708, the content picker 720 displayed when the representation of the first content item is not at a docked position (e.g., is undocked) is larger (e.g., has larger dimensions and/or area) than the content picker interface 720 displayed when the representation of the first content item 702A is docked.

FIG. 8 is a flowchart illustrating an exemplary method 800 of switching a representation of a first content item at a docked position in a three-dimensional environment with a representation of a second content item in the three-dimensional environment in response to detecting user input, in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, a method 800 is performed at a computer system in communication with one or more display generation components, and one or more input devices, such as computer system 101 and display generation component 120 in FIG. 7A. For example, a mobile device (e.g., a tablet, a smartphone, a media player, or a wearable device), or a computer or other electronic device. In some embodiments, the one or more display generation components are one or more displays integrated with the computer system or electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of detecting a user input (e.g., capturing a user input, and/or detecting a user input.) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor), microphone for capturing voice commands or other audio input, etc. In some embodiments, the computer system is in communication with a hand tracking device (e.g., one or more cameras, depth sensors, proximity sensors, touch sensors (e.g., a touch screen, trackpad)). In some embodiments, the hand tracking device is a wearable device, such as a smart glove. In some embodiments, the hand tracking device is a handheld input device, such as a remote control or stylus.

In some embodiments, while displaying, via the one or more display generation components, a representation of a first content item at a docked position in a first three-dimensional environment, such as representation of first content item 702A in FIG. 7D (e.g., a virtual environment or a representation of a physical environment of the user), wherein the docked position is fixed in the first three-dimensional environment, the computer system detects (802*a*), via the one or more input devices, a first sequence of one or more inputs corresponding to a request to switch from displaying the first content item to displaying a second content item, different from the first content item, in the first three-dimensional environment, such as the inputs from hand 706*b* in FIGS. 7G-7M. In some embodiments, the first three-dimensional environment, generated, displayed, or otherwise made viewable by the computer system, is perceptible from the viewpoint of the first user. In some embodiments, the first three-dimensional environment is generated, displayed, or otherwise caused to be viewable by the computer system. For example, the first three-dimensional environment is optionally an extended reality (XR) environment, such as a virtual reality (VR) environment, a mixed reality (MR) environment, an augmented reality (AR) environment, or an augmented virtuality (AV) environment. In some embodiments, the first three-dimensional environment is a simulated and/or virtual three-dimensional environment. In some embodiments, the first three-dimensional environment includes a simulated and/or virtual three-dimensional environment that is displayed within the first three-dimensional environment, optionally instead of representations of a physical environment (e.g., full immersion) or optionally concurrently with a representation of the physical environment (e.g., partial immersion). Some examples of a virtual environment include a lake environment, a mountain environment, a sunset scene, a sunrise scene, a nighttime environment, a grassland environment, and/or a concert scene. In some embodiments, the virtual environment is based on a real physical location, such as a museum, and/or an aquarium. In some embodiments, the virtual environment is an artist-designed location. In some embodiments, the three-dimensional environment includes one or more virtual objects and/or representations of objects in a physical environment of the first user of the computer system. In some embodiments, the first content item is a video (e.g., a movie, streaming video, and/or television show), an image (e.g., a photo and/or a drawing), or an application (e.g., a browser and/or a game). In some embodiments, the representation of the first content item is displayed (e.g., played) in a content player interface. The content player interface optionally includes a content window in which the representation of the content item is displayed. In some embodiments, the representation of the first content item is at a docked position in the first three-dimensional environment. The docked position is optionally a fixed position in the first three-dimensional environment, and therefore optionally environment-locked (e.g., world-locked). Accordingly, the computer system displays the representation of the first content item at a location and/or position in the viewport of the user that is based on (e.g., selected in reference to and/or anchored to) a location and/or object in the first three-dimensional environment (e.g., a physical environment or a virtual environment). As the viewpoint of the user shifts, the location and/or object in the environment relative to the viewpoint of the user changes, which results in the environment-locked representation of the representation of the first content item being displayed at a different location and/or position in the viewport of the user. The computer system optionally does not change the location and/or orientation of the representation of the first content item in a docked position in response to a movement input directed at the representation of the first content item (e.g., an input directed to the representation of the content item to move the representation and/or change its location and/or orientation). The docked position optionally differs between environments such that a location of a first docked position in the first three-dimensional environment relative to the viewpoint of the user and/or relative to a reference location in the first three-dimensional environment such as a center location of the environment is optionally different from a location of a second docked position in a second three-dimensional environment relative to the viewpoint of the user and/or relative to a reference location in the second three-dimensional environment such as a center location of the environment. In some embodiments, the first sequence of one or more inputs includes a user input directed at the representation of the first content item. For example, the first sequence of one or more inputs optionally includes an air gesture performed by one or more hands of the user (e.g., an air pinch gesture) while attention of the user (e.g., based on gaze) is directed to the representation of the first content item. In some embodiments, the first sequence of the one or more inputs includes an air gesture (e.g., air pinch or air tap) at a location of the representation of the first content item. In some embodiments, in response to detecting the input directed to the representation of the first content item, the computer system displays a menu including a content picker option. In some embodiments, the first sequence of one or more inputs further includes a selection input directed at the content picker option of the menu (e.g., the computer system detects an air pinch gesture while attention of the user (e.g., based on gaze) is directed to the content picker option). In some embodiments, the selection input directed at the content picker option of the menu includes an air gesture (e.g., air pinch or air tap) at a location of content picker option of the menu. In response, the computer system optionally displays a content picker interface. The content picker interface optionally includes a sequence (e.g., a list) of content items (e.g., videos, images, and/or applications). For example, the content picker interface optionally displays one or more lists of movies, streaming videos, televisions shows and episodes thereof available to watch, photos of a photo album available to view, and/or available games to play. In some embodiments, the computer system detects a selection input (e.g., an air pinch gesture) while attention of the user (e.g., based on gaze) is directed at a representation of and/or selectable option corresponding to one of the displayed content items as the second content item. In some embodiments, the selection input directed at the representation and/or selectable option includes an air gesture (e.g., air pinch or air tap) at a location of a representation of and/or selectable option corresponding to one of the displayed content items as the second content item.

In some embodiments, in response to detecting the first sequence of one or more inputs, and while maintaining display of the first three-dimensional environment via the one or more display generation components (802b) (e.g., while maintaining display of a virtual environment in which the content was displayed), such as environment 700 as shown from FIG. 7M to 7P, the computer system ceases display (802c) of the representation of the first content item at the docked position in the first three-dimensional environment, such as ceasing display of content 702A in FIGS. 7N-70. For example, the computer system removes display of the representation of the first content item from the docked position (e.g., the environment-locked position) using an animation. In some embodiments, the computer system displays an animation of the representation of the first content item morphing from being displayed in the docked position. In some embodiments, the animation includes a fade effect, such as the representation of the first content item fading out of the docked position. In some embodiments, the animation includes a blur effect, such as the representation of the first content item blurring out of the docked position. In some embodiments, the computer system ceases display of the representation of the first content item while the first content item is playing in the docked position. For example, if the content item is a video that is playing in the docked position before the computer system ceases display of the representation using an animation (e.g., a fade effect and/or a blur effect), the computer system continues to the play the video while the video is fading out. In some embodiments, the computer system pauses playback of the content item before ceasing display of the representation of the first content item.

In some embodiments, in response to detecting the first sequence of one or more inputs, and while maintaining display of the first three-dimensional environment via the one or more display generation components (e.g., while maintaining display of a virtual environment in which the content was displayed) (802b), the computer system displays (802d), via the one or more display generation components, a representation of the second content item at the docked position in the first three-dimensional environment, such as content 702B as shown in FIGS. 7O-7P. For example, the computer system displays the representation of the second content item in the docked position (e.g., the environment-locked position, which is optionally the location where the representation of the first content item was or is displayed). In some embodiments, the computer system displays the representation of the second content item using an animation. For example, the computer system displays the representation of the first content item morphing into the representation of the second content item. In some embodiments, the animation includes a fade effect, such as the representation of the first content item fading out and the representation of the second content item fading in (e.g., a cross-fade). In some embodiments, the representation of the second content item begins fading in before the representation of the first content item has completely faded out. In some embodiments, the animation includes a blur effect, such as the representation of the first content item blurring into the representation of the second content item. In some embodiments, the representation of the second content item begins blurring in before the representation of the first content item has completely blurred out. Replacing display of a representation of a first content item with a representation of the second content item while maintaining display of the three-dimensional environment enables the computer system to switch content "on the fly" and without displaying a separate and additional interface for switching the content, which reduces the number of interface or environments that the computer system has to generate, which maintains the context of the displayed user interface for the user, which makes the user-device interface more efficient, which additionally reduces power usage and improves battery life of the computer system by enabling the user to use the computer system more quickly and efficiently.

In some embodiments, a location of the docked position in the first three-dimensional environment is maintained before and after detecting the first sequence of one or more inputs, such as the docked position 708 in FIGS. 7M and 7P. In some embodiments, the location of the docked position in the first three-dimensional environment is maintained before and after display of the representation of the second content item in the first three-dimensional environment. The docked position is optionally a fixed position in the first three-dimensional environment, and therefore optionally environment-locked (e.g., world-locked), and the computer system displays the representation of the second content item at the same fixed position in the first three-dimensional environment where the representation of the first content item was displayed. In some embodiments, a spatial arrangement (e.g., position and/or orientation) of the docked position relative to the viewpoint of the user is the same before and after detecting the first sequence of one or more inputs (e.g., and/or while displaying the representation of the first content item and while displaying the representation of the second content item). The computer system optionally does not change the location and/or orientation of the representation of the second content item in a docked position in response to a movement input directed at the representation of the second content item (e.g., an input directed to the representation of the second content item to move the representation and/or change its location and/or orientation). Maintaining the location of the docked position while changing from the representation of the first content item to the representation of the second content item maintains consistency in the operation of the user interface, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, before detecting the first sequence of one or more inputs, the computer system displays, via the one or more display generation components, a content picker interface in the first three-dimensional environment, such as the content picker interface 720 in FIGS. 7J-7M, wherein detecting the first sequence of one or more inputs includes detecting a first input directed to the content picker interface that includes one or more representations of one or more content items available for display in the first three-dimensional environment, such as representations of content items 722 in FIGS. 7J-7M, and wherein the first input is directed to a representation of the second content item in the content picker interface. In some embodiments, the content picker interface is optionally a window (e.g., a pop-up window) displayed in the first three-dimensional environment in response to the one or more inputs and that includes the one or more representations of the content items. In some embodiments, the content picker interface is displayed closer to a viewpoint of the user than the representation of the first content item. For example, the content picker interface is optionally displayed at a distance of 0.5, 0.75, 1, or 1.5 meters from the viewpoint of the user in the first three-dimensional environment and the representation of the first content item is optionally displayed at a distance of 100, 200, 500, 1000, or 1500 meters from the viewpoint of the user in the first three-dimensional environment. In some embodiments, the one or more content items include one or more videos (e.g., movies, streaming videos, and/or television shows), one or more images (e.g., photos and/or drawings), and/or one or more applications (e.g., browsers and/or games). The one or more representations of the one or more content items available for display in the first three-dimensional environment optionally include the names of the one or more content items, symbols or icons for the one or more items, and/or thumbnails for the one or more content items (e.g., thumbnails for movies, streaming videos, television shows, photos, drawings, documents, games, applications, and other content items), for example. In some embodiments, the one or more representations of one or more content items are displayed as a sequence (e.g., a list). In some embodiments, the first input is a selection input (e.g., an air pinch gesture) while attention of the user (e.g., based on gaze) is directed to a representation of the one or more content items as the representation of the second content item. In some embodiments, the first input includes an air gesture (e.g., air pinch or air tap) at a location of a representation of the one or more content items as the representation of the second content item. In some embodiments, the first input includes contact by a stylus, a finger, and/or other object against a touch sensitive input device (e.g., a touch screen) and/or an input received from an input device in communication with the computer system such as a mouse and/or a trackball and directed to the content picker interface (e.g., based on attention and/or a location of a cursor or other focus indicator being on the content picker interface). Displaying a content picker interface that includes representations of one or more content items available for display facilitates the use of the computer system, enhances the operability of the computer system and makes the user-device interface more efficient, which additionally reduces power usage and improves battery life of the computer system by enabling the user to use the computer system more quickly and efficiency.

In some embodiments, prior to detecting the first input directed to the content picker interface, the computer system detects, via the one or more input devices, a second input directed to a system controls interface that is displayed in the first three-dimensional environment, such as the system controls interface 710 as shown in FIGS. 7F-7I, wherein system controls interface includes one or more controls for controlling the first content item, such as controls 710*a*-710*c* in FIG. 7H. In some embodiments, in response to detecting the second input, the computer system displays, via the one or more display generation components, the content picker interface in the first three-dimensional environment, such as content picker interface 720. In some embodiments, the system control interface is displayed adjacent to the representation of first content item. In some embodiments, the one or more controls for controlling the first content item include one or more media controls for controlling playback of the content item. For example, the one or more media controls include a play button, a pause button, a stop button, a rewind button, a fast forward button, and/or a volume dial or slider. The one or more controls optionally include a menu icon, selection of which optionally displays selectable options including an option to launch a content picker interface and/or an option to launch an environment picker interface. In some embodiments, the second input is directed to the option to launch the content picker interface, and in response to detecting the second input directed to the option to launch the content picker interface, the computer system displays the content picker interface in the first three-dimensional environment. In some embodiments, the second input is a selection input (e.g., an air pinch gesture) while attention of the user (e.g., based on gaze) is directed to the system controls interface. In some embodiments, the second input includes an air gesture (e.g., air pinch or air tap) at a location of the system controls interface. In some embodiments, the second input includes contact by a stylus, a finger, and/or other object against a touch sensitive input device (e.g., a touch screen) and/or an input received from an input device in communication with the computer system such as a mouse and/or a trackball and directed to the system controls interface (e.g., based on attention and/or a location of a cursor or other focus indicator being in the system controls interface) . . . . Launching the control picker interface from the system controls interface simplifies the user interface by concentrating the controls into fewer interface elements (e.g., the system control interface), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, before detecting the second input, the computer system detects, via the one or more input devices, a third input directed to the representation of the first content item, such as the input from hand 706b in FIG. 7E. In some embodiments, in response to detecting the third input directed to the representation of the first content item, the computer system displays, via the one or more display generation components, the system controls interface in the first three-dimensional environment, such as the system controls interface 710 in FIG. 7F. For example, the third input optionally includes an air gesture performed by one or more hands of the user (e.g., an air pinch gesture) while attention of the user (e.g., based on gaze) is directed at the representation of the first content item. In some embodiments, the third input includes an air gesture (e.g., air pinch or air tap) at a location of the representation of the first content item. In some embodiments, the third input includes contact by a stylus, a finger, and/or other object against a touch sensitive input device (e.g., a touch screen) and/or an input received from an input device in communication with the computer system such as a mouse and/or a trackball and directed to the representation of the first content item (e.g., based on attention and/or a location of a cursor or other focus indicator being in the representation of the first content item). In some embodiments, the system control interface is displayed adjacent to the representation of first content item. In some embodiments, the system controls interface is displayed closer to a viewpoint of the user than the representation of the first content item. Displaying the system control interface in response to detecting input directed to the representation of the first content item simplifies the use of the computer system by making system controls readily available, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the system controls interface includes one or more media playback controls for controlling playback of the first content item (e.g., such as described above), such as media playback controls 710a-710c in FIG. 7H. In some embodiments, while displaying, via the one or more display generation components, the system controls interface, the computer system detects, via the one or more input devices, a third input directed to a first control of the one or more media playback controls, such as the input from hand 706b directed to the fast forward button 710b in FIG. 7AB, and in response to detecting the third input, the computer system controls playback of the first content item in a first manner corresponding to the first control. For example, the one more media controls for controlling playback of the first content item include a play button, a pause button, a stop button, a rewind button, a fast forward button, and/or a volume dial or slider. In response to detecting the third input directed to a first control of the one or more media controls, the computer system optionally performs an operation corresponding to the first control. For example, if the input is directed to a pause button (e.g., the first control), in response, the computer system performs a pause operation (e.g., pauses playback of the content item). In some embodiments, the third input optionally includes an air gesture performed by one or more hands of the user (e.g., an air pinch gesture) while attention of the user (e.g., based on gaze) is directed at the first control. In some embodiments, the third input includes an air gesture (e.g., air pinch or air tap) at a location of the first control. In some embodiments, the third input includes contact by a stylus, a finger, and/or other object against a touch sensitive input device (e.g., a touch screen) and/or an input received from an input device in communication with the computer system such as a mouse and/or a trackball and directed to the first control (e.g., based on attention and/or a location of a cursor or other focus indicator being on the first control). Displaying system controls including the one or more media controls and performing an operation in response to input directed to the first media control simplifies the use of the computer system making the media control readily available, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the system controls interface includes a selectable element for displaying an environment picker interface, such as the selectable control 714 in FIG. 7F, the environment picker interface including one or more representations of three-dimensional environments available for display at the computer system. In some embodiments, while displaying, via the one or more display generation components, the system controls interface, the computer system detects, via the one or more input devices, a fourth input directed to the selectable element for displaying the environment picker interface, such as if the menu icon 712 in FIG. 7G were the selectable control 714. In some embodiments, in response to detecting the fourth input, the computer system displays, via the one or more display generation components, the environment picker interface in the first three-dimensional environment, such as if the content picker interface 720 in FIG. 7J were the environment picker interface. In some embodiments, the selectable element for displaying the environment picker interface is a button or an icon. In some embodiments, the representation of three-dimensional environments available for display include names of the three-dimensional environments, thumbnails of the three-dimensional environments, and/or icons of the three-dimensional environments. The three-dimensional environments available for display optionally includes one or more extended reality (XR) environments, such as a virtual reality (VR) environment, a mixed reality (MR) environment, an augmented reality (AR) environment, or an augmented virtuality (AV) environment. In some embodiments, the three-dimensional environments available for display correspond to different virtual environments in which to display the representation of the first content item. In some embodiments, the fourth input is directed to the selectable element for displaying the environment picker interface and in response to detecting the fourth input directed to the selectable element for displaying the environment picker interface, the computer system displays the environment picker interface in the first three-dimensional environment. In some embodiments, while displaying the environment picker interface in the three-dimensional environment, the computer system detects an input directed to a representation of a respective three-dimensional environment (e.g., one of the one or more representations of three-dimensional environments available for display at the computer system), and in response to detecting the input, the computer system displays, via the one or more display generation components, the content in the respective three-dimensional environment, such as described with reference to method 1000. In some embodiments, the three-dimensional environments available for display at the computer system have one or more characteristics of the first virtual three-dimensional environment in method 1000. In some embodiments, the fourth input is a selection input (e.g., an air pinch gesture) while attention of the user (e.g., based on gaze) is directed to selectable element. In some embodiments, the fourth input includes an air gesture (e.g., air pinch or air tap) at a location of the selectable element. In some embodiments, the fourth input includes contact by a stylus, a finger, and/or other object against a touch sensitive input device (e.g., a touch screen) and/or an input received from an input device in communication with the computer system such as a mouse and/or a trackball and directed to the selectable element (e.g., based on attention and/or a location of a cursor or other focus indicator being on the selectable element). Launching the environment picker interface from the system controls interface simplifies the user interface by concentrating the controls into fewer interface elements (e.g., the system control interface), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, in response to detecting the second input, such as the input from hand 706*b* in FIG. 7I, the computer system ceases display of the system controls interface, such as the computer system 101 ceases display of the system control interface 710 in FIG. 7J. The computer system thus optionally ceases display of the system controls interface in response to detecting the input for displaying the content picker interface. Ceasing display of the system control interface in response to detecting input for launching the content picker interface helps-declutter the three-dimensional environment and simplify the user interface, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, after detecting the second input and while the system controls interface is not displayed, the computer system detects a third input directed to the representation of the first content item, such as the input from hand 706*b* in FIG. 7W. In some embodiments, in response to detecting the third input, the computer system displays, via the one or more display generation components, the system controls interface in the first three-dimensional environment (optionally at the same position and/or orientation relative to the viewpoint of the user that the system controls interface had when the second input was detected), such as displaying the system controls interface 710 in FIG. 7X. Accordingly, after ceasing display of the system controls interface in response to the input for displaying the content picker interface (e.g., the second input), the computer system optionally redisplays (e.g., displays again) the system controls interface in response to detecting the third input directed to the representation of the first content item. In some embodiments, therefore, when the system control interface is not displayed, the computer system displays the system controls interface in response to input directed to the representation of the content item both when the content picker interface is displayed and when the content picker interface is not displayed. Redisplaying (e.g., displaying again) the system control interface in response to detecting input directed to the representation of the first content item when the computer system had ceased display of the system controls interface simplifies the use of the computer system by making system controls readily available, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the second input directed to the system controls interface is directed to a first control of the one or more controls included in the system controls interface, such as option 716*a* in FIG. 7AG. In some embodiments, displaying the system controls interface in the first three-dimensional environment includes, in accordance with a determination that the content picker interface is displayed in the first three-dimensional environment, displaying the system controls interface with the first control as a non-selectable control, such as the option 716*a* in FIG. 7AG. In some embodiments, displaying the system controls interface in the first three-dimensional environment includes, in accordance with a determination that the content picker interface is not displayed in the first three-dimensional environment, displaying the system controls interface with the first control as a selectable control, such as the option 716*a* in FIG. 7I. For example, the first control is optionally a content picker icon disposed on the system controls interface. In some embodiments, the one or more controls of the system controls interface optionally include a menu icon, selection of which optionally displays selectable options including the first control for displaying (e.g., launching) the content picker interface. When the content picker interface is displayed, the first control for launching the content picker is optionally a non-selectable and/or disabled control. Accordingly, when second input is directed to the non-selectable and/or disabled first control, the computer system optionally does not display the content picker interface in response. In some embodiments, the computer system is not responsive to input detected on the non-selectable and/or disabled first control. In some embodiments, an appearance of the first control changes to indicate that the first control is non-selectable and/or disabled. For example, the first control is optionally greyed out (or otherwise visually indicated as being disabled) when control is non-selectable and/or disabled-thus, the first control optionally has a different visual appearance when it is selectable vs. non-selectable. When the content picker interface is not displayed, the first control for launching the content picker is optionally a selectable and/or enabled control. Accordingly, when second input is directed to the selectable and/or enabled first control, the computer system optionally displays the content picker interface in response. Disabling the control for displaying the content picker when the content picker is already displayed and enabling the control for displaying the content picker when the content picker is not displayed electively provides a selectable option to the user based on the need for the option, which simplifies the user interface, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, while the content picker interface and the system controls interface are displayed in the first three-dimensional environment, in accordance with a determination that the system controls interface at least partially overlays the content picker interface from a viewpoint of a user of the computer system and that the content picker interface has a current focus, the computer system reduces a visual prominence of at least a portion of the system controls interface to increase visibility of the content picker interface from the viewpoint of the user, such as reducing a visual prominence of portion 732 of the system controls interface 710 to increase visibility of the content picker interface 720 in FIGS. 7Y and 7Z. In some embodiments while the content picker interface and the system controls interface are displayed in the first three-dimensional environment, in accordance with a determination that the content picker interface at least partially overlays the system controls interface from the viewpoint of the user of the computer system and that the system controls interface has the current focus, the computer system reduces a visual prominence of at least a portion of the content picker interface (e.g., to increase visibility of the system controls interface from the viewpoint of the user), such as reducing a visual prominence of portion 734 of the content picker interface 720 in FIGS. 7AA and 7AB. In some embodiments, the current focus includes attention of the user (e.g., based on gaze), user interaction, and/or user input. For example, the content picker interface optionally has a current focus when the computer system detects attention and/or a gaze of the user directed to the content picker, when the computer system detects interaction with the content picker interface (e.g., via the one or more input devices), and or when the computer system detects input directed to the content picker interface. In some embodiments, the at least a portion of the system controls interface whose visual prominence the computer system reduces corresponds to a portion of the system controls interface that obscures (e.g., blocks) visibility of a portion of the content picker interface. In some embodiments, reducing a visual prominence of the at least a portion of the system controls interface includes reducing a brightness of the portion of the system controls interface and/or increasing a degree of transparency of the portion of the system controls interface. In some embodiments, reducing a visual prominence of the at least a portion of the system control interface includes ceasing to display the portion of the system controls interface. In some embodiments, if no portion of the system controls interface overlays the content picker interface from a viewpoint of a user of the computer system, the computer system does not reduce a visual prominence of at least a portion of the system controls interface to increase visibility of the content picker interface from the viewpoint of the user if the content picker interface has a current focus. In some embodiments, the system controls interface optionally has a current focus when the computer system detects attention and/or a gaze of the user directed to the system controls interface, when the computer system detects interaction with the system controls interface (e.g., via the one or more input devices), and or when the computer system detects input directed to the system controls interface. In some embodiments, the at least a portion of the content picker interface whose visual prominence the computer system reduces corresponds to a portion of the content picker interface that obscures (e.g., blocks) visibility of a portion of the system controls interface (e.g., the computer system maintains visual prominence of both the system control interface and the content picker interface). In some embodiments, reducing a visual prominence of the at least a portion of the content picker interface includes reducing a brightness of the portion of the content picker interface and/or increasing a degree of transparency of the portion of the content picker interface. In some embodiments, reducing a visual prominence of the at least a portion of the content picker interface includes ceasing to display the portion of the content picker interface. In some embodiments, if no portion of the content picker interface overlays the system controls interface from a viewpoint of a user of the computer system, the computer system does not reduce a visual prominence of at least a portion of the content picker interface to increase visibility of the system controls interface from the viewpoint of the user if the system controls interface has a current focus (e.g., the computer system maintains visual prominence of both the content picker interface and the system controls interface). Reducing visual prominence of a portion of an interface element to increase visibility of an overlapping interface element that has the current focus facilitates the use of the computer system, enhances the operability of the computer system and makes the user-device interface more efficient, which additionally reduces power usage and improves battery life of the computer system by enabling the user to use the computer system more quickly and efficiency.

In some embodiments, the content picker interface is displayed at a first content picker interface location in the first three-dimensional environment, such as content picker interface location 721a in FIG. 7T. In some embodiments, while displaying the content picker interface at the first content picker interface location, the computer system detects, via the one or more input devices, a movement input corresponding to a request to move the content picker interface from the first content picker interface location in the first three-dimensional environment to a second content picker interface location in the first three-dimensional environment, different from the first content picker interface location in the first three-dimensional environment, such as the input from hand 706*b* in FIG. 7T. In some embodiments, in response to detecting the movement input, the computer system moves the content picker interface from the first content picker interface location in the first three-dimensional environment to the second content picker interface location in the first three-dimensional environment, such as content picker interface location 721*b* in FIG. 7U. In some embodiments, the movement input is directed to the control picker interface. In some embodiments, the movement input is directed to a grabber bar or handle displayed adjacent to a window of the control picker interface. In some embodiments, the movement input optionally includes an air gesture performed by one or more hands of the user (e.g., an air pinch gesture) while attention (e.g., based on gaze) of the user is directed at the content picker interface (e.g., a grabber bar or handle), followed by a drag gesture (e.g., a movement) while the air pinch is maintained from the first content picker location in the first three-dimensional environment to the second content picker location in the first three-dimensional environment and performed by the one or more hands of the user. In some embodiments, the movement input includes contact by a stylus or a finger against a touch sensitive input device (e.g., a touch screen) and/or an input received from an input device in communication with the computer system such as a mouse and/or a trackball and directed to content picker interface (e.g., the grabber bar or handle) at the first content picker location in the first three-dimensional environment, followed by a drag gesture from the first content picker location to the second content picker location in the first three-dimensional environment. In response to detecting the movement input, the computer system optionally moves the content picker interface from the first content picker interface location in the first three-dimensional environment to the second content picker interface location in the first three-dimensional environment (e.g., according to the drag gesture). Moving the content picker interface from a first location in the three-dimensional environment to a second location in the three-dimensional environment in response to movement input enables the computer system to optimize the layout of interface elements in the three-dimensional environments in response to user input, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the content picker interface is displayed at a first content picker interface location relative to the docked position in the first three-dimensional environment, such as content picker interface location 721*a* in FIG. 7T. In some embodiments, while displaying the content picker interface at the first content picker interface location relative to the docked position, the computer system detects, via the one or more input devices, a movement input corresponding to a request to move the content picker interface from the first content picker interface location relative to the docked position to a second content picker interface location relative to the docked position in the first three-dimensional environment, different from the first content picker interface location relative to the docked position, such as the input from hand 706*b* in FIG. 7T. In some embodiments, in response to detecting the movement input, the computer system moves the content picker interface from the first content picker interface location relative to the docked position to the second content picker interface location relative to the docked position, such as content picker interface location 721*b* in FIG. 7U. In some embodiments, the movement input is directed to the control picker interface. In some embodiments, the movement input is directed to a grabber bar or handle displayed adjacent to a window of the control picker interface. In some embodiments, the movement input optionally includes an air gesture performed by one or more hands of the user (e.g., an air pinch gesture) while attention of the user (e.g., based on gaze) is directed at the content picker interface (e.g., a grabber bar or handle), followed by a drag gesture (e.g., a movement) while the air pinch is maintained from the first content picker location relative to the docked position to the second content picker location relative to the docked position and performed by the one or more hands of the user. In some embodiments, the movement input includes contact by a stylus or a finger against a touch sensitive input device (e.g., a touch screen) and/or an input received from an input device in communication with the computer system such as a mouse and/or a trackball and directed to content picker interface (e.g., the grabber bar or handle) at the first content picker location relative to the docked position, followed by a drag gesture from the first content picker location to the second content picker location relative to the docked position. In response to detecting the movement input, the computer system optionally moves the content picker interface from the first content picker interface location relative to the docked position to the second content picker interface location relative to the docked position (e.g., according to the drag gesture). Moving the content picker interface from a first location relative to the docked position to a second location relative to the docked position in response to movement input enables the computer system to optimize the layout of interface elements in the three-dimensional environments in response to user input, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, displaying the content picker interface in response to detecting the second input includes displaying, via the one or more display generation components, the content picker interface at a predefined spatial relationship relative to the representation of the first content item, such as the spatial relationship between content picker interface 720 and the representation of the first content item 702A in FIG. 7J. In some embodiments, the predefined spatial relationship is the spatial relationship between the content picker interface and the representation of the first content item when the computer system initially displays the content picker interface. In some embodiments, the content picker interface is centered on the representation of the first content item (e.g., a center point of the content picker interface corresponds to a center point of the representation of the content item) from the viewpoint of the user. In some embodiments, the content picker interface is centered on a vertical midline of the representation of the first content item (e.g., horizontally centered on the representation of the content item but disposed any position vertically, such as above, below, or at the center point of the representation of the content item) from the viewpoint of the user. In some embodiments, the content picker interface is centered on a horizontal midline of representation of the first content item from the viewpoint of the user. It is understood that other predefined spatial relationships exist between the content picker interface and the representation of the content item. Displaying the content picker interface at a predefined spatial relationship relative to the representation of the first content item provides a known and predictable location for the launch of the content picker interface, which simplifies and facilitates the use of the computer system, enhances the operability of the computer system and makes the user-device interface more efficient, which additionally reduces power usage and improves battery life of the computer system by enabling the user to use the computer system more quickly and efficiency.

In some embodiments, displaying the content picker interface in response to detecting the second input includes displaying the content picker interface at a first size (e.g., area and/or volume) in the first three-dimensional environment, such as the content picker interface 720 in FIGS. 7J-7Q. In some embodiments, while the representation of the first content item is not displayed at the docked position in the first three-dimensional environment, such as the representation of the content item 702A in FIGS. 7AH-7AL, the computer system detects, via the one or more input devices, a third input corresponding to a request to display the content picker interface, such as the input from hand 706*b* directed to option 716*a*. In some embodiments, in response to detecting the third input, the computer system displays, via the one or more display generation components, the content picker interface at a second size, larger than the first size, in the first three-dimensional environment, such as the content picker interface 702A in FIGS. 7AH-7AL. In some embodiments, the first size includes a dimension, an aspect ratio, and/or an area of the content picker interface. When the representation of the first content item is not displayed at the docked position (e.g., when the representation of the first content item is undocked or displayed at an undocked position), the computer system optionally changes the location and/or orientation of the representation of the first content item in response to a movement input directed at the representation of the first content item (e.g., an input directed to the representation of the content item to move the representation and/or change its location and/or orientation). Changing the location and/or orientation of the representation of the first content item in response to a movement input directed at the representation of the first content item has one or more characteristics with moving a frame for 3D content in the three-dimensional environment in methods 1200. Changing the location and/or orientation of the representation of the first content item in response to a movement input directed at the representation of the first content item has one or more characteristics with moving the virtual content relative to the three-dimensional environment in method 1300. When the representation of the first content item is at an undocked position, in response to the third input corresponding to the request to display the content picker interface, the computer system optionally displays the content picker interface at a larger size than it displays the content picker interface when the representation of the first content item is at the docked position. The computer system optionally does not display the content picker interface at the predefined spatial relationship described previously relative to the representation of the first content item when the computer system displays the content picker interface in response to the third input corresponding to the request to display the content picker interface (e.g., when the representation of the first content item is at an undocked position) Displaying the content picker interface at a larger size when the representation of the first content item is undocked than when it is docked increases emphasis on the content picker interface relative to the undocked representation of the first content item (e.g., when the content item is less likely to be watched), which enhances the operability of the computer system and makes the user-device interface more efficient, which additionally reduces power usage and improves battery life of the computer system by enabling the user to use the computer system more quickly and efficiency.

In some embodiments, while displaying the content picker interface in the first three-dimensional environment, in accordance with a determination that the content picker interface at least partially overlays the representation of the first content item at the docked position from a viewpoint of a user of the computer system, such as the content picker interface 720 in FIGS. 7J-7M, the computer system forgoes reducing a visual prominence (e.g., visual prominence as described above) of the content picker interface in the first three-dimensional environment (e.g., maintaining the visual prominence of the content picker interface in the first three-dimensional environment), such as the content picker interface 720 in FIGS. 7J-7M. Accordingly, in some embodiments, the visual prominence of the content picker interface is maintained when the content picker interface moves (e.g., in response to movement input directed to the content picker interface) from a first position where the content picker interface does not overlay the representation of the first content item at the docked position to a second position where the content picker interface at least overlays the representation of the first content item. In some embodiments, the content picker interface is opaque at the first position and at the second position (e.g., when the content picker at least partially overlays the representation of the first content item). Forgoing reducing a visual prominence of the content picker interface when the content picker interface at least partially overlays the representation of the first content item while at a docked position maintains and/or enhances the visibility of the content picker interface when the user selects a new content item for display, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the computer system maintains display of the content picker interface in the first three-dimensional environment in response to detecting the first sequence of one or more inputs, including maintaining display of the content picker interface after (e.g., during) ceasing display of the representation of the first content item at the docked position in the first three-dimensional environment and while (e.g., during) displaying the representation of the second content item at the docked position in the first three-dimensional environment, such as content picker 720 in FIGS. 7J-7Q. In some embodiments, the computer system maintains display of the content picker interface when the content picker interface at least partially overlaps the representation of the first content item and/or the representation of the second content item when the docked content item is switched between the representation of the first content item and the representation of the second content item. In some embodiments, an appearance of the content picker interface does not change when the docked content item is switched between the representation of the first content item and the representation of the second content item. In some embodiments, a position and/or an orientation of the content picker interface does not change when the docked content item is switched between the representation of the first content item and the representation of the second content item. Maintaining display of the content picker interface when the docked content item is switched between the representation of the first content item and the representation of the second content enables the user to further switch out the representation of the second content item for a representation of a third content item if needed without having to launch the content picker interface again, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, while displaying the representation of the first content item at the docked position in the first three-dimensional environment, the computer system displays one or more simulated environment effects corresponding to the representation of the first content item in the first three-dimensional environment, such as the simulated environment effect 703A in FIGS. 7D-7N. In some embodiments, while displaying the representation of the second content item at the docked position in the first three-dimensional environment, the computer system displays one or more simulated environment effects corresponding to the representation of the second content item in the first three-dimensional environment, such as the simulated environment effect 703B in FIGS. 7O-7R. In some embodiments, the one or more simulated environment effects include a light spill (e.g., a simulated reflection of the displayed representation of content item or simulated emitted light from the displayed representation of content item (e.g., the first content item and/or the second content item) against a surface of the first three-dimensional environment including representations of one or more virtual objects and/or representations of one or more real objects). In some embodiments, a location of the one or more simulated environment effects in the first three-dimensional environment corresponds to a location of the displayed representation of content item in the first three-dimensional environment. In some embodiments, a size of the one or more simulated environment effects corresponds to a size, a position, and/or an orientation of the displayed representation of content item. In some embodiments, an appearance of the one or more simulated environment effects corresponds to a size, position and/or orientation of the displayed representation of content item. In some embodiments, an appearance of the one or more simulated environment effects changes as playback of the content item (e.g., the first content item and/or the second content item) progresses (e.g., the appearance corresponds to the displayed representation of content item). Accordingly, the appearance of the or more simulated environment effects changes according to changes of one or more visual characteristics (e.g., brightness and/or colors) of the displayed representation of the content item as playback of the content item progresses. Displaying the respective one or more simulated environment effects of the representation of the first content item and the representation of the second content item enhances the immersive effect of the first three-dimensional environment, which enhances the operability of the computer system and makes the user-device interface more efficient, which additionally reduces power usage and improves battery life of the computer system by enabling the user to use the computer system more quickly and efficiency.

In some embodiments, ceasing display of the representation of the first content item at the docked position in the first three-dimensional environment includes displaying the representation of the first content item gradually reducing in visual prominence at the docked position in the first three-dimensional environment, such the representation of the first content item in FIGS. 7M-7N. In some embodiments, displaying the representation of the second content item at the docked position in the first three-dimensional environment includes displaying the representation of the second content item gradually increasing in visual prominence at the docked position, such as the representation of the second content item in FIGS. 7O and 7P. In some embodiments, displaying the representation of the first content item gradually reducing in visual prominence at the docked position includes displaying the representation of the first content item fading out of the docked position. In some embodiments, displaying the representation of the first content item gradually reducing in visual prominence at the docked position includes displaying the representation of the first content item blurring out of the docked position. In some embodiments, displaying the representation of the first content item gradually reducing in visual prominence at the docked position includes gradually increasing a transparency of the representation of the first content item. In some embodiments, displaying the representation of the first content item gradually reducing in visual prominence at the docked position includes gradually decreasing a brightness of the representation of the first content item. In some embodiments, displaying the representation of the second content item gradually increasing in visual prominence at the docked position includes displaying the representation of the second content item fading into the docked position. In some embodiments, displaying the representation of the second content item gradually increasing in visual prominence at the docked position includes displaying the representation of the second content item blurring into of the docked position. In some embodiments, displaying the representation of the second content item gradually increasing in visual prominence at the docked position includes gradually decreasing a transparency of the representation of the second content item. In some embodiments, displaying the representation of the second content item gradually increasing in visual prominence at the docked position includes gradually increasing a brightness of the representation of the second content item. In some embodiments, displaying the representation of the first content item gradually reducing in visual prominence at the docked position includes displaying the representation of the second content item gradually increasing in visual prominence at the docked position (e.g., the representation of the first content item gradually reduces in visual prominence at the docked position while the representation of the second content item gradually increases in visual prominence at the docked position). In some examples, the representation of the second content item gradually increases in visual prominence at the docked position after the computer system has ceased display of the representation of the first content item. Gradually decreasing visual prominence of the first representation of the content item at the docked position and (e.g., while) increasing visual prominence of the representation of the second content item at the docked position provides a smoother transition from the representation of the first content item to the representation of the second content item, which enhances the operability of the computer system and makes the user-device interface more efficient, which additionally reduces power usage and improves battery life of the computer system by enabling the user to use the computer system more quickly and efficiency.

In some embodiments, ceasing display of the representation of the first content item at the docked position in the first three-dimensional environment includes displaying the one or more simulated environment effects corresponding to the representation of the first content item gradually reducing in visual prominence in the first three-dimensional environment, such as the simulated environment effects 703A in FIGS. 7M-7N. In some embodiments, displaying the representation of the second content item at the docked position in the first three-dimensional environment includes displaying the one or more simulated environment effects corresponding to the representation of the second content item gradually increasing in visual prominence in the first three-dimensional environment, such as the simulated environment effects 703B in FIGS. 7O-7P. In some embodiments, displaying the one or more simulated environment effects corresponding to the representation of the first content item gradually reducing in visual prominence in the first three-dimensional environment includes displaying the one or more simulated environment effects corresponding to the representation of the first content item gradually fading out of the first three-dimensional environment. In some embodiments, displaying the one or more simulated environment effects corresponding to the representation of the first content item gradually reducing in visual prominence in the first three-dimensional environment includes displaying the one or more simulated environment effects corresponding to the representation of the first content item gradually blurring out of the first three-dimensional environment. In some embodiments, displaying the one or more simulated environment effects corresponding to the representation of the first content item gradually reducing in visual prominence in the first three-dimensional environment includes gradually increasing a transparency of the one or more simulated environment effects corresponding to the representation of the first content item in the first three-dimensional environment. In some embodiments, displaying the one or more simulated environment effects corresponding to the representation of the first content item gradually reducing in visual prominence in the first three-dimensional environment includes gradually decreasing a brightness of the one or more simulated environment effects corresponding to the representation of the first content item in the first three-dimensional environment. In some embodiments, displaying the one or more simulated environment effects corresponding to the representation of the second content item gradually increasing in visual prominence in the first three-dimensional environment includes displaying the one or more simulated environment effects corresponding to the representation of the second content item gradually fading into the first three-dimensional environment. In some embodiments, displaying the one or more simulated environment effects corresponding to the representation of the second content item gradually increasing in visual prominence in the first three-dimensional environment includes displaying the one or more simulated environment effects corresponding to the representation of the second content item gradually blurring into the first three-dimensional environment. In some embodiments, displaying the one or more simulated environment effects corresponding to the representation of the second content item gradually increasing in visual prominence in the first three-dimensional environment includes gradually decreasing a transparency of the one or more simulated environment effects corresponding to the representation of the second content item in the first three-dimensional environment. In some embodiments, displaying the one or more simulated environment effects corresponding to the representation of the second content item gradually increasing in visual prominence in the first three-dimensional environment includes gradually increasing a brightness of the one or more simulated environment effects corresponding to the representation of the second content item in the first three-dimensional environment. Gradually decreasing visual prominence of the one or more simulated environment effects corresponding to the representation of the content item and (e.g., while) increasing visual prominence of the one or more simulated environment effects corresponding to the representation of the second content item enhances the immersive effect of the first three-dimensional environment, which enhances the operability of the computer system and makes the user-device interface more efficient, which additionally reduces power usage and improves battery life of the computer system by enabling the user to use the computer system more quickly and efficiency.

In some embodiments, while displaying the representation of the first content item in the first three-dimensional environment, in accordance with a determination that the representation of the first content item is displayed at the docked position in the first three-dimensional environment (e.g., as described above), the computer system displays, via the one or more display generation components, a content picker interface option that is selectable to display a content picker interface at a respective location in the first three-dimensional environment (e.g., a location in the content picker interface, or in a system controls user interface such as a media player control user interface), such as selectable option 716a in FIG. 7H. In some embodiments, while displaying the representation of the first content item in the first three-dimensional environment, in accordance with a determination that the representation of the first content item is not displayed at the docked position in the first three-dimensional environment (e.g., as described above), the computer system forgoes display of the content picker interface option at the respective location in the first three-dimensional environment, such as if option 716a displayed as a non-selectable option in FIG. 7H were not displayed. In some embodiments, the content picker interface option is optionally a button or an icon at the respective location that is selectable to display the content picker interface in the first three-dimensional environment (e.g., in response to detecting input directed to the content picker interface option). In some embodiments, the computer system displays the content picker interface option at the respective location concurrently with the system controls interface (e.g., the system controls interface includes the content picker interface option). Displaying the content picker interface option with the representation of the first content item and forgoing display content picker option when the representation of the first content item is not displayed de-clutters and simplifies the user interface by making the content picker option available to the user only when it is needed, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the first content item and the second content item are one or more of a video, a still image, or a document, such as the first content item of the representation of the first content item 702A in FIGS. 7B-7N. In some embodiments, the first content item is a video (e.g., a movie, streaming video, and/or a television show), an image (e.g., a photo and/or a drawing), a user interface of an application (e.g., a browser and/or a game), or a document. In some embodiments, the second content item is a video (e.g., a movie, streaming video, and/or a television show), an image (e.g., a photo and/or a drawing), a user interface of an application (e.g., a browser and/or a game), or a document. In some embodiments, the video, the still image, and/or the document are each associated with (e.g., displayed by) a respective application. In some embodiments, each of a video, a still image, and/or the document is associated with one or more applications. Replacing display of first a video, still image, or document with a second video, still image, or document while maintaining display of the three-dimensional environment enables the computer system to switch content "on the fly" and without displaying a separate and additional interface for switching the content, which reduces the number of interface or environments that the computer system has to generate, which maintains the context of the displayed user interface for the user, which makes the user-device interface more efficient, which additionally reduces power usage and improves battery life of the computer system by enabling the user to use the computer system more quickly and efficiently.

In some embodiments, the first content item is associated with a first content source, such as the first content item of the representation of the first content item 702A in FIGS. 7B-7N. In some embodiments, the second content item is associated with a second content source, different from the first content source, such as the second content item of the representation of the second content item 702B in FIGS. 7O-7P. For example, the first content source and/or the second content source is a media streaming service such as a video and/or music streaming service, and the first content item and/or the second content item is video received by the computer from the first content source and/or second content source over a communication network. In some embodiments, the first content and/or the second content source are different applications (e.g., a media player and/or a media streaming application). In some embodiments, the second content item is associated with (e.g., received from and/or displayed by) a media streaming service and/or an application (e.g., the second content source) different from a media streaming service and/or an application with which the first content item is associated (e.g., the first content source). Replacing display of first content item associated with a first content source with a second content item associated with a second content source while maintaining display of the three-dimensional environment enables the computer system to switch content between content source "on the fly" and without displaying a separate and additional interface for switching the content, which reduces the number of interface or environments that the computer system has to generate, which maintains the context of the displayed user interface for the user, which makes the user-device interface more efficient, which additionally reduces power usage and improves battery life of the computer system by enabling the user to use the computer system more quickly and efficiently.

It should be understood that the particular order in which the operations in method 800 have been described is merely exemplary and is not intended to indicate that the described order is the only order in which the operations could be performed. One of ordinary skill in the art would recognize various ways to reorder the operations described herein. In some embodiments, aspects/operations of method 800 may be interchanged, substituted, and/or added between these methods. For example, various object manipulation techniques and/or object movement techniques of method 800 is optionally interchanged, substituted, and/or added between these methods. For brevity, these details are not repeated here.

FIGS. 9A-9X illustrate examples of a computer system 101 switching from displaying a first virtual three-dimensional environment to displaying a second virtual three-dimensional environment in response to user input while displaying a representation of a first content item at a docked position.

FIG. 9A illustrates a computer system 101 (e.g., an electronic device) displaying (e.g., via a display generation component 120) a first virtual three-dimensional environment 900A. In some embodiments, computer system 101 is a head-mounted device (e.g., a head-mounted display) worn by a user of computer system 101 (e.g., user 906 as shown and described with reference to FIGS. 9A-9X). The computer system 101 has one or more characteristics of the computer system 101 in method 1000. In some embodiments, computer system 101 includes a display generation component 120. For example, the display generation component is configured to display one or more virtual objects (e.g., virtual content included in a virtual window or a user interface) in the first virtual three-dimensional environment 900A. In some embodiments, the one or more virtual objects are displayed within (e.g., superimposed on) a virtual environment (e.g., as shown and described with reference to FIGS. 9A-9X). In some embodiments, the first virtual three-dimensional environment 900A is visible to the user of computer system 101 through display generation component 120 (e.g., optionally through a transparent and/or translucent display). For example, the first virtual three-dimensional environment 900A is visible to the user of computer system 101 while the user is wearing computer system 101. In some embodiments, the first virtual three-dimensional environment 900A has one or more characteristics of the first virtual three-dimensional environment described with reference to method 1000. In some embodiments, computer system 101 includes a plurality of image sensors (e.g., image sensors 314 of FIG. 3). The image sensors optionally include one or more of a visible light camera, an infrared camera, a depth sensor, or any other sensor computer system 101 would be able to use to capture one or more images of a user or a part of the user (e.g., one or more hands of the user) while the user interacts with computer system 101.

For the purpose of illustration, FIGS. 9A-9X include respective top-down views 990a-990x of virtual three-dimensional environments 900A, 900B, and 900C that indicate the positions of various objects in the virtual three-dimensional environments in a horizontal dimension and a depth dimension. The top-down views of the virtual three-dimensional environments 900A, 900B, 900C, and 900D further include an indication of the viewpoint of the user 906 of the computer system 101. For example, the computer system 101 displays the view of virtual three-dimensional environment 900A visible through the display generation component 120 from the viewpoint of the user 906 illustrated in the top-down view 990a of the virtual three-dimensional environment 900A.

FIGS. 9A-9F illustrate the computer system 101 receiving a sequence of one or more inputs corresponding to a request to switch from displaying the first virtual three-dimensional environment 900A to displaying a second virtual three-dimensional environment.

In FIG. 9A, the computer system 101 displays a representation of a first content item 702 at a docked position 908A in the first virtual three-dimensional environment 900A. The first virtual three-dimensional environment 900A includes a simulated and/or virtual three-dimensional environment that is displayed within a three-dimensional environment, optionally instead of representations of a physical environment (e.g., full immersion) or optionally concurrently with a representation of the physical environment (e.g., partial immersion). The first virtual three-dimensional environment 900A is a lake environment. The first virtual three-dimensional environment occupies the entire viewport of the user. The representation of the first content item 702 is a video (e.g., a movie, streaming video, or a television show). In some embodiments, the first content item is an image (e.g., a photo and/or a drawing), a document, and/or an application (e.g., a browser and/or a game). The docked position 908A is optionally a fixed position in the virtual three-dimensional environment 900A, and therefore optionally environment-locked (e.g., world-locked). Accordingly, the computer system 101 displays the representation of the first content item 702 at a location and/or position 908A in the viewport of the user that is based on (e.g., selected in reference to and/or anchored to) a location and/or object in the first virtual three-dimensional environment 900A (e.g., a physical environment or a virtual environment). When the representation of the first content item 702 is at a docked position 908A, the computer system 101 optionally displays one or more simulated environmental effects 703 corresponding to the representation of the first content item 702, such as light spill 703, which is a simulated reflection of representation of the first content item 702 against the surface of the first virtual three-dimensional environment 900A.

In FIG. 9B, the computer system 101 detects an input directed to the representation of the first content item 702. The input is one of the sequence of one or more inputs corresponding to the request to switch from displaying the first virtual three-dimensional environment to displaying a second virtual three-dimensional environment. The input includes an air pinch gesture performed by a hand 906b of the user 906 while attention of the user (e.g., based on gaze 906a) is directed to the representation of the first content item 702.

In FIG. 9C, in response to the input directed to the representation of the first content item 702, the computer system 101 displays system controls interface 710. The system controls interface 710 is displayed in front of the representation of the first content item 702. In some embodiments, the system control 710 is displayed in front of the representation of content item 702 from the perspective of the viewpoint of the user 706, such as illustrated in top-down view 770c. For example, the system controls interface 710 includes one or more media controls 710a-710d for controlling playback of the first content item such as a rewind button 710a, a fast forward button 710b, a pause button 710c, and a playback progress bar 710d that indicates a playback position of the first content item. The one or more controls also include a display area 710e for displaying the name and/or title of the first content item (e.g., "Content Item"). The one or more controls further include a menu icon 712, selection of which displays selectable options including an option to launch a content picker interface. The one or more controls further include an option 714 to launch an environment picker interface, selection of which displays the environment picker interface. It is understood that the one or more controls optionally include additional controls not shown in FIG. 9C.

In FIG. 9D, the computer system 101 detects an input directed to the option 714 to launch an environment picker on the system controls interface 710. The input is one of the sequence of one or more inputs corresponding to the request to switch from displaying the first virtual three-dimensional environment 900A to displaying a second virtual three-dimensional environment. The input includes an air pinch gesture performed by a hand 906b of the user 906 while attention of the user (e.g., based on gaze 906a) is directed to the option 714 to launch an environment picker interface.

In FIG. 9E, the computer system 101, in response to the input directed to the option 714 to launch an environment picker on the system controls interface 710, displays an environment picker interface 920 in the first virtual three-dimensional environment 900A. The environment picker interface 920 is shown as a window displayed in front of the representation of the first content item (e.g., closer to a viewpoint of the user than the representation of the content item 702 at the docked position 908A), as further shown in top-down view 990e. The environment picker interface 920 includes one or more representations of the virtual three-dimensional environments 922 (e.g., icons 922a, 922b, 922c, 922d) available for display. The one or more three-dimensional environments 922 available for display include for example simulated and/or virtual three-dimensional environments that are displayed optionally instead of representations of a physical environment (e.g., full immersion) or optionally concurrently with a representation of the physical environment (e.g., partial immersion). Some examples of a virtual environment include a daytime mountain environment, a nighttime mountain environment, a theater environment, and a moon environment, among other environments not shown in FIG. 9E. In some embodiments, one or more of the virtual three-dimensional environments 922 available for display are associated with respective applications and/or content sources. The one or more representations of virtual three-dimensional environments 922 available for display optionally include the names of the one or more virtual three-dimensional environments, symbols or icons for the one or more virtual three-dimensional environments, and/or thumbnails for the one or more virtual environments.

In FIG. 9F, the computer system 101 detects an input directed to a representation of a virtual three-dimensional environments 922 (e.g., icon 922d) of the one or more representations of three-dimensional environments 922 of the environment picker interface 920. The input is one of the sequence of one or more inputs corresponding to the request to switch from displaying the first virtual three-dimensional environment 900A to displaying a second virtual three-dimensional environment. The input includes an air pinch gesture performed by a hand 906b of the user 906 while attention of the user (e.g., based on gaze 906a) is directed to the representation of a second virtual three-dimensional environment (e.g., icon 922d).

FIGS. 9G-9I illustrate the computer system 101 ceasing display of the first virtual three-dimensional environment 900A and displaying a second virtual three-dimensional environment in response to the sequence of one or more inputs corresponding to the request to switch from displaying the first virtual three-dimensional environment 900A to a second virtual three-dimensional environment.

In FIG. 9G, the computer system 101 ceases display of the first virtual three-dimensional environment 900A (e.g., the lake environment) in response to receiving the input directed to the representation of a second virtual three-dimensional environment (e.g., the moon environment) of the one or more representations of virtual three-dimensional environments 922 of the environment picker interface 920. The computer system 101 begins removing display of the first virtual three-dimensional environment 900A using an animation, such as a fade effect. As illustrated, the computer system 101 thus fades out the first virtual three-dimensional environment 900A. The first virtual three-dimensional environment 900A fading out is shown by the dashed lines. In some embodiments, while the computer system ceases display of the first virtual three-dimensional environment 900A, the computer system 101 maintains display of the representation of the first content item 702 at the docked position 908A.

In FIG. 9H, the computer system 101 displays the second virtual three-dimensional environment 900B. The computer system 101 begins display of the second virtual three-dimensional environment 900B (e.g., the moon environment) after ceasing display of representation of the first virtual three-dimensional environment 900A (e.g., the lake environment). The computer system 101 begins display of the second virtual three-dimensional environment 900B using an animation, such as a fade effect. As illustrated, the computer system 101 thus displays the second virtual three-dimensional environment 900B (e.g., the moon) as fading in. The second virtual three-dimensional environment 900B fading in is shown by the dashed lines.

In FIG. 9I, the computer system 101 has displayed the second virtual three-dimensional environment 900B (e.g., the moon environment). Further, the docked position 908B of the second virtual three-dimensional environment 900B is different (e.g., closer to the viewpoint of the user 706) than the docked position of 908A of the first virtual three-dimensional environment 900A. Accordingly, the representation of the first content item 702 in the second docked position 908B is optionally displayed from a perspective (e.g., a viewing distance and/or viewing angle) in the second virtual three-dimensional environment 900B different from a perspective (e.g., a viewing distance and/or viewing angle) from which the representation of the first content item 702 was displayed in the first virtual three-dimensional environment 900A. For example, in FIGS. 9H-91, the computer system 101 is shown as displaying the representation of the first content item 702 at the docked position 908B in the second virtual three-dimensional environment 900B from a shorter distance than the computer system 101 displayed the representation of the first content item 702 at the docked position 908A in the first virtual three-dimensional environment 900A.

In some embodiments, the computer system 101 moves the representation of the first content item 702 from the first docked position 908A (e.g., in the first virtual three-dimensional environment 900A) to the second docked position 908B (e.g., in the second virtual three-dimensional environment 900B). The computer system 101 optionally moves the representation of the first content item 702 from the first docked position 908A to the second docked position 908B while ceasing display of the first virtual three-dimensional environment 900A and/or while displaying the second virtual three-dimensional environment 900B (e.g., during the switch and/or transition from the first virtual three-dimensional environment 900A and the second virtual three-dimensional environment 900B, such as shown in FIGS. 9H-91). In some embodiments, the computer system maintains display of the representation of the first content item 702 while moving the representation of the first content item 702 from the first docked position 908A (e.g., in the first virtual three-dimensional environment 900A) to the second docked position 908B (e.g., in the second virtual three-dimensional environment 900B).

FIGS. 9J-9O illustrate the computer system 101 receiving a sequence of one or more inputs corresponding to a request to switch from displaying the first virtual three-dimensional environment 900A to displaying a third virtual three-dimensional environment 900C.

FIG. 9J illustrates computer system 101 displaying a representation of a first content item 702 at a docked position 908A in the first virtual three-dimensional environment 900A (a lake environment). In FIG. 9K, the computer system 101 detects an input directed to the representation of the first content item 702. The input includes an air pinch gesture performed by a hand 906b of the user 906 while attention of the user (e.g., based on gaze 906a) is directed to the representation of the first content item 702. In FIG. 9L, in response to the input directed to the representation of the first content item 702, the computer system 101 displays system controls interface 710. In FIG. 9M, the computer system 101 detects an input directed to the option 714 to launch an environment picker on the system controls interface 710. In FIG. 9N, in response to the input directed to the option 714 to launch an environment picker on the system controls interface 710, the computer system 101 displays an environment picker interface 920 in the first virtual three-dimensional environment 900A.

In FIG. 9O, the computer system 101 detects an input directed to a representation of a third virtual three-dimensional environment 922b (e.g., the theater environment 922c) of the one or more representations of virtual three-dimensional environments 922 of the environment picker interface 920. The input includes an air pinch gesture performed by a hand 906b of the user 906 while attention of the user (e.g., based on gaze 906a) is directed to a third virtual three-dimensional environment (e.g., icon 922c).

FIGS. 9P-9T illustrates the computer system 101 displaying the third virtual three-dimensional environment 900C associated with a plurality of viewing positions in response to input directed to a viewing position control interface. The computer system 101 optionally switches from displaying the first virtual three-dimensional environment 900A to displaying the third virtual three-dimensional environment 900C while optionally maintaining display of the representation of the first content 702, as described in reference to the computer system 101 switching from the first virtual three-dimensional environment 900A to the second virtual three-dimensional environment 900B while optionally maintaining display of the representation of the first content item 701 and illustrated in FIGS. 9G-91. A viewing position optionally corresponds to a perspective (e.g., a location and/or a direction) of the viewpoint of the user relative to the third virtual three-dimensional environment 900C and/or the docked position 908C of the content. In the example illustrated, the third virtual three-dimensional environment is theater environment 900C (e.g., a simulated theater) and a viewing position in the third three-dimensional environment 900C optionally corresponds to a seat (e.g., 935a, 935b, 935c, 935d, 935e or 935f) in the theater. The viewing position optionally also corresponds to the perspective of the viewpoint relative to the representation of the first content item 702 at the third docked position 908C in the third virtual three-dimensional environment 900C. In some embodiments, the viewing position includes a viewing distance, which is optionally a distance of the viewpoint relative to the third docked position 908C. In some embodiments, the viewing position includes a viewing angle, which is optionally an angle (e.g., a vertical angle) of the viewpoint relative to the third docked position 908C. In some embodiments, therefore, different viewing positions (e.g., seats) of the plurality of viewing positions correspond to different perspectives (e.g., viewing distance and/or viewing angle) relative to the representation of the first content item 702 at the third docked position 908C (e.g., movie screen and/or theater stage).

For the purpose of illustration, FIGS. 9P-9T include respective side views 991*p*-990*t* of virtual three-dimensional environment 900C that indicate the positions of various objects in the virtual three-dimensional environment in a vertical dimension and a depth dimension. The side views of the virtual three-dimensional environment 900C further include an indication of the viewing position (e.g., seats 935*a*-935*f*) of the user 906 of the computer system 101. For example, the computer system 101 displays the view of virtual three-dimensional environment 900C visible through the display generation component 120 from the viewing position 935*a* of the user 906 illustrated in the side view 991*p* of the virtual three-dimensional environment 900C.

Each viewing position 935*a*-935*f* corresponds to a viewing distance and/or a viewing angle that is different from the viewing distance and/or the viewing angle of another seating position 935*a*-935*f*. For example, viewing positions 935*a* and 935*d* (e.g., seats 935*a* and 935*d*) have the same viewing distance from the docked position 908C, which is the greatest viewing distance from the docked position 908C of the viewing positions 935*a*-935*f*. However, viewing position 935*a* has a different viewing angle relative to the docked position 908C than viewing position 935*d*. Viewing positions 935*b* and 935*e* have the same viewing distance from the docked position 908C, which is less than the viewing distances of viewing positions 935*a* and 935*d* but greater than the viewing distances of viewing positions 935*c* and 935*f* (e.g., seats 935*b* and 935*e* are closer to the docked position 908C than seats 935*a* and 935*d* but further from the docked position 908C than seats 935*c* and 935*f*). However, viewing position 935*b* has a different viewing angle relative to the docked position 908C than viewing position 935*c*. Viewing positions 935*c* and 935*f* have the same viewing distance from the docked position 908C, which is a shorter viewing distance to the docked position than viewing positions 935*b* and 935*e* (e.g., seats 935*c* and 935*f* are the closest to the docked position 908C). However, viewing position 935*c* has a different viewing angle relative to the docked position 908C than viewing position 935*f*.

In some embodiments, viewing positions 935*a*, 935*b*, and 935*c* (e.g., the seats 935*a*-935*c* corresponding to the "floor" of the theater environment 900C) have the same viewing angle relative to the docked position 908C. In some embodiments, viewing positions 935*a*, 935*b*, and 935*c* have different viewing angles relative to the docked position 908C. In some embodiments, viewing positions 935*d*, 935*c*, and 935*f* (e.g., the seats 935*d*-935*f* corresponding to the "balcony" of the theater environment 900C) have the same viewing angle relative to the docked position 908C. In some embodiments, viewing positions 935*d*, 935*c*, and 935*f* have different viewing angles relative to the docked position 908C.

In FIG. 9P, the computer system 101 displays the third three-dimensional environment 900C from a first viewing position 935*a*. Side view 991*p* further shows a side view of the viewing position 935*a* of the user in relation to the representation of the first content item 702 at the third docked position 908C in the third virtual three-dimensional environment 900C. Viewing position 935*a* has the greatest viewing distance from the docked position 908C. The viewing position 935*a* also corresponds to a perspective of the viewpoint relative to the representation of the first content item 702 at the third docked position 908C in the third virtual three-dimensional environment 900C. Accordingly, the computer system 101 displays the third virtual three-dimensional environment 900C and the representation of the first content item 702 at the docked position 908C from the perspective of the first viewing position 935*a* (e.g., seat 935*a*). The computer system 101 thus displays the representation of the first content item 702 and the third three-dimensional environment 900C from a perspective corresponding to the viewing distance of viewing position 935*a* (e.g., seat 935*a*) and the viewing angle of viewing position 935*a* (e.g., seat 935*a*).

In some embodiments, in accordance with a determination that the third virtual three-dimensional environment 900C is associated with a plurality of viewing positions, the computer system 101 displays a viewing control interface 930. FIG. 9P illustrates the computer system 101 displaying a viewing position control interface 930 in the third virtual three-dimensional environment 900C. In some embodiments, the computer system 101 displays the viewing position control interface 930 in response to input directed to an option for displaying the viewpoint control interface (e.g., such as from a control interface 710). The viewing position control interface 930 includes one or more controls for controlling (e.g., setting) the viewing position of the viewpoint of the user in the third three-dimensional environment 900C. The one or more controls optionally include a first control element (e.g., slider bar 932) for controlling a distance of a viewing position (e.g., a viewing distance) from the representation of the first content item 702 at the third docked position 908C in the third virtual three-dimensional environment 900C, and a second control element (e.g., toggle element 934) for controlling a viewing angle of the representation of the first content item 702 at the third docked position 908C from a viewpoint of the user.

Figure 9Q:
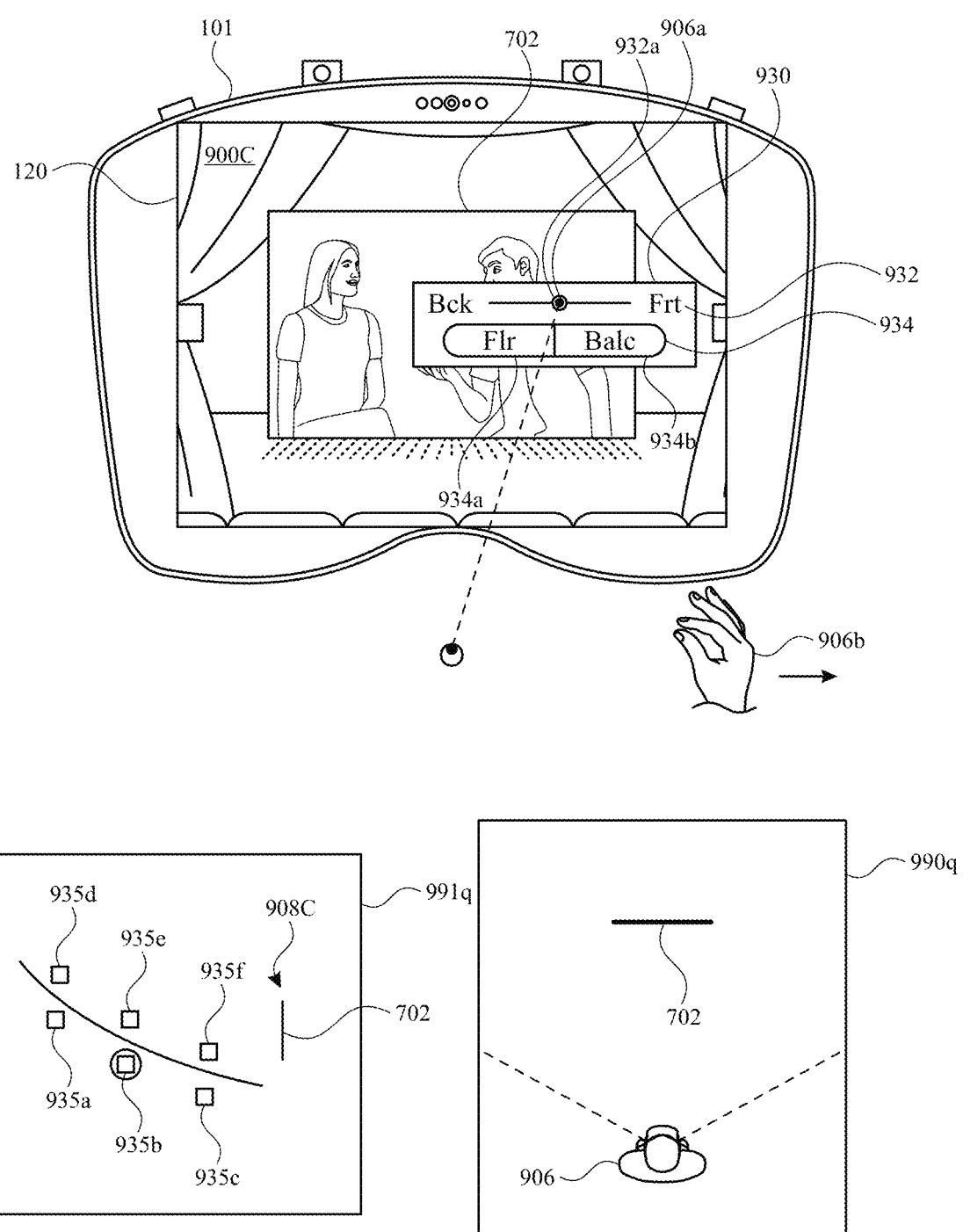
FIGS. 9A-9X illustrate examples of a computer system switching from displaying a first virtual three-dimensional environment to displaying a second virtual three-dimensional environment in response to user input while displaying a representation of a first content item at a docked position in accordance with some embodiments.

In FIG. 9Q, the computer system 101 receives an input positioning slider element 932*a* in the slider bar at a slider position corresponding to the viewing distance of viewing position 935*b* in the third virtual three-dimensional environment 900C. Viewing position 935*b* has a viewing distance from the docked position 908C less than the viewing distance of viewing position 935*a*. The input includes an air pinch gesture performed by a hand 906*b* of the user 906 while attention of the user (e.g., based on gaze 906*a*) is directed to the slider element 932*a*, followed by a drag gesture while the air pinch is maintained positioning slider element 932*a* in the slider bar 932 at the slider bar position corresponding to the viewing distance of viewing position 935*b* (e.g., dragging the slider element 932*a* to the slider bar position corresponding to seat 935*b*).

In response to receiving the input, the computer system 101 displays the third three-dimensional environment 900C from viewing position 935*b*. Side view 991*q* shows a side view of the viewing position 935*b* of the user in relation to the representation of the first content item 702 at the third docked position 908C in the third virtual three-dimensional environment 900C. Viewing position 935*b* has a viewing distance from the docked position 908C less than the viewing distance of viewing position 935*a*. The viewing position 935*b* corresponds to a perspective of the viewpoint relative to the representation of the first content item 702 at the third docked position 908C in the third virtual three-dimensional environment 900C. Accordingly, the computer system 101 displays the third virtual three-dimensional environment 900C and the representation of the first content item 702 at the docked position 908C from the perspective of viewing position 935*b* (e.g., seat 935*b*). The computer system 101 thus displays the representation of the first content item 702 at the docked position 908C and the third three-dimensional environment 900C from a perspective corresponding to the viewing distance of viewing position 935b (e.g., seat 935b) and the viewing angle of viewing position 935b (e.g., seat 935b). As viewing position 935b has a viewing distance from the docked position 908C less than the viewing distance of viewing position 935a, the computer system 101 displays the representation of the first content item 702 at the docked position 908C and the third three-dimensional environment 900C from a perspective closer to the docked position 908C than that of viewing position 935a, as shown in FIG. 9Q.

Figure 9R:
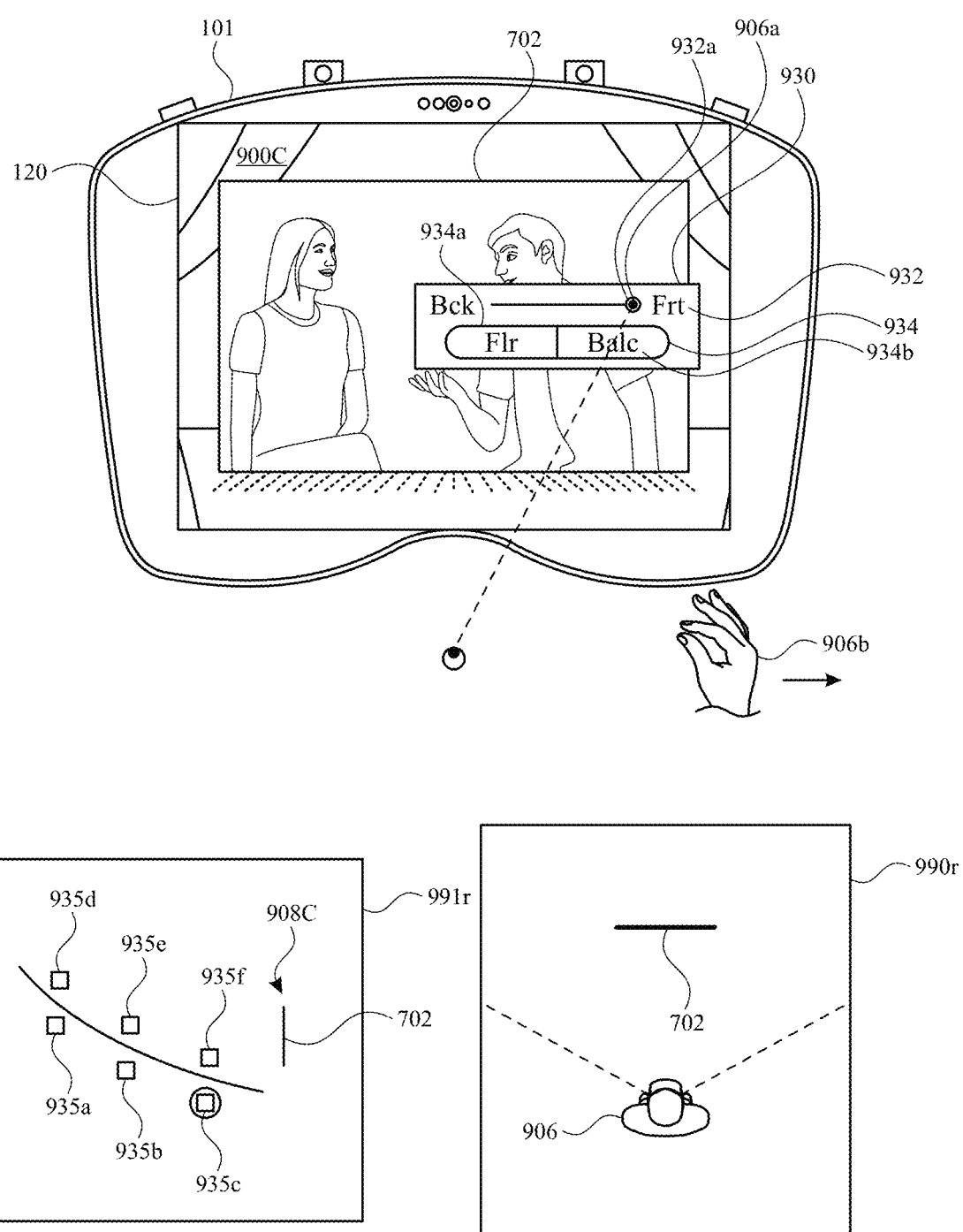

In FIG. 9R, the computer system 101 receives an input positioning slider element 932a in the slider bar at a slider position corresponding to the viewing distance of viewing position 935c in the third virtual three-dimensional environment 900C. Viewing position 935c has a viewing distance from the docked position 908C less than the viewing distance of viewing position 935b. The input includes an air pinch gesture performed by a hand 906b of the user 906 while attention of the user (e.g., based on gaze 906a) is directed to the slider element 932a, followed by a drag gesture while the air pinch is maintained positioning the slider element 932a in the slider bar 932 at the slider bar position corresponding to the viewing distance of viewing position 935c (e.g., dragging the slider element 932a to the slider bar position corresponding to seat 935c).

In response to receiving the input, the computer system 101 displays the third three-dimensional environment 900C from viewing position 935c. Side view 991r shows a side view of the viewing position 935c of the user in relation to the representation of the first content item 702 at the third docked position 908C in the third virtual three-dimensional environment 900C. Viewing position 935c has a viewing distance from the docked position 908C less than the viewing distance of viewing position 935b. The viewing position 935c corresponds to a perspective of the viewpoint relative to the representation of the first content item 702 at the third docked position 908C in the third virtual three-dimensional environment 900C. Accordingly, the computer system 101 displays the third virtual three-dimensional environment 900C and the representation of the first content item 702 at the docked position 908C from the perspective of viewing position 935c (e.g., seat 935c). The computer system 101 thus displays the representation of the first content item 702 at the docked position 908C and the third three-dimensional environment 900C from a perspective corresponding to the viewing distance of viewing position 935c (e.g., seat 935c) and the viewing angle of viewing position 935c (e.g., seat 935c). As viewing position 935c has a viewing distance from the docked position 908C less than the viewing distance of viewing position 935b, the computer system 101 displays the representation of the first content item 702 at the docked position 908C and the third three-dimensional environment 900C from a perspective closer to the docked position 908C than that of viewing position 935b, as shown in FIG. 9R.

Figure 9S:
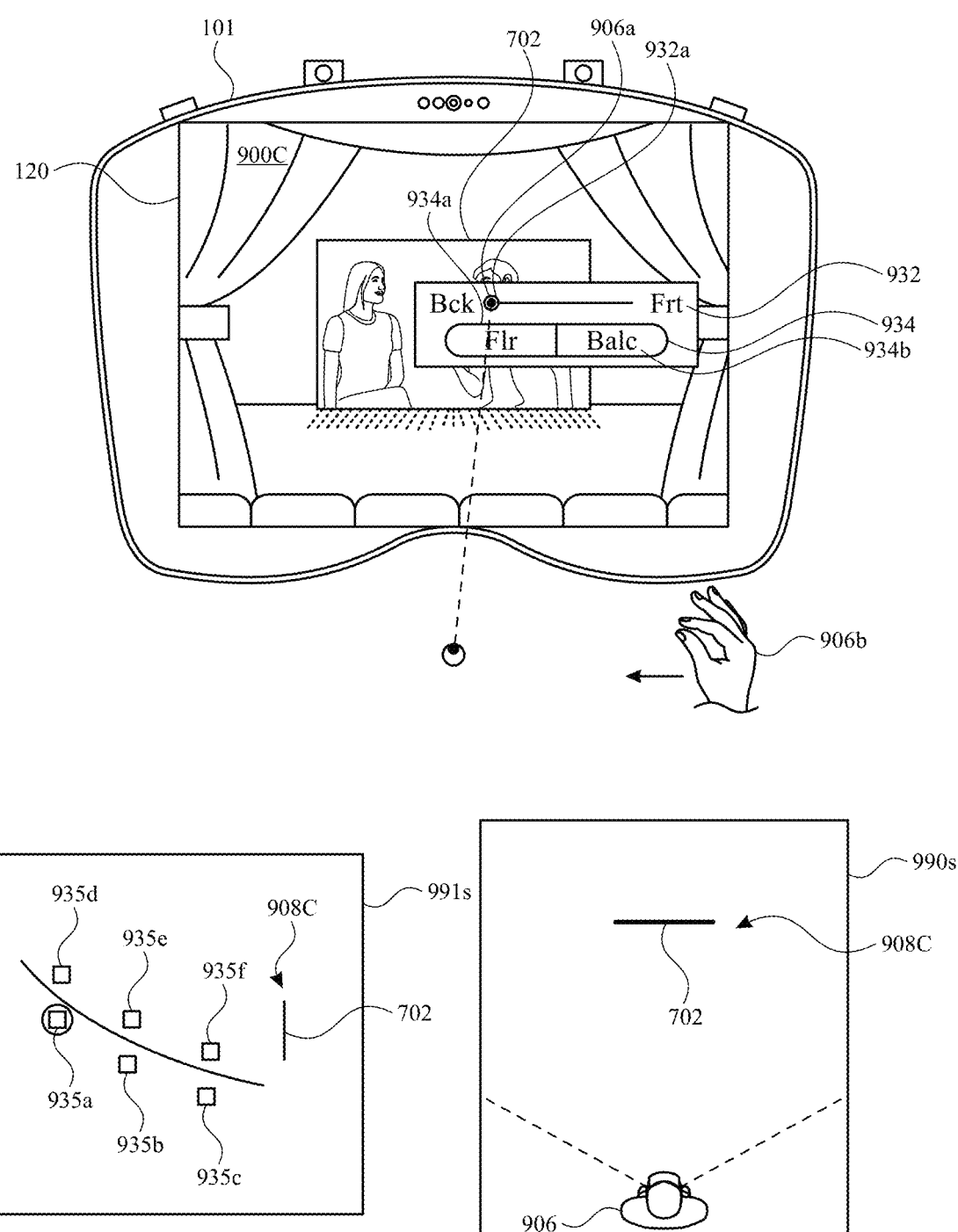

In FIG. 9S, the computer system 101 receives an input positioning slider element 932a in the slider bar at a slider position corresponding to viewing distance of viewing position 935a in the third virtual three-dimensional environment 900C. Viewing position 935a has the greatest viewing distance from the docked position 908C, which is greater than the viewing distances of viewing positions 935b and 935c (and 935e and 935f). The input includes an air pinch gesture performed by a hand 906b of the user 906 while attention of the user (e.g., based on gaze 906a) is directed to the slider element 932a, followed by a drag gesture while the air pinch is maintained positioning the slider element 932a in the slider bar 932 at the slider bar position corresponding to viewing distance of viewing position 935a (e.g., dragging the slider element 932a to the slider bar position corresponding to seat 935a).

In response to receiving the input, the computer system 101 displays the third three-dimensional environment 900C from viewing position 935a, such as previously described in reference to FIG. 9P. Side view 991s shows a side view of the viewing position 935a of the user in relation to the representation of the first content item 702 at the third docked position 908C in the third virtual three-dimensional environment 900C. Viewing position 935a has the greatest viewing distance from the docked position 908C, which is greater than the viewing distances of viewing positions 935b and 935c (and 935e and 935f). The viewing position 935a corresponds to a perspective of the viewpoint relative to the representation of the first content item 702 at the third docked position 908C in the third virtual three-dimensional environment 900C. Accordingly, the computer system 101 displays the third virtual three-dimensional environment 900C and the representation of the first content item 702 at the docked position 908C from the perspective of the viewing position 935a (e.g., seat 935a). The computer system 101 thus displays the representation of the first content item 702 at the docked position 908C and the third three-dimensional environment 900C from a perspective corresponding to the viewpoint distance of viewing position 935a (e.g., seat 935a) and the viewing angle of viewing position 935d (e.g., seat 935d). As viewing position 935a has a viewing distance from the docked position 908C greater than the viewing distance of viewing position 935c, the computer system 101 displays the representation of the first content item 702 at the docked position 908C and the third three-dimensional environment 900C from a perspective further to the docked position 908C than that of viewing position 935c, as shown in FIG. 9S (which optionally shows the same perspective as FIG. 9P that also illustrated the perspective from viewing position 935a).

Figure 9T:
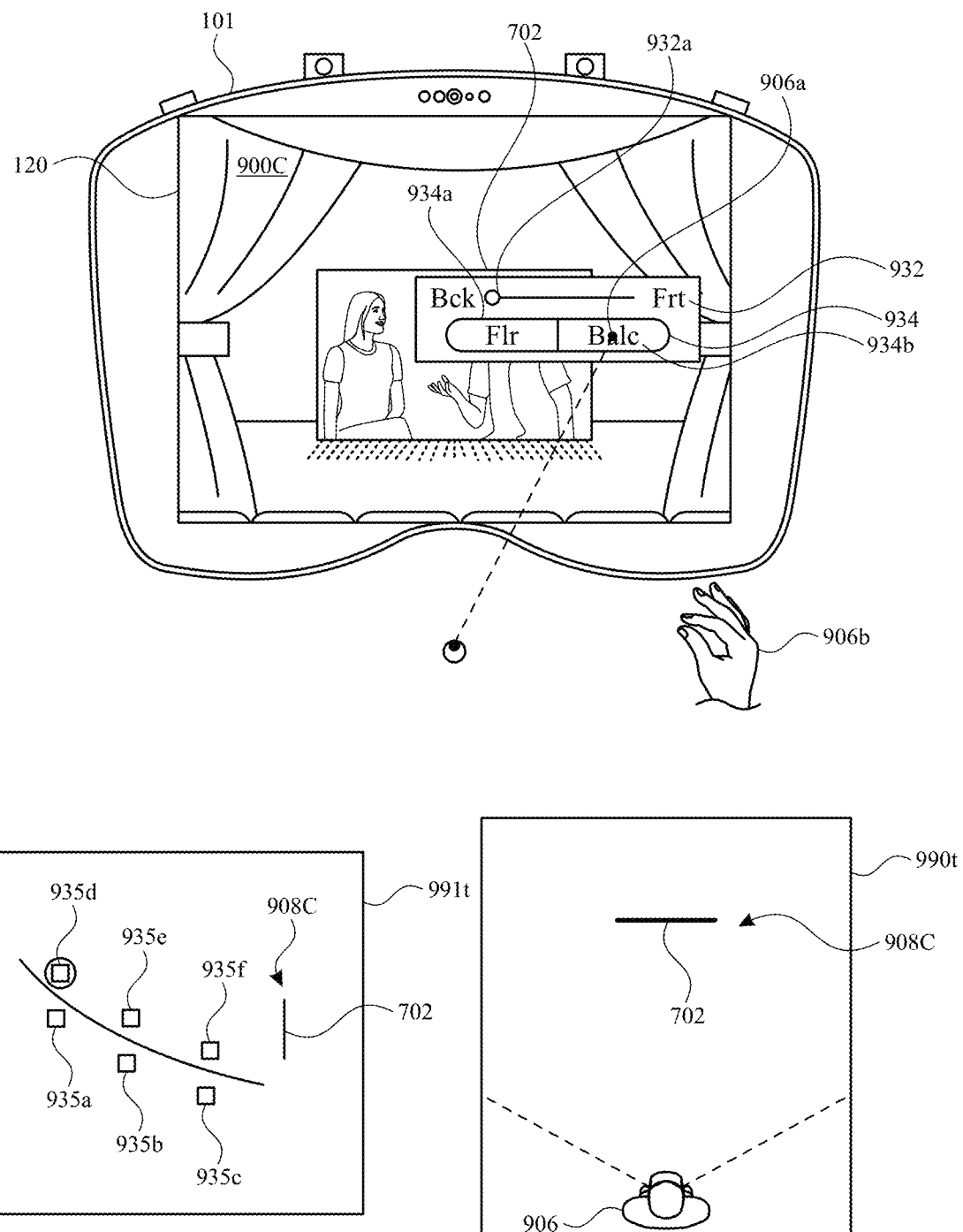

In FIG. 9T, the computer system 101 receives an input directed to toggle position 934b of toggle 934 corresponding to the viewing angle of viewing position 935d in the third virtual three-dimensional environment 900C. Viewing position 935d has the same viewing distance from the docked position 908C as viewing position 935a, but viewing position 935d has a different (e.g., higher) viewing angle relative to the docked position 908C than viewing position 935a. The input includes an air pinch gesture performed by a hand 906b of the user 906 while attention of the user (e.g., based on gaze 906a) is directed to the toggle position 934b.

In response to receiving the input, the computer system 101 displays the third three-dimensional environment 900C from viewing position 935d. Side view 99It shows a side view of the viewing position 935d of the user in relation to the representation of the first content item 702 at the third docked position 908C in the third virtual three-dimensional environment 900C. Viewing position 935d has the same viewing distance from the docked position 908C as viewing position 935a, but viewing position 935d has a different (e.g., higher) viewing angle relative to the docked position 908C than viewing position 935a. The viewing position 935c corresponds to a perspective of the viewpoint relative to the representation of the first content item 702 at the third docked position 908C in the third virtual three-dimensional environment 900C. Accordingly, the computer system 101 displays the third virtual three-dimensional environment 900C and the representation of the first content item 702 at the docked position 908C from the perspective of viewing position 935d (e.g., seat 935d). The computer system 101 thus displays the representation of the first content item 702 at the docked position 908C and the third three-dimensional environment 900C from a perspective corresponding to the viewing distance of viewing position 935d (e.g., seat 935d) and the viewing angle of viewing position 935d (e.g., seat 935d). As viewing position 935d has the same viewing distance from the docked position 908C as viewing position 935a, but viewing position 935d has a different (e.g., higher) viewing angle relative to the docked position 908C than viewing position 935a, the computer system 101 displays the representation of the first content item 702 at the docked position 908C and the third three-dimensional environment 900C from a higher perspective than that of viewing position 935a, as shown in FIG. 9T.

FIGS. 9U-9X illustrate the computer system 101 switching from displaying a daytime (or light) virtual three-dimensional environment to a displaying nighttime (or dark) virtual three-dimensional environment.

Figure 9U:
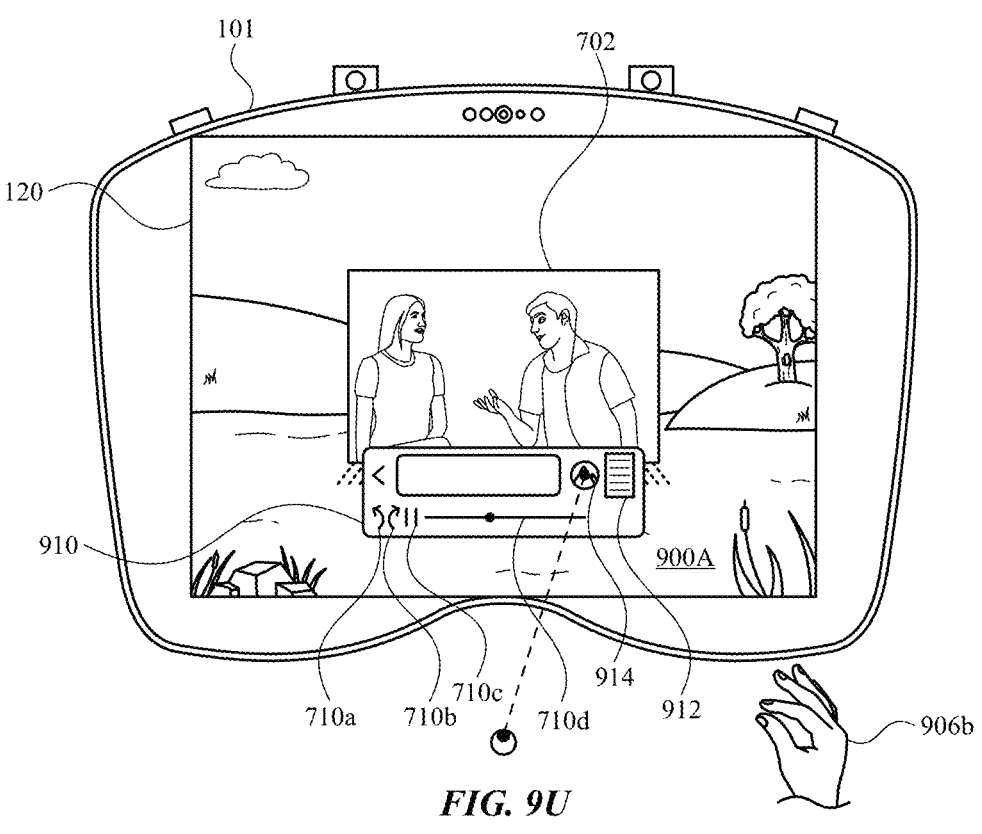
Figure 9V:
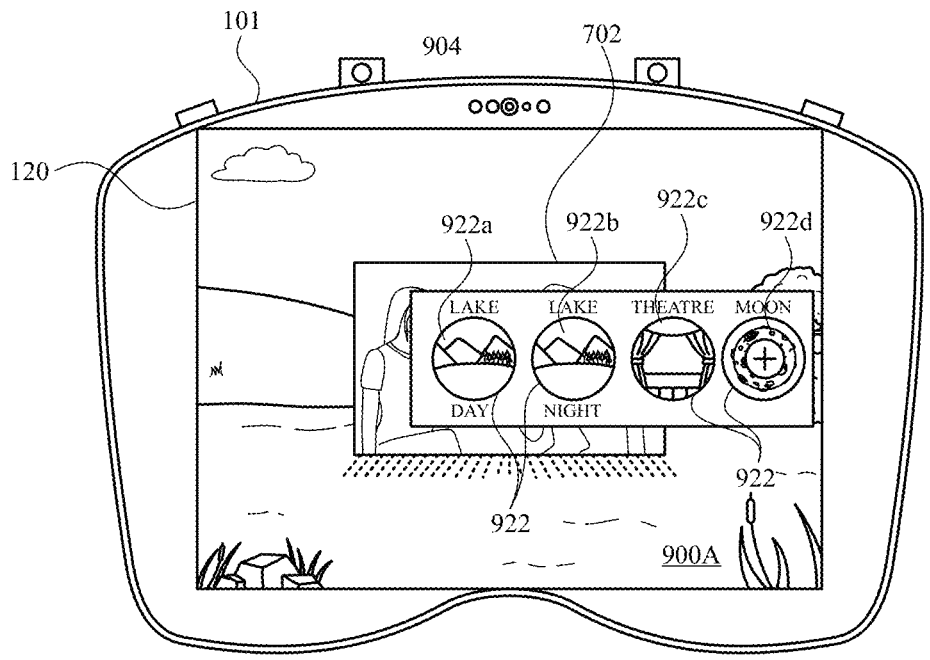

FIG. 9U illustrates computer system 101 displaying a representation of a first content item 702 at a docked position 908A in the first virtual three-dimensional environment 900A (e.g., a lake environment). The computer system 101 further displays system controls interface 710. The computer system 101 detects an input directed to the option 714 to launch an environment picker on the system controls interface 710. In FIG. 9V, in response to the input directed to the option 714 to launch an environment picker on the system controls interface 710, the computer system 101 displays an environment picker interface 920 in the first virtual three-dimensional environment 900A. The environment picker interface 920 includes one or more representations of the virtual three-dimensional environments 922 available for selection, including a virtual three-dimensional environment corresponding to simulated daytime at a lake side (e.g., daytime lake environment 922a) and a virtual three-dimensional environment corresponding to simulated nighttime at the lake side (e.g., a nighttime lake environment 922b).

Figure 9W:
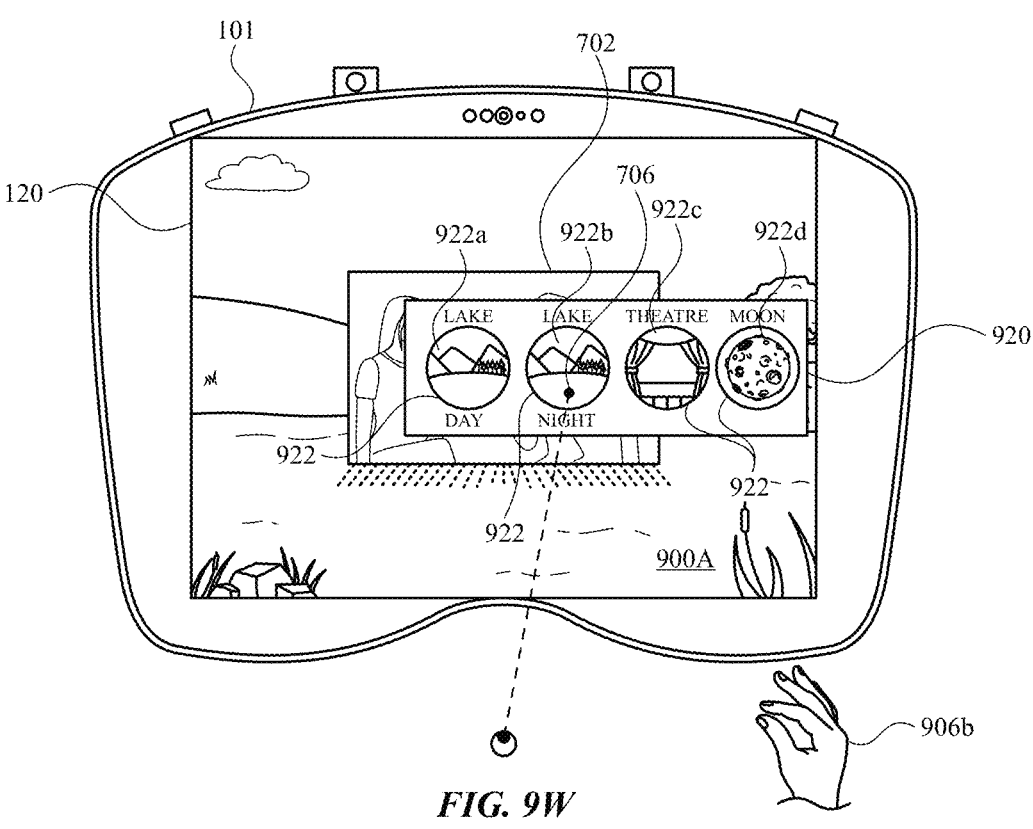
Figure 9X:
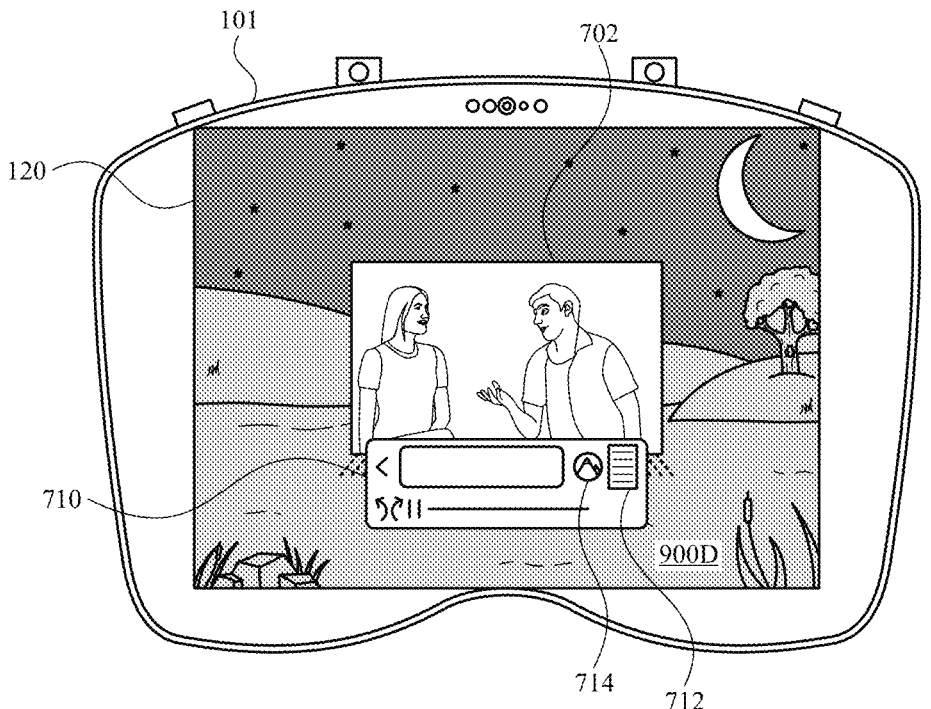

In FIG. 9W, the computer system 101 detects an input directed to a representation of a fourth virtual three-dimensional environment 922b (e.g., nighttime lake environment 922b) of the one or more representations of virtual three-dimensional environments 922 of the environment picker interface 920. The input includes an air pinch gesture performed by a hand 906b of the user 906 while attention of the user (e.g., based on gaze 906a) is directed to the representation of the fourth virtual three-dimensional environment (e.g., icon 922b).

In FIG. 9X, in response to detecting the input directed to the representation of the fourth virtual three-dimensional environments 922b (e.g., nighttime lake environment 922b), the computer system 101 displays the fourth virtual three-dimensional environment 900D. The computer system 101 optionally switches from displaying the first virtual three-dimensional environment 900A to displaying the fourth virtual three-dimensional environment 900D while optionally maintaining display of the representation of the first content 702, as described in reference to the computer system 101 switching from the first virtual three-dimensional environment 900A to the second virtual three-dimensional environment 900B while optionally maintaining display of the representation of the first content item 702 and illustrated in FIGS. 9G-9I. Accordingly, an appearance (e.g., a brightness, a lighting condition and/or scheme, and/or a color scheme) of the simulated physical space (e.g., the lakeside) corresponds to the nighttime. For example, the nighttime appearance of the fourth virtual three-dimensional environment includes optionally the moon, stars and/or other virtual elements that indicate nighttime. In some embodiments, such as illustrated in FIGS. 9W and 9X, some aspects of the virtual three-dimensional environment do not change in appearance between the daytime virtual three-dimensional environment (e.g., daytime lakeside) 900A and a corresponding nighttime virtual three-dimensional environment (e.g., nighttime lakeside) 900D. For example, the appearance of the mountains, lake, and plants is maintained between the daytime virtual three-dimensional environment (e.g., daytime lakeside) 900A and the corresponding nighttime virtual three-dimensional environment (e.g., nighttime lakeside) 900D. However, as illustrated in FIGS. 9W and 9X, other aspects of the virtual three-dimensional environment optionally change in appearance between the daytime virtual three-dimensional environment (e.g., daytime lakeside) 900A and a corresponding nighttime virtual three-dimensional environment (e.g., nighttime lakeside) 900D, such as the sun, clouds, stars, moon, and other indicators of simulated time of day.

FIG. 10 is a flowchart illustrating an exemplary method 1000 of switching from displaying a first virtual three-dimensional environment to displaying a second virtual three-dimensional environment in response to user input while displaying a representation of a first content item at a docked position, in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, a method 1000 is performed at a computer system in communication with one or more display generation components and one or more input devices, such as computer system 101 and display generation component 120 in FIG. 9A. In some embodiments, the computer system has one or more characteristics of the computer system in methods 800, 1200, 1300, 1500, 1700 and/or 1900. In some embodiments, the one or more display generation components have one or more characteristics of the one or more display-generation components in methods 800, 1200, 1300, 1500, 1700 and/or 1900. In some embodiments, the one or more input devices have one or more characteristics of the one or more input devices in method 800, 1200, 1300, 1500, 1700 and/or 1900.

In some embodiments, while displaying, via the one or more display generation components, a representation of a first content item at a first docked position in a first virtual three-dimensional environment, such as the representation of content item 702 in FIG. 9A, wherein the first docked position is fixed in the first virtual three-dimensional environment, the computer system detects (1002a), via the one or more input devices, a first sequence of one or more inputs corresponding to a request to switch from displaying the first virtual three-dimensional environment to displaying a second virtual three-dimensional environment, such as inputs from hand 906b in FIGS. 9D-9F. In some embodiments, the first virtual three-dimensional environment, generated, displayed, or otherwise made viewable by the computer system, is perceptible from the viewpoint of the first user. In some embodiments, the first virtual three-dimensional environment is generated, displayed, or otherwise caused to be viewable by the computer system. For example, a three-dimensional environment is optionally an extended reality (XR) environment, such as a virtual reality (VR) environment, a mixed reality (MR) environment, an augmented reality (AR) environment, or an augmented virtuality (AV) environment. In some embodiments, the first virtual three-dimensional environment is a simulated and/or virtual three-dimensional environment. In some embodiments, the first virtual three-dimensional environment includes a simulated and/or virtual three-dimensional environment that is displayed within a three-dimensional environment, optionally instead of representations of a physical environment (e.g., full immersion) or optionally concurrently with a representation of the physical environment (e.g., partial immersion). Some examples of a virtual environment include a lake environment, a mountain environment, a sunset scene, a sunrise scene, a nighttime environment, a grassland environment, and/or a concert scene. In some embodiments, the virtual environment is based on a real physical location, such as a museum, and/or an aquarium. In some embodiments, the virtual environment is an artist-designed location. In some embodiment, the first virtual three-dimensional environment occupies the entire viewport of the user (e.g., edges and/or boundaries of the first virtual three-dimensional environment correspond to edges and/or boundaries of the viewport of the user). In some embodiments, the first virtual three-dimensional environment does not occupy the entire viewport of the user, and at least a portion of a representation of a physical environment is optionally visible (e.g., outside of a boundary and/or edge of the first virtual three-dimensional environment. In some embodiments, the first virtual three-dimensional environment includes one or more virtual objects and/or representations of objects in a physical environment of the first user of the computer system. In some embodiments, the first virtual three-dimensional environment has one or more characteristics of the first three-dimensional environment in method 800. In some embodiments, the first content item is a video (e.g., a movie, streaming video, and/or a television show), an image (e.g., a photo and/or a drawing), or an application (e.g., a browser and/or a game). In some embodiments, the representation of the first content item is displayed (e.g., played) in a content player interface. The content player interface optionally includes a content window in which the representation of the first content item is displayed. In some embodiments, the representation of the first content is at a first docked position in the first virtual three-dimensional environment. The first docked position is optionally a fixed position in the first virtual three-dimensional environment, and therefore optionally environment-locked (e.g., world-locked). Accordingly, the computer system displays the representation of the first content item at a first location and/or position in the viewpoint of the user that is based on (e.g., selected in reference to and/or anchored to) a location and/or object in the first virtual three-dimensional environment (e.g., a physical environment or a virtual environment). As the viewpoint of the user shifts, the first location and/or object in the first virtual three-dimensional environment relative to the viewpoint of the user changes, which results in the environment-locked representation of the representation of the first content item being displayed at a different location and/or position in the viewport of the user. The computer system optionally does not change the location, position, and/or orientation of the representation of the first content item in the first docked position in response to a movement input directed at the representation of the first content item (e.g., an input directed to the representation of the content item to move the representation and/or change its location, position, and/or orientation). The first docked position optionally differs between environments such that the first location of the first docked position in the first virtual three-dimensional environment relative to the viewpoint of the user and/or relative to a reference location in the first virtual three-dimensional environment such as a center location of the environment is optionally different from a second location of a second docked position in a second virtual three-dimensional environment relative to the viewpoint of the user and/or relative to a reference location in the second virtual three-dimensional environment such as a center location of the environment. In some embodiments, the first sequence of one or more inputs includes a user input directed at the representation of the first content item. For example, the first sequence of one or more inputs optionally includes an air gesture performed by one or more hands of the user (e.g., an air pinch gesture) while attention of the user (e.g., based on gaze) is directed to the representation of the first content item. In some embodiments, the first sequence of one or more inputs includes an air gesture (e.g., air pinch or air tap) at a location of the representation of the first content item. In some embodiments, in response to detecting the input directed to the representation of the first content item, the computer system displays a menu including an environment picker option. In some embodiments, the first sequence of one or more inputs further includes a selection input directed at the environment picker option of the menu (e.g., the computer system detects an air pinch gesture while attention (e.g., based on gaze) is directed to the environment picker). In some embodiments, the first sequence of one or more inputs has one or more characteristics of the first sequence of one or more inputs in method 800. In response to detecting the first sequence of one or more inputs, the computer system optionally displays an environment picker interface. The environment picker interface optionally includes a sequence (e.g., a list) of environments for selection. For example, the sequence of environments optionally includes one or more extended reality (XR) environments, such as a virtual reality (VR) environment, a mixed reality (MR) environment, an augmented reality (AR) environment, or an augmented virtuality (AV) environment. In some embodiments, the virtual environments available for selection correspond to different virtual environments in which to display the representation of the first content item. Such virtual environments optionally have one or more of the characteristics of the virtual environments described with reference to method 800. In some embodiments, the computer system detects a selection input (e.g., an air pinch gesture) while attention of the user (e.g., based on gaze) is directed at a representation of one of the displayed environments in the environment picker interface as the second virtual three-dimensional environment. In some embodiments, the selection input includes an air gesture (e.g., air pinch or air tap) at a location of the representation of one of the displayed environments in the environment picker interface.

In some embodiments, in response to detecting the first sequence of one or more inputs, the computer system ceases (1002b) display of the first virtual three-dimensional environment, such as ceasing display of virtual three-dimensional environment 900A in FIG. 9G. For example, the computer system removes display of the first virtual three-dimensional environment using an animation. In some embodiments, the computer system displays an animation of the first virtual three-dimensional environment morphing from being displayed by the computer system. In some embodiments, the animation includes a fade effect, such as the first virtual three-dimensional environment is fading out. In some embodiments, the animation includes a blur effect, such as the first virtual three-dimensional environment is blurring out. In some embodiments, the computer system ceases display of the first virtual three-dimensional environment while the first content item is playing in the docked position. For example, if the content item is a video that is playing in the docked position before the computer system ceases display of the first virtual three-dimensional environment using an animation (e.g., a fade effect and/or a blur effect), the computer system continues to the play the video while the first virtual three-dimensional environment is fading out. In some embodiments, the computer system pauses the representation of content item before ceasing display of the first virtual three-dimensional environment.

In some embodiments, in response to detecting the first sequence of one or more inputs, the computer system displays (1002c), via the one or more display generation components, the second virtual three-dimensional environment, such as the second virtual three-dimensional environment 900B in FIGS. 9H-9I, wherein a representation of the first content item (e.g., the representation of the content item described previously, or a different representation of the content item) is displayed at a second docked position in the second virtual three-dimensional environment, wherein the second docked position is fixed in the second virtual three-dimensional environment, such as second docked position 908B in FIGS. 9H and 9I. The second docked position is optionally a fixed position in the second virtual three-dimensional environment, and therefore optionally environment-locked (e.g., world-locked). Accordingly, the computer system displays the representation of the first content item at a second location and/or position in the viewport of the user that is based on (e.g., selected in reference to and/or anchored to) a location and/or object in the second virtual three-dimensional environment (e.g., a second virtual environment). As the viewpoint of the user shifts, the second location and/or object in the environment relative to the viewpoint of the user changes, which results in the environment-locked representation of the representation of the first content item being displayed at a different location and/or position in the viewport of the user in the second virtual three-dimensional environment. In some embodiments, the second docked position in the second virtual three-dimensional environment corresponds to the first docked position in the first virtual three-dimensional environment. That is, the location and/or orientation of the representation of the first content item relative to the viewpoint of the user in the first virtual three-dimensional environment optionally match the location and/or orientation of the representation of the first content item relative to the viewpoint of the user in the second virtual three-dimensional environment. In some embodiments, the second docked position in the second virtual three-dimensional environment does not corresponds to the first docked position in the first virtual three-dimensional environment and accordingly, the location and/or orientation of the representation of the first content item relative to the viewpoint of the user in the first virtual three-dimensional environment differ from the location and/or orientation of the representation of the first content item relative to the viewpoint of the user in the second virtual three-dimensional environment. In some embodiments, the computer system displays the second virtual three-dimensional environment using an animation. For example, the computer system displays the first virtual three-dimensional environment morphing into the second virtual three-dimensional environment. In some embodiments, the animation includes a fade effect, such as the first virtual three-dimensional environment fading out and the second virtual three-dimensional environment fading in (e.g., a cross-fade). In some embodiments, the second virtual three-dimensional environment begins fading in before the first virtual three-dimensional environment has completely faded out. In some embodiments, the animation includes a blur effect, such as the first virtual three-dimensional environment blurring into the virtual second three-dimensional environment. In some embodiments, the second virtual three-dimensional environment begins blurring in before the first virtual three-dimensional environment has completely blurred out. In some embodiments, the computer system displays the second virtual three-dimensional environment while the first content item is playing (e.g. continues playing, without stopping or pausing) in the second docked position. For example, if the content item is a video that was playing in the first docked position before the computer system displays of the second virtual three-dimensional environment using an animation (e.g., a fade effect and/or a blur effect), the computer system continues to the play the video in the second docket position while the second virtual three-dimensional environment is fading in. In some embodiments, the computer system pauses the representation of content item before display of the second virtual three-dimensional environment, and resumes playback of the content item after the second virtual three-dimensional environment is displayed. Replacing display of a first virtual three-dimensional environment with a second virtual three-dimensional environment while maintaining the representation of the first content item in a docked position enables the computer system to switch environments "on the fly" and without displaying a separate and additional interfaces for switching environments, which reduces the number of interfaces that the computer system has to generate, which makes the user-device interface more efficient, which additionally reduces power usage and improves battery life of the computer system by enabling the user to use the computer system more quickly and efficiency.

In some embodiments, the first docking position is at a first location in the first virtual three-dimensional environment that has a first spatial arrangement (e.g., position and/or orientation) relative to a viewpoint of a user of the computer system, such as the first docking position 908A in FIGS. 9A-9H, and the second docking position is at a second location in the second virtual three-dimensional environment that has a second spatial arrangement (e.g., position and/or orientation) relative to the viewpoint of the user of the computer system, different from the first spatial arrangement, such as the second docking position 908B in FIGS. 9H-9I. In some embodiments, the first docking position (e.g., the first location) is at a first distance from the viewpoint of the user in the first virtual three-dimensional environment, and the second docking position (e.g., the second location) is at a second distance from the viewpoint of the user, different from the first distance. In some embodiments, the first docking position (e.g., the first location) is at a first angle from the viewpoint of the user in the first virtual three-dimensional environment, and the second docking position (e.g., the second location) is at a second angle from the viewpoint of the user, different from the first angle. Changing the location of the docking positions based on the virtual three-dimensional environment enables the computer system to display the representation of the first content at the optimal docking position for the second virtual three-dimensional environment without additional user input, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, before detecting the first sequence of one or more inputs, the computer system displays, via the one or more display generation components, an environment picker interface in the first virtual three-dimensional environment, such as the environment picker interface 920 in FIGS. 9E and 9F. In some embodiments, the environment picker interface is analogous to the content picker interface described with reference to method 800. In some embodiments, detecting the first sequence of one or more inputs includes detecting a first input directed to the environment picker interface that includes one or more representations of virtual three-dimensional environments available for display, such as the one or more representations of virtual three-dimensional environments available for display 922 of FIGS. 9E and 9F, wherein the first input is directed to a representation of the second virtual three-dimensional environment in the environment picker interface. In some embodiments, the one or more three-dimensional environments available for display include for example simulated and/or virtual three-dimensional environments that are displayed within a three-dimensional environment, optionally instead of representations of a physical environment (e.g., full immersion) or optionally concurrently with a representation of the physical environment (e.g., partial immersion). Some examples of a virtual environment include a lake environment, a mountain environment, a sunset scene, a sunrise scene, a nighttime environment, a grassland environment, and/or a concert scene. In some embodiments, the virtual environment is based on a real physical location, such as a museum, and/or an aquarium. In some embodiments, the virtual environment is an artist-designed location. The one or more representations of three-dimensional environments available for display optionally include the names of the one or more three-dimensional environments, symbols or icons for the one or more three-dimensional environments, and/or thumbnails for the one or more virtual environments. In some embodiments, the one or more representations of one or more virtual environments are displayed as a sequence (e.g., a list or grid). In some embodiments, the first input is a selection input (e.g., an air pinch gesture) while attention of the user (e.g., based on gaze) is directed at a representation of the one or more virtual environments, such as the representation of the second virtual three-dimensional environment. In some embodiments, the first input includes an air gesture (e.g., air pinch or air tap) at a location of a representation of the one or more virtual environments, such as the representation of the second virtual three-dimensional environment. In some embodiments, the first input includes contact by a stylus, a finger, and/or other object against a touch sensitive input device (e.g., a touch screen) and/or an input received from an input device in communication with the computer system such as a mouse and/or a trackball and directed to the environment picker interface (e.g., based on attention and/or a location of a cursor or other focus indicator being in the environment picker interface). Displaying an environment picker interface that includes representations of one or more three-dimensional environments available for display facilitates the use of the computer system, enhances the operability of the computer system and makes the user-device interface more efficient, which additionally reduces power usage and improves battery life of the computer system by enabling the user to use the computer system more quickly and efficiency.

In some embodiments, prior to detecting the first input directed to the environment picker interface, the computer system detects, via the one or more input devices, a second input directed to a system controls interface that is displayed in the first virtual three-dimensional environment, such as system control interface 710 in FIGS. 9C and 9D, wherein the system controls interface includes one or more controls for controlling the first content item. In some embodiments, the system controls interface is analogous to the system controls interface described with reference to method 800. In some embodiments, in response to detecting the second input, the computer system displays, via the one or more display generation components, the environment picker interface in the first virtual three-dimensional environment, such as environment picker interface 920 in FIGS. 9E and 9F. In some embodiments, the system control interface is displayed adjacent to the representation of first content item. In some embodiments, the one or more controls for controlling the first content item include one or more media controls for controlling playback of the content item. For example, the one or more media controls include a play button, a pause button, a stop button, a rewind button, a forward button, and/or a volume dial or slider. In some embodiments, the one or more controls include an option to launch the environment picker interface. In some embodiments, the option to launch the environment picker interface is a button and/or an icon. The one or more controls optionally include a menu icon, selection of which optionally displays selectable options including an option to launch a content picker interface and/or an option to launch an environment picker interface. In some embodiments, the second input is directed to the option to launch the environment picker interface (e.g., optionally one of the one or more controls and/or one of the selectable options), and in response to detecting the second input directed to the option to launch the environment picker interface, the computer system displays the environment picker interface in the first virtual three-dimensional environment. In some embodiments, the second input is a selection input (e.g., an air pinch gesture) while attention of the user (e.g., based on gaze) is directed to the system controls interface (e.g., to the option to launch the environment picker interface). In some embodiments, the second input includes contact by a stylus, a finger, and/or other object against a touch sensitive input device (e.g., a touch screen) and/or an input received from an input device in communication with the computer system such as a mouse and/or a trackball and directed to the system controls interface (e.g., based on attention and/or a location of a cursor or other focus indicator being in the system controls interface), such as, the option to launch the environment picker interface. Launching the environment picker interface from the system controls interface simplifies the user interface by concentrating the controls into fewer interface elements (e.g., the system control interface), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, before detecting the second input, the computer system detects, via the one or more input devices, a third input directed to the representation of the first content item, such as the input from hand 906*b* in FIG. 9A. In some embodiments, in response to detecting the third input directed to the representation of the first content item, the computer system displays, via the one or more display generation components, the system controls interface in the first virtual three-dimensional environment, such as the system controls interface 710 in FIG. 9C. For example, the third input optionally includes an air gesture performed by one or more hands of the user (e.g., an air pinch gesture) while attention of the user (e.g., based on gaze) is directed at the representation of the first content item. In some embodiments, the third input includes contact by a stylus, a finger, and/or other object against a touch sensitive input device (e.g., a touch screen) and/or an input received from an input device in communication with the computer system such as a mouse and/or a trackball and directed to the representation of the first content item (e.g., based on attention and/or a location of a cursor or other focus indicator being on the representation of the first content item). In some embodiments, the system control interface is displayed adjacent to the representation of the first content item. In some embodiments, the system controls interface is displayed closer to a viewpoint of the user than the representation of the first content item. Displaying the system control interface in response to detecting input directed to the representation of the first content item simplifies the use of the computer system by making system controls readily available, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the system controls interface includes one or more media playback controls for controlling playback of the first content item (e.g., such as described above), such as media controls 710*a*-710*c* in FIG. 9D. In some embodiments, while displaying, via the one or more display generation components, the system controls interface, the computer system detects, via the one or more input devices, a third input directed to a first control of the one or more media playback controls, such as if option 714 were the first media control of the one or more media controls 710*a*-710*c* in FIG. 9D. In some embodiments, in response to detecting the third input, the computer system controls playback of the first content item in a first manner corresponding to the first control, such if the computer system were controlling playback of the first content item in the first manner in FIG. 9E. For example, the one more media controls for controlling playback of the first content item include a play button, a pause button, a stop button, a rewind button, a forward button, and/or a volume dial or slider. In response to detecting the third input directed to a first control of the one or more media controls, the computer system optionally performs an operation corresponding to the first control. For example, if the input is directed to a pause button (e.g., the first control), in response, the computer system performs a pause operation (e.g., pauses playback of the content item). In some embodiments, the third input optionally includes an air gesture performed by one or more hands of the user (e.g., an air pinch gesture) while attention of the user (e.g., based on gaze) is directed at the first control. In some embodiments, the third input includes an air gesture (e.g., air pinch or air tap) at a location of the first control. In some embodiments, the third input includes contact by a stylus, a finger, and/or other object against a touch sensitive input device (e.g., a touch screen) and/or an input received from an input device in communication with the computer system such as a mouse and/or a trackball and directed to the first control (e.g., based on attention and/or a location of a cursor or other focus indicator being on the first control). Displaying system controls including the one or more media controls and performing an operation in response to input directed to the first media control simplifies the use of the computer system making the media control readily available, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the system controls interface includes a selectable element for displaying a content picker interface, such as menu icon 712 of FIG. 9C (e.g., analogous to as described with reference to the environment picker interface in method 800), the content picker interface including one or more representations of content items available for display in the first virtual three-dimensional environment. In some embodiments, the content picker interface includes one or more characteristics of the content picker interface described with reference to method 800. In some embodiments, while displaying, via the one or more display generation components, the system controls interface, the computer system detects, via the one or more input devices, a fourth input directed to the selectable element for displaying a content picker interface, such as if the input from hand 706*b* were directed to the menu icon 712 in FIG. 9D. In some embodiments, in response to detecting the fourth input, the computer system displays, via the one or more display generation components, the content picker interface in the first virtual three-dimensional environment, such as if the environment picker 920 in FIG. 9E were the content picker interface. In some embodiments, the one or more content items include one or more videos (e.g., movies, streaming videos, and/or television shows), one or more images (e.g., photos and/or drawings), and/or one or more applications (e.g., browsers and/or games). The one or more representations of the one or more content items available for display in the first virtual three-dimensional environment optionally include the names of the one or more content items, symbols or icons for the one or more items, and/or thumbnails for the one or more content items (e.g., thumbnails for movies, streaming videos, television shows, photos, drawings, documents, games, applications, and other content items), for example. In some embodiments, the one or more representation of one or more content items are displayed as a sequence (e.g., a list). In some embodiments, the fourth input is directed to the selectable element for displaying the content picker interface and in response to detecting the fourth input directed to the selectable element for displaying the content picker interface, the computer system displays the content picker interface in the first virtual three-dimensional environment. In some embodiments, while displaying the content picker interface in the virtual three-dimensional environment, the computer system detects an input directed to a representation of a respective content item (e.g., one of the one or more representations of content items available for display in the first virtual three-dimensional environment), and in response to detecting the input, the computer system displays, via the one or more display generation components, the representation of the respective content item in the first virtual three-dimensional environment. In some embodiments, the content items available for display at the computer system have one or more characteristics of the first content item and/or the second content item in method 800. In some embodiments, the fourth input is a selection input (e.g., an air pinch gesture) while attention of the user (e.g., based on gaze) is directed at selectable element. In some embodiments, the fourth input includes contact by a stylus, a finger, and/or other object against a touch sensitive input device (e.g., a touch screen) and/or an input received from an input device in communication with the computer system such as a mouse and/or a trackball and directed to the selectable element (e.g., based on attention and/or a location of a cursor or other focus indicator being on the first selectable element). Launching the content picker interface from the system controls interface simplifies the user interface by concentrating the controls into fewer interface elements (e.g., the system control interface), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, in response to detecting the second input, the computer system ceases display of the system controls interface, such as ceasing display of the system control interface 710 in FIG. 9E. The computer system thus optionally ceases display of the system controls interface in response to detecting the input for displaying the environment picker interface. Ceasing display of the system control interface in response to detecting input for launching the content picker interface helps-declutter the first virtual three-dimensional environment and simplify the user interface, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, after detecting the second input and while the system controls interface is not displayed, the computer system detects a third input directed to the representation of the first content item, such as the input from hand 906b while the system control interface 710 is not displayed in FIG. 9B. In some embodiments, in response to detecting the third input, the computer system displays, via the one or more display generation components, the system controls interface in the first virtual three-dimensional environment (optionally at the same position and/or orientation relative to the viewpoint of the user that the system controls interface had when the second input was detected), such as the system controls interface 710 in FIG. 9C. Accordingly, after ceasing display of the system controls interface in response to the input for displaying the content picker interface (e.g., the second input), the computer system optionally redisplays (e.g., displays again) the system controls interface in response to detecting the third input directed to the representation of the first content item. In some embodiments, therefore, when the system control interface is not displayed, the computer system displays the system controls interface in response to input directed to the representation of the content item both when the content picker interface is displayed and when the content picker interface is not displayed. Redisplaying (e.g., displaying again) the system control interface in response to detecting input directed to the representation of the first content item when the computer system had ceased display of the system controls interface simplifies the use of the computer system by making system controls readily available, which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the first virtual three-dimensional environment corresponds to a first simulated time of day of a first simulated physical space, such as the virtual three-dimensional environment 900A in FIGS. 9U-9V. In some embodiments, the virtual second three-dimensional environment corresponds to a second simulated time of day, different from the first simulated time of day, of the first simulated physical space, such as the virtual three-dimensional environment 900D in FIG. 9X. For example, the first virtual three-dimensional environment optionally includes the first simulated physical space that is displayed within the three-dimensional environment. Some examples of the first simulated physical space include a lake environment, a mountain environment, a grassland environment, and/or a concert scene. In some embodiments, the first simulated physical space is based on a real physical location, such as a museum, and/or an aquarium. In some embodiments, an appearance (e.g., a brightness, a lighting condition and/or scheme, and/or a color scheme) of the first simulated physical space corresponds to the first simulated time of day. For example, when the first simulated physical space is a lake environment, if a simulated time of day (e.g., the first simulated time of day) is during daytime or daylight (e.g., noon), the first virtual three-dimensional environment corresponds to the lake environment at daytime. If the simulated time of day (e.g., the second simulated time of day) is during nighttime or another time of day when it is dark outside (e.g., at a time of day between sunset and sunrise, early morning, or late evening), the first virtual three-dimensional environment corresponds to the lake environment at nighttime or the other time of day when it is dark outside. As another example, when the first simulated physical space is a mountain environment, if a simulated time of day (e.g., the first simulated time of day) is during nighttime, the first virtual three-dimensional environment corresponds to the mountain environment at nighttime. If the simulated time of day (e.g., the second simulated time of day) is during daytime, the first virtual three-dimensional environment corresponds to the lake environment at daytime. In some embodiments, the first simulated physical space includes one or more virtual elements corresponding to the simulated time of day. For example, if the first simulated time of day is during daytime, the first simulated physical space (e.g., during daytime) optionally includes the sun, birds, and/or other virtual elements that indicate daytime. For example, if the second simulated time of day is during nighttime, the first simulated physical space (e.g., during nighttime) optionally includes the moon, fireflies, and/or other virtual elements that indicate nighttime. If the first simulated time of day is daytime, the first simulated physical space optionally does not include one or more of the virtual elements displayed when the second simulated time of day is during nighttime (e.g., the moon). If the second simulated time of day is nighttime, the first simulated physical space optionally does not include one or more of the virtual elements displayed when the first simulated time of day is during daytime (e.g., the sun).

Enabling the computer system to switch simulated times of the day for an environment enables the display of the representation of the first content item under various simulated lighting conditions, facilitates the use of the computer system, enhances the operability of the computer system and makes the user-device interface more efficient, which additionally reduces power usage and improves battery life of the computer system by enabling the user to use the computer system more quickly and efficiency.

In some embodiments, in response to detecting the first sequence of one or more inputs, and in accordance with a determination that the second virtual three-dimensional environment is associated with a plurality of viewing positions, such as a plurality of viewing positions 935a-935f in FIGS. 9P-9T, the computer system displays, via the one or more display generation components, a viewing position control interface, such as viewing position control interface 930 in FIGS. 9P-9T. In some embodiments, a viewing position corresponds to a perspective (e.g., a location and/or a direction) of the viewpoint of the user relative to the second virtual three-dimensional environment and/or the docked position of the content. For example, if the second virtual three-dimensional environment is theater (e.g., a simulated theater), a viewing position in the second three-dimensional environment optionally corresponds to a seat in the theater. The viewing position optionally also corresponds to the perspective of the viewpoint of the relative to the representation of the first content item at the second docked position in the second virtual three-dimensional environment. In some embodiments, the viewing position includes a viewing distance, which is optionally a distance of the viewpoint relative to the second docked position). In some embodiments, the viewing position includes a viewing angle, which is optionally an angle of the viewpoint relative to the second docked position (e.g., an angle between a vector extending from the center of the representation of the first content item parallel to the ground/perpendicular to gravity and a vector extending from the center of the representation of the first content item to the viewpoint). In some embodiments, a viewing angle corresponds to a height of the viewpoint relative to the representation of the first content item at the second docket position such that different viewing angles correspond to different heights of the viewpoint relative to the representation of the first content item at the second docked position. For example, if the second virtual three-dimensional environment is theater (e.g., a simulated theater), the second docked position of the representation of the first content item optionally corresponds to the movie screen and/or theater stage, and a viewing position in the second three-dimensional environment optionally corresponds to the perspective of the viewpoint relative to the movie screen and/or theater stage (e.g., the viewing distance from the movie screen and/or theater stage and the viewing angle of the movie screen and/theater stage) in the theater (e.g., the second virtual three-dimensional environment). In some embodiments, therefore, different viewing positions (e.g., seats) of the plurality of viewing positions correspond to different perspectives (e.g., viewing distance and/or viewing angle) relative to the representation of the first content item at the second docked position (e.g., movie screen and/or theater stage). In some embodiments, the viewing control interface includes one or more controls for controlling (e.g., setting) the viewing position of the user in the second three-dimensional environment. The one or more controls optionally include a slider bar, a toggle element, and other selectable elements for controlling (e.g., setting) the viewing position of the second virtual three-dimensional environment. In some embodiments, the computer system displays the viewing position control interface in response to detecting the one or more sequence of one or more inputs.

In some embodiments, while displaying the viewing position control interface, the computer system detects, via the one or more input devices, a second input directed to the viewing position control interface, such as one of the inputs from hand 906b in FIG. 9Q-9T. In some embodiments, the second input is directed to the one or more controls for controlling (e.g., setting) the viewing position of the user in the second three-dimensional environment. In some embodiments, the second input is a selection input (e.g., an air pinch gesture) while attention of the user (e.g., based on gaze) is directed to the one or more controls for controlling (e.g., setting) the viewing position of the user in the second three-dimensional environment. In some embodiments, the second input includes contact by a stylus, a finger, and/or other object against a touch sensitive input device (e.g., a touch screen) and/or an input received from an input device in communication with the computer system such as a mouse and/or a trackball and directed to the one or more controls for controlling (e.g., setting) the viewing position of the user in the second three-dimensional environment (e.g., based on attention and/or a location of a cursor or other focus indicator being on the one or more controls).

In some embodiments, in response to detecting the second input, in accordance with a determination that the second input indicates a first viewing position of the plurality of viewing positions in the second virtual three-dimensional environment, the computer system displays, via the one or more display generation components, the second virtual three-dimensional environment from the first viewing position, such as from viewing position 935b in FIG. 9Q. Accordingly, in some embodiments, the computer system displays the second virtual three-dimensional environment from a first perspective of the viewpoint relative to the second three-dimensional environment. Therefore, the computer system optionally displays the second virtual three-dimensional environment from a first location and/or a first direction relative to the second virtual three-dimensional environment. The second computer system optionally displays the second virtual three-dimensional environment from a first perspective of the viewpoint relative to the second docked position. Therefore, the computer system optionally displays the second virtual three-dimensional environment from a first viewing distance and/or first viewing angle relative to the second docked position.

In some embodiments, in response to detecting the second input, in accordance with a determination that the second input indicates a second viewing position of the plurality of viewing positions in the second virtual three-dimensional environment, different from the first viewing position, the computer system displays, via the one or more display generation components, the second virtual three-dimensional environment from the second viewing position, such as from viewing position 935c in FIG. 9R. Accordingly, in some embodiments, the computer system displays the second virtual three-dimensional environment from a second perspective of the viewpoint relative to the second three-dimensional environment. Therefore, the computer system optionally displays the second virtual three-dimensional environment from a second location and/or a second direction relative to the second three-dimensional environment. The second computer system optionally displays the second virtual three-dimensional environment from a second perspective of the viewpoint relative to the second docked position. Therefore, the computer system optionally displays the second virtual three-dimensional environment from a second viewing distance and/or second viewing angle relative to the second docked position. Enabling the computer system to switch viewing positions enables the user to determine the optimal viewing position for the representation of the content item (e.g., an optimal viewing distance and/or angle), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the viewing position control interface includes a first control element (e.g., a slider bar) for controlling a distance of a viewing position of the user from the representation of the first content item at the second docked position in the second virtual three-dimensional environment, such as slider bar 932 in FIGS. 9P-9T. In some embodiments, the second input indicates the first viewing position, having a first distance from the second docked position in the second virtual three-dimensional environment, such as viewing position 935b in FIG. 9Q, wherein the second input uses the first control element to select the first viewing position (e.g., the second input positions a slider element in the slider bar at a first slider bar position corresponding to the first viewing position), such as selecting the viewing position 935b with the slider bar 932 in FIG. 9Q. In some embodiments, the second input optionally includes an air gesture performed by one or more hands of the user (e.g., an air pinch gesture) while attention of the user (e.g., based on gaze) is directed to the slider element, followed by a drag gesture while the air pinch is maintained positioning the slider element in the slider bar at the first slider position (e.g., dragging the slider element to the first slider bar position) and performed by the one or more hands of the user. In some embodiments, the second input includes contact by a stylus or a finger against a touch sensitive input device (e.g., a touch screen) and/or an input received from an input device in communication with the computer system such as a mouse and/or a trackball and directed to slider element followed by a drag gesture to the first slider bar position. Accordingly, the computer system optionally displays, via the one or more display generation components, the second virtual three-dimensional environment from the first viewing position and therefore from a perspective corresponding to the first distance from the second docked position. The computer system therefore optionally displays the representation of the first content item from a perspective correspond to the first distance from the second docked position.

In some embodiments, the second input indicates the second viewing position, having a second distance from the second docked position in the second virtual three-dimensional environment that is different from the first distance, such as viewing position 935c in FIG. 9R, wherein the second input uses the first control element to select the second viewing position (e.g., the second input positions the slider element in the slider bar at a second slider bar position corresponding to the second viewing position), such as selecting the viewing position 935c with the slider bar 932 in FIG. 9R. In some embodiments, the second input optionally includes an air gesture performed by one or more hands of the user (e.g., an air pinch gesture) while attention of the user (e.g., based on gaze) is directed to the slider element, followed by a drag gesture while the air pinch is maintained positioning the slider element in the slider bar at the second slider position (e.g., dragging the slider element to the second slider bar position) and performed by the one or more hands of the user. In some embodiments, the second input includes contact by a stylus or a finger against a touch sensitive input device (e.g., a touch screen) and/or an input received from an input device in communication with the computer system such as a mouse and/or a trackball and directed to slider element followed by a drag gesture to the second slider bar position. Accordingly, the computer system optionally displays, via the one or more display generation components, the second virtual three-dimensional environment from the second viewing position and therefore from a perspective corresponding to the second distance from the second docked position. The computer system therefore optionally displays the representation of the first content item from a perspective correspond to the second distance from the second docked position. Enabling the computer system to switch viewing distances enables the user to determine the optimal viewing distance for the representation of the content item (e.g., an optimal viewing distance), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, the viewing position control interface includes a second control element (e.g., a toggle or a switch) for controlling a viewing angle of the representation of the first content item at the second docked position from a viewing position of the user, such as toggle element 934 in FIGS. 9Q-9T. In some embodiments, the second input indicates the first viewing position, having a first viewing angle relative to the second docked position in the second virtual three-dimensional environment, wherein the second input uses the second control element to select a first viewing position, such the input from hand 906b directed to toggle position 934b to select viewing position 935d in FIG. 9T (e.g., the second input positions a switch element in the toggle or switch at a first toggle position corresponding to the first position). In some embodiments, the second input is a selection input (e.g., an air pinch gesture) while attention of the user (e.g., based on gaze) is directed to the first toggle position. In some embodiments, the second input includes contact by a stylus, a finger, and/or other object against a touch sensitive input device (e.g., a touch screen) and/or an input received from an input device in communication with the computer system such as a mouse and/or a trackball and directed to the first toggle position (e.g., based on attention and/or a location of a cursor or other focus indicator being on the first toggle position). Accordingly, the computer system optionally displays, via the one or more display generation components, the second virtual three-dimensional environment from the first viewing position and therefore from a perspective corresponding to the first viewing angle from the second docked position. The computer system therefore optionally displays the representation of the first content item from a perspective corresponding to the first viewing angle from the second docked position. In some embodiments, the first viewing angle is an angle of the first viewing position relative to the second docked position (e.g., an angle between a vector extending from the center of the representation of the first content item parallel to the ground/perpendicular to gravity and a vector extending from the center of the representation of the first content item to the first viewing position).

In some embodiments, the second input indicates the second viewing position, having a second viewing angle relative to the second docked position in the second virtual three-dimensional environment that is different from the first viewing angle, wherein the second input uses the second control element to select the second viewing position (e.g., the second input positions the switch element in the toggle or switch at the second toggle position corresponding to the second viewing position), such the input from hand 906b in FIG. 9T were directed to toggle position 934a to select viewing position 935a. In some embodiments, the second input is a selection input (e.g., an air pinch gesture) while attention of the user (e.g., based on gaze) is directed to the second toggle position. In some embodiments, the second input includes contact by a stylus, a finger, and/or other object against a touch sensitive input device (e.g., a touch screen) and/or an input received from an input device in communication with the computer system such as a mouse and/or a trackball and directed to the second toggle position (e.g., based on attention and/or a location of a cursor or other focus indicator being on the second toggle position). Accordingly, the computer system optionally displays, displaying via the one or more display generation components, the second virtual three-dimensional environment from the second viewing position and therefore from a perspective corresponding to the second viewing angle from the second docked position. The computer system therefore optionally displays the representation of the first content item from a perspective correspond to the second viewing from the second docked position. In some embodiments, the second viewing angle is an angle of the second viewing position relative to the second docked position (e.g., an angle between a vector extending from the center of the representation of the first content item parallel to the ground/perpendicular to gravity and a vector extending from the center of the representation of the first content item to the second viewing position). Enabling the computer system to switch viewing angles enables the user to determine the optimal viewing angle for the representation of the content item (e.g., an optimal viewing angle), which facilitates the use of the computer system, enhances the operability of the computer system and makes the user-device interface more efficient, which additionally reduces power usage and improves battery life of the computer system by enabling the user to use the computer system more quickly and efficiency.

In some embodiments, display of the representation of the first content item is maintained while switching from displaying the first virtual three-dimensional environment to displaying the second virtual three-dimensional environment (e.g., maintained during the ceasing display of the first virtual three-dimensional environment and the displaying of the second virtual three-dimensional environment), such as with the representation of the first content item 702 in FIGS. 9G-9I. In some embodiments, the computer system maintains playback of the first content item during the ceasing display of the virtual three-dimensional environment and the displaying of the second virtual three-dimensional environment. In some embodiments, the computer system maintains a visual appearance of the representation of the first content item (e.g., a brightness, transparency, and/or color saturation) during the ceasing display of the first virtual three-dimensional environment and the displaying of the second virtual three-dimensional environment. Maintaining display of the representation of the first content item during the switch between the virtual first three-dimensional environment and the second virtual three-dimensional environment ensures a less disruptive transition between virtual three-dimensional environments, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, switching from displaying the first virtual three-dimensional environment to displaying the second virtual three-dimensional environment includes gradually reducing a visual prominence of the first virtual three-dimensional environment, such as with virtual three-dimensional environment 900A in FIG. 9G, and gradually increasing a visual prominence of the second virtual three-dimensional environment, such as with virtual three-dimensional environment 900B in FIGS. 9H-I. In some embodiments, gradually reducing a visual prominence of the first virtual three-dimensional environment includes displaying the first virtual three-dimensional environment fading out. In some embodiments, gradually reducing a visual prominence of the first virtual three-dimensional environment includes displaying the first virtual three-dimensional environment blurring out. In some embodiments, gradually reducing a visual prominence of the first virtual three-dimensional environment includes gradually increasing a transparency of the first virtual three-dimensional environment. In some embodiments, gradually reducing a visual prominence of the first virtual three-dimensional environment includes gradually decreasing a brightness of the first virtual three-dimensional environment. In some embodiments, gradually increasing a visual prominence of the second virtual three-dimensional environment includes displaying the second virtual three-dimensional environment fading in. In some embodiments, gradually increasing a visual prominence of the second virtual three-dimensional environment includes displaying the second virtual three-dimensional environment blurring in. In some embodiments, gradually increasing a visual prominence of the second virtual three-dimensional environment includes gradually decreasing a transparency of the second virtual three-dimensional environment. In some embodiments, gradually increasing a visual prominence of the second virtual three-dimensional environment includes gradually increasing a brightness of the second virtual three-dimensional environment. In some embodiments, displaying the second virtual three-dimensional environment includes gradually increasing a visual prominence of the second virtual three-dimensional environment while gradually reducing a visual prominence of the first virtual three-dimensional environment. In some embodiments, displaying the second virtual three-dimensional environment includes gradually increasing a visual prominence of the second virtual three-dimensional environment after gradually reducing a visual prominence of the first virtual three-dimensional environment. Gradually reducing a visual prominence of the first virtual three-dimensional environment and (e.g., while) increasing a visual prominence of the second virtual three-dimensional environment provides a smoother transition from the first virtual three-dimensional environment to the second virtual three-dimensional environment, which enhances the operability of the computer system and makes the user-device interface more efficient, which additionally reduces power usage and improves battery life of the computer system by enabling the user to use the computer system more quickly and efficiency.

In some embodiments, the first sequence of one or more inputs selects the second virtual three-dimensional environment from a plurality of available virtual three-dimensional environments. In some embodiments, in accordance with a determination that the first content item is associated with a first application (e.g., the first content item is being presented by a first application installed on the electronic device), the plurality of available virtual three-dimensional environments is a first plurality of available virtual three-dimensional environments, such as if the plurality of available virtual three-dimensional environments 922 in FIGS. 9E-9F were the first plurality of available virtual three-dimensional environments. In some embodiments, in accordance with a determination that the first content item is associated with a second application (e.g., the first content item is being presented by a second application installed on the electronic device), different from the first application, the plurality of available virtual three-dimensional environments is a second plurality of available virtual three-dimensional environments, different from the first plurality of available virtual three-dimensional environments, such as if the plurality of available virtual three-dimensional environments 922 in FIGS. 9N-9O were the second plurality of available virtual three-dimensional environments. For example, the first content item is a video and the first application is a video player from a video streaming service. In some embodiments, the first plurality of available virtual-three-dimensional environments is associated with the first application (e.g., the video player) and/or the first content item. As another example, the first content item is an image and the first application is photo application. In some embodiments, the second plurality of available virtual-three-dimensional environments is associated with the second application (e.g., the photo application) and/or the first content item. In some embodiments, the first plurality of available virtual three-dimensional environments does not include a virtual three-dimensional environment of the second plurality of available virtual three-dimensional environments (e.g., there is not overlap between the first plurality of available virtual three-dimensional environments and the second plurality of available virtual three-dimensional environments). In some embodiments, the first plurality of available virtual three-dimensional environments includes at least one virtual three-dimensional environment of the second plurality of available virtual three-dimensional environments (e.g., there is an overlap between the first plurality of available virtual three-dimensional environments and the second plurality of available virtual three-dimensional environments). Providing virtual three-dimensional environments based on application and/or the content items provides the user with virtual three-dimensional environments relevant to the application and/or content item without additional input, which enhances the operability of the computer system and makes the user-device interface more efficient, which additionally reduces power usage and improves battery life of the computer system by enabling the user to use the computer system more quickly and efficiency.

In some embodiments, in response to detecting the first sequence of one or more inputs, the computer system ceases display of the representation of the first content item in the first virtual three-dimensional environment, such as ceasing display of the representation of the first content item 702 in FIG. 9G. In some embodiments, in response to detecting the first sequence of one or more inputs, the computer system displays, via the one or more display generation components, the representation of the first content item in the second virtual three-dimensional environment, such as displaying the representation of the first content item 702 in FIG. 9H. In some embodiments, the computer system ceases playback of the first content item before ceasing display of the representation of the first content item. In some embodiments, the computer system resumes playback of the first content item after display of the representation of the first content item in the second virtual three-dimensional environment. In some embodiments, the computer system does not resume playback of the first content item after display of the representation of the first content item in the second virtual three-dimensional environment. In some embodiments, the computer system does not cease playback of the first content item before (and/or while) ceasing display of the representation of the first content item in the first virtual three-dimensional environment. In some embodiments, the computer system does not cease playback of the first content item before (and/or while) displaying the representation of the first content item in the second virtual three-dimensional environment. Accordingly, in some embodiments, the computer system maintains playback of the first content item while ceasing display of the representation of the first content item in the first virtual three-dimensional environment and while displaying the representation of the first content item in the second virtual three-dimensional environment (e.g., the computer system maintains playback of the first content item during the switch from the first three-dimensional environment to the second three-dimensional environment). Ceasing display of the representation of the first content item in the first virtual three-dimensional environment and displaying the representation of the first content item in the second virtual three-dimensional environment when the computer system switches from the first virtual three-dimensional environment to the second virtual three-dimensional environment enables the computer system to forgo displaying the representation of the first content item moving between the first docked position and the second docked position, which makes the user-device interface more efficient, reduces power usage and improves battery life of the computer system by enabling the user to use the computer system more quickly and efficiency.

In some embodiments, the first virtual three-dimensional environment is associated with a first content source, such as if the virtual three-dimensional environment 900A were associated with a first content source in FIGS. 9A-9G, and the second virtual three-dimensional environment is associated with a second content source, different from the first content source (e.g., as described with reference to method 800), such as if the virtual three-dimensional environment 900B were associated with a second content source in FIGS. 9H-9I. For example, the first content source and/or the second content source is a media streaming service such as a video and/or music streaming service that optionally stores and provides virtual three-dimensional environments. In some embodiments, the first content source and/or the second content source is a content distribution service (e.g., an application distribution service, storefront and/or marketplace). In some embodiments, the first content source and/or the second content source is an application. In some embodiments, the first virtual three-dimensional and/or the second virtual three-dimensional environment is received by the computer from the first content source and/or second content source over a communication network. In some embodiments, the first content source and/or the second content source are different content distribution services (e.g., a movie streaming service and/or a podcast service) and/or applications (e.g., a media player and/or a video game application). In some embodiments, the second virtual three-dimensional environment is associated with (e.g., received from and/or displayed by) a content distribution service and/or an application (e.g., the second content source) different from a content distribution service and/or an application with which the first virtual three-dimensional environment is associated (e.g., the first content source). Replacing display of virtual three-dimensional environment associated with a first content source with a second virtual three-dimensional environment associated with a second content source while maintaining display of the representation of the first content item enables the computer system to switch three-dimensional environments between content sources "on the fly" and without displaying a separate and additional interface for switching the three-dimensional environment, which reduces the number of interface or environments that the computer system has to generate, which maintains the context of the displayed user interface for the user, which makes the user-device interface more efficient, which additionally reduces power usage and improves battery life of the computer system by enabling the user to use the computer system more quickly and efficiently.

It should be understood that the particular order in which the operations in method 1000 have been described is merely exemplary and is not intended to indicate that the described order is the only order in which the operations could be performed. One of ordinary skill in the art would recognize various ways to reorder the operations described herein. In some embodiments, aspects/operations of method 1000 may be interchanged, substituted, and/or added between these methods. For example, various object manipulation techniques and/or object movement techniques of method 1000 is optionally interchanged, substituted, and/or added between these methods. For brevity, these details are not repeated here.

FIGS. 11A-11AO generally illustrate examples of a computer system 101 detecting and responding to events corresponding to requests to move virtual content and/or a frame for virtual content in a three-dimensional environment 1100 and/or detecting and responding to events corresponding to requests to transition a mode of display of the virtual content in the three-dimensional environment 1100, in accordance with some embodiments. In some embodiments, the virtual content is immersive media content (e.g., three-dimensional (3D) content, spatial content, and/or stereoscopic content). In some embodiments, the virtual content can be displayed in different modes of display, such as in an immersive mode or in a framed mode. In some embodiments, when the virtual content is displayed in the framed mode, the virtual content is displayed through a virtual frame in the three-dimensional environment 1100. In some embodiments, when the virtual content is displayed in the immersive mode, the virtual content is displayed without the frame for the virtual content. In some embodiments, when the virtual content is displayed in the immersive mode, an amount of the virtual content that is displayed from a viewpoint of the user at any particular time in the immersive mode can be up to a first amount, and when the virtual content is displayed in the framed mode, an amount of the virtual content that is displayed from the viewpoint of the user at any particular time in the framed mode is up to a second amount, less than the first amount. In some embodiments, the computer system responds similarly to the same input detected in the different modes. In some embodiments, the computer system responds differently the same input detected in the different modes. These features and more will become apparent in the discussion of FIGS. 11A-11AO that follows and/or with reference to embodiment(s) of methods 1200 and/or 1300.

FIG. 11A illustrates a computer system 101 (e.g., an electronic device) displaying, via one or more display generation components (e.g., display generation component 120 of FIG. 1), a three-dimensional environment 1100 from a viewpoint of a user 1101 (e.g., facing the back wall of the physical environment in which computer system 101 is located). In some embodiments, computer system 101 includes one or more display generation components and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below are implemented on a head-mounted display that includes one or more display generation components that display the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

In some embodiments, computer system 101 captures one or more images of the physical environment around computer system 101 (e.g., operating environment 100 of FIG. 1), including one or more objects in the physical environment of computer system 101. In some embodiments, computer system 101 displays representations of the physical environment in three-dimensional environment 1100. For example, as shown in FIG. 11J, a physical table 1106 is in a real-world physical environment of the computer system 101, and display generation component 120 includes a display and/or presentation of physical table 1106 in FIG. 11J.

For the purpose of illustration, FIGS. 11A-11AF include respective top-down views 1110a-1110an of the three-dimensional environment 1100 that indicate the positions of various objects in the three-dimensional environment 1100 in a horizontal dimension and a depth dimension. Additionally, FIGS. 11A-11AF includes respective views of the three-dimensional environment 1100 through display generation component 120 that indicates the positions of various objects in the three-dimensional environment 1100 in a horizontal dimension and a vertical dimension. The top-down view of the three-dimensional environment 1100 further includes an indication of the viewpoint of the user 1101 of the computer system 101 and viewing boundaries 1115 of the user 1101 of the computer system 101. For example, the computer system 101 displays the view of the three-dimensional environment 1100 (e.g., the view that is bounded by the viewing boundaries 1115 in top-down view 1110a) that is shown in the display generation component 120 from the viewpoint of the user 1101 illustrated in the top-down view 1110a. Furthermore, for the purpose of illustration, FIGS. 11A-11AF include side view schematics 1118a-1118af that generally indicates a depth dimension and a vertical dimension, where the user 1101 is viewing three-dimensional environment 1100 via computer system 101, and where an environment horizon 1112a of the environment of the user is indicated and a content horizon 1112b of the virtual content that is displayed is indicated. For example, in side view 1118a in FIG. 11A, the content horizon 1112b is aligned with the environment horizon 1112a and in side view 11180 in FIG. 11O, the content horizon 1112b is not aligned with the environment horizon 1112a. The side view schematics 1118a-1118af also includes viewing boundaries 1115 corresponding to the field of view of the user of the computer system 101 (or, optionally, an available field of view of the computer system 101). It should be noted that the relative dimensions of the three-dimensional environment 1100 and the user of the computer system 101 in the illustrated figures are not necessarily drawn to scale.

In FIG. 11A, the computer system 101 displays virtual content 1102 in an immersive mode. Virtual content 1102 is optionally three-dimensional content (e.g., immersive media content), and the illustrated content is of a football game (e.g., a recorded football game). For example, virtual content is optionally 180-degree media content. The virtual content 1102 is optionally content that is in playback. For example, virtual content 1102 is optionally a 3-hour recorded football game that is in playback, such that the display generation component 120 is displaying different frames of the virtual content 1102 like playing a video, along with presenting, via one or more audio output devices of the computer system 101, audio that corresponds to the football game. In the immersive mode, the virtual content optionally occupies a first amount of an available field of view from a viewpoint of the user. As shown in headset view in FIG. 11A, the football game consumes the viewport of the user (e.g., virtual content is displayed without presentation or display of the physical environment such as table 1106). This is because in FIG. 11A, the amount of field of view of the virtual content that is displayed is greater than the viewport of the user, so if the user were to rotate the user's head, such as shown from FIG. 11A to 11B, computer system 101 would update display of the three-dimensional environment to include a different portion of the virtual content. Further, as shown in side view 1118a in FIG. 11A, a content horizon 1112b of the virtual content 1102 is aligned with a environment horizon 1112a of the environment of the user of the computer system 101. For example, the content horizon 1112b and the environment horizon 1112a are optionally parallel and/or coincident with each other. In some embodiments, the orientation of content horizon 1112b relative to the environment of the user 1101 is based on a direction of gravity in the virtual content. That is, the orientation of the content horizon 1112b is optionally perpendicular to the direction of gravity in the virtual content 1102. In some embodiments, when the content horizon 1112b and the environment horizon 1112a are coincident, the content horizon 1112b is perpendicular to the direction of gravity in the virtual content and further is coincident with the environment horizon 1112a of the environment of the user, which is optionally perpendicular to the direction of gravity in the physical environment of the user.

Figure 11B:
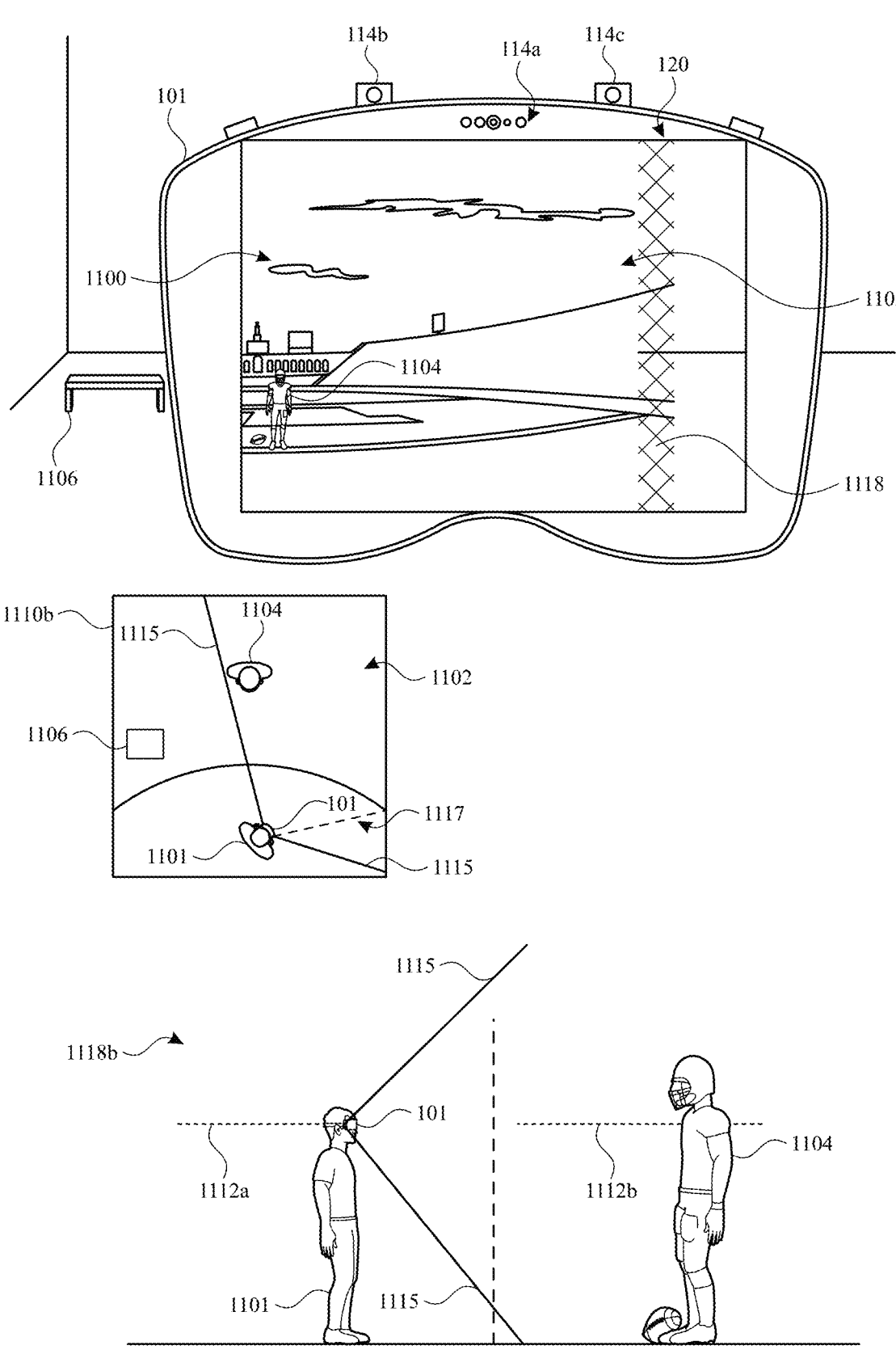

From FIG. 11A to 11B, while the computer system 101 is displaying virtual content 1102 in the immersive mode, the user 1101 has rotated the user's head from its orientation illustrated in top-down view 1110a in FIG. 11A to the orientation illustrated in top-down view 1110b in FIG. 11B. In some embodiments, the head rotation of the user 1101 corresponds to an event to change a viewpoint of the user. In response, as shown in FIG. 11B, the virtual content 1102 is maintained in location in the three-dimensional environment 1100 (e.g., relative to the environment of the user) and boundaries of the virtual content 1102 in the three-dimensional environment are now made visible in the display generation component 120. For example, the virtual content 1102 is optionally 180-degree content, and the user 1101 has rotated such that the right edge of the virtual content 1102 is visible in the viewport of the user. As illustrated in FIG. 11B, in the immersive mode of display of virtual content 1102, the boundary 1118 of the virtual content 1102 in the three-dimensional environment 1100 is of less visual prominence than a portion (e.g., reference 1104) of the virtual content

1102 that is not at the boundary of the virtual content in the three-dimensional environment; such features are described further with reference to embodiment(s) of method 1200.

Figure 11C:
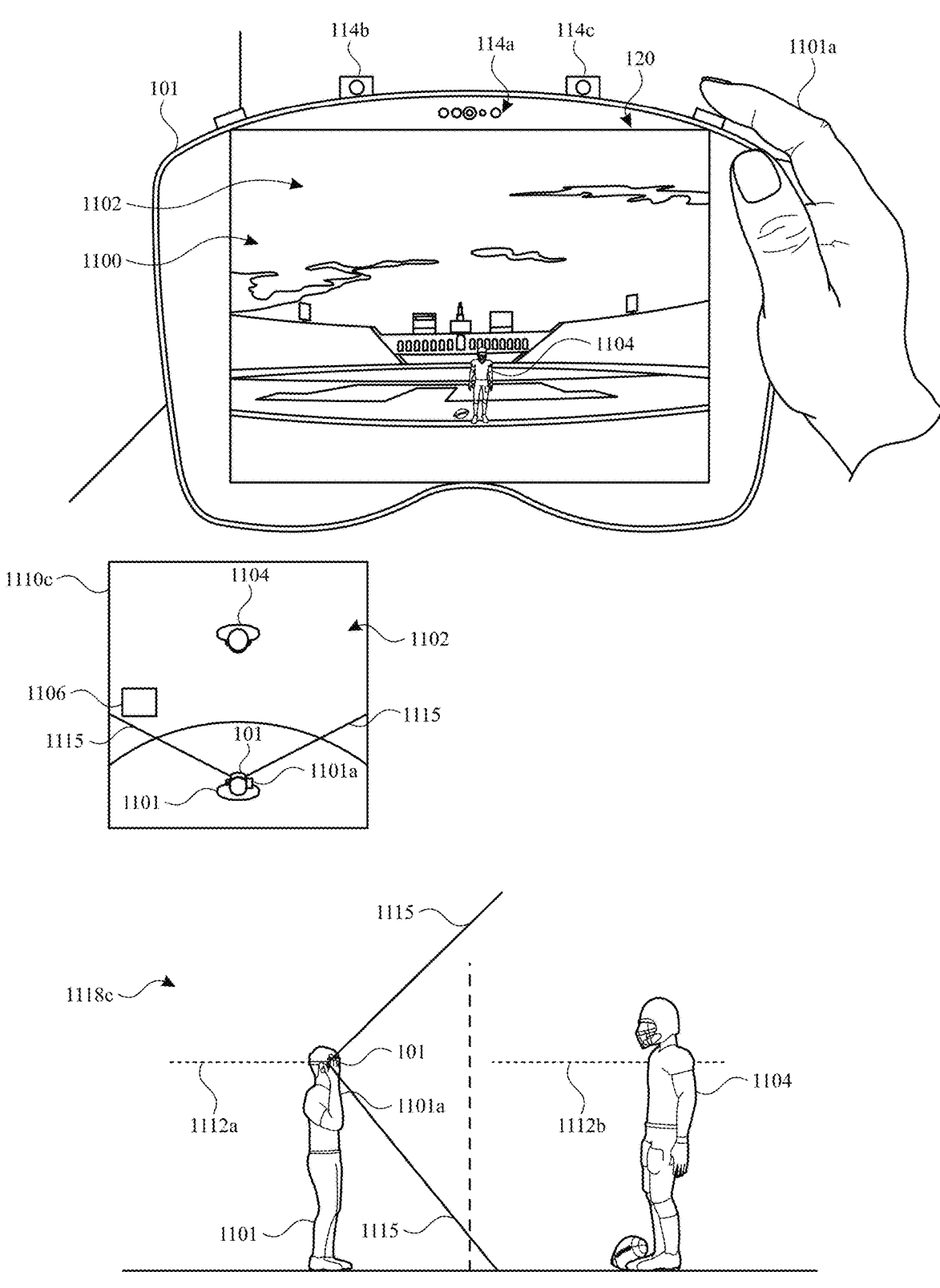
Figure 11D:
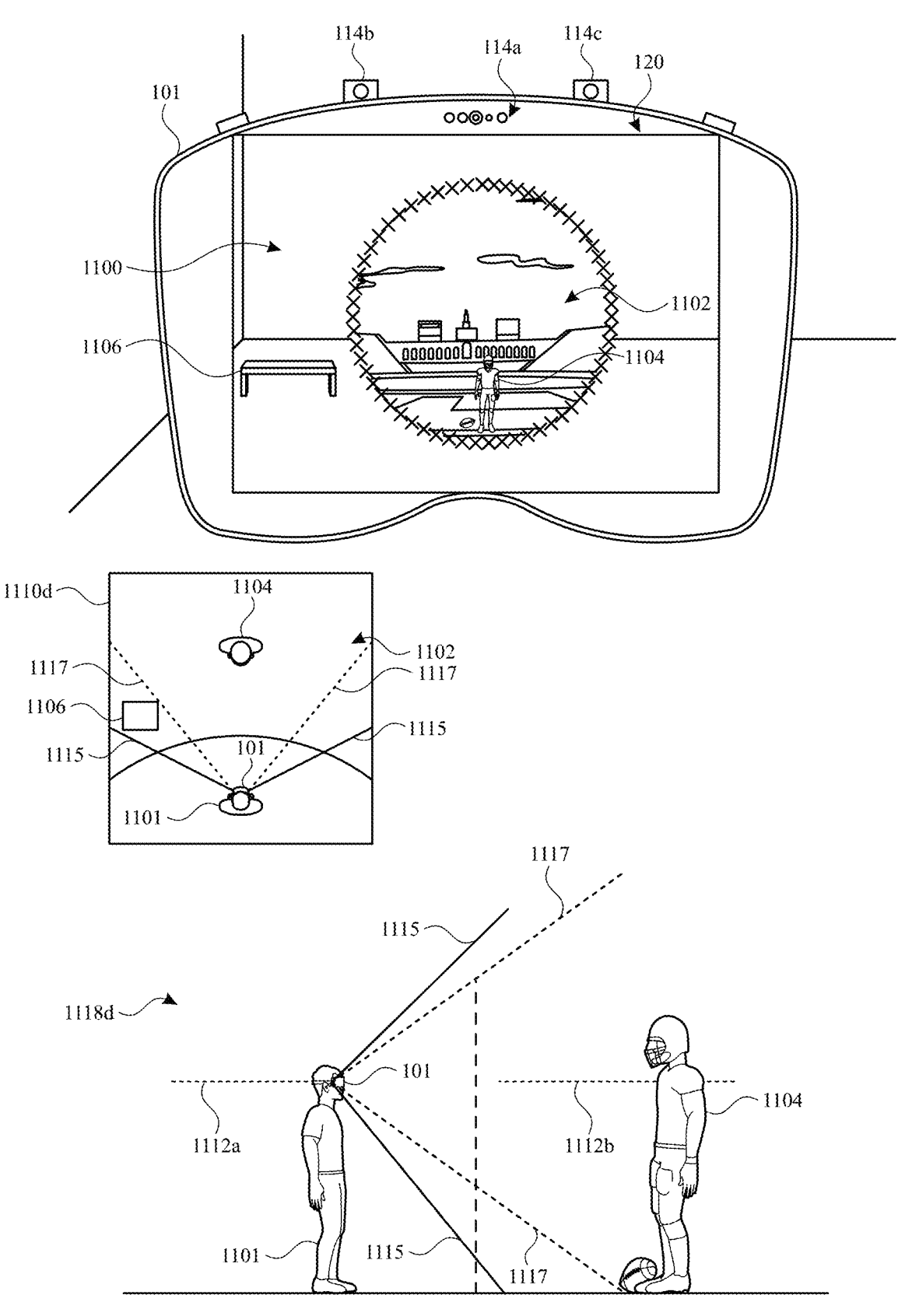

From FIG. 11A to 11C, while displaying virtual content 1102 in the immersive mode, the computer system 101 detects a request to change a level of immersion of the virtual content 1102 from the immersion level illustrated in FIG. 11A. In some embodiments, an immersion level of the virtual content 1102 corresponds to a field of view of the virtual content that can be displayed in the viewport of the user from a particular viewpoint of the user such that at the particular viewpoint of the user, if the immersion level of the virtual content 1102 is a first level then the field of view of the virtual content that can be displayed in the viewport of the user is a first field of view of the virtual content, and if the immersion level of the virtual content 1102 is a second level less than the first level, then the field of view of the virtual content that can be displayed in the viewport of the user is a second field of view of the virtual content less than the first field of view. In FIG. 11C, the computer system 101 detects the request from the user 1101 via detection of user interaction with a rotation mechanical input element of the computer system 101, as shown with the hand 1101a of the user 1101 in contact with computer system 101. In response to the detection of the request, the computer system 101 changes the immersion level of the virtual content 1102 from the immersion level of virtual content 1102 illustrated in FIG. 11A to the illustrated immersion level of virtual content 1102 illustrated in FIG. 11D, which is in accordance with the request. In the illustrated example of change in immersion level, the immersion level change is a decrease in immersion level of virtual content 1102 so the request included a request to decrease the immersion level. Further, in the illustrated example of change in immersion level, the viewing boundaries 1115 by which the virtual content is visible to the user 1101 has decreased in angular size as respectively shown from display generation component 120 of FIG. 11C to display generation component 120 of FIG. 11D, with the boundaries of the virtual content now visible in the display generation component 120, and also shown from top-down view 1110c to top-down view 1110d and from side view 1118c to side view 1118d with the field of view of virtual content 1102 that is visible to the user 1101 being bounded by viewing boundaries 1117. Further details regarding changing a level of immersion of the virtual content 1102 are described with reference to embodiment(s) of method 1200.

Figure 11E:
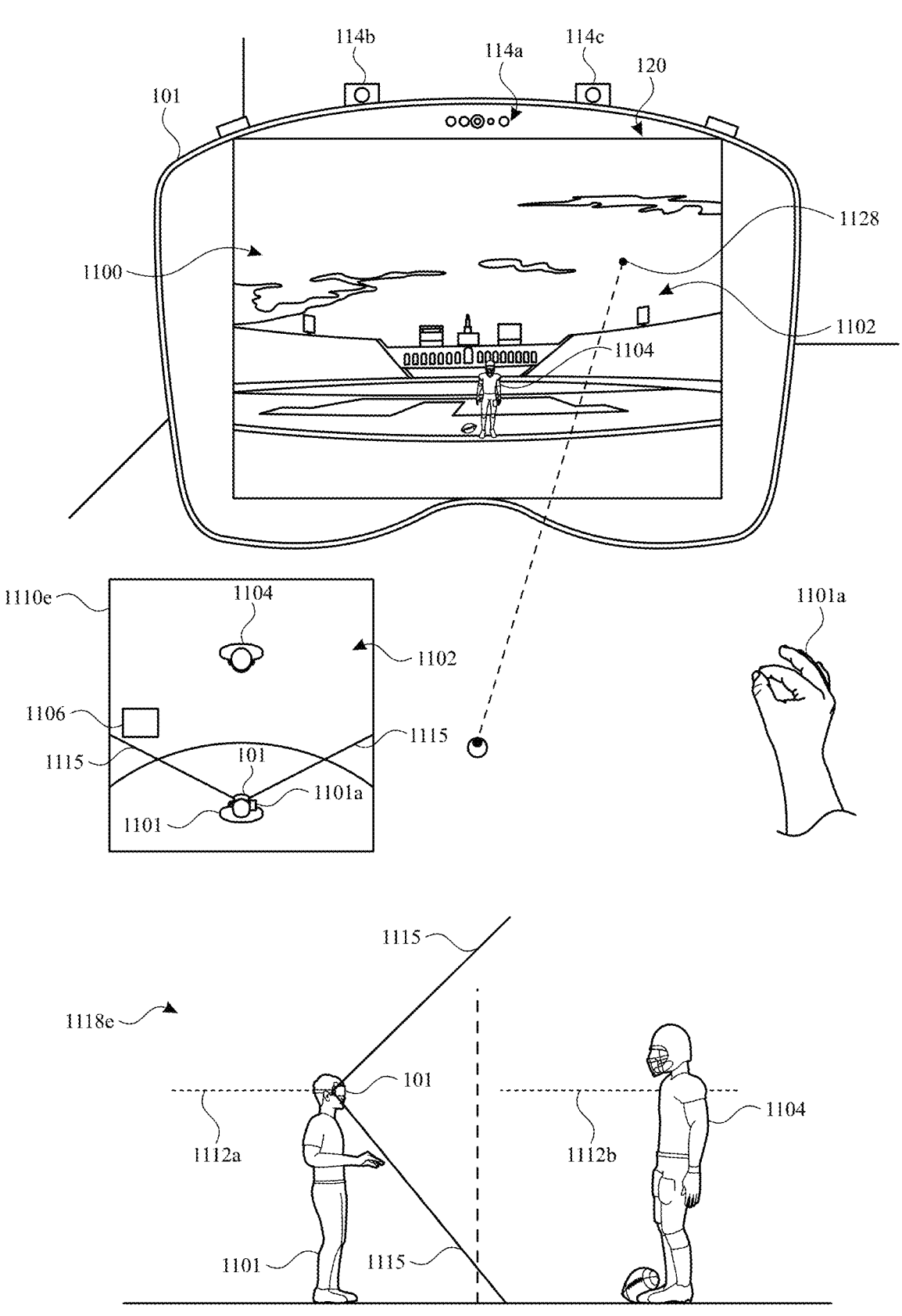

In FIG. 11E, the computer system 101 detects an input corresponding to a request to display controls associated with the virtual content 1102. For example, in FIG. 11E, the input includes a hand 1101a of the user 1101 being placed into an air pinch pose while attention (e.g., based on gaze 1128) of the user 1101 is directed at the virtual content 1102. In response, computer system 101 displays controls associated with the virtual content 1102, as shown in FIG. 11F.

Figure 11F:
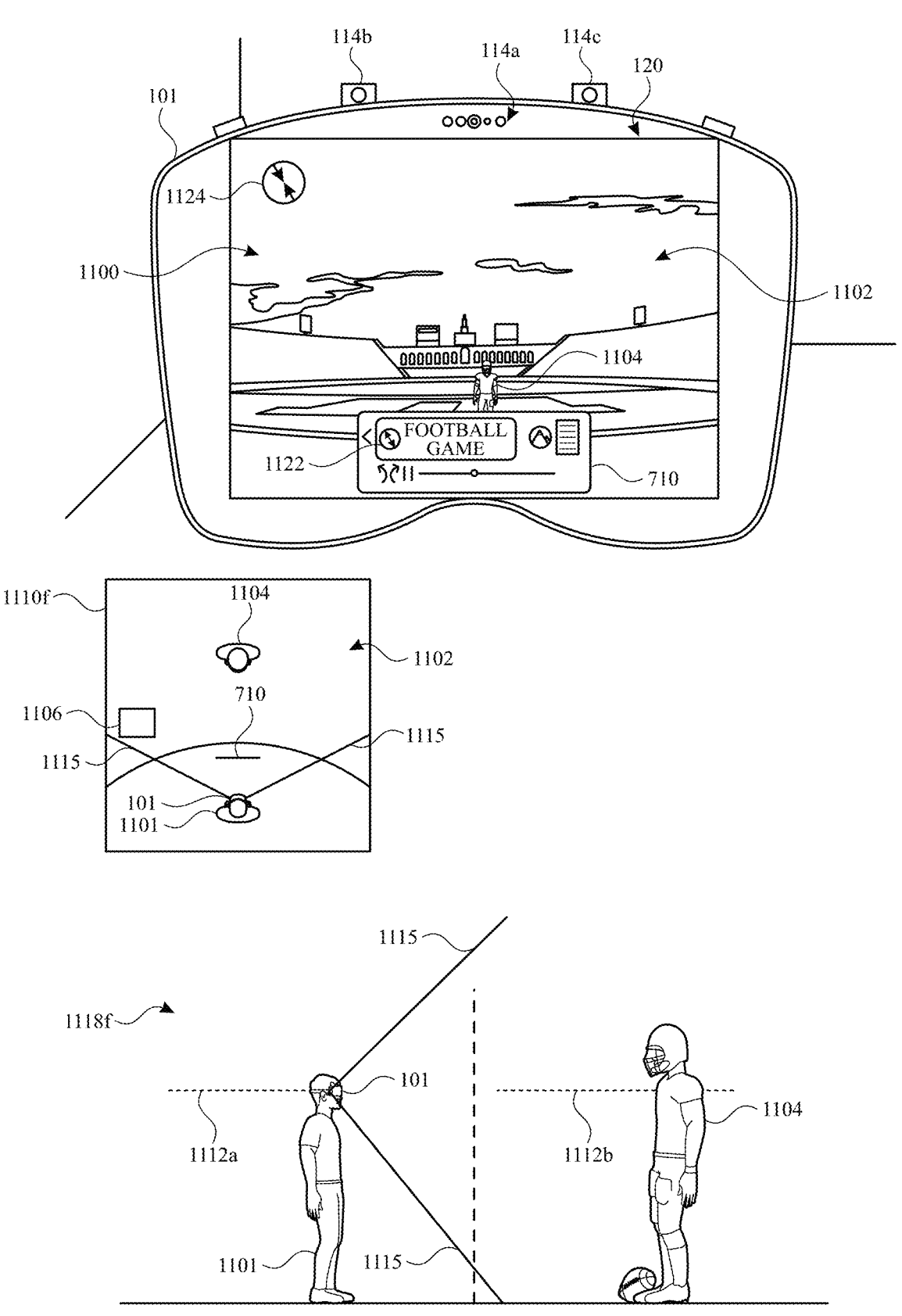

In particular, in FIG. 11F, the computer system 101 displays a playback control user interface 710 and a user interface element 1124, which is displayed separate from (e.g., outside of) the playback control user interface 710 and as an overlay on the virtual content 1102. The playback control user interface 710 includes a title of the virtual content ("FOOTBALL GAME"), a user interface element selectable to control a volume level of the virtual content, a playback length indicator, a playback time position indicator within the playback time length indicator, a fast-forward control, a rewind control, and a pause control. In some embodiments, more or fewer control elements are displayed in the playback control user interface 710. In some embodiments, playback control user interface 710 includes one or more or all features described with reference to embodiment(s) of methods 800 and/or 1000. Further, in the illustrated example, playback control user interface 710 includes a user interface element 1122 that is selectable to transition the mode of display of virtual content 1102 to a framed mode of display. Thus, in the illustrated example, the computer system 101 concurrently displays two separate user interface element (e.g., user interface element 1122 and user interface element 1124) that are selectable to transition the mode of display of virtual content 1102 to the framed mode of display. In the framed mode of display, the virtual content is displayed through a frame for the virtual content, and an amount of an available field of view of the virtual content that the virtual content occupies in the framed mode of display is optionally less than the amount of the available field of view of the virtual content that the virtual content occupies in the immersive mode of display. Further details regarding a framed mode of display are described with reference to embodiment(s) of method 1200.

Figure 11G:
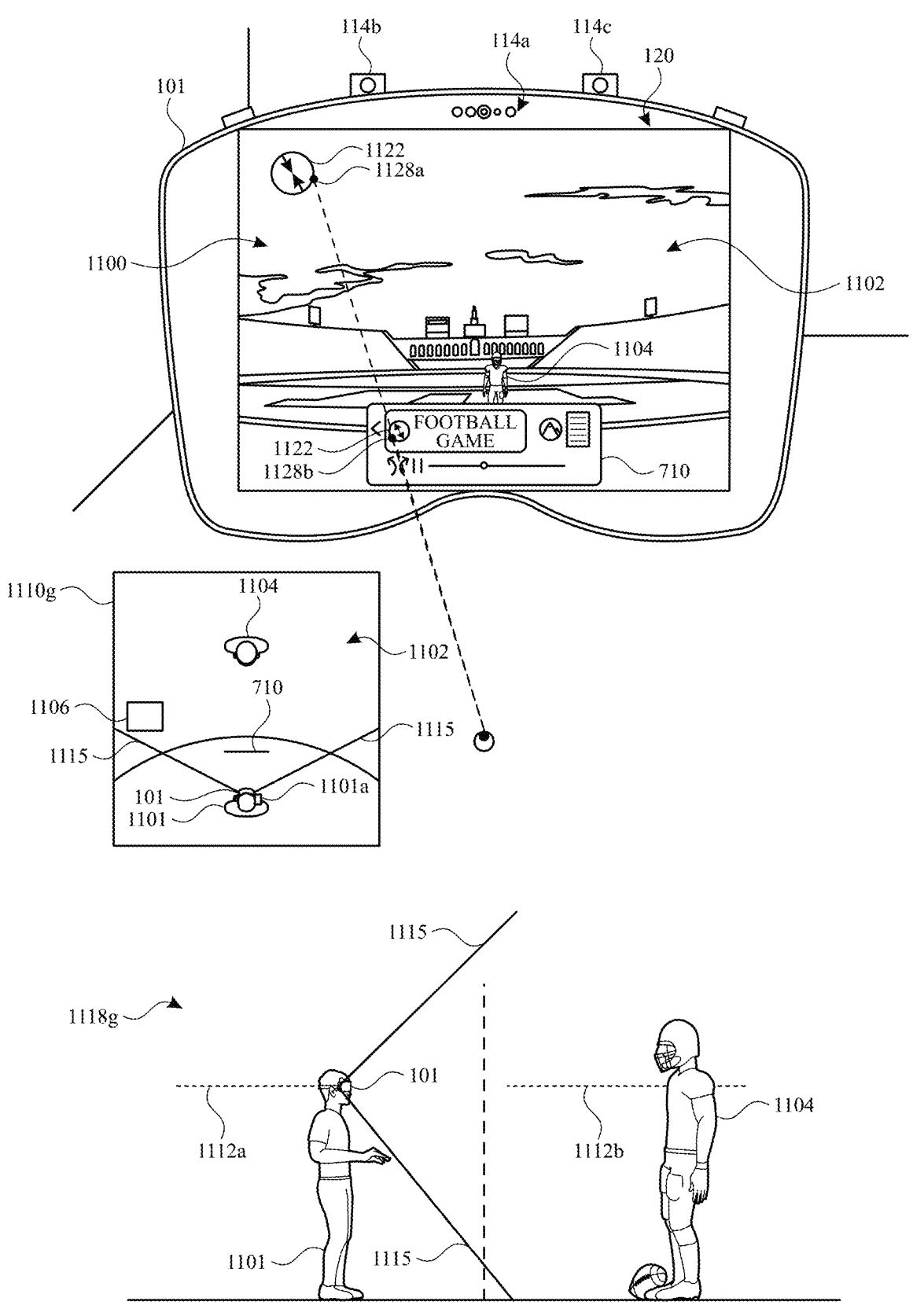
Figure 11H:
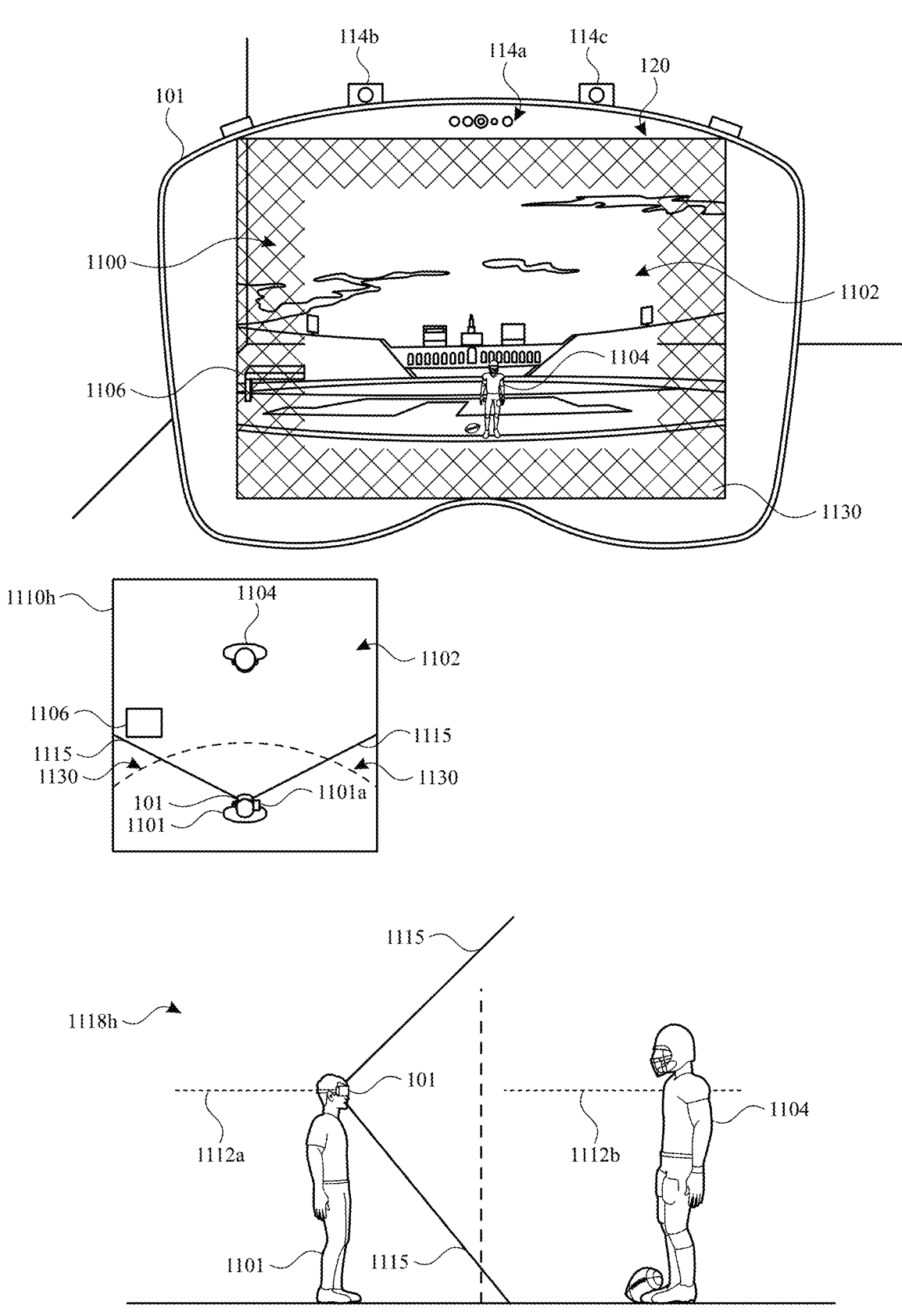
Figure 11I:
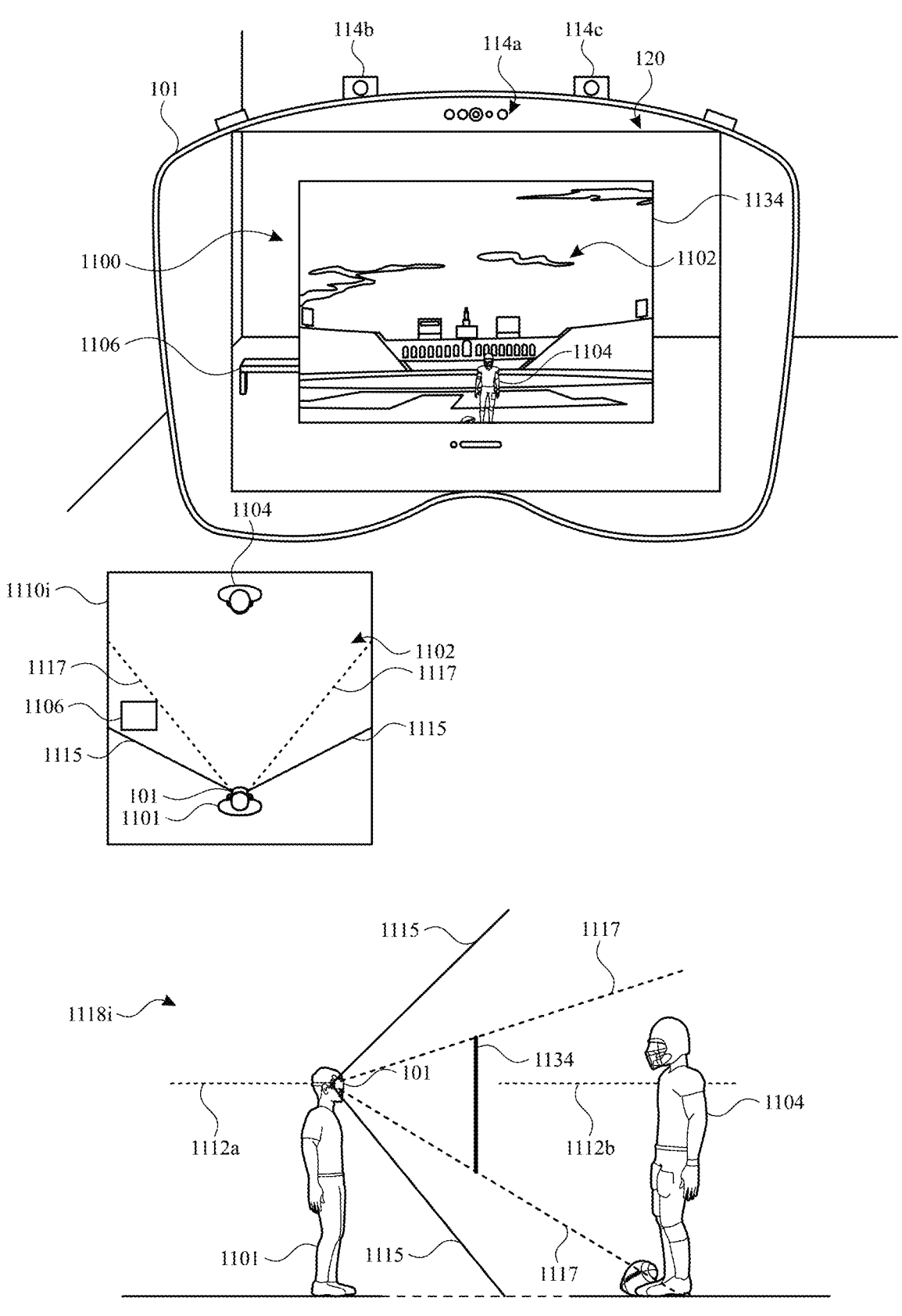
Figure 11J:
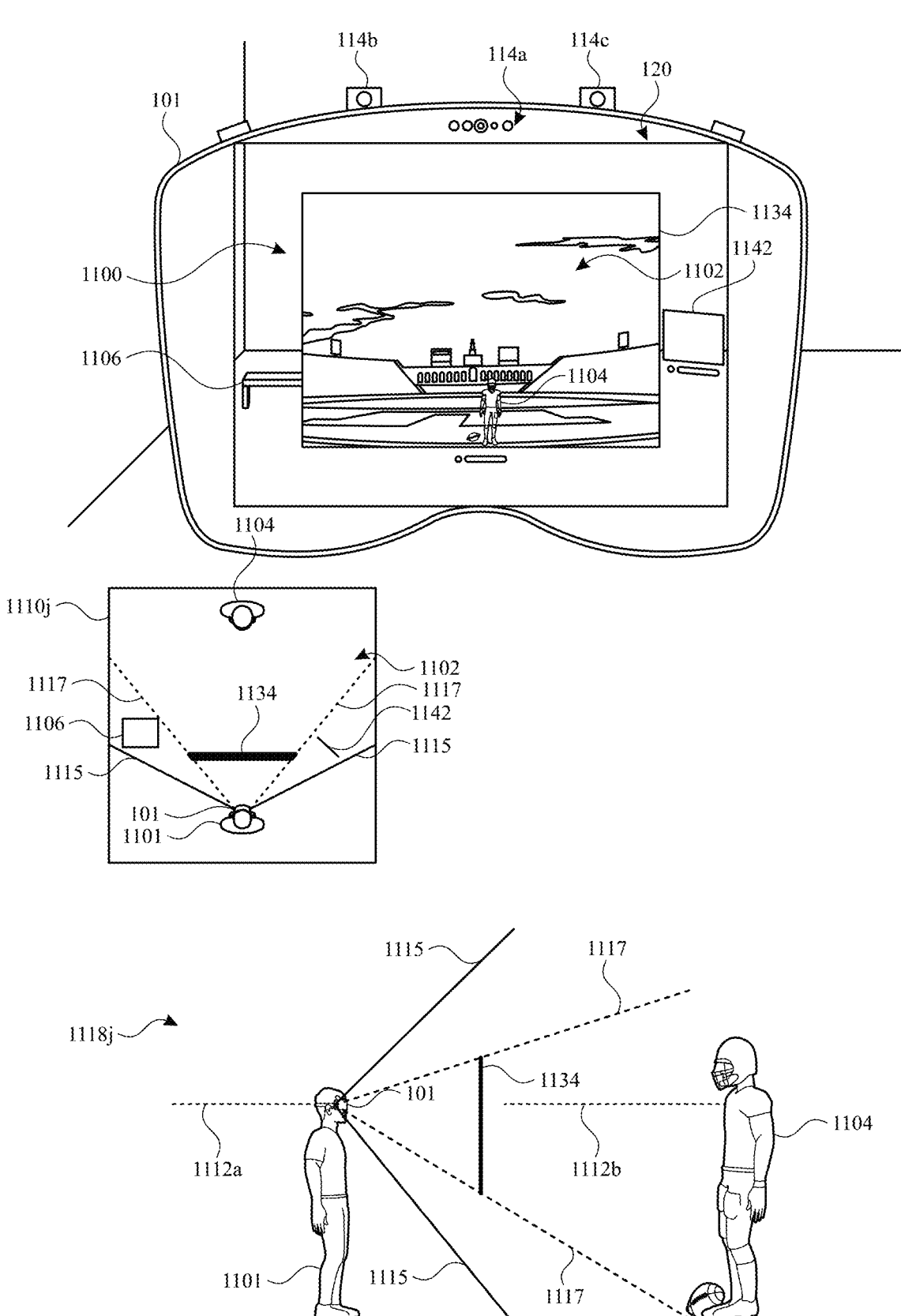

While displaying the controls illustrated in FIG. 11F, the computer system 101 detects user selection of user interface element 1122 (or alternatively of user interface element 1124, which as described above is selectable to perform the same operation as user interface element 1124), as shown in FIG. 11G. For example, the computer system 101 detects that hand 1101a of user 1101 is being placed into an air pinch pose while attention (e.g., based on gaze 1128b) of the user 1101 is directed at the user interface element 1122 (or alternatively while attention (e.g., based on gaze 1128a) of the user 1101 is directed at the user interface element 1124). In response, the computer system 101 transitions the mode of display of virtual content 1102 to the framed mode of display, as shown in FIGS. 11H through 11J.

In particular, in response to the input of FIG. 11G, which requests to transition the mode of display of virtual content 1102 from the immersive mode to the framed mode, the computer system 101 ceases display of the controls associated with virtual content 1102 and shows an animated transition. In some embodiments, the animated transition includes a change in boundaries around the virtual content 1102, such as shown with the portions of the virtual content 1102 (e.g., corresponding to portion 1130 in FIG. 11H) that were previously being displayed at a first visual prominence in FIG. 11G now being displayed at a second visual prominence in FIG. 11H that is less than the first visual prominence, without any change in an apparent size of the virtual content 1102, such that the apparent size of the virtual content 1102 in the immersive mode is the same as the apparent size of the virtual content 1102 in the framed mode. In some embodiments, the animated transition includes a change in boundaries around the virtual content 1102, such as shown with the portions of the virtual content 1102 that were previously being displayed at a first visual prominence in FIG. 11G now being displayed at a second visual prominence in FIG. 11H that is less than the first visual prominence, followed by a change in an apparent size of the virtual content 1102, such as shown with the decrease in the angular size of the content relative to the viewport of the user from FIG. 11G to FIG. 11I. In some embodiments, the change in boundaries is a change of boundaries of the virtual content 1102 from a first visual appearance of the boundaries of the virtual content 1102 in the three-dimensional environment, such as the first visual appearance of the boundaries of the virtual content illustrated in FIG. 11B, 11D, or 11H to a second visual appearance of the boundaries of the virtual content in the three-dimensional environment, such as the visual appearance of the boundaries of virtual content 1102 in three-dimensional environment shown in FIG. 11I with the boundary of virtual content 1102 being a frame 1134, which was not previously displayed when the boundaries around the virtual content had the first visual appearance. Thus, in some embodiments, the animated transition that the computer system 101 perform in response to the input to transition the mode of display of virtual content to the framed mode includes a change in boundaries that includes initiating in display a frame 1134 around the virtual content, as shown from FIG. 11H to 11J, followed by movement of the virtual content relative to the three-dimensional environment, as shown from FIG. 11H to 11J. It should be noted that when the computer system 101 detects user selection of user interface element 1122 (or alternatively of user interface element 1124) in FIG. 11G, the content horizon 1112b is aligned with the environment horizon 1112a. In some embodiments, the computer system 101 performs different animated transitions based on whether the content horizon 1112b is aligned with environment horizon 1112a or is within a threshold of alignment with environment horizon 1112a, and such features will be described in more detail herein. Further, in FIG. 11J, computer system 101 displays user interface 1142, which was previously not displayed while computer system 101 was displaying virtual content in the immersive mode. User interface 1142 is a user interface of an application that is not associated with virtual content 1102 or its display. In some embodiments, computer system 101 permits display of user interfaces that are not associated with virtual content 1102 or its display while virtual content 1102 is in the framed mode and restricts from display user interface that are not associated with virtual content 1102 or its display while virtual content 1102 is in the immersive mode; such features are described further with reference to embodiment(s) of method 1200.

In FIG. 11J, the computer system 101 displays virtual content 1102 in the framed mode of display, which includes virtual content 1102 being visible through frame 1134 without being visible elsewhere. It should be noted that the field of view of the virtual content that is in the viewpoint of the user is less than the field of view of the viewpoint of the user. That is, as shown in both the illustrated top-down view and side view in FIG. 11J, the viewing boundaries 1117 of the user viewing the content is less in size that the total viewing boundaries 1115 of the user 1101 via the computer system 101.

FIGS. 11K through 11S illustrate examples of the computer system 101 detecting and responding to different inputs requesting movement of virtual content 1102 relative to the three-dimensional environment 1100 while virtual content 1102 is in the framed mode of display.

Figure 11K:
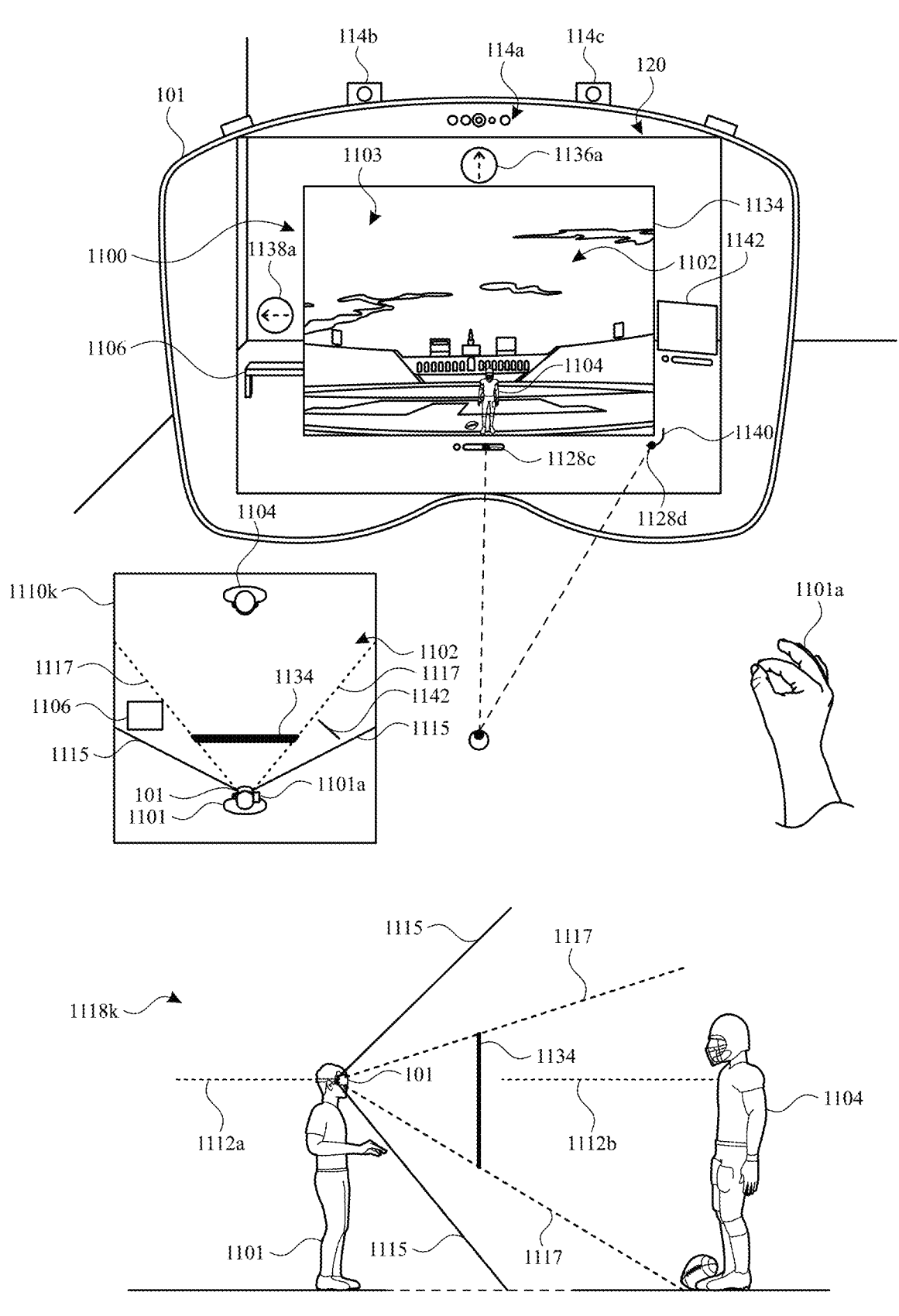

In FIG. 11K, computer system 101 detects alternative inputs where a first input requests movement of virtual content 1102 in a direction 1136a (e.g., a vertical or upward rotation direction relative to the viewpoint of the user in the three-dimensional environment), a second input requests movement of virtual content 1102 in a direction 1138a (e.g., a horizontal or lateral rotation direction relative to the viewpoint of the user in the three-dimensional environment), and a third input directed to user interface element 1140 requests enlargement of a size of frame 1134. The first input optionally includes attention (e.g., based on gaze 1128c) of the user directed to the frame 1134 (and/or directed to a user interface element for moving the frame 1134 in the three-dimensional environment 1100) while hand 1101a is in or is being put in an air pinch pose position and moving in a direction parallel to the direction 1136a. The second input optionally includes attention (e.g., based on gaze 1128c) of the user directed to the frame 1134 (and/or directed to a user interface element for moving the frame 1134 in the three-dimensional environment 1100) while hand 1101a is in or is being put in an air pinch pose position and moving in a direction parallel to the direction 1138a. The third input optionally includes attention (e.g., based on gaze 1128d) of the user 1101 directed to the user interface element 1140 while hand 1101a is in or is being put in an air pinch pose position and moving in a direction that is parallel to the width and/or length of the frame 1134 (e.g., a direction that is rightward and/or downward).

Figure 11L:
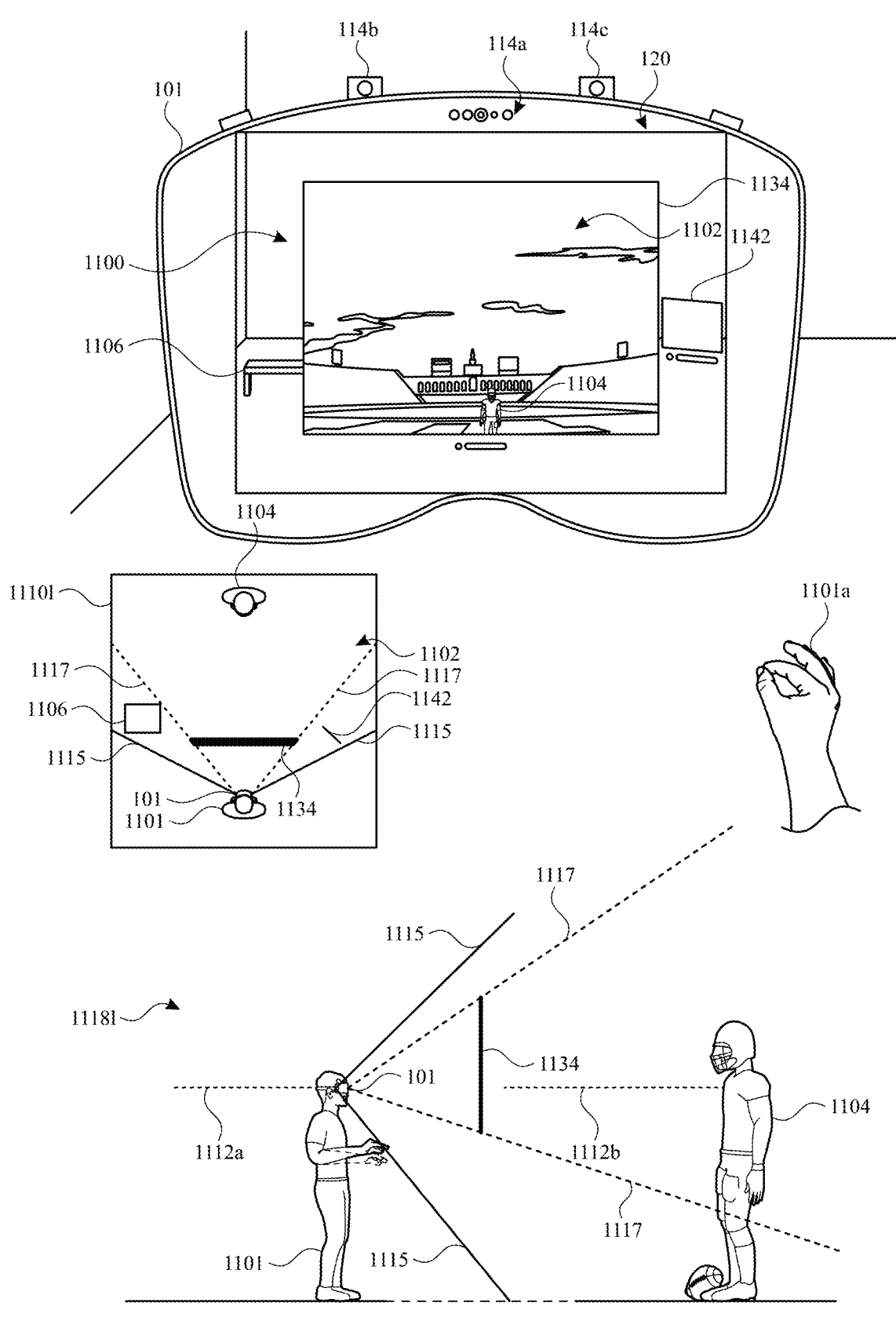
Figure 11M:
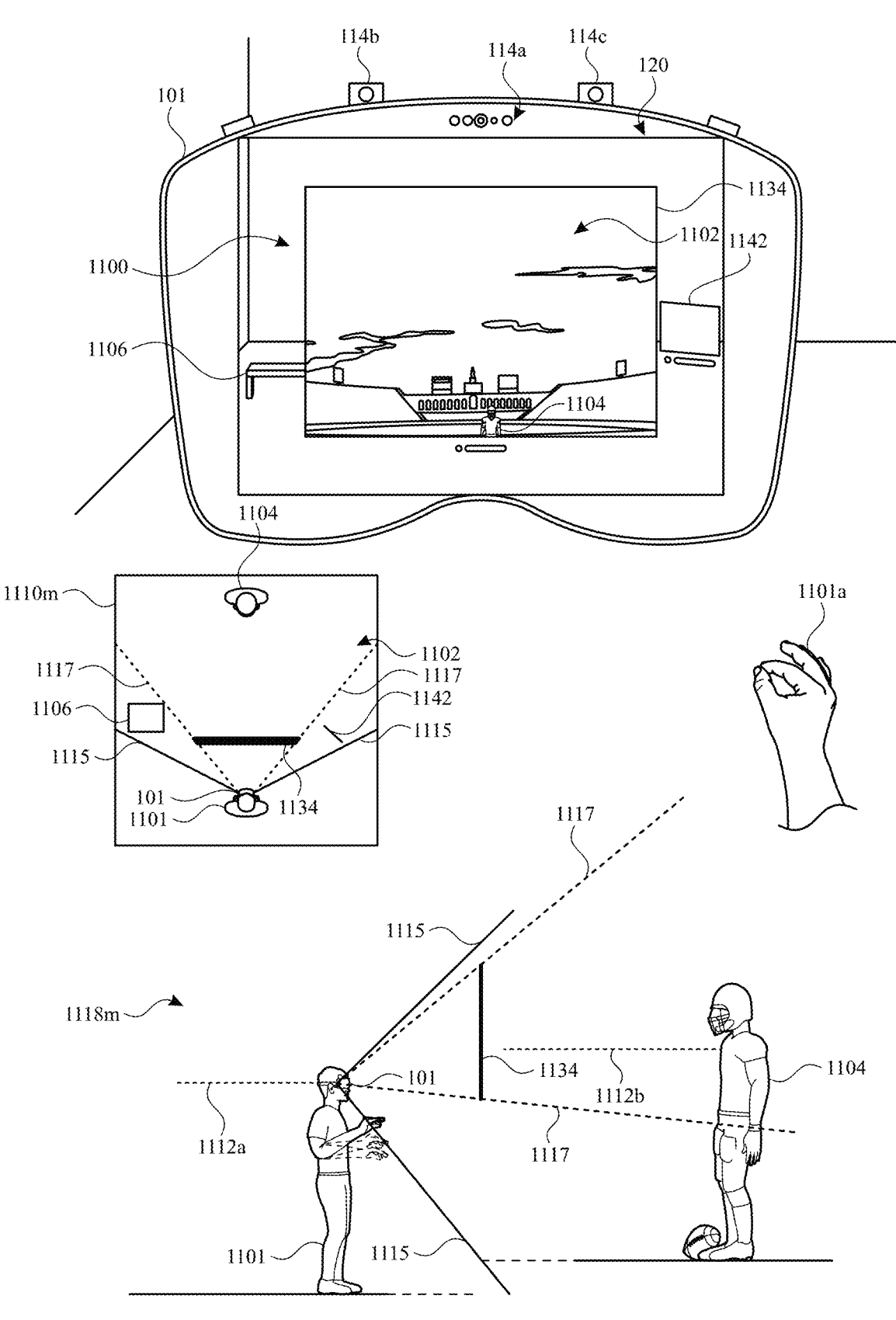

As mentioned earlier, when the computer system 101 detects user selection of user interface element 1122 (or alternatively of user interface element 1124) in FIG. 11F, the content horizon 1112b is aligned with the environment horizon 1112a. FIGS. 11K through 11M illustrate computer system 101 maintaining alignment of the content horizon 1112b with environment horizon 1112a and then ceasing alignment of the content horizon 1112b with environment horizon 1112a in response to a single or consecutive inputs that request movement in the direction 1136a (e.g., at least a portion movement that is parallel to direction 1136a).

In some embodiments, in response to the detecting a request to move the virtual content 1102 in the direction 1136a while the content horizon 1112b is aligned with the environment horizon 1112b, the computer system 101 moves frame 1134 relative to the three-dimensional environment in the direction 1136a, without moving the virtual content 1102 relative to the three-dimensional environment in the direction 1136a and without titling the frame 1134, such as shown from FIG. 11K to 11L with frame 1134 moving in the direction 1136a without it tilting in the three-dimensional environment 1100, and without reference 1104 of the virtual content 1102 moving relative to the three-dimensional environment. In some embodiments, in response to an additional request for movement in the direction 1136a, the computer system 101 ceases the alignment of the content horizon 1112b with the environment horizon 1112a, such as shown from FIG. 11L to 11M with frame 1134 having moved additionally in the direction 1136a and the virtual content 1102 having moved, including the content horizon 1112b being moved relative to the environment horizon 1112a, without a tilt of the frame 1134 in the three-dimensional environment 1100. FIG. 11AH illustrates consecutive side view schematics corresponding to the computer system 101 detecting and responding to the movement request described with reference to FIGS. 11K to 11M. In side view 1152a, the computer system 101 is detecting the movement request in direction 1136a described with reference to FIG. 11K (e.g., vertically relative to the three-dimensional environment 1100), in side view 1152b the computer system 101 is responding by moving the frame 1134 without titling the frame 1134 and without moving the virtual content 1102, as described with reference to FIGS. 11K and 11L, and in side view 1152c the computer system then further moves the frame 1134 (e.g., to a position higher than the position of the frame 1134 in 1152b) without titling the frame 1134 and moves the virtual content 1102, thus ceases the alignment of the content horizon 1112b with the environment horizon 1112a, as described with reference to FIGS. 11L and 11M. It should be noted that in some embodiments, the frame 1134 is moved in direction 1136a without moving the virtual content 1102 in the direction 1136a, until the content horizon 1112b is unsnapped (e.g., ceases alignment with the environment horizon 1112a) and the virtual content 1102 starts tilting. As such, in some embodiments, the example of FIG. 11M is optionally an optional state of a ceasing of alignment of content horizon 1112b with the environment horizon 1112a without tilting of the virtual content 1102 in the three-dimensional environment 1100.

Figure 11N:
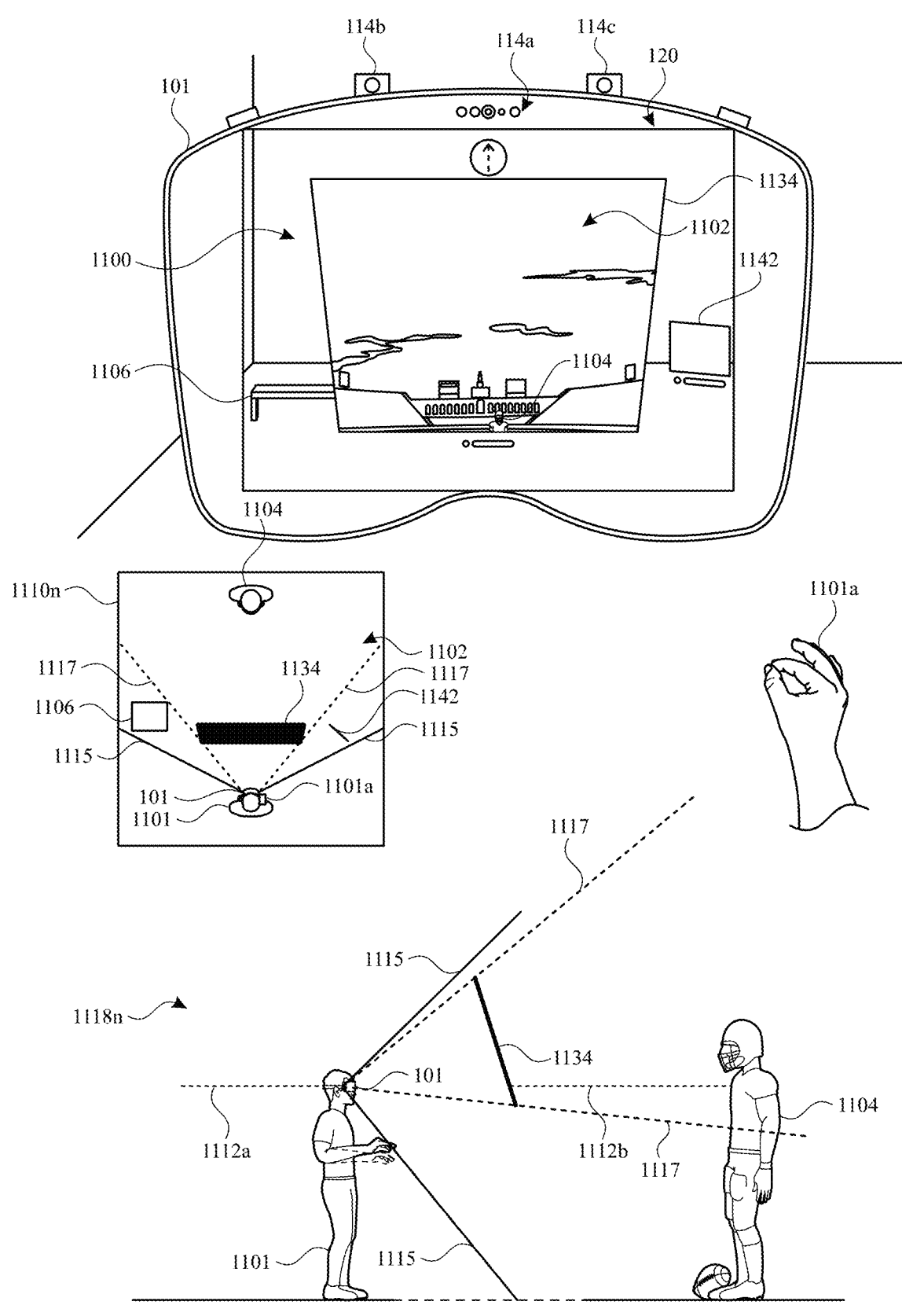

In some embodiments, the computer system 101 ceases the alignment of content horizon 1112b with environment horizon 1112a and rotates the frame 1134 about the viewpoint of the user (e.g., moves and tilts). FIGS. 11K, 11L, and 11N illustrate the computer system 101 moving the frame 1134 until a point where the frame 1134 starts rotating about the viewpoint of the user, which in the illustrated example of FIGS. 11L and 11N is also the moment when the computer system 101 ceases the alignment of content horizon 1112b with environment horizon 1112a, in response to input requesting movement in the direction 1136a. In particular, in some embodiments, the computer system 101 permits movement of the frame 1134 while the frame 1134 maintains the same orientation relative to the three-dimensional environment and while maintaining the alignment of the content horizon 1112b with the environment horizon 1112a, such as shown with the vertical movement of the frame 1134 without movement of reference 1104 and with the content horizon 1112b being maintained in alignment with environment horizon 1112a in display generation component 120 from FIG. 11K to 11L. In some embodiments, when further movement in the direction 1136a is requested, the computer system 101 ceases the alignment of content horizon 1112b with environment horizon 1112a by moving virtual content 1102, including content horizon 1112b relative to environment horizon 1112a, in the direction 1136a, such as shown from FIGS. 11N to 11O with the rotating of the frame 1134 and the rotating of the virtual content 1102, including the content horizon 1112b, to a preferred spatial arrangement relative to the position of the frame 1134, which is optionally the same spatial arrangement between the frame 1134 and virtual content 1102 as in FIG. 11K. FIG. 11AI illustrates consecutive side view schematics corresponding to the computer system 101 detecting and responding to the movement request described with reference to FIGS. 11K, 11L, and 1 IN. In side view 1154a, the computer system 101 is detecting the movement request in direction 1136a described with reference to FIG. 11K, in side view 1154b the computer system 101 is responding by moving and tilting the frame 1134, without moving and tilting the virtual content 1102 (though, alternatively, as described with reference to FIGS. 11K and 11L, the computer system 101 optionally moving the frame 1134 without tilting the frame 1134 and without moving and tilting the virtual content 1102), and in side view 1152c the computer system then moves and tilts the frame 1134 and moves and tilts the virtual content 1102 relative to the viewpoint of the user, thus ceases the alignment of the content horizon 1112b with the environment horizon 1112a, as described with reference to FIGS. 11K, 11L, and 11N.

Figure 11O:
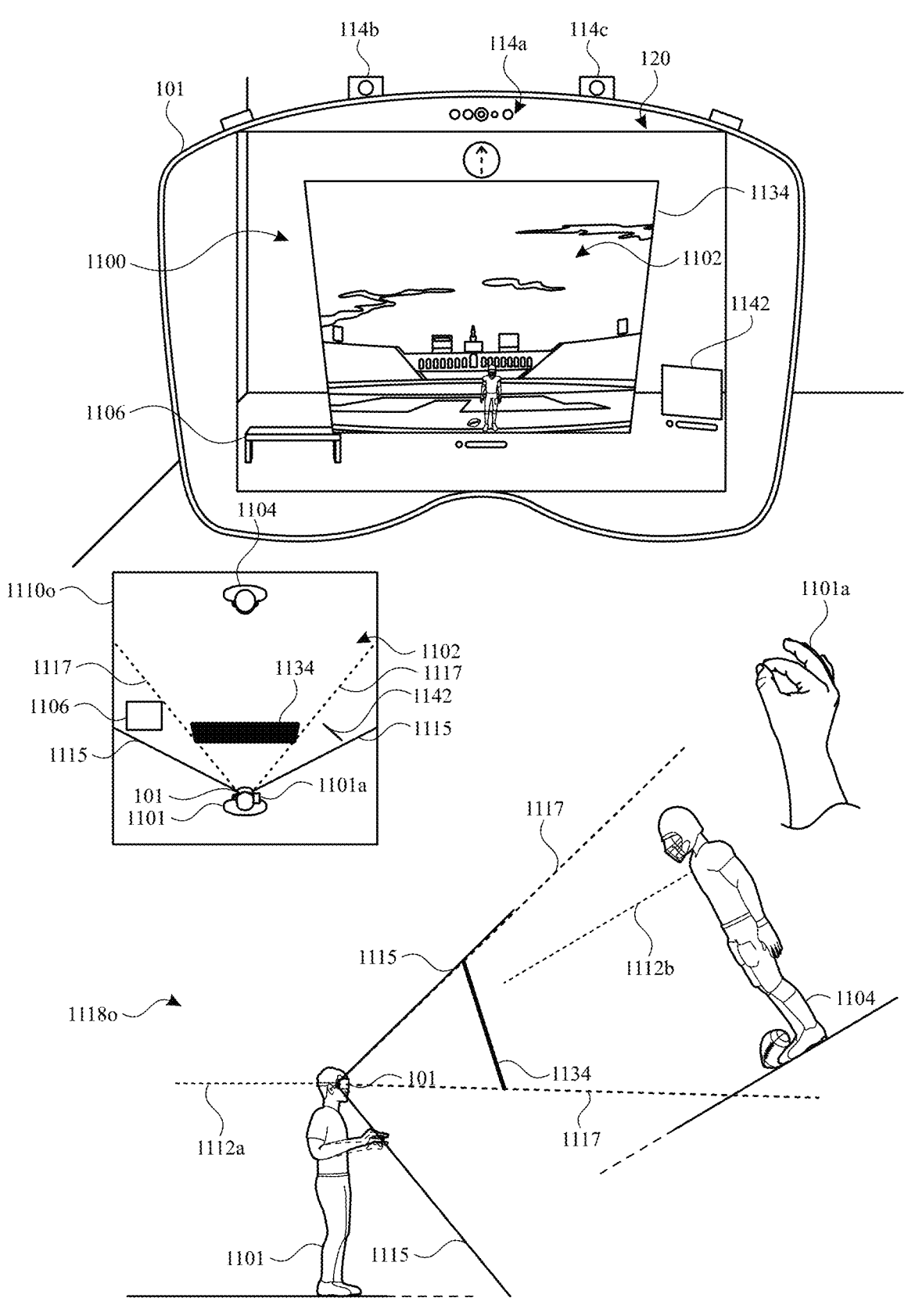
Figure 11P:
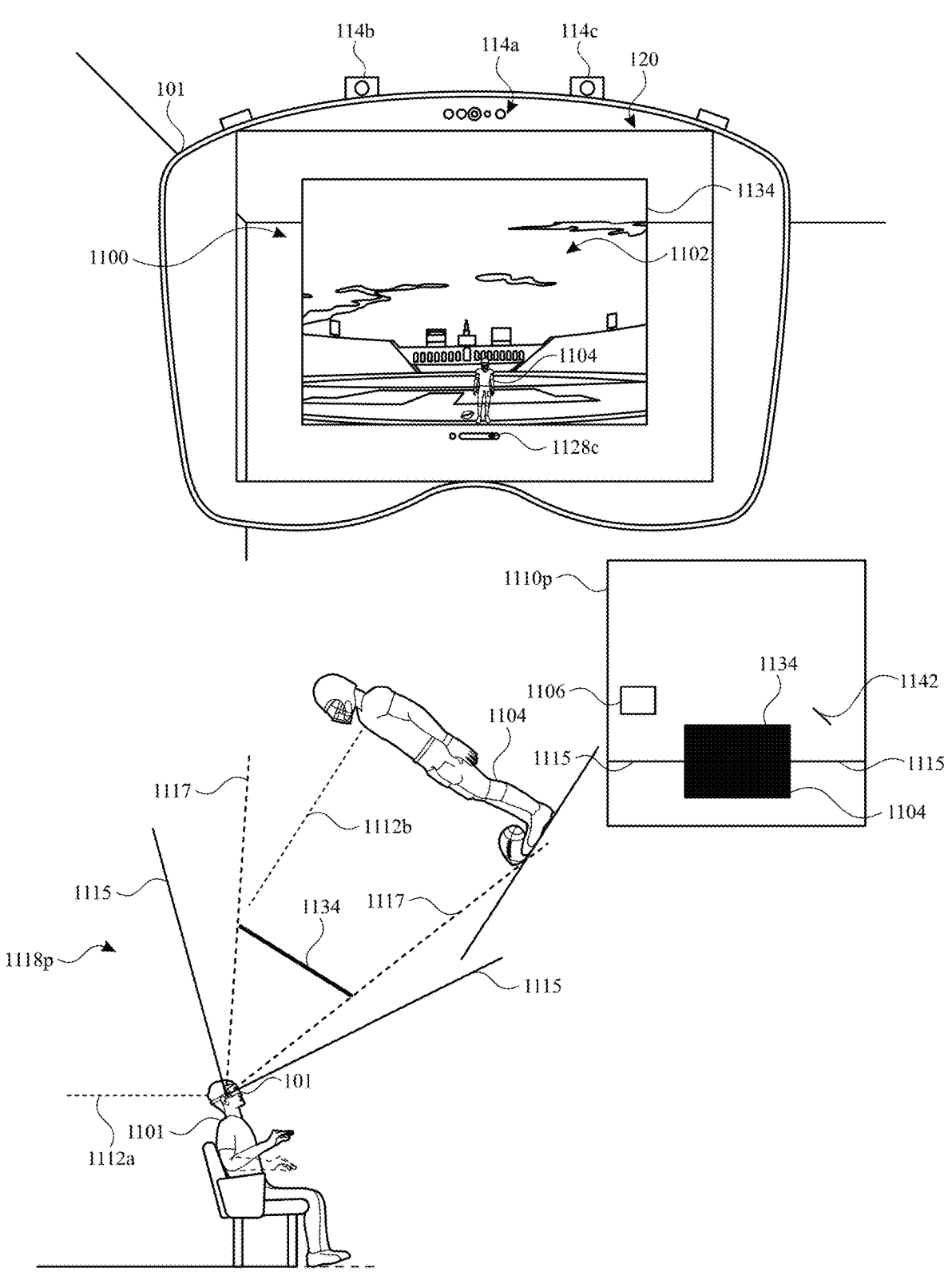

In some embodiments, when movement is requested while the content horizon 1112b is not aligned with the environment horizon 1112a, the computer system moves the virtual content 1102 and the frame 1134 through which the virtual content 1102 is visible in accordance with the requested movement, thus maintaining a preferred spatial arrangement between the frame 1134 and virtual content 1102, such as shown from FIGS. 11O to 11P. For example, while the virtual content 1102 is being displayed in the framed mode, the computer system detects a request for movement that includes movement in the direction 1136a while the content horizon 1112b is not aligned with the environment horizon 1112a, such as shown in FIG. 11O.

Continuing with this illustrated example, in response, the computer system 101 moves the virtual content 1102 and the frame 1134 in accordance with the requested movement (e.g., without suppression movement of the virtual content 1102), such as shown in FIG. 11P. It should be noted that a movement of the frame 1134 and/or virtual content 1102 relative to the three-dimensional environment 1100 optionally corresponds to movement of the frame 1134 and/or virtual content 1102 relative to the physical environment of the computer system 101, which optionally is or is not displayed or visible while displaying the three-dimensional environment 1100.

Figure 11Q:
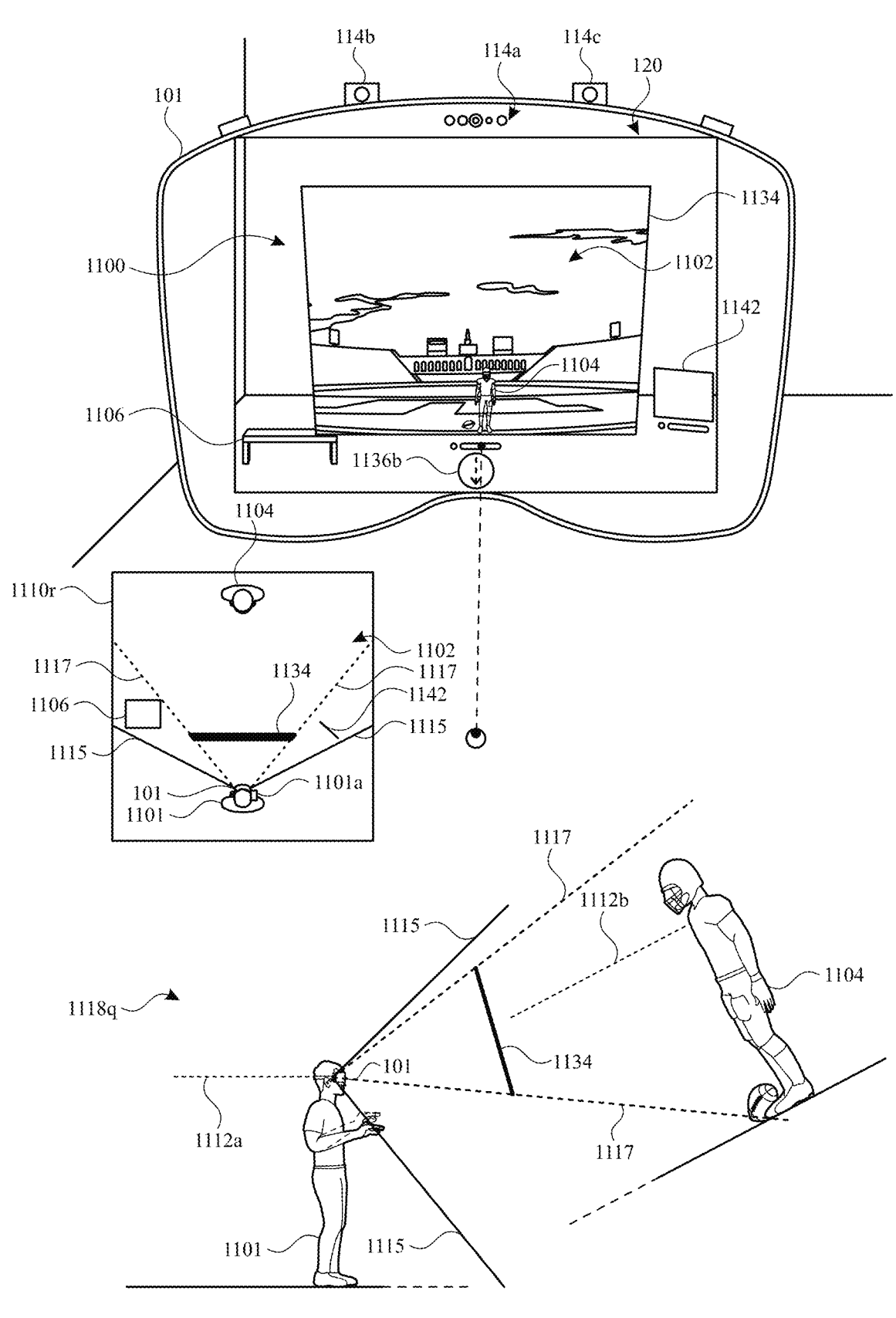
Figure 11R:
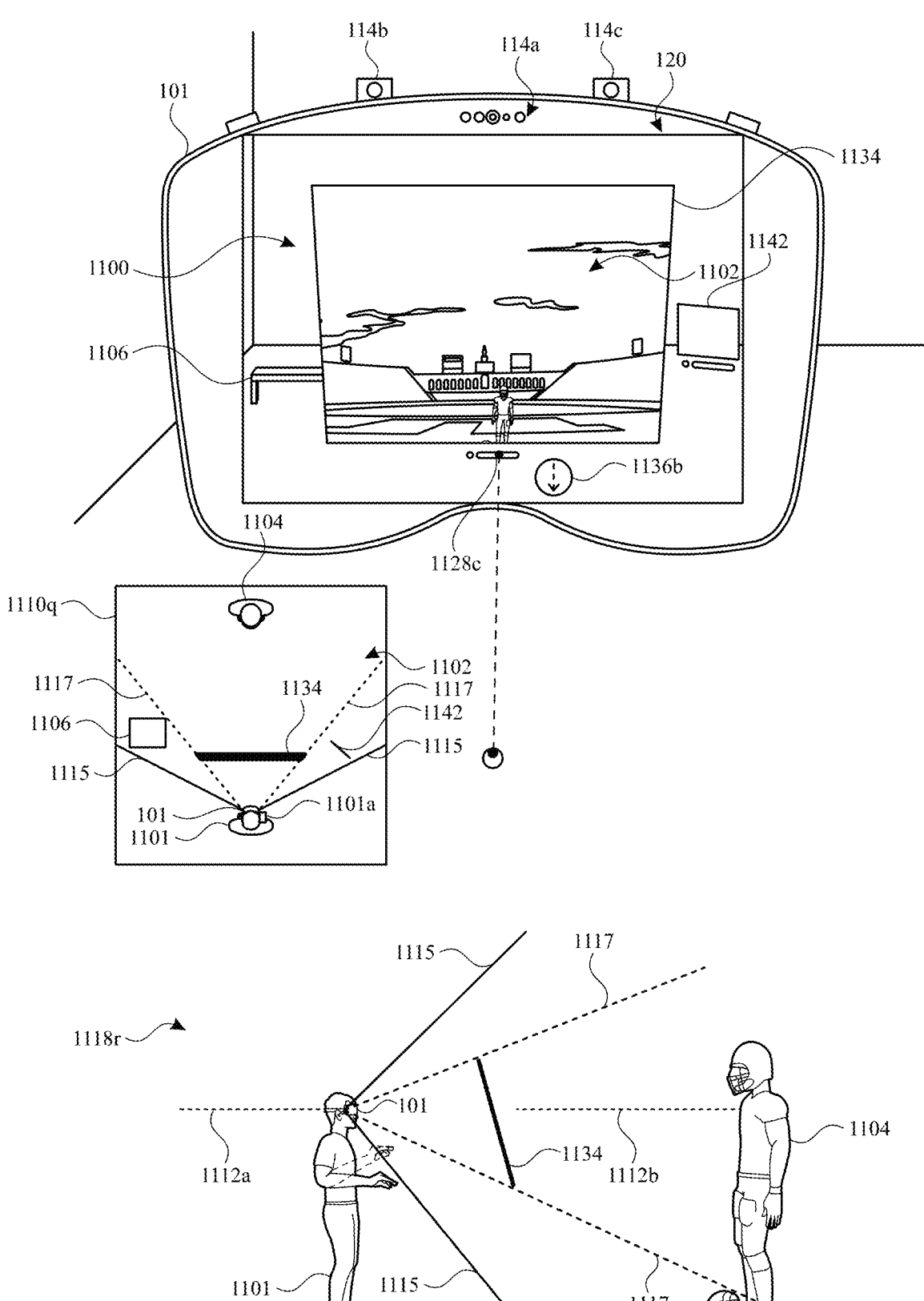

In some embodiments, the computer system detects a request for movement that includes movement in a direction that is opposite the direction 1136a while the content horizon 1112b is not aligned with the environment horizon 1112a, such as in a direction 1136b (e.g., a downward direction in the three-dimensional environment 1100) illustrated in FIG. 11Q and in response the computer system 101 shows different resulting movements of the virtual content 1102 based on whether the request for movement is a request for movement to the virtual content 1102 being within or not being within a threshold of alignment with the environment horizon 1112a. For example, FIGS. 11P to 11Q illustrates the computer system 101 detecting, in FIG. 11P, a request for movement that includes movement in a downward direction and responding, in FIG. 11Q, by moving the frame 1134 and the virtual content 1102 in accordance with the requested movement. In the illustrate case of FIGS. 11P and 11Q, the request for movement is a request for movement of the virtual content 1102 to not being within the threshold of alignment with the environment horizon 1112a, so the computer system 101 moves the virtual content 1102 and frame 1134 in accordance with the requested movement. In another example, FIGS. 11Q to 11R illustrates the computer system 101 detecting, in FIG. 11Q, a request for movement that includes movement in a downward direction and responding, in FIG. 11R, by moving the frame 1134 and the virtual content 1102, but moving the virtual content 1102 beyond the requested movement. In the illustrate case of FIGS. 11Q and 11R, the request for movement is a request for movement to the virtual content 1102 being within the threshold of alignment with the environment horizon 1112a, but less than alignment with the environment horizon 1112a, so the computer system 101 moves the frame 1134 in accordance with the requested movement and, additionally, moves the virtual content 1102 to cause the content horizon 1112b to be aligned with the environment horizon 1112a. FIG. 11AG illustrates consecutive side view schematics corresponding to the computer system 101 detecting and responding to the movement request described with reference to FIGS. 11Q and 11R. In side view 1150a, the computer system 101 is detecting the movement request in direction 1136b described with reference to FIG. 11Q, in side views 1150b through 1150d the computer system 101 is responding by rotating the frame 1134 and the virtual content 1102 in accordance with the request. That is, in side views 1150b through 1150d in FIG. 11AG, the angle between the content horizon 1112b and the environment horizon 1112a is being reduced, consecutively, as the virtual content 1102 (e.g., and the frame 1134) is being rotated downward in the viewpoint of the user. However, since the movement request is a request for movement of the virtual content 1102 to within the alignment threshold of the content horizon 1112b with the environment horizon 1112a, but less than alignment, the computer system 101 automatically further moves the virtual content 1102 so that the content horizon 1112b is aligned with the environment horizon 1112a, as shown from side view 1150d to 1150e with the frame 1134 remaining in position while the virtual content 1102 is additional moved beyond the requested movement to aligned the content horizon 1112b with the environment horizon 1112a. In some embodiments, the frame 1134 becomes vertically oriented during the movement of content horizon 1112b to alignment (e.g., when the frame 1134 reaches its position in side view 1150d), but still is moved less than content horizon 1112b.

Figure 11S:
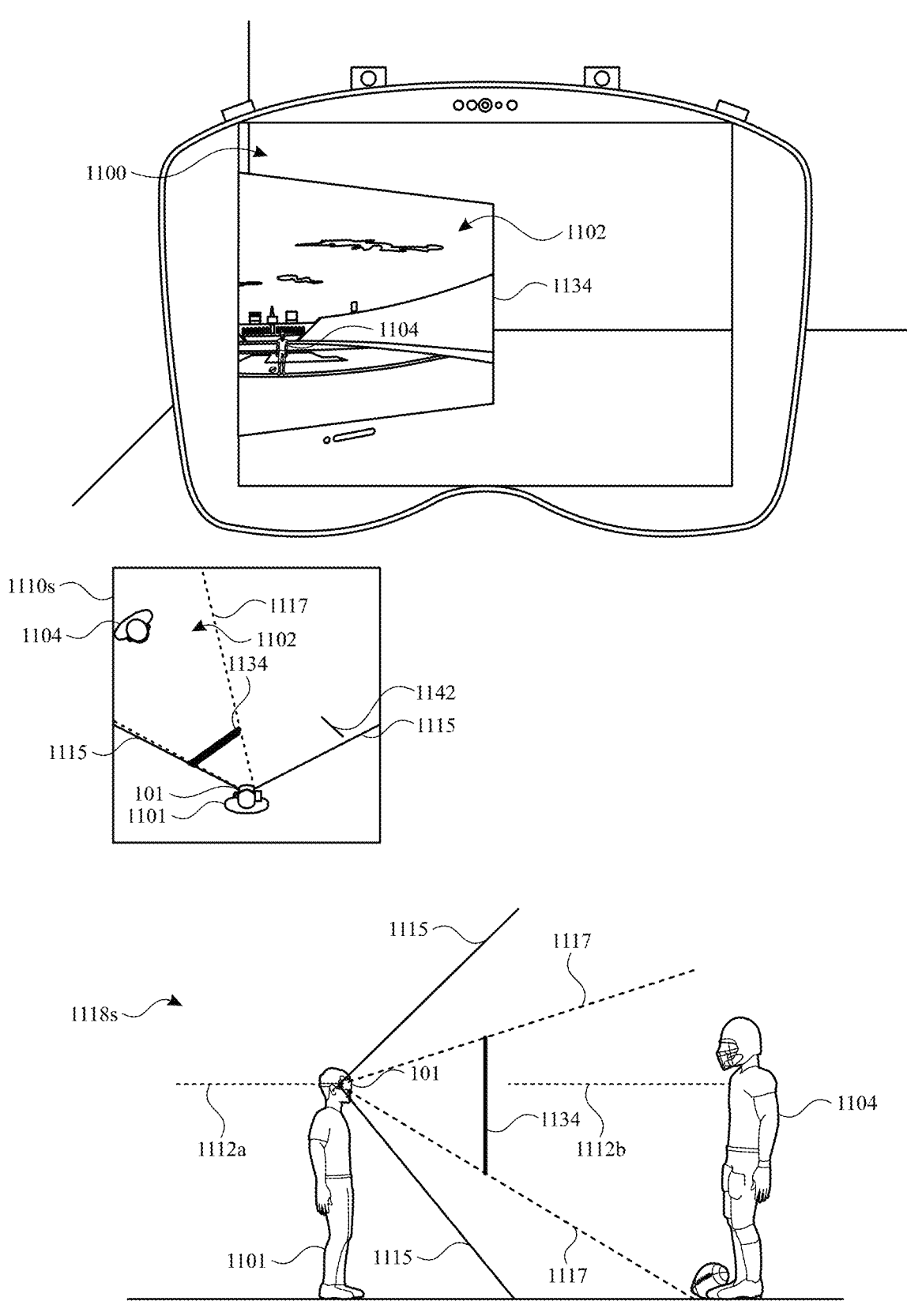

FIGS. 11K and 11S illustrate the computer system 101 detecting and responding to a request for movement that includes movement in the direction 1138a (e.g., a horizontal direction) relative to the three-dimensional environment 1100. In particular, the computer system 101 detects, in FIG. 11K, the request for movement in the direction 1138a, and in response, the computer system 101 moves the frame 1134 and the virtual content 1102 in accordance with the requested movement (e.g., without suppression or additional movement), as shown from FIG. 11K to 11S. The movement illustrated from FIG. 11K to 11S does not include movement of the content horizon 1112b relative to the environment horizon 1112a because the movement of virtual content 1102 from FIG. 11K to 11S is optionally parallel to environment horizon 1112a (e.g., parallel to the plane of the environment horizon 1112a).

Figure 11T:
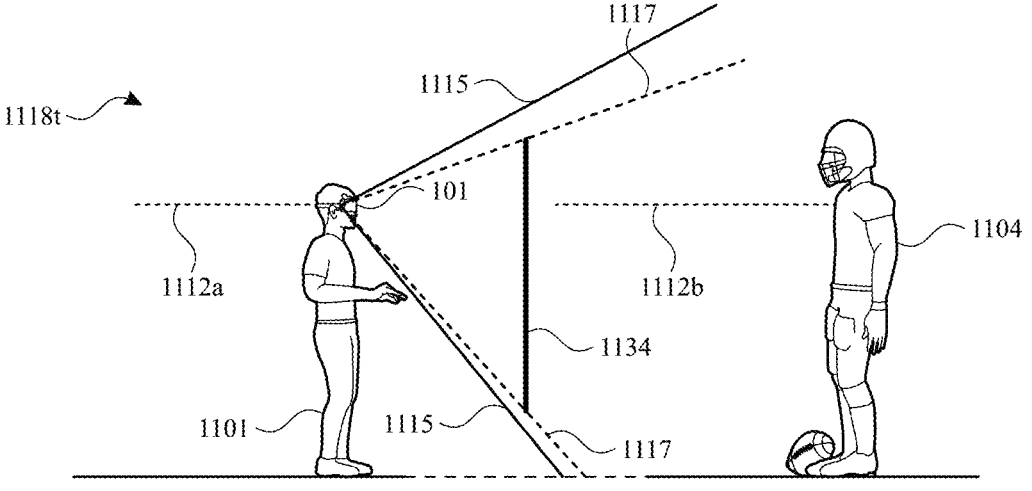

FIGS. 11K and 11T illustrate the computer system 101 detecting and responding to a request to change a size of frame 1134, in accordance with some embodiments. In particular, the computer system 101 detects, in FIG. 11K, the request to change the size of frame 1134 by way of detecting user interaction with user interface element 1140 (e.g., gaze 1128d of the user optionally with movement of the hand of the user while it is in an air pinch position), and in the illustrated example the request is a request to increase a size of frame 1134. Then, in response to the request to increase the size of frame 1134, the computer system 101 responds by increasing the size of frame 1134 through which virtual content 1102 is displayed and increasing the portion of the virtual content 1102 that is displayed through the frame 1134, as shown in FIG. 11T.

Figure 11U:
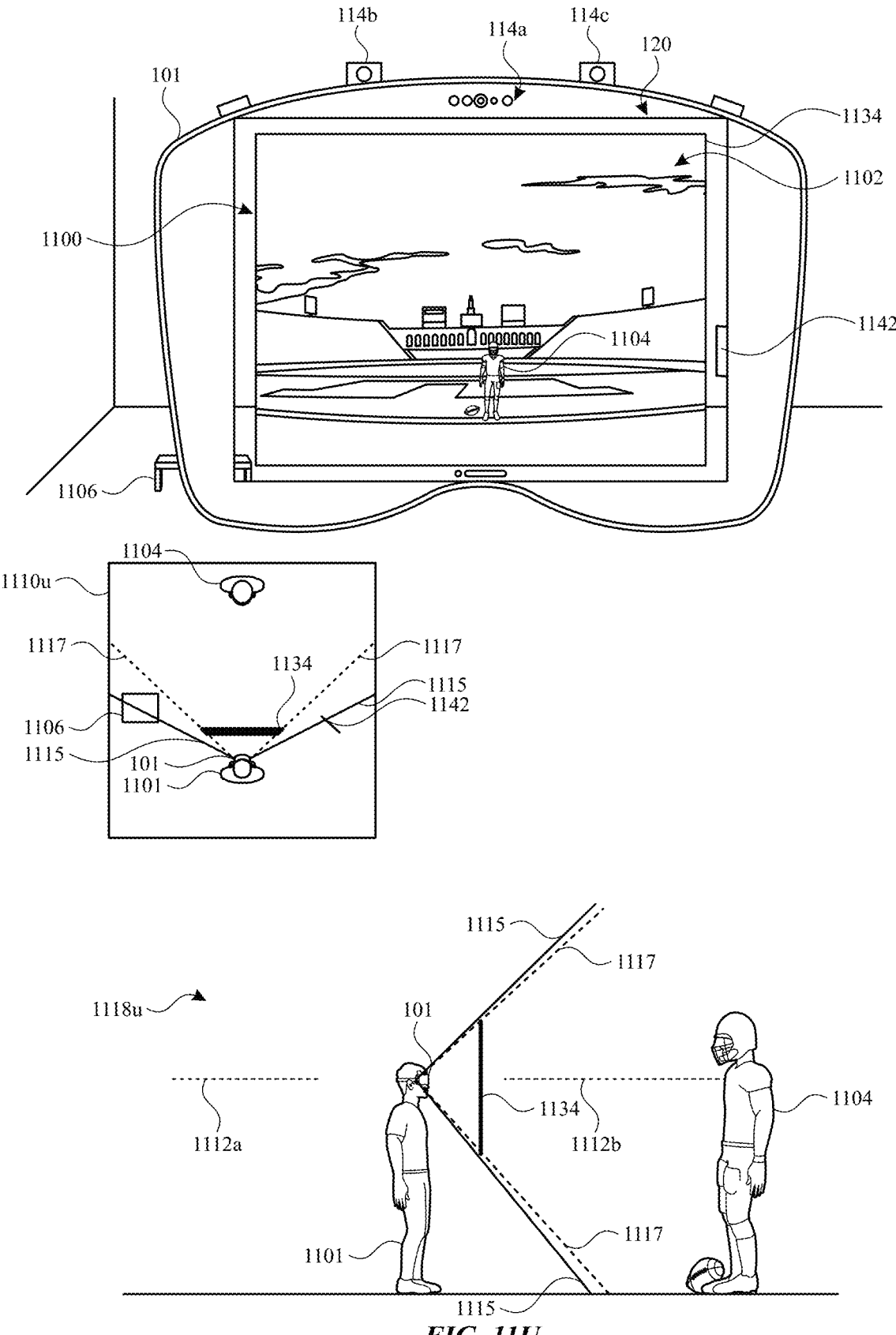
Figure 11V:
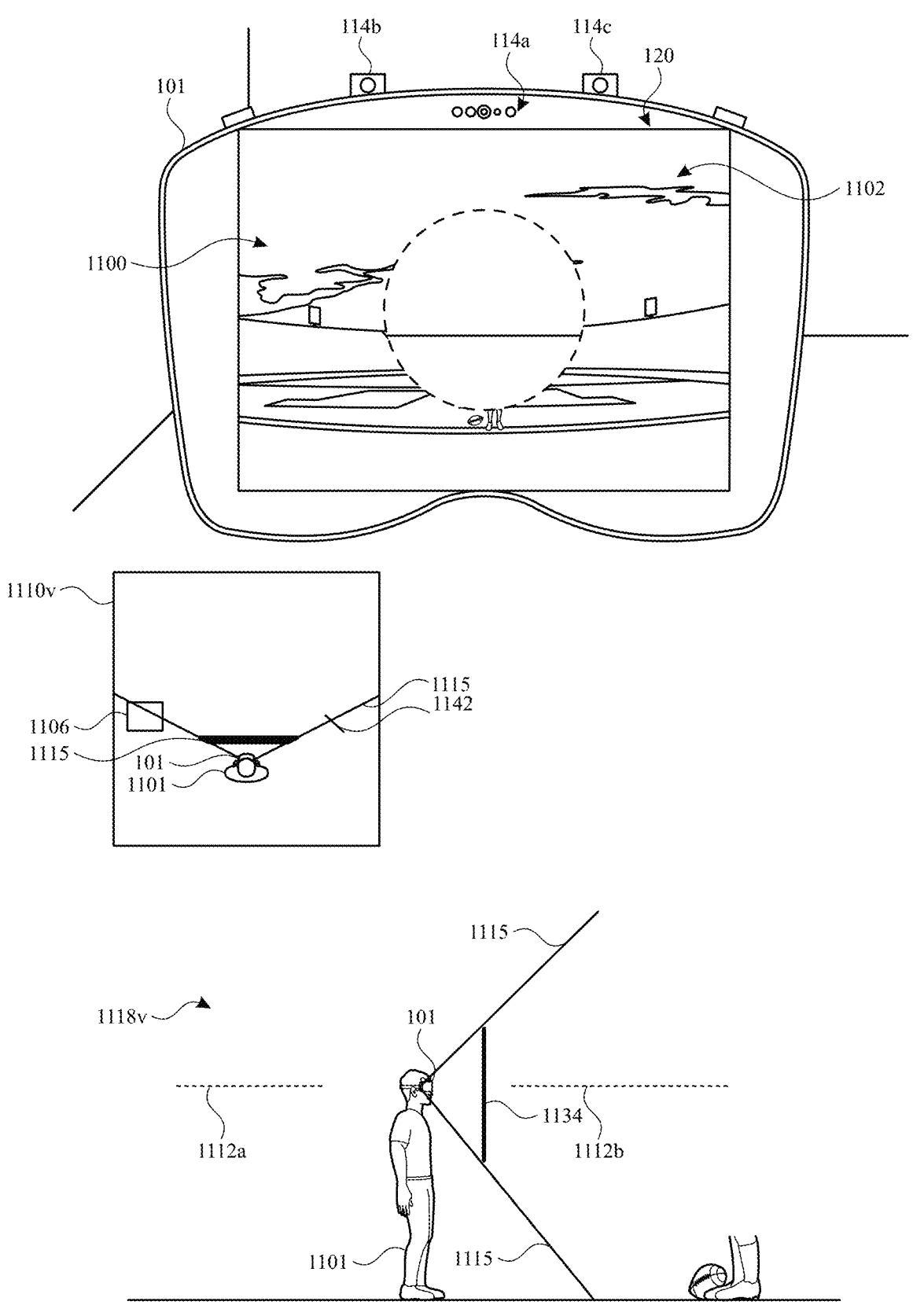
Figure 11W:
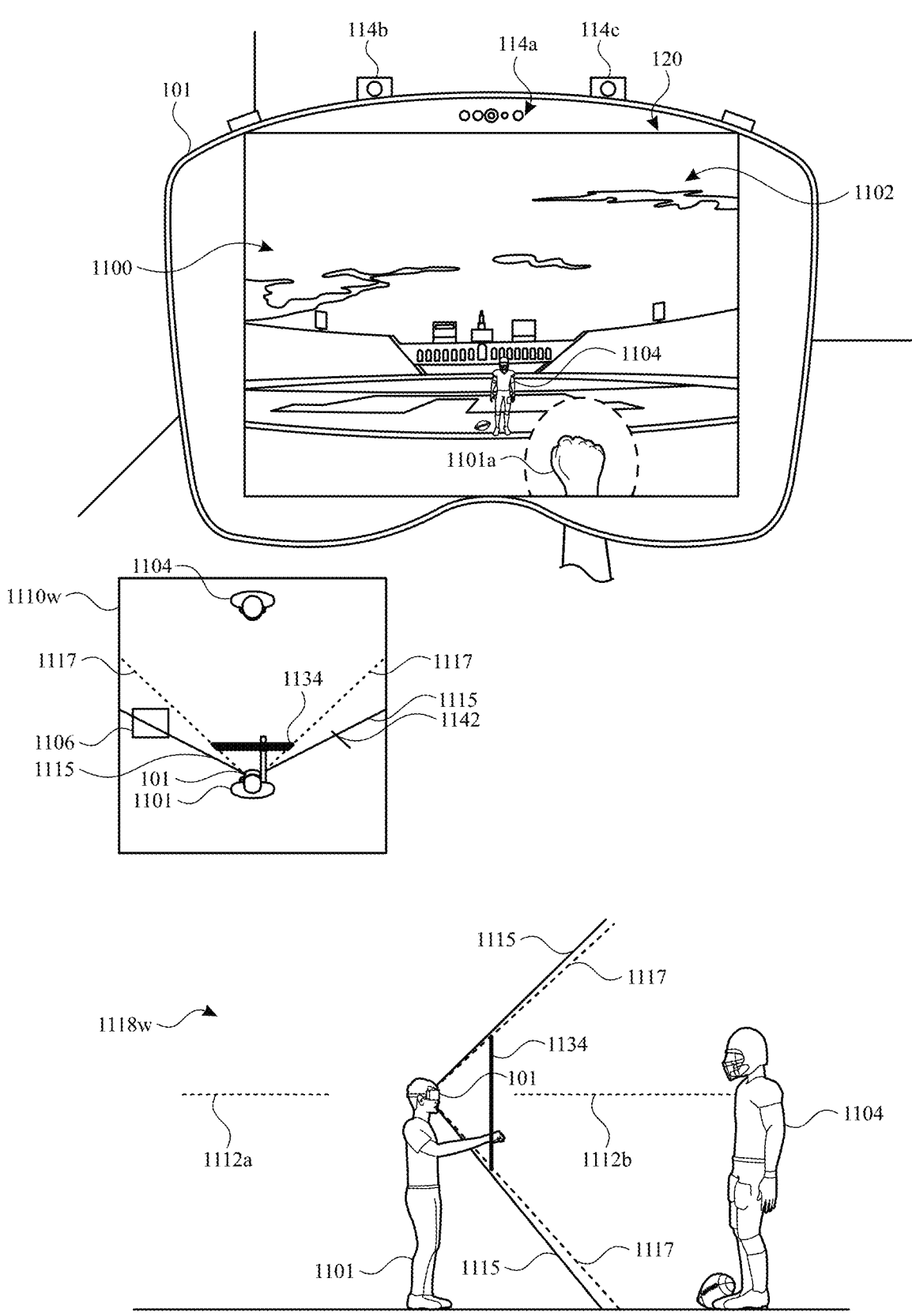
Figure 11X:
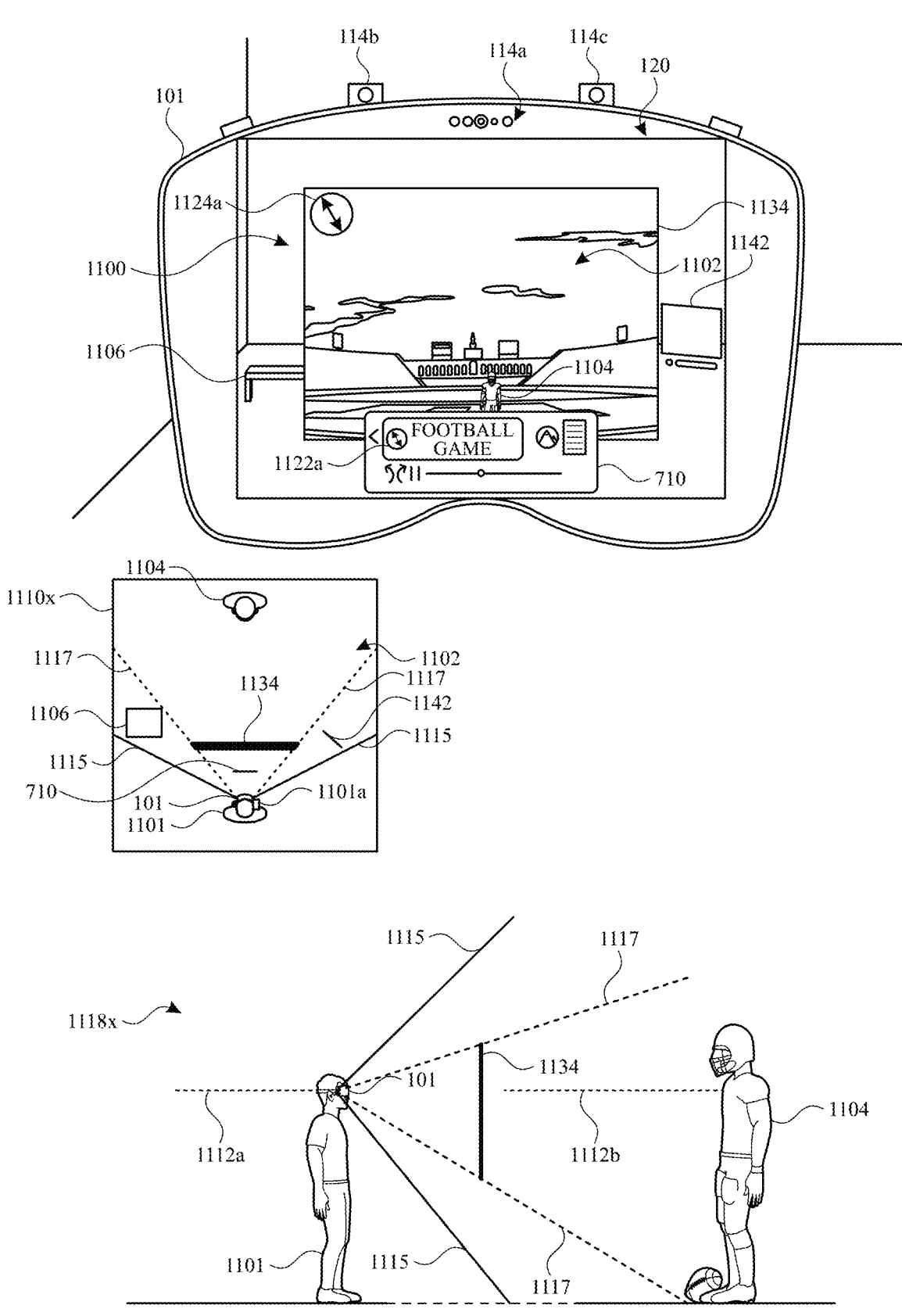

In some embodiments, a window (e.g., the frame 1134 in FIG. 11K) is displayed with one or more window UI elements (e.g., system UI such as playback controls, a tab bar, a menu bar, or other element that is placed near the window but is separate from the window) that extend outside of a portion of the window, such as shown with the concurrent display of the frame 1134 and the playback control user interface 710 in FIG. 11X. For example, the window UI element(s) 1121 in FIG. 11AO optionally includes playback control user interface 710 of FIG. 11K. In some embodiments, the one or more window UI elements extend in display to where a resize control (e.g., user interface element 1140 of FIG. 11K) would be displayed if the one or more window UI elements were not displayed with the window, such as the playback control user interface 710 in FIG. 11X extending in display to the position of the user interface element 1140 in FIG. 11K and such as the window UI element(s) 1121 in FIG. 11AO extending in display to the position of the user interface element 1140 in FIG. 11K. In some embodiments, when window UI element(s) are displayed concurrently with the window, the computer system 101 displays the resize control at a first location based on the location of the window UI element(s) (e.g., displayed outside of an edge of the window UI element(s) instead of being placed based on the location of the window (e.g., displayed outside of the edge of the window), such as shown with the location of user interface element 1140 being displayed outside of the edge of the window UI element(s) 1121 rather than at the location of the user interface element 1140 in FIG. 11K. In some embodiments, when the window is displayed without the window UI element(s) that extend outside the window, the resize control is displayed at a second location, different from the first location, based on a location of the window (e.g., just displayed outside of the edge of the window), such as shown with the location of user interface element 1140 in FIG. 11K. Though the location of the frame 1134 is the same in FIGS. 11K and 11AO, the location of the user interface element 1140 different as described above. In some embodiments, resizing (e.g., enlarging or reducing a size of) the window will cause the window UI element(s) to extend outside of the edge of the window. In some embodiments, an application event (e.g., a change in content, a change in state, or a notification/alert) will cause window UI element(s) to extend outside of the edge of the window. When a resize control (e.g., user interface element 1140 of FIG. 11AO) is placed based on the window UI element(s), the region for triggering display of the resize control is optionally based on the location of the window UI element(s) (e.g., based on attention or gaze being directed to the corner of the window UI element) instead of being based on the location of the window (e.g., based on attention or gaze being directed to the corner of the window), such as the region being different in FIGS. 11K and 11AO due to the frame 1134 being displayed without the window UI element(s) 1121 in FIG. 11K and the frame 1134 being displayed with the window UI element(s) 1121 in FIG. 11AO.

FIGS. 11K and 11U illustrate the computer system 101 detecting and responding to a request to change a viewpoint of the user while the virtual content 1102 is in the framed mode of display, in accordance with some embodiments. For example, while displaying the virtual content 1102 in the framed mode as in FIG. 11K, the computer system 101 optionally detects an event corresponding to a request to change the viewpoint of the user. For example, the event is optionally movement of the user 1101 closer to the frame 1134. In response, the computer system 101 updates the amount of the field of view of virtual content 1102 that is displayed in the frame 1134 to be a greater amount, as shown in FIG. 11U.

FIGS. 11U and 11V illustrate the computer system 101 detecting and responding to the viewpoint of the user intersecting the frame 1134, in accordance with some embodiments. For example, while displaying the virtual content 1102 in the framed mode as in FIG. 11U, the computer system 101 optionally detects an event corresponding to a request to change the viewpoint of the user. For example, the event is optionally movement of the user 1101 closer to the frame 1134. In response, the computer system 101 updates the amount of the field of view of virtual content 1102, and when or if the viewpoint of the user intersects the frame 1134 (e.g., the location the viewpoint of the user is in the frame 1134 or is within a threshold of the frame 1134), the computer system 101 reduces in visual prominence the portion of the virtual content 1102 that is in the region of the portion of the viewpoint of the user that intersects the frame 1134, as shown in FIG. 11V.

FIGS. 11U and 11W illustrate the computer system 101 detecting and responding to a portion of the user intersecting the frame 1134, in accordance with some embodiments. For example, while displaying the virtual content 1102 in the framed mode as in FIG. 11U, the computer system 101 optionally detects that hand 1101a of the user 1101 is intersecting the frame 1134, and in response the computer system 101 reduces in visual prominence the portion of the virtual content 1102 that is in the region of the hand 1101a that is intersecting the frame, as shown in FIG. 11W.

FIG. 11X illustrates the computer system 101's response to detecting an input corresponding to a request to display controls associated with the virtual content 1102 while the virtual content 1102 is in the framed mode, in accordance with some embodiments. For example, while displaying virtual content 1102 as illustrated in FIG. 11J, the computer system optionally detects the input (e.g., a hand 1101a of the user 1101 being placed into an air pinch pose while attention (e.g., gaze of the user 1101) is directed at the virtual content 1102), and in response, computer system 101 displays controls associated with the virtual content 1102, as shown in FIG. 11X. In FIG. 11X, the computer system 101 displays a playback control user interface 710 and a user interface element 1124a, which is displayed separate from (e.g., outside of) the playback control user interface 710 and as an overlay on the virtual content 1102. The playback control user interface 710 in FIG. 11X includes a title of the virtual content ("FOOTBALL GAME"), a user interface element selectable to control a volume level of the virtual content, a playback length indicator, a playback time position indicator within the playback time length indicator, a fast-forward control, a rewind control, and a pause control. In some embodiments, more or fewer control elements are displayed in the playback control user interface 710 in FIG. 11X. In some embodiments, playback control user interface 710 includes one or more or all features described with reference to embodiment(s) of methods 800 and/or 1000. Further, in the illustrated example, the playback control user interface 710 includes a user interface element 1122a that is selectable to transition the mode of display of virtual content 1102 to the immersive mode of display. Thus, computer system 101 concurrently displays two separate user interface element (e.g., user interface element 1124a and user interface element 1122a) that are selectable to transition the mode of display of virtual content 1102 to the framed mode of display. Further details regarding the immersive mode of display are described with reference to embodiment(s) of method 1200.

Figure 11Y:
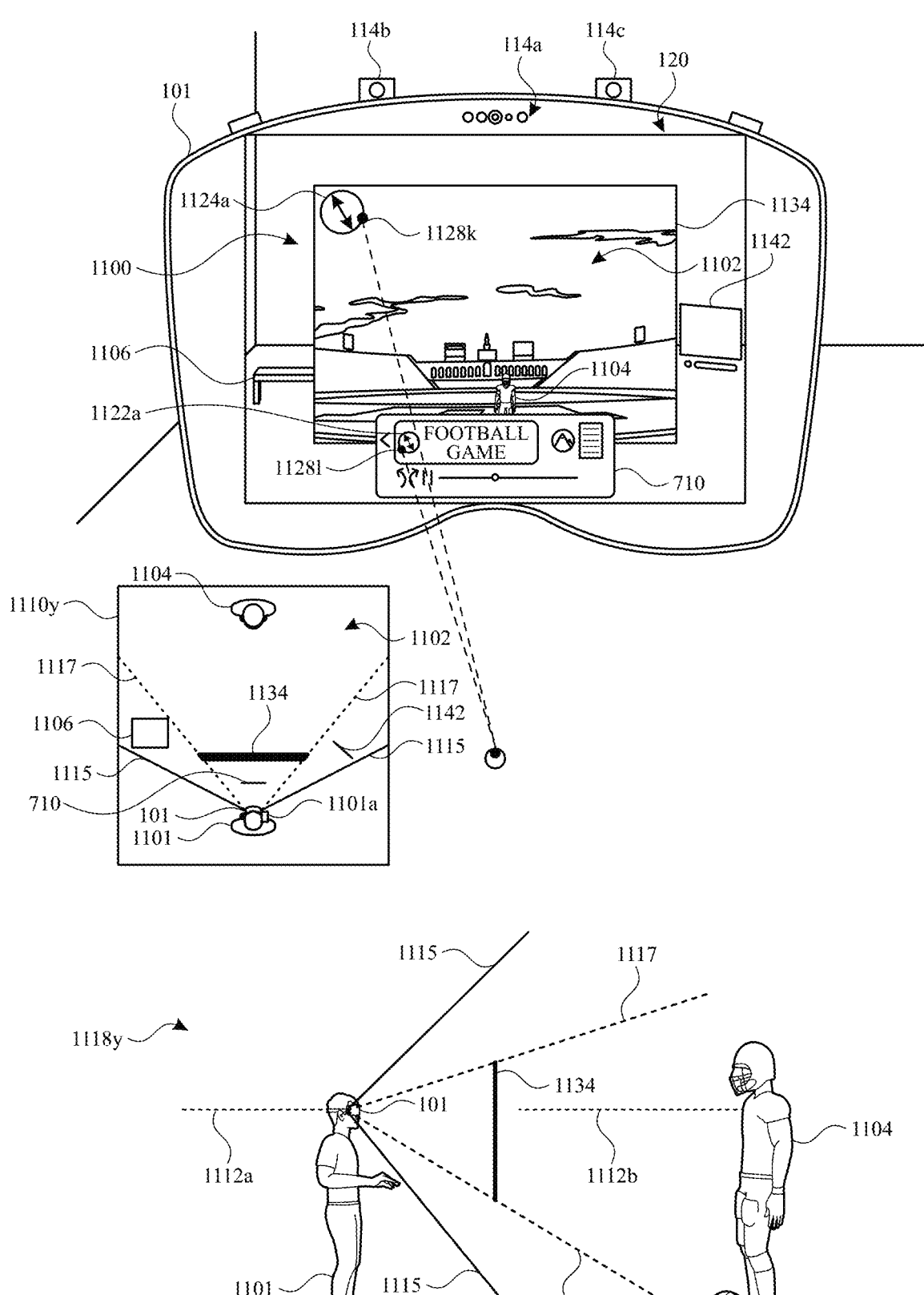
Figure 11Z:
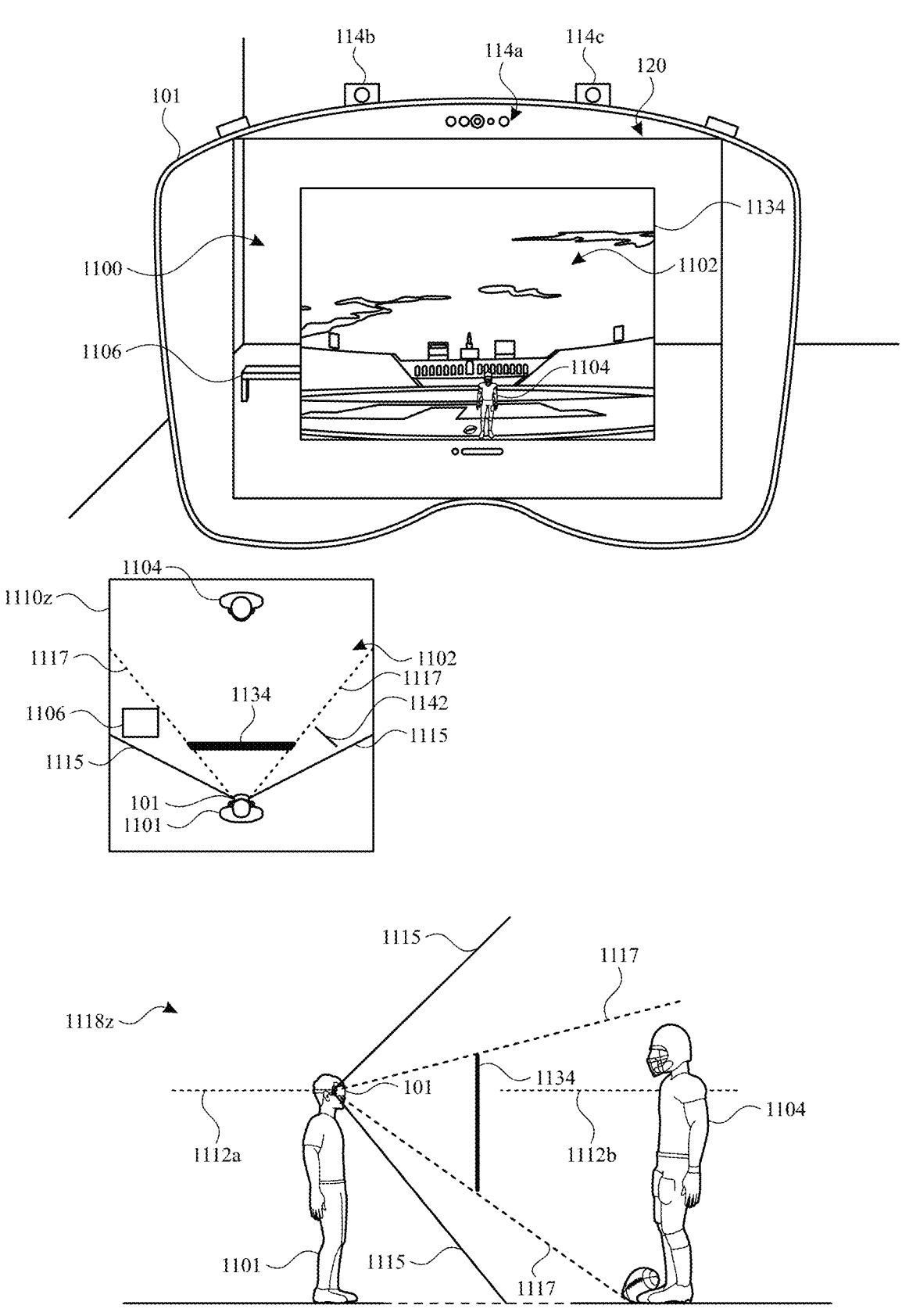
Figure 11A:
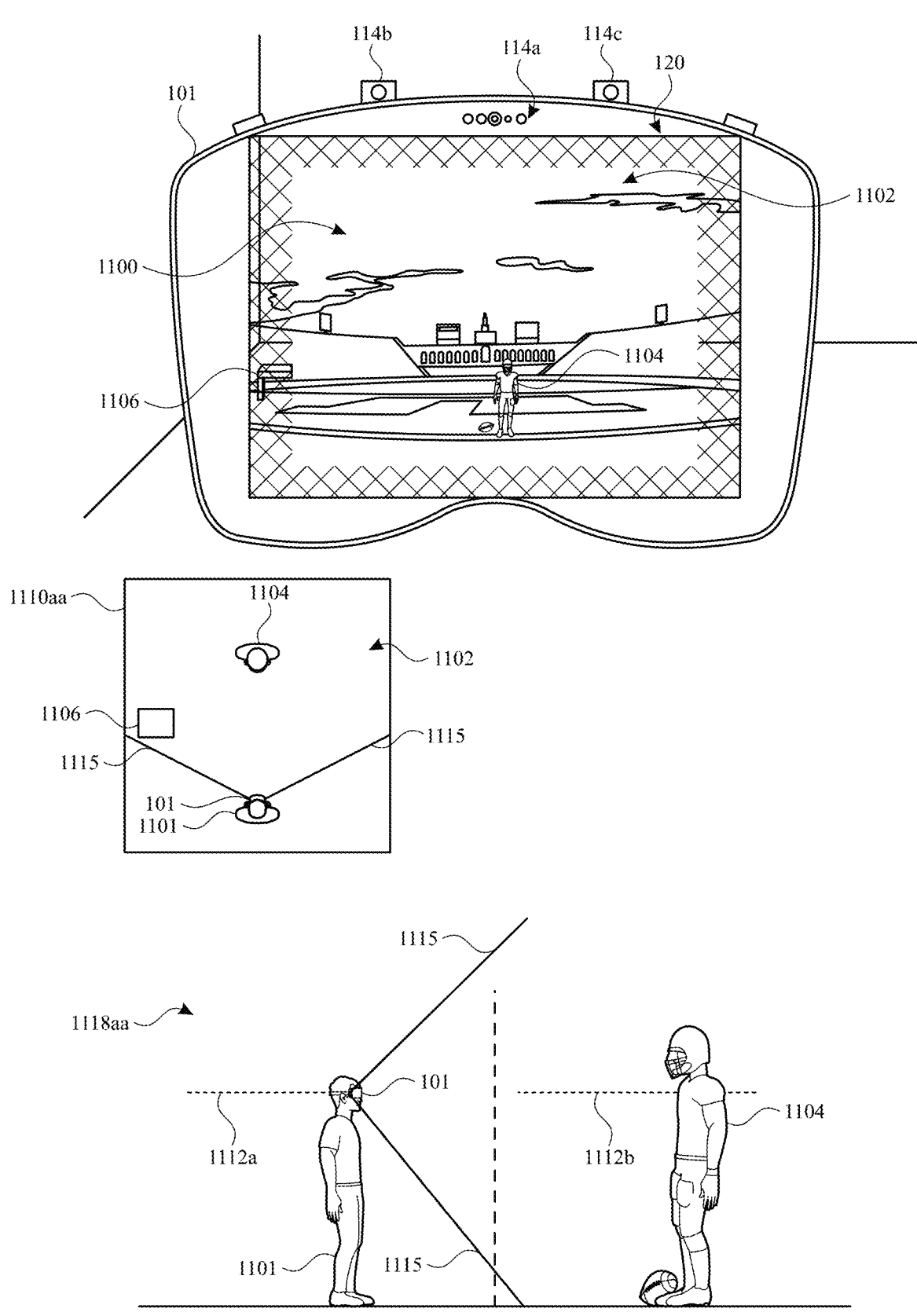
Figure 11A:
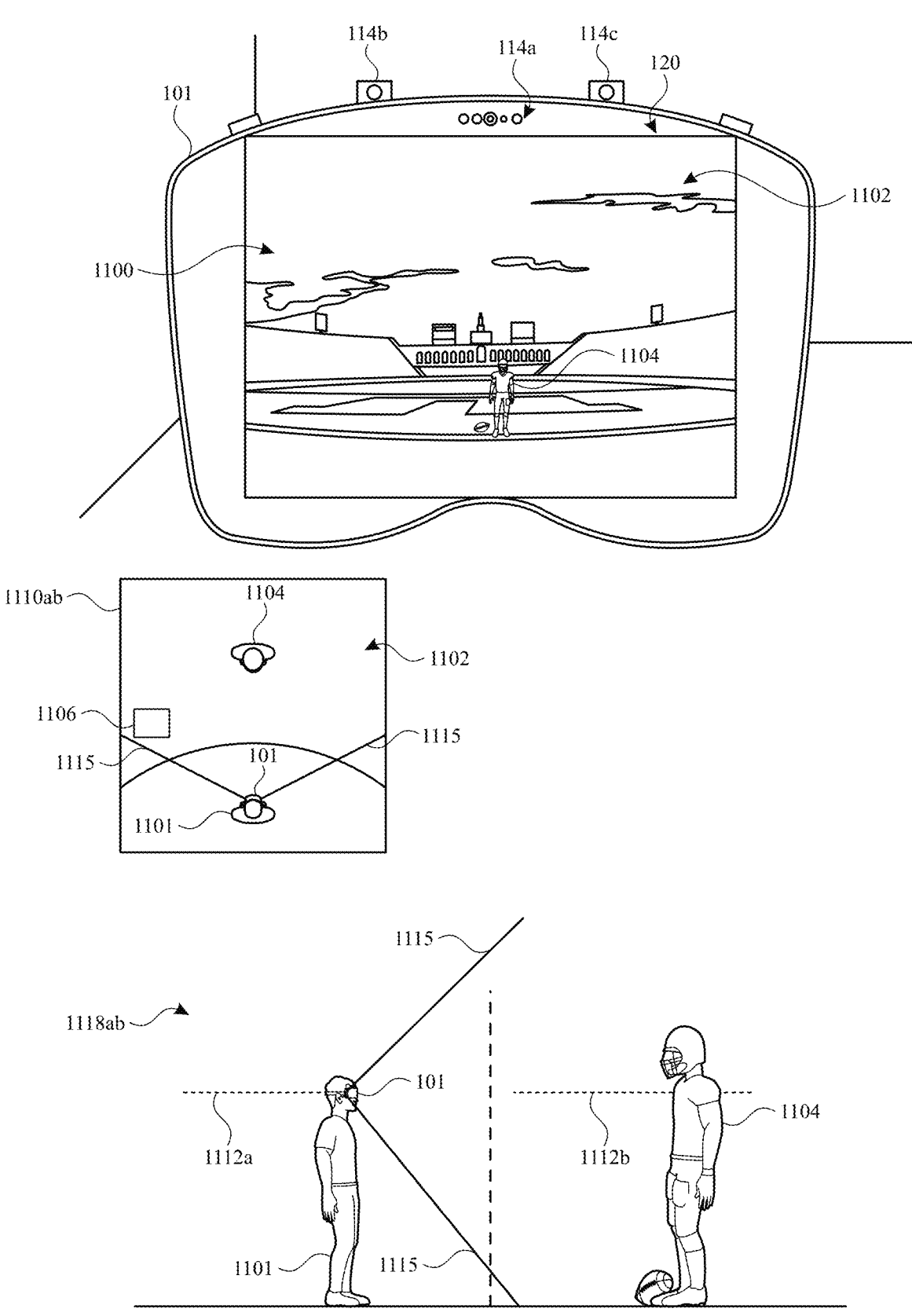
Figure 11A:
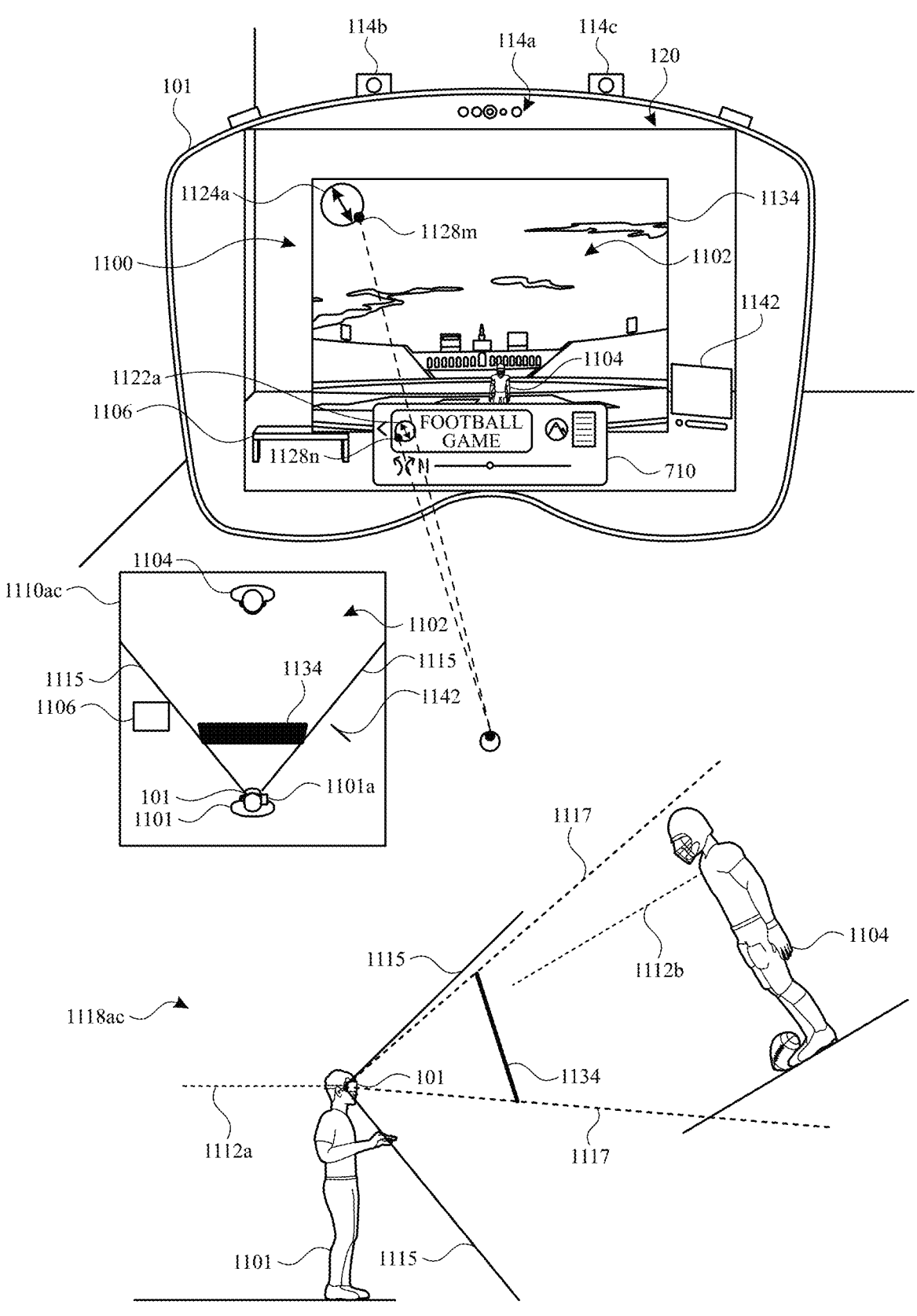
Figure 11A:
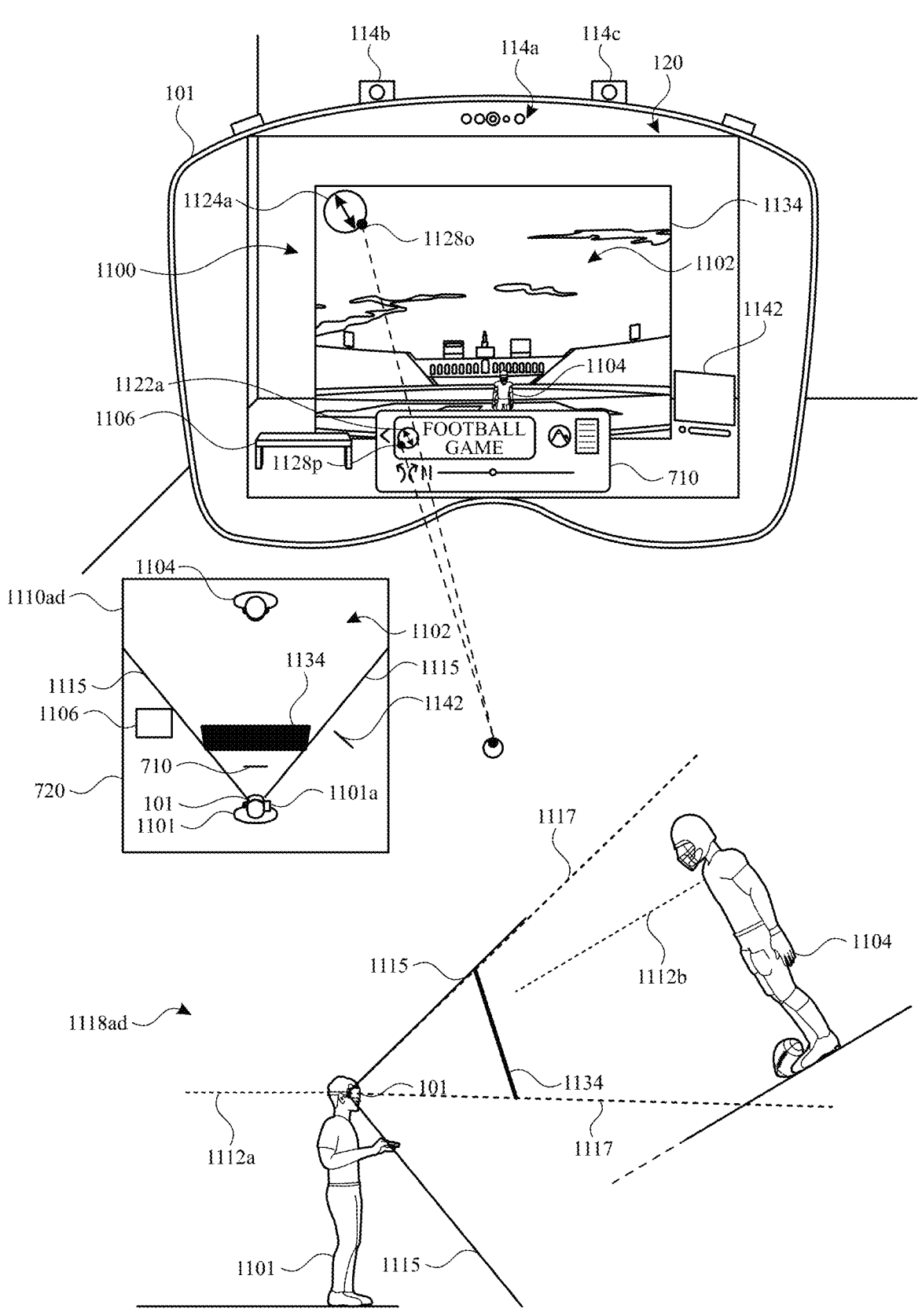
Figure 11A:
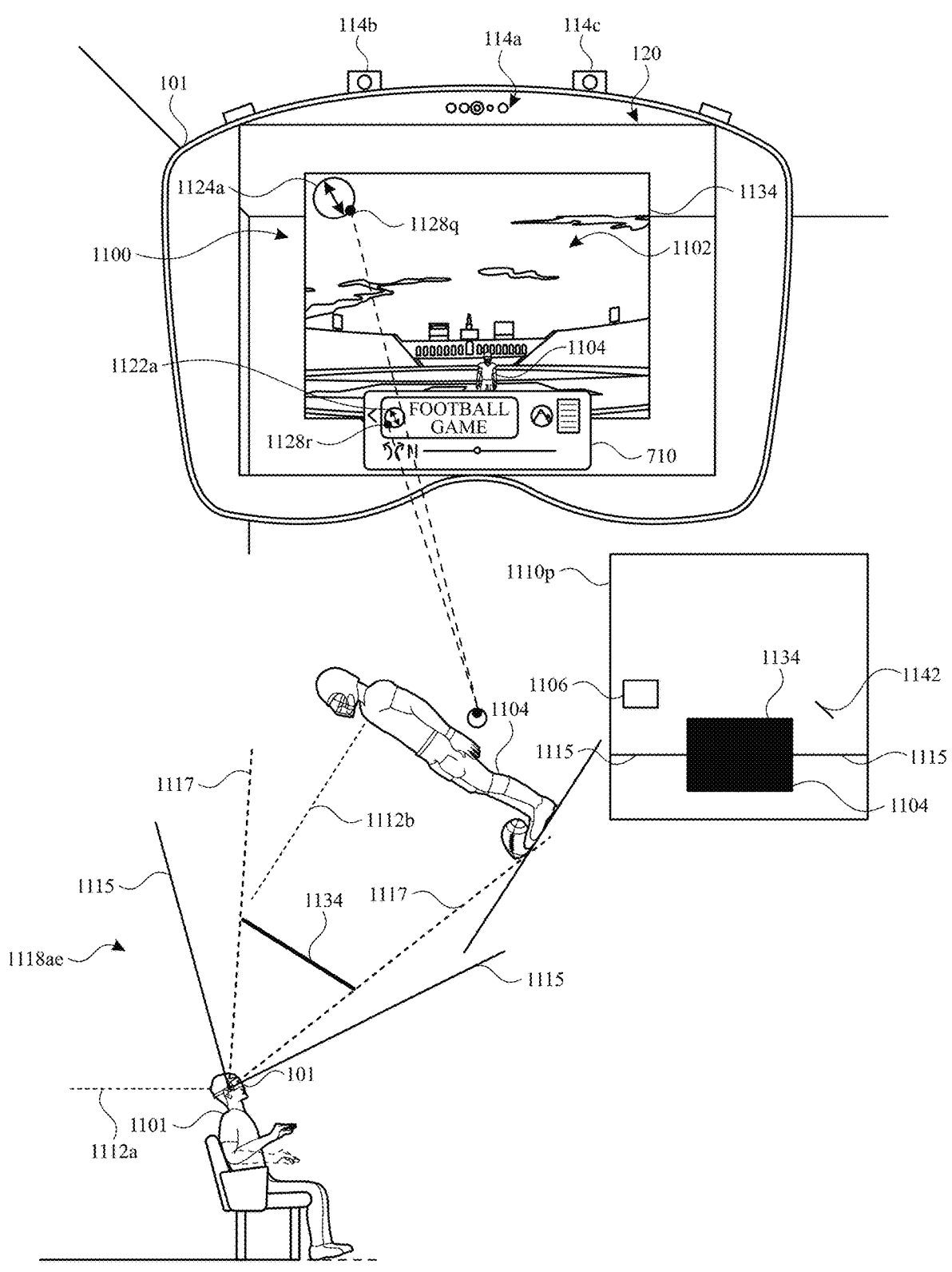
Figure 11A:
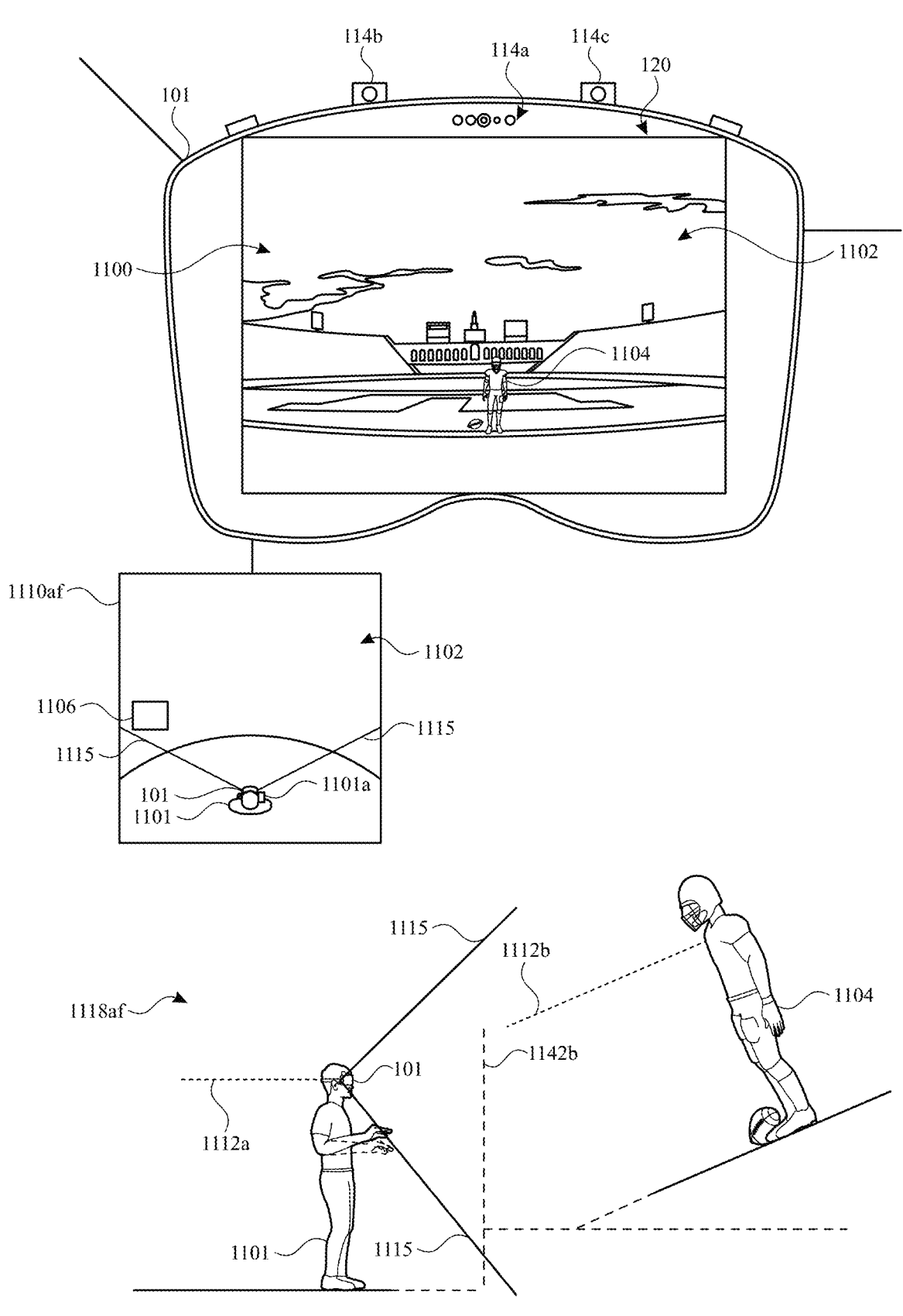
Figure 11A:
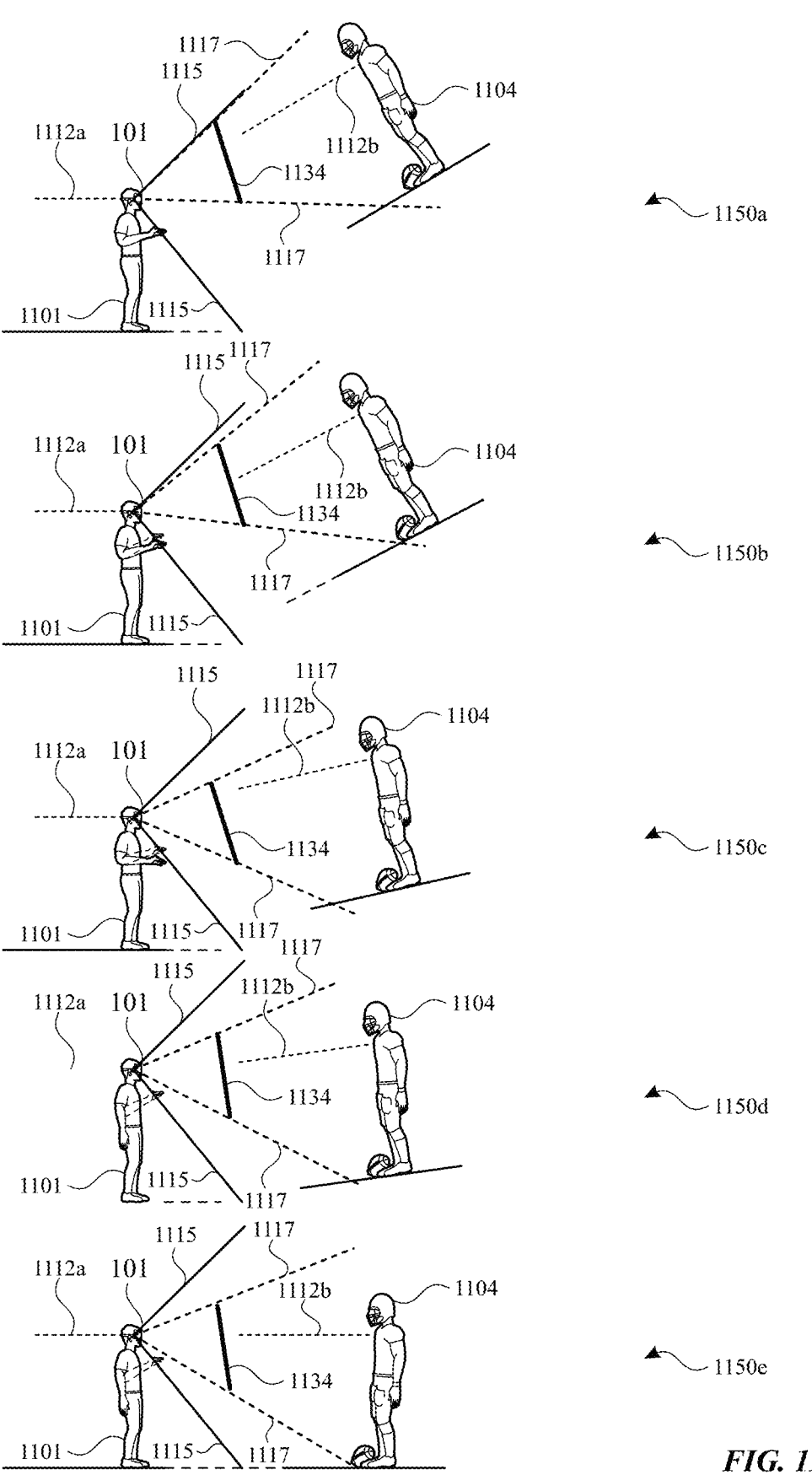
Figure 11A:
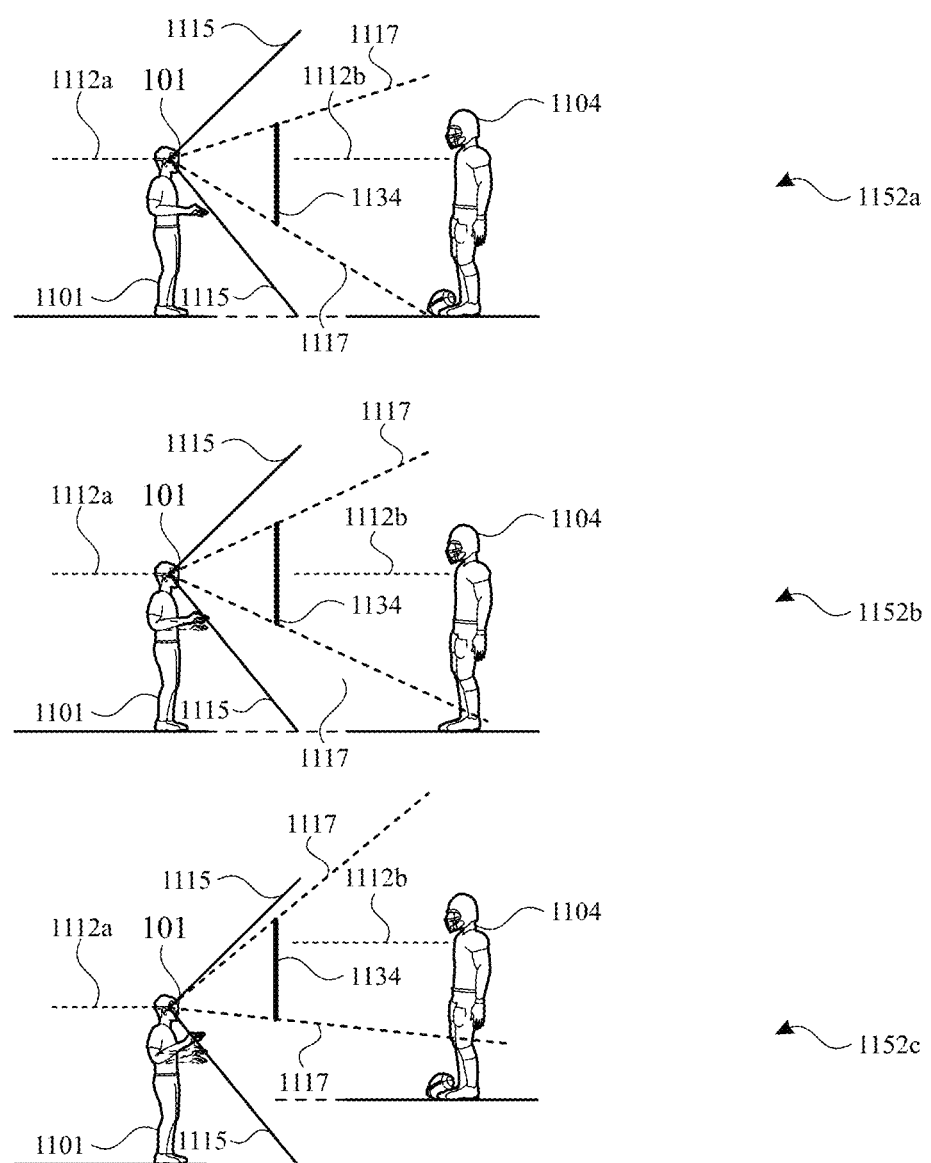
Figure 11A:
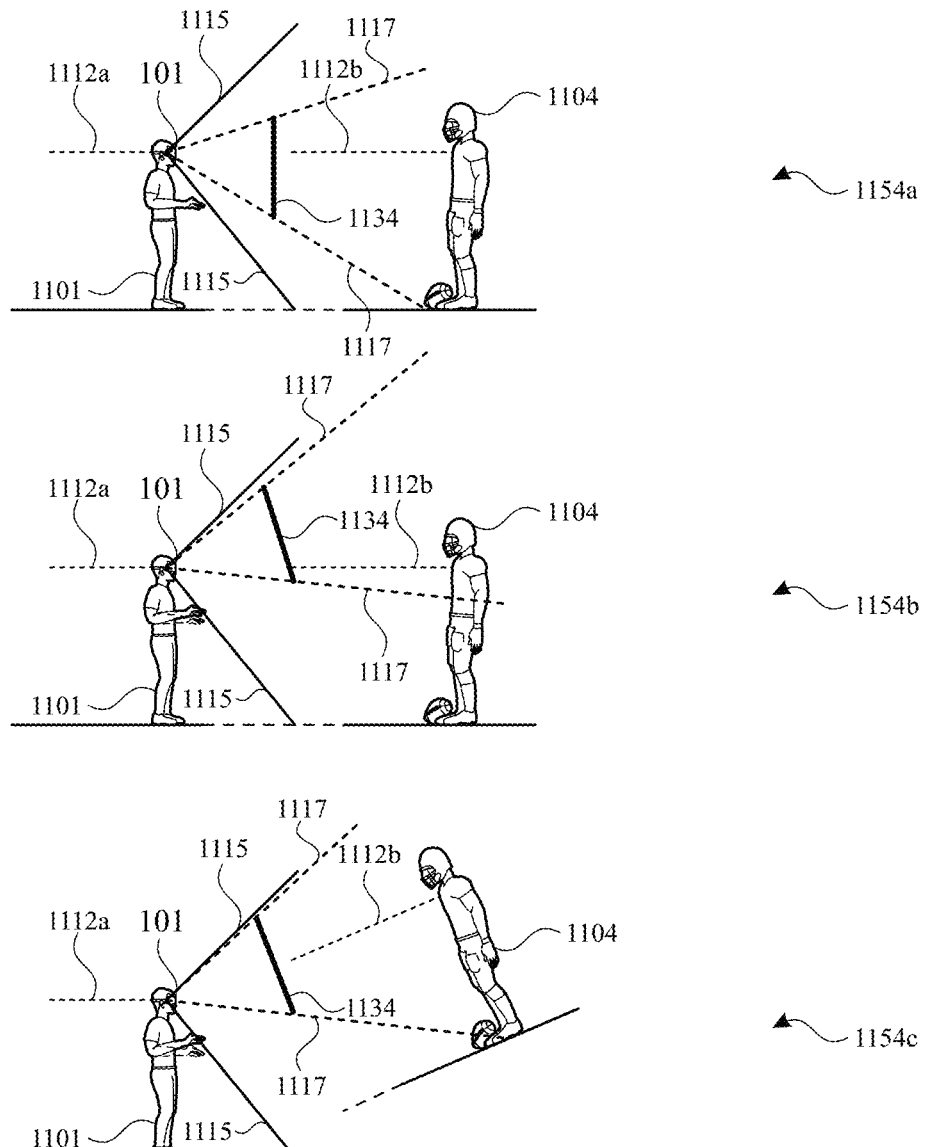
Figure 11A:
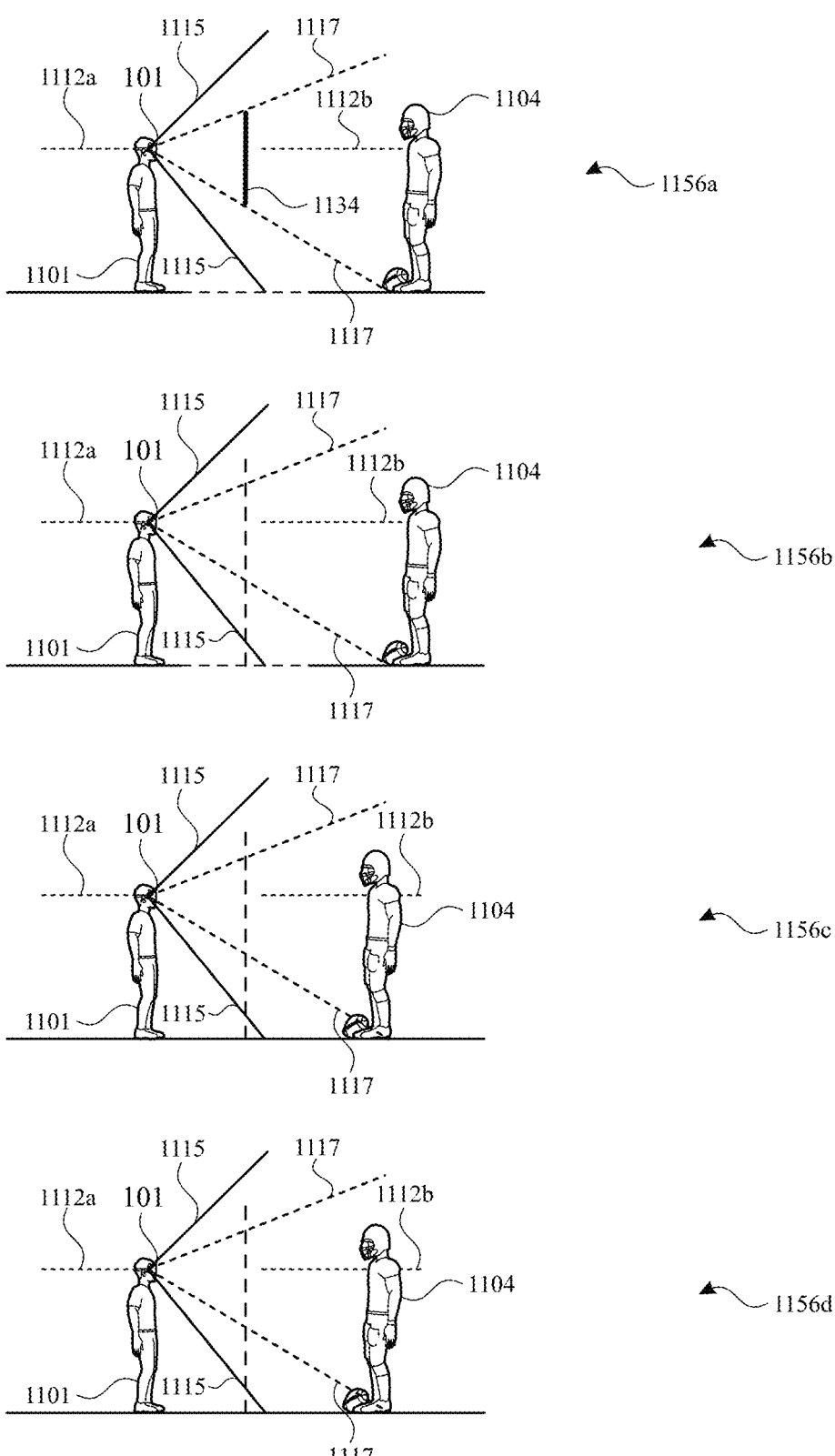
Figure 11A:
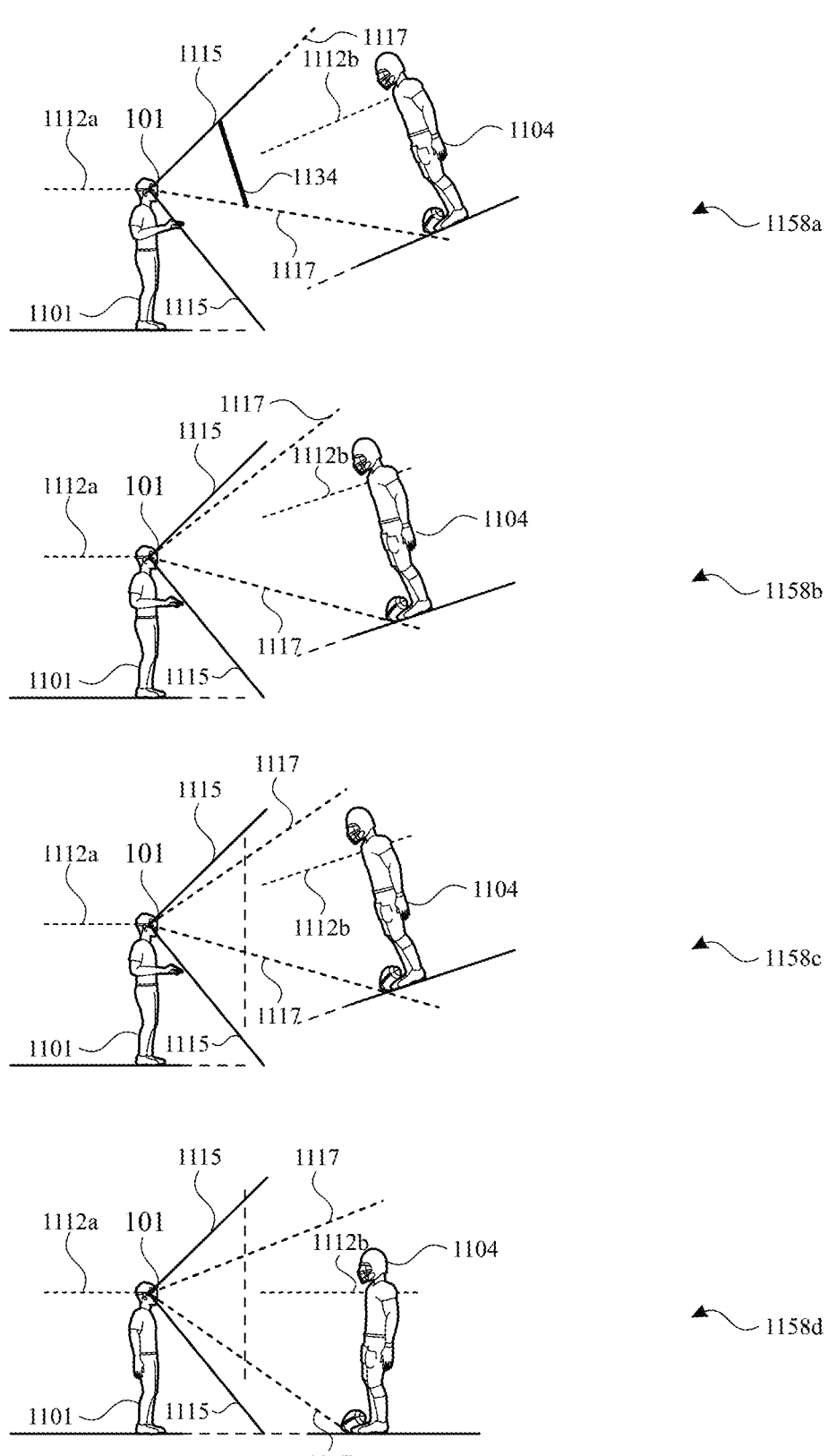
Figure 11A:
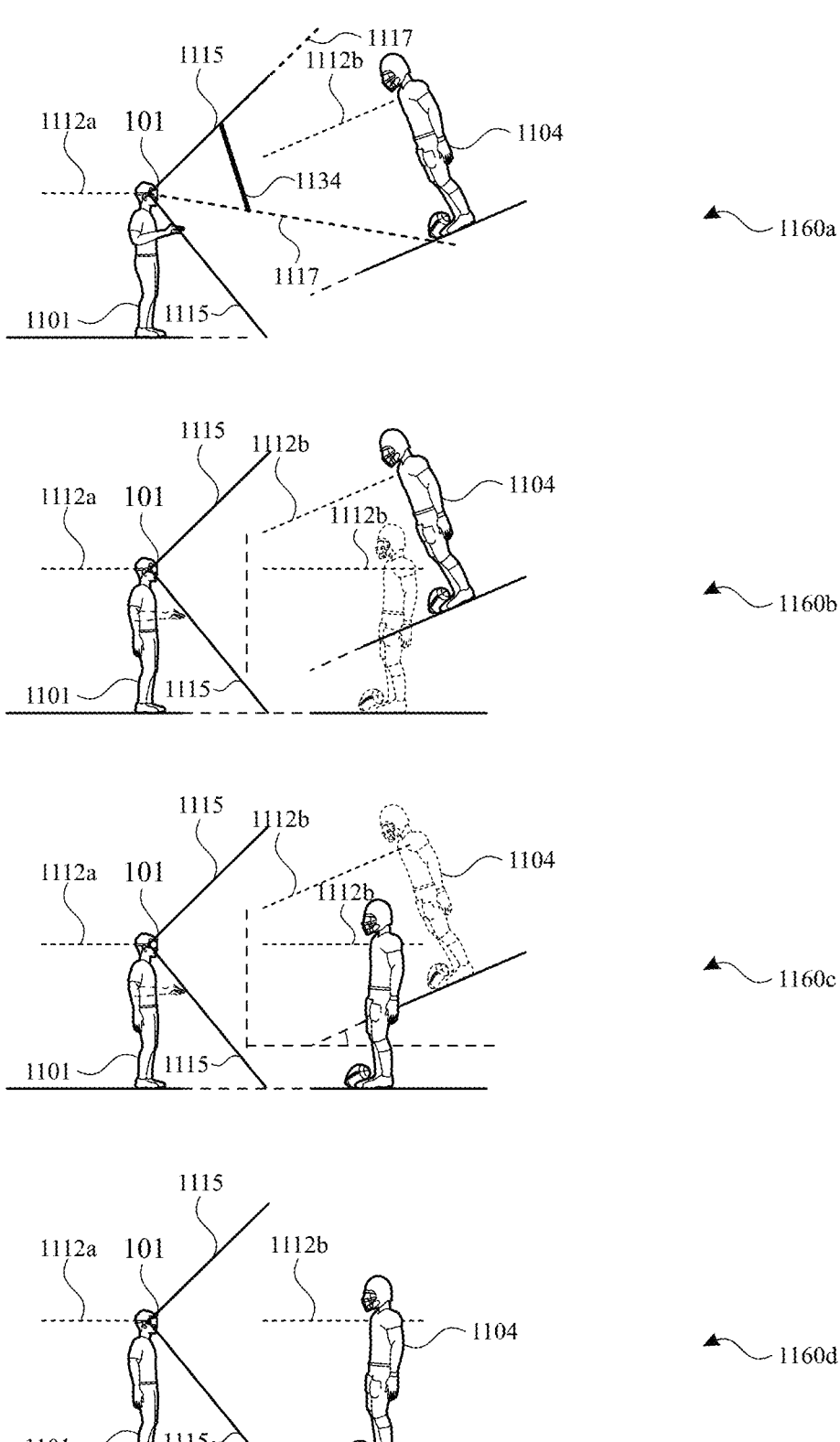
Figure 11A:
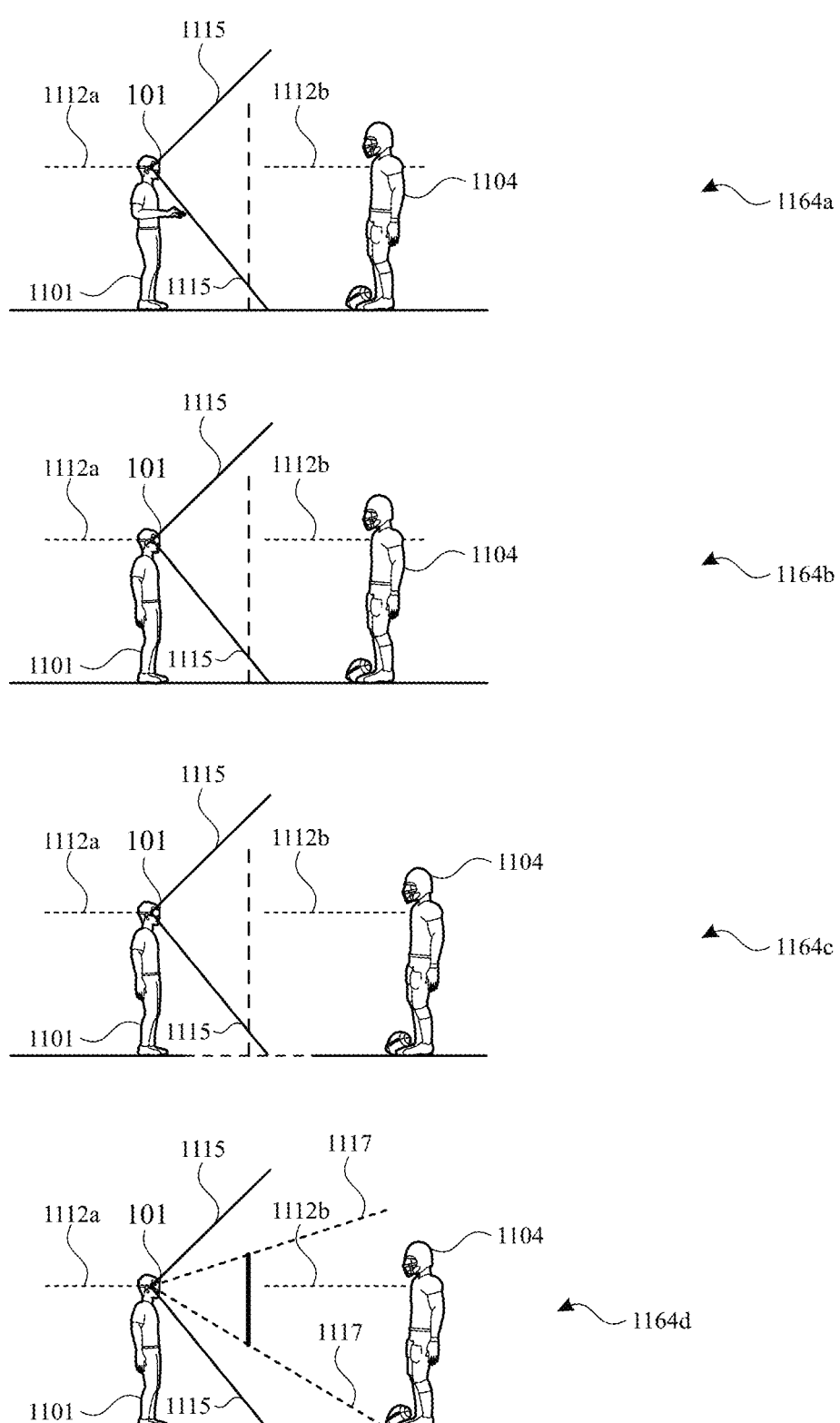
Figure 11A:
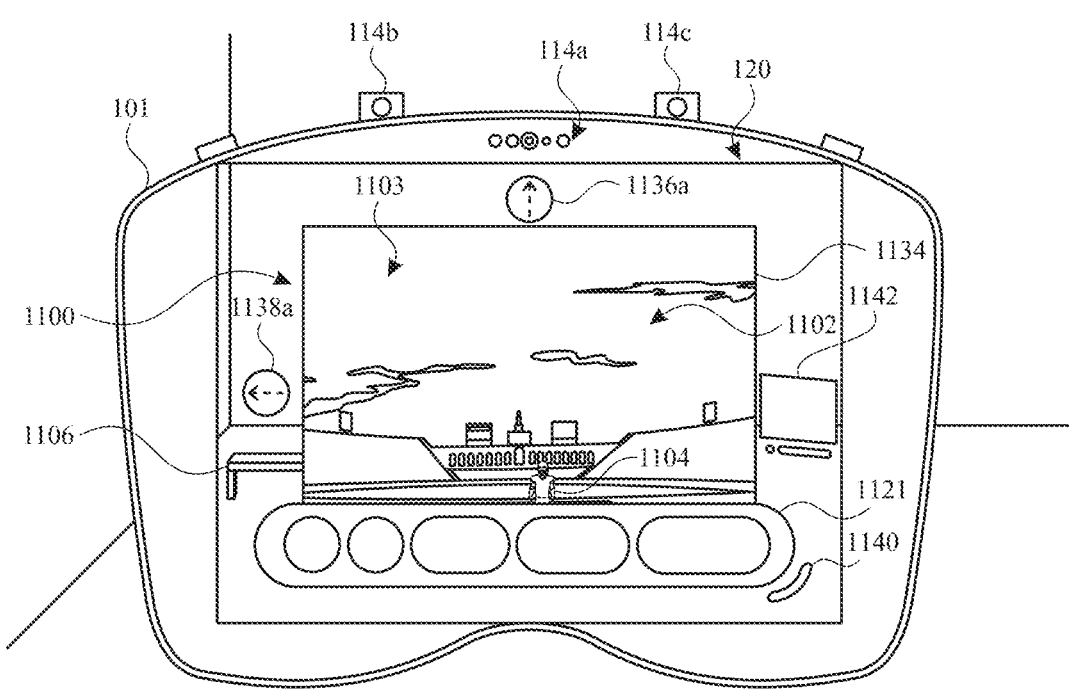

While displaying the controls illustrated in FIG. 11X, the computer system 101 detects user selection of user interface element 1124a (or alternatively of user interface element 1122a, which as described above is selectable to perform the same operation as user interface element 1124a), as shown in FIG. 11Y. For example, computer system 101 detects that hand 1101a of user 1101 is being placed into an air pinch pose while attention (e.g., based on gaze) of the user 1101 is directed to the virtual content user interface element 1124a. In response, the computer system 101 transitions the mode of display of virtual content 1102 to the immersive mode of display, as shown in FIGS. 11Z through 11AB.

In particular, in response to the input of FIG. 11Y, which requests to transition the mode of display of virtual content 1102 from the framed mode to the immersive mode, the computer system 101 ceases display of the controls associated with virtual content 1102 and shows an animated transition. In some embodiments, the animated transition includes a change in an apparent size of the virtual content 1102, such as shown with the increase in the angular size of the content relative to the viewport of the user from FIG. 11Z to FIG. 11AA followed by a change in boundaries around the virtual content 1102, such as shown with the cease of display of frame 1134 and the revealing of more of the virtual content 1102 in the viewpoint of the user. In some embodiments, the animated transition includes the change in boundaries around the virtual content 1102, without including the change in the apparent size of the virtual content 1102. It should be noted that when the computer system 101 detects user selection of user interface element 1122a (or alternatively of user interface element 1124a) in FIG. 11Y, the content horizon 1112b is aligned with the environment horizon 1112a. In some embodiments, the computer system 101 performs different animated transitions based on whether the content horizon 1112b is aligned with environment horizon 1112a or is within a threshold of alignment with environment horizon 1112a, and such features will be described in more detail herein.

In some embodiments, the computer system 101 transitions display to the immersive mode differently based on an amount of alignment of the content horizon 1112b with the environment horizon 1112a when the request to transition to the immersive mode is detected. For example, FIGS. 11Y and 11AC-AE respectively illustrate the computer system 101 detecting the request to transition to the immersive mode while the amount of alignment of the content horizon 1112b with the environment horizon 1112a is different between the respective figures. In particular, the amount of alignment of the content horizon 1112b with the environment horizon 1112a is reduced from FIG. 11Y to 11AC, and further reduced from FIG. 11AC to 11AD, and further reduced from FIG. 11AD to 11AE. The computer system 101's response to detecting the request in FIG. 11Y is illustrated in FIGS. 11Z through 11AB (and, alternatively, in FIG. 11AJ); the computer system 101's response to detecting the request in FIG. 11AC is illustrated in FIG. 11AK; the computer system 101's response to detecting the request in FIG. 11AD is illustrated in FIG. 11AL; the computer system 101's response to detecting the request in FIG. 11AE is illustrated in FIG. 11AM.

In particular, FIG. 11AJ illustrates consecutive side views showing the evolution of display that is in response to detecting the request in FIG. 11Y to transition to the immersive mode while displaying the virtual content 1102 in the framed mode and while the content horizon 1112b is aligned with the environment horizon 1112a, in accordance with some embodiments. At side view 1156a of FIG. 11AJ, the computer system 101 is detecting the request to transition to the immersive mode while displaying the virtual content 1102 in the framed mode and while the content horizon 1112b is aligned with the environment horizon 1112a. In response, as shown from side view 1156a to 1156c of FIG. 11AJ, the computer system 101 ceases display of the frame 1134 (e.g., changes the boundaries of the virtual content 1102 as shown in side view 1156b), and then optionally changes an apparent size of the virtual content 1102, which in the illustrated example is an increase in size, as shown with the movement of the reference 1104 of the virtual content 1102 toward the user 1101 from its location in side view 1156a and 1156b to its location in side view 1156c (e.g., which is the same location in side view 1156d).

FIG. 11AK illustrates consecutive side views showing the evolution of display that is in response to detecting the request in FIG. 11AC to transition to the immersive mode, which is detected while the content horizon 1112b is within a first threshold of alignment with the environment horizon 1112a but less than aligned with the environment horizon 1112a, in accordance with some embodiments. At side view 1158a of FIG. 11AK, the computer system 101 is detecting the request to transition to the immersive mode while displaying the virtual content 1102 in the framed mode and while the content horizon 1112b is within the first threshold of alignment but less than aligned with the environment horizon 1112a. In response, as shown from side view 1158b through 1158d of FIG. 11AK, the computer system 101 moves the virtual content 1102 through a plurality of intermediate locations (e.g., that, as shown from side view 1158a to side view 1158b, from side view 1158b to side view 1158c, and from side view 1158c to side view 1158d consecutively increase the alignment of content horizon 1112b with environment horizon 1112a) towards alignment until the content horizon 1112b is aligned with the environment horizon 1112a while ceasing display of the frame 1134 (e.g., changes the boundaries of the virtual content 1102) and optionally while changes an apparent size of the virtual content 1102, which in the illustrated example is an increase in size, as shown with the movement of the reference 1104 of the virtual content 1102 toward the user 1101 from its location in side view 1158a to its location in side view 1158d.

FIG. 11AL illustrates consecutive side views showing the evolution of display that is in response to detecting the request in FIG. 11AD to transition to the immersive mode, which is detected while the content horizon 1112b is within a second threshold of alignment with the environment horizon 1112a that is greater than the first threshold of alignment, but not within the first threshold of alignment with the environment horizon 1112a (e.g., and not aligned with the environment horizon 1112a), in accordance with some embodiments. At side view 1160a of FIG. 11AL, the computer system 101 is detecting the request to transition to the immersive mode while displaying the virtual content 1102 in the framed mode and while the content horizon 1112b is within the second threshold of alignment but not within the first threshold of alignment (e.g., and not aligned with the environment horizon 1112a). In response, as shown from side view 1160b through 1160d, the computer system 101 fades out (e.g., progressively as shown in side views 1160b through 1160d) display of virtual content 1102 that has the content horizon 1112b that is not aligned with the environment horizon 1112a and fades in (e.g., progressively as shown in side view 1160b through 1160d) display of virtual content 1102 with the content horizon 1112b aligned with the environment horizon 1112a. In addition, with the fading out of the display of virtual content 1102 that has the content horizon 1112b that is not aligned with the environment horizon 1112a, the computer system 101 1102 ceases display of the frame 1134 (e.g., changes the boundaries of the virtual content 1102). Further, in the illustrated example in FIG. 11AL, the display of virtual content 1102 that is faded in with the content horizon 1112b aligned with the environment horizon 1112a is of a greater apparent size than the apparent size of the virtual content 1102 that is faded out. 1102

FIG. 11AM illustrates consecutive side views showing the evolution of display that is in response to detecting the request in FIG. 11AE to transition to the immersive mode, which is detected while the content horizon 1112b is beyond a threshold of alignment with the environment horizon 1112a (e.g., beyond the first threshold and beyond the second threshold), in accordance with some embodiments. At side view 1162a of FIG. 11AM, the computer system 101 is detecting the request to transition to the immersive mode while displaying the virtual content 1102 in the framed mode and while the content horizon 1112b is beyond the threshold of alignment with the environment horizon 1112a, as also shown in FIG. 11AE. In response, as shown from side view 1162a to 1162b in FIG. 11AM, the computer system 101 ceases display of the frame 1134 (e.g., changes the boundaries of the virtual content 1102), and then optionally changes an apparent size of the virtual content 1102, which in the illustrated example is an increase in size, but maintaining the positioning of the virtual content 1102 in the three-dimensional environment, so this illustrated transition to the immersive does not involve display of virtual content 1102 in the immersive mode with the content horizon 1112*b* aligned with the environment horizon 1112*a*. These features are also generally illustrated in FIGS. 11AE and 11AF. In some embodiments, while displaying the virtual content 1102 in the framed mode, and while the content horizon 1112*b* is not aligned with the environment horizon 1112*a*, the computer system 101 detects a request to transition to displaying the virtual content 1102 in the immersive mode, as shown in FIG. 11AE, and in response, computer system 101 transitions to the immersive mode, without aligning the content horizon 1112*b* to the environment horizon 1112*a*, such as shown in FIG. 11AF.

FIG. 12 is a flowchart illustrating an exemplary method 1200 of detecting and responding to a request to transition a mode of display of virtual content from an immersive mode to a framed mode in accordance to some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, a method 1200 is performed at a computer system (e.g., computer system 101 of FIG. 1) in communication with one or more display generation components (e.g., display generation component 120 of FIG. 1) and one or more input devices (e.g., input devices 125 of FIG. 1A). For example, the computer system is or includes a mobile device (e.g., a tablet, a smartphone, a media player, or a wearable device), or a computer. In some embodiments, the computer system has one or more characteristics of the computer system described with reference to any of the methods herein, such as methods 800 and/or 1000. In some embodiments, the one or more display generation components have one or more characteristics of the display generation components described with reference to any of the methods herein, such as methods 800 and/or 1000. In some embodiments, the one or more input devices have one or more characteristics of the one or more input devices described with reference to any of the methods herein, such as methods 800 and/or 1000.

In some embodiments, the computer system displays (1202*a*), via the one or more display generation components, three-dimensional (3D) content in an immersive mode of display, wherein in the immersive mode of display the 3D content occupies a first amount of an available field of view from a current viewpoint of the user, such as shown with virtual content 1102 being in the immersive mode in FIG. 11A.

In some embodiments, the 3D content is displayed in a three-dimensional environment, such as a three-dimensional environment described with reference to method 800 and/ 1000, or elsewhere herein. In some embodiments, the three-dimensional environment is an extended reality (XR) environment, such as a virtual reality (VR) environment, a mixed reality (MR) environment, or an augmented reality (AR) environment, or another type of XR environment.

The 3D content is optionally live TV, sports content, a movie, still content and/or other media content. The 3D content is optionally immersive media content (e.g., 3D content that optionally at least partially surrounds the user of the computer system in a view of the three-dimensional environment, 180 degree media, 360 degree media, and/or 3D content for which the computer system simulates depth effect(s) optionally relative to a viewpoint(s) of the user, such that the user of computer system visually experiences the 3D content as three-dimensional content).

The amount (e.g., the extent or angular range) of the field of view of the 3D content that is displayed from the current viewpoint of the user is the first amount of the available field of view of the 3D content. The amount of the field of view of the 3D content optionally corresponds to an amount of the available field of view of the 3D content, that is visible or displayed. For example, the amount of the field of view of the 3D content optionally corresponds to an angular range of the 3D content that is visible and/or displayed in the viewport of the user from the current viewpoint of the user or corresponds to a maximum amount of the full view of the 3D content that could be visible or displayed based on the level of immersion at which the 3D content is displayed. For example, when the 3D content is 180-degree content, the available field of view is 180 degrees and the first amount of the field of view of the 3D content could be an angular range less than 180-degrees, such as 9, 15, 20, 45, 50, 60 degrees, 100 degrees, or another angular range less than 180-degrees, or could be 180-degrees. As another example, when the 3D content is 360-degree content, the available field of view is 360 degrees and the field of view of the 3D content could be an angular range less than 360-degrees, such as 9, 15, 20, 45, 50, 60 degrees, 100 degrees, 180 degrees, 220 degrees, or another angular range less than 360-degrees, or could be 360-degrees. In some embodiments, in the immersive mode of display, the various available angular ranges of the 3D content optionally correspond to different levels of immersion at which the 3D content is displayed, such that, for example, if a first level of immersion is greater than a second level of immersion, then the angular range of the 3D content displayed at the first level of immersion is greater than the angular range of the 3D content displayed at the second level of immersion. In some embodiments, the available field of view of the 3D content is larger than a field of view of the 3D content that is displayed in the current viewpoint of the user. In some embodiments, the user can explore the extent of the available field of view of the 3D content by moving the viewport of the user (e.g., moving (e.g., rotating) the user's head and thus the display generation components, such as if the display generation components are part of a head-mounted AR/VR display system being worn on the user). For example, while the 3D content occupies the first amount, the computer system optionally detects movement of the viewport of the user, and in response the computer system optionally displays a different portion of the available field of view based on the movement of the viewport of the user. Continuing with this example, in response, the 3D content that is displayed would optionally continue to occupy the first amount or a second amount different from the first amount. In some embodiments, the first amount of the available field of view is larger than the viewport of the user. In some embodiments, the first amount of the available field of view is smaller than the viewport of the user. In some embodiments, the available field of view of the 3D content is equal to the field of view of the 3D content that is displayed in the current viewpoint of the user.

In some embodiments, in the immersive mode of display, the amount of a viewport of the user that is consumed by the 3D content is based on the level of immersion at which the 3D content is displayed, such as described in more detail below.

In some embodiments, in the immersive mode of display, the level of immersion at which the 3D content is displayed corresponds to an amount of the field of view of the 3D content that is visible and/or displayed in the viewport of the user from the viewpoint of the user. For example, in the immersive mode of display, when the level of immersion at which the 3D content is displayed is a first level, the amount of field of view of the 3D content that is visible and/or displayed in the viewport of the user from the viewpoint of the user is a first amount, and when the level of immersion at which the 3D content is displayed is a second level, greater than the first level, the amount of field of view of the 3D content that is visible and/or displayed in the viewport of the user from the viewpoint of the user is a second amount, greater than the first amount. As such, in some embodiments, in the immersive mode of display, as a level of immersion at which the 3D content is displayed increases, the amount of field of view of the 3D content that is visible and/or displayed in the viewport of the user from the viewpoint of the user increases, and as the level of immersion at which the 3D content is displayed decreases, the amount of field of view of the 3D content that is visible and/or displayed in the viewport of the user from the viewpoint of the user decreases.

In some embodiments, in the immersive mode of display, the immersion at which the 3D content is displayed corresponds to the angular range of the viewpoint of the user that is occupied by the 3D content via the display generation component (e.g., 9 degrees, 15 degrees, 30 degrees, 45 degrees, 60 degrees, 80 degrees, 100 degrees, 120 degrees, 160 degrees, 240 degrees, 275 degrees, or 360 degrees), optionally independent of whether an edge of the 3D content is visible in a current viewpoint of the user. In some embodiments, in the immersive mode of display, the immersion at which the 3D content is displayed corresponds to minimum immersion, low immersion, medium immersion, high immersion, or maximum immersion (e.g., 60 degrees of content displayed at low immersion, 120 degrees of content displayed at medium immersion, 180 degrees of content displayed at high immersion, or 360 degrees of content displayed at maximum immersion). In some embodiments, in the immersive mode of display, the maximum level of immersion at which the 3D content is displayed corresponds to an angular range of the 3D content that is a value less than 360 degrees, such as 180 degrees or 120 degrees. In some examples, in the immersive mode of display, the maximum level of immersion at which the 3D content is displayed is in accordance with setting set by the creator of the 3D content. For example, the creator of the 3D content optionally sets the maximum level of immersion at which the 3D content is to be displayed in the immersive mode of display. In some embodiments, in the immersive mode of display, the level of immersion at which the 3D content is displayed corresponds to an amount of transparency of the 3D content in the viewport.

In some embodiments, while displaying the 3D content in the immersive mode of display, the computer system detects (1202b) an event (e.g., a sequence of one or more inputs detected via the one or more input devices) corresponding to a triggering condition for transitioning from displaying the 3D content in the immersive mode of display to displaying the 3D content in a framed mode of display, different from the immersive mode of display, such as selection of user interface element 1122 in FIG. 11G. In some embodiments, while displaying the 3D content in the immersive mode of display, the computer system also displays a user interface element for displaying the 3D content in the framed mode of display is displayed. In some embodiments, detecting the event includes detecting user input directed at the user interface element. For example, the user input optionally includes an air gesture performed by one or more hands of the user (e.g., an air pinch gesture) and/or gaze of the user directed at the user interface element. The framed mode of display is described further below.

In some embodiments, in response to detecting the event corresponding to the triggering condition for transitioning from displaying the 3D content in the immersive mode of display to displaying the 3D content in the framed mode of display, the computer system displays (1202c) the 3D content in a frame for the 3D content (e.g., in a virtual window or through a virtual portal, such as a visual virtual entry port through which the 3D content is made visible) in a three-dimensional environment (e.g., a virtual environment or a representation of a physical environment), wherein in the framed mode of display the 3D content occupies a second amount of the available field of view from the current viewpoint of the user that is smaller than the first amount of the available field of view from the current viewpoint of the user, such as shown with virtual content 1102 being in the framed mode in FIG. 11J and occupying less of the available of view than in FIG. 11A. In some embodiments, in response to detecting the event, the computer system shows one or more transition animations, such as the animation of the transition from display of the 3D content in the immersive mode of display to display of the 3D content in the framed mode of display described below. In some embodiments, in response to detecting the event, the computer system displays a frame (e.g., a frame of a virtual window, optionally just a frame without a stimulated glass of a simulated window) through which the 3D content is displayed and reduces from the first amount to the second amount the field of view of the 3D content that is displayed from the current viewpoint of the user. For example, from the current viewpoint of the user, the 3D content is optionally visible through the frame, without being visible outside of the frame (e.g., without being visible outside of the outer boundary of the frame from the current viewpoint of the user). It should be noted that the frame or a border of the frame is visible/displayed, or is not visible/displayed through the viewport of the user from the current viewpoint of the user. In some embodiments, in the frame mode of display, the amount of a viewport of the user that is consumed by the 3D content is not based on the level of immersion at which the 3D content is displayed. For example, unlike described with reference to the immersive mode of display, a level of immersion at which the 3D content is displayed is optionally not modifiable while in the frame mode of display. In some embodiments, in the frame mode of display, the field of view of the 3D content that is displayed is based on a size and/or dimensions of the frame, and further discussion of such embodiments are described with reference to the computer system re-sizing the frame and changing the amount of the 3D content that is visible in frame in response to a request to resize the frame.

In some embodiments, while displaying, via the one or more display generation components, the 3D content in the framed mode of display (e.g., from the current viewpoint of the user described above or another viewpoint of the user different from the current viewpoint of the user described above), the computer system detects (1202d), via the one or more input devices, an input to move the frame for the 3D content in the three-dimensional environment (e.g., the move the frame relative to a reference of the three-dimensional environment), such as input requesting movement in direction 1138a in FIG. 11K. The input optionally includes an air gesture (e.g., an air pinch gesture) performed by one or more hands of the user and directed at the frame, and further, optionally includes movement of the one or more hands (while optionally maintaining a final pose of the hand in the air gesture, such as an air pinch position with an index finger of the user touching the thumb of the user) corresponding to requested movement of the frame from a first location to a second location relative to the three-dimensional environment. Additionally or alternatively, in some embodiments, the input is or includes a gaze of the user directed at the frame or a user interface element displayed via the one or more display generation components and that is for moving the frame, and/or an input that uses one or more hardware input devices such as one or more buttons, trackpads, touch screens, keyboards, mice, voice inputs, and/or other input devices described herein.

In some embodiments, in response to detecting the input to move the frame for the 3D content in the three-dimensional environment, the computer system moves (1202e) the frame for the 3D content from a first location in the three-dimensional environment to a second location in the three-dimensional environment that is different from the first location in the three-dimensional environment (e.g., the frame is moved from the first location to the second location while the computer system is displaying the 3D content in the framed mode of display), such as shown from FIG. 11K to 11S with the movement of the frame 1134 in the three-dimensional environment 1100. In some embodiments, moving the frame from the first location to the second location includes moving the frame through a plurality of intermediate locations over time until the second location is reached. In some embodiments, in response to detecting the input, the computer system moves the frame and moves the 3D content (e.g., moves the frame and the 3D content at different or the same rates of movement (e.g., angular rates of movement and/or tangential rates of movement)) relative to the three-dimensional environment, and such embodiments are described further with reference to method 1300. In some embodiments, in response to detecting the input, the computer system moves the frame without moving the 3D content relative to the three-dimensional environment, and such embodiments are described further with reference to method 1300. Thus, the computer system optionally visually moves the frame for the 3D content in response to the input while the 3D content is in the framed mode of display. When the frame is moved, the computer system optionally maintains the visibility of the 3D content through the frame without making visible the 3D content outside of the frame from the current viewpoint of the user. As such, while the computer system displays the 3D content in the immersive mode of display, the computer system optionally detects an event that triggers transitioning the mode of display of the 3D content to the frame mode of display, and in response, the computer system optionally displays the 3D content in the frame mode of display as described above, and the computer system moves the frame in the three-dimensional environment in response to input to move the frame for the 3D content. Facilitating transition of 3D content from the immersive mode of display to the framed mode of display allows display of different amounts of an available field of view of the 3D content from the current viewpoint of the user, conserves processing power when the field of view of the 3D content is in the frame mode of display since less of the available field of view of the 3D content is visible in the framed mode of display, and further, the moveability of the frame for the 3D content in the three-dimensional environment provides a user with control over where the frame for the 3D content, which enhances user experience with the computer system.

In some embodiments, when the 3D content is displayed in the immersive mode of display, the 3D content is displayed in the three-dimensional environment (e.g., such as at a first location in the three-dimensional environment, optionally with portions being apparently displayed at different depths in the three-dimensional environment), such as virtual content 1102 in FIG. 11A. In some embodiments, while displaying the 3D content in the immersive mode of display, the computer system detects an event corresponding to a request to move the 3D content from a first respective location to a second respective location in the three-dimensional environment different from the first respective location. For example, while displaying virtual content 1102 in the immersive mode as shown in FIG. 11A, the computer system optionally detects an input to move the virtual content 1102 in the direction 1138a such as shown in FIG. 11K. The input optionally includes an air gesture (e.g., an air pinch gesture) performed by one or more hands of the user and directed to the 3D content (e.g., based on attention being directed to the 3D content and/or based on the air gesture occurring at a location corresponding to the 3D content), and further, optionally includes movement of the one or more hands (while optionally maintaining a final pose of the hand in the air gesture, such as an air pinch position with an index finger of the user touching the thumb of the user) corresponding to requested movement of the 3D content from the first respective location to the second respective location. Additionally or alternatively, in some embodiments, the input is or includes attention (e.g., based on gaze) of the user directed at the 3D content and/or an input that uses one or more hardware input devices such as one or more buttons, trackpads, touch screens, keyboards, mice, voice inputs, and/or other input devices described herein. When displaying the 3D content in the immersive mode of display, the computer system optionally does not display the frame.

In some embodiments, in response to detecting the event corresponding to the request to move the 3D content from the first respective location to the second respective location in the three-dimensional environment, the computer system forgoes movement of the 3D content (e.g., the computer system maintains the 3D content at its current position). For example, while displaying virtual content 1102 in the immersive mode as shown in FIG. 11A, the computer system optionally detects an input to move the virtual content 1102 in the direction 1138a of FIG. 11K, and in response the computer system maintains the position of the virtual content 1102 at its location shown in FIG. 11A. As such, when the 3D content is in the immersive mode of display, the computer system maintains the 3D content at its current position, thus restricting from movement the position of the 3D content in the three-dimensional environment.

Maintaining the location of the 3D content in the three-dimensional environment even if movement input requests are detected conserves processing power of the computer system because the computer system does not have to respect movement requests for moving the 3D content and enhances user experience with the computer system.

In some embodiments, when the 3D content occupies the first amount of the available field of view from the current viewpoint of the user in the immersive mode of display, a level of immersion of the 3D content is a first level of immersion (e.g., the first level of immersion is optionally as described with reference to a level of immersion of the 3D content described with reference to block 1202a of FIG. 12), such as the immersion level of virtual content 1102 in FIG. 11A. In some embodiments, while the 3D content is displayed in the immersive mode of display, and while the level of immersion of the 3D content is the first level of immersion, the computer system detects, via the one or more input devices, an input that requests to change a level of immersion of the 3D content from the first level of immersion to a second level of immersion different from the first level of immersion, such as the input from hand 1101a in FIG. 11C. In some embodiments, the input includes an air gesture (e.g., an air pinch gesture) performed by one or more hands of the user and directed to the 3D content (e.g., based on attention being directed to the 3D content and/or based on the air gesture occurring at a location corresponding to the 3D content), and further, optionally includes movement of the one or more hands (while optionally maintaining a final pose of the hand in the air gesture, such as an air pinch position with an index finger of the user touching the thumb of the user) corresponding to a requested change in level of immersion. Additionally or alternatively, in some embodiments, the input is or includes attention (e.g., based on gaze) of the user directed at the 3D content or a user interface element displayed via the one or more display generation components and that is for changing a level of immersion of the 3D content, and/or an input that uses one or more hardware input devices such as one or more buttons, trackpads, touch screens, keyboards, mice, voice inputs, and/or other input devices described herein. In some embodiments, if a direction is associated with the input, then the second level is greater than or less than the first level based on the direction. In some embodiments, if a magnitude is associated with the input, then a difference between the first and second levels of immersion is proportional to the magnitude.

In some embodiments, in response to detecting the input that requests to change the level of immersion of the 3D content from the first level of immersion to the second level of immersion (e.g., while the 3D content is displayed in the immersive mode of display), the computer system changes the level of immersion of the 3D content from the first level of immersion to the second level of immersion, including displaying, via the one or more display generation components, the 3D content occupying a second amount of the available field of view from the current viewpoint of the user, different from the first amount of the available field of view, such as shown with the change of immersion level of virtual content 1102 from FIG. 11C to 11D. When the second level of immersion is greater than the first level of immersion, the second amount of the available field of view is greater than the first amount of the available field of view, and when the second level of immersion is less than the first level of immersion, the second amount of the available field of view is less than the first amount of the available field of view. In some embodiments, while in the immersive mode of display, when the immersion level is decreased, the computer system presents more of the three-dimensional environment; in some embodiments, while in the immersive mode of display, when the immersion level is increased, the computer system presents less of the three-dimensional environment. As such, the computer system changes the level of immersion of the 3D content in response to input for such while the 3D content is being displayed in the immersive mode of display. The above-described manner of changing the level of immersion of the 3D content while in the immersive mode of display maintains a position of the 3D content in the three-dimensional environment which assists the user in understanding the relative positions of the 3D content and the three-dimensional environment, which enhances user experience.

In some embodiments, the one or more input devices via which the input that requests to change the level of immersion of the 3D content from the first level of immersion to the second level of immersion is detected includes a rotatable mechanical input element (e.g., a physical rotatable dial that can be rotated, and optionally pushed) of the computer system, and the input that requests to change the level of immersion of the 3D content from the first level of immersion to the second level of immersion includes rotation of the rotatable mechanical input element of the computer system. For example, in FIG. 11C, hand 1101a of user is optionally on the rotatable mechanical input element of computer system 101, and the rotation of the input element is included in the input in FIG. 11C. The computer system optionally determines a direction and magnitude of the change in immersion based on the direction and magnitude of the rotation. For example, if the direction of the rotation is a first direction, then the computer system optionally determines that the input is for changing the level of immersion in a first direction (e.g., a decrease or an increase), and if the direction of the rotation is a second direction, different from the first direction, the computer system optionally determines that the input is for changing the level of immersion in second direction different from (e.g., opposite) the first direction of change. Further, if the magnitude of the rotation is a first amount, then a difference in level of immersion between the first and second levels of immersion is a first difference, and if the magnitude is a second amount, different from the first amount, the difference in level of immersion between the first and second levels of immersion is a second difference that is greater than the first difference. The above described manner of changing the level of immersion of the 3D content via the rotatable mechanical input element of the computer system provides the user with control of the level of immersion of the 3D content while the 3D content is in the immersive mode of display, corresponds inputs detected via the rotatable mechanical input element to immersion change requests, and provides case of access to control of the level of immersion of the 3D content which enhances user experience with the computer system.

In some embodiments, while the 3D content is displayed in the immersive mode of display, the computer system displays, via the one or more display generation components, a user interface element selectable to display the 3D content in the framed mode of display, such as user interface element 1122 in FIG. 11F. In some embodiments, detecting the event corresponding to the triggering condition for transitioning from displaying the 3D content in the immersive mode of display to displaying the 3D content in the framed mode of display includes detecting, via the one or more input devices, an input directed at the user interface element selectable to display the 3D content in the framed mode of display, such as attention (e.g., based on gaze 1128a) directed to user interface element 1122 in FIG. 11G. In some embodiments, the input directed at the user interface element selectable to display the 3D content in the framed mode of display includes one or more of the characteristics of the input to move the frame for the 3D content in the three-dimensional environment described with reference to block 1202c of FIG. 12, but directed to the user interface element described above. For example, the input optionally includes an air gesture (e.g., an air pinch and release gesture) performed by one or more hands of the user while attention of the user (e.g., based on gaze) is directed at the user interface element. As such, in some embodiments, the computer system facilitates detection of requests to change from immersive mode of display to framed mode of display by detecting user interaction with the user interface element that is displayed to be selectable for transitioning display of the 3D content to the framed mode of display. Displaying a user interface element selectable to transition the mode of display of the 3D content to the framed mode corresponds inputs directed to the user interface element specifically as requests to transition to the frame mode of display, provides user control over the mode of display of the 3D content, and provides case of access to transition the mode to the frame mode while the 3D content is being displayed in the immersive mode, which enhances user experience with the computer system.

In some embodiments, the user interface element selectable to display the 3D content in the framed mode of display is overlaid on a portion of the 3D content from the current viewpoint of the user, such as user interface element 1122 in FIG. 11F. For example, the user interface element is optionally displayed as an overlay at a top left portion of the 3D content or at another portion (e.g., bottom left, right, top right, center, or another portion) of the 3D content. In some embodiments, the user interface element is displayed closer to the viewpoint of the user than at least some portion of the 3D content. In some embodiments, the user interface element obscures from display at least some portion of the content from the viewpoint of the user. Displaying a user interface element selectable to transition the mode of display of the 3D content to the framed mode as an overlay on a portion of the 3D content in the immersive mode corresponds inputs directed to the user interface element as requests to transition to the frame mode of display and provides case of access to transition the mode to the frame mode while the 3D content is being displayed in the immersive mode, since the user would already likely be looking in the direction of the 3D content when the user desires to transition mode of the 3D content, which enhances user experience with the computer system.

In some embodiments, the user interface element selectable to display the 3D content in the framed mode of display is displayed in a playback control user interface that includes playbacks controls for controlling playback of the 3D content, such as user interface element 1124 in playback control user interface 710 in FIG. 11F. For example, the user interface element is optionally displayed in a playback user interface that includes playback controls, such as rewind, fast forward, pause, play, a title of the 3D content in playback, a content timeline indicator for indicating a length of time of the 3D content, and/or other playback controls. In some embodiments, while the playback user interface is displayed, the computer system detects an input directed to a playback control in the playback user interface, and in response performs operation(s) corresponding to the selected playback control. Displaying in a playback user interface a user interface element selectable to transition the mode of display of the 3D content to the framed mode corresponds inputs directed to the user interface element as requests to transition to the frame mode of display and provides case of access to transition the mode to the frame mode while the 3D content is being displayed in the immersive mode, since the user might already likely be looking in the direction of the playback user interface when the user desires to transition mode of the 3D content, which enhances user experience with the computer system.

In some embodiments, while the 3D content is displayed in the framed mode of display, the computer system detects an event (e.g., a sequence of one or more inputs detected via the one or more input devices) corresponding to a triggering condition for transitioning from displaying the 3D content in the framed mode of display to displaying the 3D content in the immersive mode of display, such as selection of user interface element 1124a in FIG. 11X. In some embodiments, the event corresponding to the triggering condition for transitioning from displaying the 3D content in the framed mode of display to displaying the 3D content in the immersive mode of display includes one or more characteristics of the event described with reference to block 1202b of FIG. 12, but corresponding to the triggering condition for transitioning from displaying the 3D content in the framed mode of display to displaying the 3D content in the immersive mode of display. Further details of the event are described below with reference to selection of a user interface element selectable to display the 3D content in the immersive mode of display.

In some embodiments, in response to detecting the event corresponding to the triggering condition for transitioning from displaying the 3D content in the framed mode of display to displaying the 3D content in the immersive mode of display, the computer system displays, via the one or more display generation components, the 3D content in the immersive mode of display in the three-dimensional environment, such as shown with virtual content 1102 being in the immersive mode in FIG. 11AB. In some embodiments, in response to detecting the event, the computer system shows one or more transition animations, such as the animation of the transition from display of the 3D content in the framed mode of display to display of the 3D content in the immersive mode of display described below. In some embodiments, in response to detecting the event, the computer system ceases display of the frame and increases the amount of the field of view of the 3D content that is displayed from the current viewpoint of the user, such as from the second amount to the first amount described with reference to step(s) 1202 in FIG. 12.

In some embodiments, while displaying the 3D content in the immersive mode of display, the computer system detects an event corresponding to a request to move the 3D content from a first respective location to a second respective location in the three-dimensional environment different from the first respective location. For example, while displaying virtual content 1102 in the immersive mode as shown in FIG. 11AB, the computer system optionally detects an input to move the virtual content 1102 in the direction 1138a of FIG. 11K In some embodiments, the event corresponding to the request to move the 3D content from the first respective location to the second respective location in the three-dimensional environment includes one or more characteristics of the detection of the input described with reference to the input to move the frame for the 3D content in the three-dimensional environment, but corresponding to the request to move the 3D content from the first respective location to the second respective location in the three-dimensional environment. For example, the event optionally includes an air pinch of a user's hand, and movement of the hand, as if the user intends to grab the 3D content and move it from the first respective location to the second respective location.

In some embodiments, in response to detecting the event corresponding to the request to move the 3D content from the first respective location to the second respective location in the three-dimensional environment, the computer system forgoes movement of the 3D content (e.g., the computer system maintains the 3D content at its current position). For example, while displaying virtual content 1102 in the immersive mode as shown in FIG. 11AB, the computer system optionally detects an input to move the virtual content 1102 in the direction 1138*a* of FIG. 11K, and in response the computer system maintains the position of the virtual content 1102 at its location shown in FIG. 11AB. As such, the computer system optionally does not respect events that request movement of the 3D content while the 3D content is in the immersive mode of display. In some embodiments, the computer system displays the 3D content in the framed mode before displaying it in the immersive mode, and the location that the computer system displays the 3D content in the immersive mode is based on the location that the 3D content had in the three-dimensional environment while in the frame mode. As such, while the computer system displays the 3D content in the framed mode of display, the computer system optionally detects an event that triggers transitioning the mode of display of the 3D content to the immersive mode of display, and in response, the computer system optionally displays the 3D content in the immersive mode of display, in which the 3D content is restricted from movement from the location to which it was initially displayed in the immersive mode of display. Facilitating transition of 3D content from the framed mode of display to the immersive mode of display allows display of different amounts of an available field of view of the 3D content, permits visibility of more of the 3D content when in the immersive mode of display, since more of the available field of view of the 3D content is visible in the immersive mode of display, and further, the lack of moveability of the 3D content in the three-dimensional environment maintains the spatial arrangement of the 3D content and the three-dimensional environment which helps orient the user, since the spatial arrangement does not change while the 3D content is in the immersive mode.

In some embodiments, while the 3D content is displayed in the framed mode of display, the computer system displays, via the one or more display generation components, a user interface element selectable to display the 3D content in the immersive mode of display, such as user interface element 1122*a* in FIG. 11X. In some embodiments, detecting the event corresponding to the triggering condition for transitioning from displaying the 3D content in the framed mode of display to displaying the 3D content in the immersive mode of display includes detecting, via the one or more input devices, an input directed at the user interface element selectable to display the 3D content in the immersive mode of display, such as attention (e.g., based on gaze 11281) directed to user interface element 1122*a* in FIG. 11Y. In some embodiments, the input directed at the user interface element selectable to display the 3D content in the immersive mode of display includes one or more of the inputs directed at the user interface element selectable to display the 3D content in the framed mode of display described above. For example, the input optionally includes an air gesture (e.g., an air pinch and release gesture) performed by one or more hands of the user while attention of the user (e.g., based on gaze) is directed at the user interface element. As such, in some embodiments, the computer system facilitates detection of requests to change from framed mode of display to immersive mode of display by detecting user interaction with the user interface element that is displayed to be selectable for transitioning display of the 3D content to the immersive mode of display. Displaying a user interface element selectable to transition the mode of display of the 3D content to the immersive mode corresponds inputs directed to the user interface element specifically as requests to transition to the immersive mode of display, provides user control over the mode of display of the 3D content, and provides case of access to transition the mode to the frame mode while the 3D content is being displayed in the framed mode, which enhances user experience with the computer system.

In some embodiments, the user interface element selectable to display the 3D content in the immersive mode of display is overlaid on a portion of the 3D content from the current viewpoint of the user, such as user interface element 1124*b* in FIG. 11X. For example, the user interface element is optionally displayed as an overlay at a top left portion of the 3D content or at another portion (e.g., bottom left, right, top right, center, or another portion) of the 3D content. In some embodiments, the user interface element is displayed closer to the viewpoint of the user than at least some portion of the 3D content. In some embodiments, the user interface element is displayed closer to the viewpoint of the user than at least some portion of the frame. In some embodiments, from the viewpoint of the user, the user interface element is displayed between the frame and at least some portion of the 3D content. In some embodiments, the user interface element is displayed proximate to the left, right, top right, center, or another portion of the frame from the viewpoint of the user. In some embodiments, the user interface element obscures from display at least some portion of the content and/or the frame from the viewpoint of the user. Displaying a user interface element selectable to transition the mode of display of the 3D content to the immersive mode as an overlay on a portion of the 3D content in the framed mode corresponds inputs directed to the user interface element as requests to transition to the immersive mode of display and provides case of access to transition the mode to the frame mode while the 3D content is being displayed in the frame mode, since the user would already likely be looking in the direction of the 3D content when the user desires to transition mode of the 3D content, which enhances user experience with the computer system.

In some embodiments, the user interface element selectable to display the 3D content in the immersive mode of display is displayed in a playback control user interface that includes playbacks controls for controlling playback of the 3D content, such as user interface element 1122*a* in playback control user interface 710 in FIG. 11X. For example, the user interface element is optionally displayed in a playback user interface that includes playback controls, such as rewind, fast forward, pause, play, a title of the 3D content in playback, a content timeline indicator for indicating a length of time of the 3D content, and/or other playback controls. In some embodiments, while the playback user interface is displayed, the computer system detects an input directed to a playback control in the playback user interface, and in response performs operations corresponding to the selected playback control. Displaying in a playback user interface a user interface element selectable to transition the mode of display of the 3D content to the immersive mode corresponds inputs directed to the user interface element as requests to transition to the immersive mode of display and provides ease of access to transition the mode to the frame mode while the 3D content is being displayed in the framed mode, since the user might already likely be looking in the direction of the playback user interface when the user desires to transition mode of the 3D content, which enhances user experience with the computer system.

In some embodiments, the 3D content has a content horizon for the 3D content (e.g., a content horizon plane or line that is perpendicular to a "down" direction such as a direction of gravity in the content or is a horizon), such as content horizon 1112b in FIG. 11A. In some embodiments, the three-dimensional environment has an environment horizon for the three-dimensional environment (e.g., an environment horizon plane or line that is perpendicular to a "down" direction such as a direction of gravity in the three-dimensional environment or is a horizon), such as environment horizon 1112a in FIG. 11A. In some embodiments, while the 3D content is displayed in the immersive mode of display, the 3D content is displayed in the three-dimensional environment (e.g., in three-dimensional environment 1100 in FIG. 11A), and the content horizon for the 3D content is aligned with the environment horizon for the three-dimensional environment (e.g., the content horizon is coincident and/or parallel, and/or within 0.5, 1, or 5 degrees of being parallel with the environment horizon and/or a direction of gravity (or other defined "down" direction) in the virtual content is optionally parallel (and/or within 0.5, 1, or 5, degrees of being parallel) to a direction of gravity (or other defined "down" direction) in the three-dimensional environment), such as the content horizon 1112b being aligned with the environment horizon 1112a in FIG. 11A. In some embodiments, while the 3D content is displayed in the immersive mode of display, in accordance with a determination that the content horizon is aligned with the environment horizon while the 3D content is displayed in the immersive mode of display, the computer system maintains the alignment of the content horizon with the environment horizon for the duration (e.g., continuous duration) of the display of the 3D content in the immersive mode of display. In some embodiments, while the 3D content is in the immersive mode of display, if the computer system was to detect an input corresponding to a request to cease the alignment of the content horizon with the environment horizon while the 3D content is in the immersive mode of display, the computer system would maintain the alignment (e.g., would not move the content horizon relative to the environment horizon). Thus, in some embodiments, the horizons of the content and of the three-dimensional environment can be maintained in alignment while the 3D content is in the immersive mode of display. Further discussion of alignment of the content horizon with the environment horizon and the maintaining thereof is provided with reference to method 1300. In some embodiments, the content horizon for the 3D content includes one or more characteristics of the content horizon for the virtual content described with reference to method 1300. In some embodiments, the environment horizon for the three-dimensional environment includes one or more characteristics of the environment horizon for the three-dimensional environment described with reference to method 1300. In some embodiments, alignment of the content horizon for the 3D content with the environment horizon for the three-dimensional environment includes one or more characteristics of the alignment of the content horizon for the virtual content with the environment horizon for the three-dimensional environment described with reference to method 1300. Maintaining the alignment of the content horizon and the environment horizon even if the computer system was to detect an input corresponding to a request to cease the alignment while the 3D content is in the immersive mode of display provides feedback that the content horizon and the environment horizon are aligned, which may reduce errors resulting from undesired movements of the 3D content, reduces unintentional changes in alignment, and reduces user discomfort due to unintentional changes in alignment.

In some embodiments, when the input to move the frame for the 3D content in the three-dimensional environment is detected, an angle of the frame for the 3D content relative to the three-dimensional environment is a first angle relative to the three-dimensional environment, such as the angle of frame 1134 in FIG. 11N. In some embodiments, while displaying, via the one or more display generation components, the 3D content in the framed mode of display, in response to detecting the input to move the frame for the 3D content in the three-dimensional environment, the computer system moves the frame for 3D content to the second location in the three-dimensional environment and changes the angle of the frame for the 3D content relative to the three-dimensional environment from the first angle relative to the three-dimensional environment to a second angle relative to the three-dimensional environment that is different from the first angle (e.g., moving and tilting the frame (e.g., rotating the frame in the three-dimensional environment optionally about a position associated with the user)), such as the rotating of the frame 1134 shown from FIG. 11N to 11O. In some embodiments, when the 3D content is at the second location in the three-dimensional environment, the angle of the frame for the 3D content relative to the three-dimensional environment is the second angle relative to the three-dimensional environment, such as the angle of frame 1134 shown in FIG. 11O. In some embodiments, the computer system rotates the frame about a position in the three-dimensional environment, such as position corresponding to user relative to the three-dimensional environment (e.g., the viewpoint of the user), in response to a request to move the frame. In some embodiments, the computer system tilts the frame to maintain a preferred spatial arrangement of the frame relative to the viewpoint of the user. For example, the preferred spatial arrangement optionally is the frame being perpendicular to a vector extending from the viewpoint of the user to a center of the frame (e.g., a plane that is parallel to the width and/or length of the frame is perpendicular to the vector), and when the frame is at the first location in the three-dimensional environment, the frame is optionally oriented in the three-dimensional environment perpendicular to a vector extending from the viewpoint of the user to a center of the frame. Continuing with this example, in response to the input to move the frame to the second location, the computer system optionally moves the frame to the second location and tilts the frame relative to the three-dimensional environment such that when the frame is at the second location, the frame is optionally oriented perpendicular to a vector extending from the viewpoint of the user to a center of the frame. Moving and tilting the frame in response to requests to move the frame provides user control over where the frame is to be displayed in the three-dimensional environment, which helps arrange elements of the three-dimensional environment, and can maintain a preferred spatial arrangement between the frame and the viewpoint of the user, which increases desirable user interactions with the computer system.

In some embodiments, when the input to move the frame for the 3D content in the three-dimensional environment is detected, the content horizon for the 3D content is aligned with the environment horizon for the three-dimensional environment, such as the content horizon 1112*b* being aligned with the environment horizon 1112*a* in FIG. 11K. In some embodiments, while moving the frame for 3D content to the second location in the three-dimensional environment and changing the angle of the frame for the 3D content relative to the three-dimensional environment from the first angle relative to the three-dimensional environment to the second angle relative to the three-dimensional environment (e.g., while moving and tilting the frame (e.g., rotating the frame in the three-dimensional environment optionally about a position associated with the user)), the computer system maintains alignment of the content horizon for the 3D content with the environment horizon for the three-dimensional environment, including changing a spatial arrangement between the frame for the 3D content and the 3D content in accordance with movement of the frame for the 3D content (e.g., changing a position and/or orientation of the frame relative to the 3D content, which is understood to be the same as changing a position and/or orientation of the 3D content relative to the frame, in accordance with the moving and tilting of the frame (e.g., the rotating of the frame in the three-dimensional environment about optionally about a position associated with the user)), such as shown with the maintaining of alignment of the content horizon 1112*b* with the environment horizon 1112*a* while the frame 1134 has moved from FIG. 11K to 11L. For example, though the frame for the 3D content is being moved and tilted relative to the three-dimensional environment, the 3D content is not being moved and tilted relative to the three-dimensional environment, which indicates that the content horizon is maintained in alignment with the environment horizon, during the moving and tilting of the frame. As another example, though the frame is being moved and tilted relative to the three-dimensional environment, a direction of gravity in the 3D content relative to the three-dimensional environment is not changed relative to three-dimensional environment. In some embodiments, if a distance between the first and second locations is a first distance in the three-dimensional environment, the change in the spatial arrangement is a first amount of change, and if the distance between the first and second locations is a second distance that is greater than the first distance, the change in the spatial arrangement is a second amount of change that is greater than the first amount of change. Thus, in a manner, the 3D content that is displayed during the moving and tilting of the frame would be shown as shifting in location relative to the frame rather than relative to the three-dimensional environment as the moving and tilting of the frame occurs, which indicates that the content horizon is maintained in alignment with the environment horizon. Shifting the 3D content relative to the frame as the frame is moved and tilted in the three-dimensional environment to maintain alignment of the content horizon with the environment horizon maintains a position of the 3D content relative to the three-dimensional environment which helps the user understand their environment and reduces errors associated with misunderstanding of environments, which increases desirable user interactions with the computer system.

In some embodiments, in response to detecting the input to move the frame for 3D content to the second location in the three-dimensional environment, in accordance with a determination that an angular difference (e.g., an amount of tilt) between the first angle and the second angle is within a first range of angular difference (e.g., 0.3, 0.7, 1, 3, 10, 20 degrees, or another angular difference), the computer system changes a spatial arrangement between the frame for the 3D content and the 3D content in accordance with movement of the frame for the 3D content (e.g., changes a position and/or orientation of the frame relative to the 3D content, which is understood to be the same as changing a position and/or orientation of the 3D content relative to the frame, in accordance with the moving and tilting of the frame (e.g., the rotating of the frame in the three-dimensional environment about optionally about a position associated with the user)), such as shown with the frame 1134 moving relative to the virtual content 1102 from FIG. 11K to 11L. For example, when the angular difference (e.g., the amount of tilt) is within the first range, though the frame for the 3D content is being moved and tilted relative to the three-dimensional environment, the 3D content is not being moved and tilted relative to the three-dimensional environment. As another example, though the frame is being moved and tilted relative to the three-dimensional environment, a direction of gravity in the 3D content relative to the three-dimensional environment is not changed relative to three-dimensional environment. Thus, in a manner, when the angular difference is within the first range, the 3D content that is displayed during the moving and tilting of the frame would be shown as shifting in location relative to the frame rather than relative to the three-dimensional environment as the moving and tilting of the frame occurs.

In some embodiments, in response to detecting the input to move the frame for 3D content to the second location in the three-dimensional environment, in accordance with a determination that the angular difference between the first angle and the second angle is within a second range of angular difference (e.g., 0.3, 0.7, 1, 3, 10, 20, 30, 50, 60 degrees, or another angular difference that is optionally greater than the first range of angular difference), different from the first range of angular difference, the computer system maintains the spatial arrangement between the frame for the 3D content and the 3D content in accordance with the movement of the frame for the 3D content (e.g., maintains the position and/or orientation of the frame relative to the 3D content, which is understood to be the same as maintaining the position and/or orientation of the 3D content relative to the frame, in accordance with the moving and tilting of the frame (e.g., the rotating of the frame in the three-dimensional environment optionally about the position associated with the user)), such as shown with the spatial arrangement between frame 1134 and the virtual content 1102 being maintained from FIGS. 11O to 11P. For example, when the angular difference (e.g., the amount of tilt) is within the second range, the computer system optionally concurrently moves the frame and tilts the frame relative to the three-dimensional environment and moves the 3D content and tilts the 3D content relative to the three-dimensional environment in accordance with the movement of the frame. As another example, when the angular difference is within the second range, the computer system moves and tilts the frame relative to the three-dimensional environment and moves and tilts the 3D content relative to the three-dimensional environment in a manner that aligns a direction of gravity in the 3D content relative to the three-dimensional environment with the frame, as described further below with reference to the preferred spatial arrangement between frame and the 3D content. Thus, in a manner, when the angular difference is within the second range, the 3D content that is displayed during the moving and tilting of the frame would be shown as shifting in location relative to the three-dimensional environment as the moving and tilting of the frame occurs. In some embodiments, when the angular difference is within the second range, the computer system optionally concurrently moves and tilts the frame, as described above, and moves and tilts the 3D content and relative to the three-dimensional environment, optionally to maintain a preferred spatial arrangement between frame and the 3D content, as described below. For example, the preferred spatial arrangement between the frame and the 3D content is optionally the orientation of the longitudinal length of the frame relative to the three-dimensional environment being parallel to the direction of gravity in the 3D content and a reference of the 3D content having a specific spatial arrangement relative to the frame, such as the content horizon for the 3D content having a specific spatial arrangement relative to the frame. For example, if the moving, to the second location, and tilting of the frame would result in an orientation of the longitudinal length of the frame relative to the three-dimensional environment being changed to a first orientation, then the 3D content is moved and tilted relative to the three-dimensional environment in a manner that causes the direction of gravity in the 3D content to be parallel to the first orientation and that causes the reference of the 3D content and the frame to have the specific spatial arrangement when the frame is at the second location, and if the orientation of the longitudinal length of the frame relative to the three-dimensional environment is changed to a second orientation, different from the first orientation, then the 3D content is moved and tilted relative to the three-dimensional environment in a manner that causes the direction of gravity in the 3D content to be parallel to the second orientation and that causes the reference of the 3D content and the frame to have the specific spatial arrangement when the frame is at the second location. Shifting the 3D content relative to the frame as the frame is moved and tilted in the three-dimensional environment for a first range of change in angle and tilting the content as the frame is tilted for a second range of change in angle provides visual feedback of the amount of angular distance traversed from the first angle to the second angle, which helps the user understand their environment and reduces errors associated with misunderstanding of environments, which increases desirable user interactions with the computer system.

In some embodiments, in response to detecting the input to move the frame for the 3D content in the three-dimensional environment, while moving the frame for 3D content to the second location in the three-dimensional environment and changing the angle of the frame for the 3D content relative to the three-dimensional environment from the first angle relative to the three-dimensional environment to the second angle relative to the three-dimensional environment (e.g., while moving and tilting the frame (e.g., rotating the frame in the three-dimensional environment optionally about the position associated with the user)), during a first portion of the moving the frame for 3D content to the second location in the three-dimensional environment and changing of the angle of the frame for the 3D content relative to the three-dimensional environment (e.g., during a first portion of moving and tilting the frame (e.g., rotating the frame in the three-dimensional environment optionally about the position associated with the user)), the computer system changes a spatial arrangement between the frame for the 3D content and the 3D content in accordance with the movement of the frame for the 3D content, such as the changing of the spatial arrangement between the frame and the 3D content in accordance with the movement of the frame described above, such as shown with the frame 1134 moving relative to the virtual content 1102 from FIG. 11K to 11L.

In some embodiments, in response to detecting the input to move the frame for the 3D content in the three-dimensional environment, while moving the frame for 3D content to the second location in the three-dimensional environment and changing the angle of the frame for the 3D content relative to the three-dimensional environment from the first angle relative to the three-dimensional environment to the second angle relative to the three-dimensional environment (e.g., while moving and tilting the frame (e.g., rotating the frame in the three-dimensional environment optionally about the position associated with the user)), during a second portion of the moving the frame for 3D content to the second location in the three-dimensional environment and changing of the angle of the frame for the 3D content relative to the three-dimensional environment (e.g., during a second portion of moving and tilting the frame (e.g., rotating the frame in the three-dimensional environment optionally about the position associated with the user)), after the first portion of the moving the frame for 3D content to the second location in the three-dimensional environment and changing of the angle of the frame for the 3D content relative to the three-dimensional environment, the computer system maintains the spatial arrangement between the frame for the 3D content and the 3D content in accordance with the movement of the frame for the 3D content, such as the maintaining of the spatial arrangement between the frame and the 3D content in accordance with the movement of the frame described above, such as shown with the spatial arrangement between frame 1134 and the virtual content 1102 being maintained from FIGS. 11O to 11P. Thus, in some embodiments, the computer system shifts the 3D content relative to the frame rather than relative to the three-dimensional environment for a first portion of the movement and afterwards, shifts the 3D content relative to the three-dimensional environment during a second portion of the movement of the frame in a manner that maintains a spatial arrangement between the frame and the 3D content. Shifting the 3D content relative to the frame as the frame is moved and tilted in the three-dimensional environment followed by tilting the 3D content with the frame provides visual feedback of the amount of angular distance traversed and indicates a time of progression of the moving and tilting of the frame, which helps the user understand their environment and the progress of the computer system in completion the movement of the frame, which increases desirable user interactions with the computer system.

In some embodiments, in response to detecting the input to move the frame for the 3D content in the three-dimensional environment and during moving the frame for 3D content to the second location in the three-dimensional environment and changing of the angle of the frame for the 3D content relative to the three-dimensional environment (e.g., during moving and tilting the frame (e.g., rotating the frame in the three-dimensional environment optionally about the position associated with the user)), in accordance with a determination that the input to move the frame for the 3D content in the three-dimensional environment was detected while the content horizon for the 3D content was aligned with the environment horizon for the three-dimensional environment, the computer system maintains alignment of the content horizon for the 3D content with the environment horizon for the three-dimensional environment, including changing a spatial arrangement between the frame for the 3D content and the 3D content in accordance with movement of the frame for the 3D content (e.g., in accordance with the moving and tilting of the frame (e.g., the rotating of the frame in the three-dimensional environment about optionally about a position associated with the user)), such as shown with the frame 1134 moving relative to the virtual content 1102 from FIG. 11K to 11L, such as the maintaining of the alignment of the content horizon for the 3D content with the environment horizon for the three-dimensional environment, including changing the spatial arrangement between the frame for the 3D content and the 3D content from the first spatial arrangement to the second spatial arrangement, different from the first spatial arrangement, in accordance with movement of the frame for the 3D content described above.

In some embodiments, in response to detecting the input to move the frame for the 3D content in the three-dimensional environment and during moving the frame for 3D content to the second location in the three-dimensional environment and changing of the angle of the frame for the 3D content relative to the three-dimensional environment (e.g., during moving and tilting the frame (e.g., rotating the frame in the three-dimensional environment optionally about the position associated with the user)), in accordance with a determination that the input to move the frame for the 3D content in the three-dimensional environment was detected while the content horizon for the 3D content was not aligned with the environment horizon for the three-dimensional environment, the computer system changes an orientation of the content horizon for the 3D content relative to the environment horizon for the three-dimensional environment, including maintaining the spatial arrangement between the frame for the 3D content and the 3D content in accordance with the movement of the frame for the 3D content (e.g., in accordance with the moving and tilting of the frame (e.g., the rotating of the frame in the three-dimensional environment about optionally about a position associated with the user)), such as the maintaining of the spatial arrangement between the frame and the 3D content in accordance with the movement of the frame described above, such as shown with the spatial arrangement between frame 1134 and the virtual content 1102 being maintained from FIGS. 11O to 11P. Thus, in some embodiments, if the input to move the frame is detected when the content horizon is aligned with the environment horizon, the computer system shifts (e.g., moves and tilts) the 3D content relative to the frame rather than relative to the three-dimensional environment, and if the input to move the frame is detected when the content horizon is aligned with the environment horizon, the computer system shifts (e.g., moves and tilts) the 3D content relative to the three-dimensional environment in a manner that maintains a spatial arrangement between the frame and the 3D content. Shifting the 3D content relative to the frame as the frame is moved and tilted if the input is detected when the content horizon is aligned with the environment horizon and tilting the 3D content with the frame if the input is detected when the content horizon is not aligned with the environment horizon provides visual feedback of whether the content horizon is aligned with the environment horizon or not, and reduces errors associated with misunderstanding whether the content horizon is aligned with the environment or not, which increases desirable user interactions with the computer system.

In some embodiments, moving the frame for 3D content to the second location in the three-dimensional environment and changing the angle of the frame for the 3D content relative to the three-dimensional environment from the first angle relative to the three-dimensional environment to the second angle relative to the three-dimensional environment is movement in a respective rotation direction relative to the three-dimensional environment, such as direction 1138*a* being a rotation direction relative to the three-dimensional environment and direction 1136*a* being a rotation direction relative to the three-dimensional environment in FIG. 11K. For example, the movement in the respective rotation direction relative to the three-dimensional environment optionally is movement of the frame about an axis corresponding to a position of a viewpoint of the user as if the frame is revolving around the position of the viewpoint of the user in the three-dimensional environment in the respective rotation direction (e.g., parallel or perpendicular to the environment horizon for the three-dimensional environment).

In some embodiments, in response to the input to move the frame for the 3D content in the three-dimensional environment, while moving the frame for 3D content to the second location in the three-dimensional environment and changing the angle of the frame for the 3D content relative to the three-dimensional environment from the first angle relative to the three-dimensional environment to the second angle relative to the three-dimensional environment (e.g., while moving and tilting the frame (e.g., rotating the frame in the three-dimensional environment optionally about a position associated with the user)), in accordance with a determination that the respective rotation direction relative to the three-dimensional environment is a first respective rotation direction (e.g., a rotation direction that is perpendicular to the environment horizon for the three-dimensional environment described with reference to method 1300), the computer system changes a spatial arrangement between the frame for the 3D content and the 3D content in accordance with movement of the frame for the 3D content, such as the changing of the spatial arrangement between the frame and the 3D content in accordance with the movement of the frame described above, such as shown with the frame 1134 moving relative to the virtual content 1102 from FIG. 11K to 11L. In some embodiments, the computer system changes the spatial arrangement to maintain alignment of the content horizon for the 3D content with the environment horizon for the three-dimensional environment, such as described above and with reference to method 1300. In some embodiments, in response to the input to move the frame for the 3D content in the three-dimensional environment, while moving the frame for 3D content to the second location in the three-dimensional environment and changing the angle of the frame for the 3D content relative to the three-dimensional environment from the first angle relative to the three-dimensional environment to the second angle relative to the three-dimensional environment, while moving and tilting the frame (e.g., rotating the frame in the three-dimensional environment optionally about a position associated with the user), in accordance with a determination that the respective rotation direction relative to the three-dimensional environment is a second respective rotation direction (e.g., a rotation direction that is parallel to the environment horizon for the three-dimensional environment described with reference to method 1300) different from the first respective rotation direction, the computer system maintains the spatial arrangement between the frame for the 3D content and the 3D content in accordance with the movement of the frame for the 3D content, such as shown with the spatial arrangement between frame 1134 and the virtual content 1102 being maintained from FIG. 11K to 11S. Further details of maintaining of the spatial arrangement between the frame and the 3D content in accordance with the movement of the frame are described elsewhere herein, such as above and/or with reference to method 1300. In some embodiments, the computer system maintains the spatial arrangement because movement of the frame in the second direction does not break (e.g., does not cease or decrease) alignment of the content horizon for the 3D content with the environment horizon for the three-dimensional environment, such as described above and with reference to method 1300. For example, movement of the frame in the second direction is optionally parallel to the horizon so it does not result in a decrease in alignment of the content horizon and the environment horizon. Shifting the 3D content relative to the frame as the frame is moved and tilted in a first rotation direction and tilting the 3D content with the frame when the frame is moved and tilted in a second rotation direction provides visual feedback of the rotation direction of the frame and reduces errors associated with misunderstanding whether the content horizon is aligned with the environment or not, which increases desirable user interactions with the computer system.

In some embodiments, while displaying the 3D content in the framed mode of display at a first respective location in the three-dimensional environment, including displaying the 3D content in the frame for the 3D content in the three-dimensional environment, while a first portion of the 3D content is displayed in the frame for the 3D content from a first viewpoint of the user and a second portion of the 3D content, different from the first portion of the 3D content, is not displayed in the frame for the 3D content from the first viewpoint of the user, the computer system detects an event corresponding to a request to change a viewpoint of the user from the first viewpoint of the user to a second viewpoint of the user, different from the first viewpoint of the user, such as computer system displaying three-dimensional environment 1100 in FIG. 11J and detecting movement of the user 1101 towards the frame 1134. The event optionally includes movement of the user in the physical environment of the user towards or away from the frame, and/or lateral movement of the user in the physical environment relative to the position of the frame in the three-dimensional environment, and/or includes movement of the frame in the three-dimensional environment towards or away from a position of the user in the physical environment of the user, and/or lateral movement of the frame in the three-dimensional environment relative to the position of the user in the physical environment of the user.

In some embodiments, in response to detecting the event corresponding to the request to change the viewpoint of the user from the first viewpoint of the user to the second viewpoint of the user, the computer system changes the viewpoint of the user from the first viewpoint of the user to the second viewpoint of the user, including updating display, via the one or more display generation components, of the 3D content that is displayed in the frame for the 3D content from the first portion of the 3D content to the second portion of the 3D content, such as the computer system in response to the user 1101 moving towards the frame 1134 to the location illustrated in FIG. 11J displaying three-dimensional environment 1100 in FIG. 11U, which includes a portion of the virtual content 110 that was not displayed in the three-dimensional environment 1100 in frame 1134 in FIG. 11J. As an example, if the event is leftward movement of the user, relative to the frame, in the physical environment of the user or is movement of the frame rightward relative to the user, the second viewpoint of the user is to the left of the first viewpoint of the user, and the second portion of 3D content that is displayed in the frame at the second viewpoint of the user includes a part of the 3D content that would be to the right of the first portion of the 3D content that was displayed when the viewpoint of the user was the first viewpoint of the user. As another example, if the event is rightward lateral movement of the user, relative to the frame, in physical environment or is movement of the frame leftward relative to the user, the second viewpoint of the user is to the right the first viewpoint of the user, and the second portion of 3D content that is displayed in the frame at the second viewpoint of the user includes a part of the 3D content that would be to the left of the 3D content that was displayed when the viewpoint of the user was the first viewpoint of the user. As another example, if the event is upward vertical movement of the user, relative to the frame, in the physical environment of the user or is movement of the frame downward relative to the user, the second viewpoint of the user is above the first viewpoint of the user, and the second portion of 3D content that is displayed in the frame at the second viewpoint of the user includes a part of the 3D content that would be below the 3D content that was displayed when the viewpoint of the user was the first viewpoint of the user. As another example, if the event is downward vertical movement of the user, relative to the frame, in the physical environment of the user or is movement of the frame upward relative to the user, the second viewpoint of the user is under the first viewpoint of the user, and the second portion of 3D content that is displayed in the frame at the second viewpoint of the user includes a part of the 3D content that would be above of the 3D content that was displayed when the viewpoint of the user was the first viewpoint of the user. The discussion of the event including movement of the frame in the three-dimensional environment towards or away from a position of the user in the physical environment of the user is provided below with reference to the distance between the viewpoint of the user and the frame. Changing the part of the 3D content that is displayed in the frame in response to a change in viewpoint of the user relative to the frame allows user exploration of the 3D content, which in the frame mode may have a wider field of view than the field of view that is available from any particular viewpoint of the user, thus providing insight into a scope of the field of view of the 3D content while the 3D content is in the framed mode of display, and reduces errors with misunderstanding an expansiveness of the 3D content.

In some embodiments, in response to detecting the event corresponding to the request to change the viewpoint of the user from the first viewpoint of the user to the second viewpoint of the user, such as the movement of the user 1101 from the illustrated position relative to the frame 1134 in FIG. 11J to the illustrated position relative to the frame 1134 in FIG. 11U corresponding to the request to move the viewpoint of the user toward the frame for the 3D content, in accordance with a determination that the event corresponding to the request to change the viewpoint of the user from the first viewpoint of the user to the second viewpoint of the user further corresponds to a request to move the viewpoint of the user toward the frame for the 3D content, and while moving the viewpoint of the user to the second viewpoint of the user, the computer system updates display, via the one or more display generation components, of the 3D content that is displayed in the frame for the 3D content to include a portion of the 3D content that is greater in portion than the first portion of the 3D content, such as the update of display in display generation component 120 from FIG. 11J to FIG. 11U including a greater portion of the virtual content 1102. For example, the computer system optionally continuously updates the portion (e.g., continuously reveals more of the 3D content through the frame) during the movement of the viewpoint of the user toward the frame (e.g., during the movement of the user 1101 from the illustrated position relative to the frame 1134 in FIG. 11J to the illustrated position relative to the frame 1134 in FIG. 11U), optionally until the viewpoint of the user is the second viewpoint, which is optionally when the computer system displays the second portion of the 3D content as shown in FIG. 11U, which would be greater than the first portion (and further, greater than in portion than the consecutive increases in portions that were displayed during the movement of the viewpoint of the user toward the frame). For example, if the event is movement of the user in the physical environment of the user that corresponds to movement towards the frame in the three-dimensional environment, or is movement of the frame towards the user, the second viewpoint of the user is in front of the first viewpoint of the user, and the second portion of 3D content that is displayed in the frame at the second viewpoint of the user is a greater portion of the 3D content (e.g., includes the first portion and a part of the 3D content that would be about the first portion that was displayed when the viewpoint of the user was the first viewpoint of the user). Alternatively, if the event is movement of the user in the physical environment of the user that corresponds to movement away from the frame in the three-dimensional environment, or is movement of the frame away from the user, the second viewpoint of the user is in behind the first viewpoint of the user, and the second portion of 3D content that is displayed in the frame at the second viewpoint of the user is a lesser portion of the 3D content (e.g., includes a first part of the first portion without including a second part of the first portion that was about the first part of the first portion that was displayed when the viewpoint of the user was the first viewpoint of the user). Thus, in some embodiments, a field of view of the 3D content that is visible in the frame relative to the viewpoint is based on a distance between the viewpoint of the user and the frame, such that, if the distance is a first respective distance, the field of view of the 3D content relative to the viewpoint of the user is a first field of view, if the distance is a second respective distance greater than the first respective distance, the field of view of the 3D content is a second field of view that is less than the first field of view, and if the distance is a third respective distance less than the first respective distance, the field of view of the 3D content is a third field of view that is greater than the first field of view. Showing more of the 3D content when the distance between the frame and the viewpoint of the user is reduced increases user immersion in the three-dimensional environment, allows user exploration of the 3D content, which in the frame mode may have a wider field of view than the field of view that is available from any particular viewpoint of the user, thus providing insight into a scope of the field of view of the 3D content while the 3D content is in the framed mode of display, and reduces errors with misunderstanding an expansiveness of the 3D content.

In some embodiments, while displaying the 3D content in the framed mode of display from a first viewpoint of the user, the computer system detects an event corresponding to a request to change a spatial arrangement between a viewpoint of the user and the frame for the 3D content, such as the movement of the user 1101 from the illustrated position relative to the frame 1134 in FIG. 11U to the illustrated position relative to the frame 1134 in FIG. 11V corresponding to change the spatial arrangement between the viewpoint of the user and the frame for the 3D content. The event optionally includes movement of the user in the physical environment of the user towards a location in the physical environment that corresponds to a location of the frame in the three-dimensional environment, and/or includes movement of the frame in the three-dimensional environment towards the position of the user in the three-dimensional environment. For example, the event optionally is the user moving into the frame and/or the user pulling the frame too close to the user.

In some embodiments, in response to detecting the change in the spatial arrangement between the viewpoint of the user and the frame for the 3D content, in accordance with a determination that a distance between the frame for the 3D content and the second viewpoint of the user is less than a respective threshold distance (e.g., 4, 3, 2, 1, 0.8, 0.5, 0.3, 0.1 m, or another respective threshold distance, or the frame intersects or would intersect the second viewpoint of the user), the computer system reduces in visual prominence (e.g., reduces a visual prominence, fades out, increases a respective translucency, increases a transparency, decreases a color saturation, decreases a brightness, ceases to display, and/or fades out) the 3D content, such as shown with the environment of the user being visible (e.g., the physical environment of the user 1101 of the computer system) at the intersection of the frame and the viewpoint of the user in FIG. 11V. For example, the three-dimensional environment different from the 3D content becomes more visible and/or increased in visual prominence if the distance between the frame and the second viewpoint of the user is less than the respective threshold distance. Additionally or alternatively, in some embodiments, in response to detecting the change in the spatial arrangement between the viewpoint of the user and the frame for the 3D content, in accordance with a determination that the distance between the frame and the second viewpoint of the user is more than the respective threshold distance, the computer system maintains a visual prominence of the 3D content. Decreasing a visual prominence of the 3D content when a distance between the viewpoint of the user and the 3D content is less than a threshold indicates that the distance has changed to less than the threshold and provides spatial understanding of the user's environment outside of the 3D content, which increases user safety with the computer system and reduces errors in interacting in their environment.

In some embodiments, while displaying the 3D content in the framed mode of display from a first viewpoint of the user, and while a distance between a portion of the user of the computer system (e.g., a head, hand, torso, or another portion of the user) and the frame for the 3D content is a first distance that is greater than a respective threshold distance (e.g., the respective threshold distance described above with reference to the frame and the second viewpoint of the user), the computer system detects an event, the event including a change in distance between the portion of the user of the computer system and the frame for the 3D content from the first distance to a second distance, less than the first distance (e.g., the event includes the distance between the portion of the user and the frame being less than the respective threshold distance described above with reference to the frame and the second viewpoint of the user (e.g., less than 4, 3, 2, 1, 0.8, 0.5, 0.3, 0.1 m, or another respective threshold distance, or the portion of the user intersects or would intersect the frame)), such as hand 1101a of the user 1101 being in the frame 1134 in FIG. 11W.

In some embodiments, in response to detecting the event, in accordance with a determination that the second distance is less than the respective threshold distance, the computer system reduces in visual prominence (e.g., reduces a visual prominence, fades out, increases a respective translucency, increases a transparency, decreases a color saturation, decreases a brightness, ceases to display, and/or fades out) the 3D content, such as shown with the computer system making visible the environment of the user (e.g., the physical environment of the user 1101 of the computer system) at the intersection of the hand 1101a and the frame 1134 in FIG. 11W in response to detecting the hand 1101a of the user 1101 being in the frame 1134. For example, the three-dimensional environment different from the 3D content becomes more visible and/or increased in visual prominence if the distance between the frame and the second viewpoint of the user is less than the respective distance. In some embodiments, in response to detecting the event, in accordance with a determination that the second distance is greater than the respective threshold distance, the computer system maintains the visual prominence of the 3D content (e.g., forgoes reducing in visual prominence the 3D content). Decreasing a visual prominence of the 3D content in response to a distance between a portion of the user of the computer system and the 3D content being reduced to less than a threshold indicates that the distance has changed to less than the threshold and provides spatial understanding of the user's environment outside of the 3D content, which increases user safety with the computer system and reduces errors in interacting in their environment.

In some embodiments, the 3D content in the immersive mode of display is displayed in the three-dimensional environment, and a boundary of the 3D content in the three-dimensional environment is of less visual prominence than a portion of the 3D content other than the boundary of the 3D content, such as boundary 1118 of virtual content 1102 in FIG. 11B. In some embodiments, the boundary between the 3D content and the three-dimensional environment comprises a region (e.g., an area and/or volume that has non-zero area and/or volume) where portions of the 3D content and of the three-dimensional environment outside of the 3D content are concurrently displayed. Thus, in some embodiments, the boundary is a region in which the 3D content is displayed with partial transparency such that the remainder of the three-dimensional environment is also displayed. For example, the transition between the 3D content and the remainder of the three-dimensional environment is a feathered transition in which on one side of the transition area, the 3D content is displayed with less transparency (e.g., and the remainder of the three-dimensional environment is, therefore, less visible), and on the other side of the transition area, the 3D content is displayed with more transparency (e.g., and the remainder of the three-dimensional environment is, therefore, more visible), and/or is a blurred transition. Displaying a transition area between the 3D content and the remainder of the three-dimensional environment indicates the proximity and/or direction of the 3D content relative to the remainder of the three-dimensional environment, thereby making the user-device interaction safer and more efficient.

In some embodiments, when the event corresponding to the triggering condition for transitioning from displaying the 3D content in the immersive mode of display to displaying the 3D content in the framed mode of display is detected, a boundary of the 3D content in the three-dimensional environment in which the 3D content in the immersive mode of display is a first boundary, such as the boundary of the 3D content that is of less visual prominence than the portion of the 3D content other than the boundary of the 3D content described above, such as boundary 1118 of virtual content 1102 in FIG. 11B, and an apparent size of the 3D content from the current viewpoint of the user (e.g., the angular size on the display of a reference (e.g., an object) in the 3D content from a position corresponding to the current viewpoint of the user) is a first apparent size from the current viewpoint of the user, such as the apparent size of reference 1104 from the viewpoint of the user in FIG. 11B. In some embodiments, in response to detecting the event corresponding to the triggering condition for transitioning from displaying the 3D content in the immersive mode of display to displaying the 3D content in the framed mode of display (e.g., in response to selection of user interface element 1122 in FIG. 11G), the computer system displays an animation of a transition from display of the 3D content in the immersive mode of display to display of the 3D content in the framed mode of display (e.g., the illustrated transition of display in FIGS. 11H through 11J), including, updating display, via the one or more display generation components, of the boundary of the 3D content in the three-dimensional environment from having the first boundary to having a second boundary that is different from the first boundary, such as the frame 1134 in FIG. 11I. For example, the second boundary is optionally the edge of the frame for 3D content, so the animation optionally includes showing change of the boundary from being the first boundary to being the frame, including displaying the frame. When the boundary is changing to the second boundary, the amount of the 3D content that is displayed optionally decreases due to the change of the boundary. For example, changing the boundary to the second boundary optionally include making transparent portions of the 3D content that previous were not transparent (and thus making more visible portions of the remainder of the three-dimensional environment) and moving a location of the boundary to the second boundary. Less of the 3D content is visible when the 3D content has the second boundary than when the 3D content had the first boundary, as the second boundary is smaller in the area and/or volume of the 3D content that it encapsulates than the first boundary.

In some embodiments, displaying the animation of the transition from display of the 3D content in the immersive mode of display to display of the 3D content in the framed mode of display includes, after updating display of the boundary of the 3D content to have the second boundary, updating display, via the one or more display generation components, of the apparent size of the 3D content from the current viewpoint of the user to be a second apparent size from the current viewpoint of the user that is different from the first apparent size from the current viewpoint of the user, such as the decrease in the apparent size of the virtual content 1102 as shown with the moving back of the reference 1104 in the virtual content 1102 from the viewpoint of the user from side view 1118g of FIG. 11G to side view 1118j in FIG. 11J. For example, the computer system changes (e.g., enlarges or decreases) the angular size of the reference (e.g., the object) in the 3D content. As such, when transitioning from the immersive mode of display to the framed mode, the computer system optionally displays an animated transition that includes a change in the boundary of the 3D content (e.g., a movement and change in visual appearance of the boundary) followed by a change in the apparent size of the 3D content from the current viewpoint of the user. The above-described animated transition indicates that the mode of display of the 3D content is being changed to the framed mode, indicates that the 3D content is being moved in the three-dimensional environment, which provides spatial feedback to the user of the location of the 3D content relative to their environment, thereby making the user-device interaction safer and more efficient.

In some embodiments, updating display, via the one or more display generation components, of the apparent size of the 3D content from the current viewpoint of the user to be the second apparent size from the current viewpoint of the user includes changing a distance between the 3D content and the current viewpoint of the user, such as the decrease in the apparent size of the virtual content 1102 as shown with the moving back of the reference 1104 in the virtual content 1102 from the viewpoint of the user from side view 1118*g* of FIG. 11G to side view 1118*j* in FIG. 11J. In some embodiments, the apparent size of the 3D content changes because the 3D content changes in depth relative to the viewpoint of the user when the 3D content changes from being displayed in the immersive mode to being displayed in the framed mode, such as described below. In some embodiments, updating display of the apparent size of the 3D content to be the second size includes increasing a distance between the 3D content and the viewpoint of the user, and the second apparent size is less in size than the first apparent size because the 3D content is moved further away from the viewpoint of the user. In some embodiments, updating display of the apparent size of the 3D content to be the second size includes decreasing a distance between the 3D content and the viewpoint of the user, and the second apparent size is greater in size than the first apparent size because the 3D content is moved toward the viewpoint of the user. In some embodiments, updating the apparent size of the 3D content does not include changing a size of the 3D content relative to the three-dimensional environment. In some embodiments, in accordance with a determination that changing the distance between the 3D content and the current viewpoint of the user includes a first amount of change of distance, a difference between the first apparent size and the second apparent size from the current viewpoint of the user is a first amount of difference, in accordance with a determination that changing the distance between the 3D content and the current viewpoint of the user includes a second amount of change of distance, different from the first amount of change of distance, a difference between the first apparent size and the second apparent size from the current viewpoint of the user is a second amount of difference that is different from the first amount of difference. It should be noted that a change in an apparent size of the 3D content is optionally different (e.g., separate) from a change (e.g., a reduction) in an amount of an available field of view from a current viewpoint of the user that the 3D content occupies as a result of the transition from the immersive mode to the framed mode and is optionally different (e.g., separate) from a change in boundary of the 3D content that results when transitioning from the immersive mode to the framed mode; as such, these operations may be mutually exclusive and provide different results than the other. Correlating the change in apparent size of the 3D content to a change in depth of the 3D content relative to the user increases a realism with the move of the 3D content as the move of it results in a corresponding change in apparent size rather than in actual size of the 3D content, which provides spatial feedback to the user of the location of the 3D content relative to the user, thereby making the user-device interaction safer and more efficient.

In some embodiments, while the 3D content is displayed in the framed mode of display from a respective viewpoint of the user, a boundary of the 3D content in the three-dimensional environment in which the 3D content in the framed mode of display is displayed is a first boundary, such as the frame 1134 in FIG. 11J, and an apparent size of the 3D content from the respective viewpoint of the user (e.g., the angular size of a reference (e.g., an object) in the 3D content from a position corresponding to the respective viewpoint of the user) is a first apparent size from the respective viewpoint of the user, such as the apparent size of reference 1104 from the viewpoint of the user in FIG. 11Y, the computer system detects an event corresponding to a triggering condition for transitioning from displaying the 3D content in the framed mode of display to displaying the 3D content in the immersive mode of display, such as the event corresponding to a triggering condition for transitioning from displaying the 3D content in the framed mode of display to displaying the 3D content in the immersive mode of display described above, such as selection of user interface element 1124*b* in FIG. 11X. In some embodiments, in response to detecting the event corresponding to the triggering condition for transitioning from displaying the 3D content in the framed mode of display to displaying the 3D content in the immersive mode of display, the computer system displays an animation of a transition from display of the 3D content in the framed mode of display to display of the 3D content in the immersive mode of display (e.g., the illustrated transition of display in FIGS. 11Z through 11AB), including updating display, via the one or more display generation components, of the apparent size of the 3D content from the respective viewpoint of the user to be a second apparent size from the respective viewpoint of the user that is different from the first apparent size from the current viewpoint of the user, such as the increase in the apparent size of the virtual content 1102 as shown with the moving closer of the reference 1104 in the virtual content 1102 towards the viewpoint of the user from side view 1118*y* of FIG. 11Y to side view 11182 in FIG. 11Z. For example, the computer system changes (e.g., enlarges or decreases) the angular size of the reference (e.g., the object) in the 3D content. For example, the second apparent size is from the respective viewpoint of the user is optionally the same as the first apparent size from the current viewpoint of the user described above with reference to the animation of the transition from display of the 3D content in the immersive mode of display to display of the 3D content in the framed mode of display.

In some embodiments, displaying the animation of the transition from display of the 3D content in the framed mode of display to display of the 3D content in the immersive mode of display includes, after updating display of the apparent size of the 3D content from the respective viewpoint of the user to be the second apparent size from the respective viewpoint of the user, updating display, via the one or more display generation components, of the boundary of the 3D content in the three-dimensional environment to have a second boundary that is different from the first boundary, such as the removal of the frame 1134 from FIG. 11Y to 11AB. For example, the second boundary is optionally the same in characteristic as the first boundary described above with reference to the animation of the transition from display of the 3D content in the immersive mode of display to display of the 3D content in the framed mode of display. More of the 3D content is visible when the 3D content has the second boundary than when the 3D content had the first boundary, as the second boundary is greater in the area and/or volume of the 3D content that it encapsulates than the first boundary. As such, when transitioning from the framed mode of display to the immersive mode, the computer system optionally displays an animated transition that includes a change in the apparent size of the 3D content from the current viewpoint of the user followed by a change in the boundary of the 3D content (e.g., a movement and change in visual appearance of the boundary). The above-described animated transition indicates that the mode of display of the 3D content is being changed to the immersive mode, indicates that the 3D content is being moved in the three-dimensional environment, which provides spatial feedback to the user of the location of the 3D content relative to their environment, thereby making the user-device interaction safer and more efficient.

In some embodiments, updating display, via the one or more display generation components, of the apparent size of the 3D content from the respective viewpoint of the user to be the second apparent size from the respective viewpoint of the user includes changing a distance between the 3D content and the respective viewpoint of the user, such as the increase in the apparent size of the virtual content 1102 as shown with the moving closer of the reference 1104 in the virtual content 1102 towards the viewpoint of the user from side view 1118y of FIG. 11Y to side view 1118z in FIG. 11Z. In some embodiments, the apparent size of the 3D content changes because the 3D content changes in depth relative to the viewpoint of the user when the 3D content changes from being displayed in the framed mode to being displayed in the immersive mode, such as described below. In some embodiments, updating display of the apparent size of the 3D content to be the second size includes increasing a distance between the 3D content and the viewpoint of the user, and the second apparent size is less in size than the first apparent size because the 3D content is moved further away from the viewpoint of the user. In some embodiments, updating display of the apparent size of the 3D content to be the second size includes decreasing a distance between the 3D content and the viewpoint of the user, and the second apparent size is greater in size than the first apparent size because the 3D content is moved toward the viewpoint of the user. In some embodiments, updating the apparent size of the 3D content does not include changing a size of the 3D content relative to the three-dimensional environment. In some embodiments, in accordance with a determination that changing the distance between the 3D content and the respective viewpoint of the user includes a first amount of change of distance, a difference between the first apparent size and the second apparent size from the respective viewpoint of the user is a first amount of difference, and in accordance with a determination that changing the distance between the 3D content and the respective viewpoint of the user includes a second amount of change of distance, different from the first amount of change of distance, a difference between the first apparent size and the second apparent size from the respective viewpoint of the user is a second amount of difference that is different from the first amount of difference. It should be noted that a change in an apparent size of the 3D content is optionally different (e.g., separate) from a change (e.g., an increase) in an amount of an available field of view from a current viewpoint of the user that the 3D content occupies as a result of the transition from the framed mode to the immersive mode and is optionally different (e.g., separate) from a change in boundary of the 3D content that results when transitioning from the framed mode to the immersive mode; as such, these operations may be mutually exclusive and provide different results than the other. Correlating the change in apparent size of the 3D content to a change in depth of the 3D content relative to the user increases a realism with the move of the 3D content as the move of it results in a corresponding change in apparent size rather than in actual size of the 3D content, which provides spatial feedback to the user of the location of the 3D content relative to the user, thereby making the user-device interaction safer and more efficient.

In some embodiments, when the event corresponding to the triggering condition for transitioning from displaying the 3D content in the immersive mode of display to displaying the 3D content in the framed mode of display is detected, the 3D content is in a first playback state (e.g., in a paused state, play state in which the 3D content is playing, fast forward state, rewind state, or another playback state). For example, the virtual content 1102 is optionally a video that is playing when selection of user interface element 1122 in FIG. 11G is detected. In some embodiments, in response to detecting the event corresponding to the triggering condition for transitioning from displaying the 3D content in the immersive mode of display to displaying the 3D content in the framed mode of display, the 3D content is maintained in the first playback state without entering a second playback state different from the first playback state during transitioning from displaying the 3D content in the immersive mode of display to displaying the 3D content in the framed mode of display. For example, the virtual content 1102 is optionally a video that is playing when selection of user interface element 1122 in FIG. 11G is detected, and it continues to play while transitioning to the framed mode. As such, the computer system optionally maintains the playback state of the 3D content while transitioning the 3D content from the immersive mode of display to the framed mode of display. Maintaining the playback state of the 3D content even when transitioning mode of display of the 3D content from the immersive to frame mode provides consistency of user interaction with the 3D content while transitioning modes and makes the user-device interaction more efficient.

In some embodiments, while the 3D content is displayed in the framed mode of display, and while the 3D content is in a first playback state (e.g., in a paused state, play state in which the 3D content is playing, fast forward state, rewind state, or another playback state), the computer system detects an event corresponding to a triggering condition for transitioning from displaying the 3D content in the framed mode of display to displaying the 3D content in the immersive mode of display, such as the event corresponding to the triggering condition for transitioning from displaying the 3D content in the framed mode of display to displaying the 3D content in the immersive mode of display described above. For example, the virtual content 1102 is optionally a video that is playing when selection of user interface element 1124a in FIG. 11X is detected. In some embodiments, in response to detecting the event corresponding to the triggering condition for transitioning from displaying the 3D content in the framed mode of display to displaying the 3D content in the immersive mode of display, the computer system transitions from displaying, via the one or more display generation components, the 3D content in the frame mode of display to displaying, via the one or more display generation components, the 3D content in the immersive mode of display, wherein the 3D content is maintained in the first playback state without entering a second playback state different from the first playback state during transitioning from displaying the 3D content in the framed mode of display to displaying the 3D content in the immersive mode of display. For example, the virtual content 1102 is optionally a video that is playing when selection of user interface element 1124 in FIG. 11X is detected, and it continues to play while transitioning to the immersive mode. As such, the computer system optionally maintains the playback state of the 3D content while transitioning the 3D content from the framed mode of display to the immersive mode of display.

Maintaining the playback state of the 3D content even when transitioning mode of display of the 3D content from the immersive to frame mode provides consistency of user interaction with the 3D content while transitioning modes and makes the user-device interaction more efficient.

In some embodiments, in accordance with a determination that the 3D content is being displayed in the framed mode of display, the computer system allows concurrent display, via the one or more display generation components, of: the 3D content in the framed mode of display, and one or more user interfaces of one or more applications that are different from one or more respective applications associated with display of the 3D content, such as shown with the concurrent display of virtual content 1102 in the framed mode and user interface 1142 in FIG. 11J. For example, the computer system permits concurrent display of the content in the frame mode of display and of a messages user interface, email user interface, photo user interface, music user interface, Internet browser user interface, and/or another user interface of another application that is not associated with display of the 3D content. For example, while displaying the 3D content in the frame mode, the computer system detects input for displaying a messages UI, and in response the computer system displays the messages UI concurrently with the framed content. In some embodiments, in accordance with a determination that the 3D content is being displayed in the immersive mode of display, the computer system restricts concurrent display of: the 3D content in the immersive mode of display, and the one or more user interfaces of one or more applications that are different from the one or more respective applications associated with display of the 3D content. For example, user interface 1142 of FIG. 11J is optionally not displayed in FIG. 11A because the computer system is displaying the virtual content 1102 in the immersive mode. As such, the computer system optionally permits concurrent display of the 3D content and the user interfaces when the 3D content is being displayed in the framed mode of display and does not permit concurrent display of the 3D content and the user interfaces when the 3D content is being displayed in the immersive mode of display. Allowing simultaneous display of the 3D content and windows that are not associated with display of the 3D content when the 3D content is in the framed mode and restricting simultaneous display of the 3D content and windows that are not associated with display of the 3D content when the 3D content is in the immersive mode indicates a mode of display of the 3D content and reduces computing resources used for processes unrelated to display of the 3D content while it is in the immersive mode.

In some embodiments, while displaying the 3D content in the framed mode of display including displaying the 3D content in the frame for the 3D content in the three-dimensional environment, the computer system detects an input corresponding to a request to increase a size of the frame for the 3D content in the three-dimensional environment, such as the input directed to user interface element 1140 in FIG. 11K. In some embodiments, when the input corresponding to the request to increase the size of the frame for the 3D content in the three-dimensional environment is detected, displaying the 3D content in the framed mode of display includes displaying a first portion of the 3D content in the frame for the 3D content without displaying a second portion of the 3D content in the frame for the 3D content (optionally such as described above with reference to the first portion of the 3D content being displayed from the first viewpoint of the user without display of the second portion of the 3D content from the first viewpoint of the user), such as the amount of virtual content 1102 illustrated in FIG. 11K being the first portion. In some embodiments, while displaying the 3D content in the frame mode of display, the computer system also displays a user interface element for changing a size of the frame. In some embodiments, detecting the input for changing the size of the frame includes detecting user input directed at the user interface element. For example, the user input optionally includes an air gesture performed by one or more hands of the user (e.g., an air pinch gesture) while attention of the user (e.g., based on gaze) is directed at the user interface element, and movement of the hand while in the air pinch gesture pose in a direction that laterally points away from a center of the frame.

In some embodiments, in response to detecting the input corresponding to the request to increase the size of the frame for the 3D content in the three-dimensional environment, the computer system increases the size of the frame for the 3D content in the three-dimensional environment, such as the increase in the size of the frame 1134 from FIG. 11K to FIG. 11T. In some embodiments, in response to detecting the input corresponding to the request to increase the size of the frame for the 3D content in the three-dimensional environment, the computer system concurrently displays, via the one or more display generation components, in the frame for the 3D content, the first portion of the 3D content, and the second portion of the 3D content, such as in FIG. 11T with the display of the portion of the virtual content 1102 that is displayed in the frame 1134 in FIG. 11K being included in the display in FIG. 11T along with a portion of the virtual content that was not displayed in FIG. 11K. In some embodiments, while displaying the 3D content in the framed mode of display including displaying the 3D content in the frame for the 3D content in the three-dimensional environment, the computer system detects an input corresponding to a request to decrease a size of the frame for the 3D content in the three-dimensional environment (e.g., the user input optionally includes an air gesture performed by one or more hands of the user (e.g., an air pinch gesture) while attention of the user (e.g., based on gaze) is directed at the user interface element, and movement of the hand while in the air pinch gesture pose in a direction that laterally points toward the center of the frame), wherein: when the input corresponding to the request to decrease the size of the frame for the 3D content in the three-dimensional environment is detected, displaying the 3D content in the framed mode of display includes concurrently displaying a first portion of the 3D content in the frame for the 3D content and displaying a second portion of the 3D content in the frame for the 3D content, and in response to detecting the input corresponding to the request to decrease the size of the frame for the 3D content in the three-dimensional environment, the computer system decreases the size of the frame for the 3D content in the three-dimensional environment, and displays, via the one or more display generation components, in the frame for the 3D content, the first portion of the 3D content without displaying the second portion of the 3D content. In some embodiments, the greater the increase in size of the frame, the greater the increase in amount of 3D content that is displayed (e.g., the greater the increase in amount of the field of view of the 3D content that is displayed). In some embodiments, the greater the decrease in size of the frame, the greater the decrease in amount of 3D content that is displayed (e.g., the greater the decrease in amount of the field of view of the 3D content that is displayed). Amounts of field of view of the 3D content are described above with reference to step(s) 1202 As such, in response to requests to re-size the frame, the computer system re-sizes the frame and changes the amount of the 3D content that is visible in frame (e.g., by revealing more content (instead of enlarging the 3D content that is displayed in the frame when the request is received) or by concealing some content (instead of shrinking the 3D content that is displayed in the frame when the request is received) in accordance with the direction of the re-size request). Increasing the amount of 3D content that is visible in the frame in response to input to increase a size of the frame provides user control over the amount of 3D content that is displayed, which can cause the computer system to display the 3D content based on the amount of 3D content that is desired to be displayed rather than the computer system simply displaying all of the field of view of the 3D content which would involve more usage of computing resources, allows more of the field of view of the 3D content to be displayed and indicates an amount of field of view of the 3D content, which increases a user's understanding of the field of view of the 3D content when it is in the framed mode.

In some embodiments, the 3D content has a content horizon for the 3D content, such as content horizon 1112*b* in side view 1158*a* in FIG. 11AK. In some embodiments, the three-dimensional environment has an environment horizon for the three-dimensional environment, such as environment horizon 1112*a* in side view 1158*a* in FIG. 11AK. The content horizon and the environment horizon are optionally as described above with reference to content horizon for the 3D content and the environment horizon for the three-dimensional environment. In some embodiments, the content horizon for the 3D content includes one or more characteristics of the content horizon for the virtual content described with reference to method 1300. In some embodiments, the environment horizon for the three-dimensional environment includes one or more characteristics of the environment horizon for the three-dimensional environment described with reference to method 1300.

In some embodiments, while the 3D content is displayed in the framed mode of display, the computer system detects an event corresponding to a triggering condition for transitioning from displaying the 3D content in the framed mode of display to displaying the 3D content in the immersive mode of display, such as the event corresponding to the triggering condition for transitioning from displaying the 3D content in the framed mode of display to displaying the 3D content in the immersive mode of display described above, such as selection of user interface element 1124*a* in FIG. 11AB. In some embodiments, in response to detecting the event corresponding to the triggering condition for transitioning from displaying the 3D content in the framed mode of display to displaying the 3D content in the immersive mode of display, the computer system transitions from displaying, via the one or more display generation components, the 3D content in the framed mode of display to displaying, via the one or more display generation components, the 3D content in the immersive mode of display, such as from displaying virtual content 1102 in the framed mode as in FIG. 11J to displaying virtual content 1102 in the immersive mode as in FIG. 11A. In some embodiments, transitioning from displaying, via the one or more display generation components, the 3D content in the framed mode of display to displaying, via the one or more display generation components, the 3D content in the immersive mode of display includes, in accordance with a determination that a relative orientation between the content horizon and the environment horizon is a first relative orientation (e.g., such as the content horizon being within the first respective threshold of alignment with the environment horizon (e.g., is within 4, 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon) as described with reference to embodiment(s) of method 1300) when the event corresponding to the triggering condition for transitioning from displaying the 3D content in the framed mode of display to displaying the 3D content in the immersive mode of display is detected, transitioning from displaying, via the one or more display generation components, the 3D content in the framed of display to displaying, via the one or more display generation components, the 3D content in the immersive mode of display using a first transition, such as the first transition of aligning the content horizon with the environment horizon described with reference to embodiment(s) of method 1300, such as the transition illustrated consecutively in side views 1158*a*-1158*d* in FIG. 11AK. In some embodiments, transitioning from displaying, via the one or more display generation components, the 3D content in the framed mode of display to displaying, via the one or more display generation components, the 3D content in the immersive mode of display includes, in accordance with a determination that the relative orientation between the content horizon and the environment horizon is a second relative orientation (e.g., such as the content horizon is not within the first respective threshold of alignment with the environment horizon and is within a second respective threshold of alignment that is greater than the first threshold of alignment with the environment horizon (e.g., is within 6, 4, 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon and greater than the first threshold of alignment) as described with reference to embodiment(s) of method 1300), different from the first relative orientation, when the event corresponding to the triggering condition for transitioning from displaying the 3D content in the framed mode of display to displaying the 3D content in the immersive mode of display is detected, transitioning from displaying, via the one or more display generation components, the 3D content in the framed mode of display to displaying, via the one or more display generation components, the 3D content in the immersive mode of display using a second transition, such as the second transition of aligning the content horizon with the environment horizon described with reference to embodiment(s) of method 1300, different from the first transition, such as the transition illustrated consecutively in side views 1160*a*-1160*d* in FIG. 11AL. As such, the computer system performs different transitions between the immersive and framed mode of display based on the angle of the 3D content relative to the environment horizon. Such features are described further with reference to method 1300. Showing different transitions between the immersive and framed mode of display of the 3D content based on the angle between the content horizon and the environment horizon provides visual feedback of the angle between the content horizon and environment horizon, which increases a user's awareness of the orientation of the 3D content in their environment, which may reduce errors associated with interacting in the environment.

In some embodiments, while displaying the 3D content in the three-dimensional environment from a respective viewpoint of the user, and while the 3D content is a first distance away from the respective viewpoint of the user in the three-dimensional environment, the computer system detects an event corresponding to a request to change a distance between the 3D content in the three-dimensional environment and the respective viewpoint of the user to a second distance, such as the computer system displaying three-dimensional environment 1100 in FIG. 11J and detecting movement of the user 1101 towards the frame 1134 and that movement corresponding to the request to change the distance. The event optionally includes movement of the user in the physical environment of the user towards or away from a location in the physical environment that corresponds to a location of the frame in the three-dimensional environment, and/or includes a request for movement of the frame in the three-dimensional environment towards or away from the position of the user in the three-dimensional environment. The event optionally corresponds to a request to change a viewpoint of the user.

In some embodiments, in response to detecting the event corresponding to the request to change the distance between the 3D content in the three-dimensional environment and the respective viewpoint of the user to the second distance, in accordance with a determination that the 3D content is in the framed mode of display, the computer system changes the distance between the 3D content in the three-dimensional environment and the respective viewpoint of the user to the second distance, such as shown with the user 1101 being closer to the virtual content 1102 in FIG. 11U than in FIG. 11J. The changing of the distance between the 3D content in the three-dimensional environment and the respective viewpoint of the user to the second distance optionally further results in display of a different portion of the 3D content such as described above with reference to the second portion of the 3D content that is displayed in response to detection of an event including movement of the user in the physical environment of the user towards or away from the frame. As such, in some embodiments, the distance between the 3D content is changed in response to input for such when the 3D content is being displayed in the frame mode of display.

In some embodiments, in response to detecting the event corresponding to the request to change the distance between the 3D content in the three-dimensional environment and the respective viewpoint of the user to the second distance, in accordance with a determination that the 3D content is in the immersive mode of display, the computer system forgoes changing the distance between the 3D content in the three-dimensional environment and the respective viewpoint of the user (e.g., maintaining the distance between the 3D content in the three-dimensional environment and the respective viewpoint of the user). For example, when the virtual content 1102 is in the immersive mode, such as in FIG. 11A, a distance between the virtual content 1102 and the viewpoint of the user is optionally maintained even when movement of the user is detected. As such, in some embodiments, the distance between the 3D content is not changed in response to input for changing the distance when the 3D content is being displayed in the immersive mode of display. Thus, in some embodiments, in the framed mode, the 3D content can be moved (e.g., closer or further away from) the viewpoint of the user, and in the immersive mode, the 3D content cannot be moved (e.g., closer or further away from) the viewpoint of the user. Changing or forgoing changing the distance based on the mode of display of the 3D content indicates the mode of display of the 3D content and reduce errors associated with user interaction with the 3D content.

It should be understood that the particular order in which the operations in method 1200 have been described is merely exemplary and is not intended to indicate that the described order is the only order in which the operations could be performed. One of ordinary skill in the art would recognize various ways to reorder the operations described herein. In some embodiments, aspects/operations of method 1200 may be interchanged, substituted, and/or added between these methods. For example, various object manipulation techniques and/or object movement techniques of method 1200 is optionally interchanged, substituted, and/or added between these methods. For brevity, these details are not repeated here.

FIG. 13 is a flowchart illustrating an exemplary method 1300 of detecting and responding to a request to move virtual content in a direction that would reduce an alignment of the virtual content with an environment horizon of an environment in which the virtual content is displayed, where the request is detected while the virtual content is aligned with the environment horizon, in accordance with some embodiments. In some embodiments, the method 1300 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1300 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1300 are, optionally, combined and/or the order of some operations is, optionally, changed.

In some embodiments, method 1300 is performed at a computer system (e.g., computer system 101 of FIG. 1) in communication with one or more display generation components (e.g., display generation component 120 of FIG. 1) and one or more input devices (e.g., input devices 125 of FIG. 1A). For example, the computer system is or includes a mobile device (e.g., a tablet, a smartphone, a media player, or a wearable device), or a computer. In some embodiments, the computer system has one or more characteristics of the computer system described with reference to any of the methods herein, such as method 800, 1000, 1200, 1500, 1700, 1900, and/or 2100. In some embodiments, the one or more display generation components have one or more characteristics of the one or more display generation components described with reference to any of the methods herein, such as method 800, 1000, 1200, 1500, 1700, 1900, and/or 2100. In some embodiments, the one or more input devices have one or more characteristics of the one or more input devices described with reference to any of the methods herein, such as method 800, 1000, 1200, 1500, 1700, 1900, and/or 2100.

In some embodiments, the computer system displays (1302a), via the one or more display generation components, virtual content in a three-dimensional environment (e.g., a virtual environment or a representation of a physical environment of the user), such as shown with virtual content 1102 in FIG. 11J. In some embodiments, the virtual content has a content horizon for the virtual content (e.g., a content horizon plane that is perpendicular to a "down" direction such as a direction of gravity in the content or a horizon), such as content horizon 1112b in side view 1154a in FIG. 11AI. In some embodiments, the three-dimensional environment has an environment horizon for the three-dimensional environment (e.g., an environment horizon plane that is perpendicular to a "down" direction such as a direction of gravity in the three-dimensional environment or a horizon), such as environment horizon 1112a in side view 1154a in FIG. 11AI.

The virtual content optionally includes one or more characteristics of the 3D content described with reference to method 1200. The virtual content is optionally live TV, sports content, a movie, still content and/or other media content. The virtual content is optionally immersive media content (e.g., 3D content that optionally at least partially surrounds the user of the computer system in a view of the three-dimensional environment, 180 degree media, 360 degree media, and/or 3D content for which the computer system simulates depth effect(s) optionally relative to a viewpoint(s) of the user, such that the user of computer system visually experiences the 3D content as three-dimensional content). The virtual content is optionally displayed in (e.g., bounded by) a frame, such as described with reference to method 1200. In some embodiments, the virtual content is 2D content.

The virtual content is displayed In a 3D environment, and the 3D environment is optionally an XR environment, such as an AR, VR, AV, or MR environment, or another type of environment described herein. In some embodiments, the 3D environment is a representation of a physical environment of the user of the computer system.

The content horizon is optionally a line or plane associated with or defined (e.g., implicitly or explicitly) by the virtual content, a horizontal of the virtual content, a horizon of the virtual content, a line or plane that is perpendicular to a direction of gravity (e.g., simulated or virtual gravity) in the virtual content, a line or plane that is perpendicular to a direction of gravity (e.g., simulated or virtual gravity) in the virtual content and that is at a height where a horizontal in the content is horizontal relative to the viewpoint of the user, a line or plane that is perpendicular to a down direction (e.g., a direction of gravity or other direction specified as being "down") defined by the virtual content, a down direction defined by a creator of the virtual content, or another down direction defined by the virtual content. The content horizon optionally is or is not a specific visual element of the virtual content, as it could correspond to a line or plane that is not visible but is otherwise defined by the virtual content. For example, the virtual content is optionally playback of a live baseball game, and the content horizon is optionally a line or plane perpendicular to a direction of gravity (e.g., simulated or virtual gravity) in the live baseball game (e.g., approximately perpendicular, such as being within 0.001, 0.01, 0.1, 1 degrees, 2 degrees, 5, degrees, or another amount of degrees of being perpendicular to a direction of gravity (e.g., simulated or virtual gravity) in the virtual content and/or from the location(s) of the capturing of the live soccer game). The content horizon is optionally set by a creator of the virtual content, and/or optionally corresponds to a horizontal in the virtual content that corresponds to eye level (e.g., as if the virtual content that is displayed is real-world content that the user of the computer system is observing where the eye level of the user is fixed in height and where the content horizon is fixed in height independent of a direction that the user of the computer system is observing the virtual content, optionally unless the virtual content is moved). For example, the virtual content is optionally immersive media content as described above, and the horizon of the immersive media content optionally corresponds to a horizontal axis of the immersive media content that intersects a specific point and/or line along a vertical axis of the immersive media content.

The environment horizon is optionally a line or plane of the 3D environment, a horizontal line or plane of the 3D environment, a horizon or plane of the 3D environment, a line or plane that is perpendicular to a direction of gravity in the 3D environment or other direction identified as a "down" direction, a line or plane that is perpendicular to a down direction defined by the 3D environment, a line or plane that is perpendicular to a direction of gravity in the 3D environment and that is at a height where a horizontal line or plane in the content is horizontal relative to the viewpoint of the user, a line or plane that is perpendicular to a direction of gravity in the virtual content and at an eye level of the user of the computer system, a line defined by a creator of the 3D environment such as if the 3D environment is virtual environment stimulating a virtual location, or another line or plane defined by the 3D environment. The environment horizon optionally is or is not a specific visual element of the 3D environment, as it could correspond to a line or plane that is not visible but is otherwise defined by the 3D environment. For example, the 3D environment is optionally a representation of a physical room of a user of the computer system, and the environment horizon is optionally a horizontal line or plane in the representation of the physical room whose vertical height is at an eye level of the user of the computer system For example, if eye level of the user is 5 ft, then the environment horizon is 5 ft, and if the eye level of the user of is 6 ft, then the horizon of the physical environment is 6 ft. Thus, the environment horizon is optionally different for different eye levels, and optionally changes (e.g., changes in height) in response to changes in eye level of the user. In some embodiments, the environment horizon follows the eye level of the user (e.g., changes in height in response to changes in eye level of the user). In some embodiments, the environment horizon is independent of the eye level of the user. In some embodiments, when the environment is a virtual environment or another type of extended reality environment that is or includes display of a simulated virtual location, the environment horizon optionally corresponds to a horizon level in that simulated virtual location that is displayed to the user at the eye level of the user of the computer system or is independent of the eye level of the user (e.g., is fixed).

The content horizon can be either aligned with the environment horizon, such as content horizon 1112b being aligned with environment horizon 1112a in side view 1150e in FIG. 11AG, or not aligned with the environment horizon, such as content horizon 1112b not being aligned with environment horizon 1112a in side view 1150a in FIG. 11AG. When the content horizon and the environment horizon are aligned, the content horizon and the environment horizon are coincident and/or parallel, and/or within 0.5, 1, or 5 degrees of being parallel. When the content horizon and the environment horizon are aligned, a direction of gravity (or other defined "down" direction) in the virtual content is optionally parallel (and/or within 0.5, 1, or 5, degrees of being parallel) to a direction of gravity (or other defined "down" direction) in the three-dimensional environment. In an example, when the virtual content is a playback of a soccer game, the content horizon is optionally the line or plane in the virtual content that is perpendicular to a direction of gravity in the live soccer game, and the environment horizon is optionally the line or plane in the three-dimensional environment that is perpendicular to a direction of gravity in the three-dimensional environment of the user, and when the content horizon is aligned with the environment horizon, the line or plane in the virtual content that is perpendicular to the direction of gravity (or other defined "down" direction) in the live soccer game is also perpendicular to direction of gravity (or other defined "down" direction) applied on the user of the computer system. In an example, when the virtual content is a playback of a soccer game, and the content horizon is aligned with the environment horizon, the content horizon is optionally the line or plane that is perpendicular to a direction of gravity in the live soccer game and at eye level and/or is the line or plane that is perpendicular to a direction of gravity in the live soccer game and that is also horizontal in the viewpoint of the user (e.g., a line or plane that remains horizontal in the live soccer game in the viewpoint of the user independent of a depth of the line or plane from the viewpoint of the user). When the content horizon and the environment horizon are not aligned, a direction of gravity (or other defined "down" direction) in the virtual content is different from (e.g., not coincident and/or not parallel to) a direction gravity (or other defined "down" direction) in the three-dimensional environment (optionally by beyond a threshold amount of angular difference).

Further, in some embodiments, when the content horizon and the environment horizon are aligned, the content horizon and the environment horizon are optionally aligned relative to the 3D environment and/or to the viewpoint of the user of the computer system. When the content line and the environment horizon are aligned, the content horizon and the environment horizon are optionally parallel and/or are coincident (e.g., relative to the 3D environment and/or to the viewpoint of the user of the computer system). For example, the content horizon is a first horizontal of the virtual content and the environment horizon is a first horizontal of the 3D environment, and when the content horizon and the environment horizon are aligned, the first horizontal line or plane of the virtual content is horizontal in the viewpoint of the user and the first horizontal line or plane of the 3D environment is horizontal in the viewpoint of the user, and the locations of the first horizontal line or plane of the virtual content and of the first horizontal line of the 3D environment are coincident (and/or are within a threshold of being coincident (e.g., within 0.01, 0.1, 0.5, or 1 ft of being coincident) in the viewpoint of the user. Continuing with this example, when the content horizon and the environment horizon are not aligned, the first horizontal line or plane of the virtual content is or is not horizontal in the viewpoint of the user and the first horizontal line or plane of the 3D environment is horizontal in the viewpoint of the user, and the locations of the first horizontal line or plane of the virtual content and of the first horizontal line or plane of the 3D environment are not coincident (and/or are not within the threshold of being coincident) in the viewpoint of the user.

In some embodiments, while displaying the virtual content in the three-dimensional environment of the user of the computer system, the computer system detects (1302*b*), via the one or more input devices, an input corresponding to a request to move the virtual content relative to the three-dimensional environment, such as input from user requesting movement of virtual content 1102 in direction 1136*a* in FIG. 11K. In some embodiments, the input includes movement of a first magnitude (e.g., hand movement of the user that corresponds to a request to move the virtual content by a first magnitude or a first magnitude of hand movement of the user that corresponds to a request to move the virtual content by a first amount). In some embodiments, the input of block 1302*b* of FIG. 13 includes one or more characteristics of the input to move the frame through which the 3D content is displayed described with reference to method 1200, such as an air pinch and drag input of a hand, a tap and drag input of a finger, or a click and drag input of a mouse. In some embodiments, the first magnitude of the movement corresponds to an amount of movement associated with a dragging associated with an input, such as the dragging described in the examples above, and/or corresponds to an amount of requested movement of the virtual content due to the input. For example, the input recited in block 1302*b* of FIG. 13 optionally includes a hand movement of a user (e.g., as part of an air pinch and drag input, or as part of a touch and drag input), the magnitude of which optionally normally corresponds to a virtual object that is being controlled by the hand movement to be moved in the environment by an amount corresponding the first magnitude. Similarly, the input recited in block 1302*b* of FIG. 13 optionally includes a hand movement of a user (e.g., as part of an air pinch and drag input, or as part of a touch and drag input), the direction of which optionally normally corresponds to a virtual object that is being controlled by the hand movement to be moved in the environment in a first direction, such as the first direction described below. In some embodiments, the input of block 1302*b* of FIG. 13 is based on requested movement of a frame, such as the frame through which the 3D content is visible described with reference to method 1200. For example, when an input to move the frame is detected, the computer system optionally moves the virtual window and detecting the input corresponding to a request to move the virtual content relative to the three-dimensional environment is optionally the detection of that input to move the frame and/or of the resulting movement of the frame.

In some embodiments, in response to detecting the input corresponding to the request to move the virtual content relative to the three-dimensional environment, in accordance with a determination that the content horizon is aligned with the environment horizon in a first manner (e.g., the content horizon is parallel to the environment horizon and/or the content horizon is in a same location as the environment horizon) and the input corresponds to a request to move the virtual content in a first direction relative to the three-dimensional environment that would decrease an alignment between the content horizon and the environment horizon, such as shown in FIG. 11K with content horizon 1112*b* being aligned with environment horizon 1112*a*, the computer system suppresses (1302*c*) movement of the virtual content in the first direction including suppressing at least a portion of the movement of the content horizon in the first direction relative to the environment horizon (e.g., forgoing moving the content horizon in the first direction or moving the content horizon less in the first direction than requested), such as shown with the computer system forgoing movement of the content horizon 1112*b* relative to the environment horizon 1112*a* from FIG. 11K to 11L though movement of the virtual content 1102 was requested.

In some embodiments, movement of the virtual content in the first direction would decrease the alignment because the content horizon would be moving further away from the environment horizon if moved in the first direction. Additionally or alternatively, in some embodiments, movement of the virtual content in the first direction would decrease the alignment because content horizon would shift in height relative to a height of the environment horizon if moved in the first direction. Additionally or alternatively, in some embodiments, movement of the virtual content in the first direction would decrease the alignment because the content horizon would be moving in a manner that would cause the content horizon to no longer be coincident with the environment horizon (e.g., relative to the 3D environment and/or the viewpoint of the user) if moved in the first direction. Additionally or alternatively, in some embodiments, movement of the virtual content in the first direction would decrease the alignment because the content horizon would be moving in a manner that would cause the content horizon to no longer be parallel (and/or to no longer be within 0.5, 1, or 5 degrees of being parallel) with the environment horizon if moved in the first direction and/or that would cause the content horizon to be less parallel with the environment horizon than when the input recited in block 1302*b* of FIG. 13 is detected. Additionally or alternatively, in some embodiments, movement of the virtual content in the first direction would decrease the alignment because the portion of the virtual content that intersects the horizon of the environment when the input of block 1302*b* of FIG. 13 is detected would no longer be intersecting the environment horizon if moved in the first direction. It should be noted that when the computer system is suppression movement of the virtual content, the virtual content is not being moved as requested; rather the computer system is suppressing movement of the virtual content from being the requested movement (e.g., it is no movement or less than the requested movement). Suppressing movement of virtual content when doing so would decrease an alignment of the content horizon and the environment horizon maintains the alignment of the content horizon and the environment horizon, and provides further feedback that the content horizon and the environment horizon are aligned, which may reduce errors resulting from undesired movements of the virtual content, reduces unintentional changes in alignment, and reduces user discomfort due to unintentional changes in alignment.

In some embodiments, in response to detecting the input corresponding to the request to move the virtual content relative to the three-dimensional environment, in accordance with a determination that the content horizon is aligned with the environment horizon in the first manner (e.g., the content horizon is parallel to the environment horizon and/or the content horizon is in a same location as the environment horizon) and the input includes a request to move the virtual content in both, the first direction relative to the three-dimensional environment that would decrease the alignment between the content horizon and the environment horizon, such as direction 1136*a* in FIG. 11K, and a second direction relative to the three-dimensional environment that would maintain the alignment between the content horizon and the environment horizon in the first manner, such as direction 1138*a* in FIG. 11K, the computer system concurrently moves the virtual content in the second direction relative to the three-dimensional environment (e.g., by the amount of movement in the second direction that is requested), and suppresses movement of the virtual content in the first direction including suppressing the at least the portion of the movement of the content horizon in the first direction relative to the environment horizon (e.g., forgoing moving the content horizon in the first direction or moving the content horizon less in the first direction than requested). For example, if the computer system were to detect the input requesting movement of the virtual content 1102 in both direction 1136*a* and direction 1138*a*, then the computer system would in response optionally move the virtual content 1102 as shown from FIG. 11K to 11S in the direction 1138*a* while not moving the virtual content 1102 in the direction 1136*a*. For example, the first direction is a vertical direction relative to the three-dimensional environment and the second direction is a horizontal direction relative to the three-dimensional environment, and in response to an input that is received when the content horizon is aligned with the environment horizon and that includes a request to move the virtual content in a direction that includes both vertical and horizontal components, the computer system optionally moves the virtual content horizontally relative to the three-dimensional environment without moving the virtual content vertically, or moves the virtual content horizontally relative to the three-dimensional environment and vertically but less than the amount of vertical movement requested in the input. Moving the virtual content while suppressing movement of the content horizon relative to the environment horizon when the horizons are aligned maintains the alignment of the content horizon and the environment horizon during the moving of the virtual content, provides further feedback that the content horizon is aligned with the environment horizon, which may reduce errors resulting from undesired movements of the virtual content, reduces unintentional changes in alignment, and reduces user discomfort due to unintentional changes in alignment.

In some embodiments, in response to detecting the input corresponding to the request to move the virtual content relative to the three-dimensional environment, in accordance with a determination that the content horizon is not aligned with the environment horizon and the input includes a request to move the virtual content in a respective direction (e.g., the first direction or another direction) relative to the three-dimensional environment that would move the content horizon further away from being aligned with the environment horizon in the first manner (e.g., the movement would further decrease the alignment), wherein the input corresponds to a request to move the virtual content relative to the three-dimensional environment by a first amount, the computer system moves the virtual content in the respective direction by the first amount, including moving the content horizon relative to the environment horizon. For example, in FIG. 11O the content horizon 1112*b* is not aligned with the environment horizon 1112*a*, and the computer system optionally detects the input to move the virtual content 1102 from its illustrated location to the location illustrated in FIG. 11P and in response the computer system optionally moves the virtual content 1102 to the location illustrated in FIG. 11P. For example, the computer system moves the virtual content in accordance with the requested movement (e.g., by the first amount), without an additional movement that is not in accordance with the requested movement). In an example, movement of the virtual content in the respective direction would increase a vertical distance between the content horizon and the environment horizon in the three-dimensional environment and/or would increase an angular distance between the content horizon and the environment horizon. When the input is associated with requested movement in the respective direction and the content horizon is not aligned with the environment horizon upon detection of the input, the computer system optionally moves the virtual content in the respective direction by the requested amount of movement (e.g., without suppression of movement or an otherwise movement that does not directly correspond to the requested amount of movement). It should be noted that when the computer system is moving the virtual content in accordance with the requested movement, the virtual content is being moved as requested by the input (e.g., it is not additionally being suppressed or accelerated in movement or otherwise moved in a different way than requested). As such, conditioned that the content horizon is not aligned with the environment horizon and that the requested movement of the virtual content includes a request for movement of the virtual content in a direction that would further move the content horizon away from the environment horizon, the computer system optionally moves the virtual content in accordance with the requested movement. Moving the virtual content, including moving its horizon relative to the environment horizon, in accordance with the requested movement when the requested movement would further move the content horizon away from the environment horizon indicates that movement of the virtual content directly corresponds to the requested movement, which maintains the equality of requested amounts of movement to resulting amounts of movement, and reduces user inputs associated with correcting movements of the virtual content that is not in accordance with the requested movement of the virtual content, and further maintains a spatial arrangement of the virtual content and its horizon, and reduces user discomfort due to unintentional changes to the spatial arrangement of the virtual content and its horizon.

In some embodiments, in response to detecting the input corresponding to the request to move the virtual content relative to the three-dimensional environment, and in accordance with a determination that the content horizon is not aligned with the environment horizon and the input includes a request to move the virtual content in a respective direction relative to the three-dimensional environment that is toward alignment of the content horizon with the environment horizon and that the input includes a request to move the content horizon to within a threshold of alignment in the first manner with the environment horizon (e.g., is within 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon) but less than alignment in the first manner, the computer system moves the virtual content relative to the three-dimensional environment, including moving the content horizon in the respective direction relative to the three-dimensional environment that is toward alignment of the content horizon with the environment horizon, including aligning the content horizon with the environment horizon in the first manner. For example, as shown in FIG. 11AG, in side view 1150$a$, the content horizon 1112$b$ is not aligned with the environment horizon 1112$a$, and the computer system detects the input to move the content horizon 1112$b$ to within the threshold of alignment, but less than aligned, and in response the computer system moves the content horizon 1112$b$ to alignment, as shown in side views 1150$b$-1150$d$, and aligns the content horizon 1112$b$ with the environment horizon 1112$a$ as shown in side view 1150$e$, even though the requested movement corresponded to less than alignment, which is optionally illustrated with the frame 1134 being maintained in position in side view 1150$d$ to side view 1150$e$ while the virtual content is being aligned. For example, when input to move the content is detected, the content horizon and the environment horizon are optionally at different horizontal levels (e.g., at different heights) in the three-dimensional environment, and more particularly, the content horizon is not within a threshold of alignment in the first manner with the environment horizon (e.g., the distance between the content horizon and the environment horizon is optionally greater than a threshold distance and/or an angular difference between the content horizon and the environment horizon is greater than a greater threshold angular distance). Continuing with this example, the input includes a request to move the virtual content in the three-dimensional environment, including moving the content horizon toward alignment with the environment horizon (e.g., reducing a distance between the content horizon and the environment horizon, and/or reducing an angular difference between the content horizon and the environment horizon) to where the content horizon is within the threshold of alignment in the first manner but is less than alignment in the first manner. Continuing with this example, in response to the input, the computer system optionally automatically snaps to alignment in the first manner the content horizon with the environment horizon (e.g., the computer system further reduces the distance between the content horizon and the environment horizon, and/or further reduces the angular difference between the content horizon and the environment horizon such that the content horizon is aligned with the environment horizon in the first manner). For example, if when the input ceases, the content is within the threshold of alignment in the first manner but is less than alignment in the first manner, or if, at a specific time during detection of the input, the input includes requested movement that is to the content horizon being within the threshold of alignment with the environment horizon, then the computer system optionally automatically aligns the content horizon with the environment horizon (e.g., the computer system moves further the virtual content so that its horizon is aligned with the environment horizon). Thus, if the content horizon is not aligned with the environment horizon and the movement request of the input includes a request for movement of the content horizon to within a threshold from alignment in the first manner, but to less than alignment in the first manner, the computer system optionally aligns (e.g., automatically snaps) the content horizon to the environment horizon. Snapping the content horizon to the environment horizon in response to requested movement that corresponds to less than but near alignment of the content horizon with the environment horizon provides a method to align the horizons without user input that specifically includes requested movement that is to perfect alignment of the content horizon with the environment horizon, and reduces user inputs involved in aligning the content horizon with the environment horizon, which further reduces user discomfort when interacting with the computer system.

In some embodiments, in response to detecting the input corresponding to the request to move the virtual content relative to the three-dimensional environment, in accordance with a determination that the content horizon is not aligned with the environment horizon and the input includes the request to move the virtual content in the respective direction relative to the three-dimensional environment that is toward alignment of the content horizon with the environment horizon, and in accordance with a determination that the input includes a request to move the content horizon to not within the threshold of alignment in the first manner with the environment horizon, the computer system moves the virtual content relative to the three-dimensional environment, including moving the content horizon in the respective direction relative to the three-dimensional environment that is toward alignment of the content horizon with the environment horizon, without aligning the content horizon with the environment horizon. For example, in FIG. 11P, the computer system detects a request to move the content horizon 1112$b$ toward alignment with environment horizon 1112$a$, but not to within the threshold of alignment, so in response, the computer system moves the content horizon 1112$b$ as shown from FIG. 11P to 11Q, which does not include the content horizon 1112$b$ being aligned with the environment horizon 1112$a$. For example, provided the above-recited conditions are met, the computer system optionally moves the virtual content, including its content horizon, in accordance with the requested movement. It should be noted that when the computer system is moving the virtual content in accordance with the requested movement, the virtual content is being moved as requested by the input (e.g., it is not additionally being suppressed or accelerated in movement or otherwise moved in a different way than requested). For example, when input to move the content is detected, the content horizon and the environment horizon are at different horizontal levels (e.g., at different heights) in the three-dimensional environment, and more particularly, the content horizon is not within the threshold of alignment in the first manner with the environment horizon (e.g., the distance between the content horizon and the environment horizon is greater than a threshold distance). Continuing with this example, the input includes a request to move the virtual content in the three-dimensional environment, including moving the content horizon toward alignment with the environment horizon (e.g., reducing a distance between the content horizon and the environment horizon, and/or reducing an angular difference between the content horizon and the environment horizon) but to less than being within the threshold of alignment in the first manner. Continuing with this example, in response to the input, the computer system moves the virtual content in three-dimensional environment but does not additionally move the content horizon to being aligned with the environment horizon in the first manner. For example, if when the input ceases, the content horizon is moved closer to alignment with the environment horizon but is not within the threshold of alignment in the first manner, or if the input never includes requested movement that is to the content horizon being within the threshold of alignment with the environment horizon, then the computer system optionally maintains the location of the content horizon in the three-dimensional environment without moving further the virtual content so that its horizon is aligned with the environment horizon in the first manner (e.g., without automatically aligning the content horizon with the environment horizon). Thus, if the content horizon is not aligned with the environment horizon and the movement request of the input includes a request for movement of the content horizon toward alignment but not within a threshold distance from alignment, the computer system optionally does not align (e.g., does not automatically snap) the content horizon with the environment horizon in the first manner, but rather, maintains the location of the content horizon relative to the environment horizon. Moving the virtual content including moving the content horizon toward alignment with the environment horizon without aligning them in response to requested movement that is not to within the threshold of alignment and that is detected while the content horizon is not aligned with the environment horizon provides a method to move the content horizon in accordance with the requested movement, without further movement beyond the requested movement, thus maintaining a correspondence of the requested movement with the resulting movement and reducing user discomfort when interacting with the computer system.

In some embodiments, detecting the input corresponding to the request to move the virtual content relative to the three-dimensional environment includes detecting a first part of the request for first movement of the virtual content in the first direction, such as input from user requesting movement of virtual content 1102 in direction 1136a, and following the first part, a second part of the request for second movement of the virtual content in the first direction, such as input from user requesting movement of virtual content 1102 in direction 1136a in FIG. 11K. For example, the input optionally includes movement of a hand of a user in an air pinch position from a first location to a third location, in between the first and third locations is a second location, and moving from the first location to the third location includes movement of the hand of the user in the an air pinch position from the first location to the second location followed by movement of the hand of the user in the air pinch position from the second location to the third location. Continuing with this example, the first part of the first request for first movement of the virtual content in the first direction includes the movement of the hand from the first location to the second location, and the second part of the request for second movement includes movement of the hand from the second location to the third location.

In some embodiments, in response to detecting the first part of the request for first movement of the virtual content in the first direction, and in accordance with the determination that the content horizon is aligned with the environment horizon in the first manner, the computer system suppresses the at least the portion of the movement of the content horizon in the first direction corresponding to the first part of the request relative to the environment horizon (e.g., forgoing moving the content horizon in the first direction or moving the content horizon less in the first direction than requested), such as shown with the computer system forgoing movement of the content horizon 1112b relative to the environment horizon 1112a from FIG. 11K to 11L though movement of the virtual content 1102 was requested. For example, the computer system optionally maintains the alignment of the content horizon with the environment horizon by forgoing moving content horizon relative to the environment horizon. In some embodiments, in response to detecting the second part of the request for second movement of the virtual content in the first direction that follows the first part, after suppressing the at the least the portion of the movement of the content horizon in the first direction relative to the environment horizon, the computer system moves the virtual content relative to the three-dimensional environment, including moving the content horizon in the first direction relative to the environment horizon corresponding to the second part of the request without suppressing the movement of the content horizon corresponding to the second part of the request, such as shown with the computer system moving the content horizon 1112b relative to the environment horizon 1112a from FIG. 11N to 110. For example, the computer system optionally moves the virtual content as requested by the second part of the request (e.g., moves the virtual content by the amount of movement that is requested by the second part of the requested movement, optionally without suppression or additional movement beyond the amount of movement that is requested by the second part of the requested movement). In some embodiments, the requested movement includes the first and second parts and the second part of the requested movement includes a first respective part and following the first respective part, a second respective part, and the computer system suppresses movement of the virtual content in the first direction in response to detecting the first part, accelerates movement of the virtual content in the first direction (thus breaking the alignment of the content horizon and the environment horizon in the first manner) in response to detecting the first respective part of the second part, and moves the virtual content in the first direction in accordance with the second respective part in response to detecting the second respective part of the second part. As such, when the input to move the virtual content a first part followed by a second part in the first direction, the computer system suppresses the movement of the virtual content in response to the first part and then breaks the alignment of the content horizon with the environment horizon in response to the second part, optionally such that the new location of the content horizon relative to the environment horizon would correspond to the amount of movement associated with the second part. A rate of movement of the virtual content, if any, that is in response to the first part is optionally less than a rate of movement of the virtual content that is in response to the second part. Suppressing movement of the content horizon relative to the environment horizon in response to a first part of requested movement that would break alignment of the content horizon with the environment horizon provides a visual notice that the content horizon is aligned with the environment horizon, and then moving it without suppression in response to a subsequent part of the requested movement that is in the same direction as the first part provides a visual notice that the alignment is being broken, and together these notices indicate the different alignment states of the content horizon with the environment horizon and reduce errors in user interaction with the computer system.

In some embodiments, the computer system concurrently displays, via the one or more display generation components, a frame for the virtual content and the virtual content in the frame for the virtual content, such as frame 1134 and virtual content 1102 in the frame 1134 in FIG. 11J. The frame is optionally as described with reference to the frame for the 3D content described with reference to method 1200. As such, the virtual content is visible and/or displayed through the frame.

In some embodiments, while concurrently displaying the frame for the virtual content and the virtual content in the frame for the virtual content, and in response to detecting the input corresponding to the request to move the virtual content relative to the three-dimensional environment, the computer system moves the frame for the virtual content in accordance with the request to move the virtual content relative to the three-dimensional environment independent of a state of movement of the virtual content (and/or optionally independent of a state of alignment of the content horizon and the environment horizon), such as the moving of the frame 1134 in response to the request to move the virtual content 1102 from FIG. 11K to 11L. For example, the computer system optionally moves the frame in accordance with the request independent of the state of movement of the virtual content that is in response to the input. As another example, movement of the frame is optionally in accordance with the requested movement associated with the input, without suppression (or acceleration) of the movement of the frame different from the requested movement, even if the virtual content is being suppressed in movement such as described above with reference to step 1302c of method 1300 (or accelerated in movement such as in the snapping of the content horizon to the environment horizon described above with reference to embodiment(s) of method 1300). As another example, while displaying the frame and the virtual content, the frame responds to the input for moving the virtual content by moving in the direction associated with the input in response to the input, even if the virtual content is not being moved (e.g., is being suppressed from movement) in the direction associated with the input. Further, in some embodiments, the computer system additionally or alternatively moves the frame in accordance with the request to move the virtual content relative to the three-dimensional environment. As such, while displaying the frame and the virtual content, the frame moves in accordance with the input independently of whether the virtual content is being moved relative to the three-dimensional environment in response to the input. Moving the frame independent of a state of movement or alignment of the content horizon with the environment horizon in response to the requested movement provides visual feedback that the computer system is responding to the request for movement, which reduces errors with interacting with the computer system.

In some embodiments, while suppressing the at least the portion of the movement of the content horizon in the first direction relative to the environment horizon (e.g., while forgoing moving the content horizon in the first direction or moving the content horizon less in the first direction than requested), the computer system moves the frame for the virtual content in the first direction relative to the environment horizon such that an amount of movement of the frame for the virtual content in the first direction relative to the environment horizon is more than an amount of movement of the virtual content in the first direction relative to the environment horizon, such as the moving of frame 1134 without movement of virtual content 1102 from FIG. 11K to 11M. As another example, frame 1134 and virtual content 1102 are optionally moved, but virtual content 1102 is moved less than frame 1134 such as virtual content 1102 optionally being moved less than frame 1134 from FIG. 11K to 11M. For example, the virtual content of step(s) 1302 of method 1300 is optionally being displayed in the frame for the virtual content and when movement of the virtual content is being suppressed, such as described with reference to step 1302c of method 1300, the computer system optionally concurrently suppresses the movement of the virtual content as described with reference to step 1302c of method 1300 (e.g., forgoes moving the content horizon in the first direction or moves the content horizon less in the first direction than requested) and moves the frame in the first direction relative to the environment horizon such that the amount of movement of the frame for the virtual content in the first direction relative to the environment horizon is more than the amount of movement of the virtual content in the first direction relative to the environment horizon. As such, when movement of the virtual content is being suppressed, the frame moves more than the virtual content in the first direction. Moving the frame more than virtual content when the content horizon is being suppressed from movement relative to the environment horizon in response to the requested movement provides visual feedback that the computer system is responding to the request for movement, which reduces errors with interacting with the computer system.

In some embodiments, in response to detecting the input corresponding to the request to move the virtual content relative to the three-dimensional environment, and while not suppressing the at least the portion of the movement of the content horizon in the first direction relative to the environment horizon (e.g., while not forgoing moving the content horizon in the first direction or moving the content horizon less in the first direction than requested), the computer system concurrently moves relative to the three-dimensional environment the frame for the virtual content, and moves the virtual content, wherein a spatial arrangement (e.g., relative positions and/or orientations) between the frame for the virtual content and the virtual content is maintained during the concurrent movement of the frame for the virtual content and the virtual content. For example, in side views 1150a through 1150d in FIG. 11AG, movement of content horizon 1112b is not being suppressed, and frame 1134 and virtual content 1102 are being moved together so the spatial arrangement between them is maintained during the illustrated movement. The spatial arrangement between the frame for the virtual content and the virtual content is optionally as described with reference to the spatial arrangement between the frame for the 3D content and the 3D content of embodiment(s) of method 1200, and maintaining it during the concurrent movement includes maintaining the position and/or orientation of the frame relative to the virtual content during the movement. For example, in response to the input, and when movement of the virtual content movement is not being suppressed, the computer system optionally maintains the position and/or orientation of the frame relative to the virtual content, which is understood to be the same as maintaining the position and/or orientation of the virtual content relative to the frame such the spatial arrangement to the virtual content and frame is maintained during the movement. As such, when movement of the virtual content movement is not being suppressed, the frame moves in sync with the virtual content (e.g., at the same angular and/or tangential rates of movement) relative to the three-dimensional environment. Additionally, or alternatively, in some embodiments, in response to detecting the input corresponding to the request to move the virtual content relative to the three-dimensional environment, when the virtual content is being moved in accordance with requested movement (e.g., in the first direction or in a second direction opposite (e.g., 180 degrees offset from the first direction, or in another direction (e.g., 30, 45, or 90 degrees offset from the first direction) without a suppression or acceleration of movement from being in accordance with the requested movement), the computer system optionally concurrently moves in the three-dimensional environment the frame for the virtual content, and the virtual content, wherein the spatial arrangement (e.g., relative positions and/or orientations) between the frame for the virtual content and the virtual content is maintained during the concurrent movement of the frame for the virtual content and the virtual content. In some embodiments, during movement of the virtual content in accordance with the request, the virtual content is not being suppressed in movement from being as requested, such as described with reference to the suppression of movement of the content horizon described in embodiment(s) of method 1300, and is not being accelerated in movement beyond the requested movement, such as described with reference to the snapping operation described in embodiment(s) of method 1300. Moving the frame in sync with movement of the virtual content when the content horizon is not being suppressed from movement in response to the requested movement maintains the spatial arrangement of the virtual content and the fame during their movement, which reduces errors with interacting with the computer system.

In some embodiments, while concurrently displaying the frame for the virtual content and the virtual content in the frame for the virtual content, in response to detecting the input corresponding to the request to move the virtual content relative to the three-dimensional environment, in accordance with a determination that the content horizon is not aligned with the environment horizon and the input includes a request to move the virtual content in a direction relative to the three-dimensional environment that is toward alignment of the content horizon with the environment horizon, and that the input includes a request to move the content horizon to within a threshold of alignment with the environment horizon in the first manner (e.g., is within 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon), the computer system moves the virtual content, including moving the content horizon, by a first amount relative to the three-dimensional environment (e.g., by a first angular distance relative to the viewpoint of the user), to within the threshold of alignment with the environment horizon in the first manner, including aligning the content horizon with the environment horizon in the first manner, such as the illustrated movement of frame 1134 in side views 1150*a* through 1150*e* in FIG. 11AG.

In some embodiments, while concurrently displaying the frame for the virtual content and the virtual content in the frame for the virtual content, in response to detecting the input corresponding to the request to move the virtual content relative to the three-dimensional environment, in accordance with a determination that the content horizon is not aligned with the environment horizon and the input includes a request to move the virtual content in a direction relative to the three-dimensional environment that is toward alignment of the content horizon with the environment horizon, and that the input includes a request to move the content horizon to within a threshold of alignment with the environment horizon in the first manner, the computer system moves the frame for the virtual content, by a second amount relative to the three-dimensional environment (e.g., by a second angular distance relative to the viewpoint of the user), toward the environment horizon, concurrently with the moving the content horizon by the first amount, wherein the first amount is greater than the second amount, such as the illustrated movement of virtual content 1102 in side views 1150*a* through 1150*e* in FIG. 11AG in which from side view 1150*d* to 1150*e*, the frame 1134 is not moving while the virtual content 1102 is continued in movement toward alignment of content horizon 1112*b* with environment horizon 1112*a*. The second amount is optionally the amount of the requested movement of the virtual content. For example, provided that the above-recited conditions are met, the computer system optionally moves the frame in accordance with the movement associated with the detected input and moves the content horizon to alignment in the first manner with the environment horizon, which is a movement that is more than the requested movement. As such, the computer system additionally moves the virtual content beyond the amount of movement associated with the detected input by way of aligning the content horizon with the environment horizon in the first manner when the input only requested for movement of the content horizon to within a threshold of alignment with the environment horizon in the first manner but less than alignment of the content horizon with the environment horizon in the first manner. Continuing with this example, the amount of movement of the virtual content relative to the three-dimensional environment would optionally be greater than the amount of movement of the frame relative to the three-dimensional environment because the computer system does not provide additional movement of the frame; rather the frame optionally moves in accordance with the movement associated with the detected input. As such, while the content horizon of the virtual content is being snapped to alignment with the environment horizon in the first manner, the virtual content moves more than the frame and/or is moving even if the frame is not being moved. Additionally or alternatively, in some embodiments, while concurrently displaying the frame for the virtual content and the virtual content in the frame for the virtual content, in response to detecting the input corresponding to the request to move the virtual content relative to the three-dimensional environment, in accordance with a determination that the content horizon is not aligned with the environment horizon and the input includes a request to move the virtual content in a direction relative to the three-dimensional environment that is toward alignment of the content horizon with the environment horizon, and that the input includes a request to move the content horizon to not within the threshold of alignment with the environment horizon in the first manner (e.g., to not within 3, 2, 1, 0.8, 0.5, 0.3, 0.1, 0.05 m, or another distance of being coincident with the environment horizon and/or to not within 20, 15, 10, 9, 5, 1 degrees, or another degree of being parallel with the environment horizon), the computer system concurrently moves the virtual content, including moving the content horizon, by a first amount relative to the three-dimensional environment (e.g., by a first angular distance relative to the viewpoint of the user) in accordance with the input and moves the frame for the virtual content, by the first amount relative to the three-dimensional environment (e.g., by the first angular distance relative to the viewpoint of the user), toward the environment horizon. Showing more movement of the virtual content than of the frame during the snapping of the content horizon to the environment horizon in response to the requested movement indicates that the snapping of the virtual content to alignment with the environment horizon is an additional movement beyond the requested movement, reduces errors associated with misunderstanding the movements of the virtual and of the frame, and reduces user discomfort when interacting with the computer system.

In some embodiments, while concurrently displaying the frame for the virtual content and the virtual content in the frame for the virtual content, such as frame 1134 and virtual content 1102 in FIG. 11Y, wherein the virtual content is being displayed in a framed mode of display in which the virtual content occupies a first amount of an available field of view from a viewpoint of the user (e.g., the second amount of the available field of view from the current viewpoint of the user described with reference to embodiment(s) of method 1200), the computer system detects an input corresponding to a request to transition to displaying the virtual content in an expanded mode of display, different from the framed mode of display, such as selection of user interface element 1124a in FIG. 11Y.

In some embodiments, in response to detecting the input corresponding to the request to transition to displaying the virtual content in the expanded mode of display, the computer system displays, via the one or more display generation components, the virtual content in the expanded mode of display, in which the virtual content occupies a second amount of the available field of view from the viewpoint of the user that is greater than the first amount (e.g., the first amount of the available field of view from the current viewpoint of the user described with reference to embodiment(s) of method 1200), such as the virtual content 1102 being displayed in the immersive mode in FIG. 11AB in response to selection of user interface element 1124a in FIG. 11Y. When the frame and virtual content are being concurrently displayed, the virtual content it being displayed in a framed mode of display, such as the framed mode of display described with reference to the framed mode of display of embodiments(s) of method 1200. The expanded mode of display is optionally as described with reference to the immersive mode of display of embodiments(s) of method 1200. The detecting the input corresponding to the request to transition to displaying the virtual content in the expanded mode of display is optionally as described with reference to detecting the event corresponding to the triggering condition for transitioning from displaying the 3D content in the framed mode of display to displaying the 3D content in the immersive mode of display of in the discussion of embodiments(s) of method 1200. For example, the input optionally includes attention (e.g., based on gaze) directed at a user interface element selectable to display the virtual content in the expanded mode of display, optionally while the hand of the user is in an air pinch pose, such as the user interface element selectable to display the 3D content in the immersive mode of display, optionally while the hand of the user is in an air pinch pose, as described in the discussion of embodiments(s) of method 1200. Displaying the virtual content in the expanded mode of display is optionally as described with reference to displaying the 3D content in the immersive mode of display in the discussion of embodiments(s) of method 1200. The amounts of available fields of views from the viewpoint of the user are optionally as described with reference to the first and second amounts of available field of views described in the discussion of embodiments(s) of method 1200. As such, while displaying the virtual content in the framed mode, the computer system optionally detects a request to expand the virtual content out of the frame and in response displays the virtual content in the expanded mode of display. Facilitating transition of the virtual content from the framed mode to the expanded mode allows display of different amounts of an available field of view of the virtual content, permits visibility of more of the virtual content when in the expanded mode since more of the available field of view of the virtual content is visible in the expanded mode, reduces user discomfort because the user can change the mode of display of the virtual content, and reduces errors in interaction with the computer system.

In some embodiments, in response to detecting the input corresponding to the request to transition to displaying the virtual content in the expanded mode of display, in accordance with a determination that the content horizon is not aligned with the environment horizon and is within a first threshold of alignment with the environment horizon in the first manner (e.g., is within 4, 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon), the computer system moves the virtual content, including aligning the content horizon with the environment horizon in the first manner so that the content horizon of the virtual content is aligned with the environment horizon in the first manner in the expanded mode of display, such as the consecutive moving of content horizon 1112b to alignment while transitioning from the framed mode to the immersive mode as shown in side views 1158a through 1158d of FIG. 11AK. As such, if the content horizon of the virtual content is within the threshold of alignment with the environment horizon when the input to display the virtual content in the expanded mode is detected, in response to the input the computer system moves the virtual content in the three-dimensional environment (e.g., automatically without detecting an input for moving the virtual content relative to the three-dimensional environment and/or without detecting an input specifically for aligning the virtual content) such that the content horizon is aligned with the environment horizon in the first manner. In this way, when the virtual content is displayed in the expanded mode of display, the content horizon is aligned with the environment horizon in the first manner. Thus, the computer system optionally aligns the content horizon without input dedicated to doing such in response to the input to display the virtual content in the expanded mode. Aligning the content horizon with the environment horizon in response to detecting the input to display the virtual content in the expanded mode when the content horizon is not aligned and is within a threshold of alignment provides a method to align the horizons of the content and environment without user input specifically directed to doing so, which enhances user experience with the computer system and reduces amount of user inputs involved with aligning the horizons of the content and the environment.

In some embodiments, aligning the content horizon with the environment horizon in the first manner in response to detecting the input corresponding to the request to transition to displaying the virtual content in the expanded mode of display includes, in accordance with a determination that the content horizon is within a first respective threshold of alignment with the environment horizon (e.g., is within 4, 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon), displaying a first transition of aligning the content horizon with the environment horizon without displaying a second transition of aligning the content horizon with the environment horizon in the first manner, such as the consecutive moving of content horizon $1112b$ to alignment while transitioning from the framed mode to the immersive mode as shown in side views $1158a$ through $1158d$ of FIG. 11AK. For example, the first transition optionally includes a showing of a gradual moving of the virtual content, including of the content horizon, toward alignment of the content horizon with the environment horizon in the first manner, such that the one or more display generation components show the virtual content moving through a plurality of intermediate locations until the content horizon is aligned with the environment horizon in the first manner.

In some embodiments, aligning the content horizon with the environment horizon in the first manner in response to detecting the input corresponding to the request to transition to displaying the virtual content in the expanded mode of display includes, in accordance with a determination that the content horizon is not within the first respective threshold of alignment with the environment horizon and is within a second respective threshold of alignment that is greater than the first threshold of alignment with the environment horizon (e.g., is within 6, 4, 3, 2, 1, 0.8, 0.5, 0.3, 0.1, 0.05 m, or another distance of being coincident with the environment horizon and/or is within 20, 15, 10, 9, 5, 1 degrees, or another degree of being parallel with the environment horizon and greater than the first threshold of alignment), displaying the second transition of aligning the content horizon with the environment horizon without displaying the first transition of aligning the content horizon with the environment horizon in the first manner, such as the cross-fade animation of virtual content 1102 whose content horizon $1112b$ is not aligned with environment horizon $1112a$ decreasing in visual prominence while the virtual content 1102 whose content horizon $1112b$ is aligned with environment horizon $1112a$ is increasing in visual prominence as shown in the consecutive side views $1160a$ through $1160d$ of FIG. 11AL. For example, the second transition optionally includes a crossfade animation where 1) the virtual content that is visible via the frame and whose content horizon is not aligned in the first manner with the environment horizon is maintained in location while being reduced in visual prominence (e.g., fading away) along with the frame and 2) virtual content is displayed (e.g., fades-in or otherwise increases in visual prominence) at a location where the content horizon is aligned in the first manner with the environment horizon. As such, the second transition optionally does not include showing moving of the virtual content that was framed through a plurality of intermediate locations in the three-dimensional environment. Thus, the computer system optionally displays different transitions of aligning the content horizon with the environment horizon based on whether the content horizon is within a first or second respective threshold of alignment with the environment horizon with the input to display the virtual content in the expanded mode is detected. Showing different transitions to alignment based on how aligned the content horizon is to the environment horizon when the input to display the virtual content in the expanded mode is detected provides visual feedback of how aligned the content horizon is to the environment horizon when the input is detected and provides a visual indication of why the computer system is performing a specific transitions, which increases user understanding of the computer system and reduces computing resource usage associated with detecting and processing user inputs for correcting errors due to misunderstanding the computer system.

In some embodiments, the first transition of aligning the content horizon with the environment horizon includes maintaining display of a first amount of spatial context (e.g., of the virtual content) during the first transition, such as the maintaining of display of virtual content 1102 while content horizon $1112b$ is moving to alignment while transitioning from the framed mode to the immersive mode as shown in side views $1158a$ through $1158d$ of FIG. 11AK.

In some embodiments, the second transition of aligning the content horizon with the environment horizon includes maintaining a second amount of spatial context (e.g., of the virtual content) during the second transition, less than the first amount of spatial context (or optionally maintaining no spatial context at all during the second transition), such as the reduction in spatial context that is due to the reducing in visual prominence of virtual content 1102 whose content horizon $1112b$ is not aligned with environment horizon $1112a$ decreasing in visual prominence as shown in the consecutive side views $1160a$ through $1160d$ of FIG. 11AL. In some embodiments, an amount of spatial context refers to how much of the displayed and/or visible three-dimensional environment is maintained before, during and/or after the transition. Maintenance of a higher amount of spatial context optionally corresponds to a larger portion and/or percentage of the displayed or visible three-dimensional environment being maintained before, during and/or after the transition, and maintenance of a lower amount of spatial context optionally corresponds to a smaller portion and/or percentage of the displayed or visible three-dimensional environment being maintained before, during and/or after the transition. For example, for the first transition, the computer system optionally maintains display of the virtual content that was displayed when the input to display the virtual content in the expanded mode was detected and shows movement of that virtual content through a plurality of intermediate locations, which would optimally mean that the user's spatial context relative to the virtual content is being maintained, and for the second transition, the computer system optionally performs a crossfade that ceases display of the virtual content that is framed and initiates in display the virtual content having its content horizon aligned in the first manner with the environment horizon, which optionally means that less spatial context, if any, is being maintained during the second transition. Maintaining more spatial context during the first transition to alignment provides visual feedback that assists the user with understanding what is going on in the first transition to alignment, which increases user understanding of the computer system and reduces computing resource usage associated with detecting and processing user inputs for correcting errors due to misunderstanding the computer system.

In some embodiments, in response to detecting the input corresponding to the request to transition to displaying the virtual content in the expanded mode of display, in accordance with a determination that the content horizon is not aligned with the environment horizon and is more than a first threshold of alignment (e.g., the first threshold of alignment described above with reference to embodiment(s) of method 1300) away from alignment with the environment horizon in the first manner, the computer system forgoes aligning the content horizon with the environment horizon so that the content horizon of the virtual content is not aligned with the environment horizon in the expanded mode of display (e.g., maintaining the spatial arrangement of the content horizon relative to the environment horizon), such as content horizon 1112b being maintained relative to environment horizon 1112a from side view 1162a to 1162b during the transition from the framed mode to the immersive mode in FIG. 11AM. For example, the position of the content horizon relative to the environment horizon when the input is detected is maintained in response to the input. As such, when the content horizon is more than the first threshold of alignment away from alignment with the environment horizon in the first manner when the input to display the virtual content in the expanded mode is detected, in response to the input to display the virtual content in the expanded mode the computer system optionally displays the virtual content in the expanded mode and maintains the position of the content horizon relative to the environment horizon (e.g., without aligning the content horizon to the environment horizon). Maintaining the content horizon as unaligned relative to the environment horizon in response to the input to display the virtual content in the expanded mode when, at the time the input is detected, the content horizon is not aligned and is more than the first threshold away from alignment provides consistency of interaction with the virtual content between the framed and expanded mode of display of the virtual content, which make user interaction with the computer system more efficient.

It should be understood that the particular order in which the operations in method 1300 have been described is merely exemplary and is not intended to indicate that the described order is the only order in which the operations could be performed. One of ordinary skill in the art would recognize various ways to reorder the operations described herein. In some embodiments, aspects/operations of method 1300 may be interchanged, substituted, and/or added between these methods. For example, various object manipulation techniques and/or object movement techniques of method 1300 is optionally interchanged, substituted, and/or added between these methods. For brevity, these details are not repeated here.

FIGS. 14A-14M illustrate examples of a computer system 101 displaying a first framing element concurrently with a representation of a content item having different degrees of transparency and in response to detecting an input.

FIGS. 14A-14C illustrate computer system 101 displaying a representation of a content item 1402 in a three-dimensional environment 1400 during playback of the content item. The three-dimensional environment has on or more characteristics of the three-dimensional environment of method 1500. The three-dimensional environment 1400 is a lakeside environment that includes first hillside having a portion (e.g., hillside portion 1400a), a second hillside having a portion (e.g., hillside portion 1400b), and a cloud having a portion (e.g., cloud portion 1400c). The representation of the content item 1402 is animated or video (e.g., a movie, streaming video, and/or a television show). In some embodiments, the content item changes in appearance over time while playing and changing in appearance over time includes changing a degree of transparency of different portions of the content over time between a first (e.g., lower) degree of transparency and a second (e.g., higher) degree of transparency that is higher than the first degree of transparency. The representation of the content item 1402 includes a portion 1404 (e.g., the frame including two players and a ball 1404a) having a first (e.g., lower) degree of transparency. In the embodiment illustrated, portion 1404 is opaque. Accordingly, no portion of the three-dimensional environment 1400 located behind the portion 1404 (e.g., the opaque portion 1404) is visible from the perspective of the viewpoint of the user 1406. However, it is understood that in some embodiments, portion 1404 (e.g., including ball 1404a) is optionally partially opaque (e.g., the first degree of transparency is greater than zero) and that portions of the three-dimensional environment 1400 located behind the portion 1404 are optionally at least partially visible from the perspective of the viewpoint of the user 1406. Accordingly, although ball 1404a is referred to as "opaque ball 1404a" in this description, it is understood that opaque ball 1404a (e.g., and portion 1404) is optionally not opaque and has a degree of transparency (e.g., the first degree of transparency) in some embodiments.

The representation of the content item 1402 also includes a portion 1408 (e.g., the border region) having a second (e.g., higher) degree of transparency. Accordingly, portions of the three-dimensional environment 1400 located behind the portion 1408 (e.g., the transparent portion 1408) from the perspective of the viewpoint of the user are visible to the user, such as hillside portion 1400a, hillside portion 1400b, and cloud portion 1400c.

FIGS. 14A-14C illustrate the representation of the content item as playback of the content item progresses. Accordingly, in FIG. 14A a player is shown holding an opaque ball 1404a as part of the opaque or partially opaque portion 1404 of the representation of the content item. Portions of the three-dimensional environment 1400 located behind the representation of content item 1402 visible (e.g., behind and/or through the transparent portion 1408) from the viewpoint of the user 1406, such as hillside portion 1400a, hillside portion 1400b, and cloud portion 1400c.

For the purpose of illustration, FIGS. 14A-14M include respective top-down views 1440a-1440m of the three-dimensional environment 1400 that indicate the positions of various objects in the three-dimensional environment 1400 in a horizontal dimension and a depth dimension. The top-down view of the three-dimensional environment 1400 further includes an indication of the viewpoint of the user 1406 of the computer system 101. For example, the computer system 101 displays the view of the three-dimensional environment 1400 visible through the display generation component 120 from the viewpoint of the user 1406 illustrated in the top-down view 1440a of the three-dimensional environment 1400.

In FIG. 14B, the content item 1402 changes in appearance as the player throws the opaque ball 1404a into the transparent portion 1408 of the representation of the content item 1402. For example, the computer system 101 displays opaque ball 1404a in the transparent portion 1408 of the representation of the content item 1402 and in particular at a location in the representation of the content item 1402 corresponding to a portion of cloud 1400c. Opaque ball 1404a, having a lower degree of transparency than the transparent portion 1408, blocks (or, optionally, partially blocks) from view from the viewpoint of the user 1406 a portion of cloud 1400c located behind opaque 1404a. As a result, size and/or a shape of transparent portion 1408 of the representation of the content item changes during playback, as the transparent portion 1408 now excludes the portion blocked (or, optionally, partially blocked) by opaque ball 1404a (e.g., corresponding to cloud portion 1400b). Further a size and/or a shape of the opaque portion 1404 changes during playback as the opaque portion 1404 which includes opaque ball 1404a now extends into the location of opaque ball 1404a blocking (or optionally, partially blocking) the portion of cloud 1400c. Content brightness bar 1430 indicates the brightness 1430a of the representation of the content item 1402 during playback.

In FIG. 14C the content item 1402 changes in appearance with the trajectory of ball 1404a though the transparent portion 1408 of the representation of the content item 1402. In FIG. 14C, the computer system displays opaque ball 1404a in the transparent portion 1408 at a location in the representation of the content item 1402 corresponding to hillside portion 1400b. As opaque ball 1404a no longer blocks (or, optionally, no longer partially blocks) cloud portion 1400c from view from the viewpoint of the user 1406 (e.g., through the transparent portion 1408), cloud portion 1400c is now displayed again behind and/through the transparent portion 1408 of the representation of the content item 1402. Opaque ball 1404a, having a lower degree of transparency than the transparent portion 1408, now blocks (or, optionally, partially blocks) from view from the viewpoint of the user 1406 hillside portion 1400b located behind opaque ball 1404a. As a result, size and/or a shape of transparent portion 1408 of the representation of the content item changes during playback, as the transparent portion 1408 now excludes the portion blocked (or optionally, partially blocked) by opaque ball 1404a (e.g., corresponding to hillside portion 1400b). Further a size and/or a shape of the opaque portion 1404 changes during playback as the opaque portion 1404 which includes opaque ball 1404a now extends into the location of the opaque ball 1404a blocking (or, optionally, partially blocking) the hillside portion 1400c. Content brightness bar 1430 indicates the brightness 1430a of the representation of the content item 1402 during playback.

FIG. 14D illustrates the computer system 101 detecting a first input corresponding to a request to display a control interface for the content item. The first input includes an air pinch gesture performed by a hand 1406b of the user 1406 while attention of the user (e.g., based on gaze 1406a) is directed to the representation of the content item 1402.

In FIG. 14E, in response to detecting the first input corresponding to the request to display a control interface for the content item, the computer system 101 displays a control interface 1410 and a first portion of a first framing element 1420 behind the representation of the content item in the three-dimensional environment 1400. The control interface 1410 has one or more characteristics of the system controls interface of methods 800 and 1000. In some embodiments, the system control 1410 is displayed in front of the representation of content item 1402 from the perspective of the viewpoint of the user 1406, such as illustrated in top-down view 1440c. The system controls interface 1410 includes one or more media controls 1410a-1410d for controlling playback of the content item such as a rewind button 1410a, a fast forward button 1410b, a pause button 1410c, and a playback progress bar 1410d that indicates a playback position of the content item. It is understood that the one or more controls optionally include additional controls not shown in FIG. 14E. In some embodiments, the computer system 101 reduces the brightness of the representation of the content item and/or applies dimming to the representation of the content item 1402 when the control interface 1410 for the content item is displayed. Content brightness bar 1430 indicates the brightness 1430b of the representation of the content item 1402 when the control interface 1410 is displayed, which is less than the content bright 1430a of the representation of content item 1402 when the control interface 1410 was not displayed (e.g., in FIGS. 14A-14D).

In some embodiments, the first framing element 1420 includes or is a flat user interface element disposed behind the representation of the content item 1402. A shape of the first framing element 1420 corresponds to (e.g., matches) a shape of the representation of the content item including the transparent portion 1408 of the representation of the content item 1402. A size of the first framing element 1420 corresponds to (e.g., matches) a size of the representation of content item 1402, including the transparent portion 1408 of the content item. As shown in FIG. 14E, the framing element 1420 is more visible at location that correspond to content with the second (e.g., higher) degree of transparency (e.g., transparent portion 1408) than at locations that correspond to content with the first (e.g., lower) degree of transparency (e.g., opaque portion 1404). The first framing element 1420 is opaque (or, optionally, partially opaque) such that portion of the three-dimensional environment 1400 and/or virtual objects located behind the framing element are blocked (or, optionally, partially blocked) from view from the viewpoint of the user. Accordingly, portions of the three-dimensional environment 1400 that were visible behind and/through the representation of the content item 1402 (e.g., visible behind and/or through the transparent portion 1408 of the representation of the content item) before display of the first framing element 1420, such as hillside portion 1400a, hillside portion 1400b, and cloud portion 1400c, are now blocked (or, optionally, partially blocked) from view from the viewpoint of the user 1406 by the first framing element 1420. The portions of the three-dimensional environment 1400 that are blocked (or, optionally, partially blocked) from view from the viewpoint of the user 1406 by the first framing element 1420 (e.g., hillside portion 1400a, hillside portion 1400b, and cloud portion 1400c) are shown in dashed lines. The first framing element 1420 therefore optionally functions as a backing platter or element that enhances visibility of the content item when displayed behind the representation of the content item 1402. Top-down view 1440e shows the framing element 1420 disposed behind the representation of the content item 1402 in the three-dimensional environment 1400.

In some embodiments, the computer system 101 displays the representation of the content item 1402 concurrently with a first user interface element 1416. In some embodiments, the first user interface element 1416 includes one or more chrome regions and/or chrome elements, such as associated controls (e.g., buttons, dials, and/or icons, among others) and interfaces such as the control interface, content picker interface, and/or environment picker interface, and/or other controls and/or interfaces displayed in the three-dimensional environment 1400. For example, the first user interface element 1416 includes selectable options for controlling the content item, such as a selectable option 1416a for displaying the representation of the content item at a docked position (e.g., docking the representation of the content item) and a volume slider 1416*b*. In some embodiments, the first user interface element includes the control interface 1410 and/or or more controls located on the control interface 1410, such as the one or more media controls 1410*a*-1410*d* for controlling playback of the content item including rewind button 1410*a*, fast forward button 1410*b*, and pause button 1410*c*, for example. In some embodiments, the first interface element 1416 includes the first framing element 1420. It is understood that the first user interface element optionally includes virtual objects, interface elements, and/or additional controls not shown in FIG. 14E.

FIGS. 14E-14G illustrate computer system 101 displaying the representation of a content item 1402 in a three-dimensional environment 1400 during playback of the content item while the first framing element 1420 is displayed behind the representation of the content item. Accordingly, in FIG. 14E a player is shown holding opaque ball 1404*a* as part of the opaque portion 1404 of the representation of the content item. In FIGS. 14F and 14G, the content item changes in appearance as the player throws the opaque ball 1404*a* into the transparent portion 1408 of the representation of the content item 1402 where a portion the framing element 1420 is now visible. As a result, the shape of the opaque portion 1404 changes as the opaque ball (e.g., part of the opaque portion 1404) moves though the transparent portion. Further, the shape of the transparent portion 1408 (e.g., where the portion of the framing element 1420 is now visible) also changes while the opaque ball 1404*a* moves though the transparent portion 1408 as playback progresses. Content brightness bar 1430 indicates the brightness 1430*b* of the representation of the content item 1402 during playback of the content item while the control interface 1410 is displayed, which is less than the content brightness 1430*a* of the representation of content item 1402 during playback of the content item when the control interface 1410 was not displayed (e.g., in FIGS. 14A-14D).

FIG. 14H illustrates computer system 101 displaying a representation of a content item 1403 in a three-dimensional environment 1400 while the first framing element 1420 is displayed behind the representation of the content item. In some embodiments, the content item is a three-dimensional content item. Accordingly, when the control interface 1410 for the three-dimensional content item is displayed, the computer system 101 optionally reduces the brightness of the representation of the three-dimensional content item 1403 by a greater amount than it reduces the brightness of a representation of a two-dimensional content item. In some embodiments, the computer system applies more dimming to a representation of a three-dimensional content item 1403 than to a representation of a two-dimensional content item when the control interface for the content item is displayed. Content brightness bar 1430 indicates the brightness 1430*c* of the representation of the content item 1403 while the control interface 1410 is displayed, which is less than the content brightness 1430*b* of the representation of two-dimensional content item 1402 (e.g., in FIGS. 14E-14G). Although the representation of content item 1402 (e.g., in FIGS. 14E-14G) is described as a representation of a two-dimensional content item for the purpose of FIG. 14H, it is understood that the representation of content item 1402 as described in this disclosure is optionally a representation of a two-dimensional content item and/or a three-dimensional content item.

FIGS. 14I and 14J illustrate the computer system ceasing display of the first user interface element 1416 while main-taining display of the representation of the content item 1402 in the three-dimensional environment when the time that has elapsed since the display of the first user interface element 1416 exceeds a threshold duration. The first user interface element optionally includes the control interface 1410, the first framing element 1420, and/or one or more options for controlling the content item such as selectable option 1416*a* for displaying the representation of the content item at a docked position (e.g., docking the representation of the content item) and a volume slider 704*b*. In FIG. 14I, the computer system displays the control interface 1410 and the first framing element 1420 in response to an input corresponding to a request to display the control interface 1410. Accordingly, portions of the three-dimensional environment 1400 that were visible behind and/or through the representation of the content item 1402 (e.g., visible behind and/or through the transparent portion 1408 of the representation of the content item) before display of the first framing element 1420, such as hillside portion 1400*a*, hillside portion 1400*b*, and cloud portion 1400*c*, are blocked (or, optionally, partially blocked) from view from the viewpoint of the user by the first framing element 1420. The portions of the three-dimensional environment 1400 that are blocked (or, optionally, partially blocked) from view from the viewpoint of the user by the first framing element 1420 (e.g., hillside portion 1400*a*, hillside portion 1400*b*, and cloud portion 1400*c*) are shown in dashed lines. Time bar 1434 shows the time elapsed 1435 since the display of the first framing element 1420.

In FIG. 14J, in accordance with a determination that the time elapsed since the display of the first framing element 1420 exceeds a threshold duration having a first value 1435*a*, the computer system 101 ceases display of the first framing element (e.g., the control interface 1410, the first framing interface 1420, and/or one or more options for controlling the content item). Accordingly, portions of the three-dimensional environment 1400 located behind the representation of the content item 1402 (e.g., behind the transparent portion 1408) that were blocked (or, optionally, partially blocked) from view from the viewpoint of the user by the first framing element 1420, such as hillside portion 1400*a*, hillside portion 1400*b*, and cloud portion 1400*c*), are now visible again (e.g., visible behind and/or through the transparent portion 1408).

FIG. 14K-14M illustrate the computer system ceasing display of the first user interface element 1416 while maintaining display of the representation of the content item 1402 in the three-dimensional environment when a time that has elapsed since detecting an input directed to the first user interface element 1416 exceeds the threshold duration having a second value 1435*b*. In some embodiments, the second value 1435*b* of the threshold duration is less than the first value of the threshold duration such that the computer system 101 optionally ceases display of the first user interface element 1416 faster when interaction has been detected with the first user interface element than when interaction has not detected with the first user interface element (e.g., when the time since display of the first user interface element 1416 exceeds the threshold duration having a first value 1435*a* as described in reference to FIGS. 14I and 14J).

In FIG. 14K, the computer system 101 displays the first user interface element 1416 including the control interface 1410 and the first framing element 1420 in response to the first input corresponding to a request to display the control interface 1410. Accordingly, portions of the three-dimensional environment 1400 that were visible behind and/or through the representation of the content item 1402 (e.g., visible behind and/or through the transparent portion 1408 of the representation of the content item) before display of the first framing element 1420, such as hillside portion 1400a, hillside portion 1400b, and cloud portion 1400c, are blocked (or, optionally, partially blocked) from view from the viewpoint of the user by the first framing element 1420. The portions of the three-dimensional environment 1400 that are blocked (or, optionally, partially blocked) from view from the viewpoint of the user by the first framing element 1420 (e.g., hillside portion 1400a, hillside portion 1400b, and cloud portion 1400c) are shown in dashed lines.

The computer system 101 detects a second input directed to the play button 1410g on the control interface 1410, which corresponds to a request play the content item or resume playback of the content item. The second input includes an air pinch gesture performed by a hand 1406b of the user 1406 while attention of the user (e.g., based on gaze 1406a) is directed to the play button 1410g on the control interface 1410. Time bar 1434 shows that no time has elapsed since the detection by computer system 101 of the second input (e.g., since the interaction). Time bar 1434 further shows the first value 1435a of the threshold duration 1435a (e.g., for the time since display of the first user interface element 1416) and the second value 1435b of the first threshold duration 1435b (e.g., for the time since detection by the computer system 101 of an interaction (e.g., the second input) with the user interface element 1416), which is less than the first value 1435a of the threshold duration.

In FIG. 14L, the computer system 101 has resumed playback of the content item in response to detecting the second input corresponding to the request to play the content item or resume playback of the content item. Playback progress is shown by playback progress bar 1410d (and, optionally, by the player having thrown the opaque ball 1404a in FIG. 14L). Time bar 1434 shows that time 1436 has elapsed since detection by the computer system 101 of the second input corresponding to the request to play the content item or resume playback of the content item (e.g., since the interaction with the user interface element 1416). However, the time elapsed 1436 does not yet exceed the second value 1435b of the threshold duration (e.g., for the time since detection by the computer system 101 of an interaction (e.g., the second input)).

In FIG. 14M, the time elapsed 1436 since the computer system 101 has detected an interaction with the user interface element 1416 (e.g., the second input directed to the play button 1410g on the control interface 1410 and corresponding to the request to play the content item or resume play of the content item) exceeds the second value of the threshold duration 1435b. In accordance with a determination that the time elapsed 1436 since the interaction was detected with the user interface element 1416 exceeds the second value of the threshold duration 1435b, the computer system ceases display of the first user interface element 1416 including the first framing element 1420. Accordingly, portions of the three-dimensional environment 1400 located behind the representation of the content item 1402 (e.g., behind the transparent portion 1408) that were blocked (or, optionally, partially blocked) from view from the viewpoint of the user by the first framing element 1420, such as hillside portion 1400a, hillside portion 1400b, and cloud portion 1400c), are now visible again (e.g., visible behind and/or through the transparent portion 1408).

As the second value 1435b of the threshold duration (e.g., since interaction with the first user interface element 1416) is less the first value 1435a of the threshold duration (e.g., since display of the first user interface element 1416), the computer system 101 optionally ceases display of the first user interface element 1416 faster when interaction has been detected with the first user interface element than when interaction has not been detected with the first user interface element (e.g., when the time since display of the first user interface element 1416 exceeds the threshold duration having the first value 1435a as described in reference to FIGS. 14I and 14J). In some embodiments, the second value 1435b of the threshold duration (e.g., since interaction with the first user interface element 1416) is greater than the first value 1435a of the threshold duration (e.g., since display of the first user interface element 1416), and the computer system 101 optionally ceases display of the first user interface element 1416 faster when interaction has not been detected with the first user interface element than when interaction has been detected with the first user interface element (e.g., when the time since display of the first user interface element 1416 exceeds the threshold duration having the first value 1435a as described in reference to FIGS. 14I and 14J).

FIG. 15 is a flowchart illustrating an exemplary method 1500 of displaying a first framing element concurrently with a representation of a content item having different degrees of transparency and in response to detecting an input, in accordance with some embodiments. In some embodiments, the method 1500 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1500 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1500 are, optionally, combined and/or the order of some operations is, optionally, changed.

In some embodiments, a method 1500 is performed at a computer system in communication with one or more display generation components and one or more input devices, such as computer system 101 and display generation component 120 in FIG. 14A. In some embodiments, the computer system has one or more characteristics of the computer system in methods 800, 1000, 1200, 1300, 1700, 1900, and/or 2100. In some embodiments, the one or more display generation components have one or more characteristics of the one or more display generation components in methods 800, 1000, 1200, 1300, 1700, 1900, and/or 2100. In some embodiments, the one or more input devices have one or more characteristics of the one or more input devices in methods 800, 1000, 1200, 1300, 1700, 1900, and/or 2100. In some embodiments, the computer system is in communication with a hand tracking device (e.g., one or more cameras, depth sensors, proximity sensors, touch sensors (e.g., a touch screen, trackpad)). In some embodiments, the hand tracking device is a wearable device, such as a smart glove. In some embodiments, the hand tracking device is a hand-held input device, such as a remote control or stylus. In some embodiments, hand-tracking device has one or more characteristics of the hand-tracking device in methods 800, 1000, 1200, 1300, 1700, 1900, and/or 2100.

In some embodiments, while displaying, via the one or more display generation components, a representation of a content item in a three-dimensional environment, wherein the content item changes in appearance over time while playing (e.g., the content item is animated or a video), and changing in appearance over time includes changing a degree of transparency of different portions of the content over time between a first (e.g., lower) degree of transparency and a second (e.g., higher) degree of transparency that is higher than the first degree of transparency, such as representation of content item 1402 in FIGS. 14A-14C, the computer system detects (1502*a*), via the one or more input devices, a first input corresponding to a request to display a control interface for the content item, such as the input from hand 1406*b* in FIG. 14D. In some embodiments, the three-dimensional environment, generated, displayed, or otherwise made viewable by the computer system, is perceptible from the viewpoint of the first user. The three-dimensional environment is optionally generated, displayed, or otherwise caused to be viewable by the computer system. For example, the three-dimensional environment is optionally an extended reality (XR) environment, such as a virtual reality (VR) environment, a mixed reality (MR) environment, an augmented reality (AR) environment, or an augmented virtuality (AV) environment. In some embodiments, the three-dimensional environment has one or more characteristics of the three-dimensional environments in methods 800, 1000, 1200, 1300, 1700 and/or 1900. In some embodiments, the content item is a video (e.g., a movie and/or a television show), an animation (e.g., a photo and/or a drawing), or an application (e.g., a browser and/or a game). The content item optionally changes in appearance over time while the content item is playing in the representation of the content item (e.g., the video, animation, and/or application changes in appearance over time while playing). In some embodiments, the degree of transparency of a portion of the content item is a measure of the visibility to the user of objects (e.g., virtual objects, interface elements, and/or portions of the three-dimensional environment) that, from the perspective of the viewpoint of the user, are located behind the content item. In some embodiments, the degree of transparency of the content item varies across the representation of the content item such that the representation includes different portions having different degrees of transparency, such as a first degree of transparency and a second degree of transparency. In some embodiments, a portion of the content item optionally changes between the first degree of transparency and the second degree of transparency while the content is playing. For example, an object in the video (e.g., a portion of the video) optionally changes from the first degree of transparency to the second degree of transparency while the video is playing. In some embodiments, the second degree of transparency is greater than the first degree of transparency such that the display of the portion of the content item corresponding to the second is more transparent (e.g., less opaque) than the display of the portion of the content item corresponding to the first region. In some embodiments, the first degree of transparency is 10, 20, 30, 40, 50, 60, 70, 80, or 90% transparency. In some embodiments, the second degree of transparency is 20, 30, 40, 50, 60, 70, 80, 90%, or 100% transparency. In some embodiments, the computer system displays (or otherwise makes visible) a first portion of the three-dimensional environment located behind the representation of the content item. Accordingly, a visibility of the first portion of the three-dimensional environment optionally corresponds to (e.g., increases with) the degree of transparency of the corresponding portion of the representation of the content item. In some embodiments, a size and/or shape of a portion of the content item corresponding to the first degree of transparency (e.g., the lower transparency region) changes during display of the representation of the content item (e.g., as playback through the content item progresses). In some embodiments, a size and/or shape of a portion of the content item corresponding to the second degree of transparency (e.g., the higher transparency region) changes during display of the representation of the content item (e.g., as playback through the content item progresses). In some embodiments, a location of a portion of the content item corresponding to the first degree of transparency changes across the representation of the content item as the representation is displayed (e.g., the portion of the content item corresponding to the first degree of transparency optionally moves during display of the representation of the content item, for example as playback through the content item progresses). In some embodiments, a location of the portion of the content item corresponding to the second degree of transparency changes across the representation of the content item as the representation is displayed (e.g., the portion of the content item corresponding to the second degree of transparency optionally moves during display of the representation of the content item, for example as playback through the content item progresses). In some embodiments, the representation of the content item is displayed (e.g., played) in a content player interface, such as described with reference to methods 800 and/or 1000. In some embodiments, the representation of the content item is at a docked position in the three-dimensional environment, such as described with reference to methods 800 and/or 1000. In some embodiments, the first input corresponding to the request to display the controls interface for the content item includes a user input directed at the representation of the content item. For example, the first input optionally includes an air gesture performed by one or more hands of the user (e.g., an air pinch gesture) while attention of the user (e.g., based on gaze) is directed at the representation of the content item. In some embodiments, the first input include contact by a stylus or a finger against a touch sensitive input device (e.g., a touch screen) and/or an input received from an input device in communication with the computer system such as a mouse and/or a trackball and directed to the representation of the content item or to an object or interface element displayed in the three-dimensional environment (e.g., based on attention and/or a location of a cursor or other focus indicator being on the representation of the content item or the object or interface element displayed in the three-dimensional environment).

In some embodiments, in response to detecting the first input, and while maintaining display of the representation of the content item in the three-dimensional environment (1502*b*) (e.g., without ceasing display of the representation of the content item), such as with the representation of the content item 1402 in FIGS. 14D-14E, the computer system displays (1502*c*) the control interface for the content item, wherein the control interface includes one or more selectable options for controlling playback of the content item at the computer system, such as the control interface 1410 in FIG. 14E. For example, the one more selectable options include a play button, a pause button, a stop button, a rewind button, a forward button, a volume dial or slider, a menu icon (e.g., selection of which optionally displays selectable options including an option to launch a content picker interface and/or an option to launch an environment picker interface, each of which shares one or more characteristics respectively with the content picker interface and the environment picker interface of methods 800 and/or 1000), among other options for controlling playback of the representation of the content item. In some embodiments, the computer system displays the controls interface in proximity to the representation of the content item. For example, the computer system optionally displays the controls interface a location corresponding to the bottom of the representation of the content item within the three-dimensional environment. In some embodiments, the computer system displays the control interface in front of (e.g., closer to the viewpoint of the user than) the representation of the content item.

In some embodiments, in response to detecting the first input, and while maintaining display of the representation of the content item in the three-dimensional environment (1502*b*) (e.g., without ceasing display of the representation of the content item), the computer system displays (1502*d*) a first portion of a first framing element (e.g., a background or backing platter) concurrently with (e.g., behind, surrounding, or near) the representation of the content item, wherein the first framing element is more visible at locations that correspond to content with the second (e.g., higher) degree of transparency than at locations that correspond to content with the first (e.g., lower) degree of transparency (e.g., further from the viewpoint of the user than the representation of the content item and/or further from the viewpoint of the user than the representation of the content item), such as the framing element 1420 in FIGS. 14E-14G. In some embodiments, no portion of the first framing element (including the first portion) was displayed concurrently with (e.g., behind, surrounding, or near) the representation of the content item before and/or when the first input was detected. In some embodiments, the computer system displays the first framing element behind the representation of the content item in response to the first input, and those portions of the first framing element that are not fully obscured by the representation of the content item from the viewpoint of the user are displayed and/or visible from the viewpoint of the user. In some embodiments, the first framing element includes a flat user interface element disposed behind the representation of the content item. In some embodiments, a shape of the first framing element corresponds to (e.g., matches) a shape of the representation of the content item (e.g., if the representation has a rectangular shape, the first framing element optionally has a rectangular shape of the same aspect ratio), including those portions of the representation of the content item that have transparency greater than 0%. A size of the first framing element optionally corresponds to (e.g., matches) a size of the representation of content item, including those portions of the content item that have transparency greater than 0%. In some examples, the size of the first framing element is greater than the size of the representation of the content item, such that portions of the first framing element form a border around representation of the content item. For example, the first framing element is optionally 10, 20, 30, 40, or 50% larger than the representation of the content item. The first framing element optionally has square corners or round corners. In some embodiments, one or more characteristics of the first framing element (e.g., a color, a transparency, and/or a translucency) are configured to provide a contrast against the representation of the content item and/or the three-dimensional environment. In some embodiments, the computer system displays the first portion of the first framing element in accordance with the portions of the content item that correspond to content with the first (e.g., lower) degree of transparency and the portions of the content item that correspond to content with the second (e.g., higher) degree of transparency. Accordingly, the framing element optionally has more visibility to the user through the portions corresponding to the second (e.g., higher) degree of transparency than through the portions corresponding to the first (e.g., lower) degree of transparency. For example, if the content item is a video having portions of higher degree of transparency and portions of lower degree of transparency, the portion of the first framing element (e.g., a background or backing platter) is more visible through the portions of higher transparency than through the portions of lower transparency. In some embodiments, when a portion of the three-dimensional environment located behind the representation of the content item was visible through portions of the representation of the content item before display of the first framing element, the computer system forgoes display of (and/or reduces the visibility of) that portion of the three-dimensional environment (e.g., as raising the framing element behind the representation of the content item blocks or optionally partially blocks from view the portion of three-dimensional environment in the background). For example, if the content item is an image and a portion of the three-dimensional environment was visible through the image before display of the first framing element, the first portion of the first framing element displayed behind the image optionally reduces visibility of, and/or blocks, or optionally, partially blocks, the portion of the three-dimensional environment that was visible through the image. The computer system optionally forgoes display of the portions of the first framing element located behind portions of the representation of the content item having a degree of transparency of 0% (e.g., opaque regions of the representation of the content item). Accordingly, the portion of the first framing element located behind opaque portions of the representation of the content item are optionally not visible to the user. Displaying a portion of a first framing element concurrently with the representation of the content item based on the degree of transparency of portions of the content item enhances the visibility of the representation of the content item to the user, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the first framing element is at least partially translucent, such as if the framing element 1420 were at least partially translucent in FIGS. 14E-14G. In some examples, the first framing element has a degree of translucency. The degree of translucency is optionally 0, 10, 20, 30, 40, 50, 60, 70, 80, 90, or 100%. Accordingly, the computer system optionally displays a first portion of the three-dimensional environment located behind the framing element from the perspective of the viewpoint of the user in accordance with the translucency of the framing element (e.g., the first portion of the three-dimensional environment is at least partially visible). In some embodiments, the computer system displays portions of objects and/or portions of interface elements located behind the first framing element from the perspective of the viewpoint of the user in accordance with the translucency of the framing elements (e.g., the first portion of the three-dimensional environment is at least partially visible). Displaying the first framing element as at least partially translucent enhances the user's situational awareness by increasing the visibility of objects, interface elements, and/or portions of the three-dimensional environment hidden blocked (or, optionally, partially blocked) by the first framing element, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, when the first input corresponding to the request to display the control interface is detected, at least a portion of the three-dimensional environment was visible through a portion of the representation of the content item, such as hillside portion 1400*a*, hillside portion 1400*b*, and cloud portion 1400*c* in FIGS. 14A-D, and in response to detecting the first input, the computer reduces visibility, via the one or more display generation components, of the portion of the three-dimensional environment, such as reducing visibility of hillside portion 1400*a*, hillside portion 1400*b*, and cloud portion 1400*c* in FIGS. 14E-14G. In some embodiments, the portion of the three-dimensional environment is located behind the portion of the representation of the content item (e.g., from the perspective the viewpoint of the user). In some embodiments, the first portion of the first framing element is located between the portion of the representation of the content item and the portion of the three-dimensional environment. In some embodiments, visibility of the portion of the three-dimensional environment is reduced from the perspective of the viewpoint of the user. In some embodiments, reducing visibility of the portion of the three-dimensional environment includes reducing a brightness of the portion of the three-dimensional environment. In some embodiments, reducing visibility of the portion of the three-dimensional environment includes reducing a resolution and/or a definition of the portion of the three-dimensional environment. In some embodiments, reducing visibility of the portion of the three-dimensional environment includes increasing a blurriness of the portion of the three-dimensional environment. In some embodiments, reducing visibility of the portion of the three-dimensional environment includes hiding, and/or blocking (or, optionally, partially blocking) visibility of the portion of the three-dimensional environment (e.g., forgoing display of the portion of the three-dimensional environment). Reducing visibility a portion of three-dimensional environment that was visible through a portion of the representation of the content item in response to detecting the first input corresponding to the request to display the control interface helps reduce visual distractions when the user wants to provide control input for the representation of the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, in accordance with a determination that a size of the representation of the content item is a first content size (optionally in the three-dimensional environment), a size of the first framing element is a first frame size (optionally in the three-dimensional environment), such as the size of framing element 1420 in FIGS. 14E-14G. In some embodiments, in accordance with a determination that the size of the representation of the content item is a second content size (optionally in the three-dimensional environment), different from the first content size, the size of the first framing element is a second frame size, different from the first frame size (optionally in the three-dimensional environment), such as if the size of framing element 1420 in the representation of the content item 1402 were the second size in FIG. 14H. A size optionally refers to a dimension, aspect ratio, and/or an area of the representation of the content item and/or the first framing element. In some embodiments, the first content size corresponds to (e.g., matches) the first frame size (e.g., a dimension, aspect ratio, and/or an area of the representation of the content item is equal to the corresponding dimension, aspect ratio, and/or the area of the first framing element). In some embodiments, the first frame size is greater than the first content size (e.g., a dimension, aspect ratio, and/or an area of the first framing element is greater than the corresponding dimension, aspect ratio, and/or the area of the representation of the content item), such that at least a portion of the first framing element forms a portion on a least a size of the representation of the content item. In some examples, the portions of the first framing element optionally form a border around the representation of the content item (e.g., extend beyond all sides and/or edges of the representation of the content item). For example, the first framing element is optionally 10, 20, 30, 40, or 50% larger than the representation of the content item. In some embodiments, the size (e.g., a dimension, aspect ratio, and/or area) of the representation of the content item changes (e.g., from a first content size to a second content size). For example, the size of the representation of the content item optionally increases or decreases. Accordingly, the size of the first framing element optionally changes (e.g., increases or decreases) correspondingly. The computer system optionally changes the size of the representation of the content item automatically and/or in response to an input. Changing the size of the first framing element with the size of the representation of the content item maintains the framing of the representation of the content by the first framing element and keep the different portions of the representation of the content item framed by the first framing element, which enhances their visibility, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the representation of the content item is displayed at a first brightness (and/or visual prominence) when the first input corresponding to the request to display the control interface for the content item is detected, such as the first brightness 1430*a* in FIG. 14D.

In some embodiments, in response to detecting the first input, the computer system displays the representation of the content item at a second brightness (and/or visual prominence), wherein the second brightness is lower than the first brightness (and/or visual prominence), such as the second brightness 1430*b* in FIG. 14E-14G. The computer system thus optionally reduces the brightness of the representation of the content item and/or applies dimming to the representation of the content item when the control interface for the content item is displayed. In some embodiments, the first brightness (e.g., before dimming) is 20, 30, 40, 50, 60, 70, 80, 90%, or 100% brightness and the second brightness (e.g., after dimming) is 10, 20, 30, 40, 50, 60, 70, 80, or 90% brightness. In some embodiments, the computer system reduces a color saturation of the representation of the content item when the control interface for the content item is displayed. In some embodiments, the computer system increases a blurriness of the representation of the content item when the control interface for the content item is displayed. In some embodiments, the computer system increases a transparency of the representation of the content item when the control interface for the content item is displayed. Reducing the brightness of the representation of the content item when the control interface is displayed helps reduce visual distractions and focus on (e.g., highlight) the displayed control interface and therefore facilitates the operation of the control interface, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, displaying the representation of the content item at the second brightness includes, in accordance with a determination that the content item is a two-dimensional content item, displaying the representation of the content item at a first content brightness, such as the first content brightness 1430*b* in FIGS. 14E-14G. In some embodiments, displaying the representation of the content item at the second brightness includes, in accordance with a determination that the content item is three-dimensional content item, displaying the representation of the content item at a second content brightness, wherein the second content brightness is lower than the first content brightness, such as the second content brightness 1430*c* in FIG. 14H. In some embodiments, a two-dimensional content item has no depth (or depth less than a threshold amount of depth, like 0.1, 0.3, 0.5, 1, 3, 5 or 10 mm) in the three-dimensional environment, and a three-dimensional content item has depth (or depth greater than the threshold amount of depth) in the three-dimensional environment. Thus, when the control interface for the content item is displayed, the computer system optionally reduces the brightness of a representation of a three-dimensional content item by a greater amount than it reduces the brightness of a representation of a two-dimensional content item. In some embodiments, the computer system applies more dimming to a representation of a three-dimensional content item than to a representation of a two-dimensional content item when the control interface for the content item is displayed. In some embodiments, the first content brightness (e.g., corresponding to less dimming, such as applied to a representation of a two-dimensional content item) is 20, 30, 40, 50, 60, 70, 80, 90%, or 100% brightness and the second content brightness (e.g., corresponding to more dimming, such as applied to a representation of a three-dimensional content item) is 10, 20, 30, 40, 50, 60, 70, 80, or 90% brightness. Reducing the brightness of a representation of a three-dimensional content item more than a representation of a two-dimensional content item helps reduce visual distractions introduced by the third dimension (e.g., depth) of the representation of the three-dimensional content item when the control interface is displayed and this helps focus on (e.g., highlight) the displayed control interface and therefore facilitates the operation of the control interface, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the control interface is displayed in a second framing element (e.g., as part of a separate virtual object or separate window), different and separate from the first framing element, such as if the control interface 1410 were displayed in a second framing element in FIGS. 14E-G. In some embodiments, the second framing element is displayed concurrently with (e.g., behind, surrounding, or near) the control interface. In some embodiments, the computer system displays the second framing element in response to detecting the first input corresponding to the request to display the control interface. In some embodiments, a shape of the second framing element corresponds to (e.g., matches) a shape of the control interface (e.g., if the control interface has a rectangular shape, the second framing element optionally has a rectangular shape of the same aspect ratio). A size of the second framing element optionally corresponds to (e.g., matches) a size of the control interface. In some examples, the size of the second framing element is greater than the control interface, such that portions of the second framing element form a border around the control interface. For example, the second framing element is optionally 10, 20, 30, 40, or 50% larger than the control interface. The second framing element optionally has square corners or round corners. In some embodiments the second framing element has a spatial arrangement (e.g., a position and/or an orientation) relative to the viewpoint that is different from a spatial arrangement (e.g., a position and/or orientation) of the first framing element relative to the viewpoint. In some embodiments, the control interface and the second framing element move from a first control interface location in the three-dimensional environment to a second control interface location in the three-dimensional environment in response to movement input directed to the control interface. In some embodiments, the representation of the content item does not move in response to the movement input directed to the control interface (e.g., the control interface optionally moves independently of the representation of the content item in the three-dimensional environment). In some embodiments, one or more characteristics of the second framing element (e.g., a color, a transparency, and/or a translucency) correspond to (e.g., match) one or more characteristics of the first framing element. Displaying the control interface in a second framing element increases the visibility of the control interface that the user wants to operate, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, in response to detecting the first input corresponding to the request to display the control interface, the computer system displays one or more selectable options for controlling display of the representation of the content item, such the selectable option 1416*a* for displaying the representation of the content item at a docked position in FIGS. 14E-14G. The one or more selectable options for controlling display of the representation of the content include one or more selectable options for sharing the content item, one or more selectable options for controlling a position of the representation of the content item in the three-dimensional environment, one or more selectable options for controlling movement of the representation of the content item in the three-dimensional environment, one or more selectable options for controlling a size of the representation of the content item in the three-dimensional environment, one or more selectable options for ceasing display of the representation of the content item in the three-dimensional environment, and/or one or more selectable options for selecting one or more content items for playback in the first three-dimensional environment. Displaying the one or more selectable options for controlling display of the representation of the content item in response to the request to display the control interface reduces the number of inputs required to control display of the representation of the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more selectable options for controlling display of the representation of the content item include one or more selectable options for sharing the content item, such as if media controls 1410a-1410c and 1410g in FIGS. 14K-14M were the one or more selectable options for sharing the content item. In some embodiments, while displaying the one or more selectable options for sharing the content item, the computer system detects, via the one or more input devices, a second input directed to a first selectable option of the one or more selectable options, such as if play button 1410g in FIG. 14K were the first selectable option of the one or more selectable options. In some embodiments, in response to detecting the second input, the computer system initiates a process to share the content item, such as if initiating playback of the content item in FIG. 14L were initiating a process to share the content item. In some embodiments, sharing the content item includes displaying in the three-dimensional environment a sharing interface in response to detecting the second input. In some embodiments, sharing the content item includes initiating transmission of a copy of the content item to another computer system in communication with the computer system. In some embodiments, sharing the content item with another computer system includes making the content item accessible to that other computer system (e.g., such that the other computer system displays a representation of the content item in a three-dimensional environment visible via one or more display generation components of that other computer system). In some embodiments, the second input directed to a first selectable option of the one or more selectable options optionally includes an air gesture performed by one or more hands of the user (e.g., an air pinch gesture) while attention of the user (e.g., based on gaze) is directed to the first selectable option of the one or more selectable options. In some embodiments, the second input includes contact by a stylus or a finger against a touch sensitive input device (e.g., a touch screen) and/or an input received from an input device in communication with the computer system such as a mouse and/or a trackball and directed to the first selectable option of the one or more selectable options (e.g., based on attention and/or a location of a cursor or other focus indicator being on the first selectable option). In some embodiments, the one or more selectable options for sharing the content include one or more buttons for sharing the content item, one or more icons, and/or one or more toggle switches. In some embodiments, initiating the process to share the content item includes detecting an input for selecting a recipient of the content item (e.g., a user and/or a device) on the sharing interface. In some embodiments, initiating the process to share the content item includes detecting an input for confirming the recipient and/or initiation of the process to share the content item Displaying the one or more selectable options for sharing the content item in response to the request to display the control interface reduces the number of inputs required to share the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more selectable options for controlling display of the representation of the content item include one or more selectable options for controlling movement of the representation of the content item in the three-dimensional environment, such as if media controls 1410a-1410c and 1410g in FIGS. 14K-14M were the one or more selectable options for controlling movement of the representation of the content item in the three-dimensional environment. In some embodiments, while displaying the one or more selectable options for controlling movement of the representation of the content item in the three-dimensional environment, the computer system detects, via the one or more input devices, a second input directed to a first selectable option of the one or more selectable options, such as if play button 1410g in FIG. 14K were the first selectable option of the one or more selectable options. In some embodiments, in response to detecting the second input, the computer system moves the representation of the content item in the three-dimensional environment in accordance with the second input, such as if playing the content item in FIG. 14L were moving the representation of the content item in the three-dimensional environment. In some embodiments, the one or more selectable options for controlling movement of the representation of the content item in the three-dimensional environment include a grabber bar or handle displayed adjacent to the representation of the content item. The grabber bar or handle is optionally displayed under the representation of the content item. In some embodiments, the second input directed to the first selectable option of the one or more selectable options optionally includes an air gesture performed by one or more hands of the user (e.g., an air pinch gesture) while attention of the user (e.g., based on gaze) is directed at the first selectable option of the one or more selectable options (e.g., a handle or grabber bar), followed by a drag gesture (e.g., a movement input) performed by the one or more hands of the user. In some embodiments, the second input includes contact by a stylus or a finger against a touch sensitive input device (e.g., a touch screen) and/or an input received from an input device in communication with the computer system such as a mouse and/or a trackball and directed to the first selectable option of the one or more selectable options (e.g., the handle or grabber bar). In response to detecting the second input, the computer system optionally moves the representation of the content item in the three-dimensional environment according to the drag gesture (e.g., in the direction of the drag gesture). In some embodiments, the computer system moves the representation of the content with a magnitude and/or direction in the three-dimensional environment corresponding to a magnitude and/or direction of a movement of the one or more hands of the user during the second input (e.g., corresponding to the drag gesture while the air pinch is maintained and/or the grab gesture against the touch sensitive input device). In some embodiments, the computer system does not move the control interface when the computer system moves the representation of the content item in response to the second input (e.g., the computer system optionally moves the representation of the content item independently of the control interface). Displaying the one or more selectable options for controlling a movement of the content item in response to the request to display the control interface reduces the number of inputs required to control the movement of the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more selectable options for controlling display of the representation of the content item include one or more selectable options for controlling a size of the representation of the content item in the three-dimensional environment, such as if media controls 1410*a*-1410*c* and 1410*g* in FIGS. 14K-14M were the one or more selectable options for controlling a size of the representation of the content item in the three-dimensional environment. In some embodiments, while displaying the one or more selectable options for controlling a size of the representation of the content item in the three-dimensional environment, the computer system detects, via the one or more input devices, a second input directed to a first selectable option of the one or more selectable options, such as if play button 1410*g* in FIG. 14K were the first selectable option of the one or more selectable options. In some embodiments, in response to detecting the second input, the computer system changes a size of the representation of the content item in the three-dimensional environment in accordance with the second input, such as if playing the content item in FIG. 14L were changing a size of the representation of the content item in the three-dimensional environment. In some embodiments, the one or more selectable options for controlling a size of the representation of the content item in the three-dimensional environment include a curved window bar displayed adjacent to the representation of the content item. The curved window bar is optionally displayed adjacent to a corner of the representation of the content item, such that the curve of the window bar corresponds to (e.g., matches) the corner of the representation of the content item. In some embodiments, the second input directed to the first selectable option of the one or more selectable options optionally includes an air gesture performed by one or more hands of the user (e.g., an air pinch gesture) while attention of the user (e.g., based on gaze) is directed at the first selectable option of the one or more selectable options (e.g., a curved window bar), followed by a drag gesture (e.g., a movement input) performed by the one or more hands of the user. In some embodiments, the second input includes contact by a stylus or a finger against a touch sensitive input device (e.g., a touch screen) and/or an input received from an input device in communication with the computer system such as a mouse and/or a trackball and directed to the first selectable option of the one or more selectable options (e.g., the curved window bar). In response to detecting the second input, the computer system optionally changes the size of the representation of the content item according to the drag gesture. In some embodiments, the computer system changes the size the representation of the content with a magnitude and/or direction in the three-dimensional environment corresponding to a magnitude and/or direction of a movement of the one or more hands of the user during the second input (e.g., corresponding to the drag gesture while the air pinch is maintained and/or the grab gesture against the touch sensitive input device) Displaying the one or more selectable options for controlling a size of the content item in response to the request to display the control interface reduces the number of inputs required to control the size of the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more selectable options for controlling display of the representation of the content item include one or more selectable options for ceasing display of the representation of the content item in the three-dimensional environment, such as if media controls 1410*a*-1410*c* and 1410*g* in FIGS. 14K-14M were the one or more selectable options for ceasing display of the representation of the content item in the three-dimensional environment. In some embodiments, while displaying the one or more selectable options for ceasing display of the representation of the content item in the three-dimensional environment, the computer system detects, via the one or more input devices, a second input directed to a first selectable option of the one or more selectable options, such as if play button 1410*g* in FIG. 14K were the first selectable option of the one or more selectable options. In some embodiments, in response to detecting the second input, the computer system ceases display of the representation of the content item in the three-dimensional environment, such as if playing the content item in FIG. 14L were ceasing display of the representation of the content item in the three-dimensional environment. In some embodiments, the one or more selectable options for ceasing display of the representation of the content item in the three-dimensional environment include a close icon displayed adjacent to the representation of the content item. The close icon is optionally displayed at the bottom of the representation of the content item. In some embodiments, the close icon is optionally displayed adjacent to a grabber bar or handle located adjacent to and below the representation of the content item. In some embodiments, the second input directed to the first selectable option of the one or more selectable options optionally includes an air gesture performed by one or more hands of the user (e.g., an air pinch gesture) while attention of the user (e.g., based on gaze) is directed at the first selectable option of the one or more selectable options (e.g., a close icon). In some embodiments, the second input includes contact by a stylus or a finger against a touch sensitive input device (e.g., a touch screen) and/or an input received from an input device in communication with the computer system such as a mouse and/or a trackball and directed to the first selectable option of the one or more selectable options (e.g., the close icon) (e.g., based on attention and/or a location of a cursor or other focus indicator being on the first selectable option). In response to detecting the second input, the computer system optionally ceases display of the representation of the content item in the three-dimensional environment. Displaying the one or more selectable options for ceasing display of the representation of the content item in response to the request to display the control interface reduces the number of inputs required to control the size of the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more selectable options for controlling display of the representation of the content item include one or more selectable options for selecting one or more content items for playback in the three-dimensional environment, such as if media controls 1410*a*-1410*c* and 1410*g* in FIGS. 14K-14M were the one or more selectable options for selecting one or more content items for playback in the three-dimensional environment. In some embodiments, while displaying the one or more selectable options for selecting one or more content items for playback in the three-dimensional environment, the computer system detects, via the one or more input devices, a second input directed to a first selectable option of the one or more selectable options, such as if play button 1410g in FIG. 14K were the first selectable option of the one or more selectable options. In some embodiments, in response to detecting the second input, the computer system selects the one or more content items for playback in the three-dimensional environment, such as if playing the content item in FIG. 14L were selecting the one or more content items for playback in the three-dimensional environment. In some embodiments, the one or more selectable options for selecting the one or more content items for playback are analogous to the one or more representation of content items available for display of the content picker interface described with reference to method 800. In some embodiments, the one or more selectable options for selecting one or more content items for playback in the three-dimensional environment optionally include one or more representation of the one or more content items. In some embodiments, the second input directed to the first selectable option of the one or more selectable options optionally includes an air gesture performed by one or more hands of the user (e.g., an air pinch gesture) while attention of the user (e.g., based on gaze) is directed at the first selectable option of the one or more selectable options (e.g., a menu icon). In some embodiments, the second input includes contact by a stylus or a finger against a touch sensitive input device (e.g., a touch screen) and/or an input received from an input device in communication with the computer system such as a mouse and/or a trackball and directed to the first selectable option of the one or more selectable options (e.g., the menu icon) (e.g., based on attention and/or a location of a cursor or other focus indicator being on the first selectable option). In response to detecting the second input, the computer system optionally displays a content picker interface that includes one or more representations of content items available for display in the three-dimensional environment. In some embodiments, in response to detecting the second input, the computer system displays a representation of the one or more content items concurrently with the representation of the content item in the three-dimensional environment. In some embodiments, in response to detecting the second input, the computer system ceases display of the content item in the three-dimensional environment and displays the one or more content items in the three-dimensional environment. Displaying the one or more selectable options for ceasing display of the representation of the content item in response to the request to display the control interface reduces the number of inputs required to control the size of the content item, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, displaying the first portion of the first framing element concurrently with the representation of the content item includes displaying the first portion of the first framing element behind the representation of the content item relative to a viewpoint of a user of the computer system, such as displaying the first framing element 1420 in FIGS. 14E-14G. In some embodiments, the framing element is further from the viewpoint of the user than the representation of the content item. In some embodiments, the portions of the first framing element that are not fully obscured by the representation of the content item from the viewpoint of the user (e.g., because those portions are located behind regions of the content item that are not opaque, and/or are not located behind the representation of the content item) are displayed and/or visible from the perspective of a viewpoint of the user. In some embodiments, the computer system displays the first portion of the first framing element behind the representation of the content item in accordance with the portions of the content item that correspond to content with the first (e.g., lower) degree of transparency and the portions of the content item that correspond to content with the second (e.g., higher) degree of transparency. Accordingly, the framing element optionally has more visibility to the user through the portions corresponding to the second (e.g., higher) degree of transparency than through the portions corresponding to the first (e.g., lower) degree of transparency. For example, if the content item is a video having portions of higher degree of transparency and portions of lower degree of transparency, the portion of the first framing element (e.g., a background or backing platter) are more visible through the portions of higher transparency than through the portions of lower transparency. In some embodiments, when a portion of the three-dimensional environment located behind the representation of the content item was visible through portions of the representation of the content item before display of the first framing element, the computer system forgoes display of (and/or reduces the visibility of) that portion of the three-dimensional environment (e.g., as raising the framing element behind the representation of the content item blocks or optionally partially blocks from view the portion of three-dimensional environment in the background). For example, if the content item is an image and a portion of the three-dimensional environment was visible through the image before display of the first framing element, the first portion of the first framing element displayed behind the image optionally reduces visibility of, and/or blocks (or, optionally, partially blocks), the portion of the three-dimensional environment that was visible through the image. The computer system optionally forgoes display of the portions of the first framing element located behind portions of the representation of the content item having a degree of transparency of 0% (e.g., opaque regions of the representation of the content item). Accordingly, the portion of the first framing element located behind opaque portions of the representation of the content item are optionally not visible to the user. Displaying the first portion of the first framing element behind the representation of the content item enhances the visibility of the representation of the content item to the user which facilitates the use of the computer system, enhances the operability of the computer system and makes the user-device interface more efficient, which additionally reduces power usage and improves battery life of the computer system by enabling the user to use the computer system more quickly and efficiently.

In some embodiments, displaying the representation of the content item in the three-dimensional environment includes displaying a first user interface element concurrently with the representation of the content item, such as user interface element 1416 in FIG. 14I. In some embodiments, while displaying the first user interface element concurrently with the representation of the content item, the computer system detects that one or more criteria are satisfied, including a criterion that is satisfied when a time elapsed since the display of the first framing element exceeds a first threshold duration, such as time elapsed 1435 exceeding first threshold duration 1435a in FIG. 14J. In some embodiments, in response to detecting that the one or more criteria are satisfied, the computer system ceases display of the first user interface element while maintaining display of the representation of the content item in the three-dimensional environment, such as ceasing display of the first user interface element 1416 in FIG. 14J. In some embodiments, the first user interface element includes one or more chrome regions and/or chrome elements, e.g., interface elements configured from one or more frames and/or panels (e.g., displayed concurrently as backgrounds, windows, borders, and/or platters) for the representation of the content item and/or associated controls (e.g., buttons, dials, and/or icons, among others) and interfaces such as the control interface, content picker interface, and/or environment picker interface, and/or other controls and/or interfaces displayed in the three-dimensional environment. In some embodiments, the chrome elements include the control interface, which optionally include the one or more selectable options for controlling playback of the content item at the computer system. In some embodiments, the chrome elements include the one or more selectable options for controlling display of the representation of the content item, which optionally include one or more selectable options for sharing the content item, one or more selectable options for controlling a position of the representation of the content item in the three-dimensional environment, one or more selectable options for controlling movement of the representation of the content item in the three-dimensional environment, one or more selectable options for controlling a size of the representation of the content item in the three-dimensional environment, one or more selectable options for ceasing display of the representation of the content item in the three-dimensional environment, one or more selectable options for selecting one or more content items for playback in the first three-dimensional environment. In some embodiments, the computer system ceases display of the first user interface element (e.g., the chrome regions and/or elements) after a time elapsed (e.g., in response to the time elapsed) since display of the first framing element exceeds a first threshold duration. The first threshold duration is optionally 1, 2, 3, 5, 10, 20, 30, 60, 90, 120, or 180, seconds. In some embodiments, the computer system maintains display of the representation of the content item in the three-dimensional environment while ceasing display of first user interface element (e.g., the chrome regions and/or chrome elements). In some embodiments, the first user interface was not displayed in the three-dimensional environment prior to the computer system detecting the first input. In some embodiments, the computer system displays the first user interface element in response to detecting the first input. Ceasing display of the first user interface element (e.g., the chrome regions and/or chrome elements) after a threshold duration since the display of the first framing element helps declutter the three-dimensional environment and re-emphasize the representation of the content item after display of the first framing element, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more criteria include a criterion that is satisfied when attention of the user is not directed to the first user interface element (e.g., the control interface, as described previously, or other controls such as movement or resizing controls as described herein), such as when attention is not directed to the first user interface element 1416 in FIGS. 14I-14J. In some embodiments, attention of the user is based on a gaze of the user. In some embodiments, attention of the user includes a pointer controlled by the one more input device (e.g., a mouse, a trackball, a touch screen). For example, the computer system optionally ceases display of the first user interface element (e.g., the chrome regions and/or chrome elements) when computer system detects a gaze of the user and/or a pointing device (e.g., a hand of the user and/or a stylus) but not directed at the first user interface (e.g., after the user moves their gaze away from the first user interface element, such as the control interface), and/or when a pointer controlled by the one or more input device in the three-dimensional environment is not directed to the first user interface (e.g., after the pointer is moved away from the control interface) In some embodiments, one or more criteria are not satisfied when attention of the user (e.g., based on a gaze and or a pointing device) is directed to the one or more selectable options for controlling playback of the content item (e.g., the computer system maintains display of the first user interface if attention is detected on the one or more selectable options). In some embodiments, one or more criteria are not satisfied when attention of the user (e.g., based on a gaze and or a pointer) is directed to the control interface (e.g., the computer system maintains display of the first user interface if attention is detected on the control interface). Ceasing display of the first user interface element (e.g., the chrome regions and/or chrome elements) when attention of the user is not directed to the first user interface element helps declutter the three-dimensional environment and re-emphasize the representation of the content item after display of the first framing element, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the one or more criteria include a criterion that is satisfied when interaction with the first user interface is not detected by the computer system, such as when interaction is not detected by the computer system 101 in FIGS. 14I-14J. In some embodiments, the computer system detects an interaction with the first user interface when the computer system detects a selection input directed to the first user interface (e.g., to the system control interface, the grabber bar or handle, and or the curved window bar, or any other interface element of the first user interface). The selection input optionally includes an air pinch while attention of the user (e.g., based on gaze) of the user directed to the first user interface or contact by a stylus or finger against a touch-sensitive surface directed to the first user interface. For example, the computer system detects an interaction with the first user interface when the computer system detects a selection input directed to the one or more selection options for controlling playback of the content item. Interaction not detected with the control interface include when no selection input is directed to the first user interface. Ceasing display of the first user interface element (e.g., the chrome regions and/or chrome elements) when attention of the user is not detected with the first user interface element helps declutter the three-dimensional environment, and re-emphasize the representation of the content item after display of the first framing element, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, while displaying the first user interface element, the computer system detects, via the one or more input devices, a second input directed to the first user interface element, such as the input from hand 1406*b* in FIG. 14K. In some embodiments, in response to detecting the second input, the computer system performs an operation in accordance with the second input, such as resuming playback of the content item as shown with the representation of the content item 1402 in FIGS. 14L and 14M. In some embodiments, in response to detecting the second input, the computer system ceases display of the first user interface element while maintaining display of the representation of the content item in the three-dimensional environment, such as in FIG. 14M. In response to detecting the second input directed to the first user interface element, the computer system optionally performs an operation corresponding to the input. For example, if the input is directed to the one or more selectable options for controlling playback of the content item at the computer system, in response the computer system performs an operation corresponding to the one or more options for controlling playback (e.g., if the input is directed, to a pause button, in response, the computer system performs a pause operation, or pause playback of the content item). In some embodiments, the computer system maintains display of the representation of the content item in the three-dimensional environment while ceasing display of first user interface element (e.g., the chrome regions and/or chrome elements). In some embodiments, the second input includes an air gesture performed by one or more hands of the user (e.g., an air pinch gesture) while attention of the user (e.g., based on gaze) is directed at the first user interface element. In some embodiments, the second input includes contact by a stylus or a finger against a touch sensitive input device (e.g., a touch screen) and/or an input received from an input device in communication with the computer system such as a mouse and/or a trackball and directed to the first user interface element (e.g., based on attention and/or a location of a cursor or other focus indicator being on the first user interface element). Ceasing display of the first user interface element (e.g., the chrome regions and/or chrome elements) in response to detecting interaction with the first user interface element helps declutter the three-dimensional environment, and re-emphasize the representation of the content item after display of the first framing element, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, in accordance with a determination that interaction with the first user interface element has not been detected while the first user interface element is displayed (e.g., interaction as described above), the first threshold duration has a first value, such as threshold duration 1435*a* in FIGS. 141-14J. In some embodiments, in accordance with a determination that interaction with the first user interface element has been detected while the first user interface element is displayed, the first threshold duration has a second value, less than the first value, such as threshold duration 1435*b* in FIGS. 14K-14L. Accordingly, when interaction has been detected with the first user interface element (e.g., when the computer system has detected an input directed to an interface element of the first user interface, such as the one or more selectable options for controlling playback of the content item), the computer system ceases display of the first user interface (e.g., the chrome regions and/or chrome elements) faster (e.g., when the first threshold duration is the first value or lower value) than when interaction has not been detected with the control interface (e.g., when the first threshold duration is the second value or higher value). In some embodiments, interaction with the first user interface element has been detected when interaction was detected while the first user interface element is displayed and the first user interface element has not ceased display (e.g., the interaction detected is an interaction that was detected during the more recent instance of displaying the first user interface). Ceasing display of the first user interface element faster when interaction with the first user interface element is detected than when interaction is not detected helps declutter the three-dimensional environment when the user interacts with the control interface while maintain more options for interaction for the user when the user does not interact with the control interface, which simplifies the user's interaction with the computer system, facilitates the use of the computer system, enhances the operability of the computer system and makes the user-device interface more efficient, which additionally reduces power usage and improves battery life of the computer system by enabling the user to use the computer system more quickly and efficiently.

In some embodiments, interaction with the first user interface elements includes input for controlling playback of the content item at the computer system, such the input from hand 1406*b* directed to the play button 1410*g* in FIG. 14K. The input for controlling playback is optionally directed to the one or more selectable options for controlling playback of the content item at the computer system. The one or more selectable options optionally include for example a play button, a pause button, a stop button, a rewind button, a forward button, a volume dial or slider, among other selectable options. In response to detecting the input for controlling playback of the content item at the computer system, the computer system optionally performs an operation corresponding to the one or more selectable options for controlling playback. For example, if the input is directed to a pause button, in response, the computer system performs a pause operation (e.g., pauses playback of the content item). Ceasing display of the first user interface element (e.g., the chrome regions and/or chrome elements) in response to detecting interaction with the first user interface element helps declutter the three-dimensional environment and emphasize the control interface during the user's interaction with the control interface, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, interaction with the first user interface element includes input for changing one or more spatial properties of the representation of the content item in the three-dimensional environment, such as if the input directed to the play button 1410*g* in FIG. 14K were an input for changing one or more spatial properties of the representation of the content item in the three-dimensional environment. For example, the one or more spatial properties optionally include a size, a shape, a position, an orientation of the representation of the content item, whether the content item is displayed in a framed mode of display, and/or whether the content item is displayed in an immersive mode of display, such as described with reference to methods 1200 and/or 1300. In some embodiments, the input for changing or more spatial properties of the representation of the content item in the three-dimensional environment includes input directed to the one or more selectable options for controlling a size of the representation of the content item (e.g., a curved window bar) in the three-dimensional environment, such as previously described. In some embodiments, the input for changing or more spatial properties of the representation of the content item in the three-dimensional environment includes input directed to the one or more selectable options for controlling a position of the representation of the content item (e.g., a grabber bar or handle) in the three-dimensional environment, such as previously described. In some embodiments, changing one or more spatial properties of the representation of the content item has one or more of the characteristics of changing one or more spatial properties described previously in method 1500. Ceasing display of the first user interface element (e.g., the chrome regions and/or chrome elements) in response to detecting input for changing or more spatial properties helps declutter the three-dimensional environment and emphasize the control interface during the user's interaction with the control interface, which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the first user interface element includes the first framing element, such as the first user interface 1406 including the first framing element 1420 in FIG. 14E-14I. Accordingly, in some embodiments, the computer system ceases display of the first framing element (e.g., concurrently with the first user interface element) after a time elapsed since display of the first framing element exceeds a threshold duration. Including the first framing element in the first user interface element (e.g., the chrome regions and/or chrome elements) helps declutter the three-dimensional environment and emphasize the representation of the content item when the computer system ceases display of the first user interface element (and therefore of the first framing element) which facilitates the use of the computer system, enhances the operability of the computer system and makes the user-device interface more efficient, which additionally reduces power usage and improves battery life of the computer system by enabling the user to use the computer system more quickly and efficiently.

In some embodiments, the first user interface element includes one or more selectable options for controlling playback of the content item at the computer system (e.g., the first user interface element includes the control interface for the content item, previously described), such as selectable options 1410a-1410c in FIGS. 14E-14I. The one or more selectable options optionally include for example a play button, a pause button, a stop button, a rewind button, a forward button, a volume dial or slider, among other selectable options. Accordingly, in some embodiments, the computer system ceases display of the one or more selectable options including after a time elapsed since display of the first framing element exceeds a threshold duration. Including the one or more selectable options for controlling playback of the content item in the first user interface element (e.g., the chrome regions and/or chrome elements) helps declutter the three-dimensional environment and emphasize the representation of the content item when the computer system ceases display of the first user interface element (and therefore of the one or more selectable options), which facilitates the use of the computer system, enhances the operability of the computer system and makes the user-device interface more efficient, which additionally reduces power usage and improves battery life of the computer system by enabling the user to use the computer system more quickly and efficiently.

In some embodiments, a size and/or a shape of a portion of the content item corresponding to the second degree of transparency changes over time while the content item is playing at the computer system (e.g., in accordance with progression of playback of the content item at the computer system), such as the size and/or shape of portion 1408 of the representation of the content item 1402 changing over time during playback of the content item in FIGS. 14E-14G. Correspondingly, a size and/or a shape of a portion of the framing element visible at a location that corresponds to the portion of the content item changes over time according to the change of the portion of the content item while the content item is playing (e.g., as playback of the content item progresses). For example, the content item is a video where a person is playing with a ball. The video optionally includes an outer frame that surrounds an inner frame (e.g., forms a border region around the inner frame). The player and the ball are optionally located within the inner frame at the start of playback. The inner frame including the player and the ball optionally constitute a portion of the content item corresponding to the first degree of transparency (e.g., opaque in this example), whereas the border region around the inner frame formed by the outer frame is optionally the portion corresponding to the second degree of transparency (e.g., 80% transparent in this example but could alternatively be 90% or 100% transparent). As the player throws the ball during play back and the opaque ball enters the 80% transparent border region, the ball's presence in the border region optionally causes part of the border region to be non-transparent (e.g., the portion of the border region at which the ball is located), changing the shape of the portion of the content item corresponding to the second degree of transparency (e.g., the border region). Further, as the ball moves through the border region as playback progresses, the shape of the portion of the content item corresponding to the second degree of transparency optionally changes over time. A similar result optionally occurs if a character in the video moves between a portion of the video that corresponds to the first degree of transparency and a portion of the video that corresponds to the second degree of transparency. In some embodiments, a position of a portion of the content item corresponding to the second degree of transparency changes over time while the content item is playing at the computer system (e.g., as playback of the content item progresses). Displaying a portion of a first framing element concurrently with the representation of the content item wherein the size and/or shape of a portion of the content item corresponding to a higher degree of transparency changes, enhances the visibility of the representation of the content item, which facilitates the use of the computer system, enhances the operability of the computer system and makes the user-device interface more efficient, which additionally reduces power usage and improves battery life of the computer system by enabling the user to use the computer system more quickly and efficiently.

It should be understood that the particular order in which the operations in method 1500 have been described is merely exemplary and is not intended to indicate that the described order is the only order in which the operations could be performed. One of ordinary skill in the art would recognize various ways to reorder the operations described herein. In some embodiments, aspects/operations of method 1500 may be interchanged, substituted, and/or added between these methods. For example, various object manipulation techniques and/or object movement techniques of method 1500 is optionally interchanged, substituted, and/or added between these methods. For brevity, these details are not repeated here.

FIGS. 16A-16P illustrate examples of a computer system facilitating docking of a content item in a virtual environment based on an input angle of elevation in accordance with some embodiments.

FIG. 16A illustrates a computer system 101 (e.g., an electronic device) displaying, via a display generation component (e.g., display generation component 120 of FIGS. 1 and 3), a three-dimensional environment 1600 from a viewpoint of a user 1602 in top-down view 1605 (e.g., facing the back wall of the physical environment in which computer system 101 is located).

In some embodiments, computer system 101 includes a display generation component 120. In FIG. 16A, the computer system 101 includes one or more internal image sensors 114*a* oriented towards the face of the user 1602 (e.g., eye tracking cameras 540 described with reference to FIG. 5). In some embodiments, internal image sensors 114*a* are used for eye tracking (e.g., detecting a gaze of the user). Internal image sensors 114*a* are optionally arranged on the left and right portions of display generation component 120 to enable eye tracking of the user's left and right eyes. Computer system 101 also includes external image sensors 114*b* and 114*c* facing outwards from the user to detect and/or capture the physical environment and/or movements of the user's hands.

As shown in FIG. 16A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1600. For example, three-dimensional environment 1600 includes a representation of a window 1607, which is optionally a representation of a physical window in the physical environment, and a representation of a sofa 1608, which is optionally a representation of a physical sofa in the physical environment.

As discussed in more detail below, display generation component 120 is illustrated as displaying content in the three-dimensional environment 1600. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIGS. 16A-16P.

Display generation component 120 has a field of view (e.g., a field of view captured by external image sensors 114*b* and 114*c* and/or visible to the user via display generation component 120) that corresponds to the content shown in FIG. 16A. Because computer system 101 is optionally a head-mounted device, the field of view of display generation component 120 is optionally the same as or similar to the field of view of the user.

As discussed herein, one or more air pinch gestures performed by a user (e.g., with hand 1603) are detected by one or more input devices of computer system 101 and interpreted as one or more user inputs directed to content displayed by computer system 101. Additionally or alternatively, in some embodiments, the one or more user inputs interpreted by computer system 101 as being directed to content displayed by computer system 101 are detected via one or more hardware input devices (e.g., controllers) rather than via the one or more input devices that are configured to detect air gestures, such as the one or more air pinch gestures, performed by the user. Such depiction is intended to be exemplary rather than limiting; the user optionally provides user inputs using different air gestures and/or using other forms of input.

As mentioned above, the computer system 101 is configured to display content in the three-dimensional environment 1600 using the display generation component 120. In FIG. 16A, the computer system 101 detects an input provided by the user 1602 corresponding to a request to display a virtual environment in the three-dimensional environment 1600. For example, as shown in FIG. 16A, the computer system 101 the hand 1603 of the user 1602 provide a rotation of hardware element 1604 of the computer system 101 (e.g., a physical button or dial of the computer system 101). In some embodiments, the input provided by the user 1602 corresponds to a request to display the virtual environment at a respective immersion level (e.g., determined by a magnitude (e.g., of speed and/or distance) of the rotation of the hardware element 1604), as discussed below.

Figure 16B:
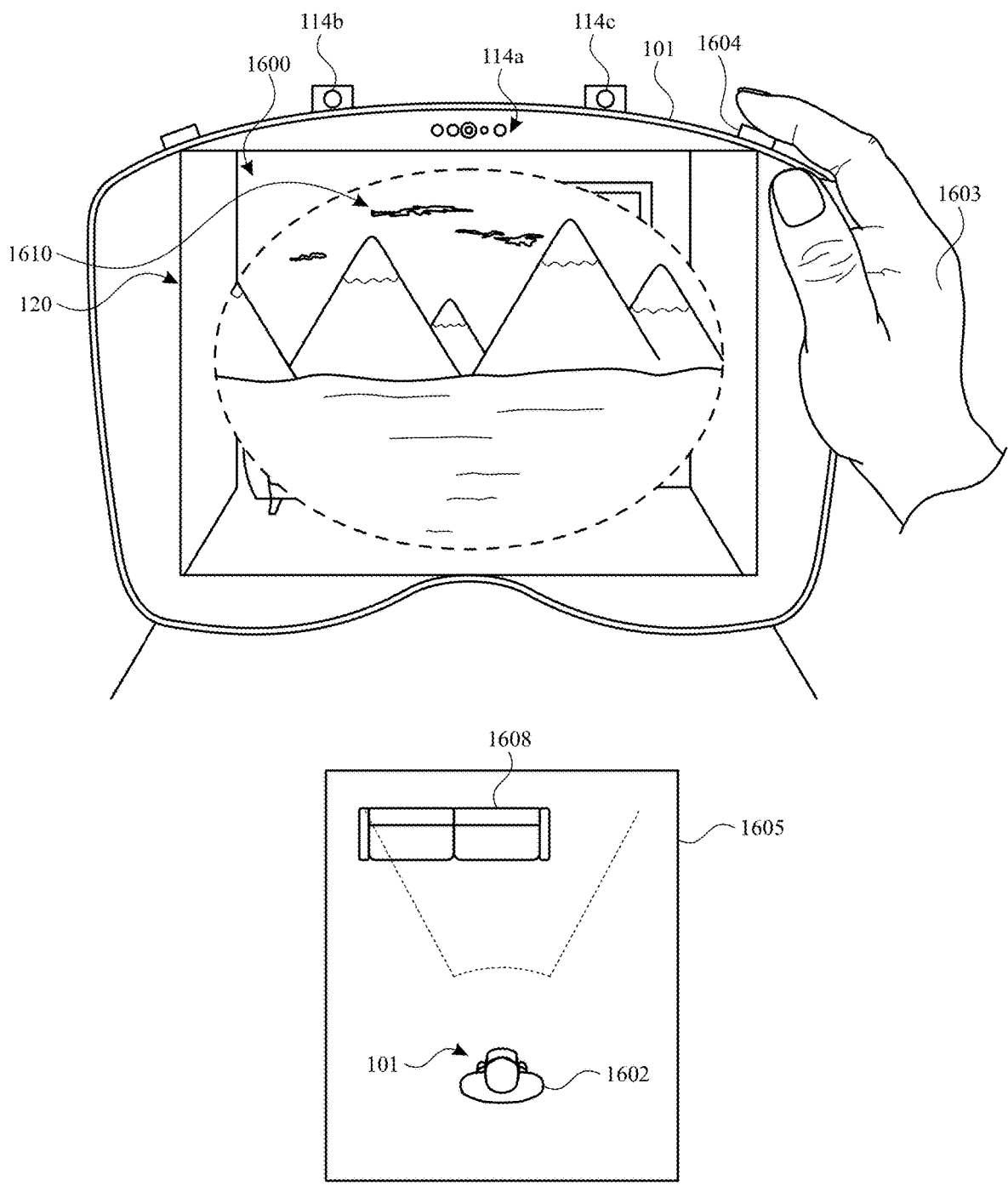

In some embodiments, as shown in FIG. 16B, in response to detecting the input provided by the hand 1603 directed to the hardware element 1604, the computer system 101 displays virtual environment 1610 in the three-dimensional environment 1600. In some embodiments, the virtual environment 1610 corresponds to a currently selected system environment of the computer system 101, such as a virtual environment selected (e.g., automatically and/or by default) by the computer system 101 or a virtual environment previously selected by a respective user (e.g., the user 1602) at the computer system 101. For example, as shown in FIG. 16B, the virtual environment 1610 is or includes a mountain environment. In some embodiments, as mentioned above, the virtual environment 1610 is displayed in the three-dimensional environment 1600 with a respective level of immersion. For example, in FIG. 16B, the computer system 101 is displaying the virtual environment 1610 at a first level of immersion determined by the magnitude of the rotation of the hardware element 1604. Additional details regarding virtual environments and levels of immersion are provided with reference to method 1700.

In FIG. 16B, while displaying the virtual environment 1610 at the first level of immersion in the three-dimensional environment, the computer system 101 detects an input corresponding to a request to display a home user interface of the computer system 101. For example, as shown in FIG. 16B, the computer system 101 detects a selection (e.g., rather than a rotation) of the hardware element 1604 provided by the hand 1603 of the user 1602.

Figure 16C:
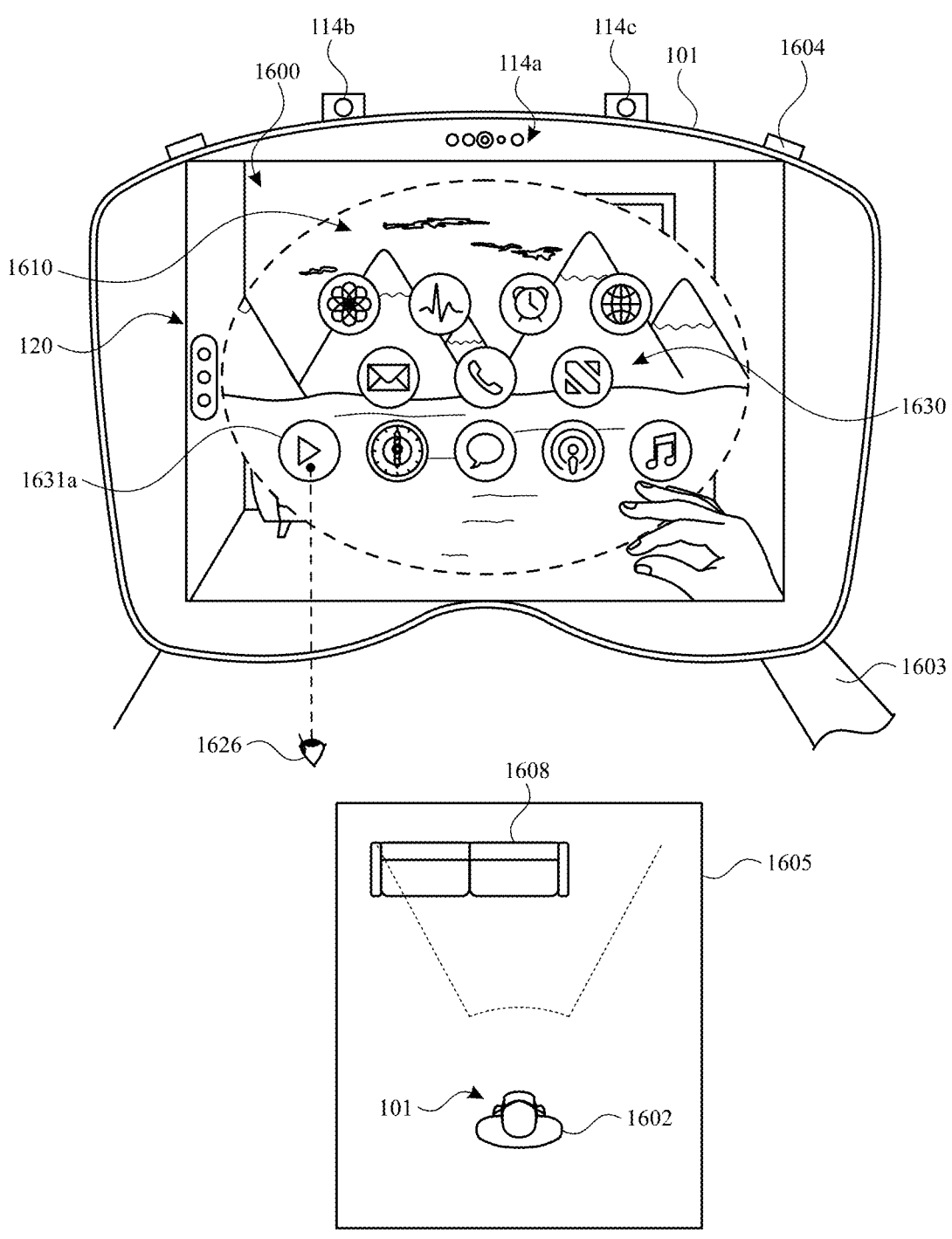

In some embodiments, as shown in FIG. 16C, in response to detecting the selection of the hardware element 1604, the computer system 101 displays a home user interface 1630 in the three-dimensional environment 1600 (e.g., overlaid on and/or within the virtual environment 1610 from a viewpoint of the user 1602). In some embodiments, the home user interface 1630 corresponds to a home user interface of the computer system 101 that includes a plurality of selectable icons associated with respective applications configured to be run on the computer system 101, as shown in FIG. 16C. In some embodiments, as shown in FIG. 16C, the home user interface 1630 is displayed at a center of the field of view of the display generation component 120 in the three-dimensional environment 1600.

In FIG. 16C, the computer system 101 detects an input provided by hand 1603 corresponding to a selection of a first icon 1631a of the plurality of icons of the home user interface 1630 in the three-dimensional environment 1600. For example, as shown in FIG. 16C, the computer system 101 detects an air pinch gesture performed by the hand 1603 (e.g., in which an index finger and thumb of the hand 1603 come together to make contact), optionally while attention (e.g., including gaze 1626) is directed to the first icon 1631a in the three-dimensional environment 1600.

In some embodiments, the first icon 1631a is associated with a first application that is configured to be run on the computer system 101. Particularly, in some embodiments, the first icon 1631a is associated with an application corresponding to and/or including media-based content that is able to be displayed (e.g., played back) in the three-dimensional environment 1600. In some embodiments, in response to detecting the selection of the first icon 1631a, the computer system 101 initiates a process to display a first content item in the three-dimensional environment 1600. For example, the computer system 101 displays a content selection user interface that includes a plurality of content items, including the first content item. In some embodiments, the computer system 101 detects a selection of the first content item for playback in the three-dimensional environment 1600 (e.g., via a selection of a representation of the first content item in the content selection user interface discussed above).

Figure 16D:
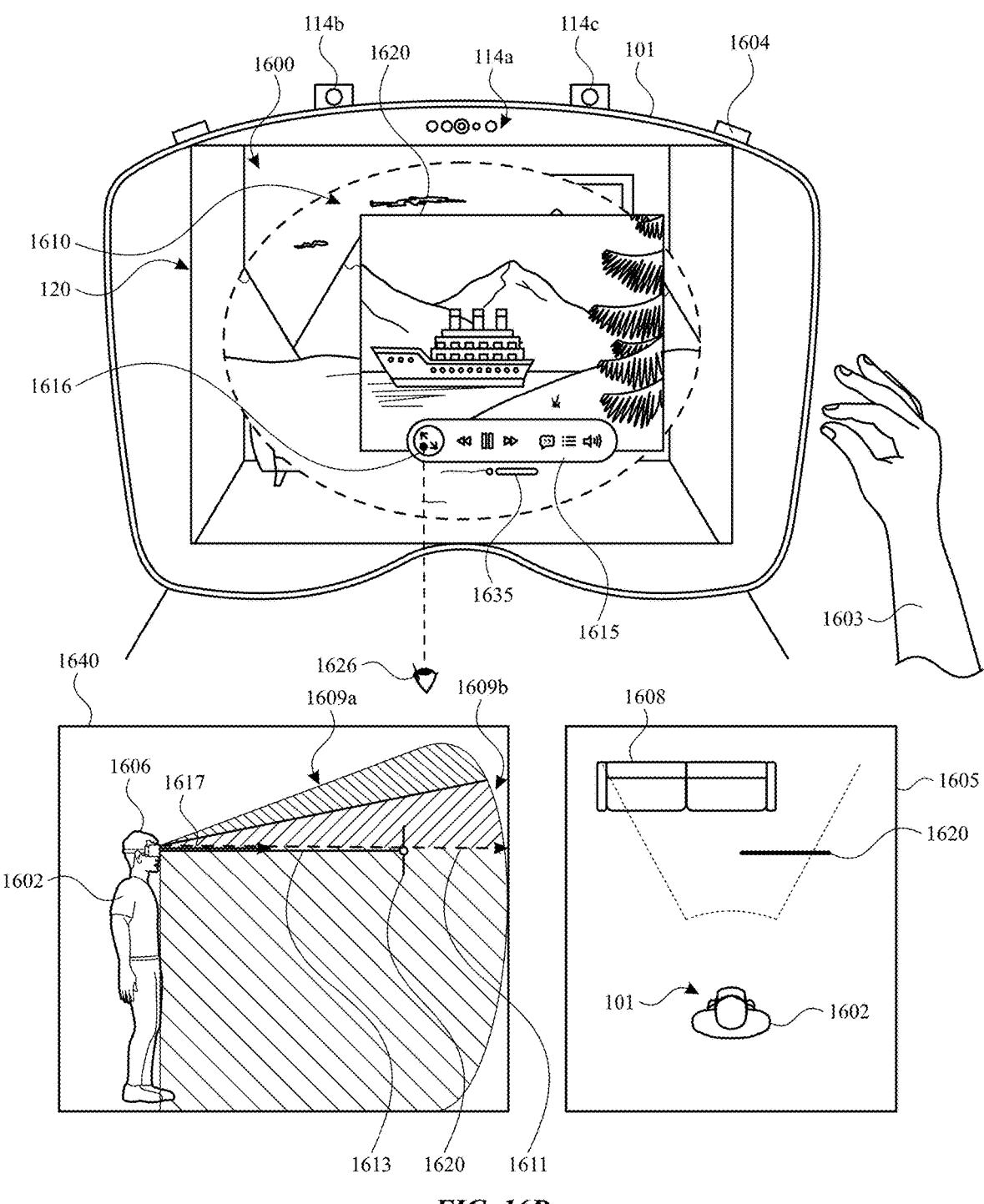

In some embodiments, as shown in FIG. 16D, the computer system 101 is displaying a first content item 1620 in the three-dimensional environment 1600 (e.g., after detecting the selection of the first icon 1631a as discussed above). For example, the first content item is being played back in a media playback user interface (e.g., a virtual window) in the three-dimensional environment 1600. In some embodiments, as shown in the top-down view 1605 in FIG. 16D, the computer system 101 displays the first content item 1620 at a first location in the three-dimensional environment 1600 relative to the viewpoint of the user 1602. For example, as shown in FIG. 16D, the first content item 1620 is displayed in front of and/or within a portion of the virtual environment 1610 in the three-dimensional environment 1600 from the viewpoint of the user 1602. As shown in FIG. 16D, the computer system 101 maintains display of the virtual environment 1610 with the first level of immersion in the three-dimensional environment 1600 when the first content item 1620 is displayed in the three-dimensional environment 1600. Additionally, in some embodiments, the first content item 1620 is associated with (e.g., is displayed with) a movement element 1635 that is selectable to initiate movement of the first content item 1620 relative to the viewpoint of the user 1602 in the three-dimensional environment 1600.

In FIG. 16D, the computer system 101 detects an input corresponding to a request to dock the first content item 1620 in the virtual environment 1610. For example, the computer system 101 detects an input corresponding to a request to display the first content item 1620 docked (e.g., displayed at a fixed position and/or with a fixed orientation) within the virtual environment 1610 from the viewpoint of the user 1602. As shown in FIG. 16D, the first content item 1620 is displayed with playback controls 1615 in the three-dimensional environment 1600. For example, the playback controls 1615 include a plurality of options for controlling playback of the first content item 1620, such as pausing and/or resuming playback of the first content item 1620, fast forwarding and/or rewinding playback of the first content item 1620, controlling a volume level of the first content item 1620, and the like. In some embodiments, as shown in FIG. 16D, the playback controls 1615 include docking option 1616. Accordingly, in some embodiments, the input corresponding to the request to dock the first content item 1620 in the virtual environment 1610 includes a selection of the docking option 1616. For example, in FIG. 16D, the computer system 101 detects the hand 1603 perform an air pinch gesture, optionally while the attention (e.g., including the gaze 1626) of the user 1602 is directed to the docking option 1616 in the three-dimensional environment 1600.

In some embodiments, the computer system 101 docks a content item in the three-dimensional environment 1600 based on an input angle of elevation that is associated with the docking input (e.g., the selection of the docking option 1616). For example, in FIG. 16D, when the computer system 101 detects the selection of the docking option 1616 provided by the hand 1603, the input is associated with input elevation vector 1617, as indicated in side view 1640. In some embodiments, as shown in the side view 1640, the input elevation vector 1617 is based on a direction (e.g., orientation) of the head 1606 of the user 1602. Accordingly, in the side view 1640 in FIG. 16D, the input angle of elevation that is associated with the docking input is measured between the input elevation vector 1617 and a horizon plane 1611 of the field of view of the user 1602. In some embodiments, the input angle of elevation that is associated with the docking input is based on one or more hands of the user, such as a position and/or movement of a hand of the user 1602 relative to the viewpoint of the user 1602. Details regarding the input elevation vector 1617 and the horizon plane 1611 are provided with reference to method 1700. Additionally, in FIG. 16D, when the selection of the docking option 1616 is detected, the first content item 1620 is associated with a first (e.g., initial) display angle of elevation in the three-dimensional environment 1600. For example, as indicated in the side view 1640 in FIG. 16D, the display angle of elevation of the first content item is measured between a vector 1613 (e.g., extending between the head 1606 of the user 1602 and a respective portion of the first content item 1620, such as a center of the first content item 1620) and the horizon plane 1611 discussed above. In the example of FIG. 16D, the input angle of elevation (e.g., measured between the input elevation vector 1617 and the horizon plane 1611) is equal to and/or parallel to the display angle of elevation (e.g., measured between the vector 1613 and the horizon plane 1611).

Figure 16E:
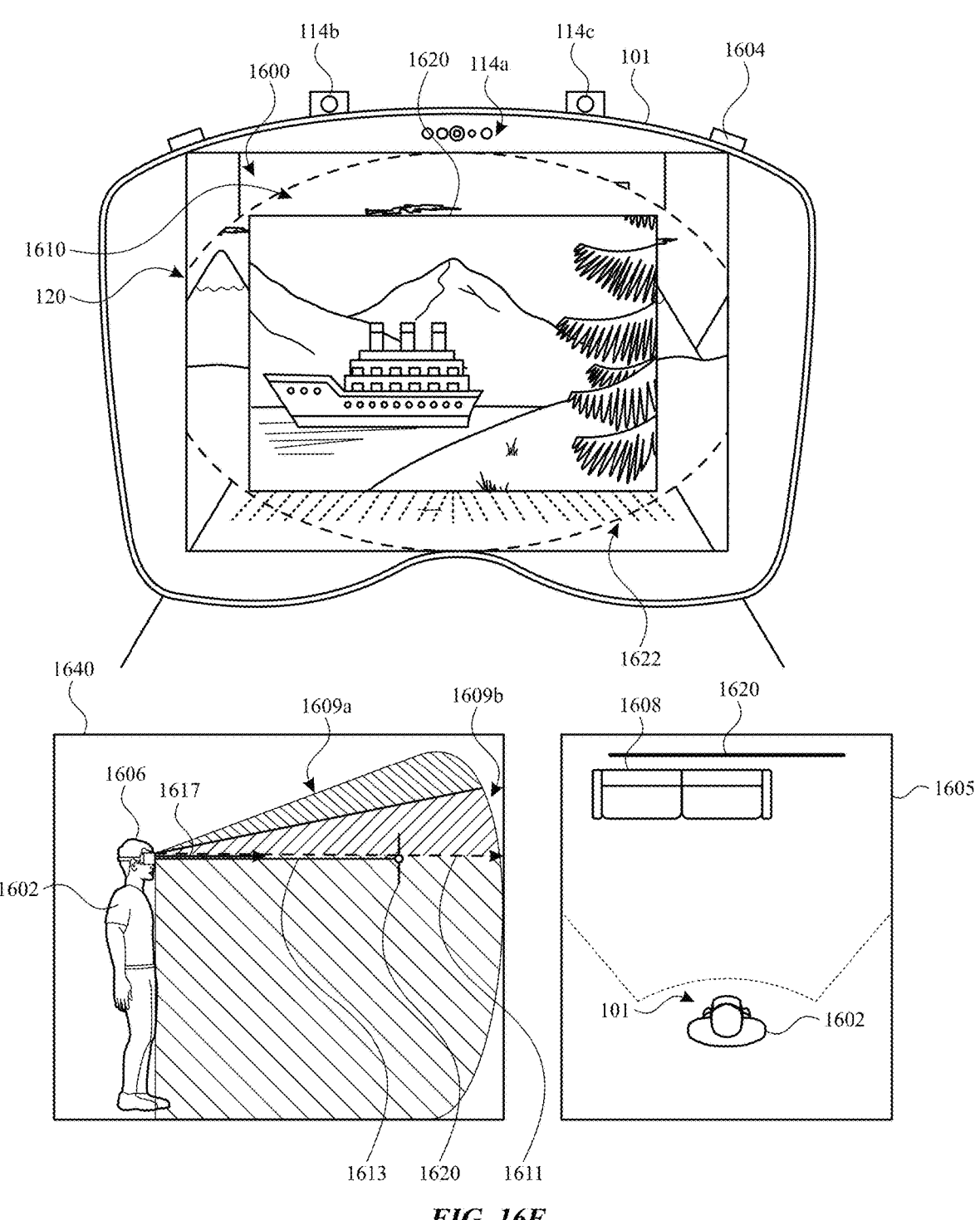

In some embodiments, as shown in FIG. 16E, in response to detecting the docking input discussed above (e.g., the selection of the docking option 1616), the computer system 101 docks the first content item 1620 within the virtual environment 1610 based on the input angle of elevation associated with the docking input. Particularly, in the side view 1640 in FIG. 16E, the computer system 101 docks the first content item 1620 based on the particular range of angles of elevation the input angle of elevation is within when the docking input is detected. For example, as shown in the side view 1640 in FIG. 16E, the computer system 101 defines/determines a first set of angles 1609a and a second set of angles 1609b, less than the first set of angles 1609a. In some embodiments, the first set of angles 1609a and the second set of angles 1609b are determined relative to the horizon plane 1611 discussed above. Details and example values for the first and the second set of angles of elevation are provided with reference to method 1700.

In FIG. 16E, because the computer system 101 determines that the docking input discussed above is detected while the input angle of elevation is aligned to the horizon plane 1611 (e.g., is equal to 0 degrees), and is thus within the second set of angles 1609b as indicated in the side view 1640, the computer system 101 displays the first content item 1620 docked in the virtual environment 1610 at a first position (e.g., a fixed position) relative to the viewpoint of the user 1602. For example, as shown in FIG. 16E, the computer system 101 centers the first content item 1620 in the field of view of the display generation component 120 and increases a size of the first content item 1620 in the three-dimensional environment 1600 from the viewpoint of the user 1602. Additionally, as indicated in the top-down view 1605 in FIG. 16E, the first position of the first content item 1620 within the virtual environment 1610 is farther from the viewpoint of the user 1602 in the three-dimensional environment 1600 than the prior (e.g., initial) location of the first content item 1620 shown in FIG. 16D. In some embodiments, as shown in FIG. 16E, when the computer system 101 docks the first content item 1620 in the virtual environment 1610, the computer system 101 increases the level of immersion of the virtual environment 1610 (e.g., to a second level of immersion that accommodates the increased size of the first content item 1620 in the three-dimensional environment 1600). In some embodiments, the computer system 101 applies and/or displays a first animation of docking the first content item 1620 at the first position in the virtual environment 1610. For example, the computer system 101 gradually increases the size of the first content item 1620, gradually moves the first content item 1620 relative to the viewpoint of the user 1602, and gradually increases the level of immersion of the virtual environment 1610 in the three-dimensional environment 1600. Additional details regarding docking content items in the three-dimensional environment 1600 are provided below with reference to method 1700.

In some embodiments, as shown in FIG. 16E, while the first content item 1620 is docked in the virtual environment 1610, the computer system 101 displays a virtual light spill effect 1622 corresponding to the first content item 1620 in the three-dimensional environment 1600. For example, the computer system 101 displays virtual light spill effect 1622 with a respective brightness, translucency, color, saturation, and/or uniformity that is based on a visual appearance of the first content item 1620 (e.g., lighting, coloration, shadow, and/or motion of a particular scene or image of the first content item 1620 that is currently displayed). In some embodiments, the virtual light spill effect 1622 is configured to be changed in visual appearance based on changes in visual appearance of the first content item 1620 (e.g., changes in lighting, coloration, shadow, and/or motion of a particular scene or image of the first content item 1620 that is currently displayed). In some embodiments, the virtual light spill effect 1622 includes and/or is accompanied by a virtual shadow effect in the three-dimensional environment 1600, such as the display of one or more virtual shadows of the first content item 1620 in the three-dimensional environment 1600 and/or of the lighting of the particular scene or image of the first content item 1620 that is currently displayed. In some embodiments, as discussed in more detail below, the computer system 101 displays the virtual light spill effect 1622 for display angles of elevation of the first content item 1620 that are within the first set of angles 1609a and the second set of angles 1609b. Additional details regarding the display of the virtual light spill effect 1622 are provided with reference to method 1700.

Figure 16F:
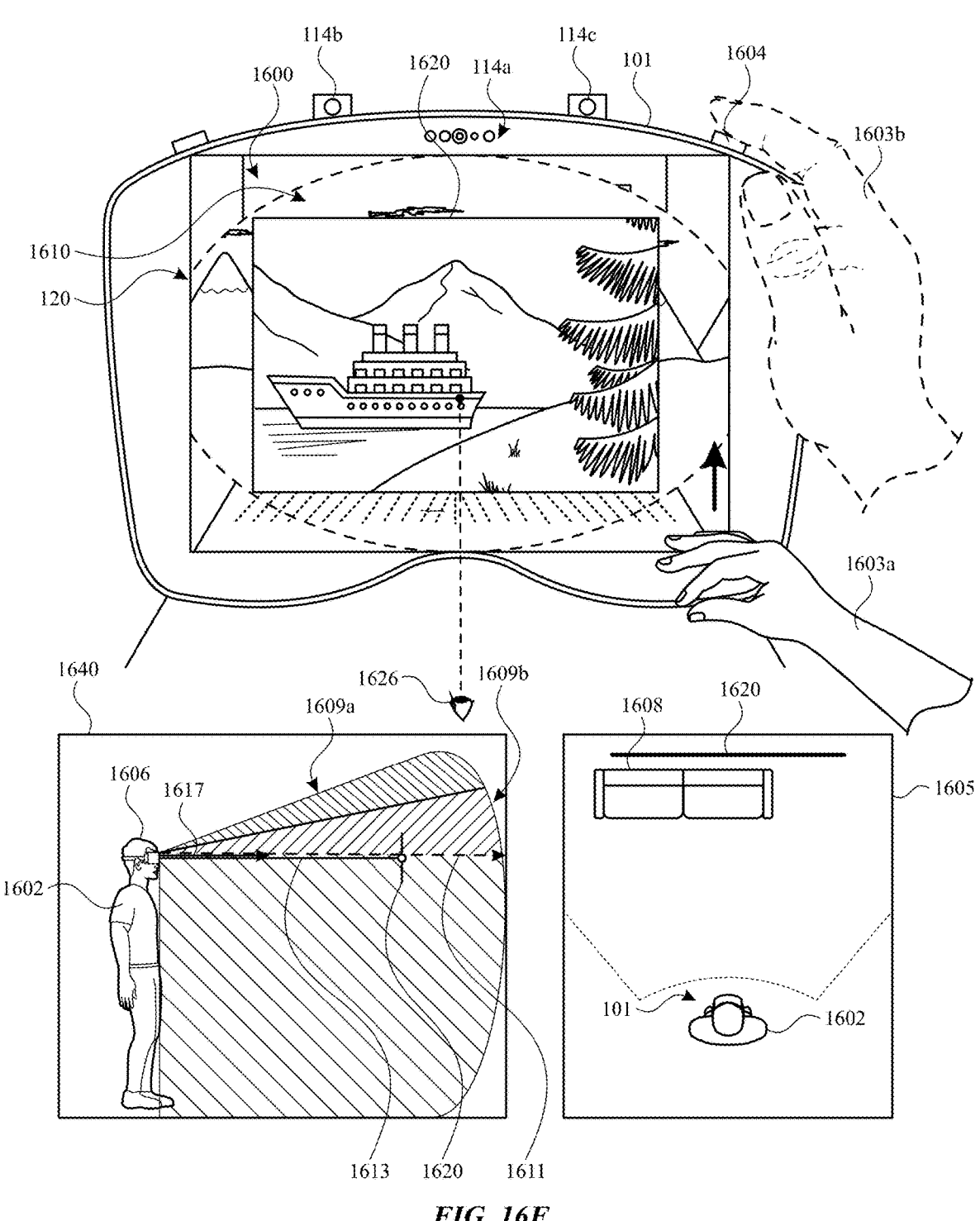

In FIG. 16F, the computer system 101 detects an input corresponding to a request to change the display angle of elevation (e.g., measured between the vector 1613 and the horizon plane 1611) of the first content item 1620 in the three-dimensional environment 1600 while the first content item 1620 is docked in the virtual environment 1610. For example, as shown in FIG. 16F, the computer system 101 detects an air pinch and drag gesture performed by hand 1603a of the user 1602, optionally while the attention (e.g., including the gaze 1626) of the user 1602 is directed to the first content item 1620 in the three-dimensional environment 1600. In some embodiments, as shown in FIG. 16F, the movement of the hand 1603a of the user 1602 corresponds to a request to increase the display angle of elevation of the first content item 1620 in the three-dimensional environment 1600. For example, the upward movement of the hand 1603a corresponds to an increase in the input angle of elevation associated with input provided by the hand 1603a. Alternatively, in FIG. 16F, the computer system 101 detects a selection of the hardware element 1604 provided by hand 1603b of the user 1602. For example, in FIG. 16F, the computer system 101 detects the hand 1603b provide a selection of the hardware element 1604 while the input angle of elevation associated with the input provided by the hand 1603b is above the first set of angles of elevation 1609a. It should be understood that while multiple hands and corresponding inputs are illustrated in FIG. 16F, such hands and inputs need not be detected by computer system 101 concurrently; rather, in some embodiments, computer system 101 independently responds to the hands and/or inputs illustrated and described in response to detecting such hands and/or inputs independently.

Figure 16G:
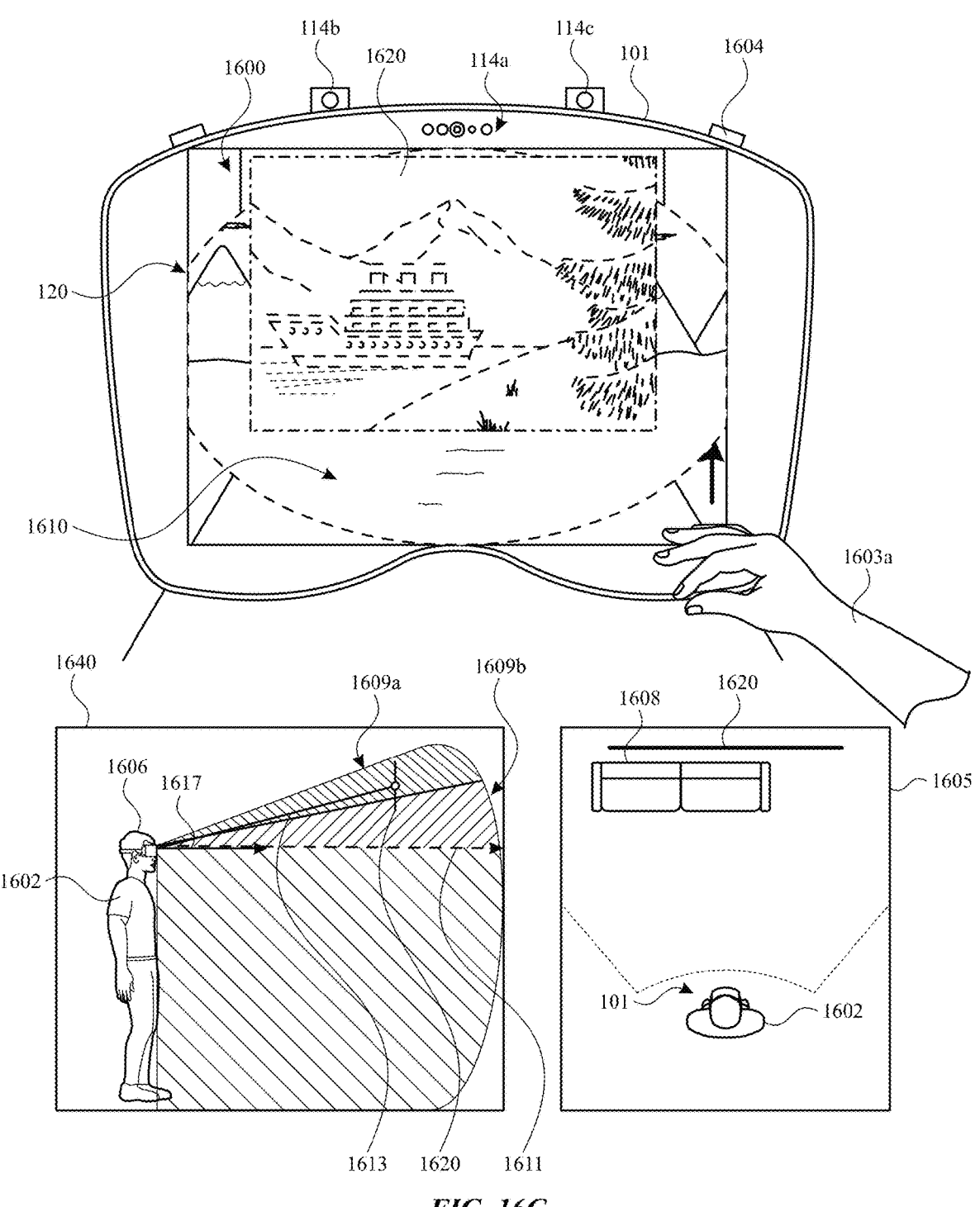
Figure 16H:
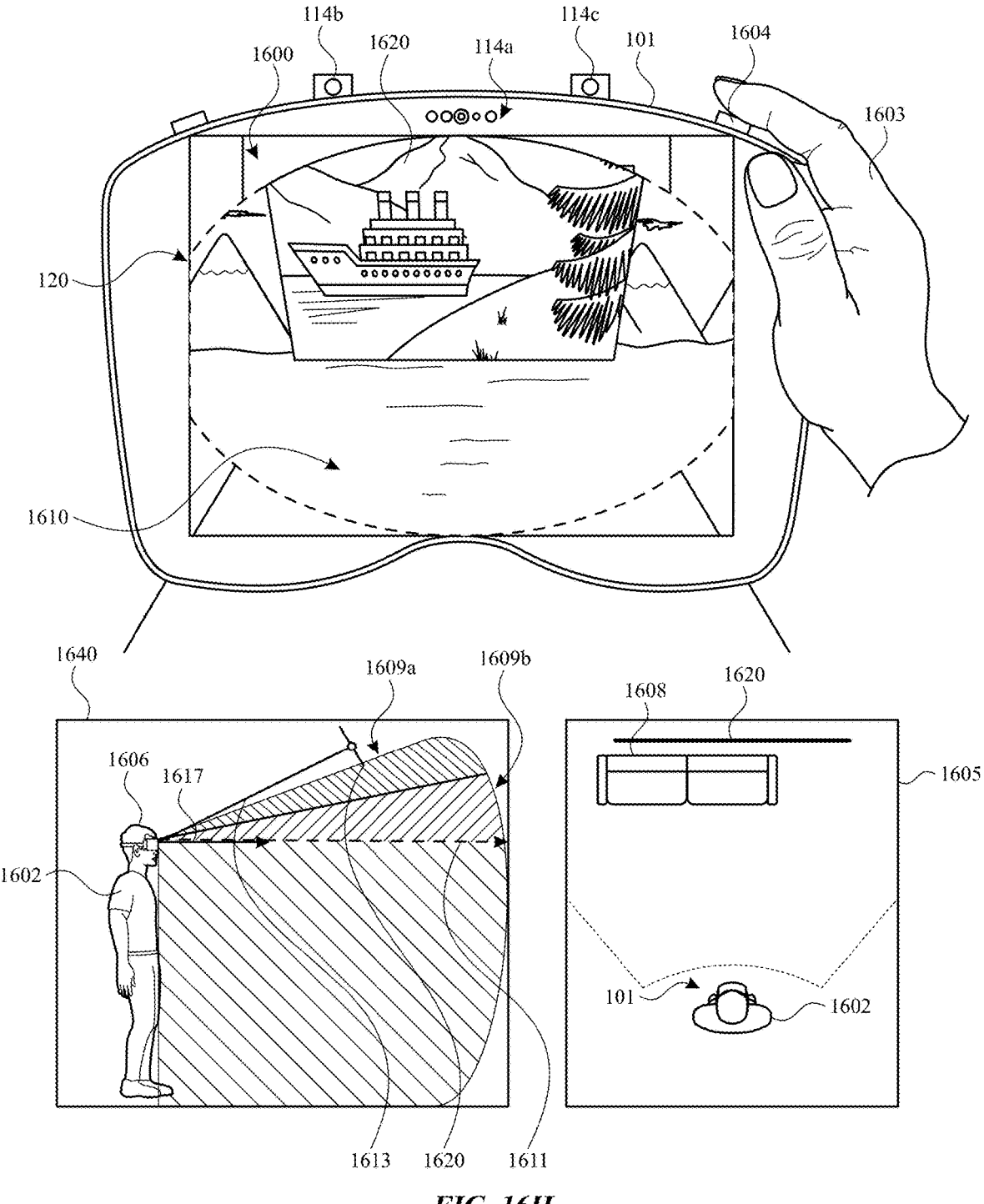

In some embodiments, in response to detecting the input corresponding to the request to change the display angle of elevation (e.g., measured between the vector 1613 and the horizon plane 1611) of the first content item 1620 in the three-dimensional environment 1600, the computer system 101 initiates movement of the first content item 1620 to a second position, different from the first position above, within the virtual environment 1610 in the three-dimensional environment 1600 (e.g., updating the display angle of elevation of the first content item 1620) based on the input angle of elevation (e.g., based on the movement of the hand 1603a), shown in FIG. 16H. For example, as shown in FIG. 16G, the movement of the hand 1603a corresponds to and/or causes the input angle of elevation being within the first set of angles 1609a in the three-dimensional environment 1600 as indicated in the side view 1640. Accordingly, as shown in FIG. 16G, the computer system 101 moves the first content item 1620 within the virtual environment 1610 to a display angle of elevation that is higher than the display angle of elevation of the first content item 1620 in the side view 1640 in FIG. 16F. Particularly, as shown in the side view 1640 in FIG. 16G, the display angle of elevation (e.g., measured between the vector 1613 and the horizon plane 1611) is within the first set of angles 1609a in the three-dimensional environment 1600. In some embodiments, while the display angle of elevation of the first content item 1620 is within the first set of angles 1609a, the computer system 101 forgoes changing an orientation of (e.g., tilting) the first content item 1620 in the three-dimensional environment 1600. For example, as indicated in the side view 1640 in FIG. 16G, when the first content item 1620 is moved upward relative to the viewpoint of the user 1602 in accordance with the movement of the hand 1603a, such that the display angle of elevation of the first content item 1620 is in the first set of angles 1609*a*, the computer system 101 forgoes tilting the first content item 1620 (e.g., downward toward the viewpoint of the user 1602) in the three-dimensional environment 1600.

In some embodiments, as shown in FIG. 16G, the computer system 101 applies and/or displays a second animation, different from the first animation discussed above, of docking the first content item 1620 at the second position in the virtual environment 1610. For example, in FIG. 16G, while changing the display angle of elevation of the first content item 1620 in the virtual environment 1610 within the three-dimensional environment 1600, the computer system 101 reduces the visual prominence of the first content item 1620. In some embodiments, reducing the visual prominence of the first content item 1620 includes fading out the first content item 1620, reducing a brightness of the first content item 1620, increasing a transparency of the first content item 1620, and/or reducing a coloration of the first content item 1620 in the three-dimensional environment 1600. In some embodiments, reducing the visual prominence of the first content item 1620 includes ceasing display of the first content item 1620 (e.g., at the first position) in the three-dimensional environment 1600.

In some embodiments, as shown in FIG. 16H, in response to detecting a conclusion and/or termination of the movement of the hand 1603*a* (e.g., a release of the air pinch gesture provided by the hand 1603*a*) or the selection of the hardware element 1604 provided by the hand 1603*b*, the computer system 101 docks the first content item 1620 at the second position in the virtual environment 1610 within the three-dimensional environment 1600. In some embodiments, the computer system 101 detects the termination of the movement of the hand 1603*a* while the input angle of elevation based on the movement of the hand 1603*a* above (e.g., greater than) the first set of angles 1609*a* in the three-dimensional environment 1600. Alternatively, in some embodiments, as mentioned above, the computer system 101 detects the selection of the hardware element 1604 by the hand 1603*b* in FIG. 16F while the input angle of elevation (e.g., measured between the input elevation vector 1617 and the horizon plane 1611) is above (e.g., greater than) the first set of angles 1609*a* in the three-dimensional environment 1600. Accordingly, in some embodiments, as indicated in the side view 1640, the second position of the first content item 1620 is associated with a display angle of elevation that is above (e.g., greater than) the first set of angles 1609*a* in the three-dimensional environment 1600 (e.g., because the display angle of elevation corresponds to the input angle of elevation above the second set of angles 1609*b*). In some embodiments, as shown in FIG. 16H, while the first content item 1620 is docked at the second position in the virtual environment 1610, the first content item 1620 is tilted/angled in the virtual environment 1610. For example, as shown in the side view 1640 in FIG. 16H, the computer system 101 rotates the first content item 1620 such that a front-facing surface of the first content item 1620 faces toward the viewpoint of the user 1602 in the three-dimensional environment 1600 relative to the viewpoint of the user 1602. Additionally, as shown in FIG. 16H, while the first content item 1620 is displayed/docked at the second position in the virtual environment 1610, the computer system 101 forgoes displaying the virtual light spill effect 1622 described previously above. Additional details regarding tilting and/or rotating the first content item 1620 to face toward the viewpoint of the user 1602 are provided with reference to method 1700.

In some embodiments, as shown in FIG. 16H, when the first content item 1620 is displayed at the second position in the virtual environment 1610, the computer system 101 completes and/or reverses the application and/or display of the second animation discussed above of docking the first content item 1620 at the second position in the virtual environment 1610. For example, in FIG. 16H, after changing the display angle of elevation of the first content item 1620 in the virtual environment 1610 within the three-dimensional environment 1600, the computer system 101 increases the visual prominence of the first content item 1620. In some embodiments, increasing the visual prominence of the first content item 1620 includes fading in the first content item 1620, increasing the brightness of the first content item 1620, decreasing the transparency of the first content item 1620, and/or increasing the coloration of the first content item 1620 in the three-dimensional environment 1600. In some embodiments, increasing the visual prominence of the first content item 1620 includes redisplaying the first content item 1620 (e.g., at the second position in the virtual environment 1610) in the three-dimensional environment 1600.

In FIG. 16H, while the first content item 1620 is docked at the second position in the virtual environment 1610, the computer system 101 detects an input corresponding to a request to change the position at which the first content item 1620 is docked in the virtual environment 1610. For example, as similarly discussed above, the computer system 101 detects a request to change the display angle of elevation (e.g., measured between the vector 1613 and the horizon plane 1611) of the first content item 1620 in the three-dimensional environment 1600. In some embodiments, as shown in FIG. 16H, the input includes a selection of the hardware element 1604 provided by the hand 1603, as similarly discussed above. In some embodiments, as shown in the side view 1640 in FIG. 16H, the input provided by the hand 1603 is detected while the input angle of elevation (e.g., measured between the input elevation vector 1617 and the horizon plane 1611) is within the second set of angles of elevation 1609*b* in the three-dimensional environment 1600. For example, the computer system 101 detects the selection of the hardware element 1604 provided by the hand 1603 while the input angle of elevation is different from the display angle of elevation of the first content item 1620 at the second position in the virtual environment 1610.

Figure 16I:
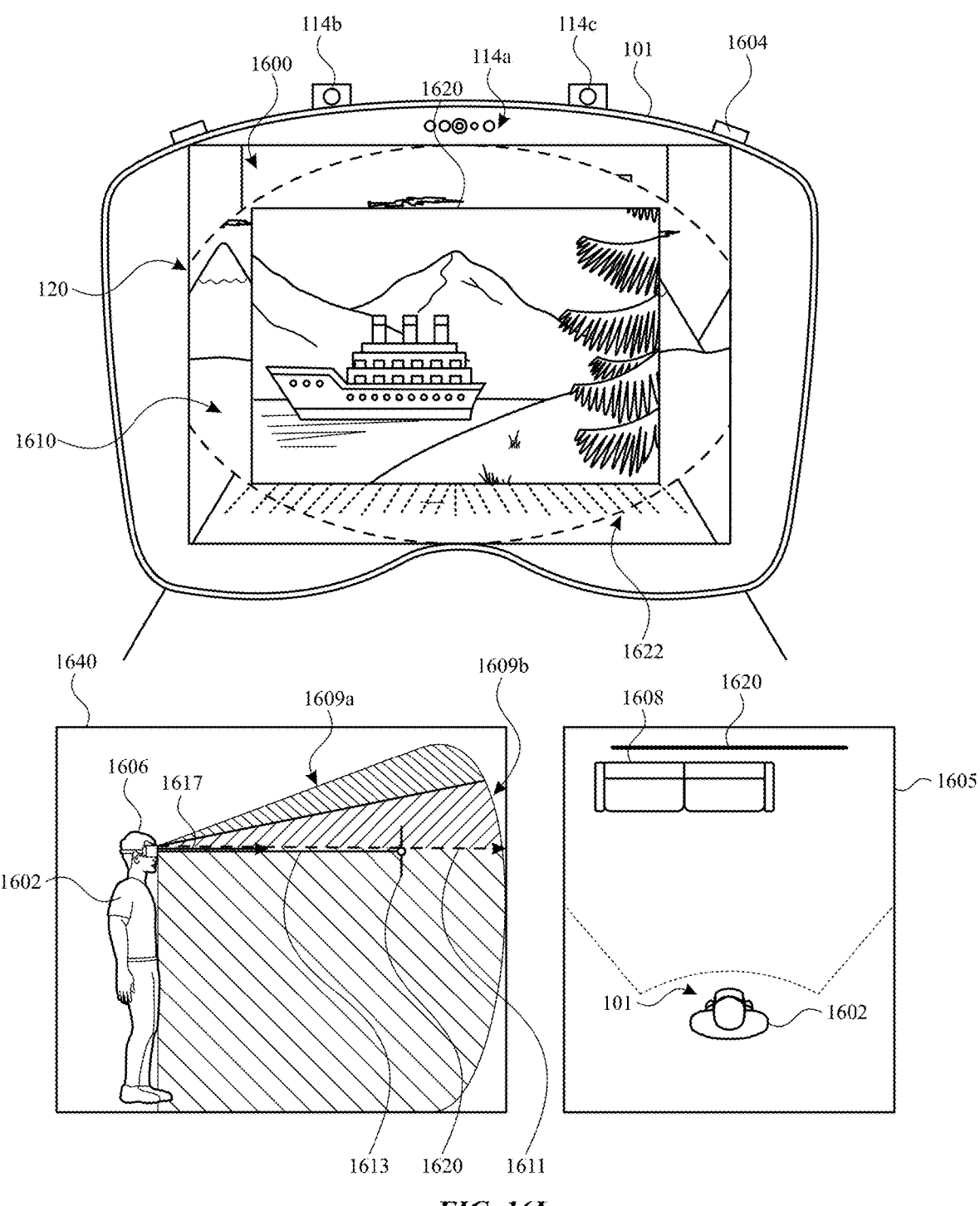

In some embodiments, as shown in FIG. 16I, in response to detecting the selection of the hardware element 1604, the computer system 101 redocks the first content item 1620 at the first position in the virtual environment 1610. For example, because the input angle of elevation associated with the input provided by the hand 1603 is within the second set of angles 1609*b* in the side view 1640 in FIG. 16H when the input is detected, the computer system 101 redocks the computer system 101 at the first position that is based on the input angle of elevation. Accordingly, in some embodiments, the computer system 101 docks the first content item 1620 at the first position in the virtual environment 1610 as shown in FIG. 16I for input angles of elevation that are within the second set of angles of elevation 1609*b* indicated in the side view 1640. In some embodiments, as shown in the side view 1640 in FIG. 16I, the first position in the virtual environment 1610 has a display angle of elevation (e.g., measured between the vector 1613 and the horizon plane 1611) that is equal to and/or parallel to the input angle of elevation, as similarly discussed above. Additionally, as similarly discussed above, when the first content item 1620 is redocked at the first position in the virtual environment 1610, the computer system 101 redisplays the virtual light spill effect 1622 that is associated with the first content item 1620.

Figure 16J:
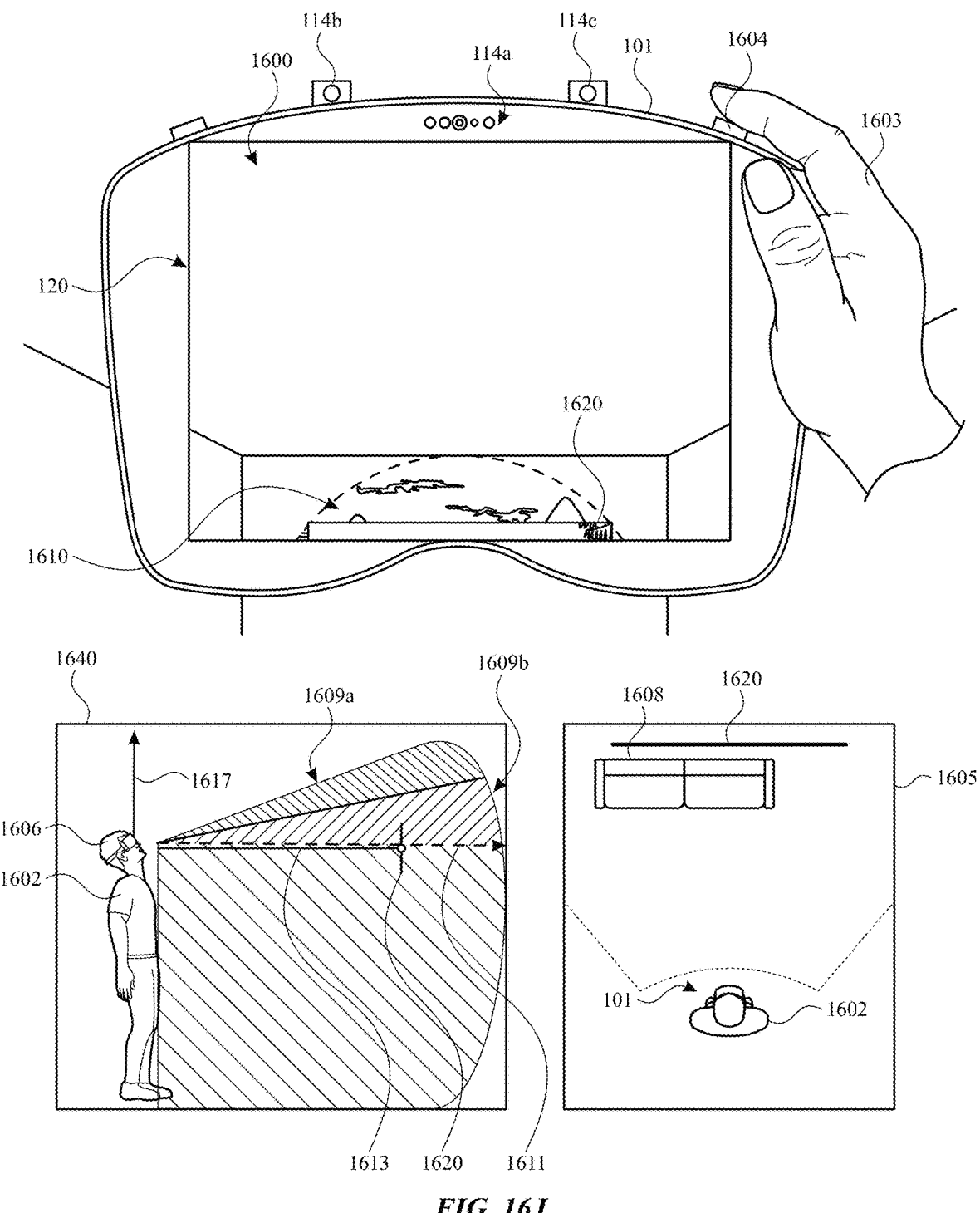

From FIG. 16I to FIG. 16J, the computer system 101 detects movement of the viewpoint of the user 1602 relative to the three-dimensional environment 1600. For example, the computer system 101 detects movement of the head 1606 of the user 1602, such as an upward tilt or rotation of the head 1606 up toward a ceiling of the physical environment, as indicated by input elevation vector 1617 in the side view 1640 in FIG. 16J, which causes the computer system 101 (e.g., which is worn on the head 1606 of the user 1602) to also move tilt upward in the physical environment toward the ceiling, thereby changing the viewpoint of the user 1602.

In some embodiments, as shown in FIG. 16J, when the viewpoint of the user 1602 changes, the view of the three-dimensional environment 1600 is updated based on the updated viewpoint of the user 1602. For example, as shown in FIG. 16J, because the viewpoint of the user 1602 is directed upward toward the ceiling of the physical environment, the virtual environment 1610 and the first content item 1620 are shifted downward in the field of view of the user 1602 from the updated viewpoint of the user 1602 in the three-dimensional environment 1600 (e.g., without the locations of the virtual environment 1610 and/or the first content item 1620 actually changing in the three-dimensional environment 1600, as indicated in the side view 1640 from FIG. 16I to FIG. 16J).

In FIG. 16J, after detecting the movement of the viewpoint of the user 1602, the computer system 101 detects a selection of the hardware element 1604 provided by the hand 1603. In some embodiments, as similarly discussed above, the selection of the hardware element 1604 corresponds to a request to change the position at which the first content item 1620 is docked in the virtual environment 1610. For example, as similarly discussed above, the computer system 101 detects a request to change the display angle of elevation (e.g., measured between the vector 1613 and the horizon plane 1611) of the first content item 1620 in the three-dimensional environment 1600. In some embodiments, as shown in the side view 1640 in FIG. 16K, the input provided by the hand 1603 is detected while the input angle of elevation (e.g., measured between the input elevation vector 1617 and the horizon plane 1611) is above (e.g., greater than) the first set of angles of elevation 1609a in the three-dimensional environment 1600. For example, the computer system 101 detects the selection of the hardware element 1604 provided by the hand 1603 while the input angle of elevation is different from the display angle of elevation of the first content item 1620 at the first position in the virtual environment 1610. In some embodiments, the input angle of elevation is at or above a maximum input angle of elevation (e.g., 90 degrees) at which content is able to be docked in the three-dimensional environment 1600.

Figure 16K:
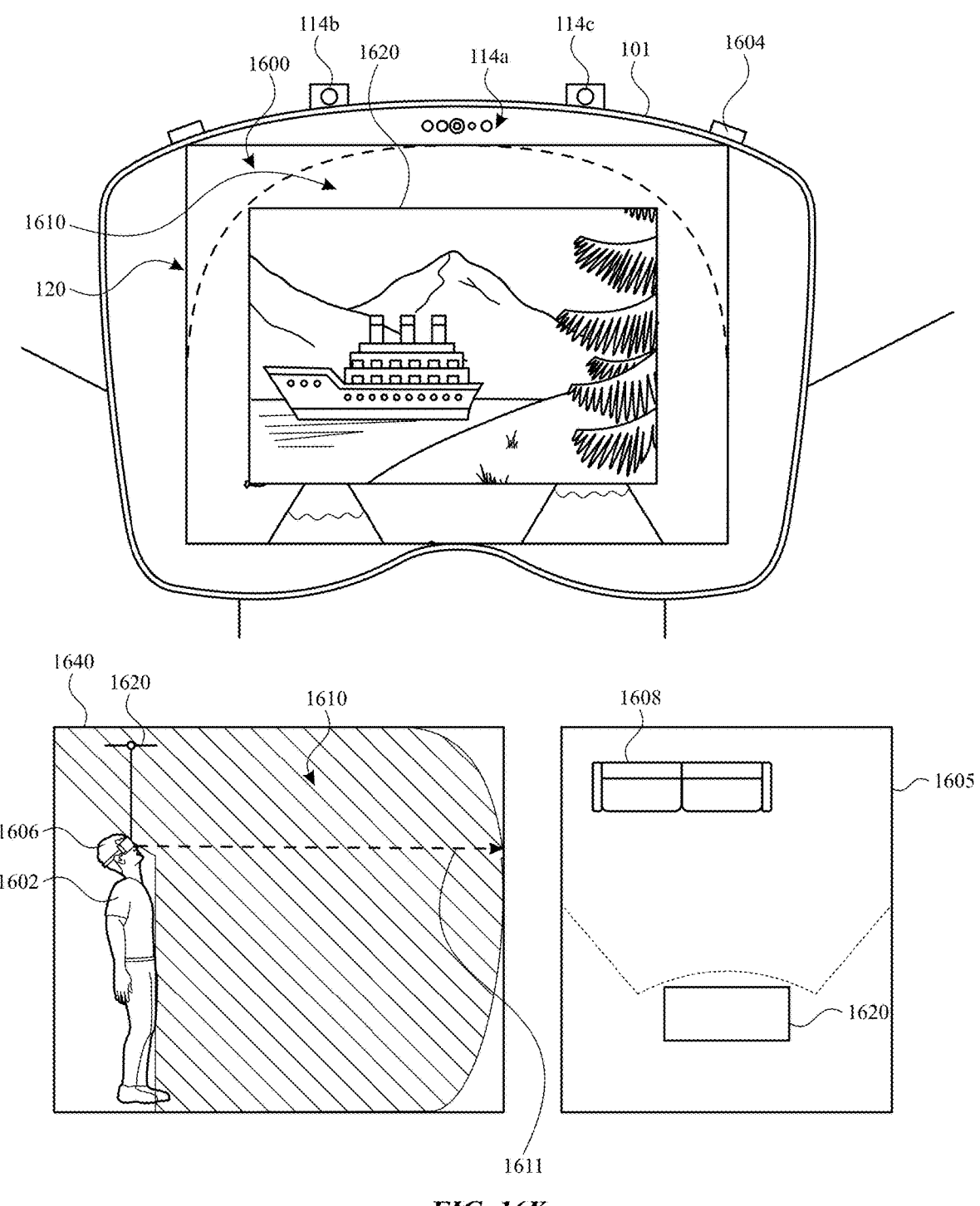

In some embodiments, as shown in FIG. 16K, in response to detecting the selection of the hardware element 1604, the computer system 101 docks and/or displays the first content item 1620 at a third position (e.g., different from the first position and the second position above) in the virtual environment 1610. For example, because the input angle of elevation associated with the input provided by the hand 1603 is above the first set of angles 1609a in the side view 1640 in FIG. 16J when the input is detected, the computer system 101 redocks the computer system 101 at the third position that corresponds to and/or is otherwise based on the input angle of elevation. Accordingly, in some embodiments, the computer system 101 docks the first content item

1620 at the third position in the virtual environment 1610 as shown in FIG. 16K, where the third position is associated with a display angle of elevation that is equal to or is similar to the input angle of elevation above (e.g., the maximum input angle of elevation) indicated in the side view 1640. For example, as illustrated in the top-down view 1605 in FIG. 16K, the first content item 1620 is positioned directly above the viewpoint of the user 1602 in the three-dimensional environment 1600 when the first content item 1620 is docked at the third position in the virtual environment 1610. In some embodiments, as shown in the side view 1640 in FIG. 16K, when the first content item 1620 is docked at the third position in the virtual environment 1610, the computer system 101 increases the level of immersion of the virtual environment 1610 in the three-dimensional environment 1600 (e.g., to a third level of immersion, greater than the second level of immersion and the first level of immersion above). In some embodiments, the third level of immersion of the virtual environment 1610 corresponds to a minimum level of immersion (e.g., 80% immersion or another value of immersion, such as the values discussed in method 1700) for docking the first content item 1620 at the display angle of elevation indicated in the side view 1640 (e.g., 90 degrees). Additionally, in some embodiments, as shown in FIG. 16K, when the first content item 1620 is docked at the third position in the virtual environment 1610, the computer system 101 forgoes displaying the virtual light spill effect 1622 that is associated with the first content item 1620.

FIGS. 16L-16P illustrate examples of the computer system 101 facilitating docking of the first content item 1620 in a second virtual environment, different from the virtual environment 1610 discussed above, based on an input angle of elevation.

Figure 16L:
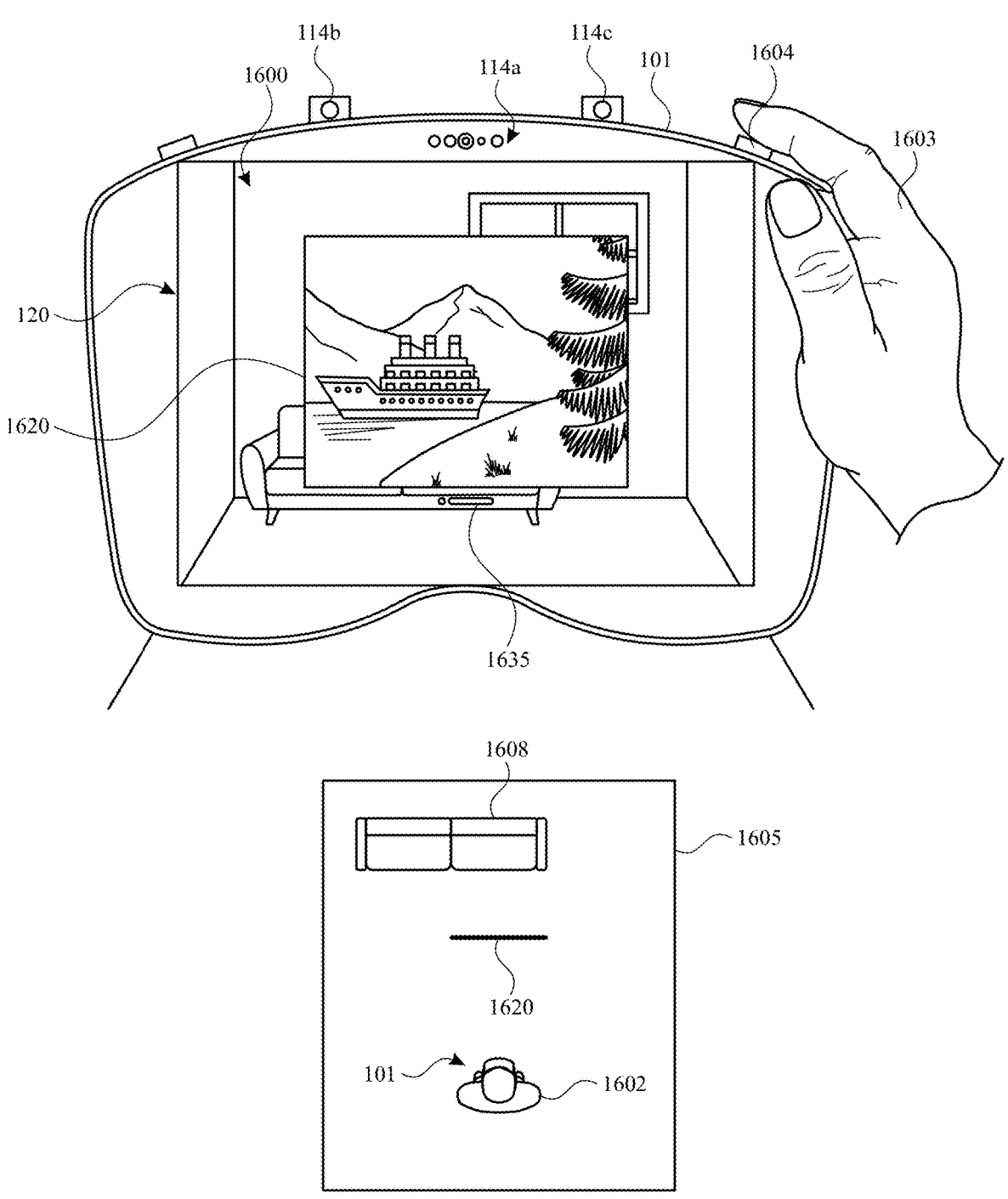

FIG. 16L illustrates the computer system 101 displaying, via the display generation component (e.g., display generation component 120 of FIGS. 1 and 3), the three-dimensional environment 1600 that includes the first content item 1620 discussed previously above. In some embodiments, as shown in FIG. 16L, the first content item 1620 is displayed in the three-dimensional environment 1600 as an undocked content item. For example, in FIG. 16L, the three-dimensional environment 1600 does not include a virtual environment in which the first content item 1620 is displayed. Additionally, in some embodiments, as shown in FIG. 16L, the first content item 1620 is displayed with (e.g., is associated with) the movement element 1635 that is selectable to initiate movement of the first content item 1620 in the three-dimensional environment 1600 relative to the viewpoint of the user 1602.

In FIG. 16L, while displaying the first content item 1620 in the three-dimensional environment 1600, the computer system 101 detects an input corresponding to a request to display a virtual environments selection user interface in the three-dimensional environment 1600. For example, as shown in FIG. 16L, the computer system 101 detects a selection of the hardware element 1604 provided by the hand 1603 of the user 1602.

Figure 16M:
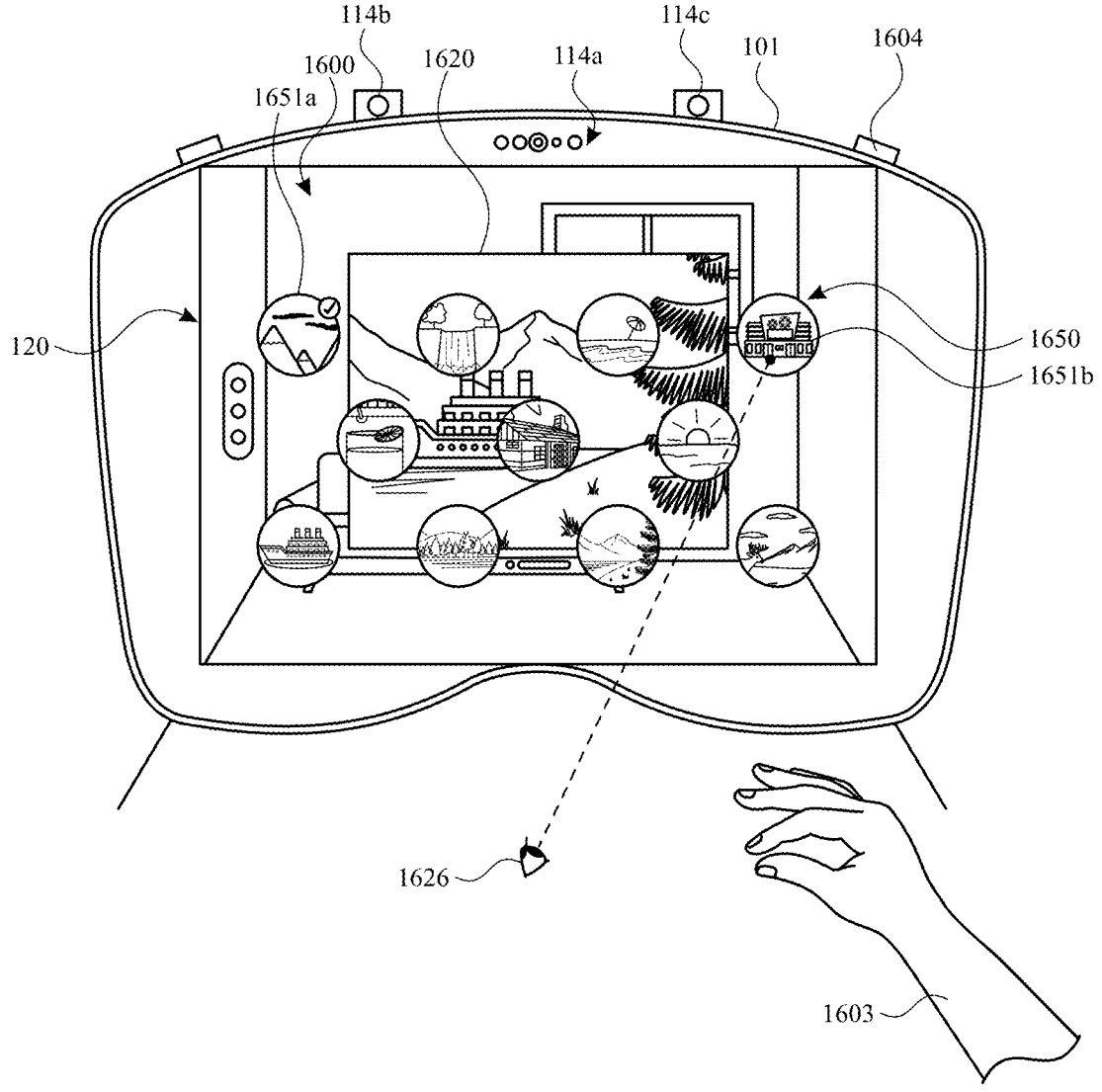

In some embodiments, as shown in FIG. 16M, in response to detecting the selection of the hardware element 1604, the computer system 101 displays virtual environments selection user interface 1650 in the three-dimensional environment 1600. In some embodiments, the virtual environments selection user interface 1650 corresponds to a sub-user interface of the home user interface of the computer system 101 discussed above (e.g., the home user interface 1630 in FIG. 16C). As shown in FIG. 16M, the virtual environments selection user interface 1650 optionally includes a plurality of selectable icons associated with respective virtual environments configured to be displayed in the three-dimensional environment 1600 by the computer system 101 (e.g., such as via a rotation of the hardware element 1604 as discussed previously above with reference to FIG. 16A). In some embodiments, as shown in FIG. 16M, a first icon 1651*a* of the plurality of icons in the virtual environments selection user interface 1650 is currently selected for display in the three-dimensional environment 1600 (e.g., as indicated by the checkmark overlaid on the first icon 1651*a*). In some embodiments, the first icon 1651*a* is associated with the virtual environment 1610 discussed above with reference to FIGS. 16B-16K.

In FIG. 16M, the computer system 101 detects an input provided by hand 1603 corresponding to a selection of a second icon 1651*b* of the plurality of icons of the virtual environments selection user interface 1650 in the three-dimensional environment 1600. For example, as shown in FIG. 16M, the computer system 101 detects an air pinch gesture performed by the hand 1603, optionally while attention (e.g., including the gaze 1626) is directed to the second icon 1651*b* in the three-dimensional environment 1600. In some embodiments, the second icon 1651*b* is associated with a second virtual environment that is different from the virtual environment 1610 discussed above (e.g., the virtual environment associated with the first icon 1651*a*).

Figure 16N:
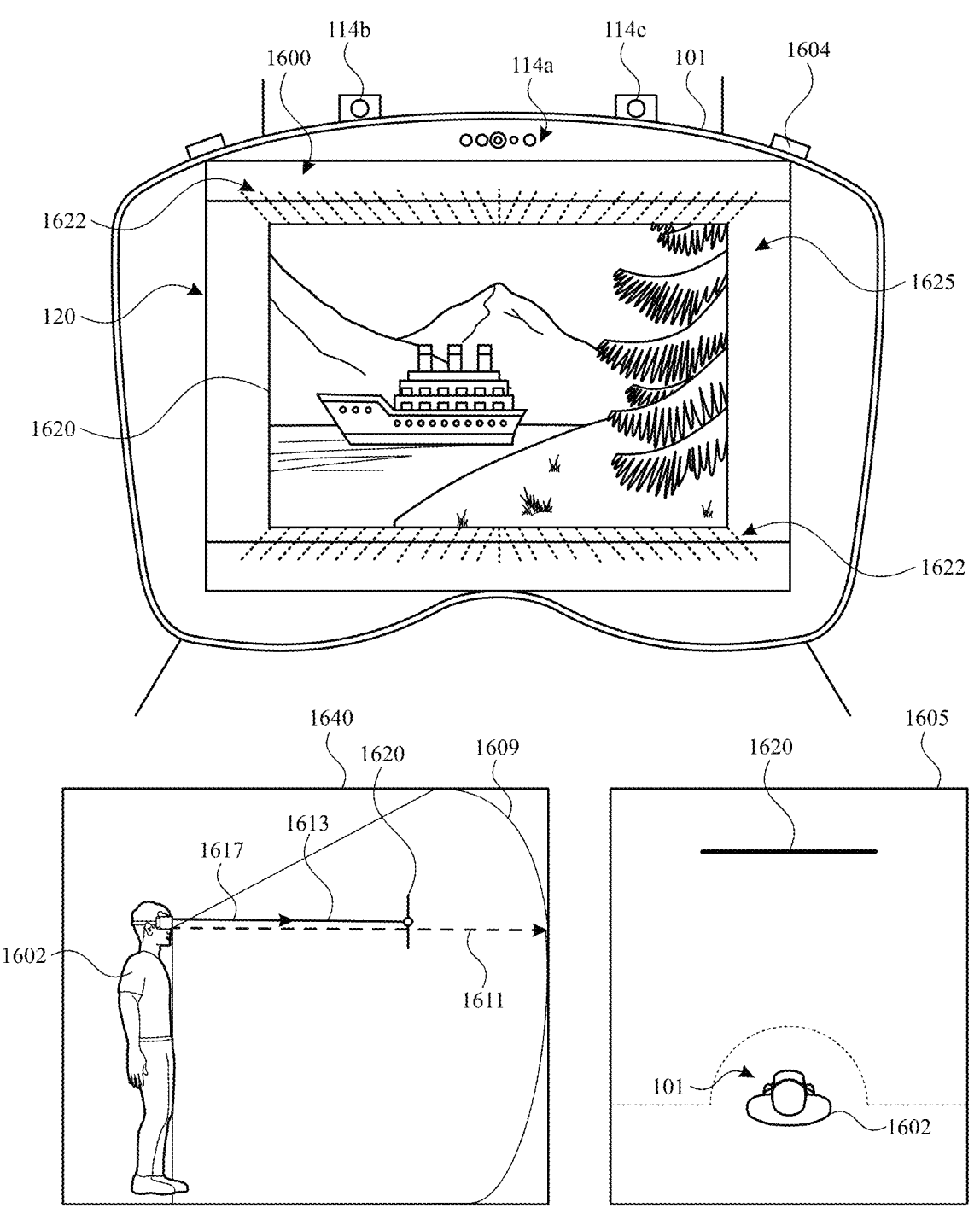

In some embodiments, as shown in FIG. 16N, in response to detecting the selection of the second icon 1651*b*, the computer system 101 displays virtual environment 1625 in the three-dimensional environment 1600. In some embodiments, as shown in FIG. 16N, the virtual environment 1625 corresponds to a theater environment (e.g., modeled after a movie theater or screening room) designated for the viewing of content, such as the first content item 1620. In some embodiments, as shown in FIG. 16N, the virtual environment 1625 is displayed at full (e.g., maximum or 100%) immersion in the three-dimensional environment 1600. Additionally, as shown in FIG. 16N, when the virtual environment 1625 is displayed in the three-dimensional environment 1600, the first content item 1620 is (e.g., automatically) docked within the virtual environment 1625 from the viewpoint of the user 1602. For example, the computer system 101 docks the first content item 1620 at a first position within the virtual environment 1625 when the virtual environment 1625 is displayed in the three-dimensional environment 1600 because the virtual environment 1625 is specifically designed for the viewing of docked content. Alternatively, in some embodiments, in FIG. 16N, the computer system 101 docks the first content item 1620 at the first position within the virtual environment 1625 in response to detecting a docking input, such as a selection of docking option 1616 as previously discussed above with reference to FIG. 16D. Additionally, in some embodiments, as shown in FIG. 16N, when the first content item 1620 is docked at the first position within the virtual environment 1625, the computer system 101 displays virtual light spill effect 1622 associated with the first content item 1620. For example, as similarly discussed above, the computer system 101 displays virtual light and/or shadow cast from the images of the first content item 1620 onto the ceiling and floor of the theater environment of the virtual environment 1625.

In some embodiments, when the first content item 1620 is docked at the first position within the virtual environment 1625, the first content item 1620 is displayed at a distance from the viewpoint of the user 1602 that is different from the first position at which the first content item 1620 is docked in the virtual environment 1610 discussed above. For example, in the top-down view 1605 in FIG. 16N, the first content item 1620 is located closer to the viewpoint of the user 1602 when docked in the virtual environment 1625 than when the first content item 1620 is docked in the virtual environment 1610, as indicated in the top-down view 1605 in FIG. 16E.

In some embodiments, a respective virtual environment is associated with a horizon according to which the virtual content of the respective virtual environment (e.g., such as the virtual ceiling and floor of the virtual environment 1625 or the virtual mountains of the virtual environment 1610) are positioned in the three-dimensional environment 1600 relative to the viewpoint of the user 1602. In some embodiments, the horizon of the virtual environment 1625 is different from the horizon of the virtual environment 1610. In some embodiments, as shown in FIG. 16N, the horizon of the virtual environment 1625 is aligned to the horizon of the physical environment of the computer system 101, optionally represented by horizon plane 1611 in the side view 1640. In some embodiments, as discussed below, the horizon of the virtual environment 1625 is optionally alternatively configured to be aligned to the display angle of elevation of the first content item 1620 in the three-dimensional environment 1600 (e.g., in accordance with a determination that the display angle of elevation is not aligned to the horizon of the physical environment, such as the horizon plane 1611).

Figure 16O:
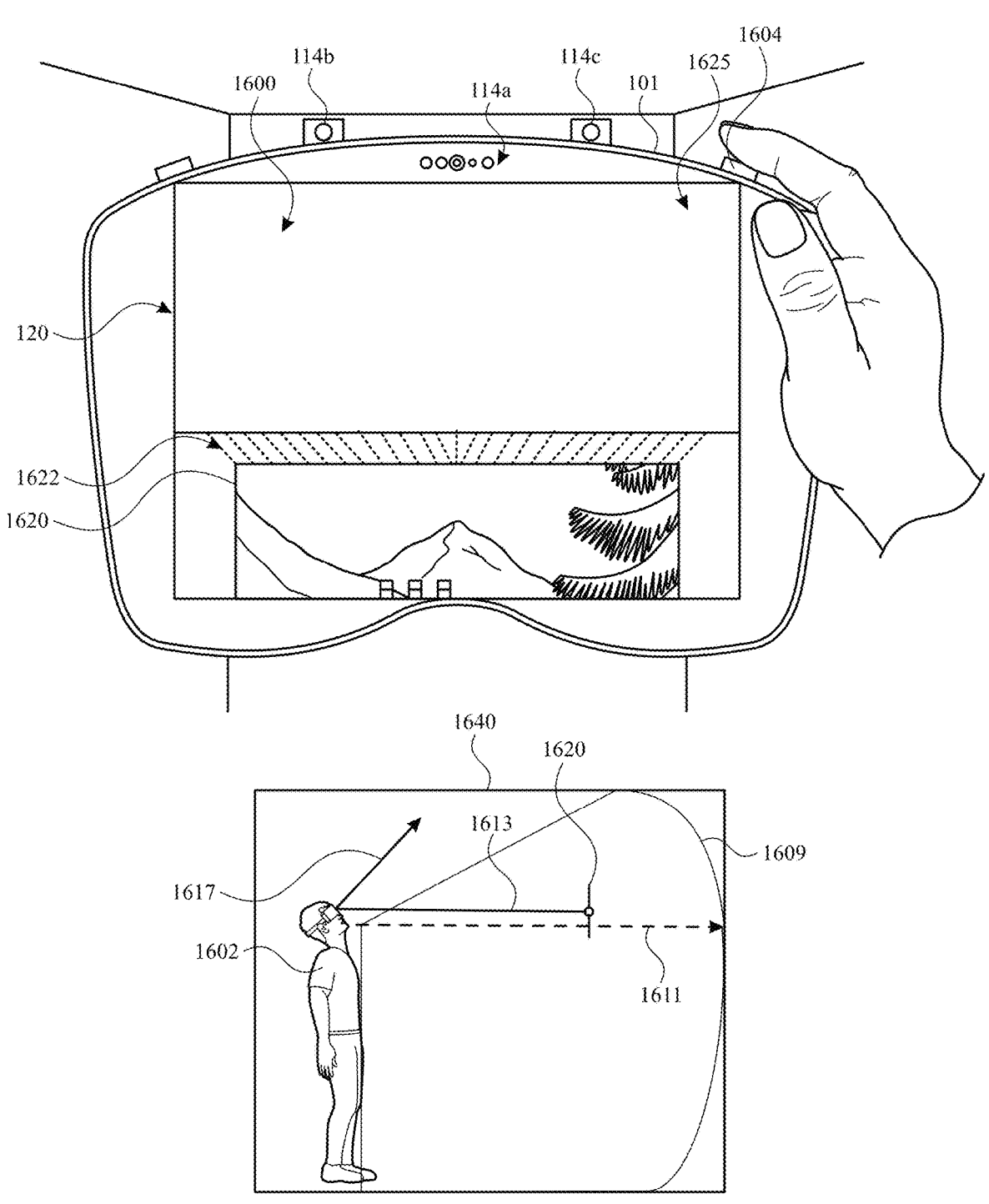
Figure 16P:
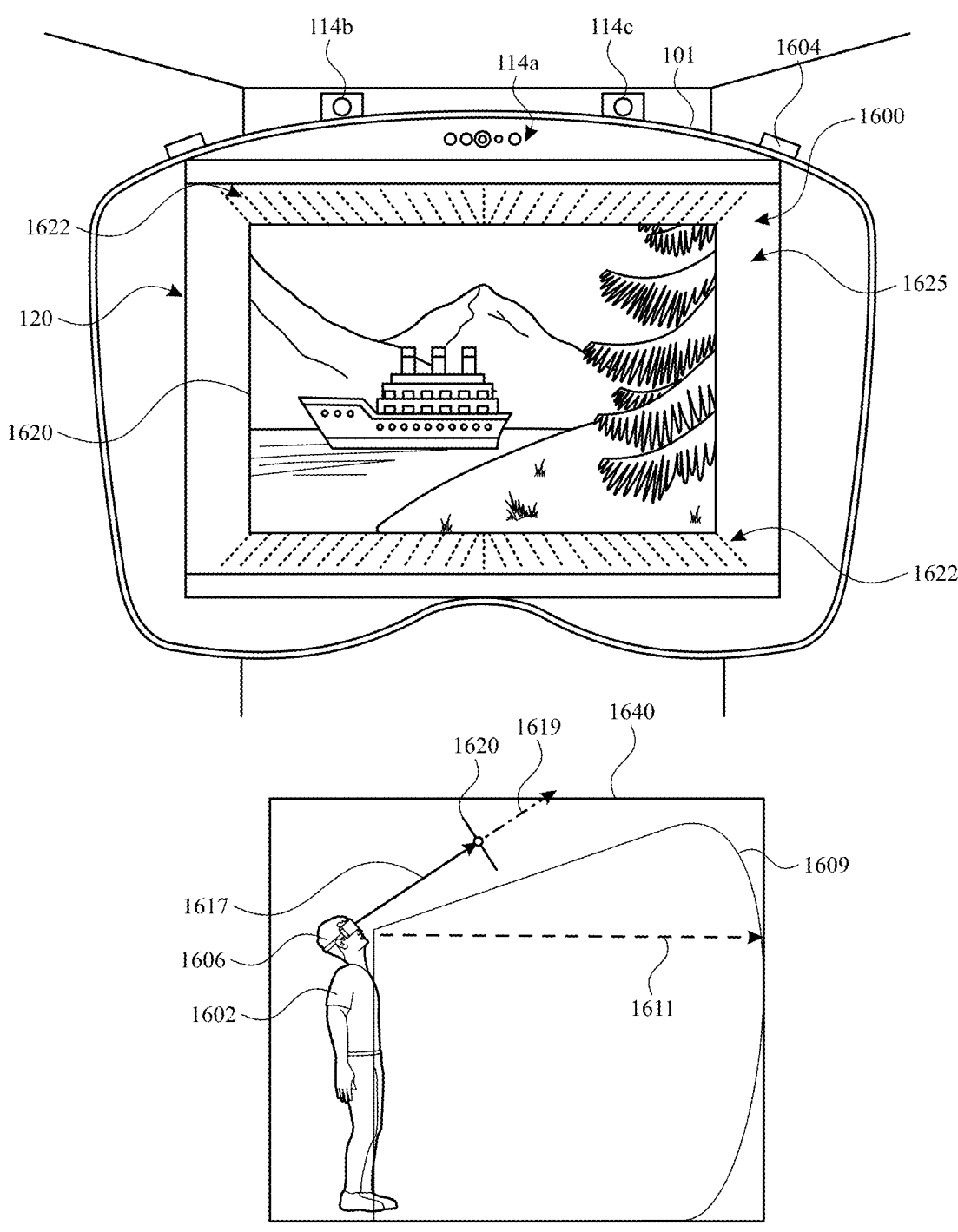

From FIG. 16N to FIG. 16O, the computer system 101 detects movement of the viewpoint of the user 1602 relative to the three-dimensional environment 1600. For example, the computer system 101 detects movement of the head 1606 of the user 1602, such as an upward tilt or rotation of the head 1606 up toward a ceiling of the virtual environment 1625, as indicated by input elevation vector 1617 in the side view 1640 in FIG. 16O, which causes the computer system 101 (e.g., which is worn on the head 1606 of the user 1602) to also tilt upward in the physical environment toward the ceiling, thereby changing the viewpoint of the user 1602.

In some embodiments, as shown in FIG. 16O, when the viewpoint of the user 1602 changes, the view of the three-dimensional environment 1600 is updated based on the updated viewpoint of the user 1602. For example, as shown in FIG. 16O, because the viewpoint of the user 1602 is directed upward toward the ceiling of the virtual environment 1625, the top edge meeting the ceiling in the virtual environment 1625 and the first content item 1620 are shifted downward in the field of view of the user 1602 from the updated viewpoint of the user 1602 in the three-dimensional environment 1600 (e.g., without the locations of the virtual environment 1625 and/or the first content item 1620 actually changing in the three-dimensional environment 1600, as indicated in the side view 1640 from FIG. 16N to FIG. 16O).

In FIG. 16O, after detecting the movement of the viewpoint of the user 1602, the computer system 101 detects a selection of the hardware element 1604 provided by the hand 1603. In some embodiments, as similarly discussed above, the selection of the hardware element 1604 corresponds to a request to change the position at which the first content item 1620 is docked in the virtual environment 1625. For example, as similarly discussed above, the computer system 101 detects a request to change the display angle of elevation (e.g., measured between the vector 1613 and the horizon plane 1611) of the first content item 1620 in the three-dimensional environment 1600. In some embodiments, as shown in the side view 1640 in FIG. 16O, the input provided by the hand 1603 is detected while the input angle of elevation (e.g., measured between the input elevation vector 1617 and the horizon plane 1611) is above (e.g., greater than) the set of angles of elevation 1609 (e.g., having one or more characteristics of the first set of angles 1609*a* or the second set of angles 1609*b* discussed above) in the three-dimensional environment 1600. For example, the computer system 101 detects the selection of the hardware element 1604 provided by the hand 1603 while the input angle of elevation is different from the display angle of elevation of the first content item 1620 at the first position in the virtual environment 1625.

In some embodiments, as shown in FIG. 16P, in response to detecting the selection of the hardware element 1604, the computer system 101 aligns the horizon of the virtual environment 1625, indicated by horizon vector 1619 in the side view 1640, to an updated display angle of elevation of the first content item 1620, as indicated in the side view 1640. Accordingly, in some embodiments, as shown in FIG. 16P, in response to detecting the selection of the hardware element 1604, the computer system 101 docks and/or displays the first content item 1620 at the first position (e.g., the same position above) in the virtual environment 1625. For example, because the input angle of elevation associated with the input provided by the hand 1603 is above the set of angles of elevation 1609 in the side view 1640 in FIG. 16O when the input is detected, the computer system 101 redocks the computer system 101 at the first position that is associated with the updated display angle of elevation (e.g., corresponding to or otherwise based on the input angle of elevation). Accordingly, in FIG. 16P, relative to the updated viewpoint of the user 1602, the first content item 1620 is optionally docked at the same location in the virtual environment 1625 as in FIG. 16N.

Additionally, as illustrated in the side view 1640 in FIG. 16P, when the horizon of the virtual environment 1625 (e.g., represented by the horizon vector 1619) is aligned to the updated display angle of elevation of the first content item 1620 in the virtual environment 1625, the horizon of the virtual environment 1625 is no longer aligned to the horizon of the physical environment, represented via the horizon plane 1611 in the side view 1640. Accordingly, Additional details regarding aligning the horizon of the virtual environment 1625 are provided below with reference to method 1700. Additionally, in some embodiments, as shown in FIG. 16P, when the first content item 1620 is docked at the second position in the virtual environment 1625, the computer system 101 maintains display of the virtual light spill effect 1622 that is associated with the first content item 1620.

FIG. 17 is a flowchart illustrating an exemplary method 1700 of facilitating docking of a content item in a virtual environment based on an input angle of elevation in accordance with some embodiments. In some embodiments, the method 1700 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1700 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1700 are, optionally, combined and/or the order of some operations is, optionally, changed.

In some embodiments, a method 1700 is performed at a first computer system (e.g., computer system 101 in FIG. 16A) in communication with one or more display generation components (e.g., display generation component 120) and one or more input devices (e.g., image sensors 114*a*-114*c*). For example, the computer system is or includes a mobile device (e.g., a tablet, a smartphone, a media player, or a wearable device), or a computer. In some embodiments, the computer system has one or more characteristics of the computer system in methods 800, 1000, 1200, 1300, 1500, 1900, and/or 2100. In some embodiments, the one or more display generation components have one or more characteristics of the display generation component in methods 800, 1000, 1200, 1300, 1500, 1900, and/or 2100. In some embodiments, the one or more input devices have one or more characteristics of the one or more input devices in methods 800, 1000, 1200, 1300, 1500, 1900, and/or 2100.

In some embodiments, while a three-dimensional environment is visible via the one or more display generation components (e.g., three-dimensional environment 1600 in FIG. 16A), the computer system detects (1702), via the one or more input devices, a first input corresponding to a request to display a representation of a first content item docked in the three-dimensional environment (e.g., a virtual environment or a representation of a real (e.g., physical) environment), such as selection of docking option 1616 associated with first content item 1626 provided by hand 1603 in FIG. 16D, wherein the first input includes a respective input elevation relative to a frame of reference (e.g., relative to a horizon line or plane that is perpendicular to gravity and that extends out from a location of a viewpoint of the user), such as input angle of elevation that is based on input angle vector 1617 in side view 1640 in FIG. 16D. For example, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment, etc.). In some embodiments, the environment has one or more characteristics of the environments in methods 800, 1000, 1200, 1300, 1500 and/or 1900. In some embodiments, the first three-dimensional environment has one or more characteristics of the three-dimensional environments and/or virtual environments in methods 800, 1000, 1200, 1300, 1500 and/or 1900. In some embodiments, a virtual environment is displayed within the three-dimensional environment when the first input is detected. In some embodiments, a virtual environment is not displayed within the three-dimensional environment when the first input is detected. For example, the first input includes a selection/designation of a virtual environment with display of the representation of the first content item in the three-dimensional environment, such as an input as similarly described in methods 800, 1000, 1200, 1300, 1500 and/or 1900. In some embodiments, the first content item corresponds to a first movie, a first episode of a television show, a first podcast, a first song, a first music video, a first video, and/or a first image. In some embodiments, the first content item is associated with an application running on the computer system, such as a media or content player application, music player application, podcast application, web browsing application, and/or photos application. In some embodiments, the representation of the first content item is displayed in the three-dimensional environment (e.g., but is not displayed in a virtual environment) when the first input is detected. For example, when the computer system detects the first input, the representation of the first content item is displayed within a user interface (e.g., a virtual user interface) in the three-dimensional environment, such as within a content player user interface or a media player user interface. In some embodiments, the representation of the first content item is not displayed in the three-dimensional environment when the first input is detected. For example, the first input includes a selection/ designation of the first content item for display in the three-dimensional environment, such as a selection (e.g., via an air pinch gesture) of an icon associated with an application via which to playback the first content item.

In some embodiments, as discussed in more detail below, the request to display the representation of the first content item docked in the three-dimensional environment corresponds to a request to display the representation of the first content item at a fixed/predetermined location in the three-dimensional environment, such as the location of the first content item 1620 in top-down view 1605 in FIG. 16E, wherein the fixed location is a respective (e.g., fixed) distance from the viewpoint of the user and/or has a respective (e.g., fixed) orientation relative to the viewpoint of the user, such as described in more detail with reference to methods 800 and/or 1000. In some embodiments, detecting the first input includes detecting interaction with a hardware button (e.g., physical control or dial) of the computer system for requesting the display of the representation of the first content item docked in the three-dimensional environment, such as a press, click, and/or rotation of the hardware button. In some embodiments, the first input corresponding to the request to display the representation of the first content item docked in the three-dimensional environment includes inter-action with a virtual button displayed in the three-dimensional environment for requesting the display of the representation of the first content item docked in the three-dimensional environment. In some embodiments, detecting the first input includes detecting a movement input directed to the representation of the first content item in the three-dimensional environment. For example, as mentioned above, the first content item is displayed within a user interface (e.g., as a virtual object) in the first three-dimensional environment. In some embodiments, the computer system detects an air pinch and drag gesture directed to the representation of the first content item, such as an air pinch gesture provided by a hand of the user, optionally while attention (e.g., including gaze) of the user is directed to the representation of the first content item, followed by move-ment of the hand in a respective direction and/or with a respective magnitude (e.g., of speed and/or distance) relative to the viewpoint of the user. In some embodiments, the first input has one or more characteristics of the input(s) in methods 800, 1000, 1200, 1300, 1500 and/or 1900.

In some embodiments, as mentioned above, an input elevation associated with the first input is a first angle of elevation relative to the three-dimensional environment when the first input is detected, such as the angle of elevation defined between the input angle vector 1617 and horizon plane 1611 in the side view 1640 in FIG. 16D. In some embodiments, the input elevation relative to the three-dimensional environment corresponds to an angle of eleva-tion relative to a horizon of the physical space of the user (e.g., independent of the viewport of the user). For example, the input elevation relative to the three-dimensional envi-ronment is measured relative to a first vector or plane (e.g., parallel to a ground/surface on which the user is positioned) extending (e.g., forward) from the user's head that is normal (e.g., or within 1, 2, 3, 4, 5, 8, or 10 degrees of being normal) to a horizontal axis across and/or parallel to a plane of the horizon of the physical space of the user (e.g., independent of the viewport of the user). In some embodiments, the first vector is parallel to a floor of the physical environment surrounding the user (e.g., the first vector extends laterally (horizontally) relative to the viewpoint/head of the user and is independent of a vertical and/or lateral orientation of the viewpoint and/or head of the user). For example, the first vector is determined irrespective of the location and/or direction of the attention (e.g., including gaze) of the user in the environment. In some embodiments, the location corre-sponding to the viewpoint of the user includes a location of the computer system. For example, if the computer system is or includes a head-mounted display as discussed above, the angle of elevation relative to the environment is deter-mined based on an orientation (e.g., vertical orientation) of the computer system when the first input is detected.

In some embodiments, in response to detecting the first input (1704), in accordance with a determination that the respective input elevation is a first angle of elevation within a first range of angles of elevation (e.g., a range from a value that is below 0 degrees and extends to 30 degrees, below 0 degrees and extending to 25 degrees, below 0 degrees and extending to 20 degrees, below 0 degrees and extending to 15 degrees, below 0 degrees and extending to 10 degrees, or below 0 degrees and extending to 5 degrees), such as the angle of elevation defined between the input angle vector 1617 and horizon plane 1611 in the side view 1640 in FIG. 16D, the computer system displays (1706), via the one or more display generation components, the representation of the first content item at a first position (e.g., a docked position) in the three-dimensional environment, such as the position of the first content item 1620 indicated in the top-down view 1605 in FIG. 16E, wherein the first position corresponds to a first placement elevation (e.g., a second angle of elevation), and the first position and the first placement elevation are used for a plurality of different input elevations that are in the first range of angles of elevation (e.g., in accordance with a determination that the respective input elevation is a different angle of elevation that is different from the first angle of elevation but is within the first range of angles of elevation, the computer system displays, via the display generation component, the repre-sentation of the first content item at the first position (e.g., a docked position) in the first three-dimensional environ-ment, wherein the first docked position corresponds to the first placement elevation). In some embodiments, the first placement elevation remains a same value (e.g., of degrees) irrespective of changes in the input angle of elevation while within the first range of angles of elevation when the first input is detected. In some embodiments, a reference point on the representation of the first content item (e.g., a center of the representation of the first content item) is displayed at the first position in the three-dimensional environment, such that a vector extending between the viewpoint of the user and the reference point has the first placement elevation relative to the three-dimensional environment (e.g., relative to the first vector described above). In some embodiments, displaying the representation of the first content item at the first position in the three-dimensional environment has one or more characteristics of displaying representations of content items at docked positions in three-dimensional envi-ronments as described in methods 800, 1000, 1200, 1300, 1500 and/or 1900. In some embodiments, the first placement elevation relative to the three-dimensional environment cor-responds to 0 degrees relative to the horizon of the physical space. For example, while the representation of the first content item is displayed at the first position that corresponds to the first placement elevation relative to the three-dimensional environment, a (e.g., center of the) front-facing surface of the representation of the first content item (e.g., a front-facing surface of the virtual window in which the first content item is being played back) is normal to the horizon vector/plane described above. In some embodiments, the first placement elevation relative to the three-dimensional environment corresponds to a different value (e.g., in degrees) relative to the horizon of the physical space, such as 1, 2, 3, 4, 5, 8, 10, or 15 degrees. In some embodiments, if, when the first input above is detected, the input elevation associated with the first input is a respective angle of elevation that is different from (e.g., greater than or less than) the first angle of elevation, but that is still within the first range of angles of elevation, the first position at which the representation of the first content item is displayed still corresponds to the first placement elevation relative to the three-dimensional environment. Accordingly, in some embodiments, the angle of elevation to which the docked position of the representation of the first content item corresponds is fixed to be the first placement elevation (e.g., the second angle of elevation) if the input angle of elevation when the first input is detected is within the first range of angles of elevation. Additionally, in some embodiments, while the representation of the first content item is displayed at the first position in the three-dimensional environment, if the computer system detects movement of the viewpoint of the user that changes the input elevation (e.g., to an angle of elevation greater than or less than the first angle of elevation) but such that it still remains within the first range of angles of elevation, the representation of the first content item remains displayed at the first position in the three-dimensional environment that corresponds to the first placement elevation relative to the three-dimensional environment in response to detecting further input (e.g., similar to the first input above) provided by the user, as similarly described below.

In some embodiments, in accordance with a determination that the respective input elevation is a second angle of elevation that is outside of the first range of angles of elevation (e.g., greater than 30 degrees, 25 degrees, 20 degrees, 15 degrees, 10 degrees, or 5 degrees), such as the angle of elevation defined between the input angle vector 1617 and horizon plane 1611 in the side view 1640 in FIG. 16J, the computer system displays (1708), via the one or more display generation components, the representation of the first content item at a second position, different from the first position, such as the position of the first content item 1620 indicated in the top-down view 1605 in FIG. 16K, wherein the second position has a corresponding second angle of elevation, different from the first angle of elevation.

In some embodiments, in accordance with a determination that the respective input elevation is a third angle of elevation that is outside of the first range of angles of elevation (e.g., greater than 30 degrees, 25 degrees, 20 degrees, 15 degrees, 10 degrees, or 5 degrees), such as the angle of elevation defined between the input angle vector 1617 and horizon plane 1611 in the side view 1640 in FIG. 16O, the computer system displays (1710), via the one or more display generation components, the representation of the first content item at a third position, different from the first position and different from the second position, such as the position of the first content item 1620 indicated in the side view 1640 in FIG. 16P, wherein the third position has a corresponding third angle of elevation, different from the first angle of elevation and different from the second angle of elevation. In some embodiments, the angle of elevation to which the (optionally docked) position of the representation of the first content item corresponds is varied for respective input angles of elevation that fall outside of the first range of angles of elevation when the first input is detected. For example, if, when the first input above is detected, the input angle of elevation associated with the first input is a respective angle of elevation that is different from (e.g., greater than or less than) the second angle of elevation, but that is still outside of the first range of angles of elevation, the position at which the representation of the first content item is displayed is a third position, different from the second position, that corresponds to the respective angle of elevation relative to the first three-dimensional environment. For example, a reference point on the representation of the first content item (e.g., a center of the representation of the first content item) is displayed at the second position or the third position in the three-dimensional environment, such that a vector extending between the viewpoint of the user and the reference point has the second angle of elevation or the third angle of elevation, respectively, relative to the three-dimensional environment (e.g., and optionally aligns (e.g., is the same as) to the first angle of elevation associated with the first input). In some embodiments, the second angle of elevation and/or the third angle of elevation relative to the three-dimensional environment corresponds to (e.g., is equal to) the input angle of elevation (e.g., the second angle of elevation or the third angle of elevation) associated with the first input. For example, while the representation of the first content item is displayed at the second position or the third position that corresponds to the second angle of elevation or the third angle of elevation relative to the three-dimensional environment, a vector extending from the viewpoint of the user and a (e.g., center of the) front-facing surface of the representation of the first content item (e.g., a front-facing surface of the virtual window in which the first content item is being played back) has the second angle of elevation or the third angle of elevation relative to the three-dimensional environment described above. Additionally, in some embodiments, while the representation of the first content item is displayed at the second position or the third position in the three-dimensional environment, if the computer system detects movement of the viewpoint of the user that changes/updates the input angle of elevation (e.g., to an angle of elevation greater than or less than the second angle of elevation or the third angle of elevation) but such that it still remains outside of the first range of angles of elevation, the representation of the first content item is moved to an updated position (e.g., different from the second position or the third position) in the three-dimensional environment that corresponds to the updated input angle of elevation relative to the three-dimensional environment in response to detecting further input (e.g., similar to the first input above) provided by the user, as similarly described below. In some embodiments, the first position, the second position and the third position are a same distance from the viewpoint of the user in the three-dimensional environment. In some embodiments, the first position, the second position and the third position are different distances from the viewpoint of the user in the three-dimensional environment. Varying an angle of elevation at which a content item is docked within a three-dimensional environment in response to detecting an input corresponding to a request to dock the content item within the three-dimensional environment based on an input angle of elevation associated with the input enables the object to automatically remain visibly displayed and/or oriented towards a viewpoint of the user in the user's viewport relative to the user's current viewpoint, which negates and/or reduces a number of inputs that would be needed to reorient the object in the user's viewport of the three-dimensional environment, thereby improving user-device interaction.

In some embodiments, the first range of angles of elevation is measured relative to a plane (e.g., horizon plane 1611 in the side view 1640 in FIG. 16D) that is perpendicular to a direction of gravity (e.g., a plane that is parallel to a ground (or other surface) on which a user of the computer system is positioned, as similarly described above). In some embodiments, the computer system detects the ground (or other surface) on which the user is positioned in a physical environment of the display generation component. For example, the ground is detected using one or more cameras or depth sensors of the computer system. In some embodiments, the computer system estimates the ground (or other surface) on which the user is positioned. For example, the ground is estimated (e.g., calculated) based on gravity. In some embodiments, the horizon is normal to (e.g., or within a threshold amount, such as 0, 1, 2, 5, 8, 10, or 15 degrees, of being normal to) the force of gravity in the physical environment. In some embodiments, the horizon is a horizon of a virtual environment (e.g., an immersive environment displayed in the three-dimensional environment) or of the physical environment surrounding the display generation component. In some embodiments, the plane parallel to the ground is based on a height of the head of the user relative to the ground in the physical environment. For example, if the head of the user is a first height (e.g., a first vertical distance) from the ground in the physical environment, the plane parallel to the ground is at a second height from the ground. In some embodiments, if the head of the user is a third height, different from the first height, from the ground in the physical environment, the plane parallel to the ground is at a fourth height, different from the second height, from the ground. Accordingly, in some embodiments, the representation of the first content item is displayed at the first position and with the first placement elevation in the three-dimensional environment when the respective input elevation is a first angle of elevation relative to the first range of angles of elevation (e.g., a range from a value that is below 0 degrees relative to the horizon and extends to 30 degrees, below 0 degrees and extending to 25 degrees, below 0 degrees and extending to 20 degrees, below 0 degrees and extending to 15 degrees, below 0 degrees and extending to 10 degrees, or below 0 degrees and extending to 5 degrees)) relative to the plane, and that is displayed at the second position or the third position in the three-dimensional environment when the respective input elevation is a second angle of elevation or a third angle of elevation outside of the first range of angles of elevation relative to the plane. Varying an angle of elevation at which a content item is docked within a three-dimensional environment in response to detecting an input corresponding to a request to dock the content item within the three-dimensional environment based on an input angle of elevation associated with the input relative to the horizon enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, in accordance with the determination that the respective input elevation is the first angle of elevation (e.g., within the first range of angles of elevation discussed above), the representation of the first content item has a first orientation in the three-dimensional environment (e.g., relative to the frame of reference, such as the horizon line or plane described above), such as the orientation of the first content item 1620 indicated in the side view 1640 in FIG. 16E. For example, a front-facing surface of the representation of the first content item is normal to (e.g., or within a threshold amount, such as 0, 1, 2, 5, 8, 10, or 15 degrees, of being normal to) a vector or plane extending from a location of the head of the user in the three-dimensional environment to a reference point on the representation of the first content item, such as a center of the representation of the first content item. Accordingly, in some embodiments, the first orientation causes the representation of the first content item to visually appear to be flat/level (e.g., non-tilted or rotated) from the viewpoint of the user in the three-dimensional environment. In some embodiments, the computer system displays the representation of the first content item with the first orientation (e.g., corresponding to a fixed orientation) for a plurality of different input elevations that are in the first range of angles of elevation (e.g., in accordance with a determination that the respective input elevation is a different angle of elevation that is different from the first angle of elevation but is within the first range of angles of elevation).

In some embodiments, in accordance with the determination that the respective input elevation is the second angle of elevation (e.g., outside of the first range of angles of elevation discussed above), the representation of the first content item has a second orientation, different from the first orientation, in the three-dimensional environment (e.g., relative to the frame of reference discussed above), such as the orientation of the first content item 1620 indicated in the side view 1640 in FIG. 16H. For example, the computer system displays the representation of the first content item with an orientation that is based on the placement elevation (e.g., the angle of elevation) of the display position of the representation of the first content item in the three-dimensional environment in accordance with a determination that the respective input elevation is an angle of elevation that is outside of the first range of angles of elevation. In some embodiments, displaying the representation of the first content item with the second orientation includes rotating the representation of the first content item in the three-dimensional environment (e.g., about a horizontal axis through a center of the representation of the first content item), such that a first portion (e.g., the front-facing surface of the representation or a top edge of the representation) is tilted toward a location of the viewpoint of the user based on the second angle of elevation in the three-dimensional environment. Accordingly, in some embodiments, while the representation of the first content item is displayed with the second orientation in the three-dimensional environment, the front-facing surface of the representation of the first content item is tilted downward relative to the viewpoint of the user in the three-dimensional environment. In some embodiments, as discussed in more detail below, an amount (e.g., number of degrees) by which the representation of the first content item is rotated in the three-dimensional environment is based on a difference (e.g., an angular difference) between a vector that extends between the head of the user and the reference point on the representation of the first content item and the frame of reference discussed above (e.g., the horizon plane).

In some embodiments, in accordance with the determination that the respective input elevation is the third angle of elevation (e.g., outside of the first range of angles of elevation discussed above), the representation of the first content item has a third orientation (e.g., relative to the frame of reference discussed above), different from the first orientation and the second orientation, in the three-dimensional environment (e.g., as similarly discussed above with reference to the second orientation but specific to the third orientation), such as the orientation of the first content item 1620 indicated in the side view 1640 in FIG. 16K. Rotating a representation of a content item in a three-dimensional environment when docking the content item in the three-dimensional environment based on an input elevation relative to a frame of reference in the three-dimensional environment enables the representation of the content item to automatically remain visibly displayed and/or oriented towards the viewpoint of the user in the user's field of view after the docking of the content item, which reduces a number of inputs that would be needed to reorient the representation in the user's field of view of the three-dimensional environment, thereby improving user-device interaction.

In some embodiments, the first orientation, the second orientation, and the third orientation cause the representation of the first content item to be displayed at a fixed angle relative to a vector extending between a first portion of a user of the computer system (e.g., a head of the user of the computer system) and a first portion (e.g., a surface of and/or a center of) of the representation of the first content item, such as vector 1613 extending between the head 1606 of the user 1602 and a center of the first content item 1620 in the side view 1640 in FIG. 16E. For example, when the computer system displays the representation of the first content item at the fixed orientation (e.g., the first orientation) for input angles of elevation that are within the first range of angles of elevation (e.g., such as the first angle of elevation) or at a dynamic orientation (e.g., the second orientation or the third orientation) based on angles of elevation that are outside of the first range of angles of elevation, the viewing angle of the representation of the first content item is maintained. Particularly, in some embodiments, at either of the first orientation, the second orientation, or the third orientation, the (e.g., two-dimensional) front-facing surface of the representation of the first content item is normal to the vector extending between the first portion of the user and the first portion of the representation of the first content item. Accordingly, as similarly discussed above, rotating (e.g., tilting) the representation of the first content item optionally causes the front-facing surface of the representation of the first content item to visually appear flat/level from the viewpoint of the user for given values of the input elevation. Rotating a representation of a content item in a three-dimensional environment when docking the content item in the three-dimensional environment based on an input elevation relative to a frame of reference in the three-dimensional environment enables the representation of the content item to automatically remain visibly displayed and/or oriented towards the viewpoint of the user in the user's field of view after the docking of the content item, which reduces a number of inputs that would be needed to reorient the representation in the user's field of view of the three-dimensional environment, thereby improving user-device interaction.

In some embodiments, the first input corresponds to a request to move the representation of the first content item in the three-dimensional environment relative to a viewpoint of a user of the computer system, such as the air pinch and drag gesture provided by the hand 1603a as shown in FIG.

16F. For example, as similarly discussed above, the first input includes an air pinch and drag gesture directed to the representation of the first content item in the three-dimensional environment. In some embodiments, the first input includes an air pinch and drag gesture directed to a movement element (e.g., a grabber bar) displayed with the representation of the first content item. For example, the computer system detects an air pinch gesture provided by a hand of the user, optionally while attention (e.g., based on gaze) of the user is directed toward the movement element, followed by movement of the hand of the user in a respective direction and/or with a respective magnitude (e.g., of speed and/or distance) relative to the viewpoint of the user. In some embodiments, the first input includes interaction with a hardware input device, such as a controller, in communication with the computer system, such as a press and/or movement of a physical toggle, switch, or button of the hardware input device, that corresponds to the request to move the representation of the first content item. Accordingly, in some embodiments, in response to detecting the first input, the computer system moves the representation of the first content item in the three-dimensional environment relative to the viewpoint of the user in a direction and/or with a magnitude (e.g., of speed and/or distance) that is based on and/or corresponds to the respective direction and/or with the respective magnitude, respectively, of the movement of the hand of the user and/or the hardware input device. Varying an angle of elevation at which a content item is docked within a three-dimensional environment in response to detecting an input corresponding to a request to move the content item within the three-dimensional environment based on an input angle of elevation associated with the input enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, the first input corresponds to a request to update a spatial arrangement of one or more virtual objects in the three-dimensional environment relative to a viewpoint of a user of the computer system, such as selection of hardware element 1604 provided by hand 1603b as shown in FIG. 16F. For example, the request to update the spatial arrangement of one or more virtual objects relative to the viewpoint of the user corresponds to a request to update a spatial arrangement of at least the representation of the first content item relative to the viewpoint of the user in the three-dimensional environment, such as a "recentering" input. In some embodiments, the input corresponding to the request to update the spatial arrangement of the one or more virtual objects relative to the viewpoint of the first user includes interaction with a hardware button (e.g., physical control or dial or rotatable input element) of the computer system for requesting the update of the spatial arrangement, such as a press, click, and/or rotation of the hardware button. In some embodiments, the input corresponding to the request to update the spatial arrangement of the one or more virtual objects relative to the viewpoint of the user includes interaction with a virtual button displayed in the three-dimensional environment for requesting the update of the spatial arrangement. In some embodiments, the representation of the first content item is within the field of view of the user when the first input is detected. In some embodiments, the representation of the first content item is outside of the field of view of the user when the first input is detected. In some embodiments, the representation of the first content item is caused to be located outside of the field of view of the user when the first input is detected as a result of prior movement input directed to the representation of the first content item and/or prior movement of the viewpoint of the user. For example, prior to detecting the first input, the computer system detects movement of the computer system relative to the three-dimensional environment, which causes the representation of the first content item to no longer be visible/displayed in the three-dimensional environment from the updated viewpoint of the user. Additionally, in some embodiments, the representation of the first content item has a respective orientation in the three-dimensional environment relative to the viewpoint of the user when the first input is detected. In some embodiments, the first input that corresponds to the request to update the spatial arrangement of the one or more virtual objects does not include and/or does not correspond to an indication of a specific manner of movement by which to move the one or more virtual objects, including the representation of the first content item. Accordingly, in some embodiments, in response to detecting the first input, the computer system concurrently moves and/or rotates the one or more virtual objects, including the representation of the first content item, relative to the viewpoint of the user in the three-dimensional environment. In some embodiments, the request to update the spatial arrangement of the one or more virtual objects in the three-dimensional environment relative to the viewpoint of the user has one or more characteristics of recentering inputs discussed in method 1000. Varying an angle of elevation at which a content item is docked within a three-dimensional environment in response to detecting an input corresponding to a request to update a spatial arrangement of one or more virtual objects within the three-dimensional environment based on an input angle of elevation associated with the input enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, the first input includes interaction with a hardware element (e.g., the hardware element 1604 in FIG. 16F) of the computer system (e.g., as similarly discussed above). For example, the computer system detects a selection of the hardware button (e.g., physical control or dial) of the computer system discussed above for requesting the display of the representation of the first content item docked in the three-dimensional environment, such as a press, click, and/or rotation of the hardware button. In some embodiments, the interaction with the hardware element has one or more characteristics of the interaction(s) with hardware elements in methods 800, 1000, 1200, 1300, 1500 and/or 1900. Varying an angle of elevation at which a content item is docked within a three-dimensional environment in response to detecting interaction with a hardware button of the computer system based on an input angle of elevation associated with the input enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, prior to (and/or when) detecting the first input, a representation of the first content item is displayed at a location in the three-dimensional environment that does not correspond to a virtual environment displayed in the three-dimensional environment, such as the first content item 1620 being displayed at least partially outside of virtual environment 1610 as indicated in the top-down view 1605 in FIG. 16D. For example, when the computer system detects the first input, a representation of the first content item is not displayed within a virtual environment in the three-dimensional environment. In some embodiments, the representation of the first content item corresponds to the representation of the first content item described above that is docked in the three-dimensional environment. In some embodiments, the representation of the first content item corresponds to a different representation than the representation of the first content item that is docked in the three-dimensional environment. For example, prior to detecting the first, the first content item is displayed in a (e.g., smaller) virtual window in the three-dimensional environment. In some embodiments, when the first input is detected, the representation of the first content item is displayed at a location that is outside of the virtual environment from the viewpoint of the user in the three-dimensional environment, such as in front of, adjacent to, above, and/or behind the virtual environment that is displayed in the three-dimensional environment. In some embodiments, when the first input is detected, the three-dimensional environment does not include a virtual environment (e.g., the computer system is not displaying a virtual environment at all). In some embodiments, prior to (and/or when) detecting the first input, the representation of the first content item is displayed in a portion of the three-dimensional environment that corresponds to a portion of the physical environment of the computer system, such as a representation of the physical environment of the computer system.

In some embodiments, the first input corresponds to a request to display of the representation of the first content item at a location corresponding to the virtual environment in the three-dimensional environment, such as the first content item 1620 being displayed within the virtual environment 1610 as indicated in the top-down view 1605 in FIG. 16E. For example, the first input corresponds to a request to display the representation of the first content item within the virtual environment from the viewpoint of the user. In some embodiments, the first input corresponds to and/or includes a request to move the representation of the first content item from outside of the virtual environment to within the virtual environment from the viewpoint of the user. In some embodiments, the first input corresponds to and/or includes a request to display a virtual environment in the three-dimensional environment, which includes and/or causes the display of the representation of the first content item within the virtual environment from the viewpoint of the user in the three-dimensional environment. In some embodiments, the first input includes a designation of a specific virtual environment (e.g., from a plurality of virtual environments) for display in the three-dimensional environment. Alternatively, in some embodiments, the first input does not include a designation of a specific virtual environment for display in the three-dimensional environment (e.g., the virtual environment is a default and/or preselected (e.g., by the user or by the computer system) virtual environment). Varying an angle of elevation at which a content item is docked within a three-dimensional environment in response to detecting an input corresponding to a request to display the content item within a virtual environment in the three-dimensional environment based on an input angle of elevation associated with the input enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, in response to detecting the first input, in accordance with the determination that the respective input elevation is the first angle of elevation, the computer system displays, via the display generation component, a first animated transition of the representation of the first content item (e.g., gradually) moving to the first position in the three-dimensional environment, such as an animated transition of the first content item 1620 being moved from the location in the top-down view 1605 in FIG. 16D to the location of the first content item 1620 in the top-down view 1605 in FIG. 16E. For example, the computer system displays a first animated transition of the representation of the first content item moving from the location that is outside of the virtual environment to a location that is within the virtual environment. In some embodiments, the first animated transition includes displaying the virtual environment in the three-dimensional environment and displaying (e.g., and/or moving) the representation of the first content item within the virtual environment. In some embodiments, the first animated transition of moving the representation of the first content item to the first position in the three-dimensional environment includes moving the representation of the first content item away from the viewpoint of the user (e.g., moving the representation backward in space such that a distance between the representation and the viewpoint of the user is increased). In some embodiments, the first animated transition includes gradually increasing a size of the representation of the first content item in the three-dimensional environment from the viewpoint of the user (e.g., such that the representation of the first content item occupies a greater portion/amount of the field of view of the user in the three-dimensional environment). In some embodiments, the first animated transition does not include changing an orientation of the representation of the first content item based on the input elevation in the three-dimensional environment from the viewpoint of the user. In some embodiments, the computer system displays the first animated transition of the representation of the first content item moving to the first position within the virtual environment for a plurality of different input elevations that are in the first range of angles of elevation (e.g., in accordance with a determination that the respective input elevation is a different angle of elevation that is different from the first angle of elevation but is within the first range of angles of elevation).

In some embodiments, in accordance with the determination that the respective input elevation is the second angle of elevation, the computer system displays a second animated transition, different from the first animated transition, of the representation of the first content item (e.g., gradually) moving to the second position in the three-dimensional environment, such as an animated transition of the first content item 1620 being moved from the location in the top-down view 1605 in FIG. 16F to the location of the first content item 1620 in the top-down view 1605 in FIG. 16H. In some embodiments, the second animated transition is different from the first animated transition in a manner other than the particular position to which the representation of the first content item is moved in the three-dimensional environment (e.g., the movement of the representation of the first content item to the second position). Particularly, the second animated transition optionally includes applying a fade effect to the representation of the first content item, such that the representation is faded out (e.g., the opacity of the representation is reduced) and/or is faded back in (e.g., the opacity of the representation is increased) at the location within the virtual environment (e.g., the second position) from the viewpoint of the user. In some embodiments, fading out the representation of the first content item includes ceasing display of the representation of the first content item at the location in the three-dimensional environment that is outside of the virtual environment. In some embodiments, when the computer system fades the representation of the first content item back in at the second position in the three-dimensional environment (e.g., when the representation is redisplayed at the second position), the size of the representation of the first content item is increased in the three-dimensional environment and/or the distance between the viewpoint of the user and the representation of the first content item is increased in the three-dimensional environment. Additionally, in some embodiments, when the representation of the first content item is faded back in at the second position in the three-dimensional environment, the orientation of the representation of the first content item is changed based on the input elevation in the three-dimensional environment from the viewpoint of the user. For example, as similarly discussed above, the representation of the first content item is tilted such that the front-facing surface of the representation of the first content item faces toward the location of the viewpoint of the user based on the second angle of elevation. In some embodiments, in accordance with the determination that the respective input elevation is the third angle of elevation, the computer system displays a third animated transition, different from the first animated transition and the second animated transition, of the representation of the first content item (e.g., gradually) moving to the third position in the three-dimensional environment (e.g., as similarly discussed above with reference to the second animated transition but specific to the third animated transition). For example, as similarly discussed above, the computer system displays an animation of fading out the representation of the first content item at the location in the three-dimensional environment that is outside of the virtual environment and fading in the representation of the first content item at the third position in the three-dimensional environment, including tilting the front-facing surface of the representation of the first content item toward the location of the viewpoint of the user based on the third angle of elevation. Displaying an animation of docking a content item within a virtual environment in a three-dimensional environment in response to detecting an input corresponding to a request to display the content item within the virtual environment based on an input angle of elevation associated with the input helps promote user comfort by avoiding eye strain and/or discomfort associated with docking the content item within the virtual environment, thereby improving user-device interaction.

In some embodiments, while displaying the representation of the first content item at the first position in the three-dimensional environment in accordance with the determination that the respective input elevation is the first angle of elevation in response to detecting the first input, the computer system detects, via the one or more input devices, a second input corresponding to a request to move the representation of the first content item, such as the input provided by the hand 1603a in FIG. 16F, wherein the second input includes a second respective input elevation relative to the frame of reference, such as based on the input angle vector 1617 in the side view 1640 in FIG. 16F. For example, the computer system detects an air gesture, such as an air pinch and drag gesture, directed to the representation of the first content item in the three-dimensional environment. In some embodiments, as similarly discussed above, the second input includes interaction with a hardware element (e.g., physical button or dial) of the computer system, such as the recentering input described above. In some embodiments, the second input corresponds to a request to change a placement elevation of the representation of the first content item (e.g., the angle of elevation at which the representation of the first content item is displayed) in the three-dimensional environment. For example, the computer system detects movement of the hand of the user (e.g., while in a pinch hand shape) upward or downward in space relative to the viewpoint of the user. In some embodiments, the second respective input elevation is different from the first placement elevation (e.g., is different from first angle of elevation and/or is outside of the first range of angles of elevation discussed above). In some embodiments, the second input has one or more characteristics of the first input discussed above.

In some embodiments, in response to detecting the second input, the computer system reduces a visual prominence of the representation of the first content item (e.g., relative to the three-dimensional environment) at the first position in the three-dimensional environment, such as fading out the first content item 1620 as shown in FIG. 16G. For example, the computer system applies a fading effect to the representation of the first content item during the movement of the representation of the first content item in the three-dimensional environment. In some embodiments, reducing the visual prominence of the representation of the first content item includes increasing a translucency of the representation of the first content item, such that, during the movement of the representation of the first content item, portions of the three-dimensional environment (e.g., including a physical environment of the computer system) are visible through the representation. In some embodiments, reducing the visual prominence of the representation of the first content item includes decreasing a brightness of the representation of the first content item. In some embodiments, reducing the visual prominence of the representation of the first content item includes blurring the representation of the first content item. In some embodiments, reducing the visual prominence of the representation of the first content item includes (e.g., temporarily) ceasing display of the representation of the first content item in the three-dimensional environment. In some embodiments, because the second respective input elevation is different from the first placement elevation, the second input corresponds to a request to move the representation of the computer system vertically in the three-dimensional environment. In some embodiments, after reducing the visual prominence of the representation of the first content item at the first position, the computer system moves and/or redisplays the representation of the first content item at a respective position in the three-dimensional environment. For example, the computer system moves the representation of the first content item away from the first position in the three-dimensional environment toward the respective position and/or redisplays the representation of the first content item at the respective position.

In some embodiments, the computer system increases the visual prominence of the representation of the first content item (e.g., relative to the three-dimensional environment) after conclusion of movement of the representation of the first content item to a respective position (e.g., the second position or the third position discussed previously above) in the three-dimensional environment, such as fading back in the first content item 1620 as shown in FIG. 16H. For example, the computer system restores display of the representation of the first content item in the three-dimensional environment after conclusion of the movement of the representation of the first content item. In some embodiments, the computer system reverses the reduction of the visual prominence of the representation of the first content item in response to detecting termination of the second input. For example, if the second input includes an air gesture, such as an air pinch and drag gesture, provided by a hand of the user, the computer system reverses the application of the visual effect after detecting a release of the air pinch gesture by the hand. In some embodiments, the computer system increases the visual prominence of the representation of the first content item after the representation of the first content item is moved and/or redisplayed in accordance with the second input (e.g., after the movement of the first content item completes in response to the computer system detecting the interaction with the hardware element of the computer system). In some embodiments, increasing the visual prominence of the representation of the first content item includes increasing the opacity of the representation of the first content item. In some embodiments, increasing the visual prominence of the representation of the first content item includes increasing the brightness of the representation of the first content item. In some embodiments, increasing the visual prominence of the representation of the first content item includes unblurring the representation of the first content item. In some embodiments, increasing the visual prominence of the representation of the first content item includes redisplaying the representation of the first content item. In some embodiments, in accordance with a determination that the second respective input elevation is not different from the first placement elevation (e.g., the second respective input elevation is the same as the first angle of elevation and/or is within the first range of angles of elevation), the computer system moves the representation of the first content item away from the first position as discussed above, without changing the visual prominence of the representation of the first content item during the movement of the representation in the three-dimensional environment. For example, the computer system moves the representation laterally in the three-dimensional environment relative to the viewpoint of the user and/or moves the representation vertically within the first range of angles of elevation in accordance with the second input without fading the representation of the first content item during the movement. Fading a content item within a three-dimensional environment during the movement of the content item within the three-dimensional environment in response to detecting an input corresponding to a request to change the angle of elevation at which the content item is displayed in the three-dimensional environment helps promote user comfort by avoiding eye strain and/or discomfort associated with the movement of the content item within the three-dimensional environment, thereby improving user-device interaction.

In some embodiments, the respective input elevation is based on a vector extending between a first portion of a user of the computer system (e.g., a head of the user of the computer system) and a first portion (e.g., a front surface of and/or a center of) of the representation of the first content item when the first input is detected, such as the vector 1613 extending between the head 1606 of the user 1602 and the center of the first content item 1620 as shown in the side view 1640 in FIG. 16D. In some embodiments, as similarly discussed above, the respective input elevation is measured between the vector and the frame of reference (e.g., the horizon plane extending outward from the viewpoint of the user and parallel to the ground of the physical environment of the computer system). For example, if the vector extending between the first portion of the user and the first portion of the representation of the first content item when the first input is detected is a first vector (e.g., having a first height and/or direction relative to the ground of the physical environment), the respective input elevation is a first input elevation. In some embodiments, if the vector extending between the first portion of the user and the first portion of the representation of the first content item when the first input is detected is a second vector (e.g., having a second height and/or direction relative to the ground of the physical environment), different from the first vector, the respective input elevation is a second input elevation, different from the first input elevation. Varying an angle of elevation at which a content item is docked within a three-dimensional environment in response to detecting an input corresponding to a request to dock the content item within the three-dimensional environment based on a vector extending between the head of the user and the content item enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, the respective input elevation is based on a viewing direction associated with a viewpoint of a user of the computer system (e.g., the direction and/or orientation of the viewpoint) when the first input is detected, such as the input angle vector 1617 in the side view 1640 in FIG. 16D that is based on the viewing direction of the user 1602. For example, the respective input elevation corresponds to and/or is based on a viewing direction of the user relative to the viewpoint of the user in the three-dimensional environment. For example, if the viewing direction associated with the viewpoint of the user is a first viewing direction, the respective input elevation is a first input elevation. In some embodiments, if the viewing direction associated with the viewpoint of the user is a second viewing direction, different from the first viewing direction, the respective input elevation is a second input elevation, different from the first input elevation. In some embodiments, the respective input elevation corresponds to a ray or vector extending from the viewpoint of the user and parallel to the direction in which the viewpoint of the user is pointed in the three-dimensional environment. Varying an angle of elevation at which a content item is docked within a three-dimensional environment in response to detecting an input corresponding to a request to dock the content item within the three-dimensional environment based on an input angle of elevation that is based on a viewing direction of the viewpoint of the user enables the object to automatically remain visibly displayed and/or oriented towards a viewpoint of the user in the user's viewport relative to the user's current viewpoint, which reduces a number of inputs that would be needed to reorient the object in the user's viewport of the three-dimensional environment, thereby improving user-device interaction.

In some embodiments, the display of the representation of the first content item docked in the three-dimensional environment is bound by a maximum placement elevation (e.g., 80, 85, 90, 95, 100, 105, or 110 degrees relative to the horizon plane) in the three-dimensional environment (e.g., a maximum angle of elevation at which the representation of the first content item is displayed in the three-dimensional environment), such as the maximum display angle of elevation of the first content item 1620 discussed with reference to FIG. 16J. In some embodiments, in response to detecting the first input, in accordance with a determination that the respective input elevation is a fourth angle of elevation that is greater than an input elevation threshold (e.g., corresponding to the maximum placement elevation described above, equal to 80, 85, 90, 95, 100, 105, or 110 degrees relative to the horizon plane), such as the input angle of elevation that is based on the input angle vector 1617 in the side view 1640 in FIG. 16J being at or above the input elevation threshold, the computer system displays, via the one or more display generation components, the representation of the first content item at a fourth position in the three-dimensional environment, wherein the fourth position corresponds to the maximum placement elevation, such as displaying the first content item 1620 at a display angle of elevation that is equal to the maximum placement elevation as shown in the side view 1640 in FIG. 16K. For example, the computer system displays the representation of the first content item at an angle of elevation that is equal to the maximum placement elevation in the three-dimensional environment despite the input elevation being greater than the maximum placement elevation. In some embodiments, the fourth position is different from the first position (and optionally the second position and the third position) in the three-dimensional environment. Limiting an angle of elevation at which a content item is docked within a three-dimensional environment to a maximum angle of elevation in response to detecting an input corresponding to a request to dock the content item within the three-dimensional environment enables the object to automatically remain visibly displayed and/or oriented towards a viewpoint of the user in the user's viewport relative to the user's current viewpoint and/or helps prevent sharp and/or extreme viewing angles of the content item, which helps prevent user discomfort, thereby improving user-device interaction.

In some embodiments, displaying the representation of the first content item docked in the three-dimensional environment includes displaying the representation of the first content item at a location within a virtual environment displayed in the three-dimensional environment, such as displaying the first content item 1620 within the virtual environment 1610 as shown in FIG. 16E. In some embodiments, the virtual environment includes a three-dimensional representation of a scene or a setting that occupies all or a portion of a field of view of the user of the computer system. For example, the virtual environment includes a three-dimensional representation of a beach, a lake, a mountainside, a field, a theater, a conference room, an opera house, or a stadium that occupies the portion of the three-dimensional environment that is in the field of view of the user. In some embodiments, when the computer system displays the representation of the first content item at the location within the virtual environment, a portion of the virtual environment is displayed in the background of and/or behind the representation of the first content item relative to the viewpoint of the user in the three-dimensional environment. In some embodiments, the virtual environment is centered on the representation of the first content item when the representation of the first content item is docked in the three-dimensional environment. In some embodiments, the virtual environment is not displayed in the three-dimensional environment when the first input is detected, as similarly discussed above. In some embodiments, the virtual environment is spatially distributed throughout an available display area (e.g., a volume or region that is optionally constrained by a portal or other boundary) of the three-dimensional environment. In some embodiments, the portal or other boundary (e.g., in which the virtual environment is displayed) is a portal into the virtual content included in the virtual environment. Accordingly, the virtual environment is optionally visible from the viewpoint of the user via the portal. In some embodiments, when the representation of the first content item is displayed docked in the three-dimensional environment, the representation of the first content item is displayed within the portal of the virtual environment in the three-dimensional environment. Varying an angle of elevation at which a content item is docked within a virtual environment that is displayed in a three-dimensional environment in response to detecting an input corresponding to a request to dock the content item within the three-dimensional environment based on an input angle of elevation associated with the input enables the object to automatically remain visibly displayed and/or oriented towards a viewpoint of the user in the user's viewport relative to the user's current viewpoint, which negates and/or reduces a number of inputs that would be needed to reorient the object in the user's viewport of the three-dimensional environment, thereby improving user-device interaction.

In some embodiments, the location of the representation of the first content item is fixed within the virtual environment, such as the location of the first content item 1620 in the top-down view 1605 in FIG. 16F being the same as the location of the first content item 1620 in the top-down view 1605 in FIG. 16H. For example, the computer system displays the representation of the first content item (e.g., initially) at a center location in the virtual environment (e.g., a location that is central within the viewport of the user), optionally independently of spatial characteristics of the representation of the first content item (e.g., size, position and/or orientation) when the first input was detected. In some embodiments, the representation of the first content item is world locked at the location in the virtual environment. For example, the computer system maintains the display of the representation of the first content item at the location in the virtual environment in response to detecting movement of the viewpoint of the user. In some embodiments, the location of the representation of the first content item is fixed within the virtual environment for a given range of angles of elevation of the input elevation. For example, the computer system displays the representation of the first content item at the location in the virtual environment for input elevations that are within the first range of angles of elevation discussed above. In some embodiments, the location in the virtual environment changes for input elevations that are outside of the first range of angles of elevation. Varying an angle of elevation at which a content item is docked within a virtual environment that is displayed in a three-dimensional environment in response to detecting an input corresponding to a request to dock the content item within the three-dimensional environment based on an input angle of elevation associated with the input enables the object to automatically remain visibly displayed and/or oriented towards a viewpoint of the user in the user's viewport relative to the user's current viewpoint, which negates and/or reduces a number of inputs that would be needed to reorient the object in the user's viewport of the three-dimensional environment, thereby improving user-device interaction.

In some embodiments, the virtual environment includes a visual horizon (e.g., a horizontal plane that is perpendicular to gravity through the virtual environment and that is optionally displayed and/or visible in the virtual environment), such as the visual horizon between the mountains and the ground in the virtual environment 1610 in FIG. 16B, and a spatial arrangement of the visual horizon (e.g., relative to the three-dimensional environment and/or relative to the physical environment) is independent of an angle of elevation at which the representation of the first content item is displayed in the three-dimensional environment in response to detecting the first input, such as the visual horizon of the virtual environment 1610 being maintained in the three-dimensional environment 1600 when the first content item 1620 is docked in the virtual environment 1610 as shown in FIG. 16E. For example, a height of the visual horizon (e.g., a vertical distance of the horizon from a ground of the physical environment) is selected without regard to an angle of elevation of the representation of the first content item in the three-dimensional environment. In some embodiments, the visual horizon of the virtual environment corresponds to an apparent visual line or curve that separates a surface of the virtual environment (e.g., a virtual ground or floor of the virtual environment) from a sky or upper region (e.g., non-floor region) of the virtual environment from the viewpoint of the user while the user is positioned on the surface of the virtual environment. In some embodiments, as discussed in more detail below, the ground or surface of the virtual environment is aligned to (e.g., matches) a floor or ground of the physical environment. Additionally, in some embodiments, a plane of the visual horizon is perpendicular to a direction of gravity in the physical environment in which the computer system is located. Accordingly, in some embodiments, if the representation of the first content item is displayed at a first angle of elevation in the three-dimensional environment, the visual horizon that is associated with the virtual environment is selected to be a first height from the ground of the physical environment, and if the representation of the first content item is displayed at a second angle of elevation that is different from the first angle of elevation, the visual horizon that is associated with the virtual environment is still selected to be the first height from the ground of the physical environment. Fixing a visual horizon of a virtual environment when a content item is docked within the virtual environment independent of an angle of elevation of the content item within the three-dimensional environment enables the visual appearance of the virtual environment to automatically be maintained when the content item is docked in the three-dimensional environment from the user's current viewpoint, thereby improving user-device interaction.

In some embodiments, the visual horizon of the virtual environment is aligned to a plane parallel to a ground (or other surface) on which a user of the computer system is positioned (e.g., as similarly described above), such as the visual horizon of the virtual environment 1610 aligning to the horizon plane 1611 in the side view 1640 in FIG. 16D. For example, a height of the visual horizon (e.g., a vertical distance of the horizontal plane through the virtual environment measured from a ground of the physical environment/three-dimensional environment) is selected to correspond to a height of the horizon plane of the physical environment (e.g., the frame of reference discussed previously above). Additionally or alternatively, in some embodiments, a plane of the visual horizon of the virtual environment is perpendicular to a direction of gravity in the physical environment. Accordingly, in some embodiments, the ground or surface of the virtual environment is aligned to (e.g., matches) a floor or ground of the physical environment. In some embodiments, as similarly discussed above, the height of the horizon plane of the physical environment is determined based on a height of the viewpoint of the user relative to the ground of the physical environment. In some embodiments, the height of the horizon plane of the physical environment is determined based on a height of the head of the user relative to the ground of the physical environment. In some embodiments, the horizon of the physical environment corresponds to a visual line or curve that separates a surface of the physical environment (e.g., a physical ground or floor of the physical environment) from a sky or upper region (e.g., non-floor region) of the physical environment from the viewpoint of the user while the user is positioned on the surface of the virtual environment. In some embodiments, the virtual environment is displayed and/or positioned within the three-dimensional environment so as to align (e.g., make coincident and/or parallel) the visual horizon line/curve of the virtual environment described above with the horizon line/curve of the horizon of the physical environment. Fixing a visual horizon of a virtual environment according when a content item is docked within the virtual environment based on a horizon plane of the physical environment in which the computer system is located enables the content item to be docked relative to the visual horizon, which allows the content item to automatically remain visibly displayed and/or oriented towards a viewpoint of the user in the user's viewport relative to the user's current viewpoint, thereby improving user-device interaction.

In some embodiments, the virtual environment includes a visual horizon (e.g., a horizontal plane that is perpendicular to gravity through the virtual environment and that is optionally displayed and/or visible in the virtual environment), such as the visual horizon between the wall and the floor in virtual environment 1625 in FIG. 16N, and a spatial arrangement of the visual horizon (e.g., relative to the three-dimensional environment and/or relative to the physical environment) is selected based on an angle of elevation at which the representation of the first content item is displayed in the three-dimensional environment in response to detecting the first input, such as the visual horizon 1619 of the virtual environment 1625 aligning to the display angle of elevation of the first content item 1620 in the side view 1640 as shown in FIG. 16P. For example, a height of the visual horizon (e.g., a vertical distance of the horizon from a ground of the physical environment) is selected based on an angle of elevation of the representation of the first content item in the three-dimensional environment. In some embodiments, the visual horizon has one or more characteristics of the visual horizon described above. Accordingly, in some embodiments, if the representation of the first content item is displayed at a first angle of elevation in the three-dimensional environment, the visual horizon of the virtual environment is selected to be a first height from the ground of the physical environment, and if the representation of the first content item is displayed at a second angle of elevation that is different from the first angle of elevation, the visual horizon of the virtual environment is selected to be a second height, different from the first height, from the ground of the physical environment. For example, from the viewpoint of the user, the visual horizon of the virtual environment maintains its spatial arrangement relative to the representation of the first content item in the three-dimensional environment for different angles of elevation of the representation of the first content item in the three-dimensional environment. In some embodiments, the virtual environment has and/or is displayed with a tilt (e.g., a vertical tilt about a horizontal axis or plane in the physical environment, such as a plane parallel to the horizon of the physical environment) relative to the physical environment according to the angle of elevation of the representation of the first content item displayed in the three-dimensional environment. In some embodiments, the tilt of the virtual environment is centered on the viewpoint of the user, such that the viewpoint of the user is the center or pivot point of the tilt and the virtual environment is tilted vertically about that pivot point. In some embodiments, if the angle of elevation of the representation of the first content item is the first angle of elevation of the representation at the first position in the three-dimensional environment, the visual horizon of the virtual environment matches and/or corresponds to the horizon of the physical environment (e.g., the virtual environment is displayed with no tilt relative to the physical environment). In some embodiments, if the angle of elevation of the representation of the first content item is the second angle of elevation or the third angle of elevation (e.g., is outside of the first range of angles of elevation discussed above) of the representation at the second position or the third position in the three-dimensional environment, the visual horizon of the virtual environment does not match and/or correspond to the horizon of the physical environment (e.g., the virtual environment is displayed with a tilt relative to the physical environment). Additionally, in some embodiments, the spatial arrangement of the visual horizon of the virtual environment relative to the physical environment when the representation of the first content item is displayed at the third angle of elevation is different from the spatial arrangement of the visual horizon of the virtual environment relative to the physical environment when the representation of the first content item is displayed at the second angle of elevation in the three-dimensional environment. Determining a visual horizon of a virtual environment when a content item is docked within the virtual environment based on an angle of elevation of the content item within the three-dimensional environment enables a spatial arrangement between the visual horizon and the content item to be maintained for different angles of elevation of the content item, thereby improving user-device interaction.

In some embodiments, in accordance with a determination that the virtual environment is a first virtual environment, such as the virtual environment 1625 in FIG. 16N, wherein the first virtual environment includes a first horizon (e.g., a first horizontal plane that is perpendicular to gravity through the first virtual environment and that is optionally displayed and/or visible in the first virtual environment), such as the visual horizon between the wall and the floor in virtual environment 1625 in FIG. 16N, a spatial arrangement of the first horizon (e.g., relative to the three-dimensional environment and/or relative to the physical environment) is selected based on an angle of elevation at which the representation of the first content item is displayed in the three-dimensional environment in response to detecting the first input, such as the visual horizon of the virtual environment 1610 being maintained in the three-dimensional environment 1600 when the first content item 1620 is docked in the virtual environment 1610 as shown in FIG. 16E. For example, a height of the first horizon (e.g., a vertical distance of the first horizon from a ground of the physical environment) is selected based on an angle of elevation of the representation of the first content item in the three-dimensional environment. In some embodiments, the first horizon has one or more characteristics of the visual horizon described above. Accordingly, in some embodiments, if the representation of the first content item is displayed at a first angle of elevation in the three-dimensional environment, the first horizon of the first virtual environment is selected to be a first height from the ground of the physical environment/ three-dimensional environment, and if the representation of the first content item is displayed at a second angle of elevation that is different from the first angle of elevation, the first horizon of the first virtual environment is selected to be a second height, different from the first height, from the ground of the physical environment/three-dimensional environment. For example, from the viewpoint of the user, the first horizon of the first virtual environment maintains its spatial arrangement relative to the representation of the first content item in the three-dimensional environment for different angles of elevation of the representation of the first content item in the three-dimensional environment. In some embodiments, displaying the first horizon with a spatial arrangement that is selected based on the angle of elevation of the representation of the first content item has one or more characteristics of displaying the visual horizon with a spatial arrangement that is selected based on the angle of elevation of representation of the first content item discussed above.

In some embodiments, in accordance with a determination that the virtual environment is a second virtual environment, different from the first virtual environment, such as the virtual environment 1610 in FIG. 16B, wherein the second virtual environment includes a second horizon (e.g., a second horizontal plane that is perpendicular to gravity through the second virtual environment and that is optionally displayed and/or visible in the second virtual environment, optionally different from or the same as the first visual horizon), such as the visual horizon between the mountains and the ground in the virtual environment 1610 in FIG. 16B, a spatial arrangement of the second horizon (e.g., relative to the three-dimensional environment and/or relative to the physical environment) is independent of the angle of elevation at which the representation of the first content item is displayed in the three-dimensional environment in response to detecting the first input, such as the visual horizon of the virtual environment 1610 being maintained in the three-dimensional environment 1600 when the first content item 1620 is docked in the virtual environment 1610 as shown in FIG. 16E. For example, a height of the second horizon (e.g., a vertical distance of the second horizon from a ground of the physical environment or from a horizon plane of the physical environment) is selected without regard to the angle of elevation of the representation of the first content item in the three-dimensional environment. In some embodiments, the second horizon has one or more characteristics of the visual horizon described above. Accordingly, in some embodiments, if the representation of the first content item is displayed at a first angle of elevation in the three-dimensional environment, the second horizon of the second virtual environment is selected to be a first height from the ground of the physical environment/three-dimensional environment, and if the representation of the first content item is displayed at a second angle of elevation that is different from the first angle of elevation, the second horizon of the second virtual environment is still selected to be the first height from the ground of the physical environment/three-dimensional environment. In some embodiments, the second virtual environment is a more abstract environment compared to the first virtual environment, which is optionally a virtual environment that is more realistic and/or grounded in reality. For example, the first virtual environment corresponds to a virtual environment modeled after a physical room, such as a movie theater or movie screening room virtual environment, or a physical space, such as an open field, a beach, or a mountainous virtual environment, while the second virtual environment corresponds to a virtual environment that is not necessarily modeled after a physical room or space, such as a surface of the moon of the planet Jupiter, a fictional environment or setting, and the like. Accordingly, in some embodiments, when the second virtual environment (e.g., a more abstract virtual environment) is displayed in the three-dimensional environment, the computer system positions the visual horizon of the second virtual environment independent of the angle of elevation of the placement location of the representation of the first content item, as doing so is less distracting for the user from the viewpoint of the user compared to a more realistic virtual environment that is the first virtual environment discussed above. In some embodiments, displaying the second horizon with a spatial arrangement that is independent of the angle of elevation of the representation of the first content item has one or more characteristics of displaying the visual horizon with a spatial arrangement that is independent of the angle of elevation of representation of the first content item discussed above. Determining a horizon plane of a respective virtual environment when a content item is docked within the respective virtual environment based on whether the respective virtual environment is a first virtual environment or a second virtual environment within the three-dimensional environment enables the object to automatically remain visibly displayed and/or oriented towards a viewpoint of the user in the user's viewport relative to the user's current viewpoint and/or automatically accounts for visual differences between and/or characteristics of the first virtual environment and the second virtual environment which separately affect the docking of the content item, thereby improving user-device interaction.

In some embodiments, in response to detecting the first input, in accordance with the determination that the respective input elevation is the first angle of elevation (e.g., that is within the first range of angles of elevation discussed above), the computer system displays, via the display generation component, a visual effect corresponding to the representation of the first content item on a surface associated with the virtual environment (e.g., a surface that is spatially located below the representation of the first content item from the viewpoint of the user), such as the display of virtual light spill effect 1622 associated with the first content item 1620 as shown in FIG. 16E. For example, as described in more detail below, the computer system displays a virtual shadow and/or simulated lighting effect based on the representation of the first content item on the surface associated with the virtual environment while concurrently displaying the representation of the first content item at the first position in the three-dimensional environment. In some embodiments, the surface associated with the virtual environment corresponds to a (e.g., virtual) ground or floor of the virtual environment in the three-dimensional environment. In some embodiments, the surface associated with the virtual environment corresponds to a physical surface of the physical environment, such as the physical ground and/or physical wall or ceiling of the physical environment that is visible in the three-dimensional environment. In some embodiments, the surface associated with the virtual environment corresponds to a surface of a virtual object (e.g., different/separate from the representation of the first content item) included within the virtual environment, such as a virtual rock, virtual sand, virtual water, or other virtual surface belonging to the virtual environment. In some embodiments, the surface associated with the virtual environment is located in front of the representation of the first content item relative to the viewpoint of the user. In some embodiments, the computer system concurrently displays the visual effect corresponding to the representation of the first content item on multiple surfaces associated with the virtual environment. For example, the computer system concurrently displays the virtual shadow and/or simulated light effect on a virtual or physical floor and a virtual or physical ceiling of the virtual environment. In some embodiments, the computer system displays the visual effect corresponding to the representation of the first content item on the surface associated with the virtual environment for a plurality of different input elevations that are in the first range of angles of elevation (e.g., in accordance with a determination that the respective input elevation is a different angle of elevation that is different from the first angle of elevation but is within the first range of angles of elevation). In some embodiments, while the representation of the first content item is not docked in the three-dimensional environment, the computer system forgoes displaying the visual effect corresponding to the representation of the first content item on a surface associated with the virtual environment.

In some embodiments, in accordance with the determination that the respective input elevation is the second angle of elevation or the third angle of elevation (e.g., that is outside of the first range of angles of elevation discussed above), the computer system forgoes display of the visual effect corresponding to the representation of the first content item on a surface associated with the virtual environment, such as forgoing the display of the virtual light spill effect 1622 as shown in FIG. 16H. For example, the computer system displays the representation of the first content item at the second position or the third position in the three-dimensional environment without displaying the visual effect corresponding to the representation of the first content item in the three-dimensional environment. In some embodiments, at the second angle of elevation or the third angle of elevation, the display of the visual effect corresponding to the representation of the first content item on a surface of the virtual environment would cause the visual effect to stray from and/or no longer mimic natural lighting/shadow effects in the physical world. Displaying a virtual surface effect corresponding to a content item on a portion of a virtual environment in a three-dimensional environment when the content item is docked within the virtual environment based on an input angle of elevation associated with the input for docking the content in the three-dimensional environment enhances the playback of the content item in the virtual environment, thereby improving user-device interaction, and/or avoids unnecessary display of the virtual surface effect for high angles of elevation in the three-dimensional environment, which helps preserve computing resources.

In some embodiments, the visual effect corresponding to the representation of the first content item includes a virtual shadow, such as a virtual shadow produced by the virtual light spill effect 1622 as described with reference to FIG. 16E. For example, the computer system displays a virtual shadow corresponding to the representation of the first content item that is virtually cast (e.g., by the representation of the first content) onto the surface associated with the virtual environment. In some embodiments, the virtual shadow mimics and/or visually corresponds to physical shadows in the physical world. For example, the computer system displays the virtual shadow based on a size and/or shape of the representation of the first content item on the surface of the virtual environment for a given (e.g., simulated) light source in the three-dimensional environment, such as a virtual light source above the representation of the first content item or a virtual light source of the virtual environment (e.g., virtual natural lighting, virtual lamps, and/or a virtual sun). In some embodiments, the virtual shadow corresponds to the first content item being played back in the representation in the three-dimensional environment. For example, the computer system displays the virtual shadow based on lighting within the scene or image of the first content item being played back. In some embodiments, the computer system is configured to update the display of the virtual shadow in response to detecting a change in a visual appearance of the representation of the first content item in the three-dimensional environment. For example, the computer system changes a size, shape, and/or darkness of the virtual shadow in response to detecting a change in the angle of elevation of the representation of the first content time (e.g., while remaining within the first range of angles of elevation) in the three-dimensional environment. Displaying a virtual shadow effect corresponding to a content item on a portion of a virtual environment in a three-dimensional environment when the content item is docked within the virtual environment based on an input angle of elevation associated with the input for docking the content in the three-dimensional environment enhances the playback of the content item in the virtual environment, thereby improving user-device interaction, and/or avoids unnecessary display of the virtual surface effect for high angles of elevation in the three-dimensional environment, which helps preserve computing resources.

In some embodiments, the visual effect corresponding to the representation of the first content item includes a virtual lighting effect that is based on one or more visual characteristics of the representation of the first content item, such as the virtual light spill effect 1622 in FIG. 16E changing based on changes in a visual appearance of the first content item 1620. For example, the computer system displays virtual light spill from the representation of the first content item onto the surface associated with the virtual environment in the three-dimensional environment. In some embodiments, one or more visual characteristics of the virtual lighting effect, such as color, brightness, location, size, and/or shape, are based on a visual appearance of the representation of the first content item. For example, the playback of the first content item within the representation functions as a virtual light source within the three-dimensional environment, such as the lighting within a particular scene or image of the first content item. In some embodiments, the computer system updates the virtual lighting effect as the one or more visual characteristics of the representation of the first content item changes in the three-dimensional environment (e.g., as a particular scene, and therefore lighting of the scene, progresses or changes in the first content item). For example, as playback of the first content item within the representation progresses, the computer system changes the one or more visual characteristics of the representation of the first content item, which optionally causes the virtual lighting effect to be updated (e.g., change in visual appearance) in the three-dimensional environment. As another example, the computer system changes the color, brightness, location, size, and/or shape of the virtual lighting effect in response to detecting a change in the angle of elevation of the representation of the first content time (e.g., while remaining within the first range of angles of elevation) in the three-dimensional environment. Displaying a virtual lighting effect corresponding to a content item on a portion of a virtual environment in a three-dimensional environment when the content item is docked within the virtual environment based on an input angle of elevation associated with the input for docking the content in the three-dimensional environment enhances the playback of the content item in the virtual environment, thereby improving user-device interaction, and/or avoids unnecessary display of the virtual surface effect for high angles of elevation in the three-dimensional environment, which helps preserve computing resources.

In some embodiments, in response to detecting the first input, in accordance with the determination that the respective input elevation is the first angle of elevation, the virtual environment in the three-dimensional environment is associated with a first minimum available level of immersion (e.g., 0, 5, 10, 15, 20, 25, 30, or 35% of the field of view of the user consumed by the virtual environment), such as the minimum level of immersion of the virtual environment 1610 in FIG. 16E. For example, for input elevations that are within the first range of angles of elevation discussed above, including the first angle of elevation, the computer system defines a first minimum level of immersion at which the virtual environment is able to be displayed in the three-dimensional environment. In some embodiments, a level of immersion includes an associated degree to which the virtual environment displayed by the computer system obscures background content (e.g., the three-dimensional environment including the respective portion of the physical environment) around/behind the virtual environment, optionally including the number of items of background content displayed and the visual characteristics (e.g., colors, contrast, and/or opacity) with which the background content is displayed, and/or the angular range of the content displayed via the one or more display generation components (e.g., 60 degrees of content displayed at low immersion, 120 degrees of content displayed at medium immersion, and/or 180 degrees of content displayed at high immersion), and/or the proportion of the field of view displayed via the one or more display generation components consumed by the virtual environment (e.g., 33% of the field of view consumed by the virtual environment at low immersion, 66% of the field of view consumed by the virtual environment at medium immersion, and/or 100% of the field of view consumed by the virtual environment at high immersion). In some embodiments, at a first (e.g., high) level of immersion, the background, virtual and/or real objects are displayed in an obscured manner. For example, a respective virtual environment with a high level of immersion is displayed without concurrently displaying the background content (e.g., in a full screen or fully immersive mode). In some embodiments, at a second (e.g., low) level of immersion, the background, virtual and/or real objects are displayed in an obscured manner (e.g., dimmed, blurred, and/or removed from display). For example, a virtual environment with a low level of immersion is optionally displayed concurrently with the background content, which is optionally displayed with full brightness, color, and/or translucency. As another example, a virtual environment displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, as discussed below, the level of immersion of the virtual environment is controllable via a hardware input element (e.g., a rotatable button or dial), such as the same hardware input element via which the recentering input discussed above is provided. In some embodiments, the virtual environment is displayed at a respective level of immersion in the three-dimensional environment. In some embodiments, while displaying the virtual environment at the respective level of immersion in the three-dimensional environment and while the representation of the first content item is displayed at the first position in the three-dimensional environment, the computer system detects an input corresponding to a request to decrease the level of immersion of the virtual environment to below the first minimum available level of immersion, such as via interaction with (e.g., a rotation of) the hardware input element above. In some embodiments, in response to detecting the input, the computer system decreases the level of immersion of the virtual environment from the respective level of immersion down to the first minimum available level of immersion in the three-dimensional environment.

In some embodiments, in accordance with the determination that the respective input elevation is the second angle of elevation or the third angle of elevation, the virtual environment in the three-dimensional environment is associated with a second minimum available level of immersion (e.g., 60, 65, 70, 75, 80, 85, 90, or 95% of the field of view of the user consumed by the virtual environment), greater than the first minimum available level of immersion, such as the increased minimum level of immersion of the virtual environment 1610 in FIG. 16K. For example, for input elevations that are outside of the first range of angles of elevation discussed above, including the second angle of elevation and the third angle of elevation, the computer system defines a second minimum level of immersion, greater than the first minimum level of immersion, at which the virtual environment is able to be displayed in the three-dimensional environment. In some embodiments, while displaying the virtual environment at the respective level of immersion in the three-dimensional environment and while the representation of the first content item is displayed at the second position or the third position in the three-dimensional environment, the computer system detects an input corresponding to a request to decrease the level of immersion of the virtual environment to below the second minimum available level of immersion, such as via interaction with (e.g., a rotation of) the hardware input element above. In some embodiments, in response to detecting the input, the computer system decreases the level of immersion of the virtual environment from the respective level of immersion down to the second minimum available level of immersion in the three-dimensional environment. Varying a minimum immersion level at which a virtual environment is displayed when docking a content item within the virtual environment in a three-dimensional environment based on an input angle of elevation associated with the input for docking the content in the three-dimensional environment enhances the playback of the content item in the virtual environment based on the input angle of elevation and/or ensures that the content item is able to be sufficiently docked in the virtual environment based on the input angle of elevation, thereby improving user-device interaction.

In some embodiments, when the first input is detected, the three-dimensional environment is displayed at a respective level of immersion (e.g., as similarly discussed above), such as the level of immersion of the virtual environment 1610 in FIG. 16D. For example, the virtual environment is displayed at the respective level of immersion in the three-dimensional environment when the first input is detected. In some embodiments, the computer system is displaying a second virtual environment, different from the virtual environment, or other virtual content at the respective level of immersion in the three-dimensional environment when the first input is detected. For example, the virtual environment is not displayed in the three-dimensional environment when the first input is detected.

In some embodiments, in response to detecting the first input, in accordance with a determination that the respective input elevation is the first angle of elevation (e.g., that is within the first range of angles of elevation) and that the respective level of immersion of the virtual environment is below the first minimum level of immersion (e.g., 0, 5, 10, 15, 20, 25, 30, or 35% of the field of view of the user consumed by the virtual environment), such as the input angle of elevation that is based on the input angle vector 1617 in the side view 1640 in FIG. 16D, the computer system displays, via the one or more display generation components, the virtual environment with the first minimum level of immersion in the three-dimensional environment, such as increasing the level of immersion to the minimum level of immersion illustrated in FIG. 16E. For example, the computer system increases the level of immersion of the virtual environment in the three-dimensional environment to the first minimum level of immersion when the representation of the first content item is displayed at the first position in the three-dimensional environment. In some embodiments, an increase in the level of immersion increases the proportion of the field of view visible via the one or more display generation components that is consumed by the virtual environment. For example, additional portions of the three-dimensional environment (including the physical environment surrounding the display generation component) in the field of view of the user are obscured (e.g., no longer displayed/visible) when the level of immersion increases for the virtual environment. In some embodiments, the computer system increases the level of immersion for the virtual environment without altering display of the representation of the first content item in the three-dimensional environment. For example, the level of immersion for the virtual environment increases without moving, obscuring, and/or changing a brightness and/or opacity of the representation of the first content item. In some embodiments, in accordance with a determination that the respective input elevation is the first angle of elevation (e.g., that is within the first range of angles of elevation) and that the respective level of immersion of the virtual environment is at least the first minimum level of immersion, the computer system forgoes changing the level of immersion of the virtual environment in the three-dimensional environment.

In some embodiments, in accordance with a determination that the respective input elevation is the second angle of elevation or the third angle of elevation (e.g., that is outside of the first range of angles of elevation) and that the respective level of immersion of the virtual environment is below the second minimum level of immersion (e.g., 60, 65, 70, 75, 80, 85, 90, or 95% of the field of view of the user consumed by the virtual environment), such as the input angle of elevation that is based on the input angle vector 1617 in the side view 1640 in FIG. 16J, the computer system displays the virtual environment with the second minimum level of immersion in the three-dimensional environment, such as increasing the level of immersion to the minimum level of immersion illustrated in FIG. 16K. For example, the computer system increases the level of immersion of the virtual environment in the three-dimensional environment to the second minimum level of immersion when the representation of the first content item is displayed at the second position or the third position in the three-dimensional environment. In some embodiments, the computer system increases the level of immersion for the virtual environment without altering display of the representation of the first content item in the three-dimensional environment. In some embodiments, in accordance with a determination that the respective input elevation is the second angle of elevation or the third angle of elevation (e.g., that is outside of the first range of angles of elevation) and that the respective level of immersion of the virtual environment is at least the second minimum level of immersion, the computer system forgoes changing the level of immersion of the virtual environment in the three-dimensional environment. Increasing an immersion level of a virtual environment in a three-dimensional environment when docking a content item within the virtual environment while the immersion level of the virtual environment is below a minimum immersion level that is based on an input angle of elevation associated with the input for docking the content in the three-dimensional environment enhances the playback of the content item in the virtual environment based on the input angle of elevation and/or automatically ensures that the content item is able to be sufficiently docked in the virtual environment based on the input angle of elevation without user input, thereby improving user-device interaction.

In some embodiments, the first input corresponds to a request to change a placement elevation of the representation of the first content item (e.g., relative to the frame of reference, such as the horizon of the virtual environment and/or the horizon of the physical environment) in the virtual environment, such as a request to change the display angle of elevation of the first content item 1620 in the side view 1640 in FIG. 16F. For example, when the computer system detects the first input discussed above, the representation of the first content item is already docked within the virtual environment in the three-dimensional environment. Accordingly, in some embodiments, the first input corresponds to a request to change the angle of elevation at which the representation of the first content item is displayed within the virtual environment in the three-dimensional environment. In some embodiments, the first input includes an air gesture, such as an air pinch and drag gesture directed to the representation of the first content item, as previously discussed herein. In some embodiments, as similarly discussed above, the computer system detects interaction with a hardware element of the computer system, such as a physical button, dial, or switch (e.g., a recentering input). In some embodiments, the request to change the placement elevation of the representation of the first content item detected via the hardware element corresponds to a recentering input that is detected when the input elevation has changed (e.g., increased or decreased) since the representation of the first content item was last docked in the virtual environment, such as due to changes in the head/viewpoint direction and/or location in the physical environment, as previously discussed above. In some embodiments, the request to change the placement elevation of the representation of the first content causes the angle of elevation of the representation of the first content item to increase from within the first range of angles of elevation to outside of the first range of angles of elevation in the three-dimensional environment. Increasing an immersion level of a virtual environment in a three-dimensional environment when moving a docked content item within the virtual environment while the immersion level of the virtual environment is below a minimum immersion level that is based on an input angle of elevation associated with a request to change the angle of elevation of the content item enhances the playback of the content item in the virtual environment based on the input angle of elevation and/or automatically ensures that the content item is able to remain sufficiently docked in the virtual environment based on the input angle of elevation without user input, thereby improving user-device interaction.

In some embodiments, in response to detecting the first input, in accordance with the determination that the respective input elevation is the first angle of elevation (e.g., that is within the first range of angles of elevation), the representation of the first content item is (e.g., initially) displayed a first distance (e.g., a default and/or computer-selected distance) from a viewpoint of a user of the computer system in the virtual environment, such as the distance between the first content item 1620 and the viewpoint of the user 1602 as indicated in the top-down view 1605 in FIG. 16F. In some embodiments, in accordance with the determination that the respective input elevation is the second angle of elevation or the third angle of elevation (e.g., that is outside of the first range of angles of elevation), the representation of the first content item is (e.g., initially) displayed the first distance from the viewpoint of the user in the virtual environment, such as the same distance between the first content item 1620 and the viewpoint of the user 1602 as indicated in the top-down view 1605 in FIG. 16H. For example, when the representation of the first content item is docked in the three-dimensional environment in response to detecting the first input, the computer system displays the representation of the first content item at the first distance from the viewpoint of the user irrespective of whether the input elevation is within the first range of angles of elevation or outside of the first range of angles of elevation in the three-dimensional environment. In some embodiments, the display of the representation of the first content item at the first distance from the viewpoint of the user in the three-dimensional environment is not determined based on user input (e.g., the computer system does not detect input selecting the first distance for the display of the representation of the first content item docked in the three-dimensional environment). Displaying a content item at a fixed distance from a viewpoint of the user when the content item is docked within a three-dimensional environment in response to detecting an input corresponding to a request to dock the content item within the three-dimensional environment irrespective of an input angle of elevation associated with the input enables the object to automatically remain visibly displayed in the user's viewport relative to the user's current viewpoint, thereby improving user-device interaction.

In some embodiments, in accordance with a determination that the virtual environment is a first virtual environment, such as the virtual environment 1610 in FIG. 16B, the computer system displays the representation of the first content item a first distance from the viewpoint of the user, such as the first distance between the first content item 1620 and the viewpoint of the user 1602 indicated in the top-down view 1605 in FIG. 16E. In some embodiments, in accordance with a determination that the virtual environment is a second virtual environment, different from the first virtual environment, such as the virtual environment 1625 in FIG. 16N, the computer system displays the representation of the first content item a second distance from the viewpoint of the user that is different from the first distance from the viewpoint of the user, such as the second distance between the first content item 1620 and the viewpoint of the user 1602 in the top-down view 1605 in FIG. 16N. In some embodiments, the first distance and the second distance are not determined based on user input (e.g., the computer system does not detect input selecting the first distance or the second distance for the display of the representation of the first content item docked in the three-dimensional environment). For example, the computer system determines the first distance and the second distance based on one or more visual characteristics of the first virtual environment and the second virtual environment, respectively, such as virtual objects within the first virtual environment and the second virtual environment, a lighting of the first virtual environment and the second virtual environment, and/or an apparent size of the first virtual environment and the second virtual environment. In some embodiments, in accordance with a determination that the virtual environment is a third virtual environment, different from the first virtual environment and the second virtual environment, the computer system displays the representation of the first content item a third distance (optionally different from the first distance and/or the second distance) from the viewpoint of the user.

In some embodiments, in response to detecting the first input, in accordance with the determination that the respective input elevation is the second angle of elevation or the third angle of elevation (e.g., that is outside of the first range of angles of elevation described above) and that the virtual environment is the first virtual environment, such as the input angle of elevation based on the input angle vector 1617 in the side view 1640 in FIG. 16H, the computer system displays, via the one or more display generation components, the representation of the first content item the first distance from the viewpoint of the user, such as displaying the first content item 1620 in the virtual environment 1610 at the first distance from the viewpoint of the user 1602 as indicated in the top-down 1605 in FIG. 16H. In some embodiments, in accordance with the determination that the respective input elevation is the second angle of elevation or the third angle of elevation and that the virtual environment is the second virtual environment, such as the input angle of elevation based on the input angle vector 1617 in the side view 1640 in FIG. 16O, the computer system displays the representation of the first content item the second distance from the viewpoint of the user, such as displaying the first content item 1620 in the virtual environment 1625 at the second distance from the viewpoint of the user 1602 as indicated in the top-down 1605 in FIG. 16P. For example, because the target distance at which the representation of the first content item is displayed in the three-dimensional environment when docking the representation of the first content item is different between the first virtual environment and the second virtual environment, the computer system displays the representation of the first content item at the different distances according to whether the virtual environment is the first virtual environment or the second virtual environment. In some embodiments, in accordance with the determination that the respective input elevation is the first angle of elevation (e.g., that is within the first range of angles of elevation) and that the virtual environment is the first virtual environment, the computer system displays the representation of the first content item the first distance from the viewpoint of the user. In some embodiments, in accordance with the determination that the respective input elevation is the first angle of elevation and that the virtual environment is the second virtual environment, the computer system displays the representation of the first content item the second distance from the viewpoint of the user. In some embodiments, the second distance is greater than the first distance. In some embodiments, the second distance is smaller than the first distance. Displaying a content item at a distance from a viewpoint of the user when the content item is docked within a virtual environment in response to detecting an input corresponding to a request to dock the content item within the three-dimensional environment based on whether the virtual environment is a first virtual environment or a second virtual environment enables the object to automatically remain visibly displayed in the user's viewport relative to the user's current viewpoint based on the virtual environment displayed, thereby improving user-device interaction.

It should be understood that the particular order in which the operations in method 1700 have been described is merely exemplary and is not intended to indicate that the described order is the only order in which the operations could be performed. One of ordinary skill in the art would recognize various ways to reorder the operations described herein. In some embodiments, aspects/operations of method 1700 may be interchanged, substituted, and/or added between these methods. For example, various object manipulation techniques and/or object movement techniques of method 1700 is optionally interchanged, substituted, and/or added between these methods. For brevity, these details are not repeated here.

Figure 18U:
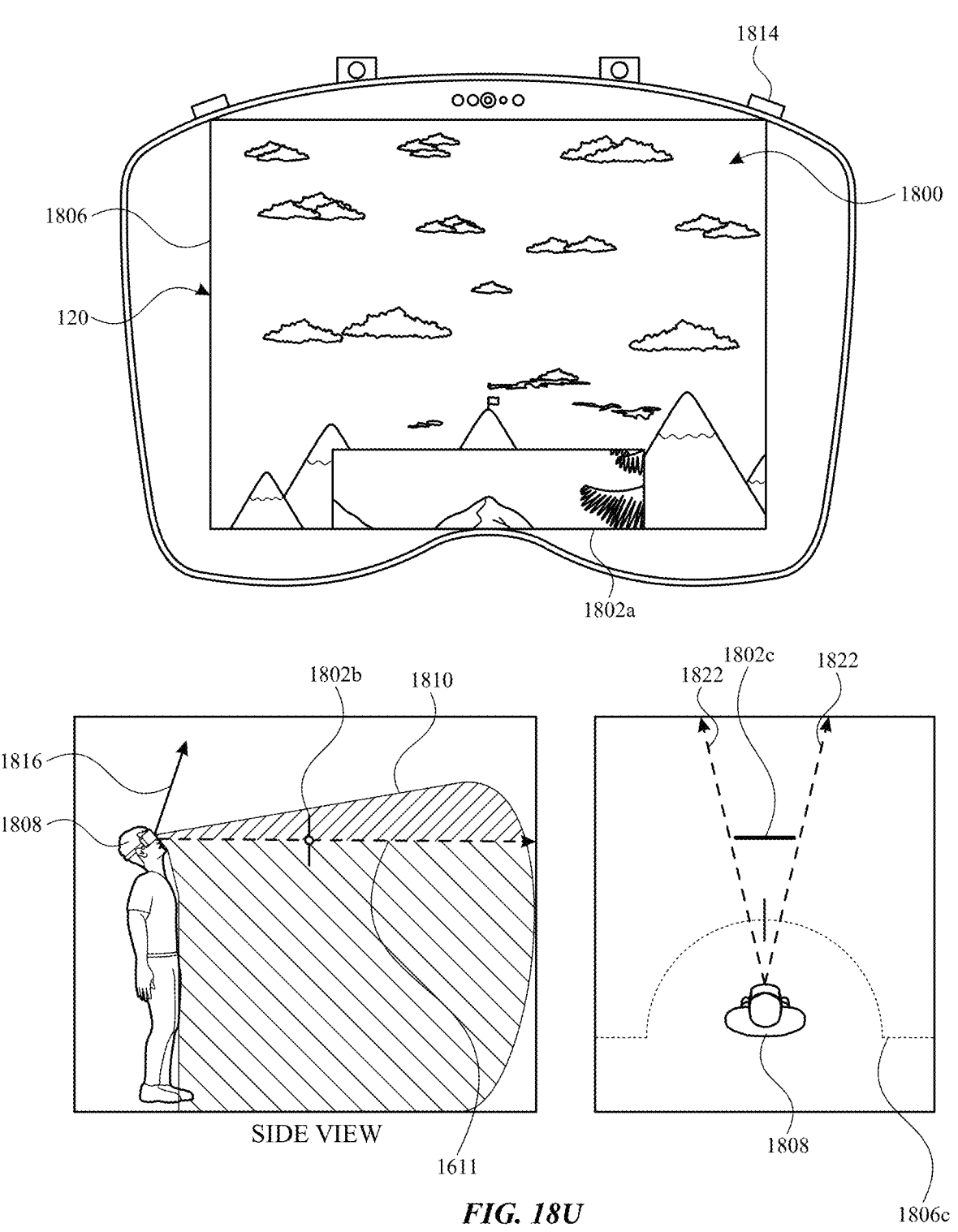
Figure 18V:
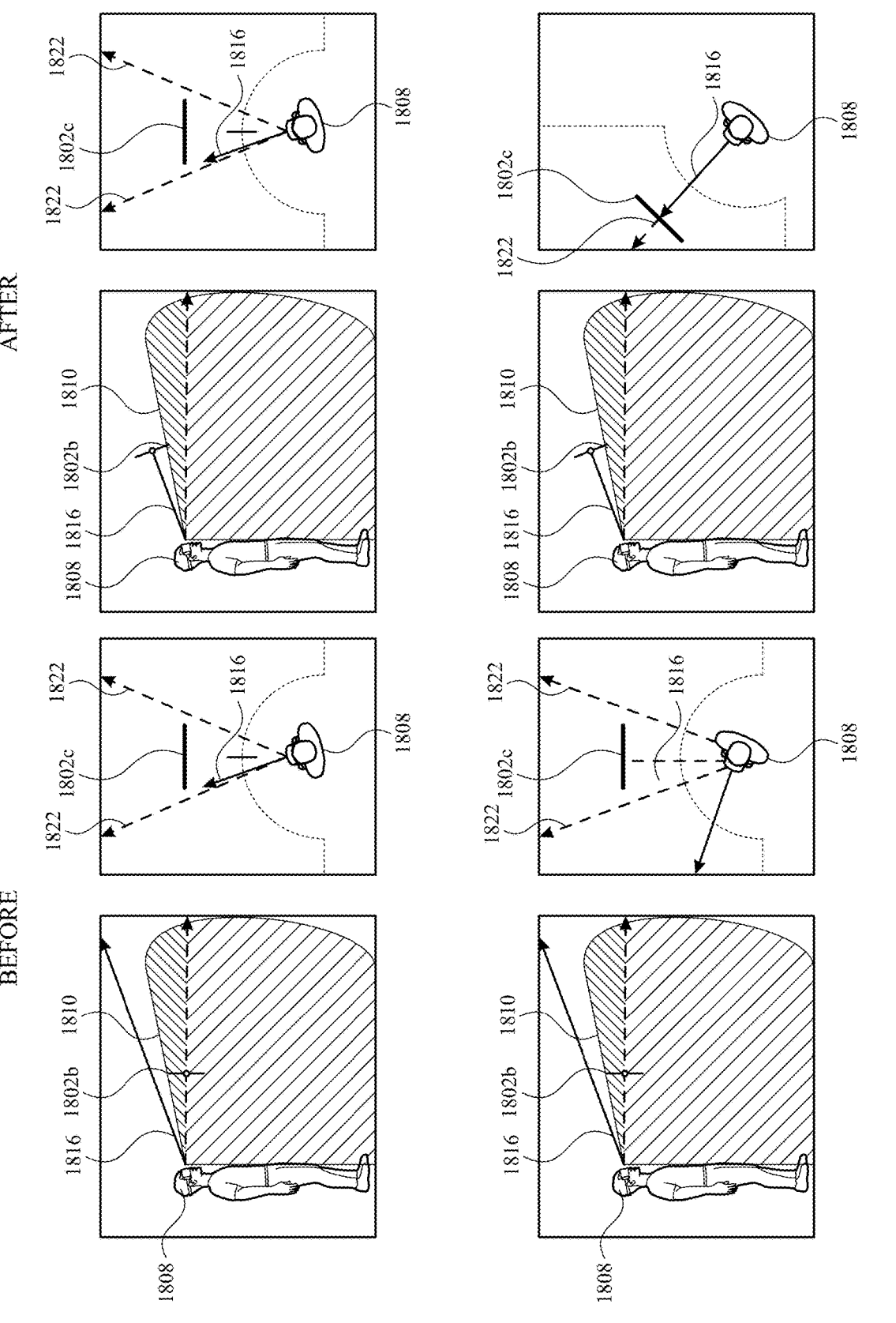

FIGS. 18A-18V illustrate examples of a computer system facilitating docking of a content item in a virtual environment based on an input angle of elevation and viewpoint yaw in accordance with some embodiments.

FIG. 18A illustrates a computer system 101 (e.g., an electronic device) displaying, via a display generation component (e.g., display generation component 120 of FIGS. 1 and 3), a three-dimensional environment 1800 from a viewpoint of a user 1808 (as shown in the side view).

In some embodiments, computer system 101 includes a display generation component 120. In FIG. 18A, the computer system 101 includes one or more internal image sensors 114a oriented towards the face of the user 1808 (e.g., eye tracking cameras 540 described with reference to FIG. 5). In some embodiments, internal image sensors 114a are used for eye tracking (e.g., detecting a gaze of the user). Internal image sensors 114a are optionally arranged on the left and right portions of display generation component 120 to enable eye tracking of the user's left and right eyes. Computer system 101 also includes external image sensors 114b and 114c facing outwards from the user to detect and/or capture the physical environment and/or movements of the user's hands.

As shown in FIG. 18A, computer system 101 captures one or more images of the physical environment around computer system 101 (e.g., operating environment 100), including one or more objects in the physical environment around computer system 101.

As discussed in more detail below, display generation component 120 is illustrated as displaying content in the three-dimensional environment 1800. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIGS. 18A-18V.

Display generation component 120 has a field of view (e.g., a field of view captured by external image sensors

114b and 114c and/or visible to the user via display generation component 120) that corresponds to the content shown in FIG. 18A. Because computer system 101 is optionally a head-mounted device, the field of view of display generation component 120 is optionally the same as or similar to the field of view of the user.

As discussed herein, one or more air pinch gestures performed by a user (e.g., with hand 1812) are detected by one or more input devices of computer system 101 and interpreted as one or more user inputs directed to content displayed by computer system 101. Additionally or alternatively, in some embodiments, the one or more user inputs interpreted by computer system 101 as being directed to content displayed by computer system 101 are detected via one or more hardware input devices (e.g., controllers) rather than via the one or more input devices that are configured to detect air gestures, such as the one or more air pinch gestures, performed by the user. Such depiction is intended to be exemplary rather than limiting; the user optionally provides user inputs using different air gestures and/or using other forms of input.

As mentioned above, the computer system 101 is configured to display content in the three-dimensional environment 1800 using the display generation component 120. For instance, as illustrated in FIG. 18A, computer system 101 displays a virtual environment 1806. In some embodiments, the virtual environment 1806 corresponds to a currently selected system environment of the computer system 101, such as a virtual environment selected (e.g., automatically and/or by default) by the computer system 101 or a virtual environment previously selected by a respective user (e.g., the user 1808) at the computer system 101. For example, as shown in FIG. 18A, the virtual environment 1806 is or includes a mountain environment. In some embodiments, as mentioned above, the virtual environment 1806 is displayed in the three-dimensional environment 1800 with a respective level of immersion. For example, in FIG. 18A, the computer system 101 is displaying the virtual environment 1806 at a first level of immersion determined by the magnitude of the rotation of the button 1814. Additional details regarding virtual environments and levels of immersion are provided with reference to methods 1700 and 1900.

In some embodiments, in addition to displaying a virtual environment, computer system 101 illustrates docked content 1802a along with a control window 1804 as illustrated in FIG. 18A. The docked content 1802a and control window 1804 share one or more characteristics with the docked content described with respect to methods 1700 and 1900. In some embodiments, and as illustrated by the side view displayed in FIG. 18A, user 1808 views content 1802 straight on (e.g., at a 0° viewpoint elevation angle as measured by the angle formed between horizon 1611 and user viewpoint vector 1816). In some embodiments, if the user 1808 tilts their head up, the viewpoint elevation angle increases as the angle between horizon 1611 and user viewpoint vector 1816 increases as illustrated in the example of FIG. 18B.

As illustrated in FIG. 18B in response to the user looking upwards, the viewpoint elevation angle increases (as reflected by the change in the viewport of the user displayed by computer system 101). For instance, as shown in the head mounted display view content 1802a along with control window 1804 are displayed lower from the viewpoint of the user 1808 since the user is now looking up. As illustrated in the side-view, the docked content 1802a is below the user viewpoint vector, thus meaning the docket content is no longer aligned with the center of the viewpoint of the user.

In some embodiments, if computer system 101 detects that the viewpoint elevation angle of the user is above a threshold amount, in response to detecting an input from the user, computer system 101 adjusts the content elevation angle of the docked content so as to shift the docked content closer to the center of the viewpoint. For instance, in response to a mechanical input to button 1814 by hand 1812 of the user, computer system 101 changes the viewpoint elevation angle of the docked content window 1802 as illustrated in the example of FIG. 18C.

In the example of FIG. 18C, in response the input at button 1814, computer system 101 moves docked content 1802 (as well as control window 1804) closer to the center of the viewpoint of the user. In some embodiments, in order to move the docked content window 1802 closer to the center of the viewpoint of the user, computer system 101 changes a content elevation angle associated with the docked content 1802a. In some embodiments, the content elevation angle is defined by horizon 1611 and a vector formed between the head of the user and a center point associated with the docked content. As shown in FIG. 18C, when computer system 101 shifts docked content 1802b (as indicated in the side view), it increases the content elevation angle to be the same as the viewpoint elevation angle of the user thereby recentering the content in the viewport of the user.

In the example of FIG. 18D, user 1808 looks even further up than in the example of FIG. 18B (e.g., the viewpoint elevation angle of the user is higher in 18D than in FIG. 18B) and in response to an button 1814 by hand 1812 of the user, computer system 101 recenters docked content 1802a to be closer to the viewpoint of the user by changing the content elevation angle of docked content 1802a as well as control window 1804 so that the content elevation angle matches the viewpoint elevation angle as illustrated in FIG. 18E. As shown in the example of FIG. 18E, the content elevation angle of docked content 1802b now matches the viewpoint elevation angle of the user thus recentering the docked content 1802a in the viewport of the user.

In some embodiments, if computer system detects a change in the viewpoint elevation angle that is within a threshold range, the computer system will not modify the content elevation angle of the docked content as illustrated in the examples of FIGS. 18F-18G. In the example of 18F, user 1808 has a viewpoint elevation angle that is positive, however, the viewpoint elevation angle is within a range of elevation angles bounded by vector 1810. In contrast, the viewpoint elevation angles of FIGS., 18B and 18D were beyond the range of elevation angles bounded by vector 1810. In response to detecting an input from 1812 at button 1814, computer system 101 and in accordance with the viewpoint elevation angle being within a range of elevation angles bounded by vector 1810, the computer system does not adjust the content elevation angle of the docked content 1802a as illustrated in the example of FIG. 18G.

In some embodiments, in addition to modifying the content elevation angle of a docked content window in response to detecting a recentering input (such as the input to button 1814), computer system 101 also modifies a yaw of the environment and/or a yaw of the content to bring the content and/or environment closer to the viewpoint of the user as illustrated in the examples of FIGS. 18H-18V. In the example of FIG. 18H, and as indicated in the top-down view of environment of 1800, computer system displays docked content window 1802c such that a yaw of the user 1808 relative to the docked content window, which is measured as lateral displacement between a center of the viewpoint of the user, indicated by 1816c in the top down view, and the center of the docked content 1802c is 0°. Similarly, the computer system displays environment 1806 such that a yaw of the user relative to the virtual environment, which is measured as the lateral displacement the viewpoint of the user 1816c with respect to the center of the virtual environment is 0°. In some embodiments, the computer system detects that the yaw of the user relative to the docked content and the yaw of the user relative to the virtual environment changes when the viewpoint of the user moves laterally as illustrated in the example of FIG. 18I.

In the example of FIG. 18I, and as illustrated in the top-down view, the viewpoint of the user 1816c of the user has shifted to the left (e.g., the computer system detected that the direction in which the user is looking has rotated to the left) such that the yaw of the viewpoint of the user relative to both the content and the environment has increased. In some embodiments, in response to receiving an input at button 1814 from hand 1812, computer system 101 compares each of the yaw of the user relative to the content and the yaw of the user relative to the environment to determine whether to shift either of the content and/or the environment to be closer to center of the viewport of the user. For instance, as illustrated in the top-down view of FIG. 18I, the viewpoint of the user 1816 has not rotated far enough to above content yaw threshold 1822 an environment yaw threshold 1820. In some embodiments, content yaw threshold 1822 represents a yaw threshold that the yaw of the user is to exceed in order for the computer system 101 to shift the docked content 1802c to be closer to the viewpoint of the user. Content yaw threshold is symmetrical with respect to the user 1808 such that if user is able to exceed the content yaw threshold 1822 by moving their viewpoint both right and left. In some embodiments, environment yaw threshold 1820 represents a yaw threshold that the yaw of the user is to exceed in order for the computer system 101 to shift the environment 1806c to be closer to the center of the viewport of the user. Environment yaw threshold is symmetrical with respect to the user 1808 such that if user is able to exceed the environment yaw threshold 1820 by moving their viewpoint both right and left. In the example of FIG. 18I, computer system 101 in accordance with a determination that viewpoint of the user 1816c exceeds neither of the content yaw threshold 1822 or the environment yaw threshold 1820, does not modify the display of the docked content 1802a or the environment 1806 as illustrated in FIG. 18J.

As illustrated in the example of FIG. 18J (e.g., in the head mounted display view), both the environment and the content have remained static (e.g., unmoved) and thus are shifted to the right of the user in response to the yaw of the viewpoint of the user 1816c moving to the left.

In the example of FIG. 18K, the computer system 101 detects that the user has moved their viewpoint 1816 from the viewpoint shown in FIG. 18H to the viewpoint of the user 1816c illustrated in FIG. 18K (e.g., to the right) such that the viewpoint yaw exceeds content yaw threshold 1822 but does not exceed environment yaw threshold 1820. Thus, in response to the input at 1814 from hand 1812, computer system 101 shifts the docked content 1802 so that is closer to the center of the viewport of the user, but leaves the environment unmodified as illustrated in FIG. 18L. As illustrated in the head mounted display view of FIG. 18L, the docked content 1802 has moved to the center of the viewport of the user but the virtual environment remains unmoved.

In the example of FIG. 18M, computer system detects that the user has moved their viewpoint 1816 from the viewpoint shown in FIG. 18H to the viewpoint of the user 1816c illustrated in FIG. 18M (e.g., to the right) such that the viewpoint yaw exceeds content yaw threshold 1822 also exceeds environment yaw threshold 1820. Thus, in response to the input at 1814 from hand 1812, computer system 101 shifts the docked content 1802 so that is closer to the center of the viewport of the user, and also shift the environment 1806c so that it is closer to the center of the viewport of the user as illustrated in FIG. 18N. As illustrated in the head mounted display view of FIG. 18N, the docked content 1802 has moved to the center of the viewport of the user as well as the virtual environment 1806.

FIG. 18O illustrates a summary of the examples illustrated in FIGS. 18I-18N. In the example of FIG. 18O, the first row of the summary illustrates the instance in which the change of the yaw of the viewpoint of the user does not exceed content yaw threshold 1822 and environment yaw threshold 1820 and thus neither the docked content 1802 nor the environment 1806 are moved in response to a recentering input as illustrated in examples 18I-18J. In the example of FIG. 18O, the second row of the summary illustrates the instance in which the change of the yaw of the viewpoint of the user exceeds the content yaw threshold 1822 but not the environment yaw threshold 1820 and thus only the content is moved and not the environment in response to a recentering input as illustrated in examples 18K-18L. In the example of FIG. 18O, the third row of the summary illustrates the instance in which the change of the yaw of the viewpoint of the user exceeds content yaw threshold 1822 and environment yaw threshold 1820 and thus both docked content 1802 and the environment 1806 are moved in response to a recentering input as illustrated in examples 18M-18N.

In some embodiments the content yaw threshold and the environment yaw threshold are based on the viewpoint elevation of the user as illustrated in the examples of FIGS. 18P-18V. In the example of FIG. 18P, the viewpoint elevation angle of the user 1808 as illustrated in the side view of FIG. 18P. In the example of 18P, and in accordance with the viewpoint elevation angle of the user being greater than the range of viewpoint elevation angles bounded by vector 1810, computer system modifies the environment yaw threshold such that both the environment yaw threshold and the content yaw threshold are the same (as represented in the examples of FIG. 18P-18V by content yaw threshold 1822). As illustrated in the examples of FIGS. 18O-18U, computer system 101 simultaneously modifies the content elevation angle, the content yaw, and the environment in accordance with the relationship between the viewpoint elevation angle and the environment and content yaw.

In the example of FIG. 18Q, computer system 101 detects that the user 1808 has tilted their head (as indicated in the sideview) outside of the range of viewpoint elevation angles bounded by vector 1810 and has also detected that the viewpoint yaw of the user 1808 is below the content yaw threshold (which is now the same as the environment yaw threshold) and in response to detecting an input at button 1814 from hand 1812 modifies the content elevation angle to be closer to the center of the viewport of the user without moving either the content in yaw or the environment in yaw as illustrated in FIG. 18R.

In the example of FIG. 18S, computer system 101 detects that the user 1808 has tilted their head (as indicated in the sideview) outside of the range of viewpoint elevation angles bounded by vector 1810 and has also detected that the viewpoint yaw of the user 1808 is above the content yaw threshold (e.g., which is now the same as the environment yaw threshold) and in response to detecting an input at button 1814 from hand 1812 modifies the content elevation angle to be closer to the center of the viewport of the user also moves both the content in yaw and the environment in yaw as illustrated in FIG. 18T.

In some embodiments, the content yaw threshold also is modified in accordance with the viewpoint elevation angle of the user. For instance, as illustrated in the example of FIG. 18U, in accordance with detecting that the viewpoint elevation angle of the user is higher than in the example of FIG. 18P, the content yaw threshold 1822 (e.g., which is the same as the environment yaw threshold) is modified (e.g., in comparison to the content yaw threshold 1822 in FIG. 18P).

FIG. 18V illustrates a summary of the examples illustrated in FIGS. 18P-18S. In the example of FIG. 18V, the first row of the summary illustrates the instance in which the change of the yaw of the viewpoint of the user does not exceed content yaw threshold 1822 and thus neither the docked content 1802 nor the environment 1806 are moved in response to a recentering input as illustrated in examples 18Q-18R. In the example of FIG. 18O, the second row of the summary illustrates the instance in which the change of the yaw of the viewpoint of the user exceeds content yaw threshold 1822 (e.g., which is the same as the environment yaw threshold) and thus both docked content 1802 and the environment 1806 are moved in response to a recentering input as illustrated in examples 18S-18T.

FIG. 19 is a flowchart illustrating an exemplary method 1900 of facilitating docking of a content item in a virtual environment based on an input angle of elevation and viewpoint yaw in accordance with some embodiments. In some embodiments, the method 1900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1900 are, optionally, combined and/or the order of some operations is, optionally, changed.

In some embodiments, a method 1900 is performed at a computer system in communication with one or more display generation components and one or more input devices, such as computer system 101 in FIG. 18A. For example, the computer system is or includes a mobile device (e.g., a tablet, a smartphone, a media player, or a wearable device), or a computer. In some embodiments, the computer system has one or more characteristics of the computer system in methods 800, 1000, 1200, 1300, 1500, 1700, and/or 2100. In some embodiments, the display generation component has one or more characteristics of the display generation component in methods 800, 1000, 1200, 1300, 1500, 1700, and/or 2100. In some embodiments, the one or more input devices have one or more characteristics of the one or more input devices in methods 800, 1000, 1200, 1300, 1500, 1700, and/or 2100.

In some embodiments, while displaying, via the one or more display generation components, a first virtual content item in a three-dimensional environment, such as content 1802*a* in FIG. 18B, the computer system detects (1902*a*), via the one or more input devices, a recentering input, such as the input at element 1814 performed by hand 1812 in FIG. 18B (e.g., input corresponding to a request to update a spatial arrangement of one or more virtual objects (e.g., a plurality of virtual objects) relative to the current viewpoint of the user to satisfy a first set of one or more criteria that specify a range of distances or a range of orientations of the one or more virtual objects relative to the current viewpoint of the user, such as a "recentering" input, as described in more detail below). For example, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment, etc.). In some embodiments, the three-dimensional environment has one or more characteristics of the environments in methods 800, 1000, 1200, 1300, 1500 and/or 1700. In some embodiments, the first content item corresponds to a first movie, a first episode of a television show, a first podcast, a first song, a first music video, a first video, and/or a first image. In some embodiments, the first content item is associated with an application running on the computer system, such as a media or content player application, music player application, podcast application, web browsing application, and/or photos application. In some embodiments, the first virtual content has one or more characteristics of the virtual content items in methods 800, 1000, 1200, 1300, 1500 and/or 1700. In some embodiments, a recentering input refers to an input pertaining to a request to orient the first virtual content item with respect to the current viewpoint of the user (e.g., the viewpoint of the user at the time that the recentering input was received). In some embodiments, the recentering input is received via a one or more mechanical buttons associated with the computer system (described further herein). Additionally or alternatively, the recentering input is received via a user input received a user interface or other interactive content window that is also displayed within the three-dimensional environment. For example, the recenter input optionally includes an express user input requesting the arranging (e.g., recentering), a determination that one or more criteria are satisfied relative to the current viewpoint, the virtual object(s), and/or the three-dimensional environment, and/or an automatic requesting of the arranging (e.g., recentering). For example, the recentering input optionally includes detecting a portion of the user's body contacting a surface (e.g., a touch sensitive surface) detected by and/or in communication with the computer system, detecting an air gesture (e.g., an air pinch gesture including contacting of the user's fingers, an air swiping gesture including movement of the user's finger(s) and/or hand(s), an air depinch of the user's fingers (e.g., movement of the user's fingers and/or finger tips away from each other), an air first including curling of the user's finger(s), and/or an air pointing gesture including a pointing of a finger) optionally while attention is directed to a respective virtual object or a position in the environment not including virtual content, an actuation of a physical and/or virtual button, and/or movement and/or selections of selectable options (e.g., buttons) detected at a second computer system, such as a stylus or other pointing device. In some embodiments, the recentering input includes detecting actuation of a rotatable button that is on the computer system. In some embodiments, the recentering input includes detecting actuation of the rotatable button for longer than a threshold amount of time (e.g., 0.1, 0.5, 1, 3, 5, or 10 seconds). In some embodiments, the input corresponding to the request to arrange the one or more virtual objects is or includes an input to arrange the virtual objects to satisfy one or more arrangement criteria. In some embodiments, the one or more arrangement criteria include criteria satisfied when an interactive portion of the virtual objects are oriented towards the viewpoint of the user, the virtual objects do not obstruct the view of other virtual objects from the viewpoint of the user, the virtual objects are within a threshold distance (e.g., 10, 20, 30, 40, 50, 100, 200, 300, 400, 500, 1000 or 2000 centimeters) of the viewpoint of the user, the virtual objects are within a threshold angle (e.g., 1, 3, 5, 10, 15, 30, 45, 60, 75, or 85 degrees) relative to a vector extending from the viewpoint of the user (e.g., a center of the user's eyes parallel to a physical ground), and/or the virtual objects are within a threshold distance (e.g., 1, 5, 10, 20, 30, 40, 50, 100, 200, 300, 400, 500, 1000 or 2000 centimeters) of each other. In some embodiments, the recentering input does not include an input that specifies or defines how the virtual objects are moved and/or reoriented other than initiating such movement and/or reorientation. In some embodiments, the recentering input is different from an input requesting to update the positions of one or more objects in the three-dimensional environment (e.g., relative to the viewpoint of the user), such as inputs for manually moving the objects in the three-dimensional environment.

In some embodiments in response to detecting the recentering input, the computer system shifts (1902*b*) the first virtual content item in the three-dimensional environment so that it is closer to a center of a viewport of the user (1902*c*), such as shifting the content elevation angle of docked content 1802 in FIG. 18C, and such as shifting the content 1802*c* to the viewpoint yaw of the user in FIG. 18L. In some embodiments, shifting the first virtual content item in the three-dimensional environment so that it is closer to a center of a viewport of the user includes moving a virtual content item in the environment so that a center of the virtual content item is shifted to be in closer alignment with a center of the viewport of the user. In some embodiments, the viewport of the user refers to the field of view of the user through the one or more display generation components of the computer system.

In some embodiments, shifting the virtual content item in the three-dimensional environment so that it is closer to a center of a viewport of the user includes (1902*c*), in accordance with a determination that a viewpoint of the user of the computer system has a first viewpoint elevation angle relative to a frame of reference, such as the viewpoint elevation angle 1816 in FIG. 18B (e.g., relative to a horizon line or plane that is perpendicular to gravity and extends out from a location of a viewpoint of the user), displaying, via the one or more display generation components, the first virtual content item at a first content elevation angle relative to the frame of reference (1902*d*), such as the content elevation of content 1802*a* in FIG. 18C.

In some embodiments, shifting the virtual content item in the three-dimensional environment so that it is closer to a center of a viewport of the user includes (1902*c*), in accordance with a determination that the viewpoint of the user of the computer system has a second viewpoint elevation angle relative to the frame of reference, different from the first viewpoint elevation angle, such as the viewpoint elevation in FIG. 18D, displaying (1902*c*), via the one or more display generation components, the first virtual content item at a second content elevation angle relative to the frame of reference, different from the first content elevation angle, such shifting the content elevation angle of docked content to the viewpoint elevation angle of the user in FIG. 18E. In some embodiments, and in response to detecting the recentering input, the computer system displays the first content item at an orientation that is based on the orientation of the viewpoint of the user relative to three-dimensional environment. For instance, the orientation of the viewpoint of the user includes the user having a viewpoint elevation angle relative to the three-dimensional environment. In some embodiments, the viewpoint elevation angle shares one or more characteristics with the input angles of elevation described with respect to method 1700. In some embodiments, the viewpoint elevation angle relative to the three-dimensional environment corresponds to an angle formed by a first vector that is parallel to a ground surface and/or plane of the three-dimensional environment, and a second vector extending from the head of the user in a direction that the head is facing (e.g., the front of the face of the user). Thus, in some embodiments, if computer system detects that the head of the user is increasing in tilt, the computer system detects that the viewpoint elevation angle increases since the horizon of the physical space (e.g., the vector parallel to the ground surface of the three-dimensional environment of the user) is fixed. In some embodiments, the first content elevation angle refers to an angle formed between the first vector (e.g., the vector that is parallel to the ground surface of the three-dimensional environment) and a second vector that is extended from the content item (e.g., a front surface of the content item and/or from a reference point on the content item, such as the center, bottom, middle, top, or side) to the viewpoint of the user of the computer system. In some embodiments, the first and second content elevation angles share one or more characteristics with the second and third angles of elevation described with respect to method 1700. In some embodiments, the first content elevation angle that the first virtual content item is displayed at in response to a recentering input is based on the first viewpoint elevation angle at the time when the recentering input is detected. In some embodiments, in response to detecting the recentering input, the computer system determines the current viewpoint elevation angle by determining the tilt of the head of the user to determine the content elevation angle at which to display the content. In some embodiments, and in response to detecting the recentering input, the computer system displays the first virtual content at a specific yaw (e.g., rotation about the Y-axis) and/or pitch (e.g., rotation about the Z-axis) in addition to displaying the first virtual content at a specific first content elevation angle (e.g., rotation about the X-axis). In some embodiments, the yaw and/or pitch displayed by the computer system is defined so as to keep the content item normal to the second vector (described herein with respect to the content elevation angle). In some embodiments, the content elevation angle is configured to ensure that the content is facing the viewpoint of the user, and optionally, that the amount of the virtual content that is visible to the user is maximized or increased. In some embodiments, the content elevation angle is independent of the tilt of the head of the user, and/or the direction of the attention of the user. Additionally or alternatively, the content elevation angle is based on the determination of the position of the head of the user within the three-dimensional environment (e.g., a determination of the location of the center of the head of the user). In some embodiments, the content elevation angle is dependent on the viewpoint elevation angle when the viewpoint elevation angle is within a certain range (described herein), similar to as described with reference to method 1700. In some embodiments, the content elevation angle and the viewpoint elevation angle are based on the floor/horizon of the three-dimensional environment in which the content is displayed. Additionally or alternatively, the content elevation angle and the viewpoint elevation angle are based on an alternative reference axis such as an axis determined by other content displayed in the three-dimensional environment, and/or an axis determined by a surface that the user of the computer system is resting upon (e.g., a reclined chair, a table, and/or surface other than the floor of the three-dimensional environment). Displaying virtual content at a an elevation angle that is based on the elevation angle of the viewpoint of the user in response to detecting a recentering input enables the computer system to display the virtual content in a manner that increases visibility of the virtual content to the user, which negates and/or reduces a number of inputs that would be needed to reorient the object in the user's viewport, thereby improving user-device interaction and conserving computing resources associated with the additional input that would otherwise be required to re-orient the virtual content.

In some embodiments, detecting, via the one or more input devices, the recentering input includes detecting actuation of a physical input element, such as detecting actuation of element 1814 in FIG. 18D. In some embodiments, the physical input element is a mechanical button or other mechanical input device that is part of and/or communicatively to the computer system. For example, the mechanical input is a digital crown such as first button 1-128 described above with respect to FIG. 1, which is depressible and twistable, button 11.1.1-114, and/or dial or button 1-328. In some embodiments, the physical input element is located on an input device that is communicatively coupled to the computer system such as on a mouse, trackpad, and/or controller device. In some embodiments, the physical input element has other functions such as, but not limited to: launching one or more applications on the computer system, and/or changing a degree of immersion in the three-dimensional environment. In some embodiments, the actuation of the physical input element associated with the recentering input shares one or more characteristics with the recentering input described with respect to methods 800, 1000, 1200, 1300, 1500 and/or 1700. In some embodiments, if the computer system detects that the actuation of the physical input element is longer than a time threshold, the computer system recenters the virtual content and/or a virtual environment. Additionally, the computer system optionally displays a home menu if the actuation of the physical input element is below a time threshold (e.g., 0.5, 1, 2, or 5 seconds). In some embodiments, the physical input element in addition to be actuated can be rotated. In some embodiments, in response to detecting rotation of the physical input element, the computer system changes a level of immersion similar to and sharing one or more characteristics of changing an immersion level discussed with respect to method 1700. Employing a mechanical physical input element to receive recentering inputs from a user, minimizes the likelihood of erroneous recentering inputs, thereby improving user-device interaction and conserving computing resources associated with the additional input that would otherwise be required to re-orient the virtual content due to inadvertent or erroneous recentering inputs.

In some embodiments, the first viewpoint elevation angle and the second viewpoint elevation angle are outside a threshold range of viewpoint elevation angles, such as the range of viewpoint elevations bounded by vector 1810 in FIG. 18A.

In some embodiments, in response to detecting the recentering input, the computer system shifts the first virtual content item in the three-dimensional environment so that it is closer to the center of the viewport of the user, such as shown with content 1802*b* in FIG. 18C. In some embodiments, the shifting of the first virtual content item in the three-dimensional environment includes, in accordance with a determination that the viewpoint of the user of the computer system has a third viewpoint elevation angle relative to a frame of reference (e.g., relative to a horizon line or plane that is perpendicular to gravity and extends out from a location of a viewpoint of the user), and in accordance with a determination that the third viewpoint elevation angle is within the threshold range of viewpoint angles, such as the range of viewpoint elevations 1810 in FIG. 18A, displaying, via the one or more display generation components, the first virtual content item at a third content elevation angle relative to the frame of reference, different from the first content elevation angle and the second content elevation angle, such as maintaining the content 1803*a* at or near horizon 1611 in FIG. 18K. In some embodiments, the recentering input shares one or more characteristics with the recentering input described with respect to methods 800, 1000, 1200, 1300, 1500 and/or 1700. In some embodiments, when the viewpoint elevation angle is outside of the threshold range, in response to a recentering input, the computer system shifts the virtual content to a new content elevation angle that is based on the viewpoint elevation angle at the time that the recentering input was detected. Additionally, in some embodiments, when the viewpoint elevation angle is within the threshold range, the computer system shifts the first virtual content item to a default content elevation angle that is associated with the threshold range. As an example, the threshold range can be from −30° to 30° or some sub-range. In some embodiments, when the viewpoint elevation angle is within the threshold range, and in response to the recentering input, the computer system displays the first content item at a 0° content elevation angle. However, if the viewpoint elevation angle is outside of the range, for instance at 40°, then in response to the recentering input, the computer system displays the first content item at 40°, and if the viewpoint elevation was 50°, then in response to the recentering input, the computer system displays the first content item at 50°. In some embodiments, the relationship between the viewpoint elevation angle and the recentering input operations shares one or more characteristics with the relationship described with respect to method 1700. Thus, in some embodiments, when the viewpoint elevation angle is outside of the threshold range, the content elevation angle that results from a recentering input, is based on the viewpoint elevation angle, however when the viewpoint elevation angle is within the threshold range, the viewpoint elevation angle that results from a recentering input goes to a default content elevation angle that is associated with the range. In some embodiments, the recentering input, the threshold range, and the actions taken by the computer system in response to the recentering input (both when the viewpoint elevation angle is within or outside of the threshold range) share one or more characteristics with the recentering input actions described with respect to method 1700. Basing the content elevation angle that a virtual object is displayed at in response to a recentering input on the viewpoint angle of the user, minimizes the likelihood that the content is displayed at an undesired content elevation angle, thereby improving user-device interaction and conserving computing resources associated with the additional input that would otherwise be required to re-orient the virtual content due to inadvertent or erroneous recentering inputs.

In some embodiments, while displaying, via the one or more display generation components, a second virtual content item in the three-dimensional environment concurrently with the first virtual content item, such as content 1804 in FIG. 18B, and in response to detecting the recentering input, the computer system shifts the second virtual content item in the three-dimensional environment in accordance with shifting the first virtual content item in the three-dimensional environment so that it is closer to the center of the viewport of the user, such as shown with content 1804 in FIG. 18C. In some embodiments, the computer system recenters (e.g., shifts) multiple virtual content items in response to the recentering input. For instance, if the second virtual content item (and a third, fourth, and/or fifth content item) is displayed with the first virtual content item, the second content item is also recentered (e.g., the elevation angle is adjusted and/or the placement/orientation of the second content item is adjusted) in accordance with the first virtual content item. In some embodiments, the first virtual content item is recentered (e.g., the content elevation angle is adjusted) in response to detecting the recentering input while the second virtual content item does not move in response to the recentering input. Additionally or alternatively, the second virtual content item is recentered to a different content elevation angle than the first virtual content item in response to detecting the recentering input. In some embodiments, the relationship between the viewpoint elevation angle when the recentering input is detected and the resulting content elevation angle is the same for the first virtual content item and the second virtual content item. Alternatively, the relationship is optionally different. Recentering multiple virtual content items in response to a recentering input, minimizes the amount of inputs required to move content to a desired content elevation angle, thereby improving user-device interaction and conserving computing resources associated with the additional input that would otherwise be required to re-orient the virtual content.

In some embodiments, the first virtual content item is displayed in a virtual environment, such as shown with the virtual environment 1806 in FIG. 18J, and the virtual environment is associated with a target viewpoint yaw relative to the viewpoint of the user (optionally relative to a frame of reference of the environment of the user, such as relative to due North at the location of the user), such as the target viewpoint yaw of the virtual environment to align with the yaw of the user as illustrated in FIGS. 18J-18N. In some embodiments, the virtual environment is an immersive environment that is displayed within the three-dimensional environment and is at least partially immersive (e.g., occupies at least a portion of the viewport of the user). In some embodiments, the virtual environment shares one or more characteristics with the virtual environments described with respect to methods 800, 1000, 1200, 1300, 1500 and/or 1700. In some embodiments, the virtual content item is displayed within the virtual environment, such that if the virtual environment is no longer displayed by the computer system, the first virtual content item also ceases to be displayed. In some embodiments, the virtual environment has a target viewpoint yaw relative to the viewpoint of the user associated with the virtual environment. The target viewpoint yaw optionally refers to a yaw of the viewpoint at which the viewpoint would be centered (from a yaw perspective) with the virtual environment and/or at which the viewpoint would be oriented at a particular point in the virtual environment defined by the virtual environment. In some embodiments, different virtual environments have different target view yaws relative to the viewpoint of the user associated with each virtual environment. In some embodiments, the viewpoint yaw associated with the virtual environment is measured from a center of the virtual environment. In some embodiments, the target viewpoint yaw relative to the viewpoint of the user is selected by the application that is associated with the virtual environment. Additionally and/or alternatively, the target viewpoint yaw relative to the viewpoint of the user is selected by the user in a settings menu and/or other control user interface associated with the virtual environment. In some embodiments, the target viewpoint yaw relative to the viewpoint of the user is the yaw at which the representation of a content item is displayed at the docked position. In some embodiments the docked position shares one or more characteristics with displaying content at a docked position described with respect to methods 800, 1000, and/or 1700. Associating a virtual environment with a target viewpoint yaw relative to the user, minimizes the amount of inputs required to move content to a yaw relative to the viewpoint of the user, thereby improving user-device interaction and conserving computing resources associated with the additional input that would otherwise be required to re-orient the virtual content.

In some embodiments, in response to detecting the recentering input, the computer system shifts the virtual environment in the three-dimensional environment, including displaying, via the one or more display generation components, the virtual environment so that the virtual environment is displayed at the target viewpoint yaw relative to the viewpoint of the user, such as shown with the virtual environment 1806 being shifted to match the yaw of the user in FIG. 18N. In some embodiments, in response to the recentering input, the computer system moves the virtual environment within the three-dimensional environment so that the above-described center or reference of the virtual environment is at the target viewpoint yaw that is associated with the virtual environment. In some embodiments, shifting the virtual environment to have the target viewpoint yaw relative to the viewpoint of the user includes moving and/or rotating (e.g., about the viewpoint) the virtual content that is displayed within the virtual environment. In some embodiments, in response to detecting the recentering input, the computer system shifts (e.g., moves and/or rotates) the virtual environment to the target viewpoint yaw, while also shifting (e.g., simultaneously or concurrently shifting) the virtual content item to a content elevation angle that is closer to the viewpoint of the user as described previously. In some embodiments, in response to the recentering input, the computer system moves and/or rotates the virtual environment without shifting the content elevation angle of the virtual content. In some embodiments, in response to detecting the recentering input, the computer system shifts the virtual content to a content elevation angle without adjusting the yaw of the virtual environment to the target viewpoint yaw. Recentering the virtual environment to have the target viewpoint yaw relative to the viewpoint of the user in response to a recentering input, minimizes the number of inputs required to adjust the position of the virtual environment, thereby improving user-device interaction and conserving computing resources associated with the additional input that would otherwise be required to re-orient the virtual content.

In some embodiments, in response to detecting the recentering input, and in accordance with a determination that a viewpoint yaw relative to the virtual environment is above a yaw threshold, the computer system shifts the virtual environment so that it is closer to the center of the viewpoint of the user, such as shown with respect to the virtual environment being shifted to the yaw of the user in FIG. 18N, including displaying, via the one or more display generation components, the virtual environment at the target viewpoint yaw relative to the viewpoint of the user associated with the virtual environment, such as shown with the virtual environment in FIG. 18M.

In some embodiments, in response to detecting the recentering input, and in accordance with a determination that the viewpoint yaw relative the virtual environment is below the yaw threshold, such as shown in FIG. 18I, the computer system forgoes shifting the virtual environment so that it is closer to the center of the viewpoint of the user including forgoing display of the virtual environment at the target viewpoint yaw relative to the viewpoint of the user associated with the virtual environment, such as shown with the virtual environment not shifting in FIG. 18J. In some embodiments, in accordance with the determination that the viewpoint yaw relative to the target viewpoint yaw of the virtual environment is below the yaw threshold, the computer system maintains the yaw of the virtual environment without adjusting it in response to the recentering input. In some embodiments, in response to a recentering input, the computer system determines whether to shift the virtual environment within the three-dimensional to the target viewpoint yaw, based on the viewpoint yaw of the user relative to the target viewpoint yaw of virtual environment determined at the time that the recentering input in received. In some embodiments, the viewpoint yaw relative to the target viewpoint yaw of the virtual environment refers to an offset between the yaw of the viewpoint of the user and the target viewpoint yaw of the virtual environment. In some embodiments, the computer system compares the viewpoint yaw to a yaw threshold to determine whether or not to shift the virtual environment to the target viewpoint yaw. In some embodiments, and in response to determining that the viewpoint yaw relative to the target viewpoint yaw of the virtual environment is above the yaw threshold, the computer system shifts the virtual environment to the target viewpoint yaw including moving the virtual environment in the three-dimensional environment so that the center point (or other reference) of the virtual environment is at the target viewpoint yaw. In some embodiments, the yaw threshold is 1°, 5°, 10°, 15°, 30°, 45°, or 75°. In some embodiments, if the viewpoint yaw relative to the target viewpoint yaw of the virtual environment is below the yaw threshold at the time the recentering input is received, the computer system forgoes modifying the yaw of the virtual environment. Alternatively, the computer system modifies the yaw of the virtual environment so that the yaw of the virtual environment is greater or less than the target viewpoint yaw associated with the virtual environment. Recentering the virtual environment to have the target viewpoint yaw relative to the viewpoint of the user in response to a recentering input when the viewpoint yaw is above a threshold when the recentering input is received, minimizes the number of inputs required to adjust the position of the virtual environment, the number of inputs needed to correct undesired yaw adjustments made in response to the recentering input, and prevents unnecessary changes in the display of the virtual environment when the current viewpoint yaw is close to the target viewpoint yaw, thereby improving user-device interaction and conserving computing resources associated with the additional input that would otherwise be required to re-orient the virtual content.

In some embodiments, the yaw threshold is determined according to a process comprising, in accordance with a determination that the viewpoint of the user of the computer system has a third viewpoint elevation angle relative to the frame of reference, such as the viewpoint elevation angle of the viewpoint in FIG. 18S, and that the third viewpoint elevation angle relative to the frame of reference is within a first range of viewpoint elevation angles, such as the viewpoint elevation angle of the viewpoint in FIG. 18S, setting the yaw threshold to be a first value, such as the yaw threshold 1822 in FIG. 18S.

In some embodiments, the yaw threshold is determined according to a process comprising, in accordance with a determination that the viewpoint of the user of the computer system has a fourth viewpoint elevation angle relative to the frame of reference that is different from the third viewpoint elevation angle relative to the frame of reference, such as the viewpoint elevation angle in FIG. 18U, and that the fourth elevation angle relative to the frame of reference is within the first range of viewpoint angles, setting the yaw threshold to be the first value, such as the yaw threshold 1822 in FIG. 18U. In some embodiments, the yaw threshold is associated with a particular range of viewpoint elevation angles. For instance, if the computer system determines that the viewpoint elevation angle of the user is within a first range (e.g., −90° to 90°, −45° to 45°, −20° to 20°, −20° to 45°, or −15° to) 90°, the computer system sets the yaw threshold to a first value (e.g., 10°, 20°, 45°, 90°, or) 180°. In some embodiments, if the viewpoint elevation angle has two different values, but both values are within the first range of viewpoint angles, the computer system will compare viewpoint yaw to the same yaw threshold. In some embodiments, if the computer system determines that the viewpoint elevation angles is in a range that is different from the first range, the yaw threshold is set to a different value. In some embodiments, the yaw threshold is correlated and/or proportional to the range (e.g., the higher the range, the higher the yaw threshold). Alternatively the yaw threshold is negatively correlated with the range (e.g., the higher the range, the lower the yaw threshold). Recentering the virtual environment in yaw based on whether a yaw threshold has been surpassed, according to a yaw threshold that is based on the viewpoint elevation of the user, minimizes the number of inputs required to adjust the position of the virtual environment and the number of inputs needed to correct undesired yaw adjustments made in response to the recentering input and also reduces unnecessary changes to the display of the virtual environment if the current viewpoint yaw is close to the target viewpoint yaw, thereby improving user-device interaction and conserving computing resources associated with the additional input that would otherwise be required to re-orient the virtual content.

In some embodiments, the yaw threshold is determined according to a process comprising, in accordance with a determination that the viewpoint of the user of the computer system has a third viewpoint elevation angle relative to the frame of reference, such as the viewpoint elevation angle of the viewpoint in FIG. 18K, setting the yaw threshold to be a first value, such as the yaw threshold 1820 in FIG. 18K.

In some embodiments, the yaw threshold is determined according to a process comprising, in accordance with a determination that the viewpoint of the user of the computer system has a fourth viewpoint elevation angle relative to the frame of reference, different from the third viewpoint elevation angle, such as the viewpoint elevation angle in FIG. 18N, setting the yaw threshold to be a second value, different from the first value, such as the yaw threshold 1822 in FIG. 18N. In some embodiments, the yaw threshold is based on the viewpoint elevation angle of the user at the time that the recentering input is received. For instance, if the computer system determines that the viewpoint elevation angle of the user is a first value (e.g., −90°, −45°, −20° °, 45°, or) 90°, the computer system sets the yaw threshold to a first value (e.g., 10°, 20°, 45°, 90°, or) 180°. In some embodiments, if the computer system determines that the viewpoint elevation angle is different from the first viewpoint elevation angle, the yaw threshold is set to a different value. In some embodiments, the yaw threshold is correlated and/or proportional to the viewpoint elevation angle (e.g., the higher the viewpoint elevation angle, the higher the yaw threshold). Alternatively the yaw threshold is negatively correlated with the viewpoint elevation angle (e.g., the higher the angle, the lower the yaw threshold). Recentering the virtual environment in yaw according to a yaw threshold that is based on the viewpoint elevation of the user, minimizes the number of inputs required to adjust the position of the virtual environment and the number of inputs needed to correct undesired yaw adjustments made in response to the recentering input, thereby improving user-device interaction and conserving computing resources associated with the additional input that would otherwise be required to re-orient the virtual content.

In some embodiments, shifting the first virtual content item in the three-dimensional environment so that it is closer to the center of the viewport of the user further includes forgoing displaying the virtual environment at the target viewpoint yaw relative to the viewpoint of the user, such as shown in FIG. 18L where the virtual environment is not displayed at the target viewpoint yaw, but the content 1802c is. In some embodiments, detecting the recentering input serves as an indicator to adjust the content elevation angle of the virtual content item and has no effect on the viewpoint yaw relative to the virtual environment and/or the first virtual content item. Thus, optionally, the computer system does not modify the viewpoint yaw relative to the virtual environment in response to receiving the recentering input. In some embodiments, the computer system adjusts the content elevation angle of the first virtual content item, even if the yaw between the virtual environment and the user is such that the first virtual content item is not within the viewport of the user. In some embodiments, in response to detecting the recentering input, the computer system changes the elevation of the content while simultaneously recentering the virtual environment to have the target viewpoint yaw relative to the user. In some embodiments, in response to detecting the recentering input, the computer system displays the virtual environment at the target viewpoint yaw without recentering the content according to the target viewpoint yaw. In some embodiments, in response to detecting the recentering input, the computer system displays the virtual content at the target viewpoint yaw without recentering the virtual environment to the target viewpoint yaw. Recentering the virtual content in terms of content elevation angle, while leaving the yaw of the virtual environment unmodified in response to a recentering input, maintains spatial context for the user, and minimizes the number of inputs required to adjust the position of the virtual environment and the number of inputs needed to correct undesired yaw adjustments made in response to the recentering input, thereby improving user-device interaction and conserving computing resources associated with the additional input that would otherwise be required to re-orient the virtual content.

In some embodiments, in response to detecting the recentering input, in accordance with a determination that a viewpoint yaw relative to the first virtual content is above a yaw threshold, such as being above yaw threshold 1822 in FIG. 18K, the computer system shifts the first virtual content so that it is closer to the center of the viewpoint of the user including displaying, via the one or more display generation components, the first virtual content at the target viewpoint yaw relative to the user associated with the virtual environment, such as displaying content 1802a at the target viewpoint yaw as shown in FIG. 18L.

In some embodiments, in response to detecting the recentering input, in accordance with a determination that the viewpoint yaw relative first virtual content is below the yaw threshold, such as being below yaw threshold 1822 in FIG. 18I, the computer system forgoes shifting the first virtual content so that it is closer to the center of the viewpoint of the user including forgoing display of the first virtual content at the target viewpoint yaw relative to the user, such as maintaining content 1802a at its location from FIGS. 18I-18J. In some embodiments, the yaw threshold (e.g., 0°, 1°, 5°, 10°, 20°, 45°, 90°, or 180°) refers to an offset between the viewpoint yaw of the user relative to the virtual content and the target viewpoint yaw relative to the user associated with the virtual environment that if is determined to be exceeded when a recentering input is received, causes the computer system to shift the display of the virtual content so that the virtual content is at the target viewpoint yaw relative to the user. In some embodiments, if the yaw threshold is not exceeded, the computer system maintains the yaw of the virtual content in the three-dimensional environment. In some embodiments, the computer system shifts the virtual content in yaw independent of the virtual environment (e.g., maintains the position of the virtual environment such that the environment is not shifted in yaw). Additionally or alternatively, the virtual environment is also shifted in yaw in accordance with shifting the virtual content. Recentering the virtual content in yaw, according to a yaw threshold, minimizes the number of inputs required to adjust the position of the virtual content and the number of inputs needed to correct undesired yaw adjustments made in response to the recentering input, and also reduces the number of changes needed to the display of the virtual content when the difference between the viewpoint yaw and the target yaw are small, thereby improving user-device interaction and conserving computing resources associated with the additional input that would otherwise be required to re-orient the virtual content.

In some embodiments, the yaw threshold is determined according to a process comprising, in accordance with a determination that the viewpoint of the user of the computer system has a third viewpoint elevation angle relative to the frame of reference, and that the third viewpoint elevation angle relative to the frame of reference is within a first range of viewpoint elevation angles, such as the viewpoint elevation angle in FIG. 18H, setting the yaw threshold to be a first value, such as yaw threshold 1822 in FIG. 18H.

In some embodiments, the yaw threshold is determined according to a process comprising, in accordance with a determination that the viewpoint of the user of the computer system has a fourth viewpoint elevation angle relative to the frame of reference, and that the fourth viewpoint elevation angle relative to the frame of reference is within the first range of viewpoint angles, such as the viewpoint elevation angle in FIG. 18P, setting the yaw threshold to be the first value, such as yaw threshold 1822 in FIG. 18P. In some embodiments, the yaw threshold is based on the viewpoint elevation angle of the user and specifically whether the viewpoint elevation angle of the user is within a specific range (e.g., −90° to 90°, −45° to 45°, −20° to 20°, −20° to 45°, or −15° to) 90°. In some embodiments, if the computer system determines that the viewpoint elevation angles is in a range that is different from the first range, the yaw threshold is set to a different value. In some embodiments, the yaw threshold is correlated and/or proportional to the range (e.g., the higher the range, the higher the yaw threshold). Alternatively the yaw threshold is negatively correlated with the range (e.g., the higher the range, the lower the yaw threshold). In some embodiments, if the viewpoint elevation angle has two different values, but both values are within the first range of viewpoint angles, the computer system will compare viewpoint yaw to the same yaw threshold. Recentering the virtual content in yaw, according to a yaw threshold that is based on the viewpoint elevation of the user, minimizes the number of inputs required to adjust the position of the virtual content and the number of inputs needed to correct undesired yaw adjustments made in response to the recentering input, and preventing unnecessary changes in the display of the virtual content, thereby improving user-device interaction and conserving computing resources associated with the additional input that would otherwise be required to re-orient the virtual content.

In some embodiments, the yaw threshold is determined according to a process comprising, in accordance with a determination that the viewpoint of the user of the computer system has a third viewpoint elevation angle relative to the frame of reference, such as the viewpoint elevation angle in FIG. 18U, setting the yaw threshold to be a first value, such as yaw threshold 1822 in FIG. 18U.

In some embodiments, the yaw threshold is determined according to a process comprising, in accordance with a determination that the viewpoint of the user of the computer system has a fourth viewpoint elevation angle relative to the frame of reference, different from the third viewpoint elevation angle, such as the viewpoint elevation angle in FIG. 18U, setting the yaw threshold to be a second value, different from the first value, such as yaw threshold 1822 in FIG. 18U. In some embodiments, the yaw threshold is based on the viewpoint elevation angle of the user at the time that the recentering input is received. For instance, if the computer system determines that the viewpoint elevation angle of the user is a first value (e.g., −90°, −45°, −20°, 45°, or) 90°, the computer system sets the yaw threshold to a first value (e.g., 10°, 20°, 45°, 90°, or) 180°. In some embodiments, if the computer system determines that the viewpoint elevation angle is different from the first viewpoint elevation angle, the yaw threshold is set to a different value. Recentering the virtual content item in yaw according to a yaw threshold that is based on the viewpoint elevation of the user, minimizes the number of inputs required to adjust the position of the virtual content and the number of inputs needed to correct undesired yaw adjustments made in response to the recentering input, thereby improving user-device interaction and conserving computing resources associated with the additional input that would otherwise be required to re-orient the virtual content.

In some embodiments, the third viewpoint elevation angle is lower than the fourth elevation angle, and the first value of the yaw threshold is greater than the second value of the yaw threshold, such as shown in the differences in viewpoint elevation angles and corresponding yaw thresholds in FIGS. 18P and 18U. In some embodiments, the yaw threshold is correlated and/or proportional to the viewpoint elevation angle (e.g., the higher the viewpoint elevation angle, the greater the yaw threshold). Alternatively the yaw threshold is negatively correlated with the viewpoint elevation angle (e.g., the higher the angle, the lower the yaw threshold). In some embodiments, the relationship between viewpoint elevation angle of the user and the yaw threshold is linear. Alternatively, the relationship is non-linear (e.g., logarithmic or exponential). In some embodiments, if the viewpoint elevation angle is higher than a threshold value, the yaw threshold is a first value, and if the viewpoint elevation angle is below the threshold value, the yaw threshold is a second value, different than the first value. Recentering the virtual content item in yaw according to a yaw threshold that is based on the viewpoint elevation of the user wherein the higher the viewpoint elevation the higher the yaw threshold, minimizes the number of inputs required to adjust the position of the virtual content and the number of inputs needed to correct undesired yaw adjustments made in response to the recentering input, thereby improving user-device interaction and conserving computing resources associated with the additional input that would otherwise be required to re-orient the virtual content.

In some embodiments, in response to detecting the recentering input, and in accordance with a determination that a current viewpoint yaw when the recentering input is detected has been rotated by a first amount relative to a baseline yaw, such as viewpoint yaw of the user 1808 in FIG. 18M, the computer system changes a position of the virtual content and the virtual environment based on the current viewpoint yaw, such as shown with the virtual environment 1806a and content 1802a in FIG. 18N. In some embodiments, the baseline yaw corresponds to the yaw at which the current view yaw is compared against to determine if the difference is greater or less than both an environment yaw threshold and/or a virtual content yaw threshold (described in further detail below). In some embodiments, when the current view yaw is detected as having rotated by an amount that greater than the environment yaw threshold and the content yaw threshold, in response to a recentering input, the computer system changes the position of the virtual content and the virtual environment based on the current viewpoint yaw.

In some embodiments, in accordance with a determination that the current viewpoint yaw when the recentering input is detected has been rotated by a second amount, different from the first amount, relative to the baseline yaw, such as shown in FIG. 18K, the computer system changes a position of the virtual content based on the current viewpoint yaw without changing the position of the virtual environment based on the current viewpoint yaw, such as shown with content 1802a and the virtual environment 1806 in FIG. 18L. In some embodiments, if the second amount of rotation is above the content yaw threshold but below the environment yaw threshold, then in response to a recentering input, the computer system changes the position of the virtual content but does not change the position of the virtual environment.

In some embodiments, in accordance with a determination that the current viewpoint yaw when the recentering input is detected has been rotated by a third amount, different from the first amount and the second amount, relative to the baseline yaw, such as shown in FIG. 18HI, the computer system forgoes changing a position of the virtual content based on the current viewpoint yaw and forgoes changing the position of the virtual environment based on the current viewpoint yaw, such as shown with respect to content 1802a and the virtual environment 1806 in FIG. 18J, wherein the first amount of rotation is greater than the second amount of rotation and the second amount of rotation is greater than the third amount of rotation. In some embodiments, if the third amount of rotation is below the content yaw threshold and below the environment yaw threshold, then in response to a recentering input, the computer system does not change the position of either the virtual content or the virtual environment. Recentering the virtual content item in yaw according to different yaw thresholds for the virtual environment and the virtual content, minimizes the number of inputs required to adjust the position of the virtual environment and the number of inputs needed to correct undesired yaw adjustments made in response to the recentering input, thereby improving user-device interaction and conserving computing resources associated with the additional input that would otherwise be required to re-orient the virtual content.

In some embodiments, the yaw threshold is a virtual content yaw threshold, such as threshold 1822 in FIG. 18H. In some embodiments, in response to detecting the recentering input, and in accordance with a determination that the viewpoint of the user of the computer system has a third viewpoint elevation angle (e.g., the same or different than each of the first and/or second value) relative to the frame of reference and that the viewpoint yaw relative to the virtual environment is above a first environment yaw threshold, different from the content yaw threshold, the computer system displays, via the one or more display generation components, the virtual environment at the target viewpoint yaw relative to the viewpoint of the user associated with the virtual environment, such as shown with the virtual environment 1806 in FIG. 18N.

In some embodiments, in response to detecting the recentering input, and in accordance with a determination that the viewpoint of the user of the computer system has the third viewpoint elevation angle (e.g., the same or different than each of the first and/or second value) relative to the frame of reference that the viewpoint yaw relative to the virtual environment is below the first environment yaw threshold, forgoing display of the first virtual content at the target viewpoint yaw relative to the viewpoint of the user associated with the virtual environment, such as shown with docked content 1802a in FIG. 18L. In some embodiments, the thresholds used by the computer system to determine whether to shift the virtual content is different for the viewpoint yaw with respect to the virtual content and the viewpoint yaw with respect to the virtual environment. Thus, in some embodiments, the virtual environment has an environment yaw threshold (e.g., 0°, 1°, 5°, 10°, 15°, 45°, or 90°) associated with the virtual environment, while the virtual content has a first virtual content yaw threshold (e.g., 0°, 1°, 5°, 10°, 15°, 45°, or 90°) associated with it. In some embodiments, the first environment yaw threshold and the first virtual content yaw threshold are based on the viewpoint elevation angle of the user. In some embodiments, the third view viewpoint elevation angle is within a range of elevation angles and/or is above or below an elevation angle threshold. Alternatively, the first environment yaw threshold and the first content yaw threshold are not based on the viewpoint elevation angle of the user. In some embodiments, the computer system determines the first environment yaw threshold and the first virtual content yaw threshold according to one or more processes described herein. In some embodiments, the computer system independently determines whether to shift the virtual environment based on a comparison to the virtual environment yaw threshold, and determines whether to shift the virtual content based on a comparison to the virtual content yaw threshold. Thus, in some embodiments, the computer system in response to a recentering input forgoes adjusting either of the yaw of the virtual content or the yaw of the environment, adjusts one but not the other, or adjusts both the yaw of the virtual content and the yaw of the environment based on a comparison to the respective yaw thresholds. In some embodiments, in the event that both the virtual content and the virtual environment are adjusted, the amount of adjustment is the same (e.g., thus keeping the placement of the virtual content within the virtual environment the same). Alternatively, the amount of adjust is different (e.g., such that the virtual content appears to be moving from the frame of reference of the virtual environment). Recentering the virtual content item in yaw according to different yaw thresholds for the virtual environment and the virtual content, minimizes the number of inputs required to adjust the position of the virtual environment and the number of inputs needed to correct undesired yaw adjustments made in response to the recentering input, thereby improving user-device interaction and conserving computing resources associated with the additional input that would otherwise be required to re-orient the virtual content.

In some embodiments, in response to detecting the recentering input, and in accordance with a determination that the viewpoint of the user of the computer system has a fourth viewpoint elevation angle (e.g., 1°, 5°, 10°, 20°, 45°, 75° or 90°) relative to the frame of reference, different from the third viewpoint elevation angle relative to the frame of reference and that the viewpoint yaw relative to the virtual environment is above the virtual content yaw threshold, such as shown in FIG. 18U with respect to threshold 1822 in accordance with viewpoint elevation angle illustrated in FIG. 18U, the computer system displays, via the one or more display generation components, the virtual environment at the target viewpoint yaw relative to the user associated with the virtual environment, such as shown in FIG. 18T. In some embodiments, in response to detecting (e.g., receiving) the recentering input, the computer system compares the viewpoint yaw of the user relative to the virtual environment to the common yaw threshold and adjusts the display of the virtual environment if it is determined that the viewpoint yaw of the user relative to the virtual environment exceeds the common yaw threshold. In some embodiments, the computer system adjusts the display of the virtual environment in accordance with the target viewpoint yaw associated with the virtual environment. In some embodiments, the computer system adjusts the display of the virtual environment in accordance with the viewpoint of the user such that the there is no yaw between the center of the viewpoint of the user and a center portion of the virtual environment.

In some embodiments, in response to detecting the recentering input, and in accordance with a determination that the viewpoint of the user of the computer system has the fourth viewpoint elevation angle relative to the frame of reference, different from the third viewpoint elevation angle relative to the frame of reference, such as the viewpoint elevation angle in FIG. 18U, and that the viewpoint yaw relative to the virtual environment is below the virtual content yaw threshold, such as in FIG. 18U, the computer system forgoes displaying the virtual environment at the target viewpoint yaw relative to the viewpoint of the user associated with the virtual environment, such as if a recentering input were applied in the example of FIG. 18U and in response the environment 1806 was not shifted even if the yaw of the user was not centered but was below threshold 1822. In some embodiments, in response to detecting (e.g., receiving) the recentering input, the computer system compares the viewpoint yaw of the user relative to the virtual environment to the common yaw threshold and adjusts the display of the virtual environment if it is determined that the viewpoint yaw of the user relative to the virtual environment exceeds the common yaw threshold. In some embodiments, the computer system adjusts the display of the virtual content in accordance with the target viewpoint yaw relative to the user associated with the virtual environment. For instance, when the virtual content is displayed within the virtual environment, and the recentering input is received, the computer system adjusts the display of the virtual content such that the yaw between a center of the viewpoint of the user and the center of the virtual content is at the target viewpoint yaw that is associated with the virtual environment. In some embodiments, the computer system adjusts the display of the virtual content in accordance with the viewpoint of the user such that the there is no yaw between the center of the viewpoint of the user and a center portion of the virtual content. Recentering the virtual content item and the virtual environment in yaw according to a common yaw threshold for the virtual environment and the virtual content, minimizes the number of inputs required to adjust the position of the virtual environment and the number of inputs needed to correct undesired yaw adjustments made in response to the recentering input, thereby improving user-device interaction and conserving computing resources associated with the additional input that would otherwise be required to re-orient the virtual content.

It should be understood that the particular order in which the operations in method 1900 have been described is merely exemplary and is not intended to indicate that the described order is the only order in which the operations could be performed. One of ordinary skill in the art would recognize various ways to reorder the operations described herein. In some embodiments, aspects/operations of method 1900 may be interchanged, substituted, and/or added between these methods. For example, various object manipulation techniques and/or object movement techniques of method 1900 is optionally interchanged, substituted, and/or added between these methods. For brevity, these details are not repeated here.

FIGS. 20A-20H illustrate examples of a computer system determining clusters of virtual objects and restoring virtual objects after a reboot event in accordance with some embodiments.

Figure 20A:
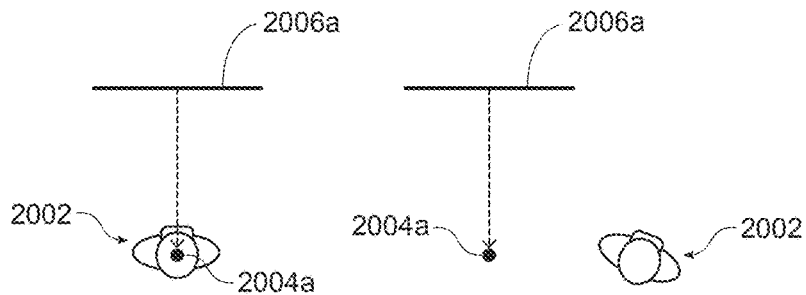
FIGS. 20A-20H illustrate examples of a computer system determining clusters of virtual objects and restoring virtual objects after a reboot event in accordance with some embodiments.

FIGS. 20A-20H illustrates example top-down views of an environment that is visible via a display generation component of a computer system (e.g., a computer system 101 as described with reference to method 2100). In particular, FIG. 20A illustrates how the computer system determines a viewing origin for a virtual object. When a virtual object (e.g., a user interface of an application, or an application window) is launched (e.g., initially displayed) or repositioned in the environment, the computer system optionally determines and/or saves the viewing origin of the placement of the virtual object. For example, on the left side of FIG. 20A, the user has launched and/or placed virtual object 2006a at a location relative to the viewpoint 2002 of the user in the environment, as shown. The computer system has identified viewing origin 2004a (e.g., the location in the environment at which the viewpoint 2002 of the user was located when the user last launched and/or positioned virtual object 2006a in the environment) as shown on the left side of FIG. 20A. Thus, if the viewpoint 2002 of the user changes subsequent to the placement of virtual object 2006a, as shown on the right side of FIG. 20A, the viewing origin 2004a remains at the same location in the environment as it had on the left side of FIG. 20A. If the computer system detects the user provide input for moving virtual object 2006a on the right side of FIG. 20A, the computer system would optionally update the viewing origin 2004a of virtual object 2006*a* to be the location in the environment at which the viewpoint 2002 of the user is located on the right side of FIG. 20A.

Figure 20B:
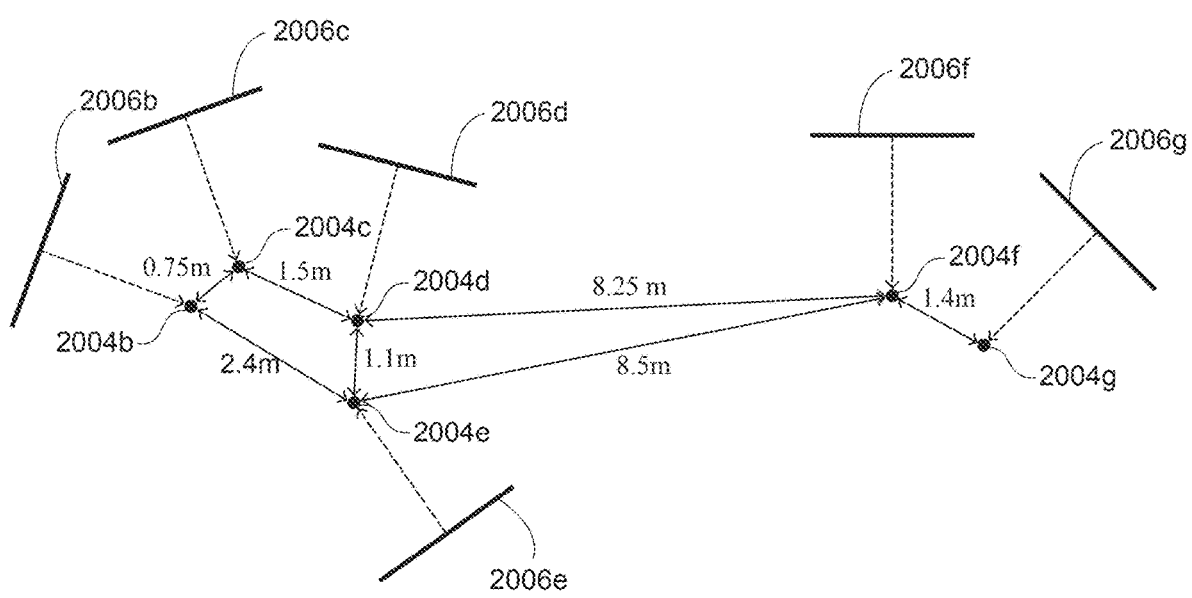
Figure 21:
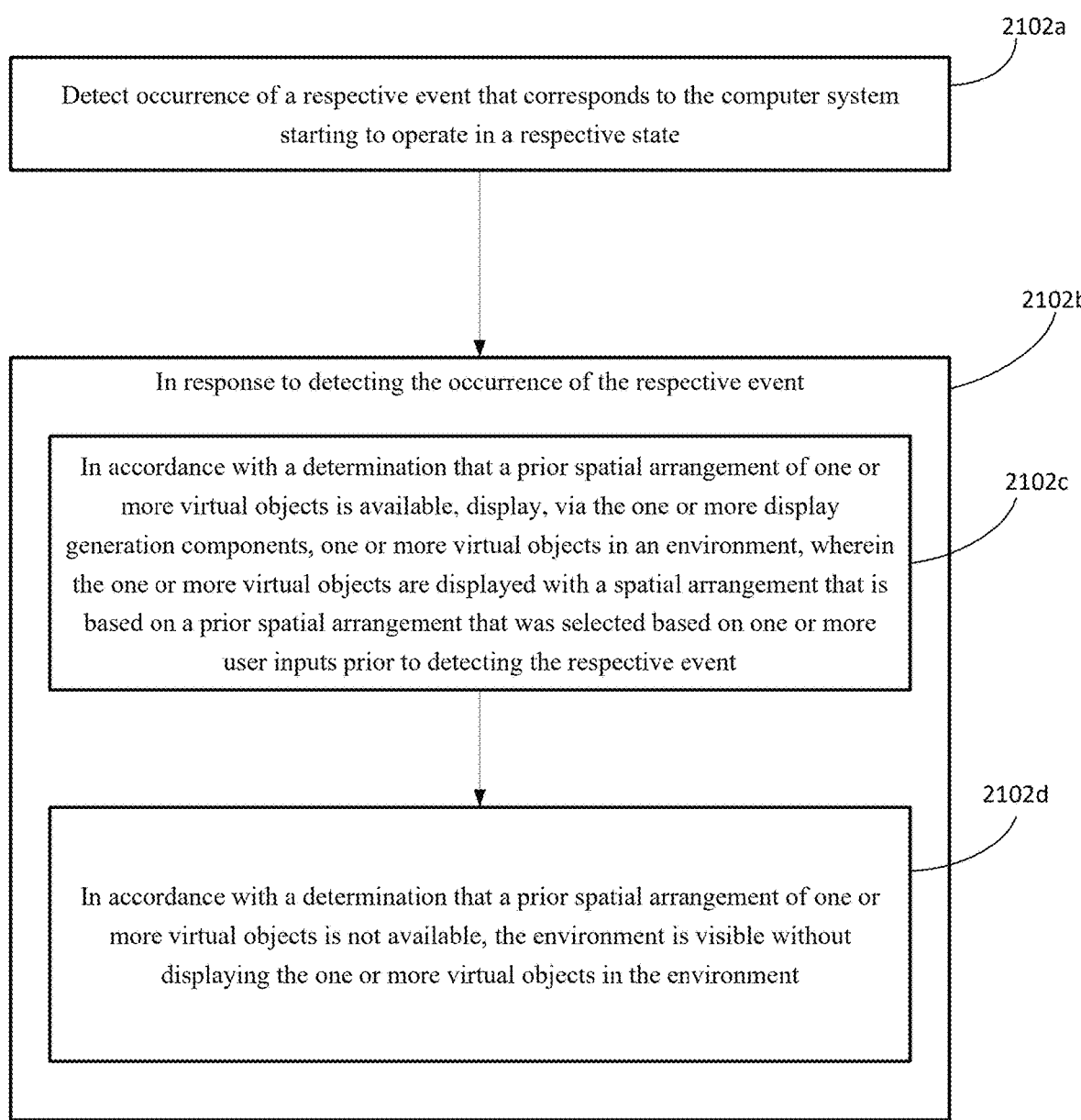
FIG. 21 is a flowchart illustrating an exemplary method of determining clusters of virtual objects and restoring virtual objects after a reboot event in accordance with some embodiments.

FIG. 20B illustrates how the computer system identifies clusters of virtual objects in accordance with some embodiments. The computer system optionally determined viewing origins for the different virtual objects that are located within the environment in the manner described with reference to FIG. 20A. For example, in FIG. 20B, the environment includes virtual objects 2006*b*-2006*g*, with corresponding viewing origins 2004*b*-2004*g*. To identify how many clusters of virtual objects are included in the environment, and to identify which virtual objects are clustered together, the computer system optionally compares the locations of the viewing origins 2004*b*-2004*g* of the virtual objects 2006*b*-2006*g* to each other, and assigns virtual objects to the same cluster when the viewing origins for those virtual objects are within a threshold distance of one another (e.g., 0.1, 0.3, 0.5, 1, 3, 5 or 10 meters). Two or more virtual objects can be identified as being part of the same cluster even if the corresponding viewing origins are not within the above threshold distance of one another if the two or more virtual objects have viewing origins that are within the threshold distance of another, intervening, viewing origin of another virtual object.

For example, in FIG. 20B, virtual objects 2006*b*, 2006*c*, 2006*d* and 2006*e* have been identified by the computer system as being part of the same cluster, because viewing origins 2004*b*, 2004*c*, 2004*d* and 2004*c* are within the above threshold distance of one another (e.g., 2 meters in the example of FIG. 20B), or are within the above threshold distance of another, intervening, viewing origin of another virtual object. For example, viewing origin 2004*e* of virtual object 2006*e*, while not being within the above threshold distance of viewing origin 2004*b* of virtual object 2006*b*, is within the above threshold distance of viewing origin 2004*d*, which is within the above threshold distance of viewing origin 2004*c*, which is within the above threshold distance of viewing origin 2004*b*. On the other hand, virtual objects 2006*f* and 2006*g* have viewing origins 2004*f* and 2004*g* that are not within the above threshold distance of viewing origins 2004*b*, 2004*c*, 2004*d* and 2004*e*, but are within the above threshold distance of each other. Therefore, computer system has identified virtual objects 2006*f* and 2006*g* as belonging to a cluster of virtual objects, different from the cluster of virtual object to which virtual objects 2006*b*, 2006*c*, 2006*d* and 2006*c* belong.

As mentioned previously, virtual objects can be clustered together with other virtual objects by virtue of intervening viewing origins being within the above threshold distance of the viewing origins of the virtual objects. For example, in FIG. 20C, virtual objects 2006*h*, 2006*i*, 2006*j*, 2006*k* and 20061 have been identified by the computer system as belonging to the same cluster, because the corresponding viewing origins 2004*h*, 2004*i*, 2004*j*, 2004*k* and 20041 are within the above threshold distance of at least one other viewing origin of the virtual objects within the cluster.

Figure 20C:
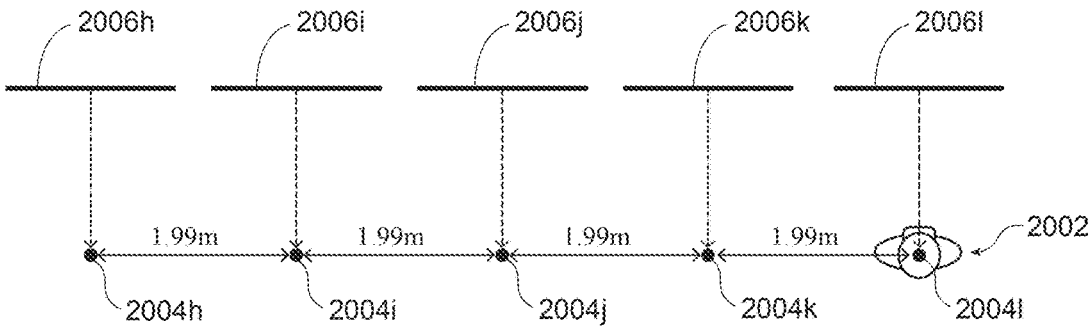

The cluster calculations described with reference to FIGS. 20A-20C are optionally performed by the computer system every time a virtual object is launched, repositioned or closed. Based on such cluster calculations, the computer system determines a primary cluster at the time the reboot event is detected, and as will be described in more detail with reference to FIGS. 20E-20H, the computer system restores display of the primary clusters of virtual objects without restoring the display of other clusters of virtual objects after the computer system has completed its rebooting process. The primary cluster is optionally determined to be the cluster of virtual objects whose average viewing origin location (e.g., the average location of all of the viewing origins of the virtual objects included in a cluster) is closest to the viewpoint 2002 of the user at the time the reboot event is detected. For example, in FIG. 20D having the virtual objects and viewing origins of FIG. 20B, the viewpoint 2002 of the user, at the time of detecting the reboot event, is closer to the average viewing origin 2040*a* of the cluster including virtual objects 2006*f* and 2006*g* than the average viewing origin 2040*b* of the cluster including virtual objects 2006*b*, 2006*c*, 2006*d*, and 2006*c*. Therefore, the computer system optionally identifies the cluster including virtual objects 2006*f* and 2006*g* as the primary cluster of virtual objects, and upon completion of the reboot process for the computer system, will restore display of virtual objects 2006*f* and 2006*g*, and will not restore display of virtual objects 2006*b*, 2006*c*, 2006*d*, and 2006*c*.

FIGS. 20E-20H illustrate how the computer system restores display of the primary cluster of virtual objects, as identified above, after and/or as part of the reboot process in accordance with some embodiments. In the left side of FIG. 20E, the user has provided input to place virtual object 2006*a* in the environment as shown. In some embodiments, each time a virtual object is launched, repositioned, resized, or closed, the computer system determines (e.g., for multiple virtual objects in environment, for each virtual object in environment, for multiple virtual objects that are visible from viewpoint 2002 of the user, or for each virtual object that is visible from viewpoint 2002 of the user) the relative position and/or orientation of the virtual objects relative to the settled body pose of the user and/or the relative position and/or orientation of the viewing origins relative to the settled body pose of the user. The settled body pose of the user optionally corresponds to the location of the viewpoint of the user, and the orientation of the torso of the user. The settled body pose of the user optionally does not correspond to a head orientation of the user. The computer system optionally determines that the body pose of the user is settled if a set of conditions including one or more of: [Condition A] the body (e.g., torso) orientation changes less than a threshold amount (e.g., 2, 5, 10, 15, 35, 60, or 90 degrees) away from the settled body orientation; [Condition B] the body position (e.g., viewpoint 2002 position) changes less than a threshold amount (e.g., 0.1, 0.3, 0.5, 1, 3, 5 or 10 meters) away from the settled body position; [Condition C] the body (e.g., torso) orientation changes less than a threshold amount (e.g., 0.5, 1, 3, 5, 10, 20, or 50 degrees) during a threshold duration (e.g., 0.01, 0.02, 0.05, 0.1, 0.3, 0.5, 1, or 3 seconds); and/or [Condition D] the body position (e.g., viewpoint 2002 position) changes less than a threshold amount (e.g., 0.005, 0.01, 0.03, 0.05, 0.1, 0.5, or 1 cm) during a threshold duration (e.g., 0.001, 0.003, 0.005, 0.01, 0.03, 0.05, 0.1 or 0.5 seconds). If any of the above are not satisfied, the computer system optionally determines that the body pose of the user is not settled. In some embodiments, if Condition A or Condition B are not satisfied, the computer system determines that the body pose of the user is no longer settled (optionally independent of whether or not Condition C and/or Condition D are satisfied). In some embodiments, while the body pose of the user is not settled, if Condition C and Condition D are satisfied (optionally independent of whether or not Condition A and/or Condition B are satisfied), the computer system determines that the body pose of the user is settled—otherwise, it optionally does not determine that the body pose of the user is settled.

Figure 20D:
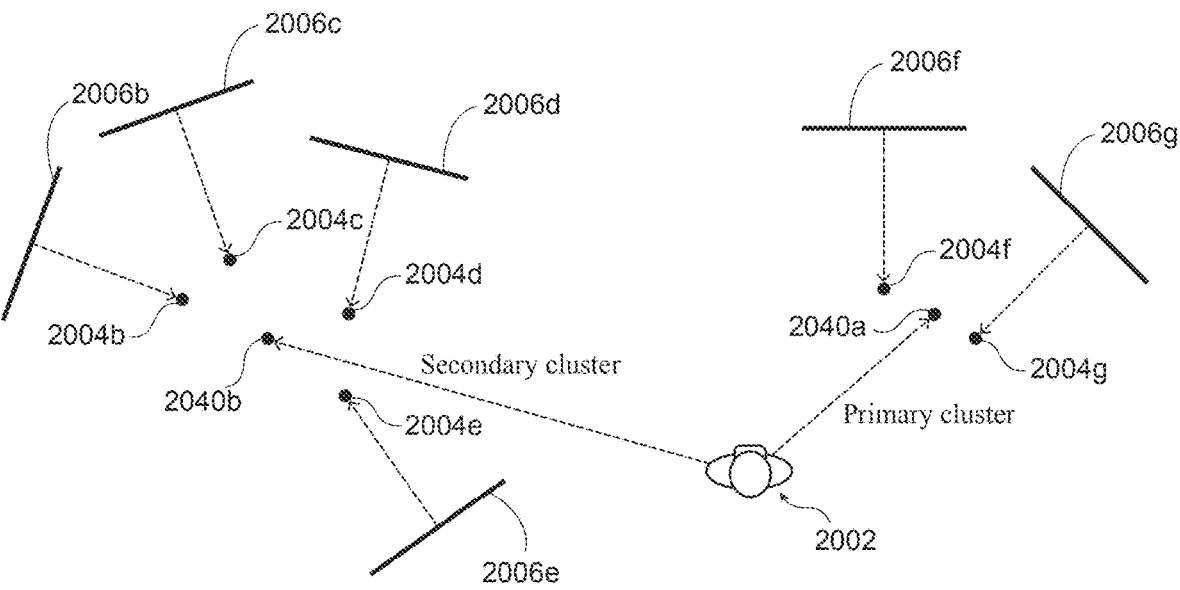
Figure 20E:
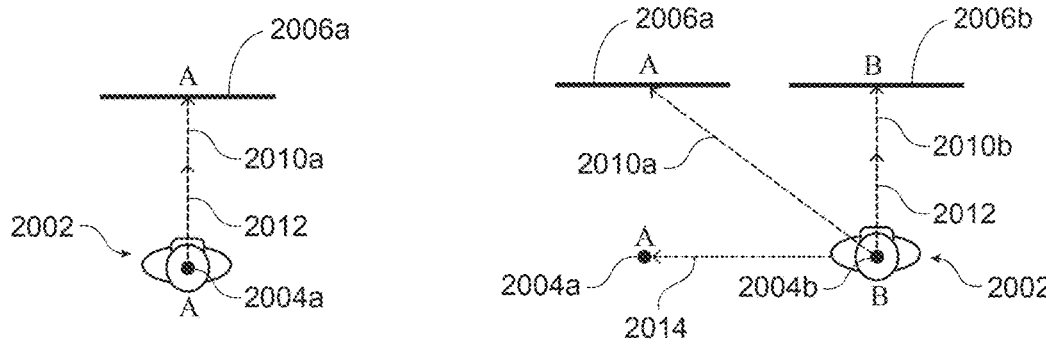

In the left side of FIG. 20E, the computer system has determined the relative position and/or orientation of virtual object 2006a, having viewing origin 2004a, relative to the settled body pose of the user, and the relative position and/or orientation of viewing origin 2004a relative to the settled body pose of the user (e.g., in the left side of FIG. 20E, the viewing origin 2004a and the settled body pose of the user are coincident). The relative position and/or orientation of virtual object 2006a relative to the settled body pose of the user is represented in the left side of FIG. 20E by a vector 2010a from the location of the viewpoint 2002 of the user to a reference point on virtual object 2006a, such as the center of virtual object 2006a. The settled body pose of the user is represented in the left side of FIG. 20E as a vector that originates at the location of the viewpoint 2002 of the user, and extends away from that location at an angle corresponding to the angle of the torso of the user.

In the right side of FIG. 20E, the computer system detects that the viewpoint 2002 of the user has moved to the right, and that the user has provided input to the computer system to launch and/or display virtual object 2006b (in addition to virtual object 2006a) in the environment. As previously described, the computer system determines (e.g., for multiple virtual objects in the environment, for each virtual object in environment, for multiple virtual objects visible from viewpoint 2002 of the user, or for each virtual object that is visible from viewpoint 2002 of the user) the relative position and/or orientation of the virtual objects relative to the settled body pose of the user and/or the relative position and/or orientation of the viewing origins relative to the settled body pose of the user. For example, in the right side of FIG. 20E, the computer system has determined: the relative position and/or orientation of virtual object 2006a, having viewing origin 2004a, relative to the settled body pose of the user (represented by vector 2010a relative to vector 2012); the relative position and/or orientation of virtual object 2006b, having viewing origin 2004b, relative to the settled body pose of the user (represented by vector 2010b relative to vector 2012); the relative position and/or orientation of viewing origin 2004a relative to the settled body pose of the user (represented by vector 2014 relative to vector 2012); and/or the relative position and/or orientation of viewing origin 2004b relative to the settled body pose of the user (in the right side of FIG. 20E, the viewing origin 2004b and the settled body pose of the user are coincident).

Figure 20F:
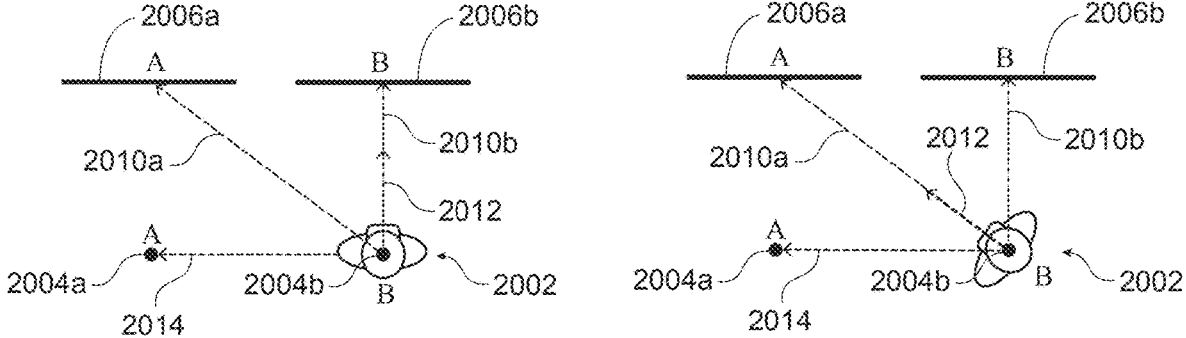

As described previously, if the computer system detects that the settled body pose of the user changes (e.g., is no longer settled, and then subsequently becomes settled again), the computer system optionally determines updated relative positions and/or orientations of the virtual objects relative to the settled body pose of the user and/or updated relative positions and/or orientations of the viewing origins relative to the settled body pose of the user. For example, the left side of FIG. 20F illustrates the scenario previously described with reference to the right side of FIG. 20E. From the left side of FIG. 20F to the right side of FIG. 20F, the computer system detects that the settled body pose 2012 of the user has changed, as shown. In response to this changing of the settled body pose 2012 of the user, the computer system optionally determined updates for the following in the right side of FIG. 20F: the relative position and/or orientation of virtual object 2006a, having viewing origin 2004a, relative to the settled body pose of the user (represented by vector 2010a relative to vector 2012); the relative position and/or orientation of virtual object 2006b, having viewing origin 2004b, relative to the settled body pose of the user (represented by vector 2010b relative to vector 2012);

the relative position and/or orientation of viewing origin 2004a relative to the settled body pose of the user (represented by vector 2014 relative to vector 2012); and/or the relative position and/or orientation of viewing origin 2004b relative to the settled body pose of the user (e.g., in the right side of FIG. 20F, the viewing origin 2004b and the settled body pose of the user are coincident).

Figure 20G:
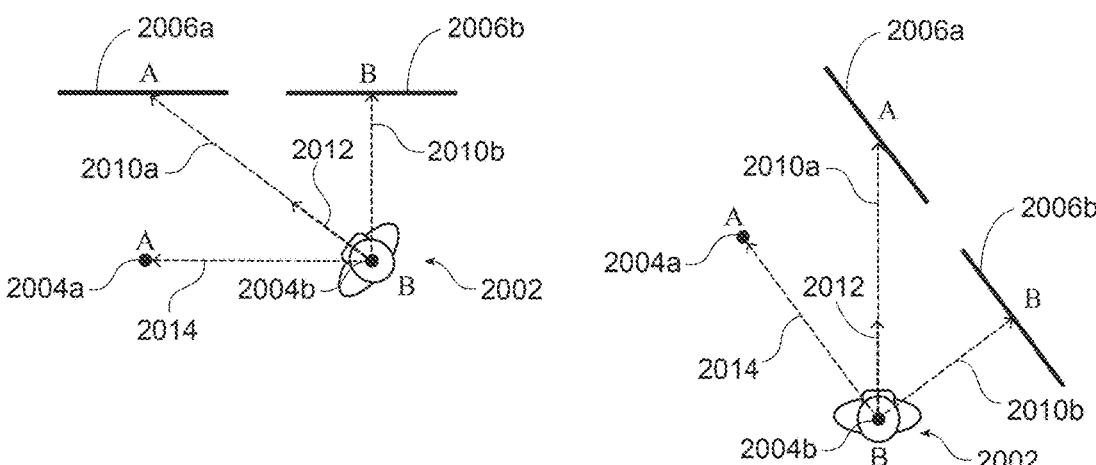

When the computer system restores display of the primary cluster of virtual objects, the computer system optionally restores the display of those virtual objects based on the above-determined relative positions and/or orientations of the virtual objects relative to the settled body pose of the user and/or relative positions and/or orientations of the viewing origins relative to the settled body pose of the user, which are optionally the last-determined versions of such information prior to detecting the reboot event. For example, the left side of FIG. 20G illustrates the scenario previously described with reference to the right side of FIG. 20F, and corresponds to the last-determined relative positions and/or orientations of the virtual objects in the primary cluster relative to the settled body pose of the user and/or relative positions and/or orientations of the corresponding viewing origins relative to the settled body pose of the user prior to detecting the reboot event. During or after completion of the reboot process, as shown on the right side of FIG. 20G, the computer system restores the virtual objects 2006a and 2006b in the environment that is visible via the computer system such that: the relative positions and/or orientations of virtual objects 2006a and 2006b relative to the current settled body pose 2012 of the user (e.g., in the right side of FIG. 20G) match the last-determined relative positions and/or orientations of virtual objects 2006a and 2006b relative to the prior settled body pose 2012 of the user (e.g., in the left side of FIG. 20G); and/or the relative positions and/or orientations of viewing origins 2004a and 2004b relative to the current settled body pose 2012 of the user (e.g., in the right side of FIG. 20G) match the last-determined relative positions and/or orientations of viewing origins 2004a and 2004b relative to the prior settled body pose 2012 of the user (e.g., in the left side of FIG. 20G).

Figure 20H:
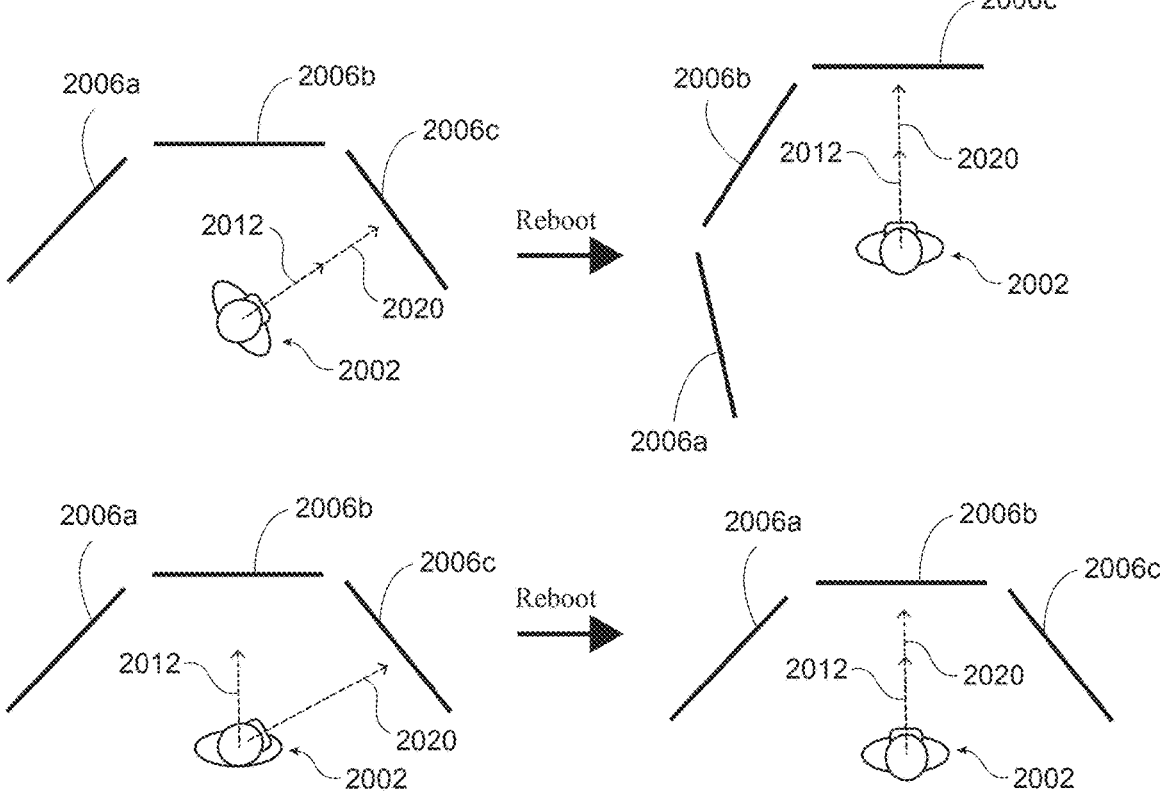

FIG. 20H illustrates how the above-described determinations of the relative positions and/or orientations of virtual objects and viewing origins are relative to a body pose that is based on the torso of the user rather than a head of the user. For example, the top portion of FIG. 20H illustrates an example scenario of how a pre-reboot configuration of virtual objects 2006a, 2006b and 2006c is restored after the reboot, where the settled body pose 2012 of the user matches the head direction 2020 of the user, both before the reboot and after the reboot. In such a scenario, the virtual objects 2006a, 2006b and 2006c are optionally restored in the manner described with reference to FIGS. 20E-20G. The bottom portion of FIG. 20H illustrates an example scenario of how a pre-reboot configuration of virtual objects 2006a, 2006b and 2006c is restored after the reboot, where the settled body pose 2012 of the user does not match the head direction 2020 of the user before the reboot. Before the reboot, the settled body pose 2012 of the user is directed toward virtual object 2006b, while the head direction 2020 of the user is directed toward virtual object 2006c. After the reboot, the computer system restores display of virtual objects 2006a, 2006b and 2006c in the manner described with reference to FIGS. 20E-20G such that the current settled body pose 2012 of the user is directed to the restored virtual object 2006b (as before the reboot), even though the head direction 2020 of the user ends up not being directed toward restored virtual object 2006c. Thus, as described previously, the computer system optionally determines the relative positions and/or orientations of virtual objects and viewing origins relative to a body pose (e.g., but not a head pose) of the user, and similarly restores display of the virtual objects such that the relative positions and/or orientations of the restored virtual objects and corresponding viewing origins are relative to a body pose (e.g., but not a head pose) of the user. The head pose of the user is optionally ignored by the computer system in the operations described with reference to FIGS. 20A-20G.

FIG. 21 is a flowchart illustrating an exemplary method 2100 of restoring display of virtual objects after detecting particular events in accordance with some embodiments. In some embodiments, the method 2100 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 2100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2100 are, optionally, combined and/or the order of some operations is, optionally, changed.

In some embodiments, method 2100 is performed at a computer system that is in communication with one or more input devices and one or more display generation components, such as the computer system described with reference to FIGS. 20A-20H. In some embodiments, the computer system, the one or more input devices, and/or the one or more display generation components have one or more of the characteristics of the computer systems, the one or more input devices, and/or the one or more display generation components of methods 800, 1000, 1200, 1300, 1500, 1700 and/or 1900.

In some embodiments, the computer system detects (2102a) occurrence of a respective event (e.g., a restart, reboot, unlock, and/or initialization event) that corresponds to the computer system starting to operate in a respective state (e.g., a user interaction state that it was not operating in immediately prior to detecting the respective event, because the device was off or rebooting), such as the reboot event described with reference to FIG. 20G between the left side of FIG. 20G and the right side of FIG. 20G. In some embodiments, in response to detecting the occurrence of the respective event (2102b), in accordance with a determination that a prior spatial arrangement of one or more virtual objects is available, such as the case in FIG. 20G, the computer system displays (2102c), via the one or more display generation components, one or more virtual objects (e.g., multiple windows and/or application volumes, such as the virtual objects described with reference to methods 800, 1000, 1200, 1300, 1500, 1700 and/or 1900) in an environment (e.g., a virtual environment, a virtual representation of a physical space sometimes referred to as optical passthrough, or optical passthrough of a physical environment that surrounds the user, such as the environments described with reference to methods 800, 1000, 1200, 1300, 1500, 1700 and/or 1900), wherein the one or more virtual objects are displayed with a spatial arrangement that is based on a prior spatial arrangement that was selected based on one or more user inputs (e.g., virtual object placement inputs and/or virtual object movement inputs) prior to detecting the respective event, such as shown in the right side of FIG. 20G (e.g., prior to rebooting, turning off, or powering down the computer system). In some embodiments, the one or more virtual objects had the prior spatial arrangement (or were otherwise associated with that prior spatial arrangement) at the moment the computer system started a process to reboot, started a process to turn off, or started a process to power down. In some embodiments, the spatial arrangement and/or the prior spatial arrangement are relative to a viewpoint of a user of the computer system and/or relative to the environment. In some embodiments, a spatial arrangement includes position and/or orientation of the virtual objects, optionally relative to each other (and/or relative to a viewpoint of a user of the computer system and/or relative to the environment).

In some embodiments, in response to detecting the occurrence of the respective event (2102b), in accordance with a determination that a prior spatial arrangement of one or more virtual objects is not available, the environment is visible without displaying the one or more virtual objects in the environment (2102d) (e.g., the computer system makes the environment visible without displaying the one or more virtual objects in the environment).

In some embodiments, the spatial arrangement was saved before the respective event was detected based on the satisfaction of automatic criteria for saving the spatial arrangement, such as movement of the viewpoint of the user and/or movement of the virtual objects as described with reference to FIGS. 20A and 20E-20F. For example, the spatial arrangement is saved periodically, optionally at fixed or dynamic intervals such as every 1, 2, 3, 5, 10, 15, 30, or 60 seconds.

In some embodiments, the spatial arrangement was saved before the respective event was detected based on one or more user inputs directed to one or more of the virtual objects that were displayed in the environment (or a different environment) prior to the occurrence of the respective event, such as the input described with reference to FIGS. 20E-20F. For example, the one or more user inputs correspond to the opening or placement of a virtual object, the removal of a virtual object, the movement of a virtual object, the resizing of a virtual object, and/or a change in input focus order between two or more of the virtual objects. In some embodiments, where there are multiple virtual objects, the spatial arrangement specifics a spatial arrangement of the virtual objects relative to each other.

In some embodiments, the spatial arrangement of the one or more virtual objects specifies a position of one or more of the virtual objects in three dimensions (e.g., relative to a viewpoint of the user and/or relative to each other), such as describing the spatial arrangement of virtual objects 2006a and 2006b in FIGS. 20E-20G in three dimensions. In some embodiments, the three dimensions are specified in cartesian coordinates (e.g., x, y, and z), spherical coordinates (e.g., radius, polar angle $\theta$ of the radial line r, and the azimuthal angle $\varphi$ of the radial line), cylindrical coordinates (e.g., height, longitudinal position, and axial position), or another three-dimensional coordinate system.

In some embodiments, the spatial arrangement of the one or more virtual objects specifies a value of one or more non-positional parameters such as size, orientation, dynamic scale, and/or focus order of the one or more objects, such as the size, orientation, dynamic scale, and/or focus order of virtual objects 2006a and 2006b in FIGS. 20E-20G. In some embodiments, where there are multiple virtual objects, the spatial arrangement specifies a size, orientation, dynamic scale, and/or focus order spatial arrangement of the virtual objects relative to each other. In some embodiments, the dynamic scale of a virtual object corresponds to the ideal or computer system-defined size the virtual object should have at its current distance from the viewpoint of the user. In some embodiments, the computer system does not update the virtual object to have its dynamic scale unless and until user interaction with the virtual object is detected (e.g., user input selecting and/or moving the virtual object); in response to detecting such user interaction, the computer system optionally updates the virtual object to have its dynamic scale. In some embodiments, focus orders define whether a first virtual object is going to be displayed over or through a second virtual object, where the first and second virtual objects overlap with each other from the viewpoint of the user, independent of which virtual object is further from the viewpoint of the user. For example, if the first virtual object is further from the viewpoint of the user than the second virtual object, and the first virtual object has a higher focus order than the second virtual object, the computer system optionally displays the first virtual object through the second virtual object (e.g., increases the transparency of one or more portions of the second virtual object so that the first virtual object is visible through those one or more portions of the second virtual object). In contrast, if the second virtual object has the higher focus order than the first virtual object, the computer system optionally does not display the first virtual object through the second virtual object (e.g., does not increase the transparency of one or more portions of the second virtual object), and the second virtual object is displayed as at least partially obscuring the first virtual object. The focus order of a virtual object is higher the more recently the user has interacted with that virtual object (e.g., the more recently the user has directed attention and/or air gestures to that virtual object).

In some embodiments, in response to detecting the occurrence of the respective event, in accordance with a determination that a prior spatial arrangement of one or more virtual objects is not available, such as if in FIG. 20G, the prior spatial arrangement of virtual objects 2006a and 2006b was not available, the computer system displays, via the one or more display generation component, a system user interface in the environment, wherein the system user interface includes one or more affordances for performing a system function. In some embodiments, the system user interface is a home screen user interface that includes one or more application icons, one or more contact affordances corresponding to different people, and/or one or more virtual environment affordances that correspond to different virtual environments.

In some embodiments, while displaying the system user interface, the computer system detects, via the one or more input devices, a set of one or more inputs corresponding to selection of a respective affordance (e.g., an air pinch or air tap gesture while attention of the user is directed toward the respective affordance).

In some embodiments, in response to detecting the set of one or more inputs corresponding to selection of a respective affordance, the computer system performs an operation corresponding to the respective affordance (e.g., opening an application, initiating a communication session, displaying one or more options for initiating a communication session, displaying a virtual environment that replaces at least a portion of a representation of a physical environment surrounding the user). In some embodiments, one or more virtual objects are displayed in response to selection of the respective affordance. In some embodiments, these one or more virtual objects are partially or fully the same as the one or more virtual objects that are displayed in accordance with the determination that the prior spatial arrangement of one or more virtual objects is available-however, the one or more virtual objects displayed in response to selection of the respective affordance are optionally displayed with a different spatial arrangement.

In some embodiments, a spatial arrangement of one or more virtual objects is made available in response to detecting occurrence of the respective event (e.g., at the movement the computer system started a process to reboot, started a process to turn off, or started a process to power down) when (or in accordance with a determination that) at least one virtual object in the spatial arrangement of virtual objects (e.g., the prior spatial arrangement of virtual object) meets proximity criteria, such as the proximity criteria described with reference to FIGS. 20B-20D. In some embodiments, a spatial arrangement of one or more virtual objects is made not available in response to detecting occurrence of the respective event when (or in accordance with a determination that) there are no virtual objects that meet the proximity criteria (e.g., none of the virtual objects having the prior spatial arrangement when detection of the occurrence of the respective event occurred meets the proximity criteria), such as if, in FIG. 20D, none of the clusters of windows met the proximity criteria. In some embodiments, the evaluation of whether or not the proximity criteria are met is made when the computer system determines whether or not to save the spatial arrangement of the one or more virtual objects (e.g., before occurrence of the event). In some embodiments, the evaluation of whether or not the proximity criteria are met is made when the computer system determines whether or not to display one or more virtual objects (e.g., multiple windows and/or application volumes) in an environment with a spatial arrangement that is based on a prior spatial arrangement of the virtual objects (e.g., after occurrence of the event). In some embodiments, the proximity criteria include a distance requirement that a respective virtual object is within a threshold distance (e.g., 5, 7, 10, 15, 20, 50, or 100 meters) from the viewpoint of the user in order for the respective virtual object to meet the proximity criteria. In some embodiments, the proximity criteria include a direction requirement that a respective virtual object is within a threshold direction (e.g., 5, 10, 20, 45, 90, or 135 degrees) from a direction of the viewpoint of the user in order for the respective virtual object to meet the proximity criteria. In some embodiments, the proximity criteria include both a direction requirement (e.g., as previously described) and a distance requirement (e.g., as previously described) in order for the respective virtual object to meet the proximity criteria.

In some embodiments, the prior spatial arrangement of virtual objects includes a first set of virtual objects, such as the virtual objects 2006b-2006g in FIG. 20D, and the one or more virtual objects that are displayed in the environment in response to occurrence of the respective event and in accordance with the determination that the prior spatial arrangement of one or more virtual objects is available is a second set of virtual objects that includes less than all of the first set of virtual objects, such as only restoring virtual objects 2006f and 2006g as described with reference to FIG. 20D.

In some embodiments, the first set of virtual objects includes multiple clusters of one or more virtual objects, such as the multiple clusters of virtual objects in FIGS. 20B and 20D, including a first cluster of one or more virtual objects that was last interacted with (e.g., prior to the respective event) at a first time, and a second cluster of one or more virtual objects that was last interacted with (e.g., prior to the respective event) at a second time that is different from the first time, and displaying the second set of virtual objects includes, in accordance with a determination that the second time is more recent than the first time, displaying the second cluster of virtual objects without displaying the first cluster of virtual objects (e.g., the first cluster of objects are not restored on reboot when the second cluster was more or most recently interacted with), such as in FIG. 20D, if the cluster of virtual objects on the right side of FIG. 20D was last interacted with more recently than the virtual objects on the left side of FIG. 20D. In some embodiments, displaying the second set of virtual objects includes, in accordance with a determination that the first time is more recent than the second time, displaying the first cluster of virtual objects without displaying the second cluster of virtual objects (e.g., the second cluster of objects are not restored on reboot when the first cluster was more or most recently interacted with).

In some embodiments, the computer system detects, via the one or more input devices, a recentering input (e.g., a verbal input, an air gesture, or a button press input such as a long press of a rotatable input element). In some embodiments, the recentering input has one or more of the characteristics of the recentering inputs of methods 1700 and/or 1900. In some embodiments, in response to detecting the recentering input, in accordance with a determination that the recentering input was detected before the respective event was detected, the computer system moves the first cluster of virtual objects relative to the second cluster of virtual objects and displays (optionally in the environment or in a different environment) the first cluster of virtual objects concurrently with the second cluster of virtual objects so that they are visible from the viewpoint of the user, such as moving the left side clusters and the right side clusters of virtual objects in FIG. 20B. In some embodiments, in response to detecting the recentering input, in accordance with a determination that the recentering input was detected after the respective event was detected, the computer system displays, in the environment, the second cluster of virtual objects so that they are visible from the viewpoint of the user without displaying the first cluster of virtual objects concurrently with the second cluster of virtual objects (e.g., because the first cluster of virtual objects were closed and not restored during the reboot operation).

In some embodiments, the second set of virtual objects includes multiple virtual objects (e.g., multiple windows and/or application volumes), such as virtual objects 2006f and 2006g in FIG. 20D.

In some embodiments, the virtual objects in the first set of virtual objects are grouped into one or more clusters, such as the clusters of virtual objects shown in FIGS. 20B and 20D, and assignment of a virtual object to a cluster is based on a position of a viewpoint of the user when the object was placed in the environment (e.g., when the object was initially placed or when the object was moved or last moved to a new placement location in the environment prior to detecting the respective event), such as the clustering being based on the viewing origins 2004b-2004g as described with reference to FIGS. 20A and 20B.

In some embodiments, while the first set of virtual objects are in the environment (or a different environment), the computer system detects, via the one or more input devices, a set of one or more inputs corresponding to a request to place a first virtual object in the environment, such as the inputs described with reference to FIG. 20A (e.g., an app launch, window placement, window move, application vol-ume placement or application volume move input such as an air gesture directed toward an application window or application volume or an air gesture such as an air tap or air pinch directed toward an application launch affordance).

In some embodiments, in response to detecting, via the one or more input devices, the set of one or more inputs corresponding to the request to place the first virtual object in the environment, the computer system places the first virtual object in the environment at a location determined by the user, such as with the placement of the virtual objects in FIGS. 20A and 20B (e.g., at a location determined based on a location of a viewpoint of the user when the object was placed and/or a location determined based on a placement input from the user such as an air pinch and drag gesture). In some embodiments, placing the first virtual object in the environment includes, in accordance with a determination that the viewpoint of the user is less than a threshold distance (e.g., 0.25, 0.5, 1, 2, 4, 5, or 10 meters) from a former viewpoint of the user that is associated with a respective virtual object in a respective cluster of virtual objects (e.g., the viewpoint of the user was located at the former viewpoint of the user when the respective virtual object was last placed, as described above, in the environment or a different environment), associating the first virtual object with the respective cluster of virtual objects, such as associating virtual object 2006e in FIG. 20B with the left cluster of virtual objects, in accordance with a determination that the viewpoint of the user is more than the threshold distance from the former viewpoint of the user that is associated with the respective virtual object in the respective cluster of virtual objects, such as with respect to virtual object 2006f in FIG. 20B relative to the left cluster of virtual objects in FIG. 20B, forgoing associating the first virtual object with the respective cluster of virtual objects, such as not associating virtual object 2006f in FIG. 20B with the left cluster of virtual objects in FIG. 20B. For example, the associating includes associating the first virtual object with a different cluster of virtual objects if the viewpoint of the user, when placing the first virtual object, is within the threshold distance of a former viewpoint of the user that is associated with a virtual object in the different cluster of virtual objects, or creating a new cluster of virtual objects if the viewpoint of the user when placing the first virtual object is not within the threshold distance of a former viewpoint of the user that is associated with any other virtual object or any other virtual object in the first set of virtual objects.

In some embodiments, the respective cluster includes multiple virtual objects that are included in the respective cluster based on a corresponding former viewpoint of the user (e.g., a former viewpoint of the user from which the corresponding virtual object was last placed in the environment or a different environment, as described previously) being less than the threshold distance from at least one other corresponding former viewpoint of the user (e.g., corresponding to another virtual object of the multiple virtual objects) for at least one other virtual object in the respective cluster, such as described with reference to the clustering of virtual objects in FIGS. 20B-20C. In some embodiments, the former viewpoint of the user corresponds to a different viewpoint relative to the same physical environment as the current viewpoint (e.g., a different location in the same room), or corresponds to a different physical environment than the current viewpoint (e.g., different room of a house, or different geographic location).

In some embodiments, displaying the one or more virtual objects with the spatial arrangement that is based on the prior spatial arrangement that was selected based on one or more user inputs prior to detecting the respective event includes, in accordance with a determination that a representative virtual object in the one or more virtual objects had a first orientation relative to a viewpoint of the user before detecting the respective event, such as the orientations of virtual objects 2006*a* and 2006*b* described with reference to FIGS. 20E-20F, displaying the one or more virtual objects so that the representative virtual object has the first orientation relative to the viewpoint of the user after detecting the respective event, such as described with reference to the right side of FIG. 20G, and in accordance with a determination that the representative virtual object in the one or more virtual objects had a second orientation relative to the viewpoint of the user before detecting the respective event, such as the orientations of virtual objects 2006*a* and 2006*b* described with reference to FIGS. 20E-20F, displaying the one or more virtual objects so that the representative virtual object has the second orientation relative to the viewpoint of the user after detecting the respective event, wherein the second orientation is different from the first orientation, such as described with reference to the right side of FIG. 20G.

In some embodiments, the one or more virtual objects includes a plurality of candidate virtual objects including a first candidate virtual object and a second candidate virtual object that is different from the first candidate virtual object and has a different spatial arrangement (e.g., a different position and/or orientation relative to a viewpoint of the user before detecting the respective event) than the spatial arrangement of the second candidate virtual object, such as the virtual objects 2006*a-c* on the left side of FIG. 20H. In some embodiments, in accordance with a determination that the user last interacted with the first candidate virtual object of the plurality of candidate virtual objects before occurrence of the respective event, such as if the user last interacted with virtual object 2006*c* on the left side of FIG. 20H, the first candidate virtual object is the representative virtual object (e.g., virtual object 2006*c*). In some embodiments, in accordance with a determination that the user last interacted with the second candidate virtual object of the plurality of candidate virtual objects before occurrence of the respective event, such as if the user last interacted with virtual object 2006*b* on the left side of FIG. 20H, the second candidate virtual object is the representative virtual object (e.g., virtual object 2006*b*). In some embodiments, because the first candidate virtual object and the second candidate virtual object have different spatial arrangements relative to the viewpoint of the user, the one or more virtual objects have a different spatial arrangement relative to the viewpoint of the user after the respective event if the first candidate virtual object is the representative virtual object than if the second candidate virtual object is the representative virtual object.

In some embodiments, the orientation of a respective candidate virtual object relative to the viewpoint of the user is determined based on an orientation of the respective candidate virtual object relative to an orientation of a torso of the user (e.g., as opposed to being based on an orientation of the respective candidate virtual object relative to an orientation of a head of the user), such as described with reference to FIGS. 20E-20H.

In some embodiments, the orientation of a respective candidate virtual object relative to the viewpoint of the user is determined based on an orientation of the respective candidate virtual object relative to an orientation of a portion (e.g., a torso or head) of the user that was maintained (e.g., with less than a threshold amount of movement) for at least a threshold of time (e.g., 0.5, 1, 2, 3, 5, 10, 30, 60, 120 seconds) after the respective candidate virtual object was placed in the environment, such as described with reference to settled body pose in FIGS. 20E-20F. For example, one or more orientations of the portion of the user that were maintained for less than the threshold amount of time are not used for determining the orientation of the respective candidate virtual object relative to the viewpoint of the user (e.g., if the user turned temporarily when placing a virtual object and then turned back and settled for the time threshold in a different orientation, the different orientation of the portion of the user relative to the orientation of the respective candidate virtual object is used to determine an orientation of the one or more virtual objects relative the viewpoint of the user after occurrence of the respective event). The threshold amount of movement is optionally a threshold change in orientation (e.g., 0.5, 1, 3, 5, 10, 20 or 30 degrees) of the portion of the user and/or threshold change in position (e.g., 0.01, 0.03, 0.05, 0.1, 0.3, 1, 5 or 10 cm) of the portion of the user.

In some embodiments, the orientation of the torso of the user is a horizon-aligned orientation, such as the settled body poses 2012 of the user shown in FIGS. 20E-20H being horizon-aligned poses and/or orientations. For example, the orientation is based on a body position of the user but projected into a plane of the horizon (and/or the ground plane), so that the orientation is parallel to the horizon, which is a plane that is perpendicular to a direction of gravity or other direction that is specified as being a "down" direction.

In some embodiments, the respective event is an event in which the computer system restarted (e.g., a power on event or a reboot event), such as described with reference to FIGS. 20A-20H.

It should be understood that the particular order in which the operations in method 2100 have been described is merely exemplary and is not intended to indicate that the described order is the only order in which the operations could be performed. One of ordinary skill in the art would recognize various ways to reorder the operations described herein. In some embodiments, aspects/operations of method 2100 may be interchanged, substituted, and/or added between these methods. For example, various object manipulation techniques and/or object movement techniques of method 2100 is optionally interchanged, substituted, and/or added between these methods. For brevity, these details are not repeated here.

It should be understood that the particular order in which the operations in methods 800, 1000, 1200, 1300, 1500, 1700, 1900, and/or 2100 have been described is merely exemplary and is not intended to indicate that the described order is the only order in which the operations could be performed. One of ordinary skill in the art would recognize various ways to reorder the operations described herein. In some embodiments, aspects/operations of methods 800, 1000, 1200, 1300, 1500, 1700, 1900, and/or 2100 may be interchanged, substituted, and/or added between these methods. For example, the three-dimensional environment in methods 800, 1000, 1200, 1300, 1500, 1700, 1900, and/or 2100, the virtual content, virtual environments, and/or virtual objects in methods 800, 1000, 1200, 1300, 1500, 1700, 1900, and/or 2100, and/or the interactions with virtual content and/or the user interfaces in methods 800, 1000, 1200, 1300, 1500, 1700, 1900, and/or 2100 are optionally interchanged, substituted, and/or added between these methods. For brevity, these details are not repeated here.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system in communication with one or more display generation components and one or more input devices:

while displaying, via the one or more display generation components, a first virtual content item in a three-dimensional environment, detecting, via the one or more input devices, a recentering input; and in response to detecting the recentering input, shifting the first virtual content item in the three-dimensional environment so that it is closer to a center of a viewport of a user of the computer system, including:

in accordance with a determination that a viewpoint of the user of the computer system has a first viewpoint elevation angle relative to a frame of reference, displaying, via the one or more display generation components, the first virtual content item at a first content elevation angle relative to the frame of reference; and in accordance with a determination that the viewpoint of the user of the computer system has a second viewpoint elevation angle relative to the frame of reference, different from the first viewpoint elevation angle, displaying, via the one or more display generation components, the first virtual content item at a second content elevation angle relative to the frame of reference, different from the first content elevation angle.

2. The method of claim 1, wherein detecting, via the one or more input devices, the recentering input includes detecting actuation of a physical input element.

3. The method of claim 1, wherein the first viewpoint elevation angle and the second viewpoint elevation angle are outside a threshold range of viewpoint elevation angles, and wherein the method further comprises:

in response to detecting the recentering input, shifting the first virtual content item in the three-dimensional environment so that it is closer to the center of the viewport of the user, including:

in accordance with a determination that the viewpoint of the user of the computer system has a third viewpoint elevation angle relative to a frame of reference, and in accordance with a determination that the third viewpoint elevation angle is within the threshold range of viewpoint angles, displaying, via the one or more display generation components, the first virtual content item at a third content elevation angle relative to the frame of reference, different from the first content elevation angle and the second content elevation angle.

4. The method of claim 1, wherein the method further comprises:

while displaying, via the one or more display generation components, a second virtual content item in the three-dimensional environment concurrently with the first virtual content item:

in response to detecting the recentering input, shifting the second virtual content item in the three-dimensional environment in accordance with shifting the first virtual content item in the three-dimensional environment so that it is closer to the center of the viewport of the user.

5. The method of claim 1, wherein:

the first virtual content item is displayed in a virtual environment, and the virtual environment is associated with a target viewpoint yaw relative to the viewpoint of the user.

6. The method of claim 5, wherein the method further comprises:

in response to detecting the recentering input, shifting the virtual environment in the three-dimensional environment, including:

displaying, via the one or more display generation components, the virtual environment so that the virtual environment is displayed at the target viewpoint yaw relative to the viewpoint of the user.

7. The method of claim 5, wherein the method further comprises:

in response to detecting the recentering input:

in accordance with a determination that a viewpoint yaw relative to the virtual environment is above a yaw threshold, shifting the virtual environment so that it is closer to the center of the viewport of the user including displaying, via the one or more display generation components, the virtual environment at the target viewpoint yaw relative to the viewpoint of the user associated with the virtual environment; and in accordance with a determination that the viewpoint yaw relative the virtual environment is below the yaw threshold, forgoing shifting the virtual environment so that it is closer to the center of the viewport of the user including forgoing display of the virtual environment at the target viewpoint yaw relative to the viewpoint of the user associated with the virtual environment.

8. The method of claim 7, wherein the yaw threshold is determined according to a process comprising:

in accordance with a determination that the viewpoint of the user of the computer system has a third viewpoint elevation angle relative to the frame of reference, and that the third viewpoint elevation angle relative to the frame of reference is within a first range of viewpoint elevation angles, setting the yaw threshold to be a first value; and in accordance with a determination that the viewpoint of the user of the computer system has a fourth viewpoint elevation angle relative to the frame of reference that is different from the third viewpoint elevation angle relative to the frame of reference, and that the fourth viewpoint elevation angle relative to the frame of reference is within the first range of viewpoint angles, setting the yaw threshold to be the first value.

9. The method of claim 7, wherein the yaw threshold is determined according to a process comprising:

in accordance with a determination that the viewpoint of the user of the computer system has a third viewpoint elevation angle relative to the frame of reference, setting the yaw threshold to be a first value; and in accordance with a determination that the viewpoint of the user of the computer system has a fourth viewpoint elevation angle relative to the frame of reference, different from the third viewpoint elevation angle, setting the yaw threshold to be a second value, different from the first value.

10. The method of claim 5, wherein shifting the first virtual content item in the three-dimensional environment so that it is closer to the center of the viewport of the user further includes forgoing displaying the virtual environment at the target viewpoint yaw relative to the viewpoint of the user.

11. The method of claim 5, further comprising:

in response to detecting the recentering input:

in accordance with a determination that a viewpoint yaw relative to the first virtual content item is above a yaw threshold, shifting the first virtual content item so that it is closer to the center of the viewport of the user including displaying, via the one or more display generation components, the first virtual content item at the target viewpoint yaw relative to the user associated with the virtual environment; and in accordance with a determination that the viewpoint yaw relative to the first virtual content item is below the yaw threshold, forgoing shifting the first virtual content item so that it is closer to the center of the viewport of the user including forgoing display of the first virtual content item at the target viewpoint yaw relative to the user.

12. The method of claim 11, wherein the yaw threshold is determined according to a process comprising:

in accordance with a determination that the viewpoint of the user of the computer system has a third viewpoint elevation angle relative to the frame of reference, and that the third viewpoint elevation angle relative to the frame of reference is within a first range of viewpoint elevation angles, setting the yaw threshold to be a first value; and in accordance with a determination that the viewpoint of the user of the computer system has a fourth viewpoint elevation angle relative to the frame of reference, and that the fourth viewpoint elevation angle relative to the frame of reference is within the first range of viewpoint angles, setting the yaw threshold to be the first value.

13. The method of claim 11, wherein the yaw threshold is determined according to a process comprising:

in accordance with a determination that the viewpoint of the user of the computer system has a third viewpoint elevation angle relative to the frame of reference, setting the yaw threshold to be a first value; and in accordance with a determination that the viewpoint of the user of the computer system has a fourth viewpoint elevation angle relative to the frame of reference, different from the third viewpoint elevation angle, setting the yaw threshold to be a second value, different from the first value.

14. The method of claim 13, wherein:

the third viewpoint elevation angle is lower than the fourth viewpoint elevation angle, and the first value of the yaw threshold is greater than the second value of the yaw threshold.

15. The method of claim 11, the method further comprises, in response to detecting the recentering input:

in accordance with a determination that a current viewpoint yaw when the recentering input is detected has been rotated by a first amount relative to a baseline yaw, changing a position of the first virtual content item and the virtual environment based on the current viewpoint yaw;

in accordance with a determination that the current viewpoint yaw when the recentering input is detected has been rotated by a second amount, different from the first amount, relative to the baseline yaw, changing a position of the first virtual content item based on the current viewpoint yaw without changing the position of the virtual environment based on the current viewpoint yaw; and in accordance with a determination that the current viewpoint yaw when the recentering input is detected has been rotated by a third amount, different from the first amount and the second amount, relative to the baseline yaw, forgoing changing a position of the first virtual content item based on the current viewpoint yaw and forgoing changing the position of the virtual environment based on the current viewpoint yaw, wherein the first amount of rotation is greater than the second amount of rotation and the second amount of rotation is greater than the third amount of rotation.

16. The method of claim 11, wherein the yaw threshold is a virtual content yaw threshold, and the method further comprises:

in response to detecting the recentering input:

in accordance with a determination that the viewpoint of the user of the computer system has a third viewpoint elevation angle relative to the frame of reference and that the viewpoint yaw relative to the virtual environment is above a first environment yaw threshold, different from the virtual content yaw threshold, displaying, via the one or more display generation components, the virtual environment at the target viewpoint yaw relative to the viewpoint of the user associated with the virtual environment; and in accordance with a determination that the viewpoint of the user of the computer system has the third viewpoint elevation angle relative to the frame of reference that the viewpoint yaw relative to the virtual environment is below the first environment yaw threshold, forgoing display of the first virtual content item at the target viewpoint yaw relative to the viewpoint of the user associated with the virtual environment.

17. The method of claim 16, further comprising:

in response to detecting the recentering input:

in accordance with a determination that the viewpoint of the user of the computer system has a fourth viewpoint elevation angle relative to the frame of reference, different from the third viewpoint elevation angle relative to the frame of reference and that the viewpoint yaw relative to the virtual environment is above the virtual content yaw threshold, displaying, via the one or more display generation components, the virtual environment at the target viewpoint yaw relative to the user associated with the virtual environment; and in accordance with a determination that the viewpoint of the user of the computer system has the fourth viewpoint elevation angle relative to the frame of reference, different from the third viewpoint elevation angle relative to the frame of reference and that the viewpoint yaw relative to the virtual environment is below the virtual content yaw threshold, forgoing displaying the virtual environment at the target viewpoint yaw relative to the user associated with the virtual environment.

18. A computer system that is in communication with one or more display generation components and one or more input devices, the computer system comprising:

one or more processors;

memory; and one or more programs, wherein the one or more programs are stored in the memory and configured to be executed by the one or more processors, the one or more programs including instructions for:

while displaying, via the one or more display generation components, a first virtual content item in a three-dimensional environment, detecting, via the one or more input devices, a recentering input; and in response to detecting the recentering input, shifting the first virtual content item in the three-dimensional environment so that it is closer to a center of a viewport of a user, including:

in accordance with a determination that a viewpoint of the user of the computer system has a first viewpoint elevation angle relative to a frame of reference, displaying, via the one or more display generation components, the first virtual content item at a first content elevation angle relative to the frame of reference; and in accordance with a determination that the viewpoint of the user of the computer system has a second viewpoint elevation angle relative to the frame of reference, different from the first viewpoint elevation angle, displaying, via the one or more display generation components, the first virtual content item at a second content elevation angle relative to the frame of reference, different from the first content elevation angle.

19. A non-transitory computer readable storage medium storing one or more programs, the one or more programs comprising instructions, which when executed by one or more processors of a computer system that is in communication with one or more display generation components and one or more input devices, cause the computer system to perform a method comprising:

while displaying, via the one or more display generation components, a first virtual content item in a three-dimensional environment, detecting, via the one or more input devices, a recentering input; and in response to detecting the recentering input, shifting the first virtual content item in the three-dimensional environment so that it is closer to a center of a viewport of a user, including:

in accordance with a determination that a viewpoint of the user of the computer system has a first viewpoint elevation angle relative to a frame of reference, displaying, via the one or more display generation components, the first virtual content item at a first content elevation angle relative to the frame of reference; and in accordance with a determination that the viewpoint of the user of the computer system has a second viewpoint elevation angle relative to the frame of reference, different from the first viewpoint elevation angle, displaying, via the one or more display generation components, the first virtual content item at a second content elevation angle relative to the frame of reference, different from the first content elevation angle.

20. The computer system of claim 18, wherein the first viewpoint elevation angle and the second viewpoint elevation angle are outside a threshold range of viewpoint elevation angles, and wherein the one or more programs further include instructions for:

in response to detecting the recentering input, shifting the first virtual content item in the three-dimensional environment so that it is closer to the center of the viewport of the user, including:

in accordance with a determination that the viewpoint of the user of the computer system has a third viewpoint elevation angle relative to a frame of reference, and in accordance with a determination that the third viewpoint elevation angle is within the threshold range of viewpoint angles, displaying, via the one or more display generation components, the first virtual content item at a third content elevation angle relative to the frame of reference, different from the first content elevation angle and the second content elevation angle.

21. The computer system of claim 18, wherein:
the first virtual content item is displayed in a virtual environment, and
the virtual environment is associated with a target viewpoint yaw relative to the viewpoint of the user.

22. The computer system of claim 21, wherein the one or more programs further include instructions for:

in response to detecting the recentering input:

in accordance with a determination that a viewpoint yaw relative to the virtual environment is above a yaw threshold, shifting the virtual environment so that it is closer to the center of the viewpoint of the user including displaying, via the one or more display generation components, the virtual environment at the target viewpoint yaw relative to the viewpoint of the user associated with the virtual environment; and in accordance with a determination that the viewpoint yaw relative the virtual environment is below the yaw threshold, forgoing shifting the virtual environment so that it is closer to the center of the viewpoint of the user including forgoing display of the virtual environment at the target viewpoint yaw relative to the viewpoint of the user associated with the virtual environment.

23. The computer system of claim 22, wherein the yaw threshold is determined according to a process comprising:

in accordance with a determination that the viewpoint of the user of the computer system has a third viewpoint elevation angle relative to the frame of reference, and that the third viewpoint elevation angle relative to the frame of reference is within a first range of viewpoint elevation angles, setting the yaw threshold to be a first value; and in accordance with a determination that the viewpoint of the user of the computer system has a fourth viewpoint elevation angle relative to the frame of reference that is different from the third viewpoint elevation angle relative to the frame of reference, and that the fourth viewpoint elevation angle relative to the frame of reference is within the first range of viewpoint angles, setting the yaw threshold to be the first value.

24. The computer system of claim 22, wherein the yaw threshold is determined according to a process comprising:

in accordance with a determination that the viewpoint of the user of the computer system has a third viewpoint elevation angle relative to the frame of reference, setting the yaw threshold to be a first value; and in accordance with a determination that the viewpoint of the user of the computer system has a fourth viewpoint elevation angle relative to the frame of reference, different from the third viewpoint elevation angle, setting the yaw threshold to be a second value, different from the first value.

25. The computer system of claim 21, wherein the one or more programs further include instructions for:

in response to detecting the recentering input:

in accordance with a determination that a viewpoint yaw relative to the first virtual content item is above a yaw threshold, shifting the first virtual content item so that it is closer to the center of the viewpoint of the user including displaying, via the one or more display generation components, the first virtual content item at the target viewpoint yaw relative to the user associated with the virtual environment; and in accordance with a determination that the viewpoint yaw relative to the first virtual content item is below the yaw threshold, forgoing shifting the first virtual content item so that it is closer to the center of the viewpoint of the user including forgoing display of the first virtual content item at the target viewpoint yaw relative to the user.

26. The computer system of claim 25, wherein the yaw threshold is determined according to a process comprising:

in accordance with a determination that the viewpoint of the user of the computer system has a third viewpoint elevation angle relative to the frame of reference, and that the third viewpoint elevation angle relative to the frame of reference is within a first range of viewpoint elevation angles, setting the yaw threshold to be a first value; and in accordance with a determination that the viewpoint of the user of the computer system has a fourth viewpoint elevation angle relative to the frame of reference, and that the fourth viewpoint elevation angle relative to the frame of reference is within the first range of viewpoint angles, setting the yaw threshold to be the first value.

27. The computer system of claim 25, wherein the yaw threshold is determined according to a process comprising:

in accordance with a determination that the viewpoint of the user of the computer system has a third viewpoint elevation angle relative to the frame of reference, setting the yaw threshold to be a first value; and in accordance with a determination that the viewpoint of the user of the computer system has a fourth viewpoint elevation angle relative to the frame of reference, different from the third viewpoint elevation angle, setting the yaw threshold to be a second value, different from the first value.

28. The computer system of claim 25, wherein the one or more programs further include instructions for, in response to detecting the recentering input:

in accordance with a determination that a current viewpoint yaw when the recentering input is detected has been rotated by a first amount relative to a baseline yaw, changing a position of the first virtual content item and the virtual environment based on the current viewpoint yaw;

in accordance with a determination that the current viewpoint yaw when the recentering input is detected has been rotated by a second amount, different from the first amount, relative to the baseline yaw, changing a position of the first virtual content item based on the current viewpoint yaw without changing the position of the virtual environment based on the current viewpoint yaw; and in accordance with a determination that the current viewpoint yaw when the recentering input is detected has been rotated by a third amount, different from the first amount and the second amount, relative to the baseline yaw, forgoing changing a position of the first virtual content item based on the current viewpoint yaw and forgoing changing the position of the virtual environment based on the current viewpoint yaw, wherein the first amount of rotation is greater than the second amount of rotation and the second amount of rotation is greater than the third amount of rotation.

29. The computer system of claim 25, wherein the yaw threshold is a virtual content yaw threshold, and the one or more programs further include instructions for:

in response to detecting the recentering input:

in accordance with a determination that the viewpoint of the user of the computer system has a third viewpoint elevation angle relative to the frame of reference and that the viewpoint yaw relative to the virtual environment is above a first environment yaw threshold, different from the virtual content yaw threshold, displaying, via the one or more display generation components, the virtual environment at the target viewpoint yaw relative to the viewpoint of the user associated with the virtual environment; and in accordance with a determination that the viewpoint of the user of the computer system has the third viewpoint elevation angle relative to the frame of reference that the viewpoint yaw relative to the virtual environment is below the first environment yaw threshold, forgoing display of the first virtual content item at the target viewpoint yaw relative to the viewpoint of the user associated with the virtual environment.

30. The computer system of claim 29, wherein the one or more programs further include instructions for:

in response to detecting the recentering input:

in accordance with a determination that the viewpoint of the user of the computer system has a fourth viewpoint elevation angle relative to the frame of reference, different from the third viewpoint elevation angle relative to the frame of reference and that the viewpoint yaw relative to the virtual environment is above the virtual content yaw threshold, displaying, via the one or more display generation components, the virtual environment at the target viewpoint yaw relative to the user associated with the virtual environment; and in accordance with a determination that the viewpoint of the user of the computer system has the fourth viewpoint elevation angle relative to the frame of reference, different from the third viewpoint elevation angle relative to the frame of reference and that the viewpoint yaw relative to the virtual environment is below the virtual content yaw threshold, forgoing displaying the virtual environment at the target viewpoint yaw relative to the user associated with the virtual environment.

31. The non-transitory computer readable storage medium of claim 19, wherein the first viewpoint elevation angle and the second viewpoint elevation angle are outside a threshold range of viewpoint elevation angles, and wherein the method further comprises:

in response to detecting the recentering input, shifting the first virtual content item in the three-dimensional environment so that it is closer to the center of the viewport of the user, including:

in accordance with a determination that the viewpoint of the user of the computer system has a third viewpoint elevation angle relative to a frame of reference, and in accordance with a determination that the third viewpoint elevation angle is within the threshold range of viewpoint angles, displaying, via the one or more display generation components, the first virtual content item at a third content elevation angle relative to the frame of reference, different from the first content elevation angle and the second content elevation angle.

32. The non-transitory computer readable storage medium of claim 19, wherein:

the first virtual content item is displayed in a virtual environment, and the virtual environment is associated with a target viewpoint yaw relative to the viewpoint of the user.

33. The non-transitory computer readable storage medium of claim 32, wherein the method further comprises:

in response to detecting the recentering input:

in accordance with a determination that a viewpoint yaw relative to the virtual environment is above a yaw threshold, shifting the virtual environment so that it is closer to the center of the viewpoint of the user including displaying, via the one or more display generation components, the virtual environment at the target viewpoint yaw relative to the viewpoint of the user associated with the virtual environment; and in accordance with a determination that the viewpoint yaw relative the virtual environment is below the yaw threshold, forgoing shifting the virtual environment so that it is closer to the center of the viewpoint of the user including forgoing display of the virtual environment at the target viewpoint yaw relative to the viewpoint of the user associated with the virtual environment.

34. The non-transitory computer readable storage medium of claim 33, wherein the yaw threshold is determined according to a process comprising:

in accordance with a determination that the viewpoint of the user of the computer system has a third viewpoint elevation angle relative to the frame of reference, and that the third viewpoint elevation angle relative to the frame of reference is within a first range of viewpoint elevation angles, setting the yaw threshold to be a first value; and in accordance with a determination that the viewpoint of the user of the computer system has a fourth viewpoint elevation angle relative to the frame of reference that is different from the third viewpoint elevation angle relative to the frame of reference, and that the fourth viewpoint elevation angle relative to the frame of reference is within the first range of viewpoint angles, setting the yaw threshold to be the first value.

35. The non-transitory computer readable storage medium of claim 33, wherein the yaw threshold is determined according to a process comprising:

in accordance with a determination that the viewpoint of the user of the computer system has a third viewpoint elevation angle relative to the frame of reference, setting the yaw threshold to be a first value; and in accordance with a determination that the viewpoint of the user of the computer system has a fourth viewpoint elevation angle relative to the frame of reference, different from the third viewpoint elevation angle, setting the yaw threshold to be a second value, different from the first value.

36. The non-transitory computer readable storage medium of claim 32, wherein the method further comprises:

in response to detecting the recentering input:

in accordance with a determination that a viewpoint yaw relative to the first virtual content item is above a yaw threshold, shifting the first virtual content item so that it is closer to the center of the viewpoint of the user including displaying, via the one or more display generation components, the first virtual content item at the target viewpoint yaw relative to the user associated with the virtual environment; and in accordance with a determination that the viewpoint yaw relative to the first virtual content item is below the yaw threshold, forgoing shifting the first virtual content item so that it is closer to the center of the viewpoint of the user including forgoing display of the first virtual content item at the target viewpoint yaw relative to the user.

37. The non-transitory computer readable storage medium of claim 36, wherein the yaw threshold is determined according to a process comprising:

in accordance with a determination that the viewpoint of the user of the computer system has a third viewpoint elevation angle relative to the frame of reference, and that the third viewpoint elevation angle relative to the frame of reference is within a first range of viewpoint elevation angles, setting the yaw threshold to be a first value; and in accordance with a determination that the viewpoint of the user of the computer system has a fourth viewpoint elevation angle relative to the frame of reference, and that the fourth viewpoint elevation angle relative to the frame of reference is within the first range of viewpoint angles, setting the yaw threshold to be the first value.

38. The non-transitory computer readable storage medium of claim 36, wherein the yaw threshold is determined according to a process comprising:

in accordance with a determination that the viewpoint of the user of the computer system has a third viewpoint elevation angle relative to the frame of reference, setting the yaw threshold to be a first value; and in accordance with a determination that the viewpoint of the user of the computer system has a fourth viewpoint elevation angle relative to the frame of reference, different from the third viewpoint elevation angle, setting the yaw threshold to be a second value, different from the first value.

39. The non-transitory computer readable storage medium of claim 36, wherein the method further comprises, in response to detecting the recentering input:

in accordance with a determination that a current viewpoint yaw when the recentering input is detected has been rotated by a first amount relative to a baseline yaw, changing a position of the first virtual content item and the virtual environment based on the current viewpoint yaw;

in accordance with a determination that the current viewpoint yaw when the recentering input is detected has been rotated by a second amount, different from the first amount, relative to the baseline yaw, changing a position of the first virtual content item based on the current viewpoint yaw without changing the position of the virtual environment based on the current viewpoint yaw; and in accordance with a determination that the current viewpoint yaw when the recentering input is detected has been rotated by a third amount, different from the first amount and the second amount, relative to the baseline yaw, forgoing changing a position of the first virtual content item based on the current viewpoint yaw and forgoing changing the position of the virtual environment based on the current viewpoint yaw, wherein the first amount of rotation is greater than the second amount of rotation and the second amount of rotation is greater than the third amount of rotation.

40. The non-transitory computer readable storage medium of claim 36, wherein the yaw threshold is a virtual content yaw threshold, and the method further comprises:

in response to detecting the recentering input:

in accordance with a determination that the viewpoint of the user of the computer system has a third viewpoint elevation angle relative to the frame of reference and that the viewpoint yaw relative to the virtual environment is above a first environment yaw threshold, different from the virtual content yaw threshold, displaying, via the one or more display generation components, the virtual environment at the target viewpoint yaw relative to the viewpoint of the user associated with the virtual environment; and in accordance with a determination that the viewpoint of the user of the computer system has the third viewpoint elevation angle relative to the frame of reference that the viewpoint yaw relative to the virtual environment is below the first environment yaw threshold, forgoing display of the first virtual content item at the target viewpoint yaw relative to the viewpoint of the user associated with the virtual environment.

41. The non-transitory computer readable storage medium of claim 40, wherein the method further comprises:

in response to detecting the recentering input:

in accordance with a determination that the viewpoint of the user of the computer system has a fourth viewpoint elevation angle relative to the frame of reference, different from the third viewpoint elevation angle relative to the frame of reference and that the viewpoint yaw relative to the virtual environment is above the virtual content yaw threshold, displaying, via the one or more display generation components, the virtual environment at the target viewpoint yaw relative to the user associated with the virtual environment; and in accordance with a determination that the viewpoint of the user of the computer system has the fourth viewpoint elevation angle relative to the frame of reference, different from the third viewpoint elevation angle relative to the frame of reference and that the viewpoint yaw relative to the virtual environment is below the virtual content yaw threshold, forgoing displaying the virtual environment at the target viewpoint yaw relative to the user associated with the virtual environment.

* * * * * 25